United States Patent [19]

Allen et al.

[11] Patent Number: 4,570,217

[45] Date of Patent: Feb. 11, 1986

[54] MAN MACHINE INTERFACE

[76] Inventors: Bruce S. Allen, Willow St., East Kingston, N.H. 03827; Michael R. Dunalvey, 276 Harris Ave., Needham, Mass. 02192; Bruce A. King, R.F.D. 2, Bolton, Mass. 01740; Harold J. DuPrie, 57 High St., Apt. 1B, Andover, Mass. 01810; Richard E. Hudnall, 15 Juniper La., Nashua, N.H. 03063; Stanely N. Lapidus, 44 Elk Dr., Bedford, N.H. 03102; Daniel R. Gilbert, 103 Horseshoe Rd., Dracut, Mass. 01826; Anne M. Carlson, 31 Avon St., Wakefield, Mass. 01880; Kiran Thakrar, 13 Tiffany Rd., Apt. 7 King's Ct.; Robert C. Doig, 9 Lancelot Ct., Apt. 12, both of Salem, N.H. 03079; Brian S. Kimerer, 66 John Carver Rd., Reading, Mass. 01867; Andrew F. Sirois, 20 Easton St., Lawrence, Mass. 01843; Bruce A. Poirer, 5 Balgreen Ct., Bradford, Mass. 01830; Philip G. Hunt, 3 Silvestri Cir., Apt. 17, Derry, N.H. 03038; Joseph J. Dziezanowski, 59 Strahmore Rd., Brighton, Mass. 02146; Michael A. Bromberg, 12D Hampshire Dr., Nashua, N.H. 03063; Michael Brown, 1 Lancelot Ct., Apt. #16, Salem, N.H. 03079; Seymour A. Friedel, Bean Rd., Merrimack, N.H. 03054

[21] Appl. No.: 479,191

[22] Filed: Mar. 28, 1983

Related U.S. Application Data

[63] Continuation-in-part of Ser. No. 363,404, Mar. 29, 1982, abandoned.

[51] Int. Cl.[4] ........................ G06F 15/46; G06F 3/153

[52] U.S. Cl. .................................... 364/188; 364/191; 364/900

[58] Field of Search ................ 364/188, 189, 167–171, 364/191–193, 200, 900; 340/701–704, 706, 707, 711, 712, 720, 721, 722

[56] References Cited

U.S. PATENT DOCUMENTS

| | | | |
|---|---|---|---|
| 3,971,000 | 7/1976 | Cromwell | 364/189 X |
| 4,001,807 | 1/1977 | Dallimonti | 364/189 |
| 4,303,973 | 12/1981 | Williamson, Jr. et al. | 364/189 |
| 4,413,314 | 11/1983 | Slater et al. | 364/188 |
| 4,443,861 | 4/1984 | Slater | 364/189 X |

*Primary Examiner*—Joseph Ruggiero
*Attorney, Agent, or Firm*—Robert H. Ware; Melvin I. Stoltz; Alfred A. Fressola

[57] ABSTRACT

A man-machine interface for use with industrial processes is disclosed having the capability of design and configuration of the interrelationship of components forming an overall industrial process. The man-machine interface further provides operator use, including process monitoring and control, as well as alarm annunciation. Most user interaction with the man-machine interface is performed through a color CRT monitor having a touch panel on the surface of the CRT screen. Operator use may be limited to touch panel interaction while configurer and designer use normally further includes use of a keyboard.

The man-machine interface utilizes distributed processing and incorporates a high level graphic language. The graphic language facilitates real time graphic display implementation through use of dynamic and static variables. Variable types are dynamically associated with variable values so that variables can undergo type changes without detrimental effect. Video bit bangers and shifters further enhance the versatility and ease of implementing rapid modifications of graphic displays. The man-machine interface further incorporates a new bus structure including a new bus arbitration technique, a unidirectional memory boundary protection mechanism, an improved interrupt system, and an improved watchdog timer circuit.

43 Claims, 119 Drawing Figures

Microfiche Appendix Included
(27 Microfiche, 1701 Pages)

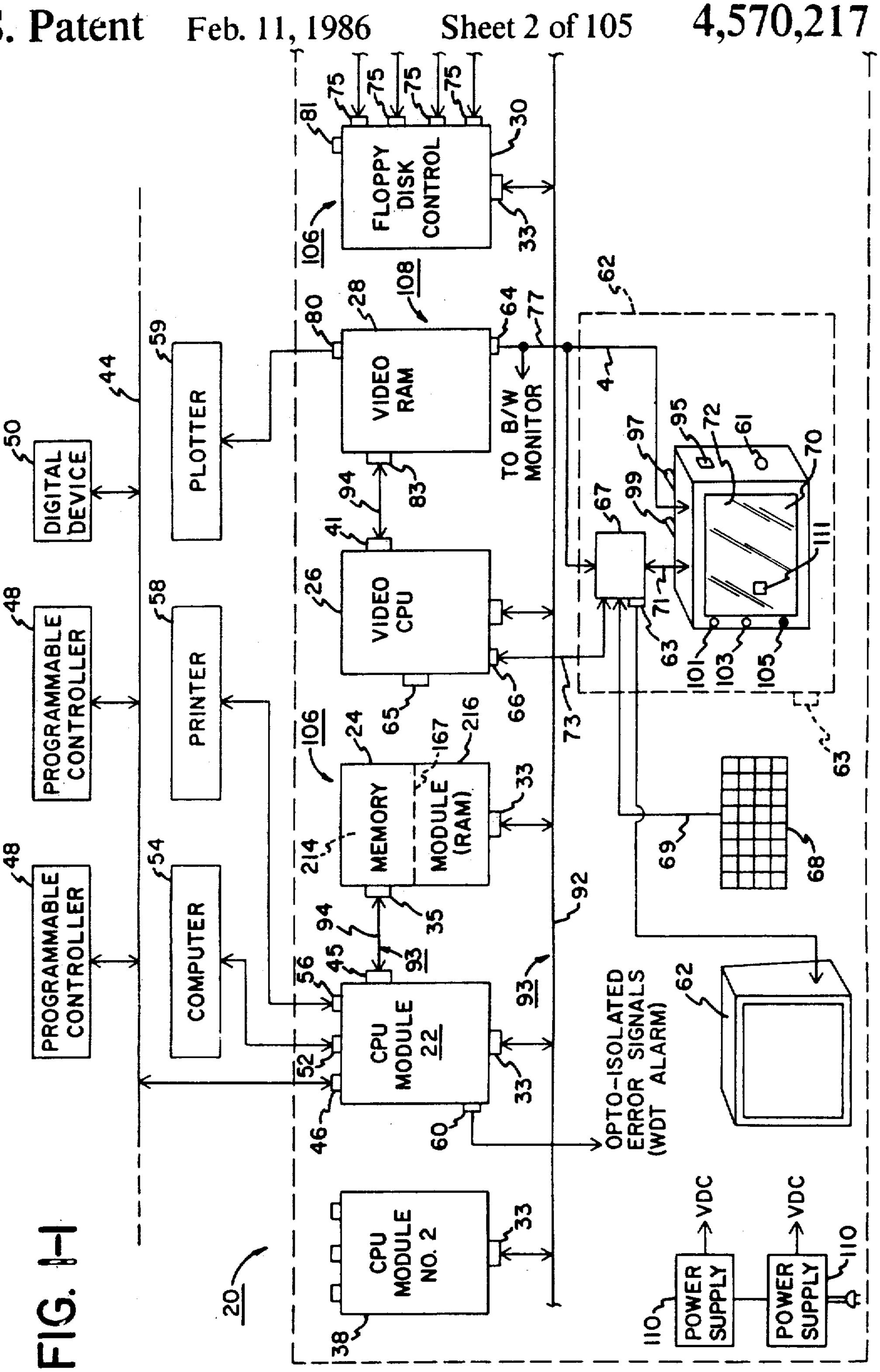
FIG. I-I

MMI BASIC CONFIGURATION

A MOVES DATA BLOCK I INTO SHARED MEMORY

D MOVES DATA BLOCK I OUT OF SHARED MEMORY

A STORES X INTO SHARED MEMORY, D READS X FROM SHARED MEMORY

A EXECUTES INSTRUCTION I IN SHARED MEMORY

"DATA MOVEMENT"

1. TC INCLUDES TM. PROGRAM EXECUTION SPEED REFERENCING LOCAL MEMORY.
2. TC—TM + TM = TC. BASIC REFERENCE SPEED TO SHARED MEMORY.
3. XOF. FIXED BUS OVERHEAD TO REFERENCE SHARED MEMORY.
4. XOV. VARIABLE BUS OVERHEAD TO REFERENCE SHARED MEMORY

DATA MOVEMENT TIMES

SLOT X GETS IT IF IT WANTS IT.
IF NOT, X+1 GETS IT IF IT WANTS IT.
SLOT N, THEN 1, THEN 2,...
IF NO OTHER SLOT WANTS IT THEN X−1 CAN GET IT.

ROTATIONAL PRIORITY ARBITRATION

PRIORITY PASSES LEFT TO RIGHT: 2,3,...,8,9,2,3...
BUT, SLOT 1 GETS EVERY SECOND ACCESS

PRIVILEGED ROTATIONAL PRIORITY ARBITRATION

GENERALIZED ADDRESS PATHS OF THE MMI

EACH ZONE SELECTS 1 OF 4 PALETTES
EACH PIXEL 113 SELECTS 1 OF 16 COLOR ENTRIES
EACH ENTRY SELECTS 1 OF 512 PHYSICAL COLORS
MAXIMUM 64 COLORS ON SCREEN AT ANY ONE TIME

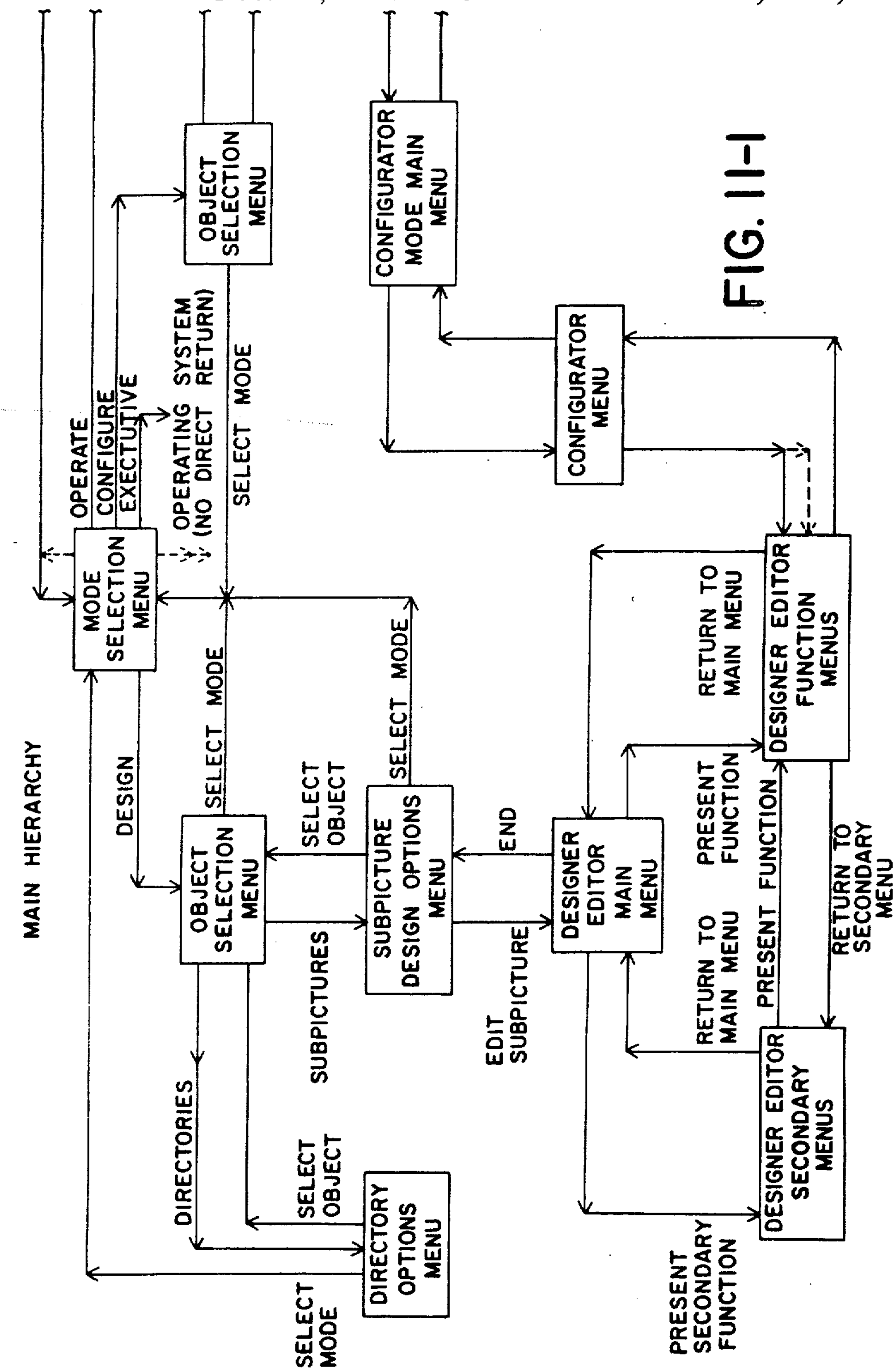
FIG. 11-I

CONFIGURATOR EDITOR

VIDEO STATION OVERVIEW

VIDEO STATION CO-ORDINATE SYSTEM

INNER RECTANGLE — SCREEN AREA
OUTER RECTANGLE — VID-88 CO-ORDINATE SYSTEM

| | |
|---|---|
| FIG. 21A | FIG. 21B |
| FIG. 21C | FIG. 21D |

FIG. 21E

| | | |
|---|---|---|
| FIG. 78A | FIG. 78B | FIG. 78C |
| FIG. 78D | FIG. 78E | FIG. 78F |
| FIG. 78G | FIG. 78H | |

FIG. 78I

MEMORY MODULE BLOCK DIAGRAM

① PUBLIC BUS ACCESSED

NOTE: ANY MODULE OF THIS DESIGN CAN READ ITS OWN STATUS AS WELL AS SOME OTHER MODULE

① BEFORE WDR-L CAN GO ACTIVE, DØ-D7 MUST BE EQUAL TO THE SLOT NUMBER OF THE BOARD, THE TWO INPUT BITS BI, B2 OF THE 25LS2521 AND THE LOW LEVEL OF SIGNAL MWTC-L

SYSTEMS MASTERS EXCEPT CPU MODULE

ADROO-L AND BHE-L IMPLEMENTATION

MEMORY OR I/O READ/WRITE TIMING

NON-BUS VECTORED INTERRUPT TIMING

Ⓐ NO TIMEOUT CYCLE WITH NO WAIT STATES
Ⓑ NO TIMEOUT CYCLE WITH WAIT STATES. (EVEN AFTER 6 MSEC)
① FIRST CLOCK CYCLE PEROID (T1 STATE)
② READY—H TIMING SHOWN IN RELATIVE REFERENCE ONLY
③ CPU T4 STATE (1) FIRST CLOCK CYCLE PERIOD (TI STATE)
(2) 9602 TIMES OUT AFTER 6 MSEC
(3) AFTER THE INTERRUPT FOR XACTO-H HAS BEEN SERVICED RSTXTO IS SET ACTIVE TO CLEAR IT
(4) XTORDY-L IS RESET WITH THE FIRST ALE AFTER THE 9602 TIMED OUT
(A) THIS IS THE CASE WHERE READY IS NEVER RETURNED. XTORDY AND XACKTO GOES ACTIVE 6 MSEC LATER DUE TO 9602 TIME OUT
(B) RESETTING XTORDY-L
(C) RESETTING XACKTO-H

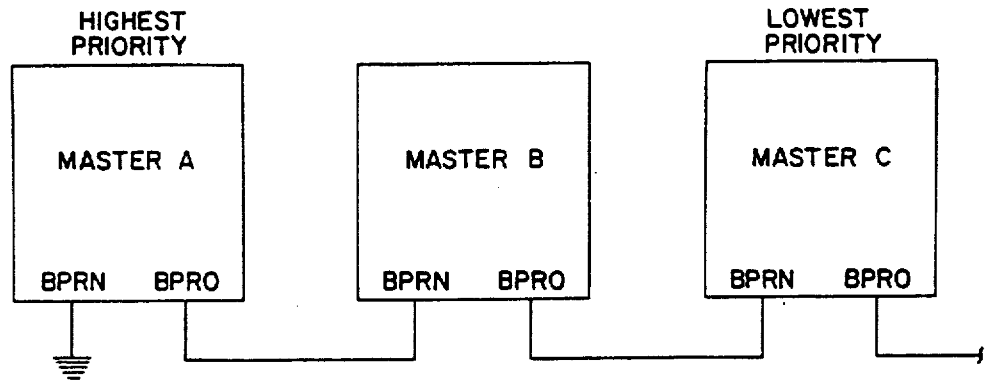

RESOLUTION TIME < 'BCLK > 'BPRO(A) + 'BPRN−BPRO(B) + 'BPRN(C) + 'SKEW
< 100 NS > 40 + 30 + 22 + 2
100 NS > 94 NS $$MAX^{\#} = 2 + \left\lfloor \frac{'BCLK - 'BPRO(A) - 'BPRN - 'SHEW}{'BPRN-BPRO} \right\rfloor$$

*NOTE $\lfloor X \rfloor$ = THE GREATEST INTEGER LESS THAN OR EQUAL TO X (THE "FLOOR" OF X)

$^{\tau}$BCLK = BUS CLOCK PERIOD $^{\tau}$BPRO = BUS CLOCK FALLING EDGE TO BUS CLOCK $^{\tau}$BPRN−BPRO = PROPAGATION DELAY OF BPRN INTO BPRO−L OUT $^{\tau}$SKEW = PROPAGATION DELAY OF BCLK−L FROM SOURCE TO END OF BUS (LAST MASTER)

THE MAXIMUM NUMBER CAN EASILY BE EXTENDED IF THE USER WISHES TO GENERATE A BCLK−L WITH A LONGER CYCLE

SERIAL PRIORITY TECHNIQUE

FIG. 47A

SETUP, HOLD, RINGING SUMMARY

SYSTEM TIMING (USE tPD BUS PROP DELAY, IN ALL SYS. CALC'S)

COMMON BUS REQUEST AC TIMING

BUS CONTROL EXCHANGE

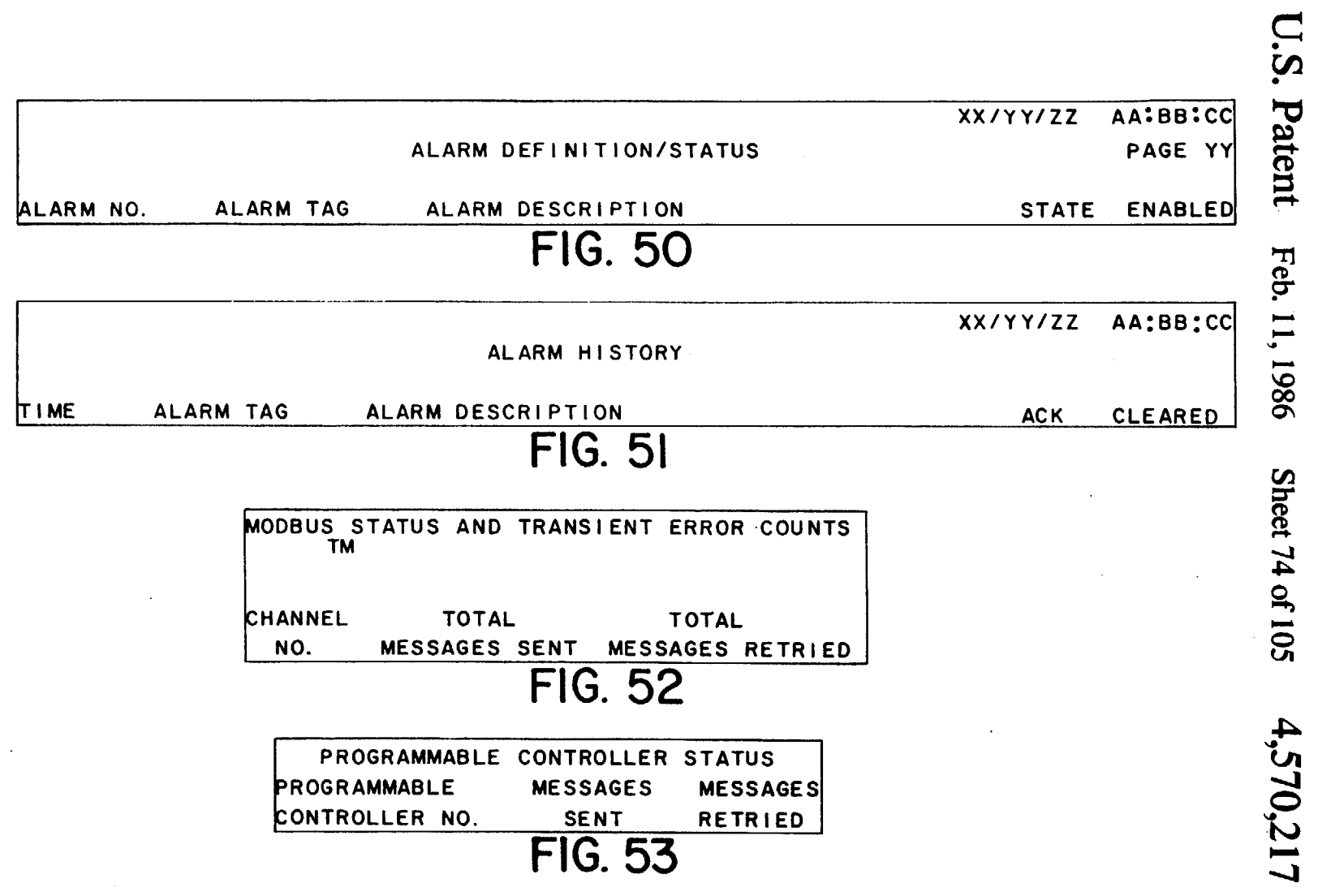

XX/YY/ZZ AA:BB:CC
PAGE YY
ALARM DEFINITION/STATUS
ALARM NO. ALARM TAG ALARM DESCRIPTION STATE ENABLED

FIG. 50

XX/YY/ZZ AA:BB:CC
ALARM HISTORY
TIME ALARM TAG ALARM DESCRIPTION ACK CLEARED

FIG. 51

MODBUS™ STATUS AND TRANSIENT ERROR COUNTS

| CHANNEL NO. | TOTAL MESSAGES SENT | TOTAL MESSAGES RETRIED |
| --- | --- | --- |

FIG. 52

PROGRAMMABLE CONTROLLER STATUS

| PROGRAMMABLE CONTROLLER NO. | MESSAGES SENT | MESSAGES RETRIED |
| --- | --- | --- |

| TIME | VAR00001<br>LINE 2(TYP)<br>LINE 3(TYP) | VAR00002 | VAR00003 | VAR0004 | VAR00005 | VAR00006 | VAR00007 | VAR00008 |
|---|---|---|---|---|---|---|---|---|
| :00 | | | | | | | | |
| :00 | | | | | | | | |
| :00 | | | | | | | | |
| :00 | | | | | | | | |
| :00 | | | | | | | | |
| :00 | | | | | | | | |
| :00 | | | | | | | | |
| :00 | | | | | | | | |
| :00 | | | | | | | | |
| :00 | | | | | | | | |

FLOPPY DISK CONTROLLER
3.0 BLOCK DIAGRAM
MMDC

MAN MACHINE INTERFACE

The present application is a continuation-in-part application of U.S. patent application Ser. No. 363,404, filed Mar. 29, 1982 for MAN-MACHINE INTERFACE, now abandoned, in favor of the present application.

REFERENCE TO "MICROFICHE APPENDIX"

The present continuation-in-part application includes a "Microfiche Appendix" containing twenty-seven sheets of microfiche in format A3 (63 frames per sheet, 9 columns by 7 rows).

TECHNICAL FIELD

The present invention is directed to machines that interface with other machines, sensors, and control elements that combine to control and monitor processes, especially industrial processes. In particular, it is directed to man-machine interfaces for designing, configuring and monitoring an overall process by designing, configuring and monitoring the interconnection of control and monitoring devices used to form an overall control plan. Such control and monitoring devices include programmable controllers, robots, valves, and various sensing devices including liquid level sensors, temperature sensors, pressure sensors, and the like.

BACKGROUND ART

Monitoring and control of industrial processes has undergone a series of developments in the last forty years. These developments can be characterized chronologically by the use of distributed instrumentation associated with the process throughout the plant; to the use of electrical instrumentation for monitoring plant conditions; to the use of centralizing the electrical instrumentation in large control rooms; and in more recent times through the use of centralized computer based operator displays using CRT monitors to present information regarding the process variables, trends of past history of selected variables and alarm annunciation. Present day centralized operator consoles may be grouped in units of two or more to provide multiple displays; with for instance one console showing the overall process, a second console allowing the operator to monitor a group of specific data points, and sometimes a third console dedicated to alarm annunciation. Associated with such operator monitors has typically been dedicated keyboards for the input of information by the operator; specifically with respect to set point values, alarm limits, and other input parameters.

Thus, over the years there has been a steady evolution in process instrumentation and control to the point where it has been found desirable to concentrate operator monitoring and oversee control at a single location in order to provide complete plant overview, including alarm review and plant operation in general.

A typical prior art system with these capabilities is the TDC-2000 system of Honeywell, Inc. In this system, multiple monitors and associated keyboards are utilized to oversee plant operations which in combination with various process interfaces provides for the overall monitoring and alarm annunciation of the entire process. A Honeywell, Inc. publication entitled "An Evolutionary Look at Centralized Operation/2", copyright 1977, by Henry Marks, describes this prior art system and shows that multiple CRT monitors are used in conjunction with associated keyboards, pen recorders and printers.

A fundamental difference between this prior art system and the present man-machine interface is that the former utilizes dedicated keyboards for the selection of the portion of the plant to be displayed as well as for responding to alarm conditions and for setting various parameters. The present invention when utilized for operator monitoring and control need not use a keyboard, but instead performs its functions through graphic displays with the response by the operator made through a touch screen associated with the monitor. In this way, the man-machine interface can be made more user friendly. It is also more flexible with respect to the type of response required by the operator and the way that the response is input by the operator. Indeed, the present invention provides for generation of screen generated "buttons" which can change color upon activation by the operator and which can take on various colors and blinking states to draw attention to the response required. This overall graphic display approach is believed to be much more operator friendly and is readily adaptable to changing circumstances of the process under control.

Furthermore, the present invention provides a man-machine interface with a built-in high level graphic language having commands which provide easy design and configuration of the overall process to be controlled. The high level graphic language includes built-in templates defining particular graphic designs which further helps the designer and configurer to generate a desired overall configuration of the process to be initialized or modified and in the way it is to be monitored and controlled.

In addition, up to sixteen different colors from 512 permissible colors may be simultaneously displayed in each of a plurality of zones; each zone occupying a region of the CRT screen. In this way, simulation of pen recorders with multiple colors can be obtained with a high resolution, including accurate color line depiction with the new neighborhood of line crossings, something hitherto believed to be unobtainable.

The present invention also incorporates other video features including the ability to shift sub-pictures on the screen and to manipulate the screen information in a high speed dynamic fashion which further enhances the graphic capability and therefore man-machine friendliness of the present invention.

Thus although dynamic graphics and process control exist in the prior art, the present invention provides the means for implementing such graphics in a straightforward fashion as well as providing greater graphic capabilities.

The Anaconda Advanced Technology (ANATEC) of Los Angeles, CA. provides a process control system with CRT monitors, which like the Honeywell TDC-2000, utilizes keyboards in association with monitors for operator overseeing and control and further utilizes a computer control and display system called CRISP® for implementing the desired process. The graphics associated with this system utilize 256 standard engineering symbols and characters to implement the displays and to design overview and process loop control. Each symbol and character occupies a given screen area (typically on the order of fifty pixels) and in each such area only two colors (background and foreground) can be displayed. Although such screen areas are relatively small, graphic representations of intersecting lines cannot show such lines as two distinct colors if the background is to have a unique color. The high level graphic language of the present invention is procedurally oriented without dedicated symbol types and thereby the colors associated with any subset of the screen is not limited to two colors as determined by the symbol type but can be any one of up to sixteen different colors for the corresponding zone in which that portion of the screen resides. This color determination can be made on the pixel level for each pixel in the zone. Differently colored intersecting or adjacent lines are thus possible in combination with a unique background color. The end result is that the graphic displays of the present invention provide high color resolution on a pixel by pixel basis which is easy to implement and modify.

Another CRT based operator work station for process control is that of the Foxboro Co., of Foxboro, MA., known as VIDEO SPEC TM subsystem. The VIDEO SPEC subsystem is a subset of the SPEC 200 TM management control system sold by Foxboro. The subsystem is the vehicle by which display and response to the overall process is made by the operator. Process overviews, trends, records of variables and alarm summaries are available with this system. It, like the previously mentioned prior art process control systems, utilizes a keyboard in association with a monitor(s) for selection of the process portions to be overseen as well as to provide input to the overall process. The use of a graphic display which is touch sensitive for operator input is neither described nor suggested by these prior art systems. Thus although the CRT in the Foxboro system may be used to label associated keys on the keyboard through alignment with the keys, the actual implementation of buttons and other devices on the display for user input and control is not shown or suggested by this product.

Similarly, a distributed process control system called the DCI-4000 by Fischer & Porter Co. of Warminster, PA. utilizes a black and white TV scan CRT terminal with an associated special keyboard that is used as the operator panel.

DISCLOSURE OF THE INVENTION

A man-machine interface (MMI) for design, configuration and operation of a distributed control system is disclosed. The man-machine interface is a cathode ray tube (CRT) based machine through which an operator can, among other things, oversee the state of the process under control, details of that process if desired, an overview of the alarm status of the process, and the ability to change set points and other variables, either in response to desired modifications or in response to alarm situations. The man-machine interface is connected to the process under control through a communications link, such as the MODBUS TM communications system or by a high speed communications systems, such as the MODWAY TM local area network communications system, both systems owned and developed by the present assignee. Interconnected by the communications link to the man-machine interface can be programmable controllers, robots, and any other process control interface for accepting analog or digital inputs and for providing analog or digital outputs. Such additional input devices include temperature sensors, pressure sensors, fluid level height sensors, and ON/OFF switch positions, while the output devices include solenoid controlled valves, relays and the like. Such external devices may interface with the communications link via programmable controllers or through a dedicated process control interface.

The man-machine interface comprises several different types of modules which can be combined in various ways to present the desired configuration for the user. These modules can be broadly broken into two categories; "intelligent modules" containing a central processing unit (CPU) and "dumb modules" lacking an internal CPU.

In a basic configuration the man-machine interface comprises an overall processing pair containing a CPU module and a random access memory (RAM) module, a floppy disk controller module, a video graphics pair containing a video CPU module and a video RAM module, the video graphics pair connected to a CRT monitor having a touch sensitive screen In this configuration, an operator can oversee the entire process under control and may specify—through appropriate interaction with the touch sensitive screen—commands for obtaining details of any desired portion of the process and commands for manipulating the value of set points and other parameters in the process within designated constraints. The man-machine interface automatically presents to the operator alarm conditions, including the alarm locations. The MMI also provides the necessary graphic information to allow the operator to take corrective actions.

The man-machine interface in this arrangement does not require a keyboard for operator use. Indeed, the operator may perform all his/her functions through the touch screen.

The man-machine interface may also be used to design and configure graphic subpictures to form overall pictures used to represent a desired process. In essence, the man-machine interface allows the designer and configurer to implement a desired process control arrangement through the process control interface equipment (that is, the programmable controllers, robots, and other devices which physically interface with the process under control) via the communications link. In this arrangement, the man-machine interface makes use of the touch sensitive monitor screen as well as a dedicated keyboard which interfaces with the monitor so as to input the desired data regarding the process loops to be controlled, the process control interface equipment to be utilized and all other necessary information needed to state the desired process control scheme.

The man-machine interface provides relatively high resolution CRT graphics which provide wide flexibility in the color information that can be presented to the user. The screen is broken down into a plurality of zones, each zone providing up to sixteen different colors selectable for each pixel in the zone. The 16 colors from each zone are selected from one of four color palettes. Each color palette in turn selects its colors from up to 512 separate colors. Typically a zone comprises eighty pixels of graphic information and thus each of those eighty pixels can be selected to have any one of the zone colors. Through use of bit shifters and what are known as bit bangers, the display presented to the user can be quickly modified so as to allow shifting of subpictures to the left, right, up or down, as well as to provide rapid changes to the subpictures or overall picture (such as having invisible information suddenly appear on the screen) depending upon the nature of the graphic changes desired. Hardware implementation of these features provides a real time display which can rapidly change depending upon the needs of the uses.

By use of the color palette technique in association with each of the plurality of zones, the graphics can present complicated displays, including simulated pen chart recorders where each simulated recorder has a different color and where intersection of the recorder traces is accurately presented. The man-machine interface also includes a high level graphics language so as to facilitate design and configuration of the overall process control. This high levei graphics language includes the use of cosmic, global and local variables wherein variable type can change with its value. That is, the variable value includes information as to its type which greatly facilitates ovariable usage.

The graphics language also has static and dynamic commands for facilitating graphic display update on a real time basis.

Furthermore, the man-machine interface incorporates a new bus structure which has a 200 pin format. This format includes a subset of the 200 pins for use as a dedicated private bus between designated boards (modules) forming the man-machine interface. The remainder of this overall bus forms a public bus through which most MMI modules communicate via a bus arbitration technique. Thus, the CPU module communicates via the private bus with the memory module so as to provide rapid access of data to and from the CPU module and the memory module without burdening the public bus through which the other modules communicate.

The man-machine interface also incorporates a bus arbitration technique which allows a second CPU module to be added to the man-machine interface in a way that does not appreciably degrade the overall communications on the public bus by the remaining modules by providing a maximum dedicated percentage of the bus time to the second CPU.

In addition, the man-machine interface incorporates a software technique interrupt. This technique is a new type of interrupt mechanism which provided queuing of interrupts and placing interrupt information into a designated area of the memory module which can only be accessed by the device to whom the interrupt is intended. Furthermore, interrupt priority can be altered by the interrupting module if the interrupting module is designated as having the ability to cause its interrupt message to be interleafed with other interrupt messages intended for some other module. The overall result is that this interrupt mechanism is very flexible and yet secure from interference by other modules.

The man-machine interface also utilizes an improved watchdog timer (WDT) associated with most of the modules. This WDT can only be retriggered if complementary information is presented to the watchdog timer within a designated time period. An arming circuit is also provided for reliable initialization of the WTD.

The man-machine interface further incorporates an electronic fence which protects a designated region of memory in the memory module from access by other modules through the public bus. Thus, communicatons through the public bus can only be made to non-fenced regions of the memory module (sometimes referred to herein as "shared memory") while the CPU module through the private bus can access any portion of the memory module regardless of the fence position. In this way programs and data which are to be used solely by the CPU can be fully protected from inadvertent change through other modules communicating on the public bus. Furthermore, the present invention provides interleafing of modules within the slots of the man-machine interface. This facilitates easy MMI reconfigurations. Trending and other features are capable with this system as they are on the other prior art systems noted above.

Nevertheless, an overall man-machine interface which is solely CRT based for operator monitoring and control is neither disclosed nor suggested by these references. Furthermore, the present invention's use of a high level graphic language with a CRT monitor and an associated keyboard provides for an extremely efficient and flexible design, configuration or modification of a process. The graphic capabilities of the present invention provide detailed graphic information which can be readily shifted and modified on a real-time basis.

The present invention further incorporates various details of construction including a new type of interrupt mechanism called a "soft interrupt" system, a new bus architecture for interconnection of the man-machine interface modules, including a bus arbitration scheme which allows for efficient addition of a second central processing unit without degrading the overall operation of the man-machine interface, a memory module fence for protecting a portion of memory from use other than via the CPU module, and improved watchdog timers which oversee all operations performed by the modules forming the man-machine interface so as to insure proper operation and to minimize disruption of the system due to malfunction of any module forming the man-machine interface. These improvements in combination with the overall design of the man-machine interface provide for the efficient utilization of the present invention for process control design, configuration and operation.

OBJECTS OF THE INVENTION

Therefore, it is a principal object of the present invention to provide a man-machine interface which can easily and efficiently design and configure a desired process control and which also can monitor the process through interconnected process control interface equipment including operator parameter updating and operator response to alarm conditions.

A further object of the present invention is to provide a man-machine interface of the above description which provides operator input solely by a touch sensitive cathode ray tube (CRT) screen.

A still further object of the present invention is to provide a man-machine interface of the above description which utilizes a user friendly high level graphic language for facilitating the design and configuration of the overall process to be controlled.

An additional object of the present invention is a man-machine interface wherein the graphic language provides for variable generation wherein the variable type is embodied in the variable value, thereby facilitating variable use and execution.

Another object of the present invention is a man-machine interface wherein the graphic language provides for static and dynamic commands for providing real-time update of screen displays by limiting update information to areas designated by dynamic commands.

Another object of the present invention is to provide a man-machine interface in which the color graphics provide that each of a plurality of zones forming the overall screen can have any one of a plurality of colors forming a palette of colors and whereby each pixel in each zone may have any of the colors from the particular palette for that zone.

A still further object of the present invention is to provide a man-machine interface in which the displayed images on the screen incorporate definable subpictures and wherein the viceo hardware in response to graphic language commands can shift the subpictures on the screen in a rapid and efficient manner through the use of bit shifters and wherein high speed variations of the displayed subpictures can be implemented through use of bit bangers.

A still further object of the present invention is to provide a man-machine interface incorporating a bus structure in which a subset of the bus is dedicated for private port communications (private bus) between designated types of boards forming the man-machine interface; thereby limiting the remainder of the bus (public bus portion) to common communications by the boards, whereby loading of the public bus is minimized.

A still further object of the present invention is to provide a man-machine interface in which the central processing unit (CPU) module can communicate with the random access memory module through the private bus and whereby a selectable region of the memory module memory space can be accessible only by the CPU module through the private bus but not accessible by other boards forming the man-machine interface through the public bus; and further wherein this boundary (fence) is determined after power start up by the CPU module depending upon the needs of the CPU.

A still further object of the present invention is to provide a man-machine interface in which boards forming the man-machine interface may interrupt other boards through a soft interrupt technique whereby the interrupt message is stored in a dedicated portion of shared memory and is accessible only by the board to whom the interrupt is intended and further wherein this soft interrupt technique provides for the prioritizing of interrupts and the interleafing of interrupts by an interrupting board if the board has such interleafing capability.

Another object of the present invention is to provide a man-machine interface in which the public bus allocation to the boards can allow for the addition of a second CPU module; whereby the second CPU module can obtain control of the public bus (token ownership) for up to some fixed percentage of the bys cycles and wherein the remaining boards can individually obtain bus token ownership during the remainder of the bus cycles on a rotating prioritized basis; and further wherein transfer of bus control (token ownership) to the second CPU module causes the previous token owner board to remember the fact so that bus control returns to that previous board upon completion of bus control the second CPU module.

A still further object of the present invention is to provide a man-machine interface incorporating improved watchdog timers for each board, wherein each watchdog timer can only be retriggered by the associated board if the complement of the previous retrigger signal is generated; thereby preventing the watchdog timer from being inadvertently retriggered during fault conditions.

A still further object of the present invention is to provide a man-machine interface which provides for design, configuration and use (operator control) of the interface without the need of computer knowledge.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken on connection with the following drawings, in which:

FIG. 1-3 is a diagram showing how FIGS. 1-1 and 1-2 are put together to form FIG. 1.

FIG. 1I is a block diagram illustrating the generalized address paths of the man-machine interface;

FIG. 2 is a rear plan view of the man-machine interface housing for the modules that comprise the overall MMI;

FIG. 3 is a front perspective view of the man-machine interface module housing shown in FIG. 2;

FIGS. 11-1 and 11-2 form a block diagram illustrating the menu hierarchy associated with the man-machine interface for designer, configurator and operator modes;

FIG. 11-3 is a diagram showing how FIGS. 11-1 and 11-2 are put together to form FIG. 11.

FIG. 17H is a diagram showing how FIG. 17F and 17G are put together;

FIGS. 28A and 28B are put together to form FIG. 28;

FIG. 50 is a monitor screen layout for an alarm definition/ status template;

FIG. 51 is a monitor screen layout for an alarm history template;

FIG. 52 is a monitor screen layout for a standard communication network status and transient error count template;

FIG. 53 is a monitor screen layout for status of a status template;

FIGS. 59A-59B are put together;

FIG. 61 is a monitor screen layout for a shift log template;

FIGS. 68A and 68B are put together to form FIG. 68;

FIG. 78I is a diagram showing how FIGS. 78A-78H are put together.

BEST MODE FOR CARRYING OUT THE INVENTION

Man-Machine Interface Operational Description

Figures 1, 2, 3:
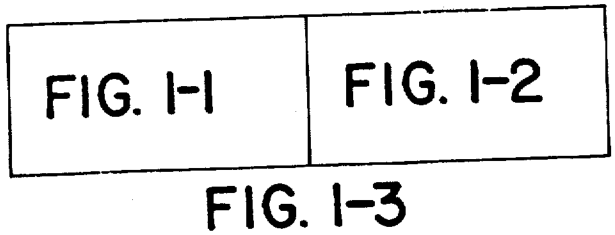

As best seen in FIG. 1, a man-machine interface (MMI) 20 comprises a plurality of modules which can include a first central processing unit (CPU) module 22, a random access memory module 24, a video CPU module 26, a video random access memory (RAM) module 28, a floppy disk control module 30, a Winchester hard disk controller module 32, a general purpose communications module 34, a high speed local area network interface module 36, a second CPU module 38, and a second video CPU module 40 and associated video RAM memory 42. The second video CPU 40 and video RAM module 42 as well as the second CPU, the hard disk controller 32, general purpose communications module 34 and local area network interface module 36 need not form the overall MMI. That is, the man-machine interface can comprise only the CPU module 22, the random access memory module 24, a video CPU module 26, a video memory module 28, and a floppy disk module 30.

As seen in FIG. 1, the CPU module 22 can connect to an industrial data communication highway bus 44 through means of a serial port 46. The data highway 44 can be of the type which communicates data via the RS 232C protocol and in the preferred embodiment of the present invention is part of a data highway communication sold and maintained by the present assignee, known as the MODBUS™ communication system. Interconnected to such a communication system can be a plurality of programmable controllers 48 and other interfacing devices 50 such as printers, computers and any other devices which utilize an RS 232C communication port.

As also seen in FIG. 1, the CPU 22 has a second port 52 which can communicate with a computer 54 or other device. A third serial port 56 can interconnect the CPU 22 with a printer 58. These serial ports also correspond to the RS 232C format. The CPU 22 has a 9-bit port 60 which is optically isolated and is used as an output device for error logging. A private port 45 connects to a private bus 94 (forming part of overall bus 93) for direct communication to RAM 24.

The video CPU (VID CPU) 26 interfaces with a cathode ray tube (CRT) color monitor 62 through two ports 64 and 66, the first for transferral of red, green, blue and sync video signals and the second port for a serial RS 232C port which connects to an interface logic module 67 forming part of CRT monitor 62. The interface logic module 67 receives parallel data signals via bus 69 interfacing with keyboard 68 and receives X-Y cartesian coordinate information from touch screen 70 via bus 71. The information is then buffered for transferral to the video CPU through bus 73 interfacing with CPU port 66. A private port 41 interfaces the video CPU with the video RAM by private bus 94. The video monitor 62 can also have its own auxiliary port 63 which contains the RGB and sync signals received from the video CPU 26 for transferral to a slave CRT monitor 62'.

The floppy disk control module 30 comprises from two to four ports 75 which in turn respectively interface with floppy disk drive units 76. The general purpose communication module 34 comprises up to four serial ports 78 which can then interface with any device operating with standard RS 232C serial communications such as computers, printers and other types of digital apparatus. The floppy disk controller module 30 also comprises a serial port 81 of the RS 232C format which is intended for primary use as a diagnostic port for the floppy disk controller.

The video RAM 28 has a port 80 which can optionally interface with a plotter for generating hard copy of a given video display as presented on screen 72. A private port 83 interfaces with private bus 94 for communication with the video CPU.

The local area network interface 36 comprises a high speed data communication port 82 which interfaces with a coaxial cable 84 or other medium forming the local area network date path and in turn interfaces with other digital devices 86 which can include computers, programmable controllers, robots, printers, other man-machine interfaces, and the like forming an overall local area network such as that described in pending U.S. patent application Ser. No. 241,688, U.S. Pat. No. 4,491,946 entitled MULTI-STATION TOKEN PASS COMMUNICATION SYSTEM, assigned to the present assignee.

The hard disk controller module 32 interfaces through port 87 to bus 88 connected to one or more Winchester disk drives 90 which in turn may communicate with one or more floppy disk drives 76' for retrieval and storage of digital data from the Winchester hard disks.

As is seen in FIG. 1, all of the modules forming the man-machine interface except the video RAM modules 28 and 40 interconnect with a bus 92 through respective public bus ports 33. Public bus 92 is the common portion of an overall bus 93 which includes a private port bus 94. The overall bus 93 comprises up to 200 lines while the private ported bus 94 can comprise up to 60 lines with the remainder to the common bus 92.

As shown in FIG. 2, each of the modules shown in FIG. 1 are preferably fabricated onto a single board with each board slidably engaging into one of the slots 96 formed in the rearward portion of the man-machine interface 20. Each slot terminates in a backplane formed by two 100 pin connectors 98 (shown in phantom). These connectors provide the physical connection of the board to both the private port (private bus 94) portion of the overall bus 93 and to the public bus 92 portion of the overall bus 93. Only the CPU boards 22 and 38 and the video CPU boards 26 and 40 utilize the private bus 94 with associated memory boards. The CPU 22 utilizes it so as to have quick access to memory module 24 without causing a time allocation problem with respect to common bus 92. Similarly, the video CPU 26 utilizes the private bus 94 for accessing the video memory 28 which has no other direct connection with any of the other modules forming the man-machine interface.

Figure 4:
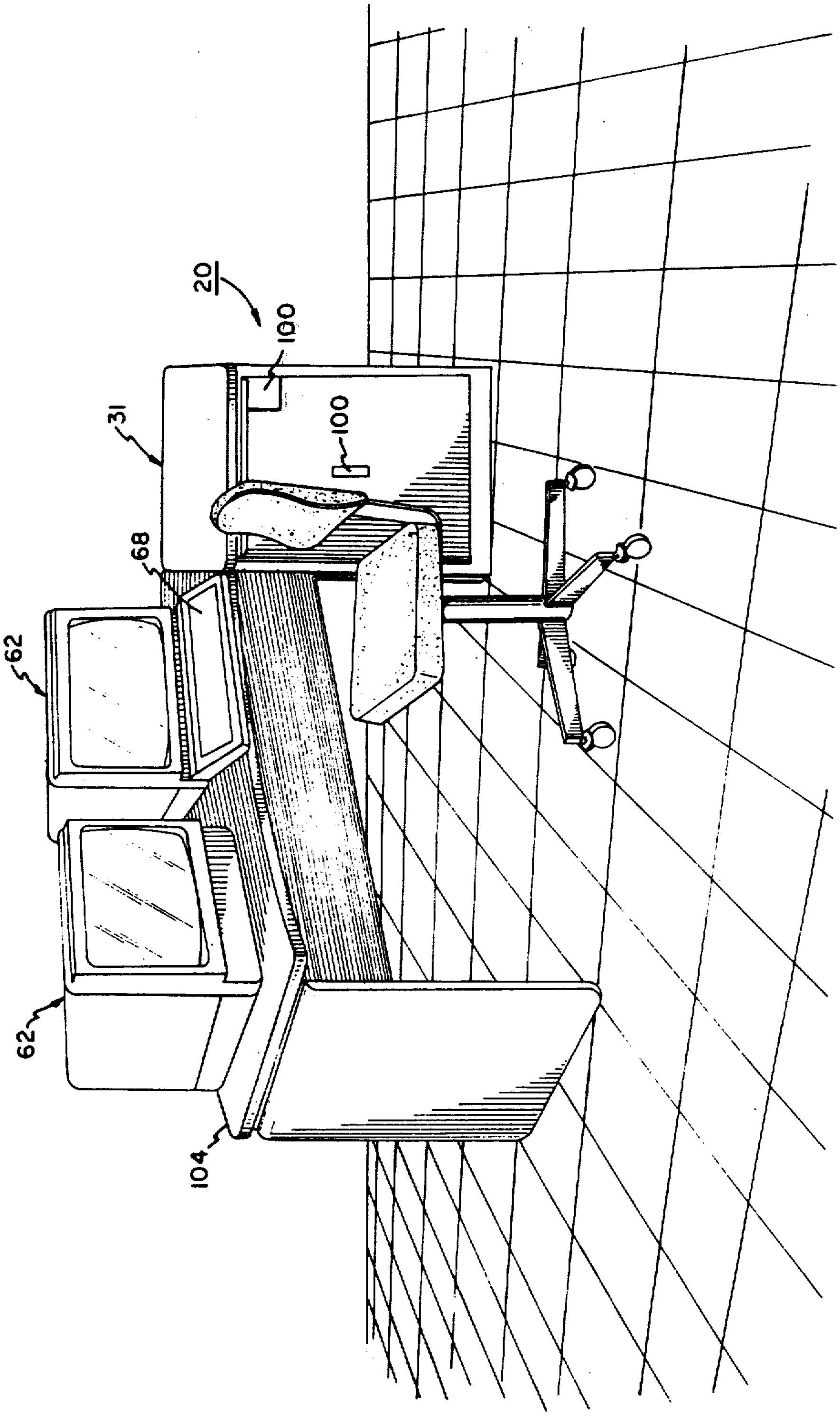
FIG. 4 is a perspective view of the overall man-machine interface showing the module housing in combination with two monitors, one monitor having a keyboard and both modules having touch screens.

As shown in FIGS. 2, 3, and 4, the man-machine interface has a module housing 31 for the storage of modules 22, 24, 26, 28, 30, 32, 34, 36, 38, 40 and 42. Nine of these modules can be stored in the housing at any one time, but more modules can be stored in larger versions of the housing. The frontal termination of the housing has access to the floppy disk drives 76 and to power ON/OFF controls 100.

FIG. 4 illustrates the man-machine interface 20 comprising two monitors 62, one having a keyboard 68 for use by designers and configurators while the second monitor 62' is designed for primary use by plant operators and does not include a keyboard. The man-machine interface modules are stored within housing 31 with the monitors placed on desk portion 104.

Thus the man-machine interface 20 can be considered as having an industrial graphics processor 106 comprising the CPU module 22, the memory module 24 and the floppy disk control module 30 and one or two independent video stations 108 each comprising a video CPU module 26, a video random access memory module 28, a CRT color monitor 62 and optionally a keyboard 68 and slave monitor 62'.

The video station 108 is a medium resolution color CRT monitor that may be furnished with related equipment such as the keyboard 68. There are three types of video stations which can be utilized. These types are set forth in Table 1.

As discussed earlier, user input to the man-machine interface is primarily via the touch panel 70 associated with screen 72 of a video station 108.

The remainder of the man-machine interface performs the functions set forth in Table 2 as a subset of its total capabilities. It should be noted that the words and phrases in the Tables and throughout this description appearing capitalized are defined in Table 25.

In general, the man-machine interface 20 is self-diagnosing; that is, each printed circuit board forming one of the modules shown in FIG. 1 is furnished with self-diagnosing hardware including, as shown in FIG. 2, a status light 49 that indicates a board failure and two light emitting diodes 51 that identify the type of failure. In this regard, the LED's can be pulsed to indicate a number which is then identified with a particular error condition.

TABLE 1

| VIDEO STATION TYPE | EQUIPMENT | FUNCTIONS |
|---|---|---|
| Touch Station | Independent color CRT controller (housed in Industrial Graphics Processor) Touch Panel Keyboard (optional) Programmable Alarm Beeper Programmable Alarm Output Relay | Plant monitoring and control as requested via touch panel input TEMPLATE DESIGN and CONFIGURATION |
| Vue Station | Independent color CRT monitor color CRT controller (housed in Industrial Graphics Processor) Programmable alarm beeper Programmable Alarm output relay | Presentation of an image requested on a Vue Station. The image is independent of the image presented on requesting Vue Station |
| Slave Station | Slave color CRT monitor | Presents the same image being presented on a Touch Station or Vue Station to which it is attached |

TABLE 2

(1) Serves as a host computer that acquires data from and disseminates data to the internal registers and coils of programmable controllers located on a network TABLE 2-continued

| |
|---|
| bus 44 or high speed local area network bus 84 (see FIG. 1). |
| (2) DESIGN and CONFIGURATION of TEMPLATES and definition of the PLANT DATA BASE. |
| (3) Storage and retrieval of TEMPLATES, DISPLAYS and the PLANT DATA BASE definition to/from floppy disk drives 76. |
| (4) Interpretation of DISPLAYS and TEMPLATES. |
| (5) Generation of video signals that drive the video station unit monitor(s) 62, 62', 62''. |
| (6) Response to user input via keyboard(s) 68 and/or touch panel(s) 70. |
| (7) Transmission of messages and reports to user supplied hard copy device(s) such as printer 58 or plotter 59. |
| (8) Sounds a video station beeper 61 located on monitor 62 at a programmable pitch on request of a DISPLAY that is being interpreted. |
| (9) Actuates a video station programmable alarm output relay 65 on request of a DISPLAY that is being interpreted. |
| (10) Actuates an internal watch dog timer output via CPU port 60 used to drive an external user supplied alarm failure horn (not shown). |

In addition, lights 134–148 as shown in FIG. 3 mount to the man-machine interface to indicate an error within the industrial graphics processor portion 106 or in the video station portion 108 and indicate any self-diagnosed hardware error.

Software Overview

The software utilized by the man-machine interface includes the following:

(1) an industrial computer real time disk operating system, (2) high level graphics language software, and (3) a user's PLANT DATA BASE definition and DISPLAY FILES.

The microfiche appendix contains the high level program listings described throughout the specification, including the high level graphics (VID-88), the configurator editor/database manager, the interpreter, designer editor with common utility routines, the data acquisition module and data acquisition timer.

The man-machine interface hardware runs under control of the industrial computer multi-tasking re-entrant real time disk operating system forming part of the MMI. The operating system provides a run time environment for the tasks that comprise the MMI graphics software.

The graphics software supports the features set forth in Table 3.

Several libraries of STANDARD TEMPLATES described in detail below can be CONFIGURED for a specific user application. If the user desires DISPLAYS different from those that can be configured from STANDARD TEMPLATES, the graphics software enables the user to customize the STANDARD TEMPLATES and to DESIGN and CONFIGURE CUSTOM TEMPLATES via the designer and configurator modes.

The libraries of STANDARD TEMPLATES furnished with the man-machine interface include general STANDARD TEMPLATE library, a process industry STANDARD TEMPLATE library, and a discrete parts manufacturing industry STANDARD TEMPLATE library.

The general STANDARD TEMPLATE library includes the STANDARD TEMPLATES set forth in Table 4.

The process industry STANDARD TEMPLATE library includes overview, group, and recipe table STANDARD TEMPLATES.

TABLE 3

| |
|---|
| (1) A selection mode that enables DESIGNERS to select modes (designer or configurator) not visible to operators and enables PROGRAMMERS to directly address the operating system. |
| (2) A designer mode that enables DESIGNERS to DESIGN CUSTOM TEMPLATES. |
| (3) A configurator mode that enables CONFIGURERS to CONFIGURE TEMPLATES and to define the PLANT DATA BASE |
| (4) An operator mode that enables OPERATORS to control and/or monitor an industrial plant by viewing images and touching buttons depicted on the screen. The operator mode does not utilize the keyboard 68. |
| (5) A data acquisition package and a database manager that obtain input data for active DISPLAYS from a network of programmable controllers 48 communicating via bus 44 (see FIG. 1) and transmit output data from active displays to this network. |

TABLE 4

| |
|---|
| Point |
| Multi-trend |
| Alarm Definition/Status |
| Alarm Processing |
| Alarm History |
| Man-Machine Interface Status |
| Industrial Network Bus 44 Status and Transient Error Counts |
| Programmable Controller Status |
| BUTTONS |
| Numeric Keypad |
| Digit Display |
| QWERTY Keyboard |
| ABCD Keyboard |
| Lights |
| Circular Gauges |
| Shift Log |
| Report |
| Tags |
| Logical Unit-To-Physical Device Mapping |
| Digital Switch |

The discrete parts manufacturing industry STANDARD TEMPLATE library includes motor control center bucket STANDARD TEMPLATES.

For all three categories of the STANDARD TEMPLATES, additions can be made and furnished as part of the man-machine interface supplied to the user.

Some of the STANDARD TEMPLATES present visual simulation of analog controllers and other panel mounted devices onto screen 72 associated with monitor 62 (see FIG. 1) and enable an operator to control these devices by simply touching their images as shown on the screen.

In addition, the man-machine interface 20 is self programming. That is, many user applications can be installed solely by configuring the STANDARD TEMPLATES supplied with the man-machine interface. Thus CUSTOM TEMPLATES are DESIGNED in the designer mode by touching menu buttons and viewing the effects of each button touched as to the template displayed as it is being DESIGNED.

The man-machine interface is self documenting. The designer mode main MENU presents a print BUTTON that, when touched, causes the DISPLAY LANGUAGE COMMANDS that comprise a TEMPLATE to be listed on a hard copy device such as printer 58. The configurator MENU presents a print BUTTON, that when touched, causes the DISPLAY LANGUAGE COMMANDS that comprise a DISPLAY to be also listed on a hard copy device such as printer 58. The data base editor MENU further presents a print BUTTON that, when touched, causes the name and attributes of each element in the PLANT DATA BASE to be listed on a hard copy device. Each STANDARD TEMPLATE that presents an image has a configurer selectable print BUTTON that, when touched in operator mode, causes the current screen contents to be output on a hard copy device such as plotter 59. Thus, a permanent record is maintained regarding template generation, configurator interconnection of templates, as well as the name and attributes of each element of a plant data base to be maintained for their reference.

Overview of User Applications Supported by STANDARD TEMPLATES

The man-machine interface is intended to meet a wide variety of user applications in both the discrete parts manufacturing industry and the process control industry. By copying STANDARD TEMPLATES from the STANDARD TEMPLATES library and using the configurator mode to configure these STANDARD TEMPLATES and to define the plant data base, the man-machine interface can be installed so as to perform any of the following functions:

(1) a process operator interface,
(2) a machine operator interface,
(3) a data acquisition device,
(4) an alarm handling device,
(5) a report generator, and
(6) a recipe down loader.

Process Operator Interface

The man-machine interface can be used by a process plant operator to monitor, inspect and modify process operating parameters such as the set point of direct digital controllers as implemented through an interconnected programmable controller. The operator can have an overview of the entire plant process and through the modifying capabilities is able to redefine set points and, if necessary, to take corrective action depending upon the desired plant process modification or change as a result of changing conditions.

In order for the man-machine interface to perform such monitoring, inspecting and modifying processes to an overall plant process, it is necessary that the MMI be "built" to operate in this fashion so as to perform the same functions as those performed by a process plant instrument control panel; that is, it must be able to convey to the operator the overall state of affairs of the plant process and in a manner which does not require the operator to overview hundreds of instruments distributed widely in an operator controlled center. Indeed, the man-machine interface is able to convey to the operator through use of one or more monitors 62 all the plant information needed to monitor, inspect and modify its parameters as needed.

The actual implementation of such a system utilizes the STANDARD TEMPLATES supplied with the MMI as specified below. Thus an overview template, which is a visible template, depicts the current value, set point and alarm status of the real or derived analog or Boolean data points to be monitored. A group template, also a visible template, provides detailed information on eight real or derived analog or Boolean data points. Such a group template can be used to obtain detailed information concerning a portion of the plant process for which closer inspection is desired. The overview template thus provides the most important information concerning all points in the plant process while the group template provides the detailed information as required by the operator. The group template allows analog points to be shown as an analog controller or as an indicator faceplate all through the graphics presented onto monitor 62.

A point template, which is also a visible template, provides detailed information and operator selectable current value trending of a single real or derived analog data point. The analog data point may be shown as an analog controller faceplate and its internal adjustments or as an analog indicator faceplate. Through this trending capability, the operator can view the historical variations of a selected process point to determine if that particular point is operating properly over an extended period of time.

Finally, a multi-trend template, which is also a visible template, allows the operator to present recent value trending of from one to six real or derived analog data points from historical data logged over the preceding eight hours, all present on a single set of axes. Through such trending capabilities, the operator can quickly monitor the overall performance of the process and in particular, data points of particular interest.

Machine Operator Interface

Several of the STANDARD TEMPLATES may be used as lower level SUBPICTURES to build a machine operator interface that performs the same functions as a machine operator's panel. Thus once called by a CUSTOM DISPLAY, the following STANDARD TEMPLATES are available in a wide variety of shapes and sizes so as to allow the operator to monitor and alter the operation of the machine. These STANDARD TEMPLATES are: BUTTON TEMPLATES, LIGHT TEMPLATES, NUMERIC DISPLAY TEMPLATES and associated NUMERIC KEYPAD TEMPLATES, and MOTOR CONTROL CENTER BUCKET TEMPLATES. These STANDARD TEMPLATES can then be configured by the CONFIGURER in the configuration mode to generate a CUSTOM DISPLAY which will yield a graphical display of a machine operator interface as desired.

Data Acquisition

The man-machine interface can be used in lieu of a general purpose minicomputer to acquire data from a network of programmable controllers and to display their data for operator inspection. When the man-machine interface is in the designer mode, it provides the flexibility and power of a high level programming language enabling the design of custom templates so as to perform functions that include the following:

(1) complex data reduction calculations,
(2) new line material energy balance calculations,
(3) supervisory plant energy management,
(4) custom scan, control and data acquisition routines,
(5) plant inventory control,
(6) supervisory control and data acquisition (SCADA) for pipelines, and
(7) AGA3 and AGA5 standard gas equations.

The man-machine interface when in the designer mode provides the following features that are useful in performing calculations and evaluating logical expressions, including (1) addition, subtraction, multiplication, division and exponentiation of read constants and variables;
(2) arithmetic functions including ABS(X), SQR(X), SIN(X), COS(X), EXP(X), LN(X), SQRT(X) and ARCTAN(X), where X is a real expression;
(3) evaluation of Boolean expressions containing Boolean OPERATORS, and/or, XOR and NOT, and the relational expressions <, <=, =; <>, >=, and >;
(5) the high level commands of IF . . . THEN . . . ELSE, DO WHILE, FOR . . . TO, and CASE . . . OF constructs.

The following STANDARD TEMPLATES can be used as described above to build a data acquisition system with the man-machine interface:

(1) overview template,
(2) group template,
(3) point template,
(4) multi-trend template,
(5) alarm definition/status template,
(6) shift log template (eight hour historical data report), and
(7) report template.

Alarm Handling

The man-machine interface can be used in lieu of an alarm annunciator to annunciate, silence, acknowledge and clear alarms. The following STANDARD TEMPLATES can be used in a manner as described previously to build an alarm annunciator:

(1) STANDARD Alarm/Definition/Status TEMPLATE. This visible template enables configurers to define all alarm points being monitored by the man-machine interface. Similarly, this template allows operators to observe the status of all such alarm points.
(2) STANDARD Alarm Processing TEMPLATE. This invisible template maintains the status (normal, unsilenced alarm, unacknowledged alarm, silenced alarm, acknowledged alarm) of each alarm point defined by the user by the standard alarm definition status template and supports clearing, operator silencing and operator acknowledgement of all such alarm points. The standard alarm processing template may be user customized in the designer mode to obtain alarm processing features not supported in its standard version.
(3) STANDARD Alarm History TEMPLATE. This visible template provides a table that lists the most recent sixteen alarm conditions in reverse chronological order and enables an operator to acknowledge alarms. It in essence provides an overview in a reverse time order of the most recent sixteen alarms.

Report Generation

A current value report can be defined by configuring the standard report template forming part of the man-machine interface. The standard report template writes configurer defined text strings and current values of variables in a pre-defined format to a configurer selected physical (logical) unit such as a video station screen, a user defined hard copy device, or a floppy disk file. The logical unit is selected by configuring an output stream variable with an actual logical physical device name.

An historical data report can be defined by configuring the standard shift report template furnished with the man-machine interface. The standard shift report template writes configurer defined text strings and historical (within the most recent eight hours) values of variables in a predefined format to a configurer specified logical device.

Recipe Downloader

A standard recipe table template forming part of the man-machine interface depicts the recipe data for a predefined process (batch or continuous) in tabular form. All entries in the table may be modified by the operator. The following operator support features are provided on the standard recipe table template.

(1) either a numeric keypad or access to an alphanumeric soft keyboard presented on screen 70, as selected by the configurer;
(2) a BUTTON to store recipe data to a floppy disk 76 (FIG. 1);
(3) a BUTTON to request that the recipe be downloaded for the satellite PC's on the network communication hosted by the MMI.

Overview of User Applications Requiring Custom Displays

Some user applications that cannot be handled by configuring standard displays forming a part of the man-machine interface consequently require the use of custom displays generated in the designer and/or configurator mode. These custom displays include the following:

(1) custom report generation;
(2) data logging;
(3) custom historical data trending;
(4) custom recipe building and storage to a floppy disk and retrieval therefrom;
(5) panel or console emulation; and
(6) process flow diagrams.

Custom Report Generation

A custom report is generated by interpreting a custom display that writes text strings and/or numbers in a format different from that available with the MMI standard report template and to specify the logical unit (control/display unit such as monitor 62, a user display hard copy device such as printer 58, a floppy disk file such as on a floppy disk drive 76, or a file within a Winchester hard disk such as drive 90) (see FIG. 1). The particular logical unit is selected by configuring an output stream variable with an actual physical device name.

Data Logging

Data is logged to a floppy disk or printer by interpreting a custom display that typically writes one record of numbers to a disk and is caused to run periodically at a specified interval by another custom display.

Custom Historical Trending

Custom historical trending capability provides the historical trending beyond that provided by the STANDARD TEMPLATE of reporting an eight hour trend. Custom historical trending may be created in designer mode by using the data base array capability of the man-machine interface and the file access capability of the display language. The designer mode provides the support facilities needed to implement this function via CUSTOM TEMPLATES. Specified process variables are accumulated continuously and their history displayed in chart form upon demand or at scheduled intervals. The acquisition of historical data takes place continuously and independently of the current screen content. The current value trends can be implemented through use of the STANDARD POINT TEMPLATE and/or the STANDARD multi-trend TEMPLATE while recent (that is, within the last eight hours) historical data reports can be generated using the STANDARD Shift Log TEMPLATE.

Custom Recipes

In order to define the recipe data for a process and a format different from that available with the man-machine interface standard recipe table template, a custom template can be designed to detect the recipe data in tabular form. Such a custom template normally provides the operator with support features similar to those provided the STANDARD Recipe Table TEMPLATE.

Machine Operators Console Emulation

To emulate a machine operator's console with the man-machine interface, a custom display is designed that calls the STANDARD TEMPLATES set forth under the subheading Machine Operator Interface, and uses them as lower level SUBPICTURES.

Process Flow Diagrams

Process flow diagrams can dynamically depict actual process operating conditions and field device statuses. Such diagrams require custom displays that are specified to a user's application.

HARDWARE PRODUCT SPECIFICATION

Industrial Graphics Processor 106

As seen in FIG. 1, an industrial graphics processor 106 can comprise a CPU 22, an associated memory board 24, a floppy disk controller module 30 with associated floppy disk drives 76. Communications are made through use of bus 93 including common bus 92 and private ported bus 94. Each module is formed on a separate printed circuit card which is mounted within one of the slots 107 of the MMI module housing 31 as seen in FIG. 2. Each floppy disk drive 76 contains an eight inch disk of double-sided, double-density format with a usable capacity of one megabyte. The industrial graphics processor also includes two power supplies 110 for providing the necessary operating voltages for the modules and disk drives forming the man-machine interface (see FIGS. 1 and 3). The industrial graphics processor is a stand-alone system based on a family of eight and sixteen bit microprocessors having an address space of 16 megabytes and supports optional hardware including floating point arithmetic processors, floppy and Winchester disks for program/data storage with power supply capability to support the optional devices.

Figure 5A:
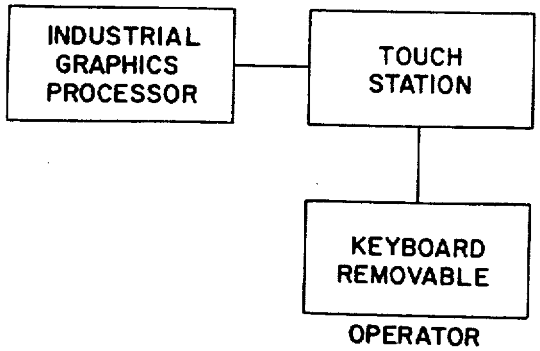
FIG. 5A is a block diagram illustrating one configuration of the industrial graphic processor (video station) as it communicates with an associated touch station and removable keyboard.
Figure 5B:
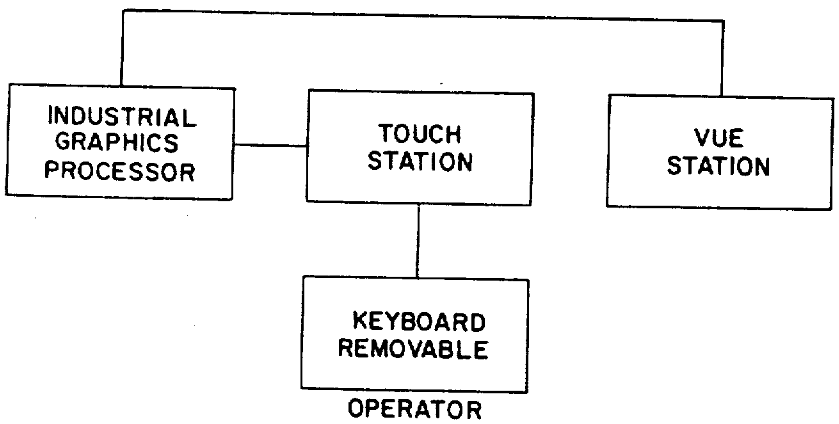
FIG. 5B is another block diagram showing another configuration of the industrial graphic processor communicating with one touch station and one vue station; that is, a monitor without a touch screen.
Figure 5C:
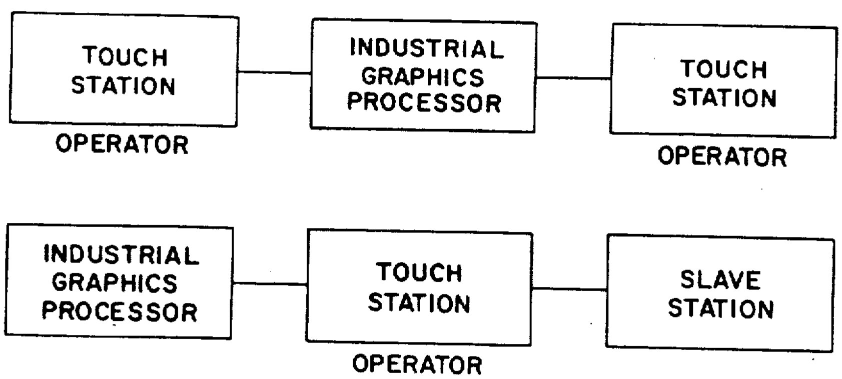
FIG. 5C shows two industrial graphic processor configurations; one associated with two touch stations with operator control and the second with one touch station with operator control and an affiliated slave station for viewing purposes only.

FIGS. 5A, 5B, and 5C illustrate three typical configurations of the man-machine interface 20. FIG. 5A shows the MMI with a single touch sensitive monitor 62 and a removable keyboard 68.

FIG. 5B shows the MMI with a first monitor 62′ having a removable keyboard 68, and a second monitor 62″ without a touch panel 70 (see FIG. 1). This latter monitor is normally used for backup visual display or for displaying information related to the first monitor.

FIG. 5C illustrates the MMI with two monitors 62′ and 62″, both with touch panels for operator control.

Finally, FIG. 5D shows a MMI configuration with a touch sensitive monitor 62 and a slave station 62′ control by the output of first monitor 62.

The industrial graphics processor includes the features set forth in Table 5.

Some of the features set forth in Table 5 are not detailed in the hardware description of the present application but are future capabilities. These include the high speed floating point processor, the Winchester disk drives and the dual parallel processors. However, their implementation is shown in this description.

TABLE 5

| |
|---|
| Microprocessor based |
| High speed floating point processor (optional) |
| Storage devices range from 8 inch floppy disks to Winchester disk drives |
| Dual-Ported dynamic random access memory |
| Dual parallel processors |
| 16 bit word (two 8 bit bytes) with 1 megabyte of direct address space and hardware address expansion to 16 megabytes |
| One bit error correction, two bit error detection memory. Memory configurable in 128KB increments, 256 KB minimum, 896 KB maximum. |
| Asynchronous operation which permits systems components to run at their highest possible speed. |
| Replacement with faster subsystems means faster operation without other hardware or software changes. |
| Modular component design which permits extreme ease and flexibility in configuring systems. |
| Self test read only memory (ROM) which automatically performs diagnostics at board level after power up. |

Overall Module Interfacing

Except for the CPU module in conjunction with the random access memory module 24 and the video CPU module 26 in conjunction with the video random access memory 28, boards comprising each module may be arbitrarily interspersed in the slots of the MMI housing 31. However, the random access memory module 24 must be placed adjacent to the CPU module 22 and the video RAM module 28 must be placed adjacent to the video CPU module 26. This is a requirement of these pairs due to the use of the private bus 94 for each of these pairs.

Bus Structure

As seen in FIG. 1, the overall bus 93 comprises a public bus 92 interconnecting the modules and a private bus 94 used to interconnect certain types of modules, such as the CPU module 22 to the memory module 24. The bus 93 has a universal processor bus architecture capable of supporting one or more processors as well as a host of local interfaces for memories, intelligent peripheral devices including floppy disk controllers, Winchester hard disk controllers and communication interfaces. The bus structure utilizes an extension of the Institute of Electronic Engineer Standard (IEEE( P796 specification for a Microprocessor System Bus Standard. The present bus 93 however uses a 200 pin two-piece connector and can electrically support sixteen slots, each slot for one module board. The memory module 24 associated with this bus as well as the peripheral controls associated therewith are designed to allow the CPU module 22 to be upgradable for use with a larger microprocessor having a physical address space of up to sixteen megabytes such as the Intel Corporation 286 TM microprocessor. Details of the bus structure are presented in a separate section entitled "Bus Structure".

Central Processing Unit 22

The CPU module 22 is a 16 bit central processing unit that supports a 16 bit data path, 16 megabytes of address space, a hardware floating point arithmetic option corresponding to the IEEE standard, three RS232-C serial ports 46, 52 and 56 for asynchronous/synchronous communications and bit oriented protocols, a programmable real time clock having a fifteen second per month maximum error if operated within the ambient temperature range of 0°-70° C., and two watchdog timers.

Floppy Disk Control Module 30

The floppy disk control module 30 is a microprocessor based module that supports up to four eight inch disk drives 76, single or double sided, single or double density (IBM 3740 TM single density or IBM 34 TM double density format), with a maximum storage capacity of 4 megabytes.

Memory Module 24

The memory module is a dual random access system that supports up to 1 megabyte of dynamic random access memory (DRAM) a 16 bit data path, 2 bit error detection and 1 bit error correction circuitry. The hardware is provided to allow the operating system of the man-machine interface to log corrected errors. The memory module can be configured for parity error detect only or error correcting, although error correcting is disclosed in this preferred embodiment.

Video CPU Module 26 and Video Random Access Memory 28

Figure 6:
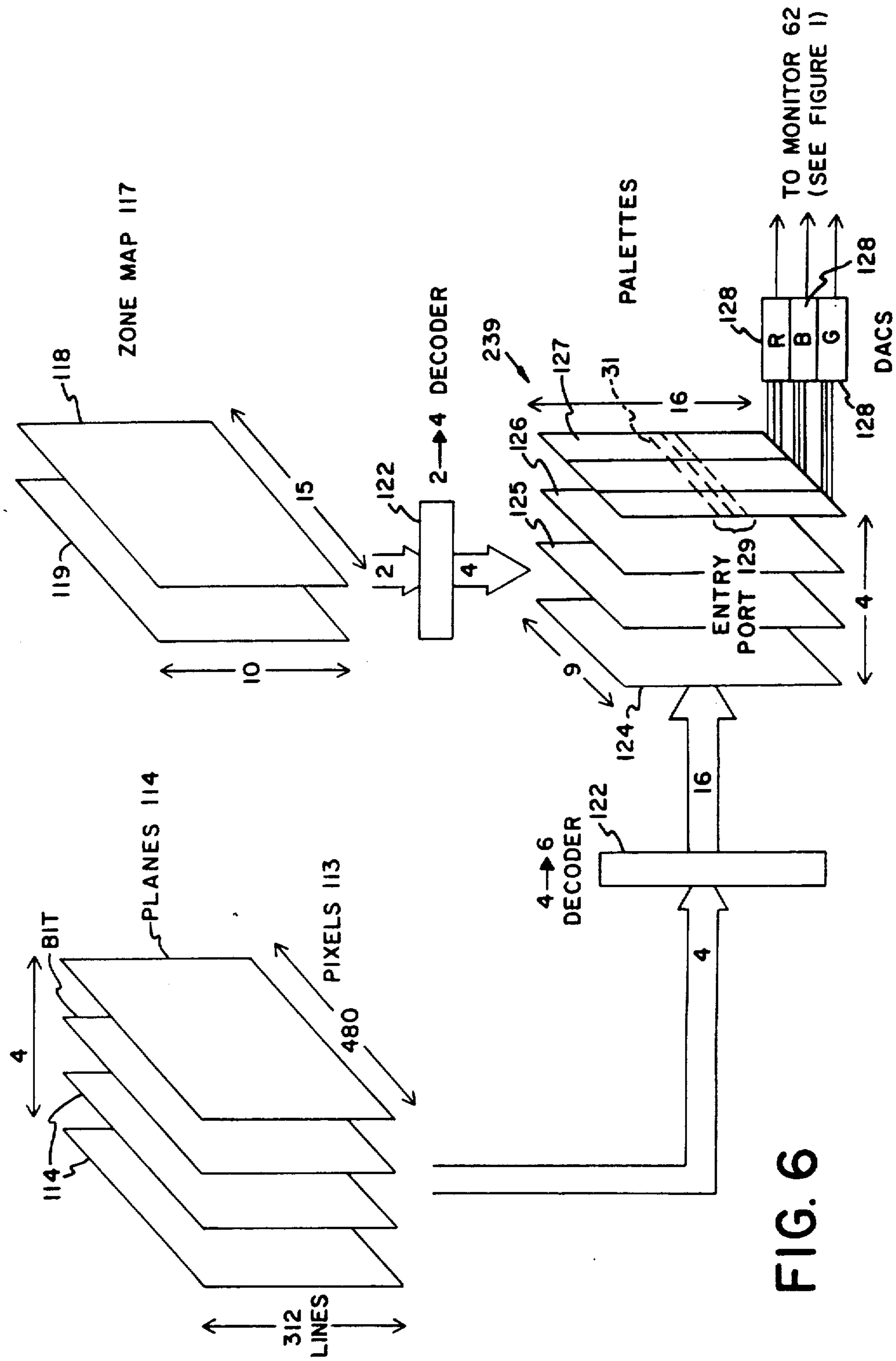
FIG. 6 is a diagrammatic block type representation of the generation of signals to the monitor through use of bit planes, a zone map and color palettes.
Figure 7:
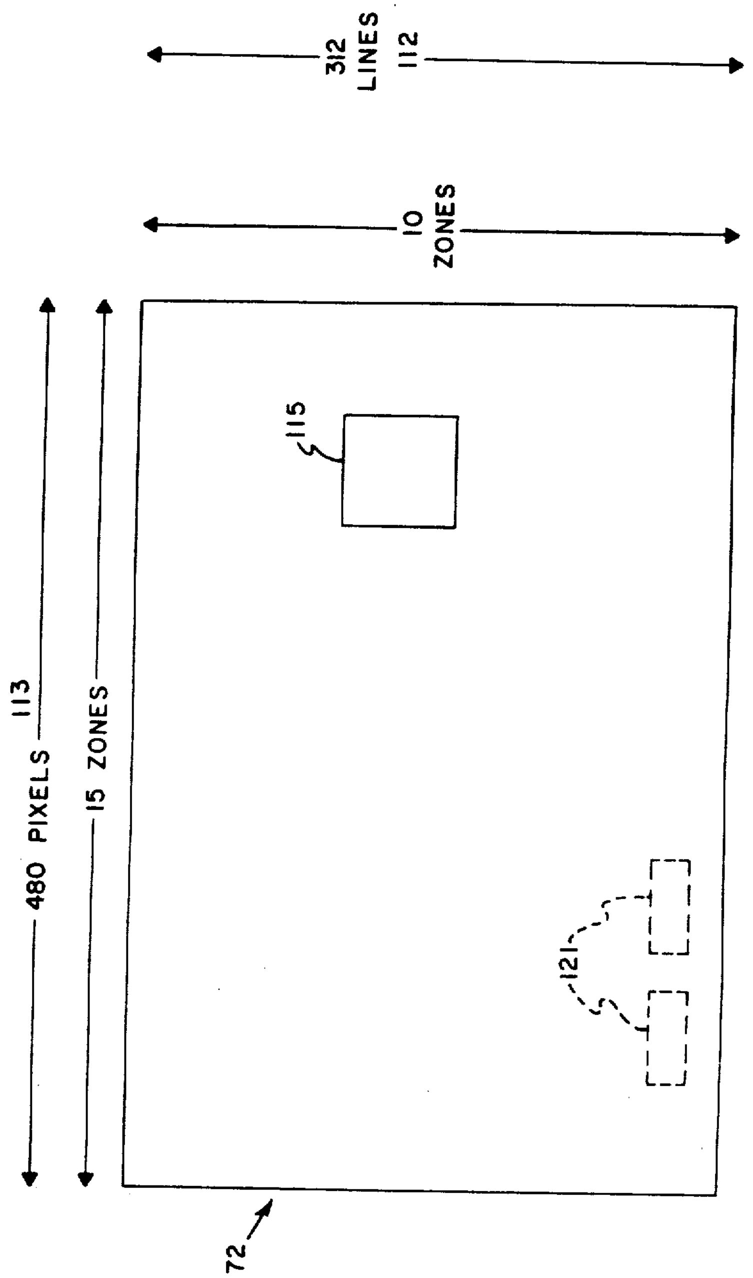
FIG. 7 is a diagrammatic representation of the screen associated with a monitor illustrating the zones associated with the screen as well as the overall pixel and line content.

The video CPU module 26 and video random access memory RAM 28 form a board pair for providing intelligent color graphics; featuring an on board Intel 8088 TM microprocessor, a program memory, video refresh memory, and color and zone memories. As best seen in FIGS. 6 and 7, each video station 108 (see FIG. 1) generates an RS172 type video signal with 312 displayed non-interlaced lines 112 with 480 picture elements (pixels 113) per line. The line rate is 19.9 kilohertz.

Furthermore, the picture comprises four memory planes 114 each comprising 480×312 bits of information. As seen in FIG. 7, the 480 pixels per line are divided into fifteen zones (such as zone 115 shown in phantom), each zone representing 32 pixels of a line. Each zone also represents 32 lines, so that the area of each zone (except the bottom most zones) represent 32×32 pixels, or 1024 pixels. Thus there exists 10×15 or 150 zones which comprise the screen area shown in FIG. 7. The actual color determined for each displayed pixel is determined by a double decoding process as best seen in FIG. 6. Thus the 150 zones are represented by a zone map 117 where each zone has two bits of information. In other words, the zone map is divided into two planes 118 and 119 where each zone has a single bit in each plane. The output from the zone map is decoded by a two to four decoder 120 since two bits can represent four combinations. Similarly, four bit planes 114 are utilized for each pixel. That is, each pixel has one bit of information in each bit plane or four bits of information total. These four bits of information are decoded by a four to sixteen decoder 122 with their selection of the sixteen permissible outputs are transferred to the color palettes 124, 125, 126 and 127.

Each color palette has sixteen selectable 9-bit words or entries 129, with each 9-bit entry representing one of 512 possible physical colors. Thus, in operation, the zone map determines which of the four color palettes is to be selected for each zone, and the bit plane decoder 122 determines which of the sixteen words in that palette is to be used for generating the desired color for each pixel therein. The output from the color palettes is transferred to a digital-to-analog converter (DAC) 128 for determining the selection and intensity for each of the red, blue and green colors generated by the monitor. The outputs from the digital-to-analog converters 128 are transferred to the monitor 62 by 75 ohm coaxial cables. The three color signals and the synchronization signal are shown in FIG. 1 as transferred to the monitor over composite bus 77.

The video CPU 26 also includes logic for high speed graphic processing capability including the use of shifters and bit bangers as explained more fully in a later section entitled "Video CPU module". The shifters allow fast shifting of areas or patterns horizontally or vertically on screen 72, and the bangers enable superposition of one or more patterns over another pattern at higher speed than that possible through sole use of a central processing unit. The video CPU module 26 and video RAM module 28 support a serial interface link through port 66 to monitor 62 over bus 73 for the receipt of keystroke information from keyboard 68 and for future use with a joy stick or "mouse" (see Bell Laboratories Pat. No. 3,541,541 entitled "X-Y Position Indicator For a Display System". In addition, digitized touch coordinates from the monitor and touch screen 70 are multiplexed on the same bus.

Physical Controls and Indicators

A POWER ON key switch 100 is located on the man-machine interface housing 31 as best seen in FIG. 3. It has three positions; namely POWER OFF, POWER ON, and a MOMENTARY SYSTEM RESET. A four position diagnostic switch 132 (shown in phantom) is mounted within housing 31 with its positions being NORMAL SYSTEM OPERATION, REPEAT CONFIDENCE TEST, SYSTEM DIAGNOSTICS, and SERVICE CENTER DIAGNOSTICS. The POWER ON switch 100 and the front door 133 to housing 31 are keyed as hotel "master slaves" so that access to DIAGNOSTIC SWITCH 132 requires that both keys be in the ON position.

As also seen in FIG. 3, four additional indicators 134, 135, 136, and 137 respectfully indicate, when ON, that all DC voltages are within specification, that the system is running properly, that an error has been detected, and that the unit is in a diagnostic mode.

As best seen in FIG. 2, each module has four indicators 49, 49', 50, and 51' which indicate the following:

(1) status light 49 when ON indicates the module is running properly;

(2) status light 49' when ON indicates that the module is the bus master with respect to bus 93 (see FIG. 1);

(3) light-emitting diodes 51 and 51' are used to generate an error code if present.

Man-Machine Interface Topologies With Respect to Network Bus 44

Figure 8:
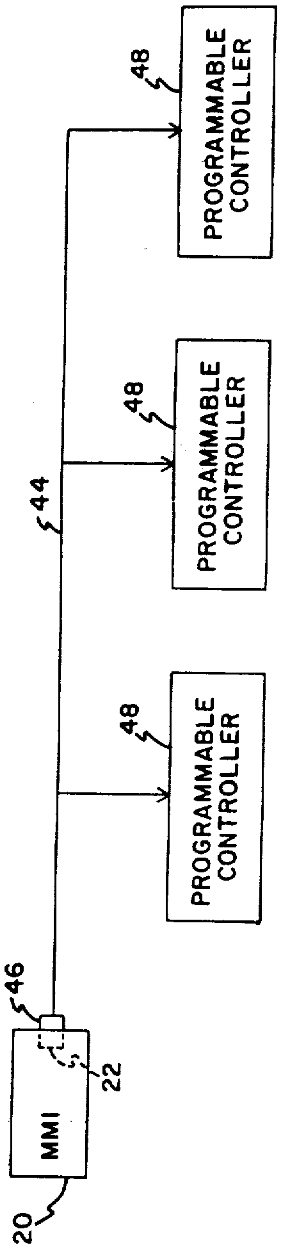
FIG. 8 is a diagrammatic representation of one embodiment of the man-machine interface communicating with a group of programmable controllers.

As seen in FIG. 1, the man-machine interface can interface through CPU module 22 via port 46 to a network communication bus 44 which in turn connects to programmable controllers 48 and other digital devices 50 such as computers, printers and the like. The man-machine interface may with respect to such a communication system such as the MODBUS TM network communication system, act as a primary station for a host protocol or act as a slave station for a slave protocol. Here the man-machine interface responds to requests from other units on the bus 44. Thus FIG. 8 illustrates a topology where the man-machine interface functions as a master to a family of one or more multi-drop PC's interconnected to bus 44.

Figure 9:
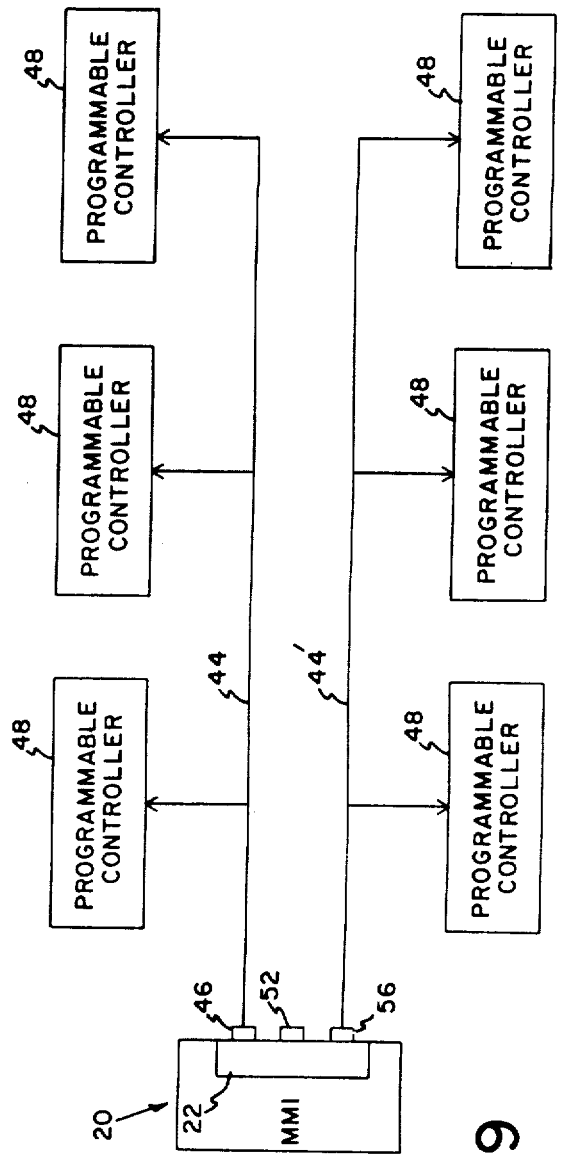
FIG. 9 is a block diagram showing the man-machine interface communicating on two serial ports with two groups of programmable controllers.

FIG. 9 illustrates the topology where the man-machine interface utilizes ports 46 and 52 to act as hosts to two network communication buses 44 and 44', each bus interconnected to a plurality of programmable controllers 48. The remaining port 56 on the CPU module 22 could be used to attach to a printer such as shown in FIG. 1.

Figure 10:
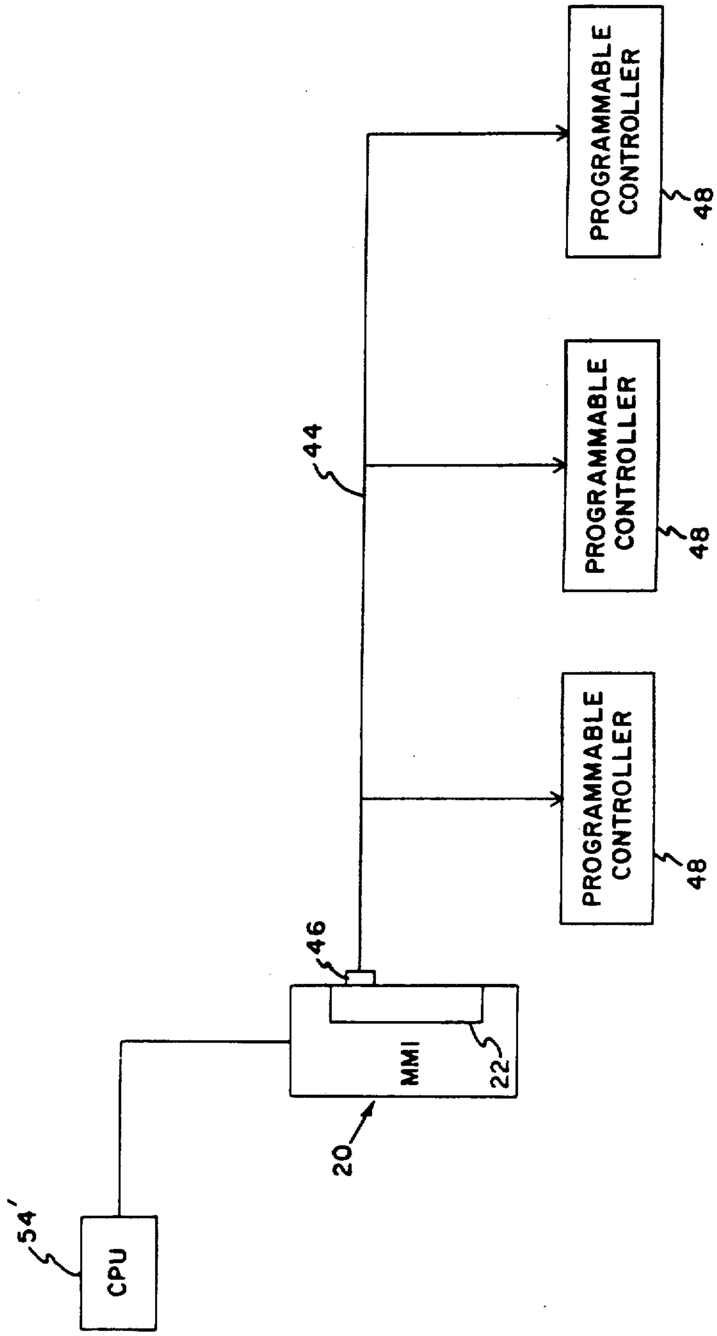
FIG. 10 is a block diagram similar to FIGS. 8 and 9 in which the man-machine interface communicates with a central processing unit (computer); wherein the man-machine interface in turn communicates with a plurality of programmable controllers.

Finally, FIG. 10 illustrates a topology in which the man-machine interface 20 is a host relative to programmable controllers 48 interconnected through the communication bus 44, but appears as a slave to CPU 54'. Thus the man-machine interface 20 is the master as to PC's 44 but in turn is the slave to the corresponding CPU. Although direct communications between the CPU and the programmable controllers does not occur without a second communication line being employed, the host computer may determine that an alternate data value is resident within the programmable controllers by asynchronously performing reads and writes with respect to the man-machine interface data base.

Thus it is readily apparent that many different topologies may be realized with the man-machine interface as interconnecte with the data communication bus 44.

Referring to FIG. 1, it is also readily apparent that the man-machine interface can, through a local area network interface module 36, be utilized with a high speed local area network using common bus 84, including such networks using token pass systems such as those described in pending U.S. patent application Ser. No. 241,688, entitled "Multi-Station Token Pass Communication System", and assigned to the present assignee.

Video Stations

As best seen in FIG. 1, each video station 108 comprises a video CPU module 26, a video random access memory module 28, a monitor 62 and an optional keyboard 68. The video station is the main vehicle for operator interaction with the man-machine interface 20. Each video station provides a 15½ inch (39.37 cm) by 11½ inch (29.21 cm) flicker free medium resolution color CRT monitor (such as a Hitachi Corporation Model 8M1719 monitor) with a resolution of 480 pixels in the horizontal direction by 311 non-interlaced lines in the vertical direction, the screen being able to support 512 possible color combinations generated by the video CPU 26. The usable screen area is approximately 15⅜ inches (39.03 cm) in the horizontal direction by 10 inches (25.4 cm) in the vertical direction. The linear pixel density (pixels, inch) is the same in the horizontal and vertical directions resulting in a square pixel that enables normal (round) circles to be drawn on the screen.

The screen 72 is covered by a transparent touch sensitive panel 70 (such as an EloGraphics Inc., Oak Ridge, Tenn. model E270-19 or Sierra Con-Intrex Products, Chatsworth, Calif. model TBD) that senses the operator's finger position. The touch-station electronics within the monitor 62 digitize this to an accuracy of 0.1 inch (2.5 mm) at the screen center.

Each touch station can be furnished with an optional detachable keyboard 68 (such as a Microswitch, Division of Honeywell Corp., Freeport, Ill., catalog list K57282-98SC24) that includes specialized function keys for supporting graphic applications. In particular, a separate numerical key pad is provided together with cursor control keys. Also the keyboard can accommodate a future joy stick as an option. In the absence of a keyboard, the joy stick may be plugged directly into the graphics processor 106 with the possible addition of a "mouse" (see Bell Laboratories U.S. Pat. No. 3,541,541) interfacing to the graphics processor through a separate interface board.

As seen in FIG. 1, each video station has an auxiliary red, green, blue and sync port 63 which can be used to drive a slave station monitor 62'. The primary function of the slave station is to display the same image that is carried on the primary video station monitor.

In addition, a post output contact 95 can be provided to start a hard copy device such as plotter 59 communicating with the video station through RAM module 28.

A beeper 61 is provided with the monitor for variable pitch annunciation. A volume control 97 is mounted on the rear of the station while an isolated output 99 is provided for customer connection to his or her own audio amplifier system. A programmable contact output 65 is provided for switching up to 250 VAC at 1 ampere so as to function as a programmable alarm output relay. A lamp 101 is provided for POWER ON indication and a second lamp 103 is provided for an ON LINE indication. A degauss BUTTON 105 is also provided for degaussing the screen.

SOFTWARE OVERVIEW

In order to make the man-machine interface operational, the following software forms part of the overall system:

(1) an industrial real-time disk operating system, (2) a display language for graphic generation, and (3) a user's plant data base definition and display files.

The hardware shown in FIG. 1 runs under control of the multi-tasking real-time disk operating system. The operating system provides a run time environment for the tasks that comprise the display language graphic software.

The display language graphic software supports the features previously set forth in Table 3.

Figures 3, 11:
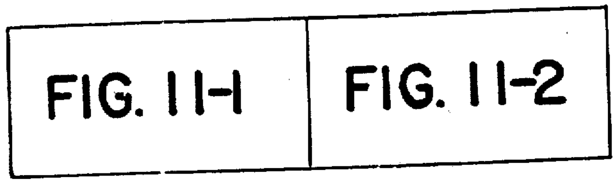

The host software executed by the CPU module 22 interfaces with designers, configurers and operators via a set of standard menus that are accessed by a hierchical structure as set forth in FIG. 11. Each of the menus includes a HELP BUTTON which, when touched, presents to the user a HELP MENU dedicated to the particular menu previously presented. The HELP MENU describes how to use the particular menu previously shown and it contains a CONTINUE BUTTON that, when touched, causes the particular previous menu to reappear.

Man-Machine Interface Startup

To initiate a startup sequence, the user places the diagnostic key switch 132 (see FIG. 3) in position 1 (normal operation) and turns on the POWER ON key switch 100. Once initiated, the man-machine interface startup sequence performs the steps set forth in Table 6.

Selection of a Mode

The mode for the selection of a mode enables designers and configurers to select designer or configurator modes respectively which are not visible to operators. This selection mode process also enables programmers to directly address the MMI operating system. The graphics software moves a particular control/display unit to the selection mode from its current mode when one of the following events occurs:

(1) If the unit is in the designer mode, the object selection of MENU, DIRECTORY OPTIONS MENU or SUBPICTURE DESIGN OPTIONS MENU, appears on the unit screen and the SELECT MODE BUTTON is touched, (2) If the unit is in the configurator mode, the object selection MENU, DIRECTORY OPTIONS MENU, or SUBPICTURE CONFIGURATION OPTIONS MENU appears on the unit screen and the SELECT MODE BUTTON is touched.

The mode selection menu presents the following BUTTONS on the screen for user interaction; namely, "Help", "Design", "Configure", "Operate", and "Executive".

Touching the design button moves the particular control/display unit from the mode selection mode to the designer mode and causes the object selection menu (described later) to be presented.

Touching the CONFIGURE BUTTON moves the particular control/display unit from the mode selection mode to the CONFIGURATOR MODE and causes the object selection menu to be presented.

TABLE 6

| | |
|---|---|
| (1) | A 30 second programmable read only memory (PROM) based hardware confidence test is run. |
| (2) | If the hardware confidence test is successful, the operating system is "booted" and begins running. |
| (3) | The graphics software is initialized. |
| (4) | When initialization of the graphics software is complete, the screen calibration data for each control/display unit that has been previously calibrated is retrieved from disk 76 (see FIG. 1). |
| (5) | Startup of each control/display unit that has not been previously calibrated is complete when the graphics software is initialized. Startup of each control/display unit that has been previously calibrated is complete when its screen calibration data has been successfully retrieved from diskette. |
| (6) | When startup of a particular control/display unit is successful, the graphics software begins running a CONFIGURER specified initial user application DISPLAY TASK at an intermediate priority that normally presents the user application main menu on the particular control/display unit. |

Touching the OPERATOR BUTTON moves the particular control/display unit from the mode selection mode to the operator mode, causing the graphic software to begin running the initial user application display task previously defined by the CONFIGURER. Normally, this running causes the user application's main menu to appear on the control/display unit's screen.

Touching the EXECUTIVE BUTTON clears the screen and allows direct access to the COMMAND EXECUTIVE level of the operating system.

DESIGNER MODE

The designer mode enables designers to design custom templates. In designer mode, a designer may create subpictures to form displays. Subpictures are components of displays and are comprised of graphic and non-graphic display language commands. Subpictures can be composed of other subpictures, allowing the user to create and manipulate displays of any complexity.

Display language commands are generated by the user in an interactive environment using a touch screen and soft keys. Subpictures and displays may be grouped functionally, hierarchically, or logically.

Subpictures may be edited in an interactive manner using single stepping, deletion, and insertion. In addition, user aids, such as graticules, gravity points and automatic redrawing, provide a comfortable environment for creating displays at all levels of complexity.

Main Function

The designer editor program allows a user to create and edit a set of files containing graphic language commands. This is achieved in an interactive environment using a color graphics terminal 62 equipped with a touch panel 70 (see FIG. 1).

As each graphic command is created, its visual effect (if any) is echoed on the screen. The user may step forward and backwards through the file, inserting and deleting commands as required. At all times the screen shows the graphic representation of the commands up to the current file position. The user may, however, choose to see the entire graphic file rather than just up to the current file position.

Secondary Function

A secondary function of the designer editor program is to create and edit character and color libraries. These are stored as separate files and may be selected in preference to the default characters and colors which are provided.

Button Control

The user controls the program using "soft buttons" 121 (see FIG. 7) in conjunction with a keyboard 68 (see FIG. 1). The soft buttons are colored areas on the screen, each labelled with a helpful text string, which executes a given function when pressed.

The set of buttons is quite large, so they are grouped into "menus"—one menu on the screen at any one time. This increases the amount of screen available for drawing and is more pleasing for the user since he/she has fewer buttons to choose from at each stage.

The MMI is able to replace one menu with another in less than 200 milliseconds, so the user does not notice an appreciable delay.

Some menus use the entire screen area in order to provide large, easy to use, soft buttons. This causes the screen contents to be temporarily lost, but redraw time is predicted to be less than one second, so the user is not held back while the display is regenerated.

Those menus which only take up a part of the screen may be repositioned by the user such that they do not obscure parts of his/her drawing.

There are three types of menus:

(a) MAIN menu—the user is initially presented with the MAIN menu. This contains several command buttons and buttons to call up secondary menus.

(b) SECONDARY menus—each contains several logically related command buttons and a button to return to the MAIN menu.

(c) FUNCTION menus—these are designed to get a specific item of information from the user and are called from the MAIN menu or from a SECONDARY menu. When their task is completed, the program returns to the menu which called them.

Text (Edit) Window

Figure 12:
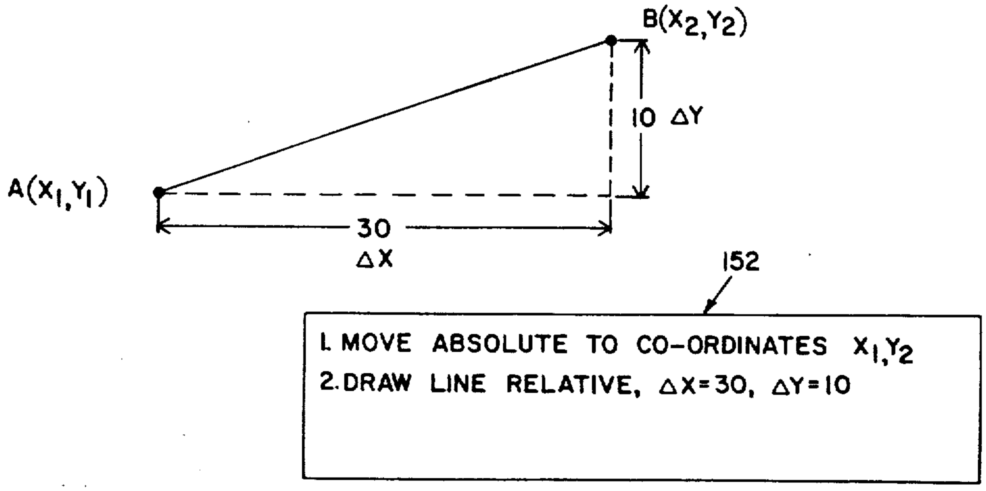
FIG. 12 is a diagram illustrating the generation of a line on the screen through use of the high level graphic language.
Figure 13:
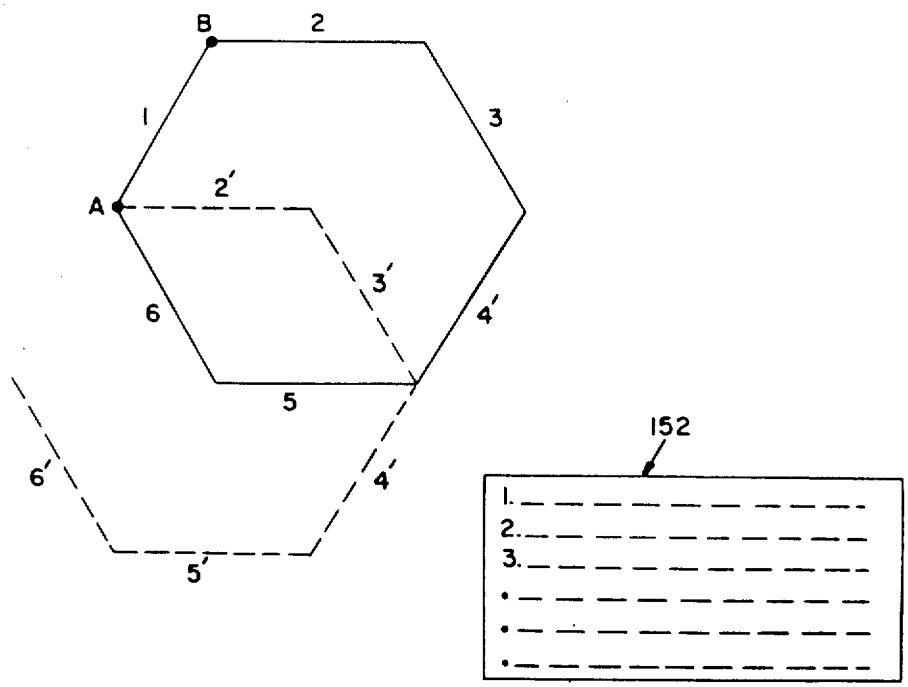
FIG. 13 is a diagrammatic representation of what occurs when a line segment in a polygon is removed through use of the high level graphic language of the present invention.
Figure 14:
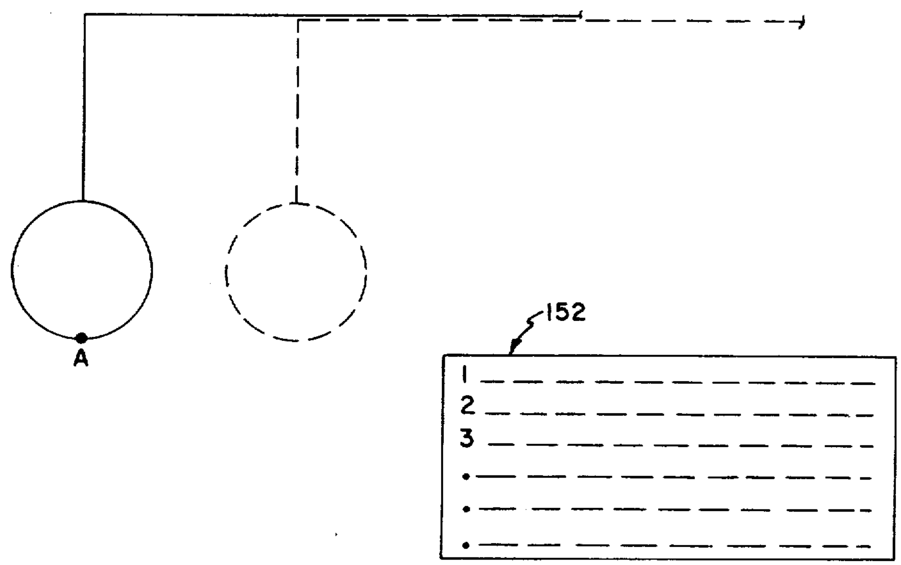
FIG. 14 is a diagrammatic representation of how the MMI's high level graphic language can implement a shift of a displayed image on the monitor.

As seen in FIGS. 12-14, the user has the option of displaying part of the command file in textual form. This involves the use of a scrolling buffer area 152 on the screen and shows several commands in near-English form.

As the user steps forward and backward through the command file, the buffer scrolls up and down such that the current command is at the center of the buffer. Previous commands are shown above and later commands (if any) are shown below.

The current command may have several arguments, such as an X coordinate, Y coordinate, etc. One of these is marked to signify that it is the "Current Argument". This is the first argument by default, but the user can step through the arguments as desired.

The user has the ability to position the Text Window anywhere on the screen. He/She may choose to move it to an unused portion of the screen if it is interfering with the current drawing. By default, it is shown at the lower left corner of the screen.

Program Structure

Figures 2, 11:
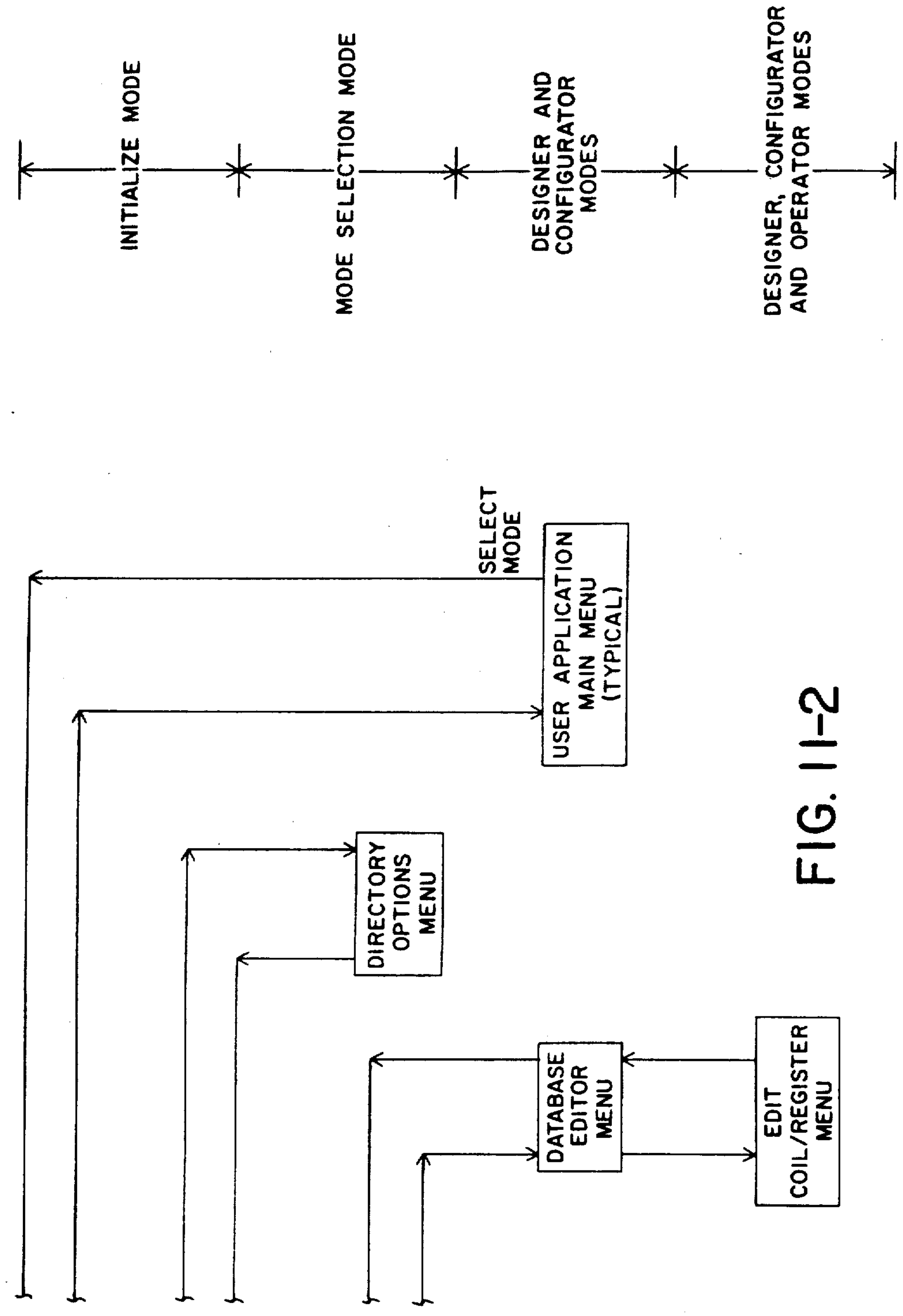
Figure 11A:
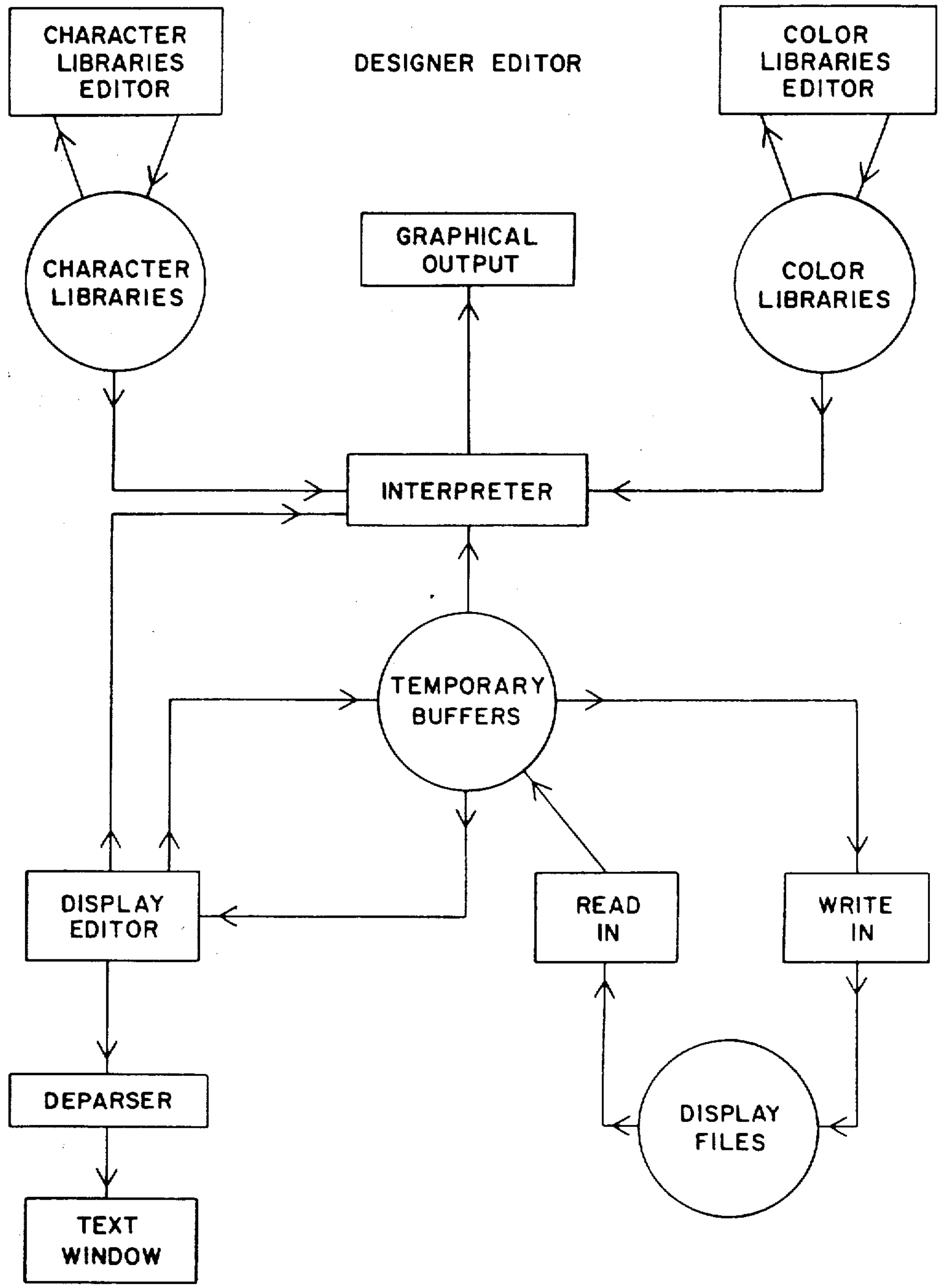
FIG. 11A is a diagrammatic representation of the designer editor utilized for implementing graphic displays.

As seen in FIGURE 11A, the designer editor program structure consists the following four basic units:

1. The Display Editor, which generates and edits the Display Commands and Parameter Names.
2. The Character Libraries Editor, which allows the user to create and edit Text and Symbol libraries.
3. The Color Libraries Editor, which allows the user to create and edit Color Libraries, and
4. The Interpreter program.

The display commands are stored in temporary buffers and are written to permanent files at the conclusion of the editing session. These files may later be read back into the temporary buffers for further processing.

The interpreter is used to draw the command file and is invoked by the Designer Editor as each edit is made. Reference is made to the appropriate character and color libraries.

| LIST OF USER COMMANDS |
|---|
| Display Editor Commands |
| Move Absolute |
| Move Relative |
| Draw Line |
| Draw Box |
| Draw Arc by Three Points |
| Define Bar Chart Area |
| Define Point Chart Area |
| Trend |
| Draw Bar |
| Draw Point |
| Clear Next Trend Area |
| Delete Current Command |
| Backstep |
| Single Step |
| Argument Step |
| Go to Start |
| Go to End |
| Start Side Trip |
| End Side Trip |
| Select Text Library |
| Load Text Library |
| Select Symbol Library |
| Load Symbol Library |
| Set Character Spacing |
| Write Text String |
| Write Number |
| Write Symbol |
| Set Text Margins |
| Color Screen |
| Color Rectangles |
| Start Polygon Fill |
| End Polygon Fill |
| Create Parameter |
| Remove Parameter |
| Create Local Variable |
| Remove Local Variable |
| Create Global Variable |
| Remove Global Variable |
| List Variables |
| Parametize Argument |
| Un-parameterize Argument |
| Suppress Select Text Window Shown |
| Suppress Select User Grid Shown |
| Suppress Select Rubberband Coordinates Shown |
| Calculation |
| Dynamic Mode |
| Static Mode |
| Select Foreground Color |
| Transparent Foreground Color |
| Select Background Color |
| Color Defaults |
| Load Color Library |
| Overwrite Color Entry |
| Overwrite Symbol Library Entry |
| Define A Button |
| Erase Button |
| Edit Subpicture |
| Create Subpicture |
| Call Subpicture |
| Return From Subpicture |
| Edit Color Library |
| Edit Character Library |
| Re-define Origin |
| Change Display Mode |
| Set Line Type |
| Move Text Window |
| Move Menu |
| IF THEN |
| ELSE |
| DO WHILE |
| CASE OF |
| Case Instance |
| FOR TO |
| END (of cntrol) |

-continued

| LIST OF USER COMMANDS |
|---|
| Chain to Display |
| Invisible Chain To Display |
| Chain Back |
| Go To Display |
| Spawn |
| Spawn And Die |
| Die |
| Kill |
| Open Channel |
| Round KLAXON |
| Set Bell Frequency |
| Sound Bell |
| Set User Grid |
| End |
| Color Libraries Editor Commands |
| Create A New Color Library File |
| Select An Existing Color Library File |
| Change Current Palette Number |
| Modify An Entry In The Current Palette |
| Change Zone Map |
| Exit From Editor Return to Display Editor |
| Character Libraries Editor Commands |
| Create A New Character Library File |
| Select An Existing Character Library File |
| Edit Character |
| Exit from editor (return to Display Editor) |

The description of these commands is given later in this section.

Subpictures

A subpicture is a collection of display language commands that perform a logical function. This function may be graphical or non-graphical in nature. For example, a subpicture may contain the display language commands to draw a motor start button on the screen, displaying the state of the motor by the button color. On the other hand, it may contain the display language commands to perform the calculations that determine the average downtime for all motors.

A subpicture is a display file entity and can contain any of the graphical commands described later. In addition, subpictures can support the following additional capability:

(a) passing arguments to other subpictures—the ability to have subpictures composed of other subpictures and to pass arguments to those subpictures; and (b) static and dynamic display processing—the ability to denote sections of a subpicture that are executed just once and sections that are executed repetitively.

The non-graphical display language commands include expression calculations and control flow. Subpictures are stored as filed in directories.

Displays

A display is a collection of one or more subpictures that make up a cohesive, unifying action. This action may be graphical or nongraphical in nature. Displays are interpreted as tasks that may be created, aborted or scheduled. Displays are made up of subpictures copied from libraries and various directories. Subpictures for a given display may come from a single directory, thereby facilitating the organization of displays in any desirable manner. Displays are different from subpictures in that they also contain information of their composition, their scheduling, and their links with other displays. This extra information is determined through the configuration process.

Displays contain the following additional information:

(1) A description of the zone and color palette for that display;

(2) Name of the alternate character set for that display;

(3) Name of the special symbol set for that display;

(4) Names of the subpictures that comprise that display;

(5) Task information that describes how the display is scheduled;

(6) Chain information with other displays; and (7) Data base information needed for invoking the display.

Displays are stored as files in directories.

Invisible Displays

The MMI has the capability to support a variety of invisible displays. Invisible displays may run automatically once initiated but are capable of being started and stopped by the operator, scheduled at different rates, and used for a broad range of activities, such as history processing (e.g., data compression for trends and other data), derived point calculations (some derived point calculations can be part of the data acquisition phase), and customized alarm monitoring. Up to eight invisible displays can run concurrently. There is no limit to the number of different invisible displays that can be scheduled.

Task scheduling may be changed dynamically, either by explicit control from the designer or by internal determination. Tasks may be spawned or destroyed dynamically, either through direct intervention of the designer or under control of a supervisory task that acknowledges their completion or startup.

There are four domains associated with each touch or view (vue) station's screen. A separate color library, text library and symbol library are associated with each domain. Each domain may be individually opened and concurrently written to by a display task that is being interpreted. When a display task writes data to a domain that is open, the data is physically written on the respective touch or vue station screen. When a display task writes data to a domain that is not open, the language receives an error return.

These features enable several different display tasks to execute asychronously and enable each of these tasks to write to the same touch or vue station screen using its own color library, text library and symbol library.

Directories

The MMI contains a hierarchical directory and file system in which the leaves are files and the nodes are directories. A directory is simply a list of files.

Capability

The MMI directories typically list files consisting of subpictures, displays, templates and application specific data. The MMI also supports the notion of libraries. Libraries can be considered special directories in that they contain no other directories, they contain only standard templates, color definitions, text font definitions and symbol font definitions; and in the case of standard templates, standard color libraries and standard character libraries, they are read only.

Typically, transactions consisting of subpicture and display creation, deletion, and modification emanate from a single directory. This eliminates naming problems as well as problems due to multiple copies of the same (or slightly modified) file. The MMI graphics software moves a particular control/display unit to the designer mode from the mode selection mode when the mode selection menu appears on the unit's screen and the design button is touches.

The designer mode provides the following menus to support design of custom templates:

(1) Object selection menu,
(2) Directory options menu,
(3) Subpicture design options menu,
(4) Designer Editor Main menu
(5) Designer Editor Secondary menus
(6) Special Function menus, and
(7) Help menus.

The object selection menu enables a designer either to address complete directories via the directory options menu or to address individual templates, displays and subpictures in a particular directory via the subpicture design options menu.

The directory options menu enables a designer to select a disk volume, to select, create and delete individual directories and to list the names of all directories.

The subpicture design options menu enables a designer to create, delete and copy templates, displays and subpictures within a particular directory, to list the names of the templates, displays and subpictures within a particular directory and to request design of a specific template, display or subpicture within a particular directory.

When a designer requests design of a specific template, display or subpicture via the subpicture design options menu, the graphics software begins running a designer editor program, that enables the designer to build and modify a specific template, display, or subpicture.

When the designer editor program begins running, it presents the designer editor main menu to the user. The designer editor main menu enables the designer to select or access menus that select one of a group of designer editor secondary menus, (described below), each one of which enables the designer to return to the designer editor main menu.

Each designer editor secondary menu is dedicated to a particular type of function (e.g., generate move or draw command, define plot or trend, etc.) supported by or accessed via the designer editor program. The editor also presents a group of function buttons in a small, user selectable area of the screen. The remainder of the screen is used to depict the image produced by interpreting the current contents of the template, display or subpicture being designed. Touching one of the function buttons causes the designer editor to perform a single function, for example, the addition of a particular display language command to the template, display or subpicture.

The special function menus (described later) are each used to obtain a specific item of information from a designer. A special function menu is requested via either the designer editor main menu and/or a designer editor secondary menu whenever the item of information obtained through the special function menu is required by an option selected on the requesting menu.

Object Selection Menu

The object selection menu is used in both the designer mode and the configurator mode, and is depicted in FIG. 11.

The object selection menu presents the following buttons to the user: directories, subpictures, help, and select mode.

Touching the directory button causes the directory options menu to be presented.

Touching the subpicture button causes one of the following two events to occur:

(1) If the particular touch station is in the designer mode, the subpicture design options menu is presented.
(2) If the particular touch station is in the configurator mode, the subpicture configuration options menu is presented. It is presented in a different background token color than that of the designer options menu.

Touching the select mode button moves the particular touch station from the designer mode to the mode selection mode, causing the mode selection menu to appear on the screen.

Options Menu

The directory options menu is used in both the designer mode and the configurator mode, as shown in FIG. 11.

The directory options menu presents the following buttons:

(1) select volume,
(2) select directory,
(3) list directories,
(4) create directory
(5) delete directory
(6) help
(7) select mode
(8) select object The directory options menu only supports access to directories that have been created using the create directory button. Directories created directly by users via the operating system utilities cannot be accessed via the directory option menu.

Touching the select volume button enables a designer or configurer to enter, via the keyboard, the name of the current disk volume to which all directory references are to apply.

Touching the select directory button enables a designer or configurer to enter, via the keyboard, the name of the current directory in which all files are to be stored and retrieved.

Touching the list directories button causes the names of all directories stored on the floppy disk drives to be listed on the screen.

Touching the create directory button enables a designer or configurer to enter, via the keyboard, the name of a new directory that is immediately created.

Touching the delete directory button enables a designer or configurer to enter, via the keyboard, the name of a directory that is immediately deleted.

Touching the select mode button moves the particular control/display unit from the designer mode to the mode selection mode, causing the mode selection menu to appear on the unit's screen.

Touching the select object button causes the object selection menu to be presented.

Subpicture Design Options Menu

The subpicture design options menu presents the following buttons:

(1) create subpicture
(2) delete subpicture
(3) copy subpicture
(4) list subpicture
(5) edit subpicture
(6) help
(7) select mode
(8) select object Touching the create subpicture button enables a designer to enter, via the keyboard, the name of a new subpicture that is immediately created.

Touching the delete subpicture button enables a designer to enter, via the keyboard, the name of a subpicture that is immediately deleted.

Touching the copy subpicture button enables a designer to enter, via the keyboard, the name of an existing subpicture and its respective directory and the name of a new subpicture in the current directory to which the existing subpicture is immediately copied.

Touching the list subpictures button causes the names of all displays, subpictures and templates in the current directory to be listed on the screen.

Touching the edit subpicture button enables a designer to enter, via the keyboard, the name of a file of display language commands which is to be edited. As soon as the subpicture name is entered, the following events occur:

(1) The designer editor program begins running with the designer entered file name serving as both input and output files; and
(2) The designer editor main menu is presented.

Touching the select mode button moves the particular control/display unit from the designer mode to the mode selection mode, causing the mode selection menu to appear on the unit's screen.

Designer Editor

The designer editor is a program that enables a designer to build and modify a file of display language commands, (i.e., a template, display or subpicture), one command at a time.

The designer editor program resembles a line oriented text editor in that it maintains a pointer to a current location in the file being designed.

A designer directs the designer editor to perform a single function, for example, addition of a particular display language command to the file being designed at the current file location, by touching a function button on one of the designer editor secondary menus.

When a designer editor secondary menu is being presented, the screen contents include:

(1) The image produced by interpreting the current contents of the display file being designed. Each time one of the menu's function buttons is used to modify the contents of this file, the image is redrawn to depict the new contents of the file.
(2) The function buttons that comprise the designer editor secondary menu being presented. A default screen location for the menu buttons is established but the designer can move the menu buttons to any desired location on the screen. The function buttons are organized in the form of a square or rectangular touch pad constructed from ¾ inch (1.90 cm) square buttons that abut one another. The standard character set with 6×6 font size is utilized to identify the buttons.
(3) An optional text window that shows the command at the current file location and the types of the commands that precede and follow the command at the current file location. The designer can move the text window to any location on the screen or can remove it from the screen. The current command is blue and the current argument is red.

The utility menu presents a relocate menu button, that when touched, enables the designer to relocate the menu to another screen location by touching the new screen location.

Most of the designer editor secondary menus present a relocate text window button that, when touched, enables the designer to relocate the text window to another screen location by touching the new screen location.

Designer Editor Main Menu

The designer editor main menu presents the following buttons that are used to select the designer editor's secondary menus:

(1) control functions,
(2) edit functions,
(3) move and draw,
(4) character functions,
(5) plots and trends,
(6) utility
(7) color functions
(8) subpictures
(9) variables,
(10) calculation
(11) database functions
(12) I/O functions
(13) end
(14) help
(15) print The designer editor's secondary menus are described later.

The description for each of the designer editor's secondary menus details the function buttons provided solely on a particular menu to create and edit a display file. The following information is given for each such function button:

(a) The function performed as a result of touching the button;
(b) Notes, where required; and
(c) The output shown in the optional text window when the button is touched.

Touching the control function button causes the control functions menu to be presented. Touching the edit functions button causes the edit functions menu to be presented. Touching the move and draw button causes the move and draw menu to be presented. Touching the character functions button causes the character functions menu to be presented. Touching the plots and trends button causes the plots and trends menu to be presented. Touching the utility button causes the utility menu to be presented. Touching the color functions button causes the color functions menu to be presented. Touching the subpictures button causes the subpictures menu to be presented. Touching the variables button causes the variables menu to be presented.

Touching the calculation button causes the keyboard menu to be presented. This menu prompts the designer to enter a statement of the form (parameter name)=(expression) via the menu buttons. When the statement is entered, a display language command is added to the display file being edited, at the current file location, that when interpreted in operator mode, causes the value of the named parameter to be set equal to the current value of the entered expression.

The expression has no data types associated with parameters, but instead the data itself carries a type identifier. The interpreter accepts and operates on any data type. No type checking is performed or necessary. This greatly facilitates program development and execution.

Touching the database functions button causes the database functions menu to be presented. Touching the I/O functions button causes the I/O function menus to be displayed. Touching the end button causes the display file being designed to be stored to disk and causes the subpicture design options menu to reappear. Touching the print button causes the contents of the file currently being designed to be printed on the default graphic hard copy device defined in the logic-to-physical unit mapping display.

The character library editor and the color library editor are separate programs having their own menus that can be invoked from the character functions menu and the color functions menu respectively.

The designer editor's function menus are described later.

Expressions

Real expressions may contain the operators +, −, *, /, and ^ (exponentiation).

Arithmetic constants may be expressed in decimal format, integer format or scientific (E) notation.

Real expressions may contain the arithmetic functions abs(x), sqr(x), sin(x), cos(x), exp(x), ln(x), sqrt(x), and arctan(x); where x is a real expression.

Boolean expressions may contain the Boolean operators AND, OR, XOR, and NOT and the relational expressions <, <=, =, <>, >=, and >.

Boolean expressions may contain the Pascal predicate odd (x).

Boolean expressions may contain the predicate eof, which returns the value true when the channel currently open is at the end of a file and false when the channel currently open is not at the end of a file.

The function lit, when applied to a database variable, returns the name of the variable in a string. For example, if PS103 is the name of a database variable, then interpretation of the display language command string X=lit (PS103) causes string X to be used as a character string and to be assigned the value "PS103". It does not pass a node in the database. Thus if the full name is PS103 SET POINT, only PS103 or SET POINT is returned.

Expressions may contain any level of parentheses, e.g., a*(b* (c+d)).

The function "connected", when applied to a database variable, returns the value True when the variable is configured for update/download from/to a PC by the data acquisition package and otherwise returns the value False.

The function valid, when applied to a database variable, returns the value True when a display has previously validated the variable's value and otherwise returns the value False.

The function enabled, when applied to a database variable, returns the value True when the value of the variable may be modified by an active display and the database package otherwise returns the value False.

The function decode, when applied to a character string whose first character is alphabetic, addresses the value of the variable whose identifier is defined by the character string's content. For example, when X="TAG1" and Z=Decode (X), the value of variable Z is set equal to the value of variable TAG1; and when X3="TAG2" and decode (X3)=A, the value of variable TAG2 is set equal to the value of variable A.

A function also exists to convert an array of PC registers into a text string and vice versa. This can impact DAP and database as well. Functions also exist to test or set a bit in a PC register in the database.

The state of each of the following designer mode toggle conditions is displayed on all of the designer editor's menus:

(1) Global/Local Variables,
(2) Static/Dynamic Mode,
(3) Display Mode ("draw all" or "drawn up to current command"),
(4) Foreground Color,
(5) Background Color, and
(6) Blink Mode.

The currently selected foreground color and the currently selected background color is displayed on all of the designer editor's menus.

Whenever a designer editor menu is being presented, the current cursor position is visibly identified and blinking.

Control Functions Menu

The control functions menu presents the following buttons:

(1) chain to display
(2) invisible chain to display
(3) chain back
(4) go to display
(5) spawn
(6) die
(7) kill
(8) if . . . then
(9) else
(10) Do While
(11) For . . . To
(12) Case . . . of
(13) Case Instance
(14) End (of control structure)
(15) Define Button
(16) Erase Button
(17) Return to Main Menu
(18) Help
(19) Relocate Menu
(20) Relocate Text Window Touch buttons may be designed into a screen picture via the "Define Button" function button. These touch buttons may be designed to call another picture or portion of a picture, change a data base boolean, jog an analog variable, with hold-down for continuous slew and auto repeat, initiate the "change an analog or logical" procedure, and initiate any calculation, display, procedure or computer "process" that has been designed in designer mode.

Some touch buttons that are usually designed into the visible displays include tag callup, alarm acknowledge, last display, and help.

The function buttons presented solely by the control functions menu perform the functions and/or generate the display language commands as set forth in Table 7.

TABLE 7

(1) CHAIN TO DISPLAY
Function: In operator mode, the program jumps to another DISPLAY FILE specified by the user. This command causes the current DISPLAY FILE name to be remembered such that the user may return using a CHAIN BACK command. Any number of chains may be executed, and a long list of DISPLAY FILE jumps built up in memory. It is then possible to retrace through the sequence with repeated use of the CHAIN BACK facility.
Notes:
(a) Keyboard used to define a FILE NAME
Text window output: Chain to "(file name)"

(2) Invisible CHAIN TO DISPLAY
Function: In operator mode, the program jumps to another DISPLAY FILE specified by the user. This command is identical to the CHAIN TO DISPLAY command except that the current DISPLAY FILE is not filed for future reference. When a CHAIN BACK command is later reached, the program will miss the current display file on its way back through the chaining list.
Notes:
(a) Keyboard used to get file name
Text window output: Invisible chain to "(file name)"

(3) CHAIN BACK
Function: In operator mode, the program returns to the DISPLAY FILE that was being executed before the current one (i.e., the file that "chained" to the current one).
Notes:
(a) If there is no memory of a previous DISPLAY, the command will do nothing.
Text Window Output: Chain back to calling display (4) Go to DISPLAY
Function: To operator mode, the program jumps to another DISPLAY FILE specified by the user. This command erases all memory of previous DISPLAY FILES which may have been built up using CHAIN TO DISPLAY commands.
Notes:
(a) Keyboard used to get file name
Text window output: Go to display "file name"

(5) Spawn
Function: In operator mode, causes a new DISPLAY FILE to start running in addition to the current one (new task created)
Notes:
(a) Keyboard used to get FILE name
(b) Keyboard used to get priority
(c) Keyboard used to get execution frequency
(d) Keyboard used to get time of day at which DISPLAY FILE is to start running.
Text window output:
Spawn new task "(file name, priority =, frequency, time =)"

(6) Die
Function: In operator mode, the current DISPLAY FILE is halted (task removed).
Text window output: Die (7) Kill
Function: The user specifies a DISPLAY FILE name. In operator mode, if this FILE is running as a task in the system, it is immediately terminated.
Notes:
(a) Keyboard used to get file name
Text window output:
Kill task "(file name)"

(8) IF . . . THEN
Function: The user enters a conditional expression. When the IF . . . THEN command is executed, the following commands in the file are only executed if there are no UNDEFINED VARIABLES in the conditional expression and the value of the conditional expression is TRUE. An END or ELSE command is used to mark the end of these following commands.

TABLE 7-continued

Notes:
(a) Keyboard used to get expression
Text window output:
If (conditional expression) is TRUE, then do the following . . .

(9) ELSE
Function: This command is used in conjunction with an IF . . . THEN command. It separates the commands which are to be executed when there are no UNDEFINED VARIABLES in the conditional expression and the value of the conditional expression is TRUE from the commands which are to be executed when there is an UNDEFINED VARIABLE in the conditional expression and/or the value of the conditional expression is FALSE.
Text window output:
ELSE do the following . . .

(10) DO . . . WHILE
Function: The user inputs an expression. At some later stage in the FILE, there will be an END (of control) statement. The commands between the DO . . . WHILE and END will be continually repeated until the, expression becomes FALSE.
Notes:
(a) Keyboard used to get expression
Text window output:
DO the following WHILE (expression) is true . . .

(11) FOR . . . TO
Function: The user enters a variable name, start value, and an end value. The following commands (delimited by an "END of Control" command) are repeated and the variable incremented by one each time until the end value is reached.
Notes:
(a) Keyboard used to get variable name
(b) Keyboard used to get start value
(c) Keyboard used to get end value
Text window output:
FOR (variable) = (integer) to (integer) DO

(12) CASE OF
Function: The user enters an expression. The result of the expression is used to jump to a particular "Case Instance" later in the DISPLAY FILE.
Notes:
(a) Keyboard used to get expression
Text window output:
CASE OF (expression)

(13) Case Instance
Function: The user enters a value. If the expression in the most recent CASE OF statement is equal to this value, the program jumps immediately to this position in the DISPLAY FILE.
Notes:
(a) Keyboard used to get value
Text window output:
Case instance of (integer): . . .

(14) END (of control structure)
Function: Marks the end of a range of conditionally executed commands (e.g. IF . . . , WHILE . . . , etc.)
Text window output:
END of control

(15) Define a BUTTON
Function: The user defines a rectangle on the screen. This inserts a display command which acts like an IF . . . THEN command. If the rectangular button area is presset the beeper sounds momentarily, THEN the next commands (until an "END of control") are executed. Otherwise, they are ignored.
Notes:
(a) Digitizer MENU used to get X/Y coordinates.
(b) The height and width of the button area are given as "H", and "W" in the text window.
(c) While the Digitizer MENU is in operation, a rectangle oscillates between the current position and the point being digitized. The rectangle is drawn such that the current position and digitized point are at diagonally opposite corners.
(d) The rectangle is drawn with a dotted line and is merely to aid the DESIGNER. It does not appear in Operator mode, so the DESIGNER must include his/her own "Draw Box"/"Color Rectangle"

TABLE 7-continued commands if desired.
Text window output:
If BUTTON (W= (integer), H= (integer)) is pressed, then . . .

(16) Erase BUTTON
Function: The user defines a rectangle on the screen. Any previously defined buttons whose center points lie within the bounds of this rectangle are removed.
Notes
(a) Digitizer MENU to define a rectangle
(b) While the Digitizer MENU is being used, a rectangle oscillates between the current position and the point being digitized.
(c) The rectangle is drawn with a dotted line and is merely to aid the DESIGNER.
(d) W and H refer to the WIDTH and HEIGHT of the rectangle.
(e) This command only erases the BUTTONS themselves, not the associated colored shapes and text labelling.
Text window output:
Erase BUTTONS in box W = (integer), H = (integer)

Edit Functions Menu

The edit functions MENU presents the following function BUTTONS:

(1) Delete Current Command
(2) Backstep
(3) Single Step
(4) Argument Step
(5) Go to Start
(6) Go to End
(7) List Variables
(8) PARAMETERIZE Current Argument
(9) Un-PARAMETERIZE Current Argument
(10) Change Display Mode
(11) Return to MAIN MENU
(12) HELP
(13) Substitute Agreement The function BUTTONS presented solely by the edit functions MENU are presented in Table 8.

TABLE 8

(1) Delete Current Command
Function: The current Command in the DISPLAY FILE is removed, and the previous command becomes the new current command. The screen is redrawn.
Text window output:
(Not applicable)

(2) Backstep
Function: The previous command in the DISPLAY FILE becomes the current command. The screen is redrawn.
Text window output:
(Not applicable)

(3) Single Step
Function: The next command in the DISPLAY FILE becomes the current command. The screen is redrawn.
Text window output:
(Not applicable)

(4) Argument Step
Function: The next argument in the current command becomes the new current argument. If there are no arguments remaining, the first argument in the next command becomes the new current argument.
Notes:
(a) The arguments of some commands may not be altered - these are automatically skipped over.
Text window output:
(Not applicable)

(5) Go to Start
Function: The first command in the DISPLAY FILE becomes the current command. The screen is redrawn.
Text window output:
(Not applicable)

TABLE 8-continued (6) Go to End
Function: The last command in the display file becomes the new current command. The screen is redrawn.
Text window output:
(Not applicable)

(7) List Variables
Function: The screen is cleared and the user is given a complete list of LOCAL VARIABLES, GLOBAL VARIABLES and PARAMETER names which have been defined in the current DISPLAY FILE.
Notes:
(a) The screen will have the following BUTTONS while displaying the variable names:
Next page (if all the names cannot be displayed on the screen at once)
Previous page (if all the names cannot be displayed on the screen at once)
Continue (return to Edit Functions MENU)
(b) The PARAMETER names, LOCAL VARIABLES and GLOBAL VARIABLES are shown in different colors
(c) This command is also available in the variables MENU.
Text window output:
(Not applicable)

(8) PARAMETERIZE Argument
Function: The user enters an expressing involving PARAMETER names/LOCAL VARIABLES/GLOBAL VARIABLES/PLANT DATA BASE variables/numbers boolean constants/string constants operators (lit, sin, ln, etc.). This is inserted into the current argument.
Notes:
(a) Keyboard used to form expression
(b) A "Plant data base variable" is a variable name which has not been defined as a PARAMETER name, LOCAL VARIABLE or GLOBAL VARIABLE.
Text Window Output
e.g.: before: Move to X = 18, Y = 20
expression generated: 42+8*Name
after: Move to X = [18]42+8*Name, Y = 20
(default value shown in square brackets)

(9) Un-PARAMETERIZE Argument
Function: Everything in the current argument is deleted, except for the default (shown in square brackets). This is the exact opposite of the "PARAMETERIZE argument" command.
Text Window Output:
e.g.: Move to X = [18]42+8*Name, Y = 20
Move to X = 18, Y = 20

(10) Change Display Mode
Function: This command is a toggle. If the program is in "Draw All" mode, it is changed to "Draw Up to Current Command" mode and vice versa. The screen is redrawn in the new mode.
Notes:
(a) "Draw All" mode means that the screen echoes the complete DISPLAY FILE being edited. In "Draw all" mode, the entire DISPLAY FILE is redrawn each time the current command is modified.
(b) "Draw Up to Current Command" mode means that the screen only echoes everything up to, and including, the current command.
(c) The "Change Display Mode" button is labeled such that it is obvious which mode is currently in operation.
Text Window Output:
(not applicable)

Move and Draw Menu

The move and draw menu presents the following function buttons:

(1) Move absolute
(2) Move Relative
(3) Draw Line
(4) Draw Box
(5) Start Polygon Fill (6) End Polygon Fill
(7) Draw Arc by Three Points
(8) Return to main menu
(9) Help The buttons presented solely by the move and draw menu perform the functions and/or generate the display language commands set forth in Table 9.

TABLE 9

(1) Move Absolute
Function: The user digitizes a point on the screen which then becomes the new "Current Position".
Notes:
(a) Digitizer menu used to get X, Y coordinates.
Text Window Output:
Mode to X = (integer), Y = (integer)

(2) Move Relative
Function: The user digitizes a point on the screen relative to the current position. The latter is updated to the new point.
Notes:
(a) Digitizer menu used to get X/Y coordinates
Text Window Output:
Move by dX = (integer), dY = (integer)

(3) Draw Line
Function: A line is drawn from the current position to a point digitized on the screen. The new point then becomes the current position.
Notes:
(a) Digitizer menu used to get X, Y coordinates.
(b) While the digitizer menu is being used, a line oscillates between the current position and the point being defined.
(c) Lines are drawn relative to the current position and not to absolute points on the screen.
(d) The line is drawn using the current foreground color.
Text Window Output:
Draw Line, dX = (integer), dY = (integer)

(4) Draw Box
Function: A point is digitized on the screen, and a rectangle is drawn such that the current position and newly digitized point are at diagonally opposite corners. The new point becomes the current position.
Notes:
(a) Digitizer menu used to get X, Y coordinates.
(b) While the digitizer menu is in operation a rectangle oscillates between the current position and the point being defined.
The rectangle outline is drawn in current foreground color.
Text Window Output:
Draw Box, width = (integer), height = (integer)

(5) Start Polygon Fill
Function: This inserts a command, with no arguments, into the display file. From this point on, it is assumed that the user is defining a polygon outline using lines, arcs, boxes, circles, etc., which are to filled in the current foreground color.
Text Window Output:
Start Polygon Fill (6) End Polygon Fill
Function: This inserts a command, with no arguments, into the display file. The shapes defined since the last "Start Polygon Fill" command are now filled with the current foreground color.
Text Window Output:
End Polygon (7) Draw Arc By Three Points
Function: The user digitizes an end point and an intermediate-point. A circular arc is then drawn from the current position such that it passes through the intermediate-point and terminates at the end point.
Notes:
(a) Digitizer menu used to get and point.
(b) Digitizer menu used to get intermediate point.
(c) While the digitizer menu is being used to get the end point, a line oscillates between the current position and the currently digitized point.

TABLE 9-continued (d) While the digitizer menu is being used to get an intermediate point, an arc oscillates through the current position, currently digitized point, and the end point.
(e) The arc is drawn in the current foreground color.
Text Window Output:
Arc, dX = (integer), dY = (integer) through dX = (integer), dY = (integer)

Character Functions Menu

The character functions menu presents the following function buttons:

(1) Write
(2) Write Symbol
(3) Write Integer
(4) Write Scientific
(5) Write Real
(6) Set Text margins
(7) Set character spacing
(8) Select text library
(9) Select symbol library
(10) Edit character library
(11) Return to main menu
(12) Help A standard text library is provided that defines the fonts for a standard ASCII set (95 upper and lower case characters) in a 6×8 cell.

Two standard sizes of characters are provided; namely, 6×8 and 6×6 dot matrices (with a 48 character set).

Custom character set:

A custom character set is supported. The custom character set is user definable within designer mode. Both the custom and the standard ASCII character sets may be used in a display at one time. Custom character font size is 8×10 but may also be used in 5×7 or 6×8 sizes.

Special Symbols:

A set of user defined special symbols is supported. Special user defined symbols typically include valves, relays, pipes, pumps, etc. Symbol font size is 8×10 or smaller.

The text drawing capabilities of the man-machine interface are set forth in Table 10.

TABLE 10

(1) 95 upper and lower case ASCII characters (6×8 grid) from the standard text library.
(2) Alternate character sets containing user definable characters.
(3) 48 upper case characters in 6×6 grid.
(4) 128 user definable special symbols (8×10).
(5) Variable character spacing.
(6) Variable line spacing - up to 38 (6×8), 51 (6×6) or 31 (8×10) lines per screen.
(7) Text scrolling by variable line space within software defined margins.
(8) Precision placement of characters at any dot. The current cursor position corresponds to the lower left hand corner of a character written to this position.
(9) Full control of text cursor.
(10) Rotation of graphic drawing environment 90 degrees, 180 degrees, and 270 degrees to support horizontal and vertical bar graphs and other similar features.
(11) Text overwrite, foreground can be written over graphics.
(12) Text magnification of X2 and X4, which also affects line spacing and character spacing.

The buttons presented solely by the character functions menu perform the functions and/or generate the display language commands as set forth in Table 11.

TABLE 11

(1) Write
Function: The user enters an expression via the keyboard. This is converted to a stream of characters and output on the screen at the current position using the current text library. The current position is updated to the next available position.
Notes:
(a) Keyboard used to get expression.
Text Window Output
Write (expression)

(2) Write Symbol
Function: The designer selects an entry from the current symbol library and it is drawn at the current position. The current position is updated.
Notes:
(a) Symbols menu used to select entry and to select normal, X2, X4 magnification.
(b) The integer shown in the text window refers to the entry number in the symbol library which is in operation at the time.
Text Window Output
Write symbol number (integer)

(3) Write Integer
Function: The user enters an expression and field width via the keyboard. The value of the expression is rounded to the nearest integer and output at the current position, which is updated. Alternatively, it is put at the end of the string. The field width defines how many characters are to be output.
Notes:
(a) Keyboard used to get expression
(b) Keyboard used to get field width
Text Window Output
Write integer (expression), field width (integer)

(4) Write Scientific
Function: The user enters three items of information via the keyboard:
(a) an expression,
(b) the total number of characters to be output, and
(c) the number of characters before the decimal point.
The value of the expression is output in scientific notation, starting at the current position. The latter is updated accordingly;
i.e., expression value = 8.765,
total number of characters set to 10,
number of characters before point set to 2,
output => "87.65E-1"
Notes:
(a) Keyboard used to get expression,
(b) Keyboard used to get number of characters.
(c) Keyboard used to get number of characters before the decimal point.
Text Window Output
Write scientific (expression), number of characters (integer), number of characters before point (integer)

(5) Write real
Function: The user enters three items of information via the keyboard:
(a) an expression,
(b) total number of characters to be output, and
(c) number of characters before the decimal point.
The value of the expression is output as a real number, starting at the current position. The latter is updated to the end of the string.
e.g., expression value = 8.765,
total number of characters = 10,
output => "8.765".
Notes:
(a) Keyboard used to get expression.
(b) Keyboard used to get number of characters.
(c) Keyboard used to get number of characters before decimal point.
Text window output TABLE 11-continued Write real (expression), number of characters (integer), number of characters before point (integer).

(6) Set Text Margins
Functions: The designer enters a point on the screen. A rectangle is then drawn such that the current position and the newly digitized point are at diagonally opposite corners. The rectangle defines a scrolling buffer area for subsequent textual output (not symbols).
Notes:
(a) Digitizer menu used to get X/Y coordinates.
(b) While the digitizer menu is being used, a rectangle oscillates between the current position and the point being defined.
(c) The rectangle is drawn with a dotted line and is merely to aid the designer. It does not exist in operator mode, so the user must include his/her own "Draw box" command if desired in operator mode.
Text window output:
Text Margins, width = (integer), height = (integer).

(7) Set Character Spacing
Function: The designer sets the vertical and horizontal spacing between characters. This is measured in pixels.
Notes:
(a) Keyboard used to get horizontal spacing.
(b) Keyboard used to get vertical spacing.
(c) All characters are defined in an 8×10 grid of pixels. The spacings are defined from the bottom left pixel of one character to the bottom left pixel of the next (horizontally and vertically).
(d) If character spacing is set symmetrically, rotated characters are not distorted.
Text window output:
Character spacing, horizontal = (integer), vertical = (integer)

(8) Select Text Library
Function: The designer selects one of the four available text libraries to be the current text library.
Notes:
(a) Keyboard used to get number 0 . . . 3.
(b) Only library 0 may be loaded with a text library file. Libraries 1, 2 and 3 provide different character size fonts which may not be altered.
Text widow output:
Select Text Library "(integer)".

(9) Select Symbol Library
Function: The designer selects one of the two available symbol libraries to be the current symbol library.
Notes:
(a) Keyboard used to get 0 or 1.
(b) Buttons "2" and "3" suppressed in library number menu.
Text window output:
Select symbol library (integer).

(10) Edit Character Library
Function: Jumps to the character library editor menu.
Notes:
(a) Character library editor menu presented - the designer may return directly to the main menu when he/she has finished editing the character library file.
(b) A description of the facilities available in the character library editor is described later.
Text window output:
(not applicable)

In addition to the write commands described above, the character functions menu presents read commands to enable real, integer, boolean and character string data to be read from disk files. Real data may be read in either scientific or integer notation.

Plots and Trends Menu

The plots and trends menu presents the following function buttons:

(1) Set bar width
(2) Define chart height
(3) Define trend area (4) Define scale
(5) Draw bar
(6) Draw point
(7) Next
(8) Return to main menu
(9) Help "%" Conversion Operator This is a unary operator in display language which converts a number in engineering units to a number in screen units. The conversion is done according to the following formula:

% y=(y−lower)/(upper−lower) * chart_height

WHERE:
lower, upper=a chart's lower and upper engineering unit's values respectively, chart_height=chart height in screen units (pixels),
x=an engineering unit's value,
%y=value of y in screen units (pixels), This conversion operator is normally used on the height argument of a bar or point but may be used in arguments to other commands as well; thereby permitting more sophisticated scaled drawings.

Ticksize Function

This function may be used in a numeric expression in display language. It yields the following real value:

(upper−Lower)/number_of_intervals

The purpose of this function is to permit placing things like tick marks and labels on the screen at places which are significant in terms of engineering units.

Trend Graphs

All of the following trend capabilities are implemented via custom displays. A trend is a graphical representation of data corresponding to that written with a pen on paper as the paper moves.

A trend may be in one of two formats: either a bar or a point chart. Bar charts are by far the most readable. Each unique item trended can be linked to a different color.

A chart may have a threshold value associated with each data point. Whenever that threshold value is exceeded, another color specified by the designer is utilized. Trends may move in any perpendicular direction (e.g., up, down, left, right) but typically move from right to left.

Each point chart may have at most six scales, three on each side. These scales may be represented in floating point. Each point chart may trend the values of between one and six variables.

Bar charts can have a maximum of 2 data points plotted per chart. Bar charts may have a color linked to a value, so that the color of a bar varies with its height. A third color is also mapped for any overlap regions.

The buttons presented solely by the plots and trends menu and used to operate display language commands are described in Table 12.

TABLE 12

(1) Set Bar Width
Function: Touching this button generates a display language command, that, when interpreted in operator mode, defines the width of subsequent bars and points to be drawn in screen units.

TABLE 12-continued

Notes:
(a) Digitizer menu used to define bar width.
(b) While the digitizer menu is being used, a horizontal line oscillates between the X coordinates of the current position and the point being defined.
Text window output:
Set Bar Width = (integer).

(2) Define Chart Height
Function: Touching this button generates a display language command, that, when interpreted in operator mode, informs the graphics software that the current chart lower limit is at the current cursor position and that the current chart height is chart-height screen units high. If chart-height is negative, the chart limits extend downward from the cursor instead of upward.
Notes:
(a) Digitizer menu used to define chart-height.
(b) While the digitizer menu is being used, a vertical line oscillates between the current position and the point being defined.
Text window output:
Define chart height, high = (real)

(3) Define Trend Area,
Function: The user defines a rectangle on the screen which is later used for trending.
Notes:
(a) Digitizer menu used to define rectangle.
(b) While the digitizer menu is in operation, a rectangle oscillates between the current position and the point being defined.
(c) The "width" and "height" are in screen units.
(d) The current position is automatically moved to a position exactly one bar width to the left of the right trend boundary line. This leaves the cursor in a position for drawing bars and points at the right hand end of the trend area.
Text window output
Define trend area, width = (integer), height = (integer)

(4) Define Scale
Function: Touching this button generates a display language command that, when interpreted in operator mode, informs the graphics software of the lower and upper chart limits in engineering units.
Notes:
(a) Keyboard used to get lower chart limit.
(b) Keyboard used to get upper chart limit.
Text window output:
Define scale, low = (real), high = (real)

(5) Draw Bar
Function: Touching this button generates a display language command that when interpreted in operator mode, causes a bar of a color and a screen unit's height defined by the command's arguments to be drawn on the screen at the current bar width. The bar's lower left corner is the current cursor location.
Notes:
(a) Digitizer menu used to define bar height.
(b) While the digitizer menu is being used, a bar oscillates between the current position and the point being digitized.
(c) Select color from palette menu used to get desired bar color.
Text window output:
Draw bar, color = (code), height = (integer)

(6) Draw Point
Function: Touching this button has the identical effect as touching the draw bar button except that only the top scan line of the bar is drawn when the generated display language command is interpreted in the operator mode.
Notes:
(a) Digitizer menu used to define height.
(b) While the digitizer menu is being used, a bar oscillates between the current position and the point being digitized.
(c) Select color from palette menu used to get desired top scan line color.
Text window output:

TABLE 12-continued (not specified)
(7) Next
Function: Touching this button generates a display language command that, when interpreted in operator mode, causes one of two possible behaviors depending on which has occurred more recently within the current subpicture, a define-chart or define-trend command.
(1) If a define-chart command is more recent, then the cursor moves to the right a distance equal to the current barwidth. It does not cause the bar to be cleared to background color, since that puts artificial constraints on the bar chart background, and it also slows the clearing of the chart area.
(2) If a define-trend command is the more recent command, then:
(a) If moving the cursor right by 2* barwidth moves it outside the trend rectangle, then the cursor is not moved, rather the trend rectangle is shifted left by the barwidth, filling with color from the right most pixel on each scan line.
(b) Otherwise, since the cursor is inside the trend rectangle, it is moved to the right by the current barwidth.
Text window output:
(not specified)
(8) Define Trend
Function: Touching this button generates a display language command, that when interpreted in operator mode, informs the graphics software that an ambient trend rectangle of a specified height and width has its lower left corner at the current cursor position; and causes the cursor to move to the right by the amount of trend-rectangle-width-barwidth-1, in screen units. This leaves the cursor in a position for drawing bars and points at the right hand end of the trend rectangle. Such bars and points do not overlap the rightmost pixel of the rectangle, which is used as a source of background color during subsequent shifting.
Text window output:
(not specified)

Utility Menu

The utility menu presents the following function buttons:

(1) Suppress/select text window shown
(2) Suppress/select user grid shown
(3) Suppress/select oscillation coordinates shown
(4) Suppress/select current palette number shown
(5) Static/Dynamic mode
(6) Re-define origin
(7) Set line type
(8) Move Text window
(9) Move menus
(10) Sound Klaxon
(11) Sound Beeper
(12) Set Beeper Frequency
(13) Set User Grid
(14) Return to main menu
(15) Help The buttons presented solely by the utility menu perform the functions and/or generate the display language commands as set forth in Table 13.

TABLE 13

(1) Suppress/select Text Window Shown
Function: This command is a toggle. If the text window is currently being shown, it is switched OFF. If it is not currently being shown, it is switched ON.
Notes:
(a) The text window is described above.

TABLE 13-continued

Text Window Output:
(not applicable)
(2) Suppress/select User Grid Shown
Function: This command is a toggle. If the user grid is currently being shown, it is switched OFF. If it is not currently. being shown, it is switched ON.
Notes:
(a) The user grid is shown as a set of fine and coarse crosshairs at regular intervals in both the horizontal and vertical directions. It is designed to help the user digitize coordinates.
Text Window Output:
(not applicable)
(3) Suppress/select Oscillator Coordinates shown
Function: This command is a toggle. If the oscillator coordinates are currently being shown, they are switched OFF. If they are not currently being shown, they are switched ON.
Notes:
(a) While the digitizer menu is in operation, the coordinates of the point being digitized can be displayed. This command allows the user to select or reject this facility.
Text window output:
(not applicable)
(4) Suppress/select Current Palette Number Shown
Function: This command is a toggle. If display of the document color palette number is currently enabled where applicable, its display is suppressed (i.e., it is not shown even when applicable). If display of the current color palette number is suppressed, the display is enabled where applicable.
Notes:
(a) When the select color from palette menu is being presented, the current color palette number is displayed provided its display is enabled.
Text Window Output:
(not applicable)
(5) Static/Dynamic Mode
Function: This command toggles the mode. The default mode is static; the alternate is dynamic.
Notes:
(a) Features drawn in dynamic mode are assumed to be affected by database variables. Hence, they are continually redrawn at a designated update cycle time. For example, the bars in a Bar Chart are drawn in Dynamic Mode since they are continually changing height.
(b) Features drawn in Static Mode are assumed to be unaffected by database variables. Their size and location are fixed, so they need only be drawn once. For example, the scale lettering on a Bar Chart are drawn in Static Mode.
Text Window Output:
Static mode selected or Dynamic mode selected. This command greatly facilitates graphic generation and real time updating of variable information.
(6) Re-define Origin Point
Function: The designer indicates a point on the screen. This is the origin point, or "handle", which is used to position the screen drawing if it is called as a subpicture.
Notes:
(a) Digitizer menu used to reposition origin.
(b) When the digitizer menu is first called up, the cursor lines are set to the current origin. If the designer merely wants to check where the origin has been defined, he/she can touch the quit button to leave it unaltered.
Text Window Output:
(not applicable)
(7) Set Line Type
Function: The designer defines how lines are to be drawn.
Notes:
(a) A display menu with the following selections is presented: Proportionally spaced dotted line (1 pel wide), solid line 1 pel wide, solid line 2 pels wide, solid line 3 pels wide, solid line 4 pels wide, solid line 5 pels wide, solid line 6 pels wide, solid line 7 pels wide and solid line 8 pels wide.

TABLE 13-continued

Text Window Output:
Set line type to (integer)
(8) Move TExt Window
Function: Allows a designer to reposition the text window to a different place on the screen. The designer digitizes a point and the window is moved such that its lower left corner is at the newly defined position.
Notes:
(a) Digitizer menu used to set X/Y coordinates.
Text Window Output:
(not applicable)
(9) Move menus
Function: Those menus which do not take up the whole screen may be moved such that they do not clash with the screen drawing.
Notes:
(a) The menus are only allowed in certain fixed positions on the screen. Each time this command is invoked, the menus move to the next allowable position.
Text window output:
(not applicable)
(10) Sound Klaxon
Function: Sound the Klaxon alarm for approximately one second.
Text window output:
Sound KLAXON
(11) Sound Beeper
Function: Causes the beeper to sound at the current beeper frequency (user definable) for approximately ½ second.
Text window output:
Sound Beeper
(12) Set Beeper Frequency
Function: The audio frequency of the beeper is defined in cycles per second (hertz)
Notes:
(a) Keyboard used to get frequency
Text window output:
Set Beeper Frequency = (integer) Hz
(13) Open Channel
Function: This command opens the selected device so that reads and writes can use it.
Notes:
(a) Keyboard used to input channel number
Text window output:
Open Channel (integer)
(14) Set User Grid
Function: The user selects the spacing (number of pixels per grid unit) between the grid lines used by the digitizer menu.
Notes: Gravity grid menu used to set spacing.
Text window output:
(not applicable)

Color Functions Menu

The color functions menu presents the following function buttons:

(1) Color Screen
(2) Fill Rectangle and Clear Rectangle
(3) Overwrite Color Entry
(4) Select Foreground Color
(5) Select Background Color
(6) Transparent Foreground Color
(7) Select Current Color Palette
(8) Color Defaults
(9) Edit Color Library
(10) Return to Main Menu
(11) Help
(12) Relocate Menu
(13) Relocate Text Window

Color Selection

At any given time, there may be up to 64 colors displayed on the screen simultaneously. As shown in FIG. 6, the colors are organized into four color palettes 124, 125, 126 and 127 containing 16 colors (entries 129) each. As shown in FIG. 7, the screen is divided into a 15×10 grid, each grid called a "zone" (e.g., zone 115). The color palettes are mapped to the grid, thus determining which color palette is used at a given screen position. A common use for this feature is to map the user's area of the screen to one color palette and the system's area of the screen to another color palette. The individual color palette entries are read by the hardware that controls the gun intensities.

Dynamic Symbols

Any symbol in any display can be made dynamic. If it is a discrete symbol (on/off) it can change color or shape with change in state; it also can change its position (in X and/or Y coordinates) and any of its dimensions. Examples include pumps, motors, valves, and pipes (lines). Similarly, analog signals can be used to change symbols. Examples include bar graphs, reservoir levels in tanks, etc.

The buttons presented solely by the color functions menu perform the functions and/or generate the display language commands as set forth in Table 14.

TABLE 14

(1) Color Screen
Function: The whole screen is cleared to the current background color.
Text window output:
Clear screen to current background color.
(2) Color Rectangle
Function: The designer indicates a point on the screen. A rectangle is thus defined such that the current position and the new point are at diagonally opposite corners. The rectangle is then filled with the current background color.
Notes:
(a) Digitizer menu used to get X/Y coordinates.
(b) While the digitizer menu is in operation, a rectangle oscillates between the current position and the point being defined.
Text window output:
Color Rectangle, height = (integer), width = (integer) to background.
(3) Overwrite Color Entry
Function: The user mixes a color pair and inserts them at some point in the current color palette. The original entry is lost, but the palette may be re-generated from the pertinent color library at any time. User must specify solid or blinking for each color.
Notes:
(a) Select color from palette menu used to get palette index (0 . . . 15).
(b) Mix a color menu used to get color code (0 . . . 511).
(c) Mix a color menu used to get second color code (1 . . . 511).
(d) Each entry in a color palette has two associated color codes. The video CPU module automatically switches periodically from one to the other-this is how a blinking color is achieved. A steady color is one in which both entries are the same.
(e) The mix a color menu (first call only) has a "Both" button which can be touched instead of the "Enter" button. This sets both entries at once and eliminates step (c).
(f) First integer in text window output refers to the palette number (0 . . . 3).
Text window output:
Set Palette (integer) entry (integer) to (2 × integer)
(4) Select Foreground Color
Function: The user picks one of the 16 entries in the current color palette. This becomes the current foreground color.
Notes:
(a) Select color from palette menu used to get a color code 0 . . . 15.

TABLE 14-continued

Text window output:
Select foreground color = (integer)
(5) Select Background Color
Function: The user picks one of the 16 entries in the current color palette. This becomes the current background color.
Notes:
(a) Select color from palette menu used to get a color code 0 . . . 15.
Text window output:
Select background color = (integer)
(6) Transparent Foreground Color
These colors are actually see-through colors. The user may select a transparent color at the expense of half the colors available to him. Example: If the user picks a translucent color of red, then no matter what the user draws over it, the color shows through as red. The user then only has eight other colors.
The possible combinations are:

| Show | Normal |
|---|---|
| 0 | 16 |
| 1 | 8 |
| 2 | 4 |
| 3 | 2 |

This all implies color priorities. If three show colors such as red, blue and green are wanted, and two normal colors such as white and yellow are added, then the color priorities are:
High > Red, Blue, Green
Low > White, Yellow
(7) Select Current Color Palette
Function: The user selects one of four color palettes, code 0 . . . 3.
Text Window Output:
Select current color palette = (integer)
(8) Color Defaults
Function: The default zone mappings and color palettes are selected.
Text window output:
Select Color Defaults
(9) Edit Color Library
Function: Jumps to the color library editor menu.
Notes:
(a) Color library editor menu reached - the user may return directly to the main menu when he/she has finished editing the color library files.
(b) A complete description of the available facilities in the color library editor is presented below.
Text window output:
(not applicable)

Subpictures Menu

The subpictures menu presents the following function buttons:

(1) Call subpicture
(2) Return from subpicture
(3) Start Side trip
(4) End Side trip
(5) Return to Main Menu
(6) Help Table 15 describes the buttons presented by the subpictures menu along with the functions and/or the display language commands generated.

TABLE 15

(1) Call subpicture
Function: The user specifies the name of a display file. The contents of the display file are then drawn at the current screen position. The user is requested to assign an expression for each parameter in the subpicture.
Notes:
(a) Keyboard used to get file name.
(b) Expression menu used to get an expression for each subpicture parameter.
(c) Digitizer menu used to get X/Y coordinates.
(d) The subpicture's origin is positioned over the digitized point.
Text Window Output:
Call "(name)", Args: (an expression for each parameter)
Call "(tankshape)", Args: Height* 18,3
(2) Return from subpicture
Function: The current subpicture is terminated and the program returns immediately to the calling subpicture.
Notes:
(a) If the subpicture does not contain one of these commands, the program automatically returns to the calling subpicture when the end of the subpicture is reached.
Text Window Output:
Return (from subpicture)
(3) Start Side Trip
Function: The present graphical state is set aside and can be resumed later (using an "End Side Trip" command). In this way, the user can temporarily change position, color, or other graphic parameter.
Text Window Output:
Start Side Trip.
(4) End Side Trip
Function: Resumes graphic state which was in operation before the last "Start Side Trip" command.
Text Window Output:
End Side Trip

Variables Menu

The variables menu presents the following function buttons:

(1) Create parameter
(2) Remove Parameter
(3) Create Local Variable
(4) Remove Local Variable
(5) Create Global Variable
(6) Remove Global Variable
(7) List Variables
(8) Return to Main Menu
(9) Help
(10) Relocate Menu
(11) Relocate Text Window Within a subpicture, parameters that are created in a calling subpicture, or in global variables and local variables, may be used as scalars or arrays of the type boolean, real or character string. The length of a character string is defined by its use.

The buttons presented by the variables menu perform the functions and/or generate the display language commands set forth in Table 16.

TABLE 16

(1) Create Parameter
Function: The designer enters a string of characters, and a parameter name is created. A parameter is an argument which is required when the display file is called as a subpicture.
Notes:
(a) Keyboard used to get character string.
Text window output: (not applicable)
(2) Remove Parameter
Function: An existing parameter name is removed from the list.
Notes:
(a) Keyboard used to get character string.
Text window output:
(not applicable)
(3) Create Variable
Function: The designer enters a string of characters and a variable (global variable by default, local variable when local variables are selected per item 5) is created.
Notes:
(a) Keyboard used to get character string TABLE 16-continued Text window output:
(not applicable)
(4) Remove Variable
Function: An existing variable is removed.
Notes:
(a) Keyboard used to get character string
Text window output:
(not applicable)
(5) Global/Local Variables
Function: This command toggles the variable creation type. The default variable creation type is global; the alternate is local. When global is the variable creation type, all subsequent create variable commands create global variables. When local variables are the variable creation type, all subsequent create variable commands create local variables.
Text Window Output:
(not applicable)
(6) List Variables
Function: The screen is cleared and the designer is given a complete list of all local variables, global variables and parameter names which have been defined in the current display file.
Notes:
(a) The screen has the following buttons while displaying the variable names:
- Next page (if all the names cannot be displayed on the screen at once)
- Previous page (if all the names cannot be displayed on the screen at once).
- Continue (return to edit functions menu).
(b) The parameter names, local variables and global variables are shown in different colors. This command is also available in the edit functions menu.
Text window output:
(not applicable)

Database Functions Menu

The database functions menu presents the following function buttons:
(1) Connect
(2) Disconnect
(3) Validate
(4) Invalidate
(5) Enable
(6) Disable The buttons presented by the database functions menu perform the functions and/or generate the display language commands set forth in Table 17.

TABLE 17

(1) Connect
Function: The user enters the name of a variable that is to be connected to its associated programmable controller (PC). When this command is executed in the operator mode, the variable is connected to the PC previously specified for the variable via the database editor menu set PC element number command. This causes the data acquisition package to begin updating/downloading the value of the variable from/to a PC.
Notes:
(a) Keyboard used to define variable name.
Text window output:
Disconnect (variabe name)
Connect (variable name)
(2) Disconnect
Function: The user enters the name of a variable that is to be disconnected from its associated PC. When this command is executed in the operator mode, the variable is disconnected from the PC previously specified for the variable via the database editor menu set programmable controller (PC) element number command. This causes the data acquisition package to stop TABLE 17-continued updating/downloading the value of the variable from/to a PC.
Notes:
(a) Keyboard used to define variable name.
Text window output:
(3) Validate
Function: The user enters the name of a variable whose value is to be validated. When this command is executed in the operator mode, the value of the variable is declared valid.
Notes:
(a) Keyboard used to define variable name.
Text window output:
Validate (variable name)
(4) Invalidate
Function: The user enters the name of a variable whose value is to be invalidated. When this command is executed in the operator mode, the value of the variable is declared invalid.
Notes:
(a) Keyboard used to define variable name
Text window output: Invalidate (variable name)
(5) Enable
Function: The user enters the name of a variable whose value is to be made write accessible. When this command is executed in the operator mode, modification of the value of the variable by an active display and the data acquisition package is enabled.
Notes:
(a) Keyboard used to define variable name.
Text Window output
Enable (variable name)
(6) Disable
Function: The user enters the name of a variable whose value is to be write protected. When this command is executed in the operator mode, modification of the value of the variable by an active display and the data acquisition package is disabled.
Notes:
(a) Keyboard used to define variable name.
Text window output:
Disable (variable name)

I/O Functions Menu

The I/O Functions Menu presents the following buttons:
(1) Open Stream
(2) Close Stream
(3) Select Stream
(4) Print DISPLAY
(5) PC Statistics
(6) Channel Statistics
(7) Message Statistics The buttons presented by the I/O functions menu perform the functions and/or generate the display language commands as set forth in Table 18.

TABLE 18

(1) Open Stream
Function: Touching this button generates a display language command that, when interpreted in operator mode, opens a character stream to an I/O device. The I/O device is referred to by its logical unit number.
(2) Close Steam
Function: Touching this button generates a display language command that, when interpreted in operator mode, closes the character stream to an I/O device.
(3) Select Stream
Function: Touching this button generates a display language command that, when interpreted in operator mode, selects a stream previously opened to an I/O device as the stream to which all read and write commands currently apply.

TABLE 18-continued

| |
|---|
| The I/O device is referred to by its logical unit number. |
| (4) Print Display<br>Function: Touching this button generates a display language command that, when interpreted in operator mode, causes the current contents of a particular touch station's screen to be frozen, printed on a specified output device and then unfrozen and the touch station's printer start contact to be closed as required for a hard copy printer (such as Tektronix Corportion's hard copy printer) to print the image. The touch station screen and the output device are referred to by their respective logical unit numbers. |
| (5) PC Staticitics<br>Function: Touching this button generates a display language command that, when interpreted in operator mode, retrieves the messages sent and the messages retrieved for a specific programmable controller on the communications system network. |
| (6) Channel Statistics<br>Function: Touching this button generates a display language command that, when interpreted in operator mode, retrieves the total messages sent and total messages retrieved for a specific communications system channel. |
| (7) Message Statics<br>Function: Touching this button generates a display language command that, when interpreted in operator mode, retrieves the total messages sent and total messages retrieved by the data acquisition package. |

The relationship between logical unit numbers and physical devices is fixed; that is, a particular logical unit number always refers to a specific physical device. Operator capability to reroute an I/O stream from one I/O device to another I/O device can be implemented via a display that: (1) opens a stream to each of the potential I/O devices; (2) selects the stream to which all read and write commands currently apply via a select stream command having a parameterized logical unit number; and (3) enables the operator to modify the value of the parameterized logical unit number.

Character Library Editor

The character library editor is a program that enables a designer to create, select, delete, and modify character libraries.

The character library editor program is invoked by touching the edit character library button on the character functions menu, as described earlier.

The character library editor menu presents the following function buttons:

(1) Create character library file
(2) Select character library file
(3) Delete character library file
(4) Edit character library
(5) Copy character library file
(6) Exit
(7) Help
(8) Relocate menu The buttons presented by the character library editor menu perform the functions set forth in Table 19.

TABLE 19

| |
|---|
| (1) Create Character Library File<br>Function: Creates an empty character library file which becomes the file currently being edited.<br>Notes:<br>(a) Keyboard used to get file name.<br>(b) The library file which was previously being edited is first copied to permanent storage.<br>(c) The character entries are initially set to blanks (all 8 × 10 pixels are unmarked). |
| (2) Select Character Library File<br>Function: Selects a character library file from those that are available.<br>Notes:<br>(a) Keyboard used to get file name. |
| (3) Delete Character Library File<br>Function: Removes a specified character library file from storage. |
| (4) Edit Character<br>Function: The user chooses one of the character entries in the current file, and changes its shape interactively.<br>Notes:<br>(a) Symbols menu used to get character position in file (0 . . . 127).<br>(b) Define special character menu used to alter character shape. |
| (5) Character Library File<br>Function: The designer enters the name of an existing character library file and its respective directory and the name of a new character library file in the current directory to which the existing character library file is immediately copied. |
| (6) Exit (Present Designer Editor Main Menu)<br>Function: The character library file currently being edited is copied to permanent storage. The design editor main menu is then presented. |

Color Library Editor

The color library editor is a program that enables a designer to create, select, delete and modify color libraries.

The color library editor program is invoked by touching the edit color library button on the color functions menu, as described earlier.

The color library editor menu presents the following function buttons:

(1) Create Color Library File
(2) Select Color Library File
(3) Delete Color Library File
(4) Copy Color Library File
(5) Change Palette Number
(6) Modify Palette Entry
(7) Change Zone Map
(8) Exit
(9) Help The buttons presented by the color library editor menu perform the functions set forth in Table 20.

TABLE 20

| |
|---|
| (1) Create Color Library File<br>Function: Creates a new color library, setting the color palettes and zone map to the standard defaults.<br>Notes:<br>(a) Keyboard used to get file name.<br>(b) The display file which was previously being edited (if any) is first copied to permanent storage. |
| (2) Select Color Library File<br>Function: Selects a color library file from those that are available.<br>Notes:<br>(a) Color libraries menu used to get file name.<br>(b) The display file which was previously being edited (if any) is first copied to permanent storage. |
| (3) Delete Color Library File<br>Function: Removes a specified color library file from storage.<br>Notes:<br>(a) Color libraries menu used to get file name. |
| (4) Change Palette Number |

TABLE 20-continued

Function: The user chooses a new current color palette number (0 . . . 3).

Notes:

(a) Keyboard used to get number 0 . . . 3.

(5) Copy Color Library File

Function: The designer enters the name of an existing color library file in the current directory to which the existing color library file is immediately copied.

(6) Modify Current Palette

Function: The user creates color pair and then assigns them to a place in the current color palette.

Notes:

(a) Mix a color menu used to get color code (0 . . . 511).
(b) Mix a color menu used to get color code (0 . . . 511)
(c) Select color from palette menu used to get palette index (0 . . . 15).
(d) Each entry in a color palette has two associated color codes. The video CPU module automatically switches periodically from one to the other-this is how a blinking color is achieved. A steady color is one in which both entries are the same.
(e) The mix a color menu (first call only) has a "Both" button which can be selected instead of the "Enter" button. This sets both entries at once and eliminates item (b).

(7) Change Zone Map

Function: The user changes the zone-palette assignments in the display file currently being edited.

Steps:

(a) Zone mapping control menu used to define how the zone buttons responds to the user's touch.
(b) Zone mapping menu used to change zone-palette assignments as required.
(c) Item (b) is not necessary if the user elects to change all zones to the current palette number.

(8) Exit (Present Designer Editor Main Menu)

Function: The color library file currently being edited is copied to permanent storage. The designer editor main menu is then presented.

Designer Editor Function Menus

The menus described in this subsection are used to get a specific item of information from the user. When this is achieved, the secondary (main) menu which invoked the function menu is resumed.

Each function menu is also equipped with a "Quit" button which, when touched, aborts the current command action and immediately returns the program to the calling menu.

Digitizer menu

Information to be obtained: X/Y coordinates

Button Functions:

1 Up Arrow
2 Down Arrow
3 Left Arrow
4 Right Arrow
5 Enter
6 Keyboard Entry
7 Quit (return to main menu)

Notes:

(a) The ditigizer menu is used to define a point on the screen.

(b) A crosshair may be moved about the screen using one of four direction buttons shown on the menu. The buttons are shaped like arrowheads which point in the direction they control. The up-arrow, for example, causes the crosshair to move slowly towards the top of the screen until released. The rate at which the crosshair moves may be selected via a toggle button as either a default slow rate (1 grid unit/second). The number of pixels per grid unit is defined via the set user grid command on the utility menu.

(c) It is also possible to indicate the desired point by touching the screen directly. In this case, the crosshair jumps immediately to the point which was touched. The user generally employs the latter method to position the crosshair roughly in the right place and then uses the arrow buttons for fine adjustment.

(d) When the crosshair has been positioned satisfactorily, the enter button is pressed and the process is complete. Alternatively, the quit button may be selected. This aborts the command which called the digitizer menu and returns the user directly to the menu that requested the digitizer menu.

(e) The digitizer menu does not erase the drawing on the screen since the point to be defined is related to existing picture elements.

(f) Some commands which use this menu are arranged such that a geometric shape is redrawn continuously as the crosshair is moved. This is called oscillating. For example, the "draw box" command causes a rectangle to be drawn such that the current position and the point being digitized are at diagonally opposite corners.

(g) The keyboard entry button enables the user to enter coordinates via the keyboard instead of digitizing them graphically.

(h) The coordinates defined by the digitizer menu are displayed digitally in pixels on the screen. Coordinate (0,0) is the lower left hand corner of the screen.

Select Color From Palette Menu (FIG. 6).

Select Color From Palette Menu

Button Functions

1 Enter
2 Quit
3 A button for each color in palette (16).

Symbols Menu

Button Functions

1. A button for each library entry (128) containing:
   (a) index number and
   (b) character shape
2. Enter
3. Quit

Mix a Color Menu

Button Functions

1 "Set zone to"
2 "Toggle zones"
3 "Clear Whole Screen to"
4 Enter
5 Quit

Notes:

(a) "Set zone to" and "Toggle zones" set the operation mode of the zone buttons in the zone mapping menu.

(b) "Clear Whole Screen to" is used to set every zone to the current palette number.

Zone Mapping Menu

Button Functions:

1. A button for each Zone *15×10)
2. Enter

Notes:

(a) The zone buttons react depending upon the zone mapping control buttons which are in operation.

"Set Zone to"

Each zone button is set to the current palette number when pressed.

"Toggle Zones"

Each zone button increments its palette assignment by 1 each time it is pressed (module 3).

Define Special Character Menu

Button Functions:

1. A set of 8×10 continuous buttons representing the 80 pixels which make up a character.
2. Enter
3. Quit Notes:

(a) Each button is either marked or unmarked. The marked buttons are shown in a different color.
(b) The buttons toggle between marked and unmarked i.e., an unmarked button becomes marked when touched and vice versa.
(c) The user constructs his/her new character by marking the pixels he/she wishes to be illuminated.
(d) The character is shown alongside at true size for reference purposes.

Gravity Grid Menu

Button functions:

(1) Increase Horizontal Spacing
(2) Decrease Horizontal Spacing
(3) Increase Vertical Spacing
(4) Decrease Vertical Spacing
(5) Enter
(6) Quit Notes:

(a) Current horizontal/vertical spacing displayed as pixels.
(b) Grid lines move dynamically as spacing is altered.

Keyboard

Button functions:

(1) "hard" keyboard
(2) soft quit button
(3) soft enter button

Notes:

(a) The keyboard is used to get character strings, integers, real numbers, etc. A helpful prompt message on the screen is presented so that the user knows what kind of data is required.

CONFIGURATOR MODE

Introduction

The configurator mode enables configurers to configure templates.

The man-machine interface graphics software moves a particular control/display unit to the configurator mode from the mode selection mode when the mode selection menu appears on the unit's screen and the configure button is touched.

The man-machine interface configurator mode provides the following menus to support configuration of templates:

(1) Object selection menu
(2) Directory options menu
(3) Configurator mode main menu
(4) Configurator menu
(5) Database editor menu The object selection menu enables a configurer to address complete directories via the directory options menu or to address individual templates, displays and subpictures in a particular directory via the configurator mode main menu.

The directory options menu enables a configurer to select, create and delete individual directories and to list the names of all directories.

The configurator mode main menu enables a configurer to delete and copy templates, displays and subpictures within a particular directory, to list the names of templates, displays and subpictures within a particular directory, and to request editing of the plant data base.

When a configurer requests either configuration of a specific template, display or subpicture, or editing of the plant data base, via the configurator mode main menu, the graphics software supports the request via the configurator editor program, described above.

When a configurer requests configuration of a specific template, display or subpicture via the configurator mode main menu, the configurator menu is presented.

When a configurer requests editing of the plant data base via the configurator mode main menu, the database editor menu is presented.

When a configurer requests editing of a database element definition in the plant data base via the database editor menu, the edit/coil register menu is presented.

Two of the designer editor function menus described above, the digitizer menu and the keyboard menu, are also accessed via the configurator menu whenever an item of information obtained through the digitizer or keyboard menu is required by an option selected on the configurator or database editor menu.

Configuration Sequence

The way a template is configured is highly dependent on how it was designed. For example, if a template has within it a subpicture of a control loop, there are various ways this part of the template could be configured depending on how it was designed. Examples of two extreme cases are as follows:

(1) The control loop subpicture was designed to require the parameters setpoint high, low, and temperature to exist. During configuration all of these parameters would need to be completely specified; e.g., the setpoint may require the mnemonic PLANT1.SYSTEM4.PC6.T101.SETPOINT to completely specify it to the plant data base. Additionally, each of the other parameters would in turn require a complete mnemonic.
(2) The same control loop subpicture was designed so that each of its variablized elements had the form X. setpoint,X.hi, X.low, and X.temperature. The subpicture also has "X" as a parameter to it. On configuration, this template would now first prompt the user for the value of X alone, which could be specified as PLANT1. SYSTEM4.PC6.T101. Now, each additional parameter can be specified as just SETPOINT, HI, LOW, and TEMP. The use of such parameters (the definition of "X" and its use as a partial specifier for unique setpoints) greatly facilitates setpoint definition.

This latter aspect whows the present invention's implementation of hierarchical variables. That is once a parameter such as "X" is defined, parameters which follow "X" can be accessed by their particular name (e.g. TEMP) without the necessity of specifying all parameters in the tree above it (that is, all parameters defined by "X").

The above examples suggest that a template may be arbitrarily complicated or easy to configure depending on how cleverly it is designed. Therefore, to insure consistency within configurator mode, guidelines for designing templates have been established. Parameters have no types: The data value for a parameter may be any of the following types: directory name, display name, real number constant, integer constant, logical value constant, plant data base mnemonic (or part of one; as above), string constant, color, or palette name.

There is no type checking whenever parameters are specified. Type conversion is performed automatically by the interpreter when possible. This facilitates configuration since the user need not concern himself/herself with the data types for the variable. A typical template may have many subpictures, each requiring parameters similar to the example above. The configurator menu aids the configurer in naming these parameters by "walking" him/her through the template, subpicture by subpicture, parameter by parameter, asking for a value or mnemonic for each parameter. Again, the order in which the walk through occurs depends on how the template was designed.

Configurator Mode Main Menu

The configurator mode main menu presents the following buttons:

(1) delete subpicture
(2) copy subpicture
(3) list subpicture
(4) configure subpicture
(5) edit plant data base
(6) Configure communication system (e.g. bus 44 shown in FIG. 1)
(7) help
(8) select mode
(9) select object Touching the delete subpicture button enables a configurer to enter, via the keyboard, the name of a subpicture that is immediately deleted after confirmation.

Touching the copy subpicture button enables a configurer to enter, via the keyboard, the name of an existing subpicture and the name of a new subpicture to which the existing subpicture is immediately copied.

Touching the list subpicture button causes the names of all displays, subpictures and templates in the current directory to be listed on the screen.

Touching the configure subpicture button enables a configurer to enter, via the keyboard, the name of a file containing display language commands which are to be configured or re-configured. As soon as the file name is entered, the configurator menu is presented, enabling the configurer to configure or re-configure the entered file.

Touching the edit plant data base button causes the database editor menu to be presented, enabling the configurer to define or maintain the plant data base.

Touching the configure communications system button causes the configure communications system menu to be presented, enabling the configurer to change the default values of the communication interface parameters (e.g., baud rate, parity, stop bit) so as to match programmable controller (PC) parameters.

Touching the select mode button moves the particular touch station from the configurator mode to the mode selection mode, causing the mode selection menu to be presented.

Touching the select object button causes the object selection menu to be presented.

Configurator Editor Program

The configurator editor is a program that performs five functions:

(1) It locates undefined variables in a subpicture, enables the configurer to name a data point in the plant data base to be associated with each such undefined variable and installs each newly named data point in the plant data base when the subpicture is installed,
(2) It checks to ensure that every file name quoted in control transfer commands (i.e., CHAIN TO, spawn, etc.) actually refers to an existing display file,
(3) It enables the configurer to define and maintain the plant data base,
(4) It enables the configurer to specify the initial user application display task that begins running for a particular control/display unit when startup of the particular unit is successful, and
(5) It changes the default values of the communication interface parameters (baud rate, parity, stop bit) to match PC parameters.

Functions 1, 2, and 4 are supported via the configurator menu. Function 3 is supported via the database editor menu.

The configurator editor program is compatible with both the procedure oriented design method and the object oriented design method supported by the designer editor program.

Figure 11B:
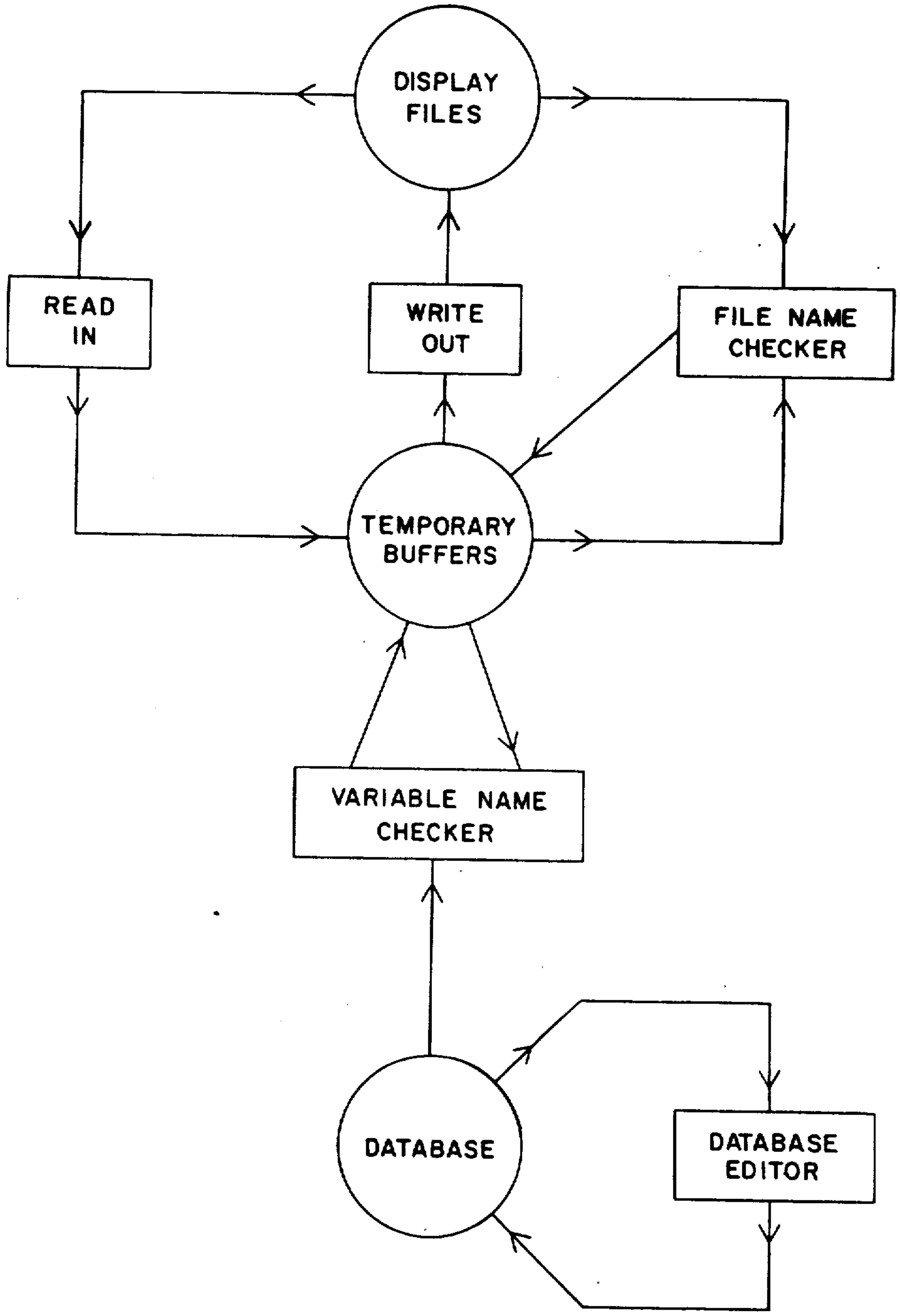
FIG. 11B is a diagrammatic representation of the configurator editor used for implementing graphic displays.

FIG. 11B illustrates the structure chart of the configurator editor.

Configurator Menu

The configurator menu presents the following buttons:

(1) Suppress/Select Text Window
(2) Move Text Window
(3) Move Menus
(4) Single Step
(5) Backstep
(6) Go to Start
(7) Go to End
(8) Step to Next Undeclared Variable
(9) Step to Next Name
(10) Confirm Current Name
(11) Change Current Name
(12) Change Display Mode
(13) Specify Initial Display Task
(14) Memory/disk resident display file
(15) Return to Main Menu
(16) Help
(17) Print The configurator menu is presented with a graphic representation of the current display file and an optional text window in the same manner as a secondary designer editor menu is presented.

The buttons presented by the configurator menu function are set forth in Table 21.

TABLE 21

| |
|---|
| (1) Suppress/Select Text Window |

TABLE 21-continued

This button is a toggle. If the text window is currently being displayed, it is removed. If it is not being displayed, it is immediately generated.

(2) Move Text Window
The configurer may reposition the text window such that it does not interfere with the display file drawing. The configurer indicates a point on the screen using the digitizer menu. The text window is then redrawn such that its bottom left corner is at the newly defined position.

(3) Move Menus
Menus which are used in conjuntion with the display file drawing (e.g., configurator menu, etc.), may be moved about the screen to certain fixed positions. Each time this button is touched, the menus move to the next allowable position.

(4) Single Step
The next command in the display file becomes the current command and the screen is redrawn.

(5) Backstep
The previous command in the display file becomes the current command and the screen is redrawn.

(6) Go to Start
The first command in the display file becomes the current command and the screen is redrawn.

(7) Go to End
The last command in the display file becomes the current command and the screen is redrawn.

(8) Step to Next Undefined Name
The configurator editor steps through the display file until it comes to an undefined variable name or file name. The new variable or file name becomes the current name and the screen is redrawn.

(9) Step to Next Name
The configurator editor steps through the display file until it comes to a variable name or file name. The new variable name or file name becomes the current name and the screen is redrawn.

(10) Confirm Current Name
The current name is checked to see if it exists (as a file or database entry). If it exists, it is marked as defined. All names are initially undefined so that the configurer cannot accidentally use a temporary variable name which actually exists in the database.

(11) Change Current Name
The configurer types in a new file/variable name. This overwrites the current name in the display file.

(12) Change Display Mode
Function: This command is a toggle. If the program is in "Draw All" mode, it is changed to "Draw Up to Current Command" mode and vice versa. The screen is redrawn in the new mode.
Notes:
(a) "Draw All" mode means that the screen echos the complete display file being edited. In "Draw All" mode, the entire display file is redrawn each time the configurer defines a previously undefined variable or file name.
(b) "Draw Up to Current Command" mode means that the screen only echoes everything up to and including, the current command.
(c) The "Change Display Mode" button is labelled such that it is clean which mode is currently in operation.

(13) Specify Initial Display Task
The configurer identifies a particular video station and then types in the name of the initial user application display task that is to begin running for the particular video station when startup of the particular station is successful, as defined above.

(14) Memory/Disk Resident Display Task
Touching this button toggles the operator mode location (memory or disk) of the display task currently being configured. The default operator mode location, memory resident, is invoked each time the configurator mode is entered.

(15) Return to Main Menu
The configurator mode main menu is presented.

(16) Print
Touching the print button causes the contents of the file currently being configured to be printed on an interconnected hard copy device (such as printer 58 shown in FIG. 1).

Database Editor Menu

The database editor menu presents the following buttons:

(1) Create Database
(2) Remove Database
(3) Select Database
(4) Create Branch
(5) Delete Branch
(6) Copy
(7) List
(8) List and Tract
(9) Create Shorthand Sring
(10) Remove Shorthand String
(11) List Shorthand String
(12) Create Coil
(13) Create Register
(14) Edit Database Element
(15) Return to Main Menu
(16) Help
(17) Print The buttons presented by the database editor menu function are set forth in Table 22.

TABLE 22

(1) <u>Create Database</u>
By default there are three database names in existence; /SYS/ /DB0/ and /DB1/. The user may create his/her own database names by typing a text string via the keyboard.

(2) <u>Remove Database</u>
The user may delete a selected database name (and any associated data) by typing in the appropriate name via the keyboard.

(3) <u>Select Database</u>
The user types in a database name via the keyboard (e.g., /BOBSDATA/). From this point it is assumed that any reference to database is under this name (e.g. /BOBSDATA/VALVE is equivalent to simply VALVE). It should be noted that the /SYS/ database cannot be deleted. The user may still address data in other databases by including the appropriate prefix; e.g., /SYS/DAY.

(4) <u>Create Branch</u>
The database is hierarchical in nature, which means that data elements may be logically grouped together using a common "Branch" name. This may be visualized as a tree structure:

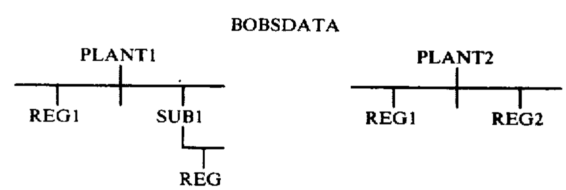

There are four addressable data elements in this example; namely:
/BOBSDATA/PLANT1.REG1
/BOBSDATA/PLANT1.SUB1.REG
/BOBSDATA/PLANT2.REG1
and /BOBSDATA/PLANT2.REG2
PLANT1, SUB1 and PLANT2 are called Branches because they are not data as such, but merely naming conventions to group the elements together. The user creates a Branch by typing in the name from the top of the data structure, and separating the Branches by periods ("."). Note that the database reference may be omitted if it is the current database.

(5) <u>Delete Branch</u>

TABLE 22-continued

A selected Branch and all associated data may be removed. The user enters the required name via the keyboard.

(6) Copy

This facility allows the user to copy the data associated with one Branch into the data structure of another. The user enters the two Branch names via the keyboard. An example is given below:

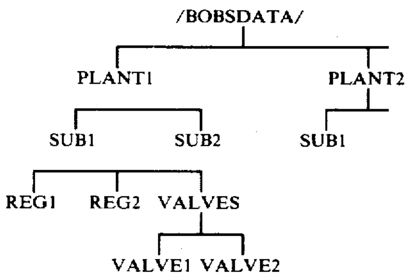

If the user copies PLANT1. SUB2 to PLANT2, the result would be:

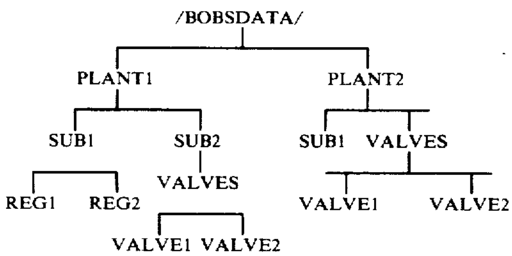

(7) List

The branches/elements associated with a particular branch are listed on the screen. The user enters the branch name via the keyboard. Assuming the database example given in item (6) above, and branch name "/BOBSDATA/PLANT1", the program outputs:
SUB1
SUB2
which are the names on the next level in the tree down from the given branch.

(8) List and Trace

This command is similar to the "List" command, except that everything directly below the branch name is output. Assuming the database given in item (6) and the branch name "/BOBSDATA/PLANT1" the program outputs:

```
SUB1
  REG1
  REG2
SUB2
  VALVES
    VALVE1
    VALVE2
```

Note that the lower level names are indented to show how far down the tree they are from the branch.

(9) Create Shorthand String

The user types in a codestring and a database reference via the keyboard. Whenever the code string is used in the future, prefixed by a "%" symbol, the database reference is assumed; e.g., given that:

Code String = "Z", reference = "PLANT1. SUB6"
Code String = "R", reference = "REGISTER"

then the following terms are identical:

(a) PLANT1.SUB6.PC34.REGISTER
(b) %Z.PC34.REGISTER and
(c) %Z.PC34.%R

This facility reduces the amount of typing required by the user.

(10) Remove Shorthand String

The user types in a shorthand string via the keyboard. If a shorthand string exists with this name, it is deleted.

(11) List Shorthand Strings

The screen is cleared and each shorthand string name is listed; e.g.,

%V = PLANT6.VALVES.VALVE6
%D = /SYS/DAY

(12) Create Coil

The user types in a database name and a coil element is created. The various attributes associated with a coil are set to the default values and the Edit Coil/Register menu described above is presented. It should be noted that a coil entry in the database may also be used as a branch.

| Coil Default Values | |
|---|---|
| Value | false |
| Autolog | false |
| Enabled | true |
| Connected | false |
| Valid | true |
| Protection | 15 |

(13) Create Register

The user types in a database name, and a register element is created. The various attributes associated with a register are set to the default values, and the Edit Coil/Register menu described above is presented. A register entry in the database may also be used as a branch.

| Register Default Values: | |
|---|---|
| Value | = 0.0 |
| Span | = 1.0 |
| Zero | = 0.0 |
| Autolog | = false |
| Enabled | = true |
| Connected | = false |
| Valid | = true |
| Protection | = 15 |

(14) Edit Database Element

The user types in a database name via the keyboard. The Edit Coil/Register menu described above is presented. If the database name does not exist or is a branch, the user is given an error message and the command has no effect.

(15) Return to Main Menu

The configurator mode main menu is presented.

(16) Print

Touching the print button causes a description of the data base currently being edited to be printed on a hard copy device (such as printer 58 shown in FIG. 1).

Edit Coil/Register Menu

The Edit Coil/Register menu presents the following buttons:

(1) Set Protection
(2) Set/Unset Autolog
(3) Set/Unset Enabled
(4) Set/Unset Connected
(5) Set/Unset Valid
(6) Set PC Number
(7) Set PC Element Number
(8) Set Value
(9) Return to Database Editor Menu
(10) Help The buttons presented by the Edit Coil/Register menu function are set forth in Table 23.

TABLE 23

(1) Set Protection

Each user has an associad security level derived from the password used to gain access to the system. This is defined as a number in the range 0,1, and 2 where:

0 = no security rating (untrustworthy)
1 = low security rating
2 = high security rating (trustworthy)

The configurer may set the coil/register such that it may be read/altered only by users of a certain minimum security level. The codes are as follows:

TABLE 23-continued

0 = security of 2 needed to read/modify
1 = security of 1 to read, 2 to modify
3 = security of 1 to read or modify
5 = security of 2 to modify, anyone can read
7 = security of 1 to modify, anyone can read
15 = anyone can read or modify When the user presses the set protection button, a menu is presented that enables the user to select one of the six codes listed above and to return to the edit coil/register menu.

The default protection value is set to 15.

(2) Set/Unset Autolog

This is a toggle function - defaulted to OFF. When the button is touched, it causes the function to be switched ON. The button indicates the present state by color and legend. In operator mode, if the autolog facility is in operation, all changes to the value of the coil/register are automatically logged.

(3) Set/Unset Enabled

This is a toggle function - defaulted to OFF. When the button is touched, it causes the function to be switched ON. The button indicates the present state by color and legend. If the enabled switch is OFF, the coil/register is not connected to the system. All requests to change its value are ignored. The coil/register remains in the state it was in before it was disconnected, even though it may still be connected to a process controller or programmable controller.

(4) Set/Unset Connected

This is a toggle function - defaulted to OFF. When the button is touched, it causes the function to be switched ON. The button indicates the present state by color and legend. This field specifies if the coil/register is connected to a process controller. Once connected, the coil/register's value is automatically scanned. Operator changes are written to the process controller or programmable controller.

(5) Set/Unset Valid

This is a toggle function - defaulted to FALSE. When the button is touched, it causes the function to be switched to TRUE. The button indicates the present state by color and legend. This field is provided as an aid to the user. In certain calculations, a display may determine that the value of this coil/register is invalid; i.e., it is out of range or contradicts known conditions. Toggling this field to FALSE lets the user carry this knowledge through to other calculations which might rely upon this value.

(6) Set PC Number

This button bears the number of the process controller to which the coil/register is attached. When touched, the user is invited to enter a new number via the keyboard.

(7) Set PC Element Number

This button bears the (process controller or programmable controller) PC element number currently defined. When touched, the user is invited to enter a new number via the keyboard. Because each PC supports many registers/coils, there is a need for a PC Element Number.

(8) Set Value (a) Coil. The coil is a boolean - TRUE or FALSE. The button toggles between the two.
(b) Register. Each register stores a real number. The button shows the current setting. When pressed, the user is invited to enter a new value via the keyboard. If the register is called, for instance, REG, the user is provided with the ability to reference the engineering units (four characters) by REG. ENG. UNITS.

(9) Return to Database Editor Menu

The database editor menu described above is presented.

Configure Ports and Communications System Menu

Upon entering this menu, a port selection menu is first presented. After a port is selected, the configurer port menu is presented. This menu is used to configure all serial ports in the system and to assign ports to communications systems functions. The initial man-machine interface has three serial ports associated with the CPU module for interfacing with user equipment. The user configures each port's hardware characteristics and he assigns communications system functions to some of the ports. One or two ports of the three may be communications system master ports on which up to 32 PC's can be connected. Any of the ports (up to two initially) may be assigned to printers. Any one port may be assigned as a communications system slave. This port then accepts communications system commands from a host computer.

The configure communications system menu presents the following buttons:

(1) Display baud
(2) Display parity
(3) Display mode
(4) Display stop bit
(5) Set Baud
(6) Set Parity
(7) Set mode
(8) Set stop bit
(9) Return to main menu
(10) Help
(11) Communications system master
(12) Communications system slave
(13) Printer.

The buttons presented by the configure communications system are set forth in Table 24.

TABLE 24

(1) Display Baud

Touching this button causes the current baud rate of the communication interface to be displayed.

(2) Display Parity

Touching this button causes the parity of the communication interface to be displayed.

(3) Display Mode

Touching this button causes the mode (full or half duplex) to be displayed.

(4) Display Stop Bit

Touching this button causes the value of the communication interface stop bit to be displayed.

(5) Set Baud

Touching this button enables the configurer to enter the desired baud rate.

(6) Set Parity

Touching this button enables the configurer to enter the desired parity.

(7) Set Mode

Touching this button enables the configurer to specify full or half duplex.

(8) Set Stop Bits

Touching this button enables the configurer to enter a desired value for the stop bits.

Operator Mode

The operator mode enables operators to control and/or monitor an industrial plant by viewing images and touching buttons depicted on the screen by visible displays. The graphics software moves a particular video station to the operator mode under the following circumstances:

(1) when start up of the unit is successful, or
(2) from the mode selection mode when the mode selection menu appears on the unit's screen and the operate button is touched.

When a particular control/display unit enters the operator mode, the initial user application display task specified by the configurer via the configurator menu (configurator mode) begins running for the station at an intermediate priority. When a particular video station enters the operator mode and a configurer has not specified the initial user application display task, the operating system's executive level menu is presented and the operator mode is exited.

The initial user application display task and any other display tasks that run in the operator mode are user configured. Therefore, both the visible displays and invisible displays being interpreted at any given time for a particular video station that is in the operator mode are user selectable by one of the following two methods:

(1) Designing existing display file names into control transfer commands (CHAIN TO, spawn, etc.).

(2) Replacing undefined display file names in control transfer commands (CHAIN TO, spawn, etc.) with existing display file names via the configurator mode. This method is used to build up chains of standard displays.

When the operator mode is entered, all display files in the current directory, except those configured as operator mode disk resident, are brought into memory from disk.

A display file that has been configured as operator mode disk resident is only brought into memory when a spawn or chain command is executed that require the file be memory resident.

DATA ACQUISITION PACKAGE AND DATABASE MANAGER

Introduction

Programmable controllers of the present assignee can be connected on a common bus which has a low to medium speed centralized data communications system. In this centralized system, there is a single dedicated host computer and up to 32 remote programmable controllers. The system is capable of communications over a distance of 15,000 feet with limited distance modems or any distance over phone lines with modems.

In an installation where the man-machine interface 20 serves a network of programmable controllers, the acquisition and dissemination of data is done as follows:

(1) A data acquisition package connects the plant data base with the communications system network and operates asynchronously with respect to the remainder of the graphics software.

(2) In the operator mode, a database manager connects active display tasks with the plant data base and also facilitates communication between active display tasks.

The plant data base is the mechanism by which displays are linked with the user application. A typical application can be controlled via programmable controllers (PC's). Each PC contains a number of internal variables which can be read from or written to graphic displays. These PC internal variables come in two varieties; namely, coils and registers. Each coil or register is assigned a reference number. PC's are also assigned reference numbers so that in a multi-PC application, each PC coil or register can be uniquely specified with a programmable controller number and a register/coil number. The mechanism by which programmable controllers communicate with each other and with graphics is via the communications system.

The plant data base contains a reflection of the application's coils and registers. Displays read and write to the plant data base as though they were directly conversing with programmable controllers. The plant data base is continuously maintained to reflect the current state of the PC variables via the data acquisition package which communicates to the PC's.

Data Acquisition Package

The data acquisition package performs the following functions asynchronously with respect to the remainder of the graphics software:

(1) Periodic update of the values of all data points in the plant data base that serve as inputs to displays with the actual value of I/O points, coils and registers located in programmable controllers on the network.

(2) Transmission to the appropriate programmable controller coils and registers of the value of each data point in the plant data base that serves as an output from a display to a programmable controller output point, coil or register when and only when the value of such a data point is changed by an operator or a display.

(3) Periodic collection of communications and error statistics on the network and periodic collection of diagnostic information from each programmable controller in the network. This information is made available to displays via the PC stats, channel stats, and message stats functions supplied by the designer editor.

(4) Provision of means, in the plant data base, for notifying custom displays of critical events in the network, such as a programmable controller going "off-line".

When the data acquisition package is communicating with devices on the network, it attempts to maximize throughput. In severe cases where the data is totally scattered throughout the network, the data acquisition package may not attempt any data transfers and may abort operations.

It is the user's responsibility to configure the logic within the programmable controllers on the network to obtain maximum throughput by blocking data acquisition related fields wherever possible.

The data acquisition package automatically modifies and re-optimizes its operation each time a configurer installs a display that in any way redefines the plant data base.

When the data acquisition package (DAP) is running in operator mode, it generates an alarm in the database if a PC fails to respond. The DAP then periodically pulls dead PC's once to determine if they should be placed on the active scan list.

Database Manager

General

Datatypes

The plant data base contains two datatypes, called coil and register, to reflect the naming convention used in programmable controllers. Coils are boolean (true/-false) variables whereas registers are real variables. While internally to the PC's registers are integer values, the capability is provided for automatic conversion to engineering units on input (and conversion back on output) so that the displays need only deal with real values.

Database Names

Each database element has a user assigned name by which it can be referred. The name is hierarchical in nature. This means that logically related database items can be grouped together in convenient ways. This capability is especially useful when configuring templates, since many data base elements can be referred to with a single reference.

Database Handles

It is especially useful in certain applications to refer to portions of database names rather than the full name. For example, one has the ability to pass partial names as parameters to subpictures. For this reason subnames are given database handles, a method of referring to partial names.

Autolog Facility

An attribute of every database element is the Autolog Facility. This feature allows all operator changes to the database to be automatically logged. This facility can be switched on or off from displays.

Datapoint Protection

To provide protection from unauthorized personnel modifying important datapoints, every datapoint can be assigned a protection level. Lockout from modification to the datapoint is automatic if the security level of the operator is not sufficient. Six levels of protection are provided.

Data Acquisition Package

Elements in the database may be designated as being "connected" to a register or coil in a particular PC. Although displays use the database as though they are directly communicating with PC's, the data acquisition package actually does the communication.

Each database element may be assigned a scan rate so that it may reflect the actual changes occurring in a PC within a certain time interval. Also, when a connected database element is modified from a display, the new value is written out to the PC by the data acquisition package. Consideration is given to the concept of polling PC's only for (1) variables presently on the screen, (2) alarmed variables, and (3) other specifically requested variables.

Examples of Database Names

Some database management (DBM) functions take as an input argument the mnemonic descriptor (name) of the datapoint in question. This name is hierarchical in nature and consists of strings of ASCII characters (subnames) in the ranges "A", "Z", "0", "9", and separated by periods ("."). The first character in each subname is a letter. There is no distinction between upper and lower case, as conversion to upper case is automatic. Examples of valid names are:

PLANT22. AREA18.GROUP2.STEAMTANK.-PRESSURELOOP.SETPOINT
TANK1. PRESSURELOOP.SETPOINT
TANK1. PRESSURELOOP.PRESSURE
TANKI. TEMPLOOP.SETPOINT
TANK1. TEMPLOOP.TEMP.
TANK1. TEMPLOOP.ALARMLIMIT
TEMPORARY
P3.ONE4159
T

It is useful to visualize these names as being organized in a sort of tree structure:

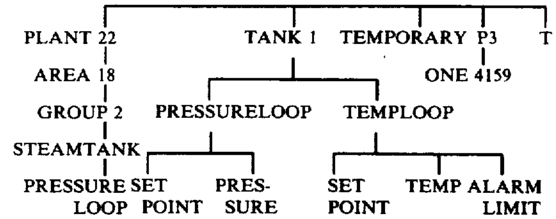

Multiple Database Capability

The ability to distinguish between several logically separate databases is provided, even if the databases have elements with the same name. The distinction is handled by a prefix to the element name. This prefix is delimited by slashes "/" to distinguish it from a normal prefix. For example:

/DBO/STEAMTANK.PRESSURE
/DBl/STEAMTANK.PRESSURE are two variables with the same name residing in different databases.

A database is assigned to a display at configuration time and the ability exists to copy one database to another so that the only remaining task for the configurer is to change the PC routing.

Once a database is chosen for a display, the user need not specify the database prefix thereafter. However, the user can explicitly request or connect an item in another database by referring to the full name.

Default Databases

Two databases are provided as defaults at system configuration, one for system data and one for process variables. These are named /SYS/ and /DBO/. If no database is specified, /DBO/ is the default database.

Two default database handles are provided to correspond to the two default databases. These are internal variables not available to the user but available to application programs through cosmic memory. Within this specification the names pDBO and pSYS are used for these handles.

System Database

The database called /SYS/ is for system data and contains the following default elements:

/SYS/TIME.SECONDS
/SYS/TIME.MINUTES
/SYS/TIME.HOURS
/SYS/DATE.MONTH
/SYS/DATE.DAY
/SYS/DATE,YEAR
/SYS/POWER.UP

The user may add system variables if desired. The password for each touch-station serviced by an Industrial Graphics Processor (IGP) is stored in the IGP's /SYS/database and is accessible via a reserved identifier.

Database Handles

To permit certain conveniences to the user, it is often necessary to refer to partial names. As an example, a display might have a subpicture which contains the following variables:

X.PRESSURE
X.SETPOINT

X.HILIMIT
X.LOWLIMIT

The subpicture was designed to have one parameter named X. In the database, process variables exist for each of the display variables, but the names are cumbersome:

PLANT22. AREA18. GROUP2. STEAMTANK. PRESSURELOOP. PRESSURE
PLANT22. AREA18. GROUP2. STEAMTANK. PRESSURELOOP. SETPOINT
PLANT22. AREA18. GROUP2. STEAMTANK. PRESSURELOOP. HILIMIT
PLANT22. AREA18. GROUP2. STEAMTANK. PRESSURELOOP. LOWLIMIT

The user can resolve all references by passing PLANT22. AREA18. GROUP2. STEAMTANK. PRESSURELOOP for the parameter X.

To prevent the display interpreter from having to do complex string substitutions when handling this type of parameter passing, the MMI can search for subnames in the database. The result of this type of request is called a database handle. This handle tells the database manager where to start searching for a name (It can be thought of as a variable which holds a prefix).

In the above example:

pTemp=SearchDB(pDBO, "PLANT22.AREA18.-GROUP2.STEAMTANK.PRESSURELOOP")

pPres=SearchDB(pTemp, "PRESSURE")

Now all accesses to
PLANT22.AREA18.GROUP2.STEAMTANK.-PRESSURELOOP.PRESSURE
can be made through the database Handle pPres.

If the database is thought of as being a tree structure as shown above, a dbHandle can be thought of as a pointer to one of the modes. The above example can be visualized as follows:

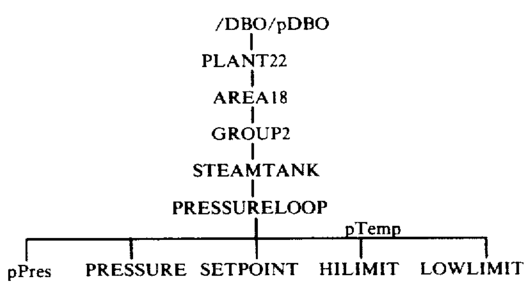

Database Descriptors

A database descriptor is a record which describes a datapoint both in form and where it comes from (internally or from a programmable controller). There are two types of database elements available to the user: registers and coils. Each field within a descriptor is modifiable through a DBM function while it is specific to that field.

Common Descriptor Characteristics

There are some characteristics which apply to each datapoint. The characteristics that apply to each datapoint that are configurer modifiable via the edit coil/-register menu are described above.

Register Characteristics

The register data type is a real number. When connected to a PC register, an automatic conversion takes place between PC register units and engineering units. To establish the parameters for this conversion, the fields Span and Zero are provided. As a convenience, the field Eng Units is provided to save six character string to describe the engineering units used.

The fields maximum limit and minimum limit are provided to limit the maximum and minimum values that an operator may assign to the engineering unit's value.

Coil Characteristics

The coil datatype is a boolean value (true/false).

OPERATING SYSTEM COMMANDS

The operating system's Executive Level Display allows user access to all of the executive level commands. These executive commands include the following:

| Command | Description |
|---|---|
| Backup | Copy all files on specified disk volume to a specified backup drive. |
| Change Volume Name | Change the name and password of a disk volume. |
| Create Directory | Create a new directory on a disk volume. |
| IVolume | Initialize the volume control structures on a disk volume, destroying all files on the volume. |

DIAGNOSTIC FEATURES

Diagnostic Strategy Overview

Diagnostics typically provide powerful tools to assist during the manufacture, field analysis, and repair of computer based systems. Two additional levels of diagnostics are required. The first requirement is that on a power up reset, each processor executes a self test to insure the integrity of its respective board prior to each board going on line. The second requirement is to have continuous testing of the hardware while the system is on line and running, to insure the integrity of the operational system and to permit shutdown of a malfunctioning system. This second level of diagnostic support is under direct control of the system operating system (OS). Four levels of diagnostics, each selected by an associated position of the diagnostic switch 132 (see FIG. 3), is provided:

(1) Normal System Operation—Power up confidence test, initialization check (e.g. correct diskettes loaded), run time diagnostics (e.g. background RAM/ROM checks), run time software checks (stack overflow, etc.).

(2) Repeat Confidence Test—Aids fault resolution by the maintenance engineer.

(3) System Diagnostics—Offline board/system diagnosis using the floppy disk controller board as the master controller.

(4) Service Center Diagnostics—Remote diagnostic hookup.

In addition to the run time diagnostics which look specifically for hardware faults in a running system, the operational software performs validity checks on its own internal operations. Although these run time validity checks are not technically a diagnostic, they can be useful in detecting hardware failures, even though the actual failure may not be isolated. For example, in a debugged software system, stack underflow/overflow may be indicative of a CPU memory failure. There are two levels of run time validity checks:

| | |
|---|---|
| Initialization Checks | (on line - configuration error, et.) |
| Run Time Software Checks | (on line - stack error, divide error, memory parity, error, watchdog timer expiration, program check scenes, etc.) |

Confidence Test Overview

The purpose of a power up confidence test is to provide a self test capability on each CPU based board. For any intelligent board (module), the power up confidence test resides in on-board PROM/EPROM. Errors detected are reported externally via onboard light emitting diodes (LED's) (49, 49', 51, 51', see FIG. 2) and internally via the bus status registers in the individual boards. The confidence test is a GO-NO-GO test. The board (module) is tested to whatever extent possible, without requiring off-board hardware. If the module uses a second module (e.g. the CPU module and memory module) to form a board set, then the confidence test executes from the hardware resident on the module with the CPU. Examples are:

CPU and Memory Board
Video CPU and Video Memory

The confidence test can be executed repeatedly for maintenance purposes by setting the diagnostic switch. Some examples ot typical confidence tests are listed below:

CPU Module Test
Memory Module Test
PROM/EPROM Checksum Test
EEPROM Checksum Test
Serial Port Loopback Test
Timer Tests
Watchdog Timer Tests The confidence test is used to facilitate system repair by isolating failures to a board level but is not used to repair the boards themselves.

If the module passes the confidence test, it hands off control to the operating system software located on the same on-board PROM/EPROM. If the confidence test detects an error, control is retained indefinitely by the power up diagnostic, thereby preventing the system from utilizing defective equipment. An exception is the floppy disk controller module 30 (FIG. 1) which hands over to the operating system bootstrap on I/O failures due to drive or media failure and which can better be reported via the video station 108 through the operating system software.

A reset is required to restart the system if an error occurs. A power up reset invokes the power up confidence test. The confidence test is designed to test all possible hardware options. Hardware jumpers are available on each board (module) to indicate which options are present.

Run Time Diagnostics Overview

The purpose of run time diagnostics is to detect hardware failures in a running system. The run time diagnostics are under control of the operating system. All hardware that can be tested in a manner which does not interfere with the execution of the operational software is tested. The run time diagnostics handle failures in a manner similar to the confidence test. Any fatal error takes the module off line in whatever fashion the system software deems appropriate. After the board is off line the error is reported to the user.

Examples of Run Time Diagnostics are:
PROM/EPROM Checksum
Memory Test

Run time diagnostics accomplish two objectives, as outlined below.

Continuous Testing

In control systems environment, it is not unusual for equipment to remain powered up and running for several months without being shut off. Since the confidence test only executes once on power up, a hardware failure could go undetected and influence system operation. Run time diagnostics provide continuous testing of system hardware in a manner which does not noticeably affect system software. It should be noted that some of the tests contained in the confidence test may not be practical in the run time diagnostics. For example, the RS-232C ports cannot be placed in loopback mode without the risk of losing input characters (unless the operating system can schedule this event).

Expanded Testing

The confidence test is restricted to testing on-board hardware. During the execution of run time diagnostics, it may be reasonable to test some of the hardware off-board, such as a limited portion of global memory and interface. In this regard, the run time diagnostics are more comprehensive than the power up confidence test.

FIELD SERVICE FACILITIES

Customer System Generation

The man-machine interface can be configured in the field to have a variety of options: from 1 to 2 touch or vue stations and multiple serial outputs and from 1 to 4 floppy disks to Winchester hard disks. In a normal computer system this implies a complex system generation procedure. Some configuration changes, such as the number of floppy disk drives, do not require separate disks but are detected at initial bootstrap of the system.

The application specific portion of the system generation process occurs in configurator mode. In addition to specifying the data base, the user defines the user list and associated access privileges as well as network topology. The image displayed at the secondary display unit may be controlled by the primary control/display unit.

Field Service Features

The service center mode provides for the interrogation of status information via a serisl interface port of the CPU module via ASCII commands. A line protocol allows for the down line loading of code which may then be executed by the onboard processor. The latter facility allows the loading of a more complex line driver which may in turn load more complex diagnostic software.

STANDARD TEMPLATES

The man-machine interface provides several libraries of standard templates, described in this section, that can be configured for specific user applications. Where the user desires displays different than those that can be configured from the standard templates, the graphics software enables the user to customize the standard templates and to design and configure custom templates via the designer and configurator modes.

The libraries of standard templates are as follows:

General standard template library
Process industry standard template library
Discrete parts manufacturing industry standard template library The general standard template library includes the following standard templates:

Point
Multi-trend
Alarm definition/status
Alarm processing
Alarm history
Man-Machine Interface Status
Man-Machine Interface
Status and transient error counts template
Programmable controller status
Buttons
Numeric keypad
Digit display
QWERTY keyboard
ABCD keyboard
Lights
Circular gauge
Shift log
Report
Tags
Logical unit-to-physical device mapping
Digit switch The process industry standard templates library includes the following standard templates:

4 Loop Overview
4 Loop Group
8 Loop Overview
8 Loop Group
Recipe Table

The discrete parts manufacturing industry standard templates library includes the following standard template: Motor control center bucket.

GENERAL STANDARD TEMPLATE LIBRARY

Standard Point Template

Figure 48:
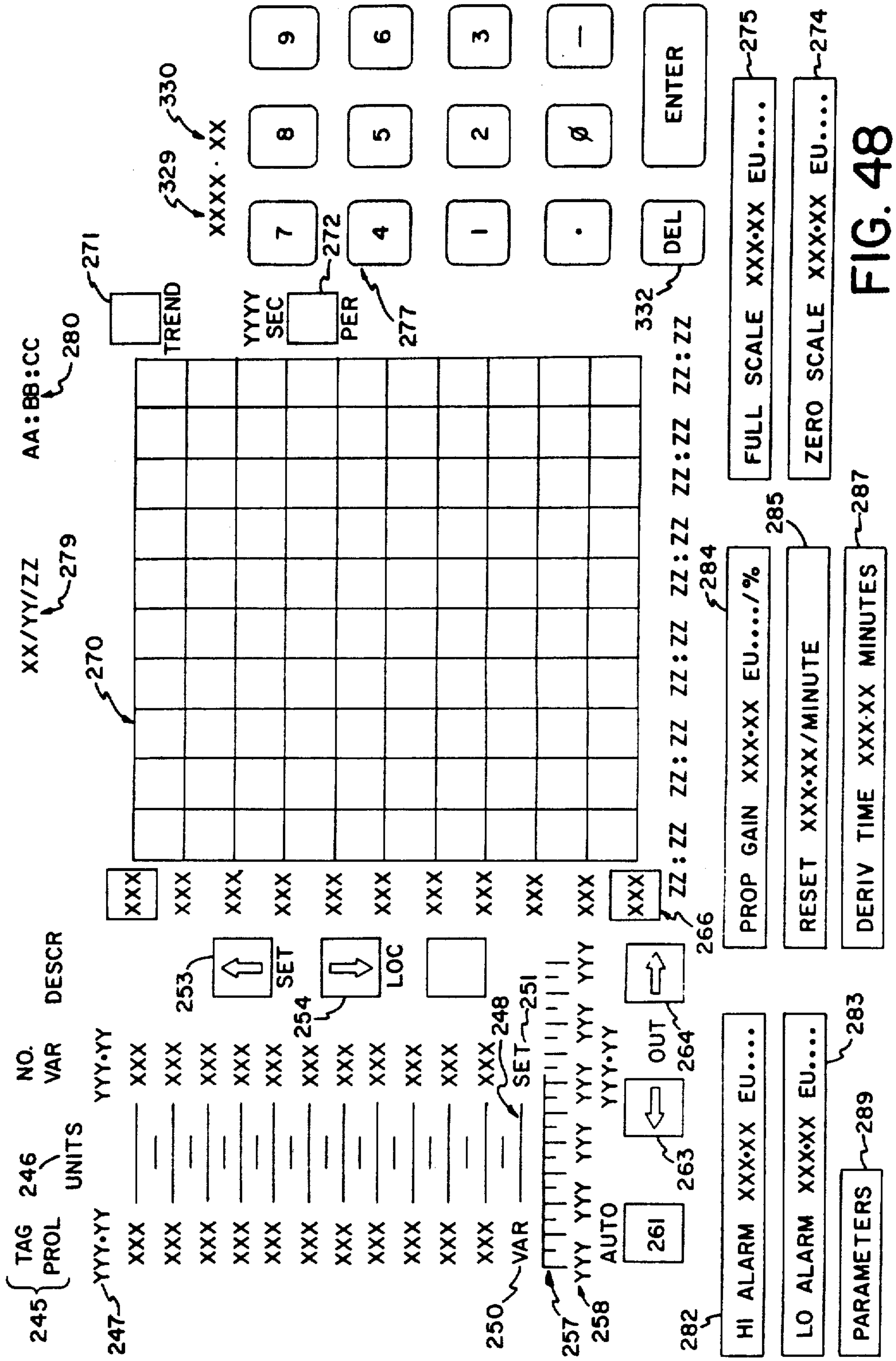
FIG. 48 is a representation of the monitor screen layout regarding a point template.

The standard point template shown in FIG. 48 is a visible template that provides detailed information and operator selectable current value trending of a single measured (actual or derived) variable. The measured variable can be displayed on a 3 inch (7.62 cm)×6¾ inch (17.1 cm) analog controller faceplate or on a 3 inch (7.62 cm)×6¾ inch (17.1 cm) analog indicator faceplate.

The standard point template for an analog controller faceplate with current value trending, internal adjustments, numeric keypad and group, and overview buttons selected is shown in FIG. 48.

Analog Controller Faceplate

The analog controller faceplate presents the following information:

(a) two lines of character strings 245 at the top of the faceplate, and default values blank, that may be configured as string constants that describe the measured variable.
(b) the engineering units 246 of the measured variable;
(c) the current value 247 of the measured variable, displayed digitally;
(d) a vertical measurement scale 248 calibrated over the range (zero to zero+span) of the measured variable;
(e) two vertical bars 250, 251, labeled VAR and SET, whose lengths are proportional to the current values of the measured variable and the setpoint respectively. These bars display transparently on the left and right sides of the vertical measurement scale respectively;
(f) a vertical pair of slew buttons 253, 252 to raise and lower the controller's setpoint;
(g) a toggle button, whose default presentation is blank, that may be configured to appear as a local/-remote setpoint button;
(h) a horizontal output scale 257 calibrated over the output range of the controller. The controller's output range may be either a default range (0–100%) or a custom configured range;
(i) a horizontal output bar 258 whose length is proportional to the current value of the controller's output. This bar displays transparently over the horizontal output scale.
(j) the current value 260 of the controller's output displayed digitally;
(k) a toggle button 261 that functions as the controller's auto/manual button; and
(l) a horizontal pair of slew buttons 263,264 to raise and lower the controller's output.

Analog Indicator Faceplate

The analog indicator faceplate is identical to the analog controller faceplate except as follows:

(a) the vertical measurement scale is approximately 5 inches (12.7 cm) long and straddles the faceplate's vertical centerline;
(b) a single vertical bar 266 is presented to depict the current value of the measured variable. This bar displays transparently at the center of the vertical measurement scale; and
(c) slew buttons, local/remote button, horizontal output scale, horizontal output bar, digital output display, auto/manual button and slew buttons are not presented.

Trend Graph

The standard point template provides an operator selectable current value trend graph of the measured variable. The trend graph 270 is enclosed in a 7 inch (17.8 cm) square. When a standard point display is initially drawn on the screen, only the controller or indicator faceplate, the trend button and the parameters button are presented.

The trend button 271 is a standard toggle button that alternately initiates a new current value trend graph (i.e. starts a new trend graph beginning with the current value of the measured variable) and erases the previous trend graph.

The trend period (time between trended values) has a default value in case a trend period is not specified. The value of the trend period is displayed digitally. Touching the period button 272 causes the standard numeric keypad template to be presented on the right of the screen and causes the period button to blink. When the new value is entered, a new current value trend graph is presented using the new trend period and the standard numeric keypad template is erased. Modifications of the trend period remain in effect when the trend graph is erased for purposes other than further modification of the trend period.

The zero and full scale values 274, 275 of the trend graph default to those of the measured variable. Touching the zero scale value display location on the screen causes the numeric keypad template 277 to be presented on the right of the screen and causes the zero scale value to blink. When the new zero scale value is entered, a new current value trend graph is presented using the new zero scale value and the standard numeric keypad template is erased.

Modifications of the trend graph's zero scale value remain in effect when the trend graph is erased for purposes other than further modification of this value. The trend graph's full scale value may be similarly modified. The date and the time are displayed in the upper right hand corner of the 7 inch square (locations 279 and 280 respectively) that encloses the trend graph.

Internal Adjustments

The internal adjustments include hi alarm limit 282, lo alarm limit 283, proportional gain 284, reset 285, derivative time 287, full scale value 275 and zero scale value 274.

The internal adjustments may be alternatively displayed and erased by consecutively touching the parameter button 289.

Touching the label, value or units of a particular internal adjustment while the internal adjustments are being displayed causes the standard numeric keypad template to be presented on the right of the screen and causes the label of the particular internal adjustment to blink.

Group and Overview Buttons

The standard point template provides an optional, configurer selectable group button and an optional, configurer selectable overview button. These buttons are presented in operator mode only when previously selected by the configurer.

In operator mode, touching the group button causes a chain to a configurer specified display, normally the standard 4-loop group display associated with the standard point display being viewed.

In operator mode, touching the overview button causes a chain to a configurer specified display, normally the standard 4-loop overview display associated with the standard point display being viewed.

Standard Multi-Trend Template

Figure 49:
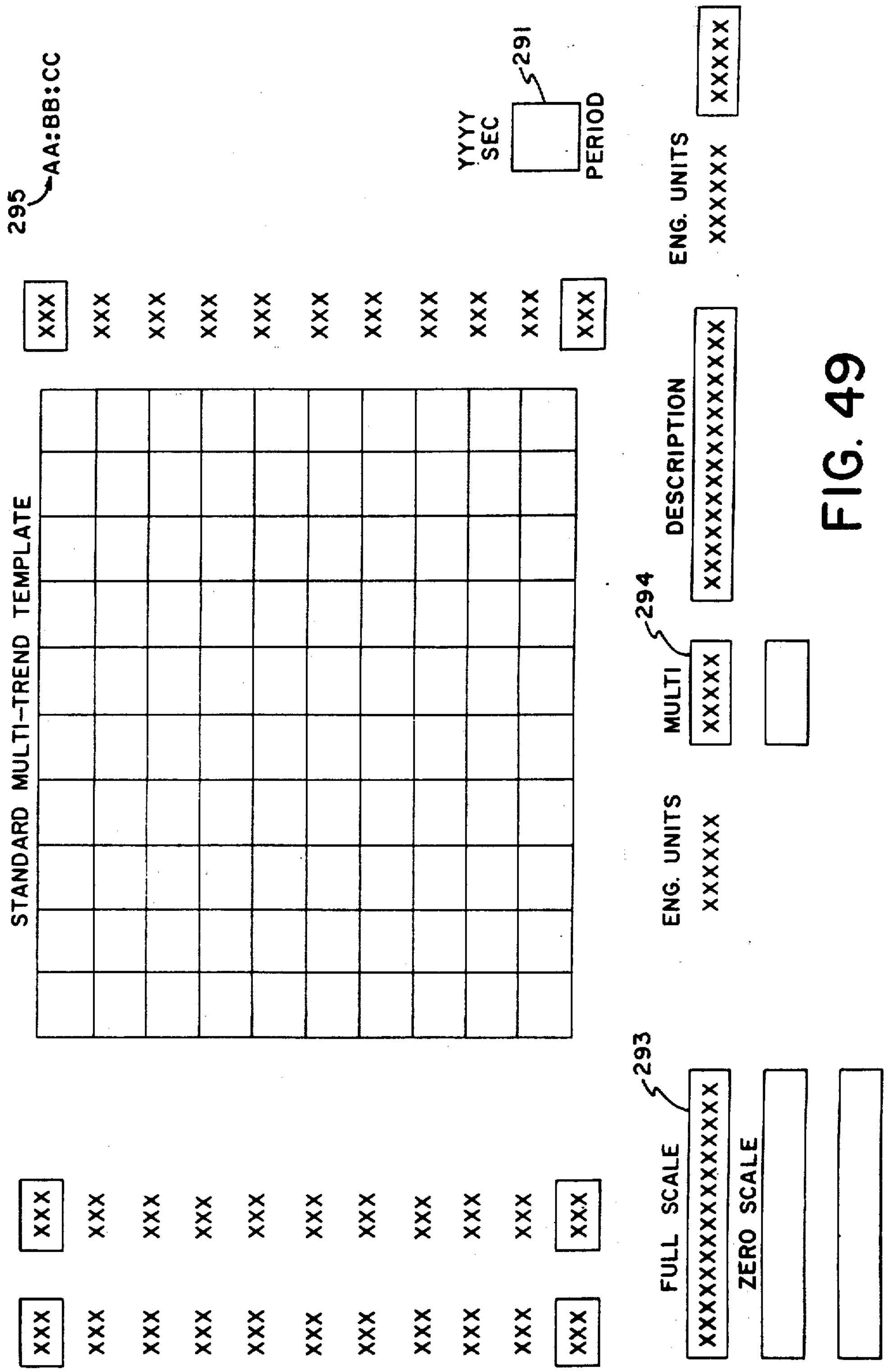
FIG. 49 is a monitor screen layout with respect to a multi-trend template.

The standard multi-trend template, depicted in FIG. 49 is a visible template that provides current value trending of from one to six measured (actual or derived) variables on a single set of axes.

The trend period (time between trended values) has a default value in case a trend period is not specified. The value of the trend period is displayed digitally. Touching the period button 291 replaces the grid (but not the scales) with the standard template that presents the standard numeric keypad template and a message directing the operator to enter a new value for the trend period. When the new value is entered, a new current value trend graph is presented using the new trend period. Modifications of the trend period remain in effect when a standard multi-trend display is erased for purposes other than further modification of the trend period.

The default tags (database handles) of the variables being trended are specified during configuration. Touching a tag descriptor location on the screen replaces the screen contents with a standard template that presents the standard QWERTY keyboard template and a message directing the operator to enter a new tag. When the new tag is entered, a new current value trend graph is presented incorporating the new tag. Modifications to the trend graph's tag remain in effect when a standard multi-trend display is erased for purposes other than further modification of one of these tags. The engineering units ultiplier of each variable being trended is similarly configured and may be similarly modified, with the standard numeric keypad template utilized for input of the modified value (see FIG. 48, Keypad 277).

The default zero scale value 292, full scale value 293 and engineering units multiplier 294 of each variable being trended is specified during configuration. Touching the screen location that displays one of these values erases all data dependent on this value and replaces the grid with a standard template that presents the standard numeric keypad template and a message directing the operator to enter the desired value. When the new value is entered, all data dependent on the new value is drawn and a new current value trend graph is presented using this new data. Operator modifications made to a zero scale value, full scale value or engineering units multiplier remain in effect when the standard multi-trend display is erased for purposes other than further modification of the value. The date 295 is displayed in the template's upper right hand corner.

Standard Alarm Definition/Status Template

The standard alarm definition/status template, shown in FIG. 50, is a visible template that enables configurers to define and operators to look up and acknowledge the states of all alarm points being monitored by the man-machine interface. The standard alarm definition/status template is designed for configuration as one or more pages of standard alarm definition/status displays. The standard alarm/definition/status template presents the following information:

(a) Date 300 and time 301. When a standard alarm definition/status display is interpreted in operator mode, the date and time are automatically updated every second.

(b) Page number 302. The page number is defined by the configurer.

(c) Alarm numbers 303. The alarm numbers on page number y run from $20(y-1)+1$ to $20(y-1)+20$.

(d) Alarm tags 305. The default value of each alarm tag is a blank character string that may be configured via the display language command alarm (I)=[""] lit (Alarm I_TAG). Here, ALARM (I)_TAG is an undefined boolean variable that is configured with the programmable controller coil name (or the default blank character string) in the alarm tag column on the screen.

(e) Descriptions 306. Each alarm point has an associated 38 element character string, default value blank, that may be configured to a string constant that describes an alarm point.

(f) Status 307. This is a character string, transparent to the user, that displays an alarm point's state (normal or alarm) in the operator mode. When an alarm point's condition is an unacknowledged alarm, the character string displays as alarm and blinks. When an alarm point's condition is an acknowledged alarm, the character string displays as "alarm" and does not blink (i.e., it is steady-on). When an alarm point's state is normal, the character string displays as "normal" and does not blink.

(g) Enabled 308. This is a character string, transparent to the user, that in the operator mode, displays "YES" when an alarm point is not enabled (not connected to a PC coil).

(h) Acknowledge button 309. This is a visible, standard toggle button that, when touched in operator mode, acknowledges all unacknowledged alarms on the alarm definition/status display being viewed.

Standard Alarm Processing Template

The standard alarm processing template is an invisible template that, when configured and interpreted in the operator mode, processes each alarm point defined on a standard alarm definition/status template according to the logic described above.

At any given time, the state of each coil associated with an alarm point is either proper or trouble (not proper). At any given time, the state of each alarm point is either normal or alarm (not normal). At any given time, the condition of each alarm point whose state is "alarm" is either unacknowledged or acknowledged and, optionally, either unsilenced or silenced. Alarm silencing is an optional feature that, when desired, is enabled during configuration of the standard alarm processing template.

When alarm silencing has been enabled, the alarm beeper 61 (see FIG. 1) may be silenced from any standard display without the operator viewing and acknowledging the information that identifies the alarm point(s) as in the unsilenced alarm condition. The operator merely touches a silence button 311 on the standard display. The alarm beeper may be similarly silenced from any custom display that presents an appropriately designed and configured silence button. When the alarm beeper is so silenced, all alarm point(s) in unsilenced alarm condition change to the silenced alarm condition.

Where alarm silencing has not been enabled, no display may be used to silence the alarm beeper without operator viewing and acknowledgement of information that identifies the alarm point(s) in the alarm state.

An alarm is acknowledged by touching the acknowledge button 309 on any standard display (standard alarm definition/status display or standard alarm history display, see FIG. 1) that identifies the alarm point in alarm. An alarm point may also be acknowledged from any custom display that presents an appropriately designed and configured acknowledge button.

In the subsections that follow, all references to alarm silencing apply only when this feature has been configured into the standard alarm processing display. When the state of the coil associated with an alarm point changes from "proper" to "trouble" or is "trouble", the state of the alarm point is "alarm".

When an alarm point's state is alarm, it remains alarm until the folling conditions are both met: (1) it has been operator acknowledged, i.e., its condition is acknowledged, and (2) the state of the coil associated with the alarm point is proper. When an alarm point's state changes from normal to alarm, the alarm point's condition is initially unsilenced and unacknowledged. When an unsilenced, unacknowledged alarm condition becomes acknowledged, it also becomes silenced.

Standard Alarm History Template

The standard alarm history template, shown in FIG. 51 is a visible template that provides a table listing the most recent 16 alarms to transition from normal to alarm state in reverse chronological order (most recent transition to alarm first). This alarm history template also enables an operator to acknowledge the alarm point in alarm state.

The standard alarm history template is designed for configuration as a one page standard display. The standard alarm history template presents the following information:

(a) Date 315 and time 316. When a standard alarm history template is interpreted in operator mode, the date and time are automatically updated every second;

(b) For each of the most recent 16 alarm points to transition from normal to alarm state, in reverse chronological order (most recent transition to alarm first), the time of transition 317 to the alarm state occurred, alarm tag 318, alarm description, 319 time of acknowledgement 321 and time of clearing 322 (transition of coil associated with alarm point back to proper state) are displayed. Alarm tags and alarm follow the previously described format; and (c) Acknowledge button 309' as described above.

When interpreted in the operator mode, the standard alarm history display scrolls down one line each time a new line, describing a new transition to the alarm state, is added at the top of the display.

Standard Status and Transient Error Counts Template

The standard communications network status and transient error counts template is shown in FIG. 52. It is a visible template that tabulates the following data on a MMI system's one or two communications network (such as communication bus 44 shown in FIG. 1):

(1) each channel's number.

(2) total messages sent on each channel.

(3) total messages retried on each channel.

The messages sent and retried are zeroed each time the operating system is booted. Each of these items is stored in a double word to eliminate the possibility of overflow.

Standard Programmable Controller Status Template

The standard programmable controller status template is shown in FIG. 53. It is a visible template that tabulates the following data on from one to thirty-two programmable controllers interfaced to a MMI system via a communications bus (such as PC's 48 via bus 44 to MMI 20 shown in FIG. 1):

(1) each programmable controller's number.

(2) messages sent from each programmable controller.

(3) messages retried for each programmable controller.

When the standard programmable controller status template is configured, the configurer specifies the communication network channel (bus) number and the total number of programmable controllers on the channel.

The messages sent and retried per programmable controller are zeroed each time the operating system is booted. Each of these items is stored in a double word to eliminate the possibility of overflow.

Standard Button Templates

Standard Toggle Button Templates

Figure 54:
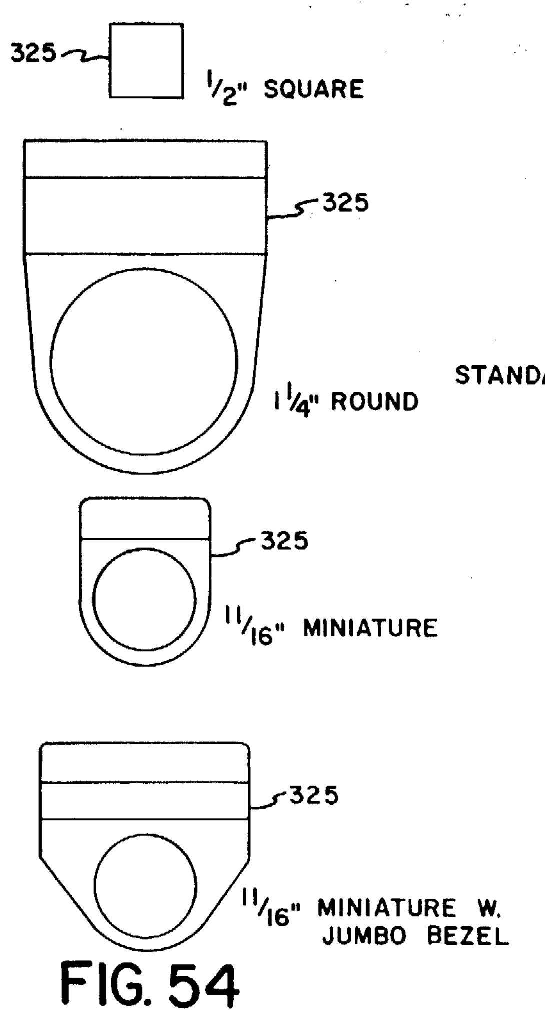
FIG. 54 is a monitor screen layout for toggle buttons shown on the screen.

There are four standard toggle button designs 328 (templates) as shown in FIG. 54.

Each such template presents a single alternate action button. Each time the button is touched, the state of an associated boolean is toggled. The calling subpicture provides arguments that specify a color entry for each of the button's two states and the identifier of the boolean variable that defines these states.

STANDARD SLEW BUTTON TEMPLATES

Figure 55:
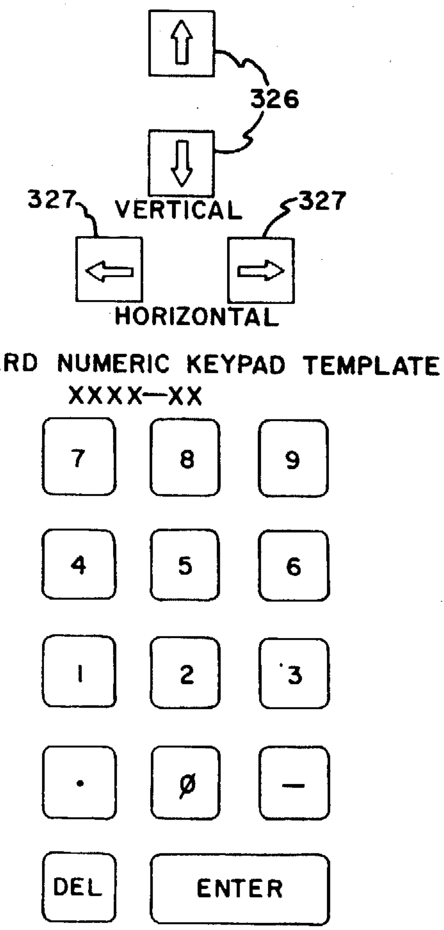
FIG. 55 is a monitor screen layout for slew button templates.

There are two standard slew button templates 326 and 327 as shown in FIG. 55. Each such template presents a two button set, associated with a real variable, that consists of a raise button and a lower button. Touching the raise button increases the real variable by 1% of its range per second touched for the first 10 seconds and 10% of its range per second touched every second thereafter until its maximum value is reached. Touching the lower button decreases the real variable in an analogous manner down to its minimum value. The designer may specify two separate static color entries (foreground and background) for each of the two buttons and the range as arguments in the call to each standard slew buttons template.

Standard Numeric Keypad Template

The standard numeric keypad template corresponds in design to keypad 277 shown in FIG. 48. It is thus similar in format to a calculator keypad, with the numbers 0 through 9 arranged in a cluster. Each "key" is a button. There are 2 buffer areas 329 and 330 associated with a keypad (character and result). The first buffer 329 is similar to a calculator display in that it sequences the digits correctly and suppresses leading zeros. (For example, touching the sequence "0", "1", "2", "3" results in a "123" in this buffer). The second buffer 330 contains the integer number that corresponds to the string in the first buffer. The calculator display also functions as a clear key that when touched causes the character string buffer to be evaluated as a number which is then placed in the result buffer. Touching the DEL button 332 deletes the rightmost entry in the character buffer and shifts the character buffer right by one position. A display has access to both buffer areas. This provides the capability of (a) placing the keypad's image anywhere on the screen, and (b) modifying the function of another button (for example, a button whose function is to read a register may determine which register is to be read from the keypad buffer area).

Standard Digit Display Template

Figure 56:
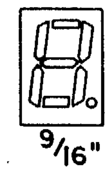
FIG. 56 is a monitor screen layout for digits displayed on the screen.

The standard digit display template presents an image of from one to eight standard 9/16 inch (1.42 cm) digits, as shown in FIG. 56. The arguments passed to the standard digit display template by a calling subpicture include the following:

(1) Indentifier of variable whose value is to be displayed.

(2) Number of digits to be displayed.

(3) Number of digits to be displayed after decimal point (zero causes suppression of decimal point).

Standard QWERTY Keyboard Template

Figure 57:
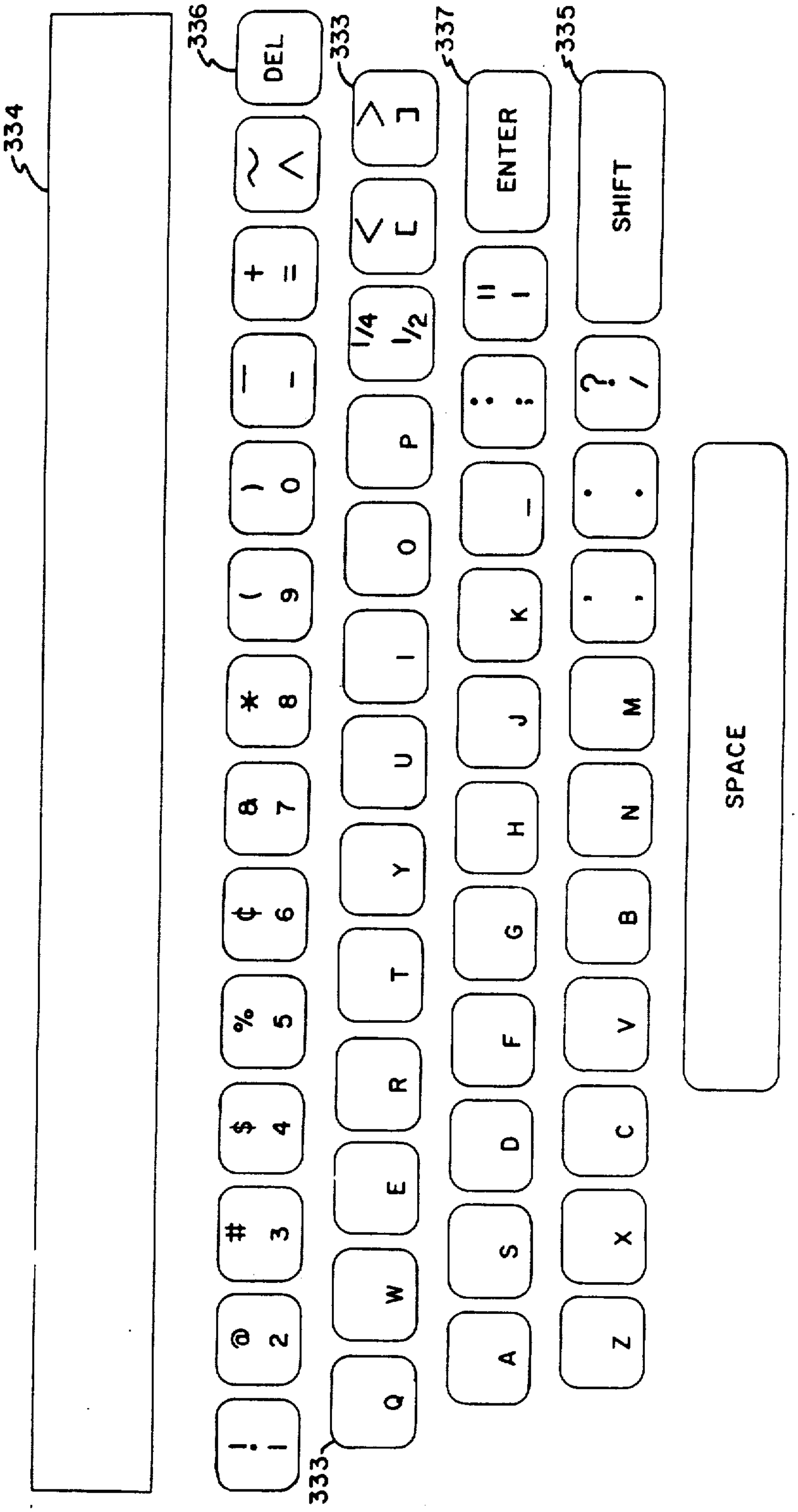
FIG. 57 is a monitor screen layout of a QWERTY keyboard.

The standard QUERTY keyboard template is shown in FIG. 57. This template presents the image of a keyboard that is similar in format to a typewriter keyboard. Each key 333 is a button. There is an 80 character buffer area 334 associated with the keyboard. Its initial value is 80 blanks. Except for the SHIFT, DEL and ENTER buttons, touching a key shifts the contents of the buffer one character to the left and enters the character associated with the key into the right most buffer location.

By default, this keyboard functions in lower case. The shift button 335 is a standard toggle button that alternates the keyboard between lower case and upper case.

Touching the DEL button 336 deletes the right most entry in the character buffer and shifts the character buffer right by one position.

Touching the ENTER button 337 causes a chain back to the calling subpicture.

Standard ABCD Keyboard Template

Figure 58:
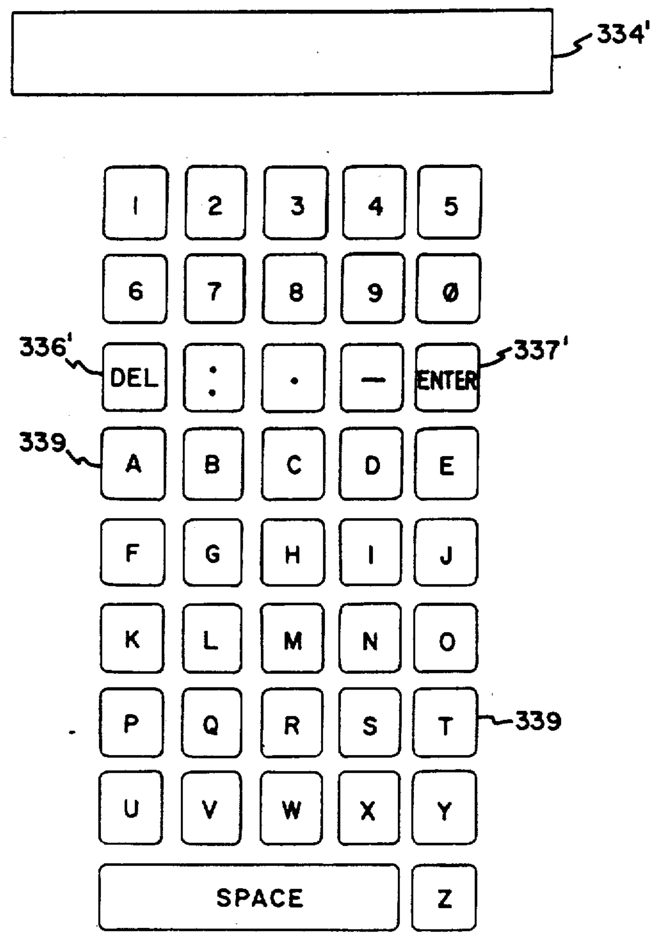
FIG. 58 is a monitor screen template for an ABCD keyboard.

The standard ABCD keyboard template is shown in FIG. 58. This template presents the image of a keyboard on which the alphabetic character keys 339 are located according to their sequence in the alphabet. Each key is a button. There is an 80 character buffer area 334' associated with the keyboard. Its initial value is 80 blanks. Except for the DEL and ENTER buttons, touching a key shifts the contents of the buffer one character to the left and enters the character associated with the key into the right most buffer location. This keyboard only functions in the upper case.

Touching the DEL button 336' deletes the rightmost entry in the character buffer and shifts the character buffer right by one position.

Touching the ENTER button 337' causes a chain back to the calling subpicture.

Standard Light Templates

Figure 59A:
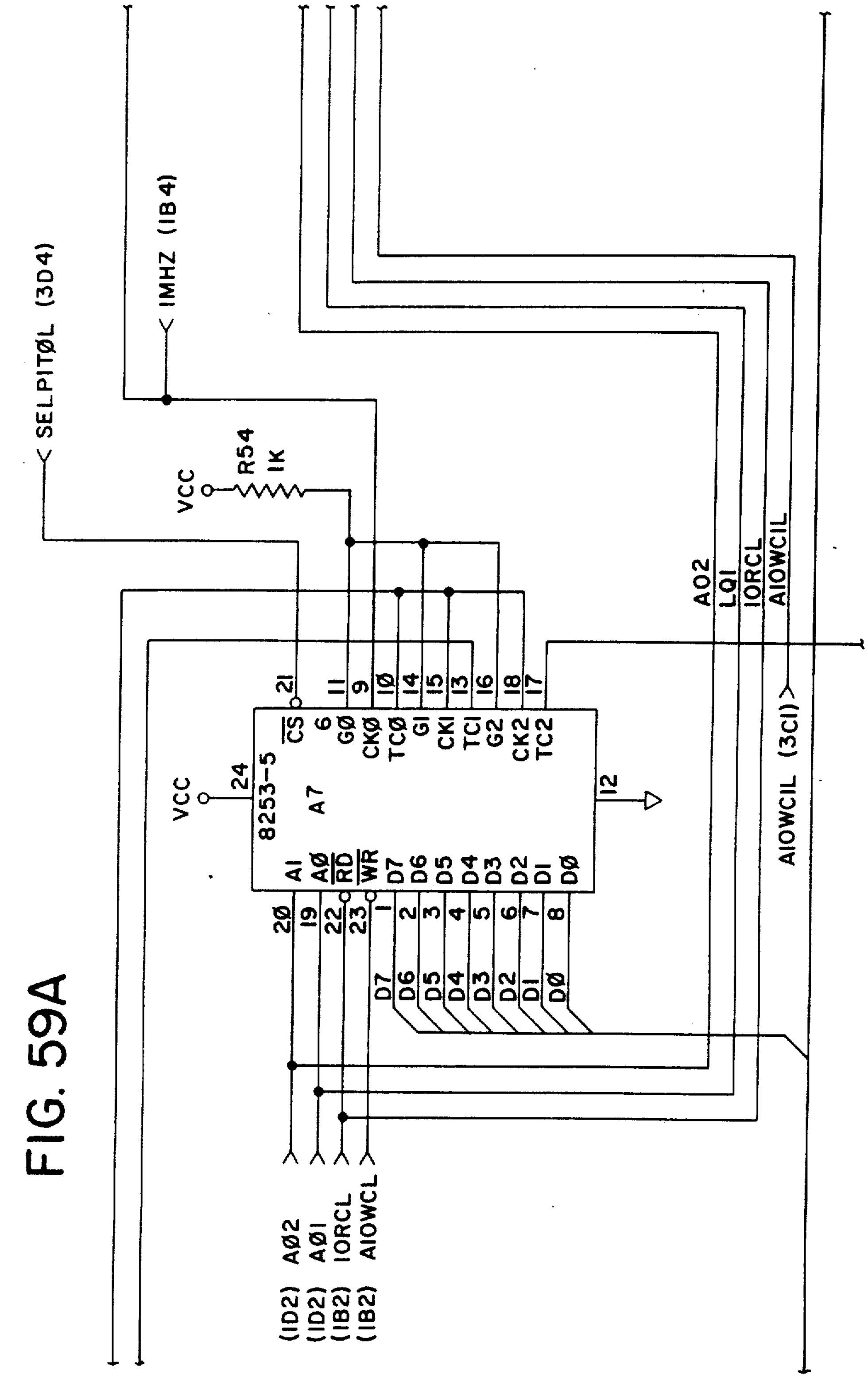
FIGS. 59A-B are schematic diagrams of the fast watchdog timer circuitry in the CPU module.
Figure 59B:
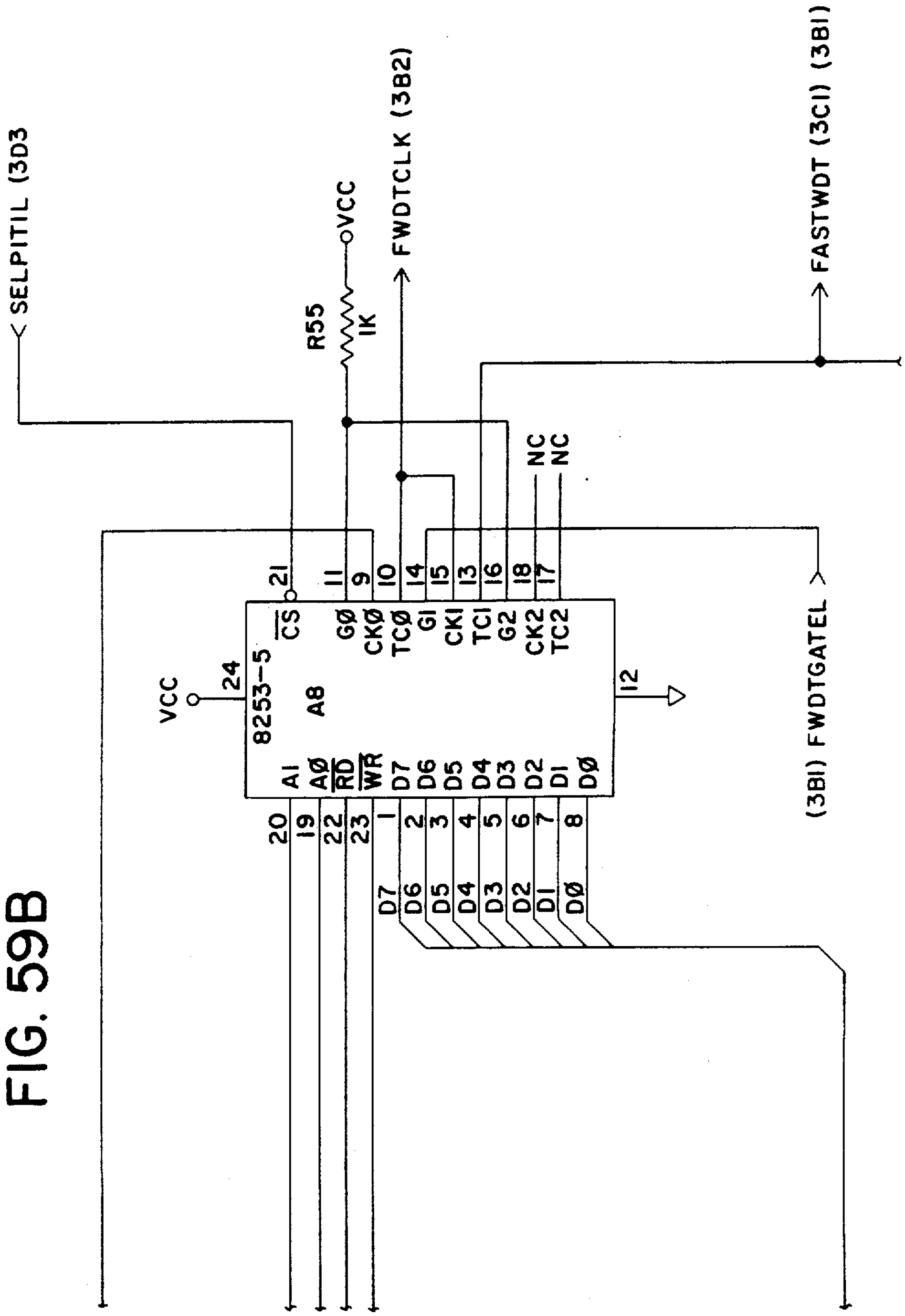
Figure 59C:
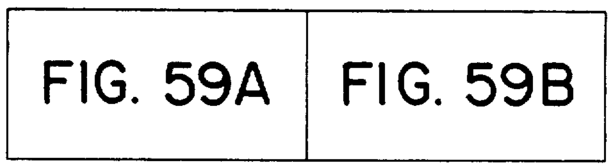
FIG. 59C is a diagram showing how

There are four standard light templates as shown in FIG. 59. The calling subpicture provides arguments that specify the color entry for each of a light's two states and the identifier of the boolean variable that defines these states.

Standard Circular Gauge Template

Figure 60:
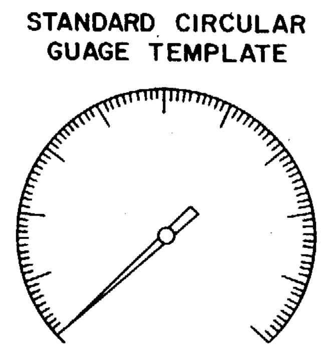
FIG. 60 is a monitor screen layout for a circular gauge template.

The standard circular gauge template is shown in FIG. 60. The calling subpicture provides arguments that specify the following:

(1) Gauge full scale value.

(2) Gauge zero scale value.

(3) Scale (foreground) color.

(4) Faceplate (background) color.

Standard Shift Log Template

FIG. 61 illustrates the standard shift log template. This template writes configurer defined variable descriptors and historical (hourly averages for most recent 10 hours) values of the described variables in a predefined format to a configurer specified logical unit.

From one to eight real variables (var 00001 through var 00008 shown in FIG. 61) may be configured for hourly averaging on a standard shift log template. Three lines 340 of character strings, each eight characters, are provided to describe each real variable being logged.

Standard Report Template

Figure 62:
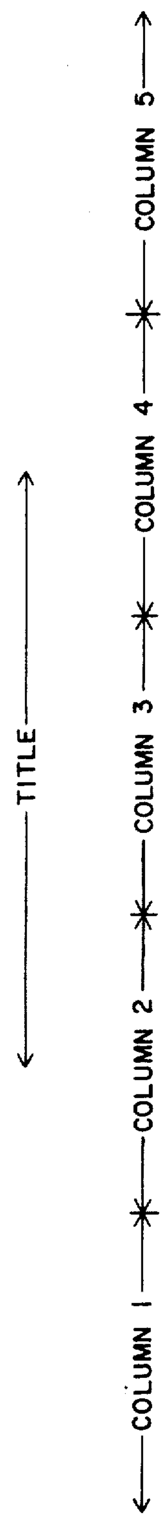
FIG. 62 is a monitor screen layout for a report template.

FIG. 62 illustrates the standard report template. This template writes configurer defined variable descriptors and the values of the described variables in a predefined format to a configurer specified logical unit.

The standard report template divides the MMI screen into five columns of 32 lines each. Each line in each column may be configured as a description (character string constant), a real variable, or may be left at its default value (a blank character string). Real variables are written with two digits on the right of the decimal point. The title is a configurer defined 32 character wide string constant.

Standard Tag Template

Figure 63:
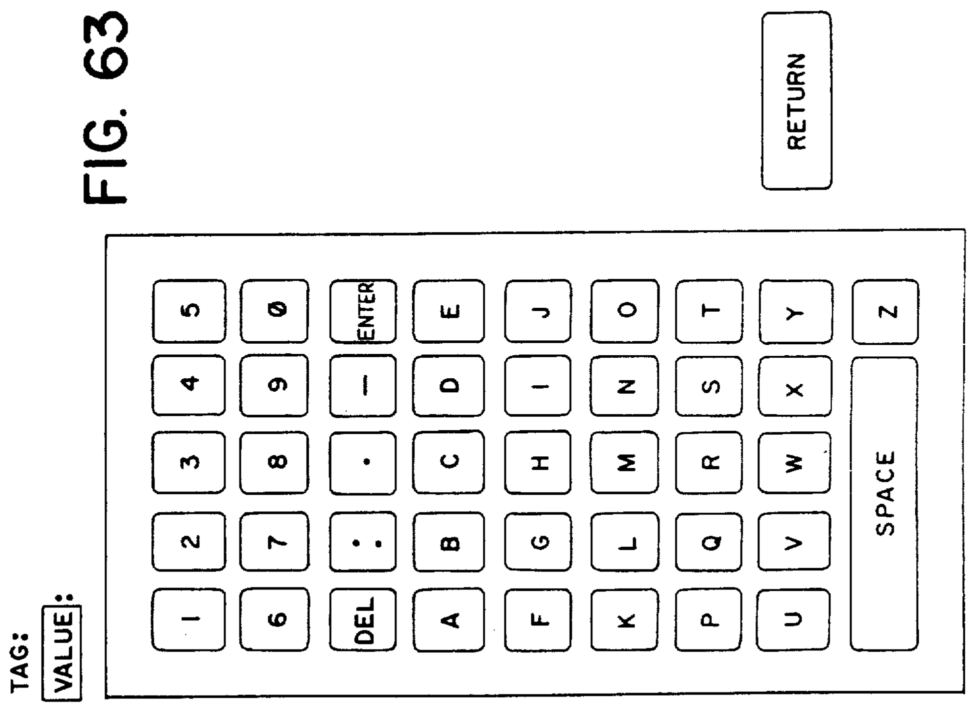
FIG. 63 is a monitor screen layout for a tag template.

FIG. 63 illustrates the standard tag template. This template is a visible subpicture. Each of the other standard templates presents a button labelled "TAG" that, when touched, causes a chain to the standard tag template. When the standard tag template is interrupted, the following sequence of events occurs:

(1) The screen is erased and redrawn as per FIG. 63.

(2) The operator touches in a tag (variable name) via the ABCD keyboard image and then touches the keyboard's ENTER button.

(3) The current value of the entered tag is displayed next to the value button 342.

(4) Touching the value button 342 enables the operator to enter a new value for the entered tag via the ABCD keyboard image.

(5) Touching the return button 343 causes a chain back to the standard tag template.

Standard Digit Switch Template

Figure 64:
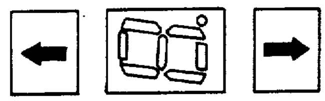
FIG. 64 is a monitor screen layout for a digit switch template.

The standard digit switch template presents an image of from one to eight standard digits, as shown in FIG. 64. The arguments passed to the standard digit switch template by a calling subpicture include the following:

(1) Identifier of variable whose value is to be modifiable via and displayed by the digit switch 345.

(2) Number of digits to be displayed.

(3) Number of digits to be displayed after decimal point (zero causes suppression of decimal point).

Each digit has an associated raise button above the digit and an associated lower button beneath the digit. Touching the raise button 326′ increases the value of the digit by 1 unit per second. Touching the lower button 326″ decreases the value of the digit by 1 unit per second.

PROCESS INDUSTRY STANDARD TEMPLATE LIBRARY

Standard 4 Loop Overview Template

Figure 65:
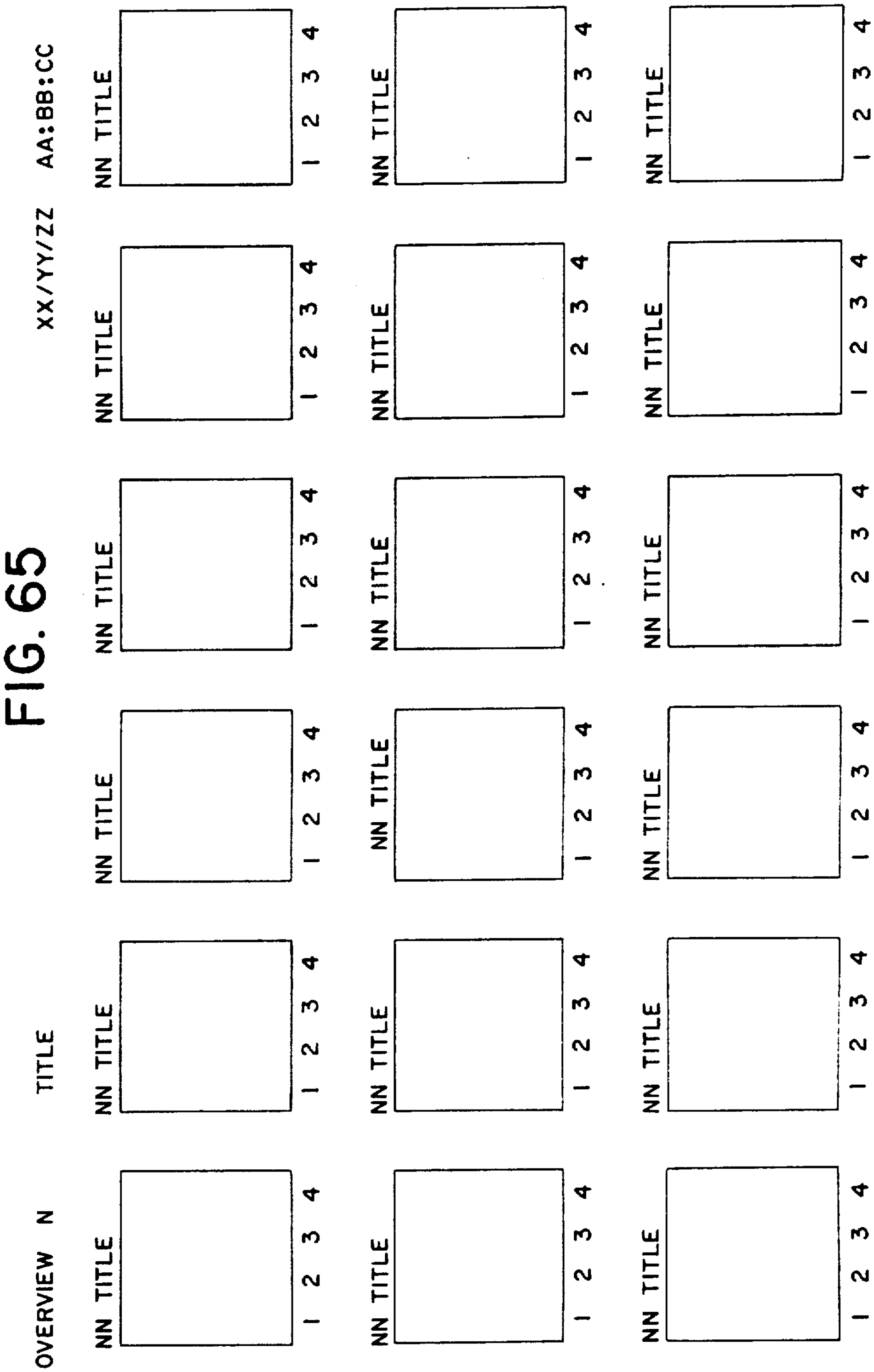
FIG. 65 is a monitor screen layout for a four loop overview template.

The standard 4 loop overview template is shown in FIG. 65. This template is a visible template that presents eighteen groups 347 of four points each. A point may be a controller, or an indicator, or may be discrete, or unused (blank).

In the case of a controller, the current values of the process variable and the setpoint are each displayed via a 50 pixel high bar and the hi and lo alarm limits are indicated by means of tic marks. The setpoint bar is red. The process variable bar and the point ID number blink when the process variable is in alarm and the alarm is unacknowledged.

In the case of an indicator, the current value of the process variable is displayed via a 50 pixel high bar and the hi and lo alarm limits are indicated by means of tic marks. The bar is green when the process variable is not in alarm and yellow when it is in alarm. The bar and the point ID number blink when the process variable is in alarm and the alarm is unacknowledged.

A discrete point is displayed as follows:

(1) The String

O
N appears above the point identifier when the value of the associated discrete input is in the state (true or false) that the configurer has defined as "ON".

(2) The String

O
F
F appears above the point identifier when the value of the associated discrete input is in the state that the configurer has defined as "OFF".

(3) The string displayed above the point identifier is yellow when the discrete point is in alarm. The string and the point ID number blink when the associated discrete input is in alarm and the alarm is unacknowledged.

In operator mode, touching the rectangle that encloses a particular group causes a chain to a configurer specified display, normally the standard 4 loop group display associated with the particular group.

Standard 4 Loop Group Template

Figure 66:
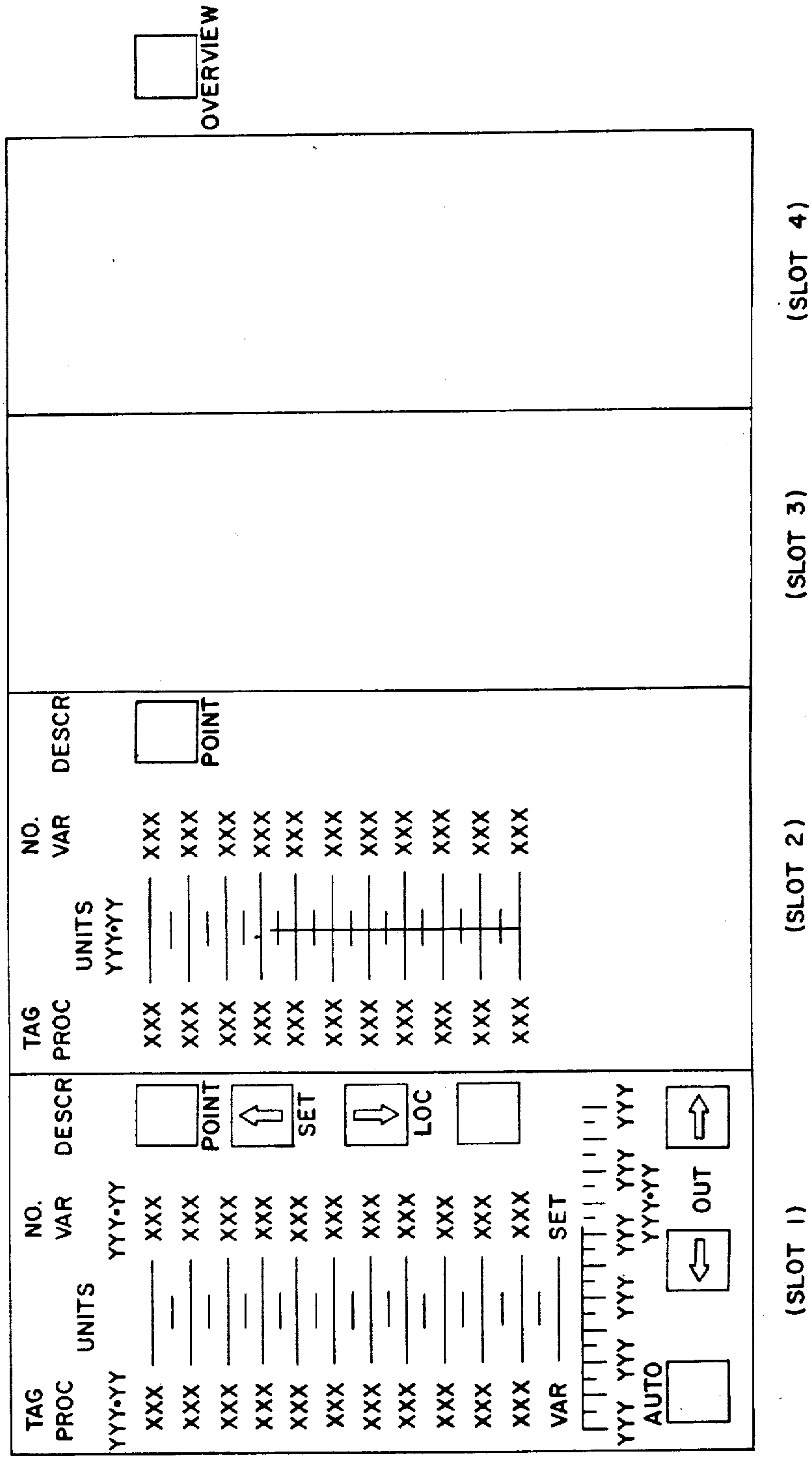
FIG. 66 is a monitor screen layout for a four loop group template.

The standard 4 loop group template is shown in FIG. 66. This template is a visible template that presents a four slot instrument case. Each slot 349 may be configured as either a blank faceplate, a controller faceplate, or an indicator faceplate. In FIG. 66, a controller faceplate is shown in Slot 1, an indicator faceplate is shown in Slot 2 and blank faceplates are shown in Slots 3 and 4.

When a controller or an indicator faceplate is presented as part of a standard 4 loop group display, a detail button 350 appears in the faceplate's upper right corner. Touching the detail button in the operator mode causes a chain to a configurer specified display, normally the standard point display associated with the faceplate in which the detail button is located.

The standard 4 loop group template also presents an overview button 351. Touching the overview button in the operator mode causes a chain to a configurer specified display, normally the standard 4 loop overview display associated with the standard 4 loop group display being viewed.

Standard 8 Loop Overview Template

Figure 67:
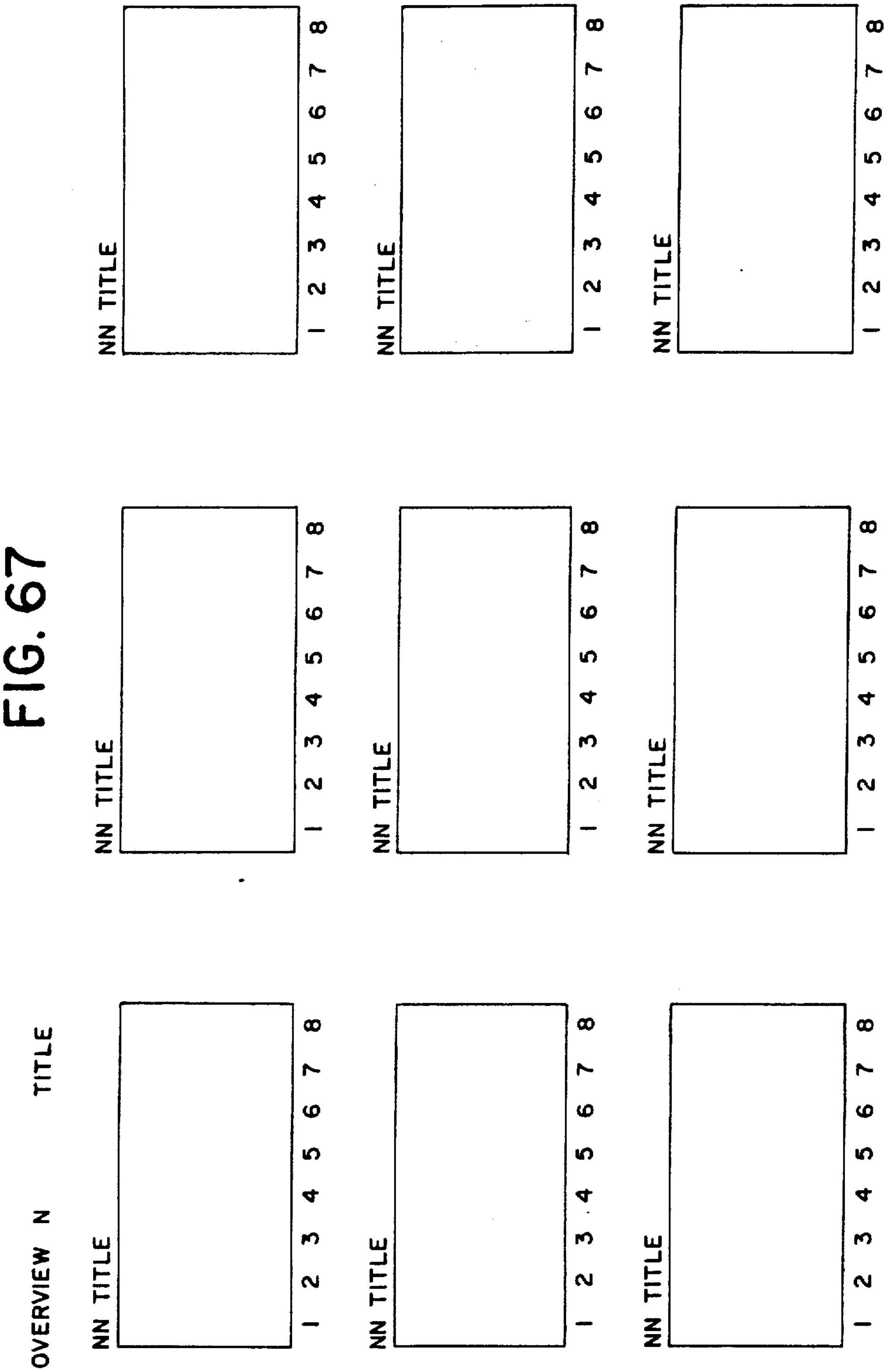
FIG. 67 is a monitor screen layout for an eight loop overview template.

The standard 8 loop overview template is shown in FIG. 67. This template is a visible template that presents nine groups 353 of eight points each. A point may be a controller, or an indicator, or may be discrete or unused (blank).

Controllers, indicators and discrete points 353 are depicted in this template in a manner analogous to that described for the 4 loop overview template.

In operator mode, touching the rectangle that encloses a particular group causes a chain to a configurer specified display, normally the standard 8 loop group display associated with the particular group.

Standard 8 Loop Group Template

Figure 68C:
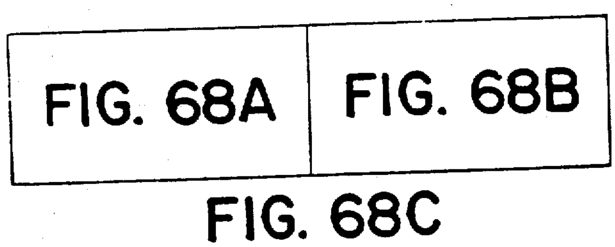
FIG. 68C is a diagram showing how
Figure 68A:
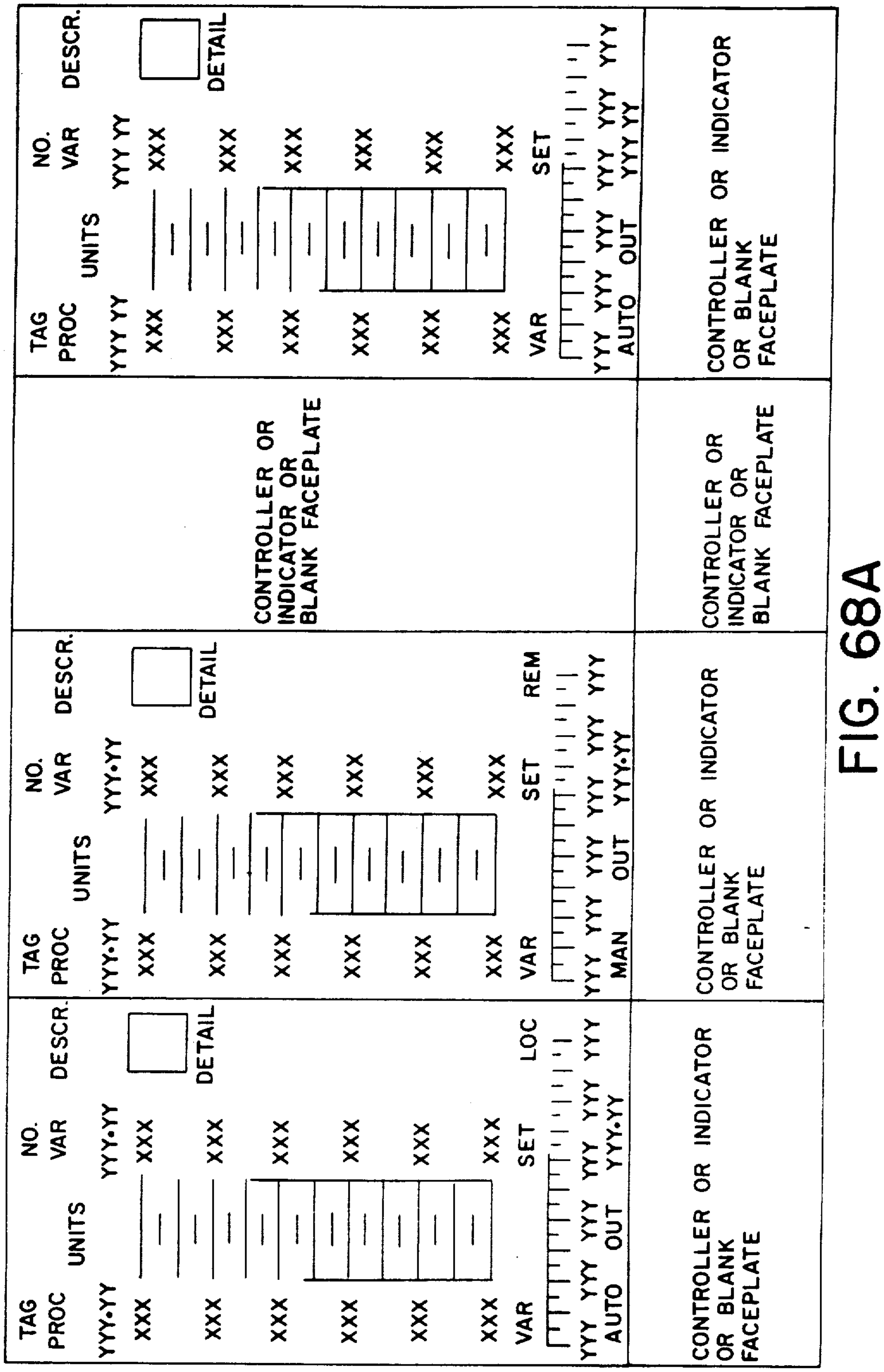
FIGS. 68A and 68B form a monitor screen template for an eight loop group template.
Figure 68B:
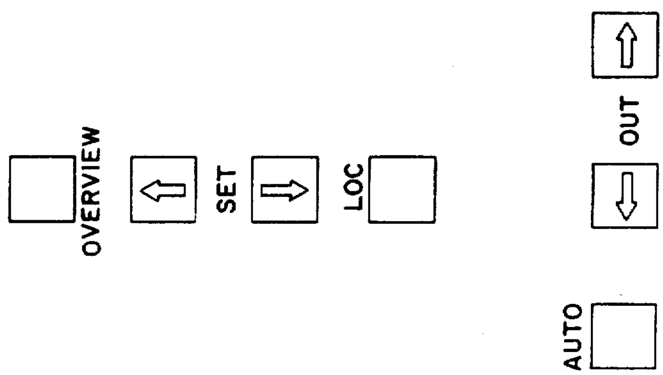

The standard 8 loop group template is shown in FIG. 68. This template is a visible template that presents eight faceplates 355, each one of which can be configured as a controller, an indicator, or a blank.

The controller faceplate presented on the standard 8 loop group template is similar to that presented on the standard 4 loop group template, except that the faceplate height is reduced by removing the setpoint slew buttons 356, local/remote setpoint button 357, auto/manual button 358 and output slew buttons 359 and compressing the vertical measurement scale.

The indicator faceplate presented on the standard 8 loop group template is similar to that presented on the standard 4 loop group template, except that the faceplate height is reduced by compressing the vertical measurement scale.

In operator mode, touching any spot inside a particular controller or indicator faceplate, except for the detail button, causes the common button set on the right of the display to apply to the particular faceplate.

In operator mode, touching the detail button 350' inside a controller or indicator faceplate causes a chain to a configurer specified display, normally the standard point display associated with the faceplate in which the detail button is located.

In operator mode, touching the overview button 351' causes a chain to a configurer specified display, normally the standard 8 loop overview display associated with the standard 8 loop group display being viewed.

Standard Recipe Table Template

Figure 69:
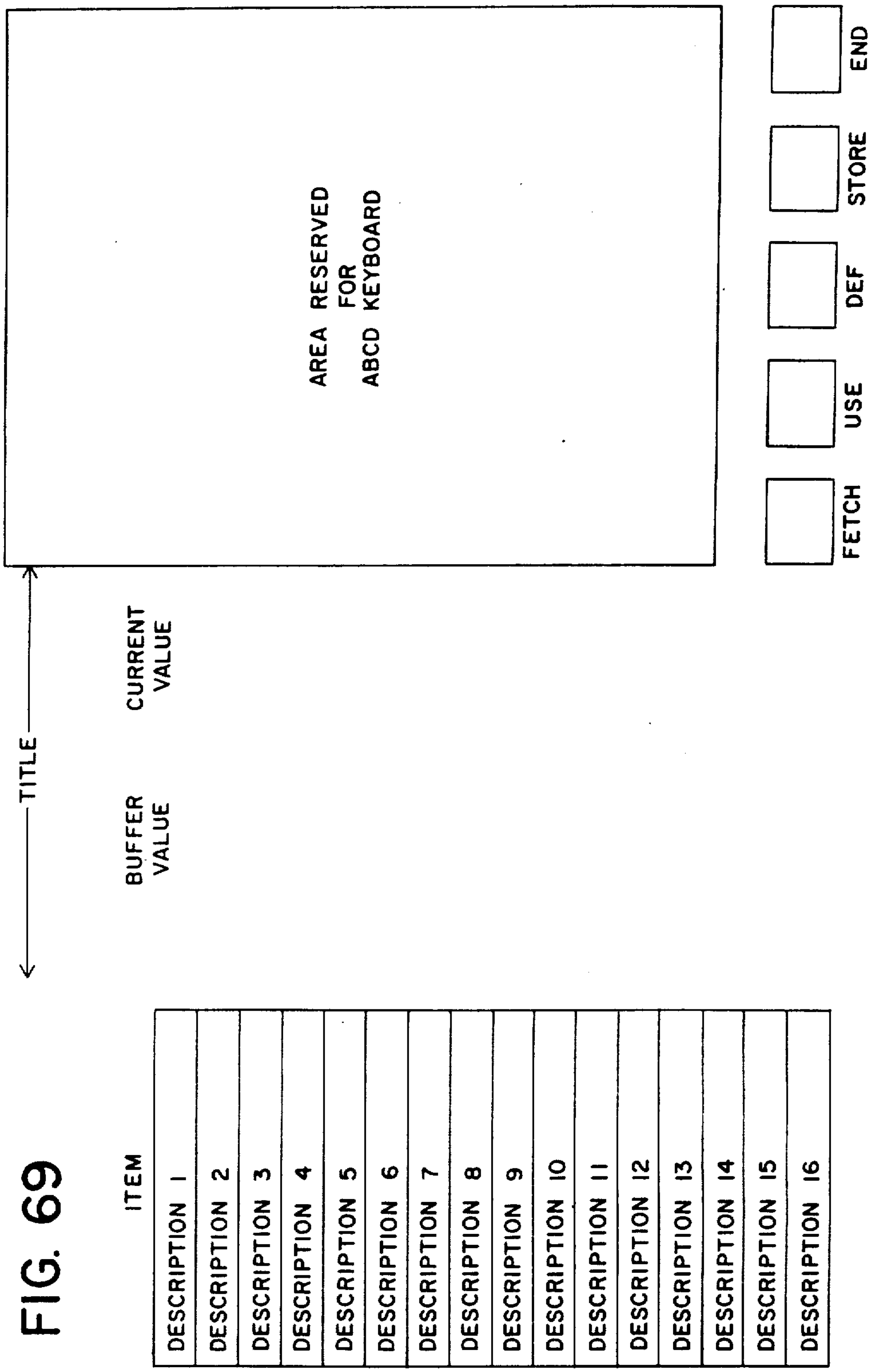
FIG. 69 is a monitor screen layout of a recipe table template.

FIG. 69 illustrates the standard recipe table template. This template is a visible template that supports all functions related to recipe definition and use.

The following files are associated with a standard recipe table display:

(1) One or more recipe buffers 361. A recipe buffer defines a set of data that may be used to control a particular segment of an industrial plant.

(2) One recipe table 362. The recipe table defines the set of data that is currently being used to control the particular segment of an industrial plant.

The structures of the recipe table and the recipe buffer(s) associated with a standard recipe table display are always identical.

In operator mode, all recipe buffers associated with a standard recipe table display are memory resident if the display has been configured as memory resident. Where the display has been configured as disk resident, only the current recipe buffer associated with the display is memory resident; the remainder are disk resident.

The standard recipe table template divides the man-machine interface screen into three columns of 16 lines each. The lines in the left column are configured as recipe data descriptors (character string constants). The lines in the center column are configured as variables whose current values are the values of the variables in the current recipe buffer. The lines in the right column are configured as the variables in the recipe table.

Real variables are written to the screen with two digits on the right of the decimal point.

In operator mode, when a standard recipe table display is presented for the first time following MMI startup, both the contents of the current recipe buffer and the contents of the recipe table associated with the display are undefined.

The standard recipe table template provides an optional, configurer selectable set of buttons (define button, start button and end button) that enables a user to define and store to disk the contents of a recipe buffer using a standard recipe table display in the operator mode.

A standard recipe table display always presents a standard set of buttons (fetch button 363, used button 364).

In operator mode, touching the optional define button 365 causes the following sequence of events to occur:

(1) An ABCD keyboard is presented on the right of the screen.

(2) A button appears behind each recipe dated item in the center (current recipe buffer) column.

(3) The operator can modify any recipe data item in the center column by touching the button behind the recipe data item's description and then entering its new value on the ABCD keyboard.

(4) The operator can store the current recipe buffer to disk by touching the store button 366 and entering valid file name on the ABCD keyboard. If the current recipe buffer is not stored to disk at this point, its contents are not permanently retained.

(5) The operator terminates the recipe definition by touching the end button 367. This requires the existence of an entire standard recipe table display with the operator modifications shown in the current recipe buffer.

In operator mode, touching the fetch button 363 causes the following sequence of events to occur.

(1) An ABCD keyboard is presented on the right side of the screen.

(2) A message is presented directing the operator to enter a new product ID.

(3) The operator enters the new product ID on the ABCD keyboard.

(4) The recipe buffer associated with the entered new product ID is transferred into the current recipe buffer and the standard recipe table display is redrawn.

In operator mode, touching the used button 368 causes the contents of the current-recipe buffer to be transferred, word for word, to the contents of the recipe table (i.e., causes the current recipe buffer to be downloaded to the appropriate programmable controller(s)).

In operator mode, a boolean "Use" parameter is set whenever the use button is touched(i.e., a recipe download occurs). Once set, the "Use" parameter remains set until cleared by external means (normally, the sequence logic in the PC acknowledges receipt of the downloaded recipe data).

MAN MACHINE INTERFACE PERFORMANCE

Display Generation/Update Speeds

The maximum elapsed time between the selection of a "qualified" display and its completed image being displayed is 7 seconds. The initial observable response is 1 second. The display selection buttons are the last figures to disappear from the old image and the first figures to appear on the new image when a new display is selected. This facilitates rapid pagination through the MMI system with large numbers of displays. A qualified display requires a screen area which is 25% display loaded with up to 64 variable figures.

The touch of a button always provides instantaneous feedback that the requested action has been scheduled for execution.

Storage Capability (both core and disk)

For each 256 kilobyte (KB) of additional memory, the man-machine interface system supports a minimum of 2000 analog and 5000 discrete points either real or derived. The system supports a standard point display for each of these points, a generic standard group display for each group or eight points and standard overview display for each group of 72 points. In addition to these standard displays, each 256 KB permits an additional 300 custom templates to be defined. Any time during the configuration process, the user may interrogate the system for an assessment of the remaining unused system capacity.

Benchmarks (Standard Templates)

(1) Overview template
  Criteria—draw with all options in 0.9 seconds when completely configured.
(2) Group Template (drawing later)
  Criteria—Draw in 0.5 seconds when completely configured.
(3) Standard Point Template
  Criteria—draw with all options in 0.6 seconds when completely configured.
(4) Multitrend template
  Criteria—draw in 1.0 second when completely configured.

TABLE 25

Definitions

These definitions are in alphabetical order and appear capitalized in the text for reader reference.

| | |
|---|---|
| ARGUMENT: | A variable used in a CALLING SUBPICTURE whose value is communicated between the CALLING SUBPICTURE and a lower level SUBPICTURE by including the variable's identifier in the DISPLAY LANGUAGE COMMAND in the CALLING SUBPICTURE that calls the lower level SUBPICTURE. |
| BUTTON: | A rectangular area on the monitor screen, either visible or invisible, that, when touched, causes an event to occur. |
| CALLING SUBPICTURE: | A subpicture that calls another (lower level) subpicture. |
| CHAIN BACK: | A DISPLAY LANGUAGE COMMAND that, when executed, causes the "source" DISPLAY that CHAINED TO the current "destination" DISPLAY to be interpreted in lieu of the current "destination" DISPLAY. |
| CHAIN TO: | A DISPLAY LANGUAGE COMMAND that, when executed, causes a "destination display" to be interpreted in lieu of the current "source" DISPLAY and causes the name of the "source" display to be saved in order to enable a subsequent CHAIN BACK (return) to the "source" DISPLAY from the "destination" DISPLAY. |
| CHARACTER LIBRARY: | A TEXT LIBRARY or a SYMBOL LIBRARY. |
| COLOR LIBRARY: | A file that defines a ZONE MAP and four COLOR PALETTES. |
| COLOR PALETTE: | A 16 entry table in which each entry defines two color codes. |
| CONFIGURATION: | An operation in which a user CONFIGURES a TEMPLATE. |
| CONFIGURE: | To make a TEMPLATE application specific by associating UNDECLARED VARIABLES in the TEMPLATE with the names of registers and/or coils in the PLANT DATA BASE. |
| CONFIGURER: | A person who CONFIGURES TEMPLATES |

TABLE 25-continued

Definitions

| | |
|---|---|
| | or re-CONFIGURES DISPLAYS. |
| CREATING SUBPICTURE: | The subpicture in which a particular LOCAL VARIABLE, GLOBAL VARIABLE or parameter is created via an appropriate display language command. |
| CUSTOM DISPLAY: | A DISPLAY produced when a user CONFIGURES a CUSTOM TEMPLATE. |
| CUSTOM TEMPLATE: | A user designated TEMPLATE. |
| DESIGN: | To build or modify a TEMPLATE, DISPLAY or SUBPICTURE by modifying the contents of a FILE of DISPLAY LANGUAGE COMMANDS. |
| DESIGNER: | A person who DESIGNS TEMPLATES or re-DESIGNS DISPLAYS. |
| DIRECTORY: | A list of the names of FILES. Each FILE name in a DIRECTORY is unique. A DIRECTORY is further defined in the specification under subheading "DIRECTORIES". |
| DISPLAY: | A complete program consisting of DISPLAY LANGUAGE COMMANDS that is application specific. A DISPLAY is further defined in the specification under subheading "DISPLAYS". |
| DISPLAY FILE: | A file (either memory or disk resident) that consists of the interpretable code for one or more DISPLAYS, some of which may be chained together by means of CHAIN TO and CHAIN BACK commands. |
| DISPLAY LANGUAGE: | The high level graphic programming language that, when interpreted, causes images to be drawn on the monitor screen and user designed calculations and other operations required of the MMI to be performed. |
| DISPLAY LANGUAGE COMMAND: | A statement written in DISPLAY LANGUAGE. |
| DISPLAY TASK: | A task that runs on the operating system and interprets a particular DISPLAY FILE. |
| FILE: | The data that defines a TEMPLATE, DISPLAY, SUBPICTURE, MENU, TEXT LIBRARY or SYMBOL LIBRARY. |
| GLOBAL VARIABLE: | A variable that is known to each of the SUBPICTURES of a particular DISPLAY in which the variable is CREATED in a DISPLAY LANGUAGE "Create Global Variable" command. |
| INVISIBLE DISPLAY: | A DISPLAY that, when interpreted, does not draw an image of the monitor screen but does perform application specific arithmetic and/or logical calculations based on actual plant operating conditions. |
| INVISIBLE SUBPICTURE: | A SUBPICTURE that, when interpreted, does not draw an image on the monitor screen but does perform application specific arithmetic and/or logical calculations based on actual plant operating conditions or other special operations. |
| INVISIBLE SUBPLATE: | A TEMPLATE that, when interpreted, does not draw an image of the monitor screen, is not application specific and cannot access actual plant operating conditions. |
| LOCAL VARIABLE: | A variable that is known only to its CREATING SUBPICTURE and all subpictures called by its CREATING SUBPICTURE. A local variable is created via a DISPLAY LANGUAGE "create LOCAL VARIABLE" command. |
| MENU: | An image, drawn on the screen, that presents BUTTONS utilized by a user to select program options. Unless otherwise prefixed by the word "custom", all MENUS referenced herein are part of the MMI. |
| OPERATOR: | A person who utilizes the MMI to control and/or monitor an industrial plant. |
| PARAMETER: | A variable used in a SUBPICTURE whose value is always communicated to/from the SUBPICTURE by/to a calling SUBPICTURE. Each parameter in a subpicture is created via a DISPLAY LANGUAGE "create PARAMETER" command included in the SUBPICTURE. |
| PARAMETERIZE: | To replace an argument in a DISPLAY LANGUAGE COMMAND that, by default, is a |

TABLE 25-continued

| Definitions | |
|---|---|
| | constant, with an expression containing one or more variables. |
| PLANT DATA BASE: | A collection of data points used to link displays and SUBPICTURES with the internal registers and coils in the programmable controllers on a communication network interfaced with MMI and to facilitate inter-DISPLAY communication. |
| PROGRAMMER: | A person who directly utilizes the features of the operating system supplied with the MMI. |
| STANDARD DISPLAY: | A DISPLAY produced when a user CONFIGURES a STANDARD TEMPLATE. |
| STANDARD TEMPLATE: | A TEMPLATE furnished with the MMI. |
| SUBPICTURE: | A complete program or a subroutine written in DISPLAY LANGUAGE. A SUBPICTURE is further defined in the specification under the subheading "SUBPICTURES". |
| SYMBOL LIBRARY: | A FILE that defines a set of 128 graphic symbol fonts. |
| TEMPLATE: | A complete program or subroutine consisting of DISPLAY LANGUAGE COMMANDS that can be used for multiple applications and is not application specific. |
| TEXT LIBRARY: | A FILE that defines a set of 128 text fonts, (ie. alphanumeric characters, punctuation marks, etc.) |
| UNDEFINED VARIABLE: | A variable whose identifier is referenced in a SUBPICTURE and has not been created as a LOCAL VARIABLE, a GLOBAL VARIABLE or a PARAMETER in the SUBPICTURE. |
| VISIBLE DISPLAY: | A DISPLAY that, when interpreted, draws an application specific image on the monitor screen and can access and/or depict actual plant operating conditions. |
| VISIBLE SUBPICTURE: | A SUBPICTURE that, when interpreted, draws an application specific image on the monitor screen and can access and/or depict actual plant operating conditions. |
| VISIBLE TEMPLATE: | A TEMPLATE that, when interpreted, draws an image on the monitor screen that is not application specific and cannot access or depict actual plant operating conditions. A VISIBLE TEMPLATE is normally configured to produce a VISIBLE DISPLAY or a VISIBLE SUBPICTURE. |
| WINDOW: | A continuous area of the monitor screen that is written to by one and only one active DISPLAY. |
| ZONE: | A rectangular sub-division of the monitor screen. The monitor screen is 15 zones wide × 10 zones high. |
| ZONE MAP: | A table that maps each of the 150 ZONES on the monitor screen to one of the four color palettes usable by the VIDEO CPU at any given time. |

MAN MACHINE INTERFACE GRAPHIC LANGUAGE

Graphic Language Background

The present man-machine interface incorporates a high level graphic language for facilitating the generation of displays by a designer their configuration by a configurer, and the updating of variable information concerning system variables during operator mode.

In general there are three basic techniques for generating graphic displays. One is known as the data structure approach, the second is a procedural approach and the third is an approach set forth in a language called SMALL TALK as described in "The Small Talk Graphics Kernel" by Daniel H. Ingalls, *Byte Magazine,* August 1981.

In the data structure approach, graphical displays are generated by data blocks, each block having numbers and pointers connected together with each data block representing some entity on the screen, such as a point, a line, an arc, etc. The data block therefore include information regarding the object such as coordinates if the object to be displayed is a point. If the item to be displayed is a line, the data block includes pointers or references indicating the end points of the line with a further instruction to have a trace made between those two end points.

The data structure approach has the advantage in that the data structure represents the topology of the picture and that changing the coordinates of one point changes everything attached or referenced to that point when the picture is re-drawn. This approach also allows programs to explore the data structure at will, rather than being constrained to some particular order of execution. The data structure approach, due to its nature of representing objects on the screen, allows the user to directly access an object on the screen through the use of a cursor or light pen to point.

A major disadvantage of the data structure approach is that it is difficult to delete a portion of an object due to the fact that other parts of that object point to or make reference to that portion. Therefore all of these pointers must be cnanged if the graphic representation is to be completed. Furthermore, this approach makes fairly heavy use of memory and is not as compact in its code as the procedural approach to be described below.

In the procedural approach, a program is generated that consists of commands for moving the cursor about the screen so as to generate an image regardless of its complexity. Any image is therefore expressed as a sequence of such commands analogous to the type of display which is generated by a hypothetical sky writer leaving a trail of smoke as the plane moves in two dimensions. A principal advantage of the procedural approach is that it is very compact in its coding implementation because it does not require the overhead of pointer storage as found in the data storage technique. Rather it uses a linear sequence of commands to be executed by an interpreter.

An early version of such a procedural graphic language was developed for the IBM 2250 computer during the early 1960's. In it, a vector display console had a buffer. The computer drew a picture and loaded into the buffer as a sequence of commands for moving the cursor so as to leave or not leave a trace as the cursor moved. The commands themselves were interpreted by hardware thereby yielding a fast updating of the graphic display. Though the implementation was fast, the machine language hardware interpretation did not provide for conditional jump instructions, subroutine call instructions, nor the ability to modify the memory structure. All of these techniques are incorporated in the man-machine interface of the present invention. Indeed, the present invention extends the procedural approach so as to become a universal graphic programming language in the sense that it can modify memory, perform conditional jumps, and execute subroutines. This approach thereby attains a great deal of flexibility that is not easily achievable through other techniques.

For example, in the data structure approach, if an object is to be deleted such as a line segment, that line segment cannot be simply erased due to the other line segments or things that make reference to it. In essence the line is in the middle of a graphic nest and therefore its deletion requires a symbolic clipping of the other pointers that make reference to it in order that the overall graphic change can be implemented.

In the procedural approach, the line segment is simply deleted since the graphic implementation is merely the graphic interpretation of a sequence of commands. By deleting one command, only that command is affected and not the others.

The third graphic technique is that implemented in the Small Talk TM language as discussed in the previously cited *Byte Magazine* article. This approach is a combination of the procedural and data structure representations. In the Small Talk approach, a picture is built in a manner similar to a data structure method in that an object such as a point is a piece of data structure which contains the data required to define that point, such as its coordinates. The Small Talk approach in addition contains an attached procedure, or attached commands. Thus the Small Talk approach is more akin to a language than a data structure. The basic rule in Small Talk is that one does not do anything to a piece of data structure but rather the data structure performs the task that you wish to implement. For instance, the way that one would move a point ten units to the right would not be to obtain the coordinates for that point and add 10 units to the X Cartesian coordinate, with the redrawing of that point as modified; but rather a message (command) would be made to the data structure for that point to have the point move itself to the right by 10 units.

It is similar in concept to a society of sovereign entities which only work through mutual cooperation. Other things which can be implemented are the actual display of a point, and the implementation of lines and other objects. A message can thus be sent to a portion of the Small Talk graphic implementation to have that particular data structure display itself or to erase itself or to perform some other modification to itself.

The Small Talk implementation combines the advantages of the procedural implementation with those of the data structure implementation in that one obtains flexibility in the description of a graphic design which allows modification of the design to take place under local control. In addition, it allows for the buildup of topological information into the data structure in a manner akin to the data structure approach. This latter aspect is something that is not easily obtainable in the procedural approach since in the procedural approach there is no actual unit ot information representing a displayable object but rather the information stored in a sequence of commands for generating a displayable object.

The primary disadvantage of the Small Talk approach is that it is relatively difficult to implement for a given functional specification since there are significant data management problems due to the fact that pieces of data plus program commands have to be allocated and deallocated as they point to one another. There is also the problem—though of a less severe nature—similar to that in the data structure approach, with respect to deletion of objects and its requirement that referencing points be updated so as to properly point to the correct portion of the graphics taking into account that portion which has been deleted.

DETAILED DESCRIPTION OF THE GRAPHICS LANGUAGE STRUCTURE

The graphic display high level language forming part of the man-machine interface accomplishes graphic display through a procedural technique in which displays are generated through use of a display editor. The display editor is similar to a string editor for writing programs in a high level language such as BASIC or Pascal. The concept utilizes a string of commands where the user can insert and delete commands until the desired graphical display is obtained.

The difference between the display editor and a string editor used with standard programming languages is that each time a change is made to the graphic display program, it is re-executed so as to reproduce the display that it describes. As shows in FIG. 12, when in the display editor mode, the user is shown on screen 70 actual commands being implemented by the user at editing window 152. Thus if the first line of the program causes a point A to be located on the screen with absolute reference to origin 0, a move absolute command is called specifying the coordinates and X1 and Y1 desired. Simultaneously, the cursor is moved A on the screen. The next command desired by the user in this example is a draw line relative command from the current position of the cursor (that is, point A) to a new point B defined by the change in the X and Y directions representing the horizontal and vertical directions of the screen. For instance delta X and delta Y could be 30 units to the right (horizontal) and 10 units up (vertical). The editing window then presents the draw line relative information to the user in textual form while the display cursor moves to position B with a trace left between points A and B representing the desired line.

If a plurality of lines have been drawn and a particular line is to be deleted, the user in the display editor simply moves through the program lines in the editor window until the cursor moves to the location on the screen corresponding to the line for which deletion was desired. The command for drawing that particular line is then removed and the remaining commands re-executed so as to show the display after the change had been made. An example of this is shown in FIG. 13 where segments 1, 2, 3, 4, 5, and 6 have been previously drawn and their commands displayed in the edit window 152. These commands could include a move absolute to point A with "line draw relative" commands sequentially executed from that point on. It is also possible that this display could be obtained with a polygon command. This command and others are described in detail in a later section entitled "Graphic Language Host Interpreter"

If line segment 1 is to be deleted, the user simply scrolls through the program steps shown in window 152 until the cursor is at the location corresponding to line segment 1. The user then deletes the command for drawing line segment 1 and the remaining lines are then be redrawn. In this particular case since line segments 2, 3, 4, 5, and 6 are all drawn relative to the previous position of the cursor, if line segment 1 is deleted the beginning point of line segment 2 is no longer at position B but is rather at position A. Thus the re-drawing of this previous polygon with line segment 1 deleted appears as shown in dotted in FIG. 13. It is seen that the polygon has in essence been shifted with an open space left where a line segment 1 previously appeared. This is the technique used by the procedural graphic language according to the present invention.

The present invention also allows the uses of specified colors, movements and many other grahical commands which are described more fully in previous subsections.

In FIG. 14 a vat 153 has been drawn on the screen by first defining an absolute move from origin 0 to point A with a circle then drawn from point A. Line segments 1 and 2 are then drawn relative to this vat, segments 1 and 2, the latter line segment perhaps continuing so as to interconnect with other portions of the process environment for which a display is desired. If for some reason, the entire display needed to be moved, say, in the horizontal direction, the re-drawing of the display is a straightforward matter. In particular, the user instead of having a move absolute from the origin to point A could simply re-define a move absolute from the origin to position B, leaving unchanged the remaining commands in the edit window. The display drawn would then be a move absolute to position B and a re-drawing of the remaining commands, so that the entire display would be shifted to the right. This is shown in phantom in FIG. 14. It is thus seen that modificiations to the display can be readily obtained with the high level graphic language embodied in the present man-machine interface.

The above examples illustrate that the commands forming part of the graphic language include both relative movement commands and absolute movement commands, wherein the former relate to a movement from the current position of the cursor while the latter refer to a movement with respect to some predefined origin point.

To implement the procedural graphic display language, the present invention has a host CPU display (graphic) editor (executed by CPU module 22) and a video station display (graphic) editor (executed by video CPU module 26). Both editors (interpreters) utilize a similar command language structure. As more fully described with respect to the host display interpreter and the video station display interpreter, the commands for drawing graphic images comprise various line movements, line draws and other commands regarding color and movement of images on the video display.

In particular the host CPU module can retrieve and interpret what are known as Configured Display Files (CDF's) which represent the commands for specifying an action to be performed for graphic display.

Figure 15:
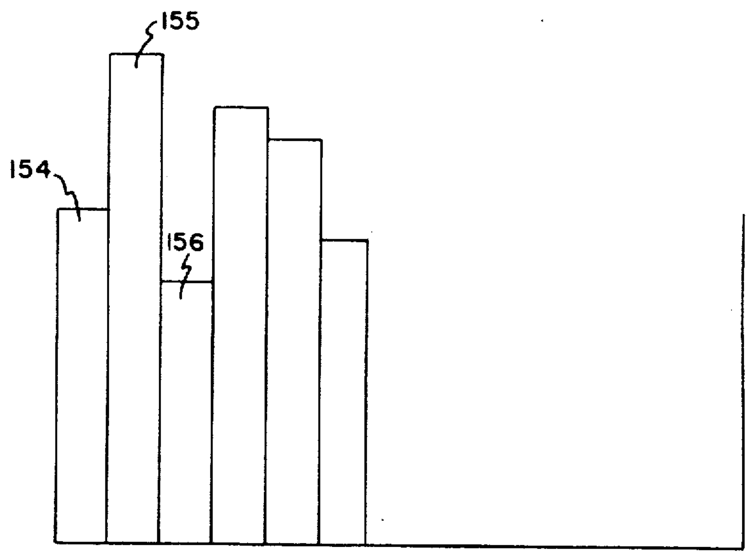
FIG. 15 is a diagrammatic representation of bar trend graph implemented on the monitor of the present invention.

The present invention utilizes the concept defined herein as "dynamic updating" for parts of the screen image. That is, the information as interpreted by the Host CPU is initially presented to the video station CPU where the host interpreted commands are further interpreted so as to actually draw the display on the monitor. In most applications, the display generated on the monitor comprises mostly non-varying information. For the trend bar graphs shown in FIG. 15, only the height of the bars 154, 155, 156, etc. would vary. The remaining portion of the image does not vary with time. To accomplish this in an efficient manner, the present invention re-executes only those portions of the graphic commands which are defined as dynamic variables. In this example, the dynamic variables correspond to the height of the bars and not to the remainder of the display, including the border for the bar graph.

GRAPHIC LANGUAGE HOST INTERPRETER

Overall Purpose and Function

The graphic language interpreter accepts sequences of commands in graphic language and executes them to produce displays and to perform display related processing. The smallest independently executable module of display language is a subroutine, referred to as a subpicture. The subpicture is delineated with pointers into a display or graphic language buffer by the program which invoked the interpreter.

The graphic language presents an interface between the display tasks written by the user of the MMI and the system facilities. The interpreter causes the commands contained in the subpictures to be executed in such a manner that the actions of those commands as described herein are performed by the system equipment and software.

The MMI system facilities with which the interpreter communicates include:

video CPU hardware/software complement
database manager
file system

The interpreter is used by several independent tasks as shown in Table 100. These tasks may be executed concurrently.

TABLE 100

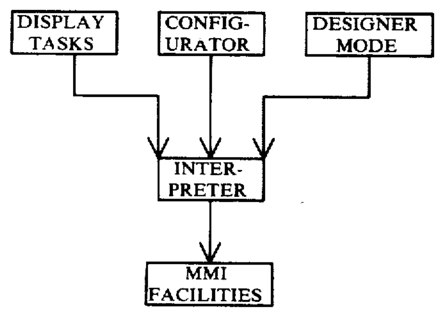

General Functional Breakdown

The overall functions mentioned earlier can be broken down into major categories. Each of the following subsections discusses one of the major functional categories of the interpreter.

Scope of the Graphic Language

The graphic language is the interface which allows user programs to access the MMI hardware and software facilities. Therefore, a description of the graphic langauge contains a large part of the functionality of the graphic language interpreter.

The graphic language is a general-purpose language. Special features of the language are optimized for the unique requirements of the MMI function; e.g., graphics generation and data base access. However, general commands such as flow control and expression evaluation are included to make the language complete.

The generality of the language is such as to allow a self-referencing capability; i.e., the ability to write the graphic language interpreter in the graphic language itself. This feature allows the system to be enhanced through the use of the system itself. It also facilitates updating the language.

The interpreter has three formats for the storage of display tasks:

buffer format
file format
user format (surface syntax)

Buffer format is the only format executed directly by the interpreter. File format and user format are translated to and from the buffer format for execution.

Buffer format is a machine-readable format which is optimized for fast execution and conservation of memory space. Buffer format is the result of translating from either file format or user format.

File format is a stand-alone format in which all necessary information about the display task is stored as a logical unit. This information includes:

variable names
parameter names
subpicture names
internal program labels

The file format is used to store the display tasks on permanent storage. It is translated into buffer format for execution at which time some of the information about the display task may be moved into tables for rapid access.

User format is a human-readable format for interface with the designers of system software. This format presents the display language to the user (via the edit window 152, see FIG. 12) as a normal algorithmic programming language. The input from the operator is parsed into buffer language for execution, and the existing display tasks are deparsed for viewing by the operator. User format is not stored.

Interpreter Performance

The interpreter executes display tasks rapidly enough to provide real time response to the video CPU. The real time requirements are specified in detail in the MMI section.

To ensure that the interpreter is able to meet its real time performance requirements, it has two modes:

display mode
update mode

The display mode causes an entire display and all of its calls to be executed for the purpose of initial display of the graphics. The update mode causes only selected parts of the display to be executed for the purpose of updating only those parts of the display which are subject to change. Thus, the static parts of the display are drawn only once for each invocation of the display, and the dynamic parts are redrawn many times at a specified interval.

The interpreter is capable of supporting more than one independent display window on the same video CPU module. It also is capable of driving independent windows on more than one video CPU module. It does this in such a way as not to place unnecessary demands on the memory (RAM) of the MMI host CPU (generally with respect to memory module 24).

File Access Interface

The interpreter interfaces with the operating system file utilities in order to provide storage required by the display tasks.

Data Base Access Interface

The interpreter interfaces with the data base manager in order to provide access to the data required by the display tasks.

Video CPU Module Access Interface

The interpreter interfaces with the video CPU module hardware/ software complement to provide the actual execution of the graphics on the displays.

Re-Entrancy

The interpreter is written as re-entrant code to save random access memory space while allowing the execution of multiple display tasks concurrently.

The display language interpreter is written so that it is re-entrant, allowing several display processes to use the code concurrently. The bulk of the work performed by the interpreter is done in the display routines. These routines actually interpret the graphic language commands. Program modules and routines are called as necessary in response to the execution of display language commands in a display process.

An overview of the interpreter showing its relationship to the display processes and to MMI is shown in FIGURE. It can be seen that the interpreter is central to the operation of MMI. Besides the user-defined display processes (which run in operator mode), other tasks which use the interpreter include:

(1) designer mode process;
(2) configurator mode process.

The interpreter knows which of these three basic modes it is operating in. The specific actions which it performs depend upon which type of process has called the interpreter. In addition to the design and configurator modes, the operator mode is further divided into two modes, i.e.:

(1) display mode,
(2) update mode.

This feature is described in the subsection entitled Operator Mode Support and elsewhere in this section. The implementation of update mode is a primary design factor for the overall graphic interpreter language. It greatly facilitates generation of real-time displays.

MAJOR INTERPRETER MODULES

The interpreter code consists of a number of major program modules which are integrated to perform the interpretation of the graphic language. Each module performs one major function for the interpreter. This subsection lists these major modules and describes their functions. The actual routines which make up the modules (of which there may be several in each module) are described later.

The major program modules are:

(1) Display
(2) Readin
(3) Writeout
(4) Compress
(5) Decompress
(6) Parse
(7) Deparse
(8) Name table handler.

The interaction of these modules is illustration in FIGURE.

The display routines forming the display module are central to the interpreter since these routines actually interpret the graphic language commands. The other modules are used as necessary to perform the actions demanded by the display language command.

Readin and Writeout are modules which handle the loading and saving of Configured Display Files (CDF). The CDF's contain the commands specifying the actions to be performed by the display tasks. The translation of the CDF's to and from the internal buffer format required by the interpreter is performed by these modules. Readin reads the specified CDF from permanent storage and translates it from file format into buffer format. Similarly writeout translates display language buffer format into file format and writes it to permanent storage.

Compress and Decompress perform inverse functions on strings of graphic language in buffer format. Compress translates buffer format into accelerated buffer format. Decompress translates accelerated buffer format into normal buffer format. The main transformation which takes place is the evaluation of all constant values in the graphic language program so that the interpreter can send the string directly to the video CPU module at execution time. This provides an increase in execution speed depending upon the content of the display language program. Programs in accelerated buffer format can be written to and read from permanent storage in the same manner as programs in normal buffer format.

Parse and Deparse also perform inverse functions. The parser translates from the surface syntax (user format) into buffer format. The deparser translates from buffer format into user format. The user format is a human readable format for presentation to the user via an editor window (52) forming part of screen 72 (see FIG. 12). The window may be mofed by the user. Thus the user format may state that a line has been drawn from point A to point B while the graphic language command is a "draw line relative" command represented by the character "1" with two x-z coordinate pairs specified. A printout of the graphic commands to display a plurality of instrument faceplates is given in Appendix A.

The Name Table module manipulates the runtime name tables, in particular searching for names and insertion or deletion of names.

DATA STRUCTURES

This subsection describes the data structures used by the graphic interpreter. These structures have been designed to provide efficient execution of the graphic language. The manner in which the data structures are used is described in detail in the subsections which describe the routines of the interpreter. The descriptions given here set the stage for an understanding of those later subsections.

A copy of each of the structures described here exists for each display process in the MMI system. Since the interpreter code is re-entrant, each invocation of the interpreter considers that its structures are unique. Only the cosmic data (see below) are available to more than one display process. The cosmic data base is therefore manipulated by a data base manager.

Graphic language procedures can be considered as strings, and therefore can be passed around as such. A pointer to a procedure is just a pointer to a string (which is how the string type is implemented in Pascal.

Special data structures are used to store graphic language variables. The scope of a variable in the graphic language can belong to one of three ranges:

(1) local
(2) global
(3) cosmic

Local variables are accessible only to the procedure in which they are declared and to any procedures called by that procedure, unless the called procedure has a local variable with the same name.

Global variables are accessible to any procedure of a display process. They are not accessible to other processes. Global variables are similar to FORTRAN common variables in the way they are used.

Cosmic variables are accessible to any process or procedure in the system. The cosmic variables which are of interest to the user are contained in the Cosmic Data Base. Some other variables are cosmic, but they are generally for internal use only (i.e., the interpreter does not access them). All cosmic variables are accessed through the data base manager.

The names of the variables are maintained by the interpreter in a name table resident in global memory. The strings of characters which make up the actual names are manipulated only upon readin and writeout of the procedures. Internally, the names are represented as an index into the name table. This allows rapid searches to be performed at run time as well as saving space for name storage in the display language buffer.

The following data types are used in the display language:

(1) reals
(2) short integers
(3) integers
(4) long integers
(5) Booleans
(6) strings
(7) records All these types are not normally visible to the user. The user is normally interested only in reals and Booleans. The type of a variable is assigned to it along with a particular value rather than assigning the type once to the variable and forcing the values to conform to the specified type. Therefore a particular variable can contain values of widely varying types during a single execution of a single graphic language procedure. The type is really associated with the value rather than with the variable. This implementation method helps isolate the user from the problems associated with the typing of variables.

Thus any given variable, such as variable X on one occasion may represent an integer data type, on a second occasion may represent a string data type and on a third occasion may represent an array. By associating the data type with the value, a very reliable computing graphic display process can be implemented even if the variable for some reason does not exist. This encompasses the idea of an indefined variable or a default operator. Thus if one of the variables is undefined, the default operator instead of giving an undefined answer, gives a default value.

For instance if the variable X represented the height of a bar and if for some reason that process variable was defined by the user, its default value would instead be displayed on the chart rather than preventing any graphic implementation. The default value could be any specified number for the entire chart regardless of the particular process variable. This allows the graphic language program to run even though variables are unspecified; thereby greatly increasing the reliability of generating a display regardless of errors in its initial implementation. This is especially important in the process control environment where the operator needs to see certain information even if the display for presenting that information contains errors in its original implementation.

Since the type of value is associated with the value itself, the value is a record rather than a simple pattern of bits. The record contains the following fields:

(1) type
(2) integer value
(3) real value (4) name
(5) character values

The fields are overlaid in the record to save memory space. These records (called "r-values") are bound to the appropriate variables dynamically at execution time.

The values of the variables and the parameters are associated with them at execution time through the use of an association list. This is a linked list made up of association blocks. The association blocks have the following structure:

(1) number of references to the block,
(2) name table index
(3) a r-value,
(4) link pointer.

These blocks are linked onto the association list in a manner which makes the list emulate a stack. Free blocks are held on a Free pointer. The stack built by the association list is dynamic unless a snapshot is taken of the list. Snapshots are used to restore the state of the variables and parameters dynamically for update mode and button responses. Snapshots are taken by maintaining a pointer to the lowest level association block and then allowing the blocks to remain linked rather than returning them to the free pool of blocks. This is demonstrated in FIGS. 17 and 17.

Figure 16:
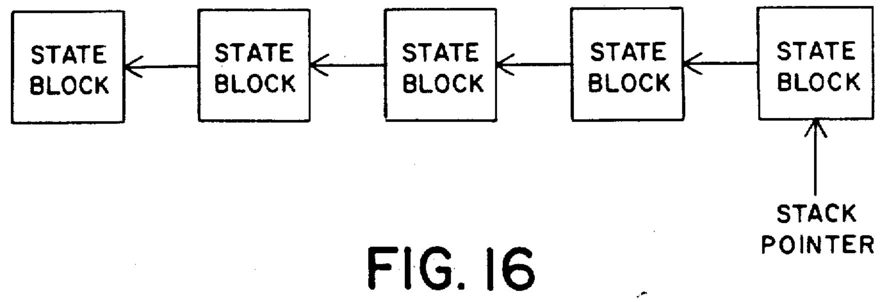
FIG. 16 is a block diagram illustrating the state blocks for implementing the high level graphics language in association with a stack pointer.
Figure 17:
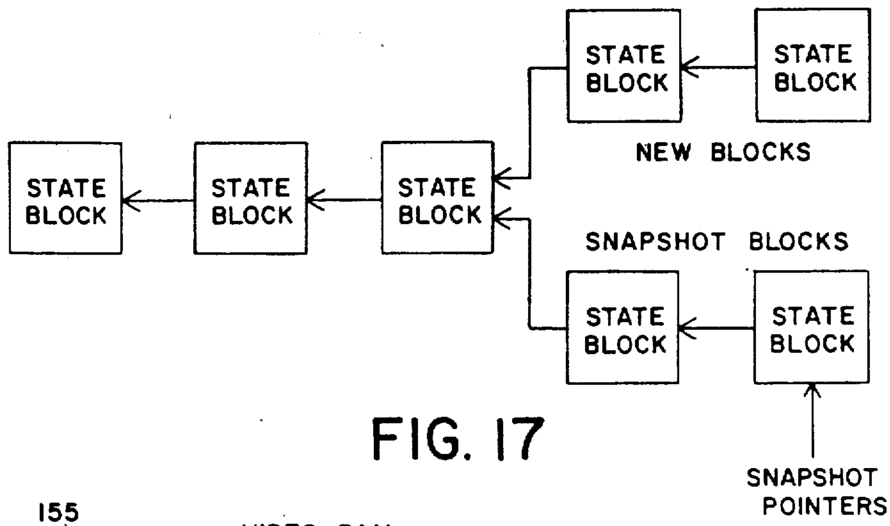
FIG. 17 is a block diagram similar to FIG. 16 illustrating the use of snapshot blocks which are taken when a dynamic variable is to be updated in a graphic display.

FIG. 16 shows the association list at an arbitrary time during the execution of a graphic language procedure. To recover the storage associated with a terminating procedure, the blocks which are associated with the procedure are unlinked and returned to the free pool of blocks. However, if a snapshop is taken, the blocks are not unlinked, and a pointer is maintained to indicate the lower block in the structure. Then dynamic allocation of other association blocks can proceed, building a tree structure out of the list. This is shown in FIG. 17.

Each time a snapshot is taken, all the reference counts in all of the association blocks in the current stack (i.e., in one path up through the association tree) are incremented. The reference count tells the interpreter which paths can be deallocated upon return from a subpicture. If the reference count of an association block is greater than zero after being decremented, then a snapshot must have been taken in a subpicture lower in the calling hierarchy. In that case, the blocks are not deallocated.

When the interpreter returns to execute update mode for this procedure, the snapshot pointer allows access to the variables as they were allocated when the snapshot was taken.

The snapshot pointer is kept in a state block for implementation of the update mode feature of graphic language. The state blocks are linked together to allow the interpreter to process groups of graphic language code quickly using the variables allocated for those groups of code. The state blocks have the following structure:

(1) video window state
(2) offset into procedure
(3) pointer to procedure string
(4) pointer to association list The video window state allows the restoration of the display to the state it was in when the procedure originally entered dynamic mode. The state restoration is done by sending the video window state information to the video CPU module. The procedure pointer and offset indicate where the interpreter is to begin execution. The use of the association list pointer is described above. The interpreter "executes" these state blocks one at a time when it is in update mode. This allows rapid execution of commands which must be performed many times to update the displays in operator mode.

The interpreter maintains a stack for the purpose of chaining back from displays to their calling displays. The workings of this stack are described in subsequent subsections. The stack contains the name of the calling display, which is represented as an index into the name table.

Thus after the initial drawing is displayed, only updating the state blocks is performed. Thus the state block remembers the video state at the time of the original display and puts this information back to the video CPU along with the updated value of the dynamic variables, such as the height of bars in a bar graph. Thus only the dynamic variables are executed by the host interpreter providing for much more efficient generation of updated displays in a manner which does not require the user to draw two separate displays—one representing information which is not to be changed and the second representing information which is to be changed.

This use of state blocks also facilitates generation of graphically presented buttons with touching of the button causing a particular routine to be generated. Thus each button has a predefined command and it acts similarly to a dynamic variable. The button in effect defines an interrupt routine such that if touched, then code associated with the button is executed at that moment without waiting. This is performed by use of an association list because there arbitrary commands can be stored and all information regarding the new display to be generated can be maintained.

A global button list is also maintained. It contains an array of entries for the buttons in the process, each entry containing the following fields:

(1) button code
(2) pointer to procedure
(3) offset into procedure (for button actions)
(4) pointer to association list.

When the display process is awakened by the video CPU module with a button touch, the display process uses this information to cause the interpreter to execute the commands associated with the button.

DISPLAY ROUTINES

The display routines are responsible for the actual interpretation of the graphic language commands. The routines in this program module are connected via several levels of calls in order to provide the required reentrancy of the interpreter. The interaction of the routines is illustrated in FIGURE.

Each of the display processes "thinks" that it has its own copy of the display interpreter and the required data structures.

The Display-procedure routine directs the interpretation using the Display-command and Display-expression routines to do the work of splitting the commands down into executable sized pieces and calling the appropriate processes to perform the required actions.

The implementation of the general features of the display language are described in the following subsections.

Designer Mode Support

The interpreter supports the designer mode operation of the MMI by providing certain actions in that mode that do not occur in other modes.

During designer operation, the interpreter remains in display mode always. This to provide the capability of redrawing the user's displays without having his process go off and wait on an exchange for some timeout or button touch. The designer is not interested in updating the displays at this time, but rather is interested in designing them.

The interpreter causes dotted lines to be drawn around the invisible items in the displays when those items are defined by the user. The invisible items include:

(1) buttons (2) chart margins (3) text margins

The code which is executed by the interpreter to draw the boxes around the invisible items is maintained with the designer mode source code. The source is then included in the interpreter code using an "include" statement and compiled along with the interpreter. Therefore, the source can be maintained by the interested parties (i.e., the writer of designer mode) even though it is part of the interpreter at run time.

The code which draws the boxes around the invisible items in the displays will be executed only in designer mode and will consist of commands which are sent directly to the video CPU module.

Configurator Mode Support

The interpreter supports the configurator mode operation of the MMI by providing certain actions in that mode that do not occur in other modes.

During configurator operation, the interpreter calls a procedure provided by the configurator program when it encounters an undefined variable. Since cosmic data base variables are declared by default (i.e., if they are not declared as locals, globals, or parameters they are considered to be cosmic), there is a column in the name table to indicate whether each undeclared variable name has been confirmed by the configurator as a valid data base variable. This helps avoid confusion between undeclared variables and true cosmic data base variables. Therefore, the interpreter checks each undefined variable to see if it is confirmed, and if so it continues. If the variable is not confirmed, the interpreter calls the procedure passed to it by the configurator mode program. The action which takes place at this time depends upon the code in the procedure (written by the designer of the configuration editor).

When calling the procedure, the interpreter supplies the following parameters:

(1) offset in buffer (2) ? ? ?

The procedure returns a code to the interpreter to indicate the action it is supposed to take. A zero value means to continue operations, and any other value means to terminate and return to the caller.

During the configurator operation, only the display mode is entered by the interpreter since the configurator is not interested in exercising the update mode of operation.

Operator Mode Support

The interpreter supports the operator mode operation of the MODVUE by providing certain actions in that mode that do not occur in other modes.

In operator mode, it is necessary to interpret the display language code as rapidly as possible. It is therefore necessary to provide the update mode as well as the display mode provided during designer operation and configurator operation. The implementation of the update mode is described in other sections of this document (e.g., Display/Update Modes and Data Structures).

Display/Update Modes

The interpreter operates in display mode the first time through a display and then continues to operate in update mode until the termination of the display (e.g., by chaining to another display in the display process or by termination of the process).

When in display mode, the Enter Dynamic and Enter Static commands are used as indications to take snapshots of the state of the Modvue system. These snapshots are used in update mode to speed up the execution of the display updates.

The variables and parameters of the procedures are allocated dynamically on the association list during the original drawing of the display. When the Enter Dynamic command is encountered, the system state is saved by placing the state of the video CPU module into the state block along with the pointer to the procedure and the offset into the procedure. The association list (where the variables are allocated) is frozen by incrementing reference counts in the association blocks (see the section on Data Structures), and a pointer is saved in the state block. The state block is then entered into a list of blocks by incrementing a state block counter. The commands found between the Enter Dynamic and Enter Static commands are executed normally. Nested Enter Dynamic and Enter Static commands are counted so that multiple state blocks are not saved for the nested commands.

Upon termination of the procedure (i.e., the entire display has been drawn on the video CPU module), the interpreter automatically enters update mode. In update mode, the interpreter causes the display process to wait on the exchange where it expects to receive its communications from the Operating System (i.e., button touches). If a message is received on that exchange, the process is awakened to take proper action. The code to decide what to do when this happens must be in the display process code itself since the interpreter cannot make that decision.

If no message is received at the exchange by the scheduled update time for the display (this is done by using a wait with timeout), the display process is awakened and proceeds to go through the state blocks saved during the display mode operation of the display. Each state block is taken from the list and "executed". The state of the system is restored by sending the VID state information to the video CPU module. The association list pointer is used for variable access, and the procedure pointer/offset pointer combination indicates what code to execute.

The execution of the code begins at the indicated position and continues, counting the mesting levels of Enter Dynamics and Enter Static commands, until the outermost Enter Static is encountered. Then the interpreter ends execution of that block and goes to the next state block on the list. When all the state blocks have been executed in this manner, the display process is once again sent to wait on its exchange for the next message or update time.

Since it is possible for a button to be pressed during the execution of commands by the interpreter (at which time the display process is not waiting on the exchange), it is necessary to poll the exchange for messages on a frequent periodic basis. This will slow the interpreter down slightly, but cannot be avoided. It is necessary to respond quickly to button touches and operating system messages even while the interpreter is executing normal commands.

Button Touches

When a button touch is received from the video CPU module, it is picked up by the display process while waiting at an exchange or by the interpreter during polling operations. In any case, the display process code must evaluate the information in the button touch message and vector the execution of the process to the correct display language code.

When a Create Pushbutton command is encountered (in display mode), an entry is made in the button list and information is stored to identify the new button. Then code must be entered by the designer (during designer operation—at other times the code will already exist) to perform the required functions when the button is pressed. That code must be stored away somewhere for access when the button is pressed. The location of the code for the button is stored in the button list.

When a button touch is processed, the system should react as though a subpicture were being called. Therefore, the display process should send an Enter Sidetrip command to the video CPU module to preserve its state prior to executing the button command code. Upon termination of the button code (assuming the button did not completely change the context of the display process) an End Sidetrip command should be sent to the video CPU module to restore the state of that device.

Since a procedure (a Pascal procedure in the interpreter) which handles button touches is called to perform this function, a return from the procedure will restore the context to the appropriate place in the interpreter (i.e., to the active execution of display language code or to the display process itself).

Parameter Evaluation

The procedures in display language can have parameters which are evaluated at execution time and passed to the procedure. The type of the parameter is associated with the value passed to the procedure in the same way a type is associated with the value of a variable. Thus, a procedure may be called with a string parameter one time and a real parameter another time even though the name of the parameter is unchanged.

Expressions are accepted as actual parameters in a display language call. The evaluation of expressions is discussed in another subsection. Once the expression of the actual parameter has been evaluated, the value obtained is bound to the parameter name (as a modvalue) and pushed onto the association list. Thus, the evaluated parameters are treated the same as local variables, but with defined values bound to them. The "parameter name" is really an index into the name table associated with the display process. The actual string which defines the parameter name to the user resides in the name table itself.

When the called procedure accesses the parameter, it is found by searching up the association list until a match is found between the names. The interpreter does not do a string search for the parameter name since the names on the association list are indexes into the name table. The value assigned to the parameter can then be used as desired by the procedure. All parameters are passed by value using this method. It is therefore not possible to return a value from a subpicture by assigning it to a parameter.

Local Variables

Procedures can have local variables which are accessible only to them and to procedures which they call. When the procedure is entered, the local variables declared for it are pushed onto the association list along with the parameters for that procedure. The values of the local variables are initialized to "undefined".

The names of the local variables are indexes into the name table where the actual strings which define them are kept. The interpreter finds the value of a local variable by searching up the association list until a match is found between the names. Since the association list is implemented as a stack, the local variable may have been declared in this procedure or in one above it in the hierarchy of calls. It makes no difference to the interpreter. The lowest level variable of the specified name which is found is assumed to be the desired one. If the name is not found at all in the association list, it is assumed to be a cosmic variable (see the Data Manager Interface section for the access method to cosmic data).

Global Variables

Global variables are allocated on the association list at execution time just like the procedure parameters and local variables are. The allocation takes place in the procedure where the global variable is accessed. Thus, each procedure which accesses the global variable has its own "copy" of the variable allocation. Since the same value for the variable must be obtainable by all the procedures in the display process, the association list contains a pointer to the global location where the value is stored rather than containing the value itself. This can be implemented as just another type assigned to the variable (e.g., an "indirect" type or "pointer" type). The fact that the variable is "global" or "local" is academic to the interpreter, since it merely needs to know where to obtain the value of the variable or to assign another value—information which is available in the type assigned to the value in the association list.

Global variables are accessed in the same manner as parameters and local variables. The association list is searched for the name of the global variable. The name is an index into the name table. When a match is found, the location of the value is obtained from the association list (this is keyed by the type of the value) and the actual value can then be obtained or changed. If the name is not found on the association list, it is assumed to be a cosmic variable, and it is accessed in a different manner (see the Data Base Manager Interface section for details).

Expression Evaluation

Expressions are generally acceptable in display language anywhere a value is expected to be found. The expressions are kept in prefix notation for ease of identification and evaluation. The operator is the first item specified in a phrase of the expression, and its operands follow in order. Since the operators have a fixed number of operands, it is easy to know when the expression has terminated. Of course, the operands of an operator can be expressions in their own right, recursively.

Constant valued operands are stored in the display language buffer itself as opposed to being stored in system allocated variables. Since many arguments to display language commands will be constants, this scheme will increase the speed of execution slightly. It also allows the interpreter to avoid the hassle of allocating system variables for all the constants in the program. Special tags identify the operands in the buffer as constants and indicate their type.

An operand can also be the name of a variable where the value is stored. In this case, the variable name is tagged with a special code which indicates that the next two bytes in the buffer are an index into the name table (i.e., a variable "name"). The interpreter checks the scope of the variable by looking the name table and then finds the actual value by searching the cosmic data base or the association list as appropriate (see the section on the Data Base Manager Interface).

The operators of display language are listed here along with the number of arguments each requires:

| | |
|---|---|
| relational | |
| greater than | 2 |
| less than | 2 |
| equal | 2 |
| less or equal | 2 |
| greater or equal | 2 |
| not equal | 2 |
| arithmetic | |
| addition | 2 |
| subtraction | 2 |
| multiplication | 2 |
| division | 2 |
| unary minus | 1 |
| modulo division | 2 |
| Boolean | |
| OR | 2 |
| AND | 2 |
| XOR | 2 |
| NOT | 1 |
| string | |
| length | 1 |
| substring | 2 |
| find | 1 |

The types of the values are associated with the values themselves rather than with the variable to which the value is assigned. Therefore, it is not possible to tell until runtime if operations being performed on variables will compatible value types. It is sometimes necessary to coerce the types of the values to other types in order to complete an operation. The value types which are available are:

(1) real
(2) short integer
(3) integer
(4) long integer
(5) Boolean
(6) string
(7) record Conversions can be performed between most of the types. Also, the majority of the conversions are relatively obvious. Some conversions which cannot be performed are:

(1) string to numeric (e.g., integers and reals)
(2) records to anything
(3) anything to records If a conversion cannot be performed, the result is an undefined value.

Arrays

Multi-dimensional arrays can be declared for any of the data types in display language. Since the type of a variable is associated with its value rather than its name, arrays can be declared without regard to type. The index to any array, however, will be coerced to an ordinal type before the array will be accessed.

There will be an "array" type which will be interpreted in a special manner. The numerical quantity tagged with an array type will be assumed to be a pointer to a single dimensional array of modvalues. Along with that pointer will be an integer value which specifies the range of the array. The index ranges will be from zero to the declared value, inclusive. Range checking will be performed on all accesses to the array, and any access falling outside the limits of the array will be returned as an undefined value.

If the modvalues of the array elements are arrays themselves (i.e., the original variable is an array of arrays) the indirection is taken one step further, thus implementing multi-dimensional arrays. Therefore, an unlimited number of dimensions may be specified for any array. The final elements of the array can be modvalues of any type.

GRAPHIC LANGUAGE COMMANDS

Functions and Concepts of the Language

The graphic language defines the interface between the system user and the system facilities. Since the interpreter executes the commands of the graphic language, the language itself defines a large part of the functionality of the interpreter. This subsection provides a detailed description of the graphic language and categorizes the various types of commands. The description of the commands which directly invoke identical video CPU commands (e.g., trend commands, graphic commands, etc.) are informational in nature. Precise definitions of the video CPU actions are presented later in a separate section.

The format given for each of the commands in the graphic language is the format used by the interpreter. In some cases this format may differ from the format used by the video CPU (e.g., the units of the arguments or the validity of expressions as arguments). The formats for the video CPU commands (i.e., the output of the interpreter) are documented in the above mentioned section.

The following subsection describes the implementation of each of the commands of the language.

Graphic Commands

Enter Graphics Mode

This command is passed directly to the video CPU module.

Draw Box (dx,dy)

The interpreter accepts expressions for the arguments dx and dy. The expressions are evaluated and the values obtained are sent to the video CPU using the video CPU version of the Draw Box command. Prior to sending the command, however, the values are coerced to integer values.

Draw Arc (destx, desty, interx, intery)

The interpreter accepts expressions for the arguments. The expressions are evaluated and the values obtained are sent to the video CPU module using the video CPU version of the Draw Arc command. Prior to sending the command, the values are coerced to integer values.

Clear Rectangle (dx,dy)

The interpreter accepts expressions for the arguments dx and dy. The expressions are evaluated and the values obtained are sent to the video CPU module using the video CPU version of the Clear Rectangle command. Prior to sending the command, the values are coerced to integer values.

Draw Line (dx,dy)

The interpreter accepts expressions for the arguments dx and dy. The expressions are evaluated and the values obtained are sent to the video CPU module using the video CPU version of the Draw Line command. Prior to sending the command, the values are coerced to integer values.

Set Line Type (code)

The interpreter accepts an expression for the argument. After the expression has been evaluated, the interpreter coerces the value to a short integer value and passes the command to the video CPU module.

Move (dx,dx) (relative)

The interpreter accepts expressions for the arguments dx and dy. The expressions are evaluated and the values obtained are sent to the video CPU module using the video CPU version of the Move (relative) command. Prior to sending the command, the values are coerced to integer values.

Move (x,y) (absolute)

The interpreter accepts expressions for the arguments x and y. The expressions are evaluated and the values obtained are sent to the video CPU module using the video CPU version of the Move (absolute) command. Prior to sending the command, the values are coerced to integer values.

Start Polygon Fill( )

This command is passed through directly to the video CPU module.

End Polygon Fill( )

This command is passed directly through to the video CPU module.

Bar and Trend Commands

Draw Bar (height, max, min, mid)

All of the arguments in this command can be expressions. The interpreter evaluates the expressions and translates the values into pixel values. The supplied values are translated into pixel values by using the information in the video CPU module state block about the current chart area. The interpreter assumes that this Draw Bar command refers to that chart. The height translation is a simple rounding procedure to the nearest pixel value given the max and min values for the chart. If the bar will extend outside the chart area, it is truncated at the chart boundary. The number of pixels per engineering unit is obtained from the information associated with the current chart area. If the height value is below the mid value, the pixel value calculated for the height is a negative number. The translation of the midpoint of the chart is similar. The max and min value translations are simply the size of the chart area and zero respectively.

The command and its pixel value arguments are then sent to the video CPU module using its version of the Draw Bar command.

Draw Line Chart (height, max, min)

All of the arguments in this command can be expressions. The interpreter evaluates the expressions and translates the values into pixel values. The supplied values are translated into pixel values by using the information in the video CPU module state block about the current chart. The interpreter assumes that this Draw Line Chart command refers to that chart. The height translation is a simple rounding procedure to the nearest pixel value given the max and min values for the chart. If the line will extend outside the chart area, it is truncated at the chart boundary. The number of pixels per engineering unit is obtained from the information associated with the current chart area. The max and min value translations are simply the size of the chart area and zero respectively.

The command and its pixel value arguments are then sent to the video CPU using its version of the Draw Line Chart command. The interpreter saves the last point drawn in this chart area and sends it along with the new point to the video CPU module. The video CPU draws the line from the old point to the new point on the chart. Then the interpreter saves the new point as the last point for this chart area. The last point value is saved by pushing a variable onto the association list when the chart is defined. This is a variable created and named by the interpreter. Since the association list is frozen in a snapshop (because of the dynamic mode updates of the chart), the interpreter can repeatedly access the variable during update mode without losing the value stored there. Each chart has a branch of the association list frozen for use during update mode since each is in a unique group of dynamic commands (see Line Chart command for a discussion of this constraint). Therefore, all charts can use a variable of the same name, but each has its own invocation of the variable.

Trend Block Fill Bars (n, max, min, mid) . . . numbers . . .

The value of the argument "n" is expected to be a constant reflecting the number of expressions following the command. The value is coerced to an integer value before any of the expressions are evaluated. The max, min, and mid arguments are translated into pixel values as described in the subsection on the Draw Bar Command.

The interpreter evaluates "n" expressions located after the command. If any of the expressions causes an error condition in the expression parser, the command is terminated and the interpreter attempts to resynchronize itself by searching for three valid display language commands in succession. Execution of those commands then continues normally.

The "n" values obtained from the "n" expressions are translated into pixel values based upon the current chart area and the information in the command and passed to the video CPU module using the analogous command for that device.

Trend Block Fill Lines (n, max, min) . . . numbers . . .

The value of the argument "n" is expected to be a constant reflecting the number of expressions following the command. The value is coerced to an integer value before any of the expressions are evaluated. The max and min arguments are translated into pixel values as described in the subsection on the Draw Line Chart command.

The interpreter evaluates "n" expressions located after the command. If any of the expressions causes an error condition in the expression parser, the command is terminated and the interpreter attempts to resynchronize itself by searching for three valid display language commands in succession. Execution of those commands then continues normally.

The "n" values obtained from the "n" expressions are translated into pixel values based upon the current chart area and the information in the command and passed to the video CPU module using the analogous command for that device. The interpreter sends two points for each line drawn. Each time a command is sent, every point becomes the new point and then the last point in successive commands.

Next( )

This command is passed directly to the video CPU module.

Trend(mask)

The mask argument is accepted as an expression and evaluated by the interpreter. The value obtained from the expression is coerced to a short integer value and passed directly to the video CPU module.

Bar Chart (dy,number of bars,barwidth)

The arguments to this command can be any expressions. The expressions are evaluated and coerced to integer values. The command and arguments are then passed to the video CPU module.

The integer values are assumed to be pixel values and are saved locally by the interpreter as the current chart information. This information is used by the Draw Bar command as described in the subsection which discusses that command.

Certain constraints arise from this implementation of the chart capability. Bar charts should be defined in static mode. Only one chart area can be updated in each block of dynamic commands (e.g., using the Trend or Draw Bar commands) without having the display designer perform some manual bookkeeping to tell the interpreter which chart is being accessed (i.e., by moving the cursor to the proper position and re-defining the chart). This is necessary in order to restore the chart information properly in the video CPU module.

The video CPU module operates on the principle of a "current chart", which is defined in the video CPU state block. That state block is saved in the host state block and restored to the video CPU each time a dynamic section of code is entered. Therefore, each time a group of dynamic commands is entered, only one chart area is restored as the current chart.

If the interpreter is operating in designer mode, it also draws a dotted line around the chart area. This is done by executing code which is maintained with the designer editor and included in the interpreter with an "include" statement.

Line Chart (dy, number or bars, barwidth)

The arguments to this command can be any expressions. The expressions are evaluated and coerced to integer values. The command and arguments are then passed to the video CPU module.

Certain constraints arise from this implementation of the charts capability. Line charts should be defined in static mode only. Only one chart area can be updated in each block of dynamic commands (e.g., using the Trend or Draw Line Chart commands) without having the display designer perform some manual bookkeeping to tell the interpreter which chart is being accessed (i.e., by moving the cursor to the proper position and re-defining the chart). This is necessary in order to restore the chart information properly in the video CPU module. It is also necessary in this case for the display designer to maintain an array of "last point" values and to store them in the system variable (allocated for that purpose) prior to executing any Draw Line Chart commands.

The video CPU module operates on the principle of a "current chart", which is defined in the video CPU state block. That state block is saved in the host state block and restored to the video CPU each time a dynamic section of code is entered. Therefore, each time a group of dynamic commands is entered, only one chart area is restored as the current chart.

If the interpreter is operating in designer mode, it also draws a dotted line around the chart area. This is done by executing code which is maintained with the designer editor and included in the interpreter with an "include" statement.

Shift (dx, dy, direction, distance)

The arguments may be any expressions. The expressions are evaluated and the values obtained are coerced into integer values. The command is then passed to the video CPU module using the analogous command for that device.

Button Commands

Erase Buttons (dx, dy)

The arguments for the command can be any expressions. After the expressions have been evaluated, the values obtained are coerced to integer values and passed to the video CPU module using the erase buttons command for that device.

Create Pushbutton (priority, Boolean, dy, dx)

The arguments can be any expressions. After they have been evaluated, the first argument is coerced to a Boolean value, and the other two are coerced to integer values. Then the command is passed to the video CPU module.

If the interpreter is operating in designer mode, it also draws a dotted line around the button just defined. This is done by executing code which is maintained with the designer editor and included in the interpreter with an "include" statement.

The code associated with buttons is accessed asynchronously (described in the subsection on Button Touches). The button code itself is segregated from the rest of the code so that it is not executed when the display is initially drawn in display mode. It therefore does not reside with the Create Pushbutton command.

When the new button is created, an entry is made in the button list with the pertinent information to define the button. The information includes the location of the code so that the display process knows what to execute when the button touch signal is received.

Color Palette and Zone Commands

Overwrite Palette Entry (lp, lc, hue 1, hue 2)

The arguments can be any expressions. After the expressions have been evaluated, the values obtained are coerced to integer values and passed with the command to the video CPU module.

Load Color Library (file name, xlo, ylo, xhi, yhi)

The first argument is a string which specifies a file name that contains the desired color library. The interpreter tries to open a file (in read only mode) using the string exactly as it is passed. If for any reason the file cannot be opened, the interpreter ignores the rest of the command. Once the library file is successfully opened, the contents of the file are read into a buffer, and the file is closed.

The other arguments can be any expressions, which are evaluated and coerced to integer values. These values are used to define the rectangular area of the screen in which the command is to set the zone map. The interpreter calculates the zones which are affected and sends the proper commands to the video CPU to set their values. The settings for the zones are obtained from the buffer which was read in from the specified file. Zone settings for areas not designated in the command are not used.

The palettes are then loaded by the interpreter using the information in the buffer which was read in from the color library file.

Background Color (color)

The argument for the command can be any expression. After the expression has been evaluated, the value obtained is coerced to a short integer value. The integer value is assumed to be the color code to be sent to the video CPU module. The code is then broken down into its bits and a twobit code is created for each single bit in the color code. The two-bit code allows the colors in the video CPU to have "don't-care" values for the transparent foreground colors. The "don't-care" codes are not used for this command. Therefore, the bits are translated into one of two codes:

00—reset the bit

01—set the bit

Foreground Color (color)

The argument for the command can be any expression. After the expression has been evaluated, the value obtained is coerced to a short integer value. The integer value is assumed to be the color code to be sent to the video CPU. The code is then broken down into its bits and a two-bit code is created for each single bit in the color code. The two-bit code allows the colors in the video CPU to have the "don't-care" values for the transparent foreground colors. The "don't-care" codes are not used for this command. Therefore, the bits are translated into one of two codes:

00—reset the bit

01—set the bit

Transparent Foreground Color (char1, char2, char3, char4)

The arguments to the command are four ASCII characters. Each of the characters are be one of the following:

"0"

"1"

"?"

The 0 and 1 are interpreted to mean that the code for resetting the bit and the code for setting the bit are to be assembled into the argument sent to the video CPU. The "?" is interpreted to mean that a "don't-care" code is to be sent to the video CPU module. The four ASCII characters are translated into the appropriate codes and packed into a single eight bit byte for transmission to the video CPU.

If any values for any of the arguments is other than one of those characters, the command is ignored.

Text Commands

Start Text Mode

This command is passed directly through to the video CPU.

Set Character Spacing (horiz, vert)

The arguments can be any expressions. After the expressions have been evaluated, the values obtained are coerced into integer values. Depending upon which character library is currently being used, the integer values are translated into the appropriate values, and the command is sent to the video CPU module.

Select Text Library (library number)

The argument for the command can be any expression. After the expression has been evaluated, the value obtained is coerced to a short integer value, and the command is passed to the video CPU module with that value.

Load Text Library (filename)

The argument must be a string containing a valid file name. The interpreter tries to open the file using the file name as it is passed. If the file cannot be opened for any reason, the command is ignored. If the file is successfully opened, the contents of the file are read into a buffer, and the interpreter loads text library number zero in the video CPU module with the values in the buffer.

Select Symbol Library (library number)

The argument for the command can be any expression. After the expression has been evaluated, the value obtained is coerced to a short integer value, and the command is passed to the video CPU module with that value.

Load Symbol (file name)

The argument is a string containing a valid file name. The instrument tries to open the file using the file name as it is passed. If the file cannot be opened for any reason, the command is ignored. If the file is successfully opened, the contents of the file are read into a buffer, and the interpreter loads the current symbol library in the video CPU module with the values in the buffer.

Overwrite Symbol Library Entry (loc, value)

The arguments can be any expressions, which are evaluated and coerced to integer values. The command is then passed to the video CPU module with the integer arguments.

Define Special Character (code, maskword 0, . . . , markwork 7)

The arguments can be any expressions which are evaluated and coerced to integer values. The command is then passed to the video CPU module with the integer arguments.

Write Character (code)

The expression which specifies the character code is evaluated and coerced to a short integer before the command is passed to the video CPU module.

Write Number (value)

The value to be written can be any expression. After the expression has been evaluated, the value is translated into a string of ASCII characters. The result of the translation depends upon the value type. The ASCII string is then printed on the video CPU module at the current position using the "text" command.

Set Test Window Margins (dx,dy)

The arguments can be any expressions. When the expressions have been evaluated, they are translated into the nearest pixel values and used in that form when the command is passed to the video CPU module.

If the interpreter is operating in designer mode, it also draws a dotted line around the text margin area. This is done by executing code which is maintained with the designer editor and included in the interpreter with an "include" statement.

Text (string)

The text string is passed unaltered to the video CPU module.

General Programming Commands

Spawn Task (name, priority, args . . . )

The interpreter calls the Operating System facility "Create Activity" with the name and priority of the task as specified in the command. Since the new task is to execute concurrently with the spawing task, no further action is required after the new task is running. The interpreter checks the error codes returning from the "Create Activity" call to make sure that the task is spawned. If the interpreter cannot spawn the specified task, an error code is logged to indicate that fact.

Spawn and Die (name, priority, args . . . )

The interpreter calls the Operating System facility "Create Activity" with the name and priority of the task as specified in the command. Since the old task is to terminate after executing this command, the interpreter executes a "die" command after the new task is running. The interpreter checks the error codes returned from the "Create Activity" call to make sure that the task is spawned before killing the original task off.

Die( )

The interpreter immediately executes the Operating System "Kill" facility with its own identifier as the argument.

Kill Task (task)

The argument can be any expression which is evaluated and coerced to an integer value. That value is assumed to be the task number of the task to be terminated. Then an Operating System (OS) call is made to the "Kill" facility using that task number as the argument. The interpreter checks the error code returned from the O.S. to make sure that the task was indeed killed.

Assign (variable, expression)

The expression is evaluated, and the resulting value is assigned to the specified variable. Since the value type is associated with the value itself, there is no need to coerce the value into any type other than that which results directly from the expression evaluation. The variable takes on the type associated with the value.

Enter Dynamic( )

When this command is first encountered in display mode, the interpreter takes a snapshot of the state blocks for use in update mode. Nested Enter Static commands are counted to know when to exit the snapshot, but have no other effect.

To take a snapshot, a state block is allocated and included in a list of state blocks by incrementing a state block counter. Then the following information is saved in the state block:

video window state
current position in the buffer
pointer to current procedure
pointer to current association list This information is sufficient to restore the state of the procedure during the update mode so that the proper commands are executed.

When encountered in update mode, the command is only counted to keep track of nesting levels.

Enter Static( )

When this command is encountered in display mode, the snapshot being taken is terminated. Whie there is no explicit information saved by the interpreter to terminate a snapshot, it does know when the current snapshot is completed so that it can take another snapshot on the next Enter Dynamic command (i.e., it must know when it is out of any nested commands). Until the outermost nested Enter Static command is found, the action is just to decrement a counter.

When in update mode, the command causes the termination of the "execution" of the current state block if it is the outermost nested command. Thus, it marks the end of the dynamic code in the buffer. If the command is nested, it causes a counter to be decremented to keep track of the nesting levels.

Sound Klaxon()

Figure 70:
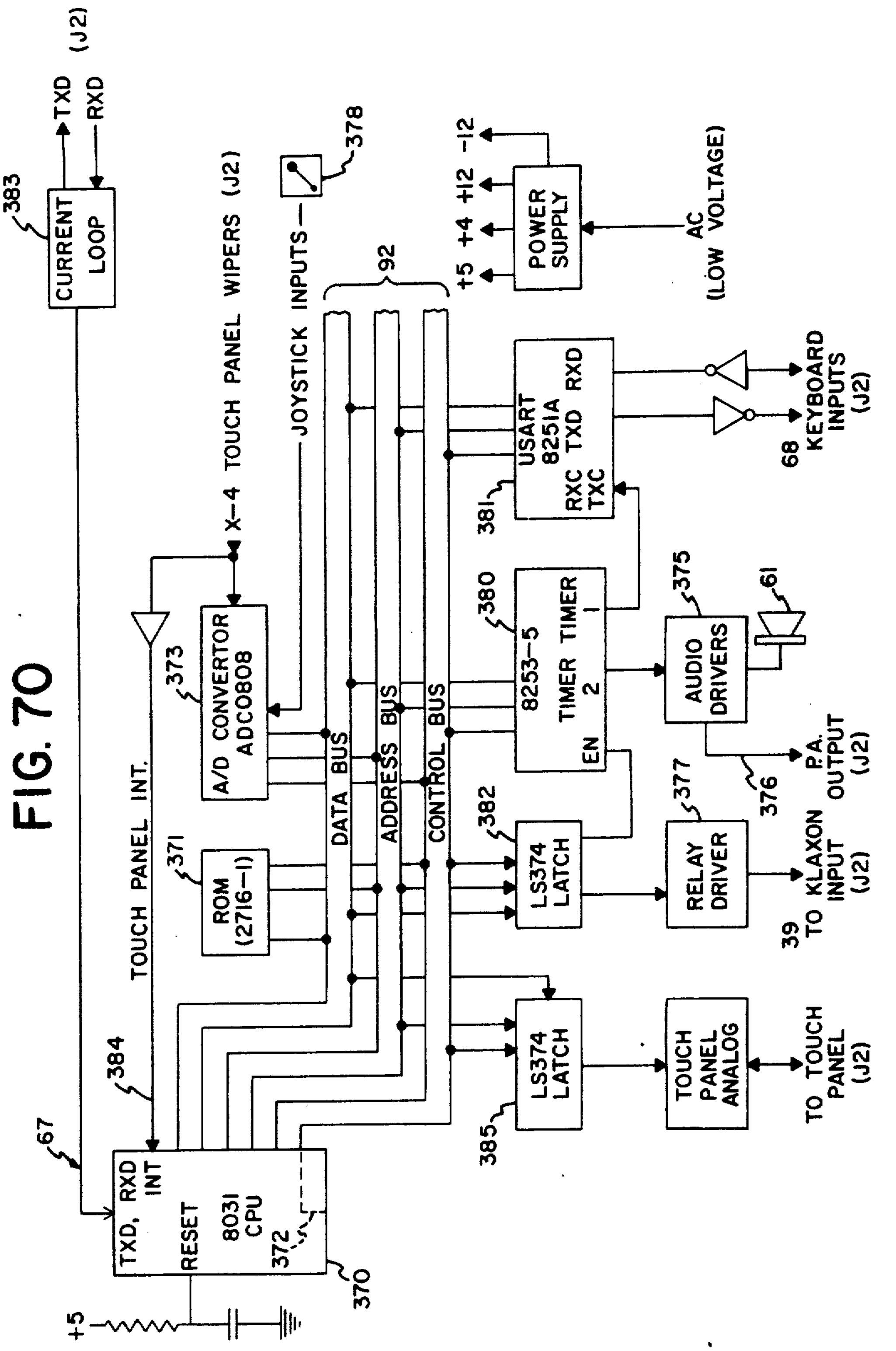
FIG. 70 is an overall block diagram of the interface logic circuitry.

The interpreter makes the appropriate call to the Operating System or writes to the appropriate port to cause the Klaxon relay to be closed (see FIGS. 1 and 70 and the "Interface Logic" section).

Set Bell Frequency (frequency)

The argument can be any expression. After the expression has been evaluated, the value obtained is coerced to a real value and sent to the interface logic circuitry (see above-mentioned section) which sets the frequency of the bell (beeper 61, see FIG. 1).

Sound Bell( )

The interpreter makes the appropriate call to the Operating System or writes to the appropriate port to cause the system bell to sound (see abovementioned section).

Control Flow Statements

If-Then (offset 1, offset 2, expression)

The expression passed with the command is evaluated and the value obtained is coerced to a Boolean value. The Boolean value is then checked for a TRUE or FALSE value. If the value is TRUE, then offset 1 is added to the current position in the buffer. The current position is the position of the character which defines the If-Then command. If the value is FALSE, then offset 2 is added to the current position in the buffer to obtain the new position.

The value in offset 1 passes control in the buffer to a position just past the end of the expression in the command. Offset 2 passes control to either an End statement or to a position just past any Else command present.

To avoid the danger of jumping out of the buffer area, the offsets are expressed as constant values.

A nexting level counter is incremented whenever this command is encountered.

Else (offset)

The Else command serves as an unambiguous marker for the If-Then-Else construct for the purpose of deparsing. The interpreter treats the Else command exactly like a jump. Therefore, it is necessary for offset 2 in the If-Then command to pass control to the command just after the Else command if it is there. The offset specified in the Else command passes control to a position which contains the End command. It is necessary for the interpreter to see the End command in order to keep track of nesting levels.

The new position in the buffer is obtained by adding the value of the offset to the current position. The current position is the location of the character which identifies the Else command.

To avoid the danger of jumping out of the buffer area, the offsets are expressed as constant values.

While (offset 1, offset 2, expression)

The While command causes the interpreter to evaluate the expression and coerce it to a Boolean value. If the value of the Boolean is TRUE, the value in offset 1 is added to the current position in the buffer. The current position is the location of the character which identifies the While command. If the value of the Boolean is FALSE, the value of offset 2 is added to the current position.

Since this is a looping command, there must be a jump command just before the End command which terminates the loop. The jump command passes control back to the beginning of the loop. The new position calculated using offset 2 passes control to the End command and past the jump back to the beginning of the loop. Otherwise, an infinite loop results. The value in offset 1 causes control to be passed to the location just after the end of the expression.

To avoid the danger of jumping out of the buffer area, the offsets are expressed as constant values.

A nexting level counter is incremented whenever this command is encountered.

For (offset 1, offset 2, index name, expression)

The interpreter evaluates the expression and compares the value in the index variable to it. The values may have to be coerced to perform this function if they are of different types. If the value in the index variable is greater than the value obtained from the expression, control is passed to the location specified as offset 2 by adding that offset to the current position in the buffer. The current position in the buffer is the location of the character which identifies the For command.

If the value in the index variable is less than or equal to the value obtained from the expression, the value in offset 1 is added to the current position. In the case where the value types are so different that they cannot be compared, the loop is terminated by default (i.e., offset 2 is taken).

Each time the comparison between the variable and the expression is completed, the index variable is automatically incremented by the interpreter.

Since this is a looping command, there must be a jump command just before the End command which terminates the loop. The jump command passes control back to the beginning of the loop. The new position calculated using offset 2 passes control to the End command and past the jump back to the beginning of the loop. Otherwise, an infinite loop results. The value in offset 1 causes control to be passed to the location just after the end of the expression.

To avoid the danger of jumping out of the buffer area, the offsets are expressed as constant values.

It is necessary that an assignment statement exist prior to the For command if the index variable is to be initialized.

A nesting level counter is incremented whenever this command is encountered.

Case Of (case count, const 1, offset 1, . . . , offset n, expression)

The interpreter evaluates the expression. The value obtained is then compared with each of the constants specified in the command. If a match is found, control is passed to the location calculated by adding the associated offset to the current position. The current position is the location of the character which identifies the Case-Of Command. If no match is found, control is passed to the location calculated using the last offset (i.e., the default offset) which passes control to the End command of the case statement.

Some coercion of the value types may have to be done if the types do not match. In the case of completely incompatible types, control is passed to the default offset.

Since there is a default offset, there is one more offset in the command than there are cases in the statement.

To avoid the danger of jumping out of the buffer area, the offsets are expressed as constant values.

Jumping around the case statements which do not apply the current situation is handled by the Case Instance command. Since the default location is used in all cases to terminate the statement, it is calculated upon entering the Case-Of command and saved on a stack until used. The stack is necessary in order to properly evaluate nested case statements. It is necessary to calculate and save the default location upon entering the statement since the offset is specified relative to the character which identifies the Case-Of command in the buffer. The current position is different when executing one of the case instances.

A nesting level counter is incremented whenever this command is encountered.

Case Instance (case, number)

This command performs the dual purpose of providing an unambiguous marker for the deparser and indicating to the interpreter that a particular case is ended. When the command is encountered, control is passed to the default location calculated upon entering the Case-Of command. This causes termination of the case statement. The case number is used by the deparser and is ignored by the interpeter. The default location is obtained by popping it off the stack.

Go To Display (name)

The interpreter passes control from the current display to the specified display. This involves entering display mode (regardless of the current mode of the interpreter) and executing the specified display. The stack which contains the return addresses of calling displays (see Chain Display) is completely cleared. Thus, the trace of the calling displays is erased, and no Chain Return commands can be effectively executed until some calls have been made.

Chain Display (name)

The interpreter passes control from the current display to the specified display. This involves entering display mode (regardless of the current mode of the interpreter) and executing the specified display. The name (and index into the name table) of the current display is first pushed onto the display stack. Therefore, the called display can execute a Chain Return command and return to this display.

Invisible Chain Display (name)

The interpreter passes control from the current display to the specified display. This involves entering display mode (regardless of the current mode of the interpreter) and executing the specified display. The name of the current display is not saved on the stack. However, the information which is already on the stack is not disturbed. In this way, if the called display executes a Chain Return command, control is passed to a display farther up the chain than this display. Control is never passed back to the display which executed the Invisible Chain Display command by use of the Chain Return command.

Chain Return ()

The interpreter pops the latest display name off the stack and passes control to that display. If the stack is empty, the command is ignored and an error is logged.

Any time control is passed to a display other than the current display, the interpreter enters display mode regardless of the mode it was operating in at that time.

Call Subpicture (name, args . . . )

The interpreter pushes the current position in the buffer onto its subpicture stack and transfers control to the specified subpicture. Before control can be transferred, the subpicture itself is copied from long lived memory into the interpreter buffer just after the code for the procedure which called it. This storage is reclaimed after completion of the subpicture. Thus, the display language buffer acts like a stack of procedures.

Upon entry to the subpicture, all of the arguments supplied in the call are evaluated, and the values obtained are bound to the formal parameters specified in the subpicture. Binding consists of inserting the "r-value" for the parameter (actually a pointer to it since it is a record) in the association block along with the parameter name. General expressions are allowed for the arguments in the call. The association list for the subpicture is built by "pushing" association blocks onto the list existing for the calling procedure. The association blocks contain the values for the parameters, local variables, and global variables. The values for the local variables are initialized as undefined. The values for the global variables are initialized as pointer types which point to the locations where the actual values are stored.

As the arguments are evaluated, they are bound to the parameters in the order specified in the call. If there are too few arguments specified, the remaining formal parameters are pushed and initialized with undefined values. If there are too many arguments specified, they are evaluated, but the values obtained are ignored.

A Start Sidetrip command is sent to the video CPU module prior to passing control to the subpicture. This saves the state of the video CPU module for restoration upon return to the calling procedure.

Subpicture Return()

The location in the calling procedure is popped from the stack and control is returned to that procedure. If no snapshots were in progress during the execution of the subpicture (initiated in either the subpicture or in its calling procedure), the association list is unlinked and returned to the pool of free association blocks. If a shapshot was in progress, it is necessary to leave the association blocks linked for use in update mode operation. This is done by incrementing the reference counts of the association blocks (see the section on Data Structure).

Before returning control to the calling procedure, the buffer storage taken up by the subpicture is reclaimed for use in the next call.

An End Sidetrip command is passed to the video CPU module prior to passing control back to the calling procedure in order to restore the state of the video CPU module to what it was when the subpicture was called.

Start Sidetrip ()

This command is passed directly through to the video CPU module.

End Sidetrip()

This command is passed directly through to the video CPU module.

Macro()

This command is used by the interpreter to ignore a section of the display buffer. When encountered, the interpreter scans the characters in the buffer until it finds the next Macro command, and then begins executing commands normally. The name of the command is derived from its use in ignoring macro names in the buffer, but it can be used to ignore anything else as well.

Jump (offset)

Control is passed unconditionally to the location in the buffer calculated by adding the specified offset to the current position. The current position is the location of the character which identifies the Jump command.

End()

This command serves as a marker for the end of certain flow control constructs. The action required when the command is encountered is to decrement a nesting level counter to keep track of the nesting levels of the constructs. If the command is encountered in a subpicture with the nesting level zero, it is taken as a Subpicture Return command. If it is encountered in the highest level procedure of a display with the nesting level zero, it is taken as the end of the procedure. In that case, the interpreter reverts to update mode regardless of the mode it was in when the command was encountered.

The command is also used as a marker for the deparser.

Date Base Control Commands

Each data base variable is associated with a record which contains descriptors of the characteristics of that variable. Some of those descriptors may be modified by a graphic language program at execution time. A command is provided in the graphic language for each descriptor which can be modified in this way. Actual programmable controller (PC) numbers and protection levels are intentionally excluded from this list to guarantee the authority of the configurator in those decisions.

Set Auto Log (name, value)

The name of the variable is passed to the Data Base Manager to obtain a handle for it. Then the Auto Log attribute is set to the Boolean value specified in the second argument. The first argument has a string value which represents the name of a variable in the data base. The second argument can be any expression, which is evaluated and coerced to a Boolean value before being used to set the attribute.

Query Auto Log (name, variable)

The name of the variable is passed to the Data Base Manager to obtain a handle for it. Then the Auto Log attribute is fetched into the specified variable. The first argument has a string value which represents the name of a variable in the data base. The second argument is a variable name into which to store the attribute value.

Set Connected (name, value)

The name of the variable is passed to the Data Base Manager to obtain a handle for it. Then the Connected attribute is set to the Boolean value specified in the second argument. The first argument has a string value which represents the name of a variable in the data base. The second argument can be any expression, which is evaluated and coerced to a Boolean value before being used to set the attribute.

Query Connected (name, variable)

The name of the variable is passed to the Data Base Manager to obtain a handle for it. Then the Connected attribute is fetched into the specified variable. The first argument has a string value which represents the name of a variable in the data base. The second argument has a variable name into which to store the attribute value.

Set Valid (name, value)

The name of the variable is passed to the Data Base Manager to obtain a handle for it. Then the Valid attribute is set to the Boolean value specified in the second argument. The first argument has a string value which represents the name of a variable in the data base. The second argument can be any expression, which is evaluated and coerced to a Boolean value before being used to set the attribute.

Query Valid (name, value)

The name of the variable is passed to the Data Base Manager to obtain a handle for it. Then the Valid attribute is fetched into the specified variable. The first argument has a string value which represents the name of a variable in the data base. The second argument has a variable name into which to store the attribute value.

Set Enabled (name, value)

The name of the variable is passed to the Data Base Manager to obtain a handle for it. Then the Enabled attribute is set to the Boolean value specified in the second argument. The first argument has a string value which represents the name of a variable in the data base. The second argument can be any expression, which is evaluated and coerced to a Boolean value before being used to set the attribute.

Query Enabled (name, variable)

The name of the variable is passed to the Data Base Manager to obtain a handle for it. Then the Enabled attribute is fetched into the specified variable. The first argument has a string value which represents the name of a variable in the data base. The second argument is a variable name into which to store the attribute value.

Set Sample Rate (name, value)

The name of the variable is passed to the Data Base Manager to obtain a handle for it. Then the Sample Rate attribute is set to the value specified in the second argument. The first argument has a string value which represents the name of a variable in the data base. The second argument can be any expression, which is evaluated and coerced to an integer value being used to set the attribute. The integer value is a code which specifies one of several discrete sample rates.

Query Sample Rate (name, variable)

The name of the variable is passed to the Data Base Manager to obtain a handle for it. Then the Sample Rate attribute is fetched into the specified variable. The first argument has a string value which represents the name of a variable in the data base. The second argument is a variable name into which to store the attribute value.

READIN ROUTINES

The Readin routines are used to obtain Configured Display Files (CDF) from permanent storage and translate them from file format into buffer format for execution by the interpreter. The routines strip some of the information from the CDF and distribute it to the run-time tables for quick access. Labels, variable names, and parameter names which are explicitly contained in the CDF are removed and translated into pointers into the appropriate tables.

The main routine, Readin procedure, uses the other routines (Readin command and Readin expression) to do the translation in a heirarchical manner. The relationship of these routines to one another is shown below:

READIN PROCEDURE → READIN COMMAND → READIN EXPRESSION

WRITEOUT ROUTINES

The Writeout routines perform the function of writing the display language procedures to permanent storage and translating them from buffer format into file format. The routines gather information relevant to the procedure from the run-time tables and include this information in the CDF so that the CDF is complete in a stand-alone fashion. Labels, variable names, and parameter names are included explicitly in the CDF. The CDF is then written to permanent storage.

The main routine, Writeout-procedure, uses the other routines (Writeout-command and Writeout-expression) to do the translation in a hierarchical manner. The relationship of these routines to one another is shown below:

COMPRESS ROUTINES

The Compress routines translate normal buffer format into accelerated buffer format. In accelerated format, all references to constant values are resolved and evaluated so that the interpreter can send the command directly through to the video CPU module with a minimum of expression processing. This provides an increase in execution speed for the operator display procedures.

DECOMPRESS ROUTINES

The Decompress routines translate accelerated buffer format into normal buffer format.

PARSER ROUTINES

The Parser routines are used to translate from user format into buffer format. User format is a format used to present display language programs to a human operator in the surface syntax, and buffer format is the format executed by the interpreter.

The main routine, Parse command, uses the other routines hierarchically to perform the work. The relationships of the major routines are illustrated below:

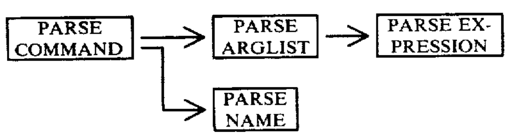

In addition to these major routines, there are some minor routines which perform some simple functions for the parser. These routines are:

push operator
insert operator
reduce
precedence
numeric
alphabetic

DEPARSER ROUTINES

The Deparser routines translate user format into buffer format. This is to allow presentation of an existing display language program to a human operator.

The main routine, Deparse, uses the other routines in a hierarchical fashion to do the translation. The relationships among the routines are illustrated below:

In addition to these major routines shown in FIGURE, there are some minor routines which are used by the deparser as required to perform some minor functions. These functions are:

coerce integer
revalue

NAME TABLE ROUTINES

The interpreter relies on run-time name tables to bind variables and parameters to their values. The name table routines handle the insertion, deletion, and searching of names for the interpreter. The relationship among the routines is illustrated below:

The routine Intern does most of the work and calls the routine Equal name to check for string equality between a supplied name and a name in the name table.

DATA BASE MANAGER INTERFACE

The interpreter interfaces with the cosmic data base through the data base manager (DBM). The DBM provides a facility whereby the interpreter can look up the location of a data base variable by passing the name of the variable as a string. A particular name can also be found in the same way. In that case, the string representing the partial name is passed to the DBM and a handle is returned to the caller. The handle can then be used to start a subsequent search in the data base hierarchy by supplying it along with the remainder of the name (see the Data Base Manager section.

All variables encountered by the interpreter which are not identified as local variables, global variables, or parameters are assumed to be cosmic data base variables. Variables are determined to be local, global, or parameters by having them declared during readin of the procedure. If the variable name is not declared, it is assumed to be a cosmic data base reference. Therefore, if a variable is not found in the association list at run-time, the name of the variable (i.e., its actual string representation) is taken from the name table and passed to the data base manager to search for the variable. The DBM passes a handle back to the interpreter as described above.

FILE SYSTEM INTERFACE

The file system is accessed via the general I/O commands in the graphic language. Since all devices look like files to the interpreter, the commands which perform the I/O are addressed here.

Open Stream

The Open Stream command is used to open a character stream to an I/O device. The format of the command is:

Open Stream (logical unit, device, erc.) The logical unit number is the number by which the device is referred to in the graphic language program when it is selected or closed. The value is restricted to an integer type, although a real value can be coerced by the interpreter if necessary. The argument itself can be any expression. The device name is a string specifying a device name or file name which is acceptable to the Operating System, since the interpreter passes the name unaltered when opening the stream.

The erc (error is be the name of a variable into which the interpreter can store the value of the error code returned by the Operating System. The interpreter does not evaluate the error code, but rather returns the value in this variable. Conditional branching statements are available in the graphic language to perform the checks.

Since most of the commands in graphic language are implicitly "write" statements, the files and devices are opened in Write Only mode. This means that only one display process can have access to a specific file or device at one time. The interpreter executes an Operating System "open" command to open the file or device and passes the returned information back to the graphic language procedure.

Close Stream

The interpreter simply translates this command into an Operating System "close" command, passing the specified logical unit number. The format of the command is:

Close Stream (logical unit).

Select Stream

Since most of the commands in the display language are implicit "write" statements, there is an implicit output stream available for the interpreter to write to. The Select Stream command allows the program designer to select any of a number of open output streams by logical unit number as the implied output stream. The format of the command is:

Select Stream (logica unit).

If the logical unit specified in the command is not open to a device or a file, the command is ignored, keeping the current stream for output. Only one stream can be selected at a time, so selecting a different stream automatically removes the current one as the implied stream.

When the display process is first initiated, a default output stream is opened to one of the video CPU modules.

VIDEO ACCESS INTERFACE

The output from the display interpreter is a string which is normally passed to the video CPU module for interpretation and display. However, the output may be redirected to any other device or to a file through the use of the general I/O commands. The interpreter normally translates the commands in its buffer into commands compatible with the video CPU module input requirements (see the video CPU interpreter section). Therefore it is up to the display designer to make sure that undecipherable commands are not sent to certain devices (e.g., to a printer).

GRAPHIC LANGUAGE FORMATS

Graphic language programs are represented in one of three formats. Each program may be in any of the formats during its life-cycle depending upon the status of the program. The three formats are:

buffer format
file format
user format (surface syntax)

This subsection describes these formats in detail as well as the storage of the required program information at various times (e.g., the runtime tables).

These subsections describe the overall format for each of the above cases.

Buffer Format

Figure 17A:
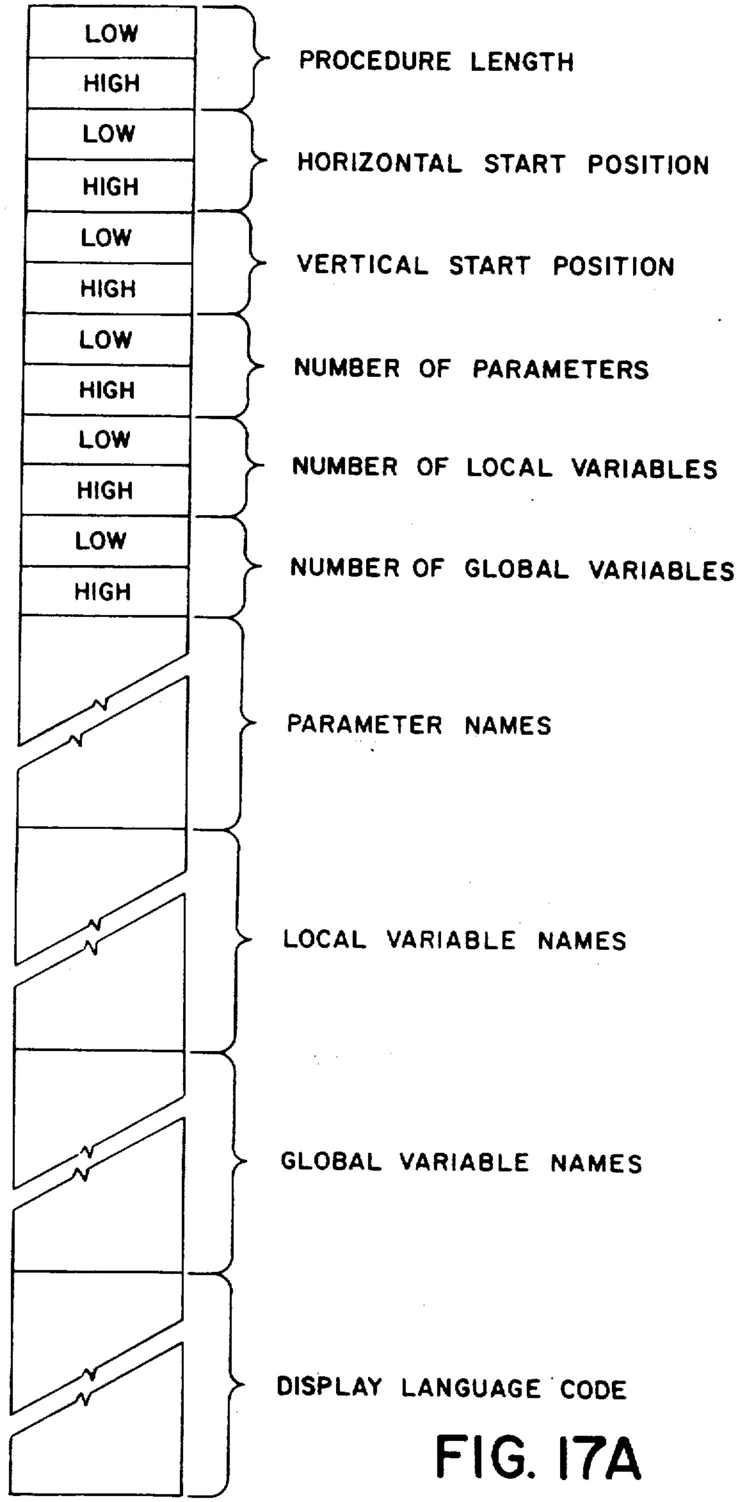
FIG. 17A illustrates the location of various parameters and variables associated with the implementation of the high level graphic language.

The buffer format is the executable format of the graphic language. It is the only format that the display interpreter (associated with the video CPU) sees. A graphic language procedure is formally considered a string and is contained in a buffer from which the interpreter executes the commands. The format of the graphic language buffer is shown in FIG. 17A.

The procedure length is a count of the total number of bytes in the buffer.

The start positions are used only in designer mode. They indicate where on the screen the procedure is to begin execution. This is to allow the designer to ensure that the entire subpicture is visible on the screen in designer mode, regardless of the current location of the cursor. In all other modes, these values are ignored.

The format for the names of the parameters, local variables, and global variables is as follows:

op-name code
name table offset (low byte)
name table offset (high byte)

The op-name code is just a key to indicate that the next two bytes represent an offset into the name table where the actual string is maintained. The name table itself is a record which has the following format:

number of entries
array of string indexes
array of r-values (for global variables)
array of characters to hold names Each index into the name table actually points to an entry in the array of string indexes. The values in the string index array point to the beginning of the string of characters which represent the name. This double index has the advantage of allowing the access of the r-value for the name (necessary if it is the name of a global variable) using the same index value as is used to access the string. It also provides the length of the string by subtracting the entry in the index array from the next value in the index array (this works because the strings are entered sequentially in the character array).

Finally, the graphic language code is contained in the buffer. The format of this section depends upon the code generated by the procedure designer.

File Format

The file format is the format on which the procedures are stored in permanent storage. This format is intended to be self-sufficient in the sense that all the information needed to load and execute the procedure is contained explicitly in the file formatted procedure. Mostly this includes the explicit spelling of names in the code, whereas in buffer format the names are removed from the buffer and stored in a name table for rapid access.

The display interpreter does not see the file format. Procedures in file format are always translated into buffer format prior to being passed to the interpreter for execution. The format itself is described in FIG. 17A.

The main difference between this format and buffer format is the spelling out of the names for the parameters, local variables, and global variables. The format for this is:

"(to delimit the name)
the actual name string
"(to end the name)

This name format is used in the sections which declare the names and also in the section which contains the display language code. Any variable names which are found in the code and are not declared as a parameter, local variable, or global variable are assumed to refer to cosmic database variables. When these are encountered in the code during readin, they are inserted in the name table. The others have been already inserted because of their declarations.

User Format

This format is described in conjunction with the designer editor program, which contains the parser and deparser facilities.

VIDEO CPU GRAPHIC LANGUAGE INTERPRETER

General Characteristics

The video station 108 shown in FIG. 1 is a user interface device with two distinct tasks:

(1) it displays Host (CPU module 22) graphic command output in graphic form on a color CRT (monitor 62); and (2) it is responsible for transmitting operator input (in the form of screen touches, keystrokes, and joystick pointings) to the Host.

Software Structure

Figure 17B:
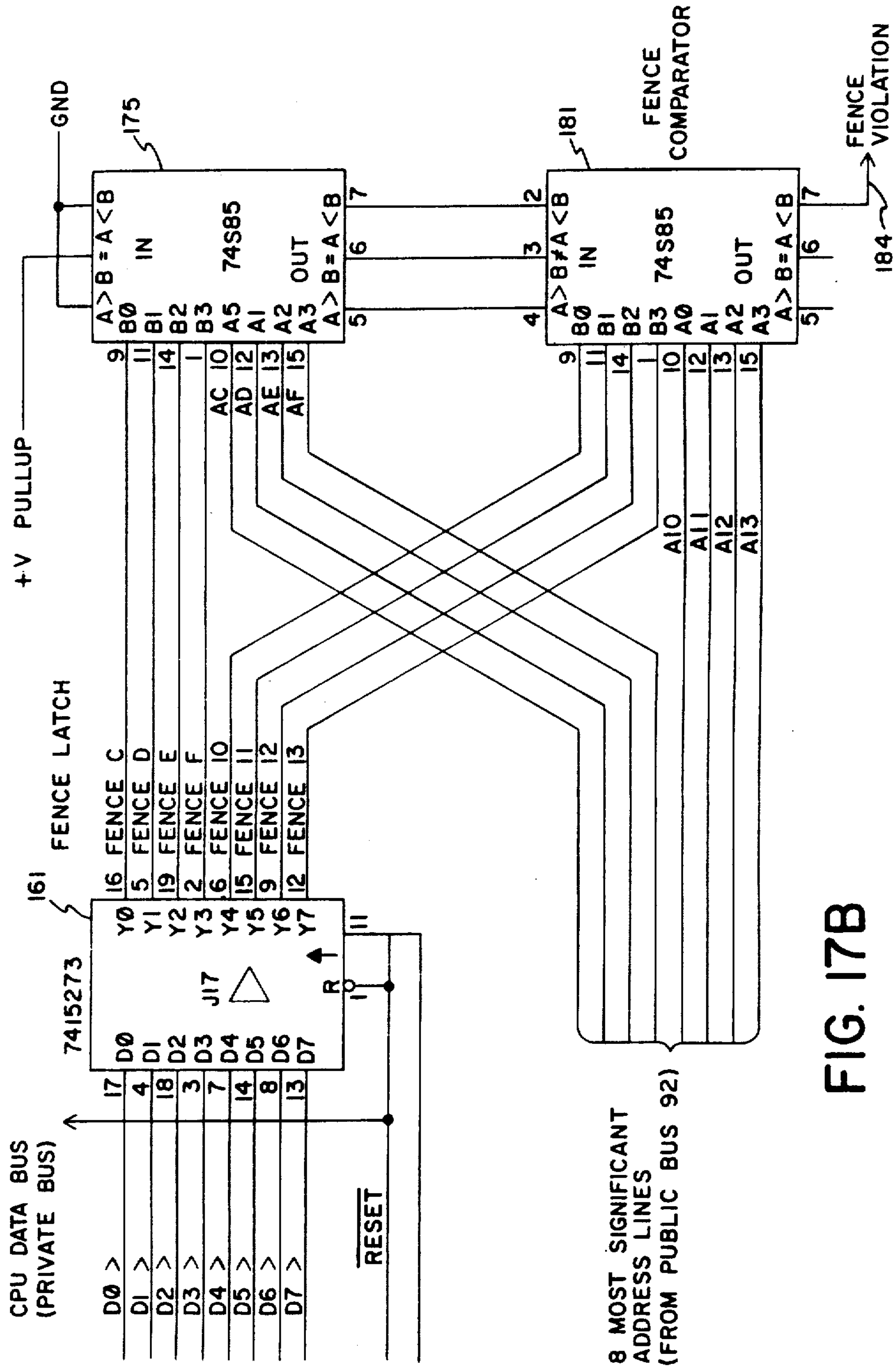
FIG. 17B is a schematic diagram illustrating the operation of the fence and fence comparator forming part of the man-machine interface.
Figure 17C:
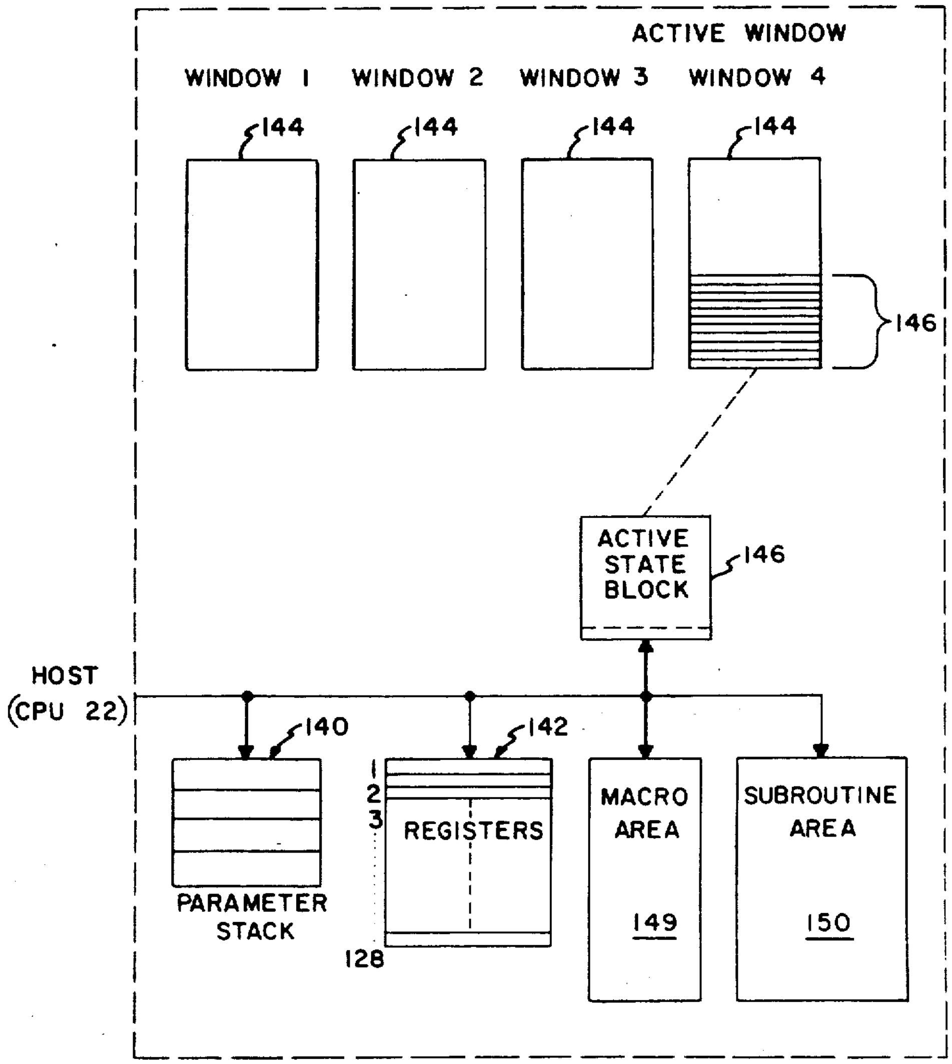
FIG. 17C is a diagrammatic representation of the video station and the use of windows with state blocks and parameter stacks and their communication with the host central processing unit.

The Host views the video station 108 as shown in FIG. 17C. The primary function of the video station is to accept commands from the Host and act upon them. The video station is designed to process commands in post-fix notation (parameters are received before the command) although some of the commands can be sent in post-fix or pre-fix mode. The video station stacks all the data it receives onto its parameter stack 140. Any subsequent post-fix commands take their parameters from the stack. This implies that the parameters need not immediately precede the command but may be transmitted far in advance. The video station accepts a command stream in this style, but for clarity of programming it is desirable that the post-fix commands have their arguments immediately preceding the command whenever possible.

The video station has 128 registers collectively designated by reference numeral 142. Each register is 16 bits wide and is reserved for use by the Host. The registers are simply memory locations which the Host may access individually by register number.

Each window 144 of the video station has an associated stack of state blocks 146. Only the state block at the top of the stack may be accessed by the Host. This is termed the active state block 146'. All commands that reference data (directly or indirectly) refer to the active state block. Initially each window has only one state block in its stack. This is set up to contain default values during initialization.

Figure 17D:
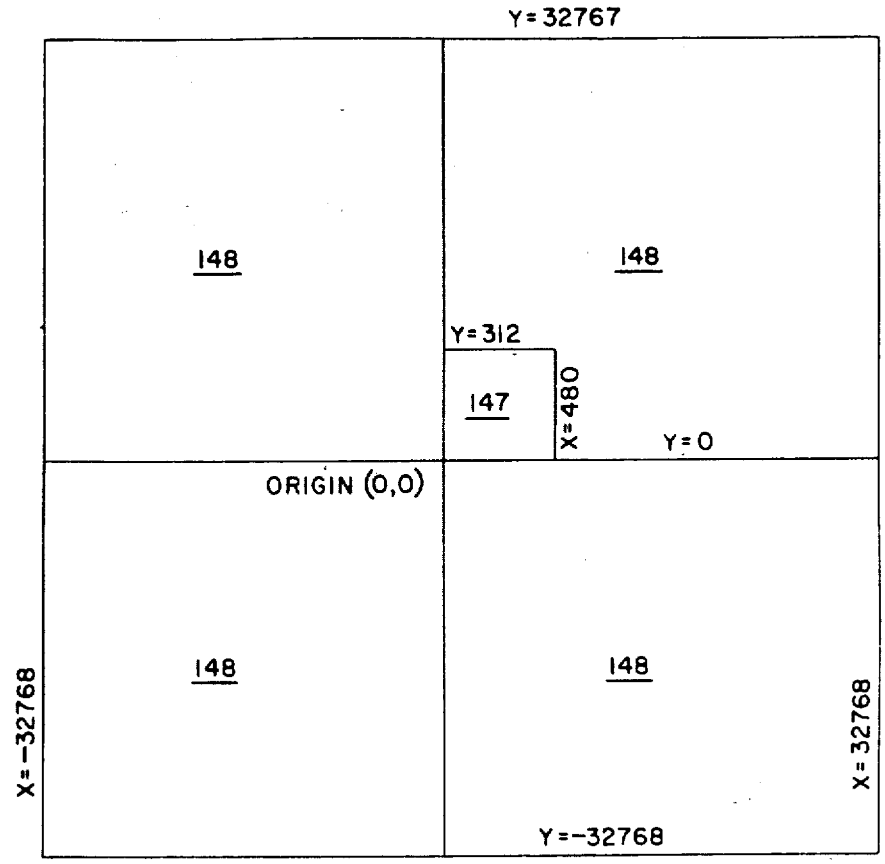
FIG. 17D is a block diagram illustrating the video station coordinate system for implementing the high level graphic language of the present invention.

Commands to a video station that draw images on the screen are all referenced to the current position. This is a coordinate pair that is maintained by the video station. The current position does not need to fall within the screen area. FIG. 17D shows the screen area 147 and the overall coordinate area 148. If an attempt is made to draw an image outside the screen area, the video station clips the image and displays any portion which falls inside the area. The video station also maintains the concept of a current direction, which is used by some of the graphic commands. The description of the logic commands later in this section describes the effect each has on the current position and direction.

Video Station Commands

The following subsections give a brief description of the groups of commands which the Host CPU sends to the video CPU.

Program Control Commands

This set of commands allows the Host to define a portion of one datastream as a macro 149 (see FIG. 17C) or a subroutine 150 (permanent macro) which may then be executed any number of times. Macros may be executed upon several conditions giving the Host-video station datastream a simple programming language structure.

Stack and Register Commands

These commands manipulate data on the top of the parameter stack. and also between the stack and the video station registers 142.

State Control Commands

The currently active state variable block 146 is manipulated by this set of commands. State variable blocks may be stacked, duplicated, or transmitted to the Host. With these functions, the Host implement side trips (displayable subroutines).

Arithmetic Commands

Commands that perform arithmetic operations on variables on the parameter stack. This is another facility which gives the Host-video station datastream a programming language-like structure.

Logical Commands

These commands are similar to arithmetic commands, except they perform logical operations on the parameter stack data.

Graphic Commands

This set of commands is responsible for displaying graphic images on the color display. The Host CPU can directly draw lines, arcs, and boxes on the display. Rectangular and other polygonal areas may be filled with color, and pie diagrams can be constructed.

Color Commands

These commands manipulate the color table entries, zone maps, and color mode. They also allow the background and foreground colors to be set up for the graphic and text commands.

Text Commands

These commands are responsible for displaying text information on the display. To speed up the transmission rate of alphanumerics the datastream can operate in text mode. In text mode every byte is treated as an ASCII character, and only the control characters are treated as commands. Character spacing (horizontal and vertical) and the text or edit window (see FIG. 12) can be altered by the Host CPU. Different fonts can be selected and special characters can be defined.

Touch Commands

The Host CPU can define areas of the screen surface as 'buttons'. The operator touching a button initiates an action in the video station which can result in an escape sequence being passed back to the Host CPU.

Detailed Description Of The Video CPU Graphic Interpretation

Display Generation Overview

The video station display generation elements are shown diagrammatically in FIG. 6. The four bit planes 114 are mapped to the screen 72 (see FIG. 7) giving each pel a depth of 4 bits. Each bit plane is 312 bits high by 480 bits wide resulting in a total of 149,760 bits per plane. The origin of the coordinate system is at the bottom left hand corner of the screen (see FIG. 7). The bit planes are mapped to the color palettes 124, 125, 126 and 127 via decoder 122. Each color palette contains 16 entries 129. Each entry has two 9 bit blocks 131 which define two colors. The video station automatically blinks these two colors. A steady color is defined by setting the two entries to the same value. The intensity of the three primary colors (R, G, B) is each described by three bits. The least significant three bits define the red intensity, the next three bits the green intensity and the most significant three bits the blue intensity.

The screen area is divided into zones 115. As shown in FIG. 7, there are 150 zones on the screen, 15 across by 10 down. Each zone contains a two bit value (stored planes 118 and 119 of zone map 117— see FIG. 6) which is used to select one of the four color palettes. The video station hardware is capable of displaying up to a maximum of 64 different colors on the screen at any one time. Up to 512 different colors can be defined by the nine bit color entries.

Stack Commands

The stack commands manipulate data on the parameter stack and in the sixteen video station registers. None of these commands affect the current position or direction. These commands are:

| | |
|---|---|
| DUPLICATE | " |
| NUMBER | # |
| EXCHANGE | % |
| READ FROM REGISTER | = |
| STORE IN REGISTER | _ |
| SAVE | [ |
| RESTORE | ] |

Tables 101-107 describe these commands in detail.

Arithmetic Commands

This group of commands perform arithmetic operations on the values located on top of the parameter stack. The result is always pushed back onto the stack. All numbers are treated as 16 bit signed integers. The video station does not perform any overflow checking during the operations. These commands do not affect the current position or direction. The commands are:

| | |
|---|---|
| ADD | + |
| ABSOLUTE VALUE | \| |
| NEGATE | ^ |
| MULTIPLY | * |
| DIVIDE | / |
| REMAINDER | |

TABLE 101

| | |
|---|---|
| Command | DUPLICATE |
| Character | " |
| Input Parameters | Number |
| Output Parameters | Number |
| | Number |
| Type | Post-fix |
| Description | This command duplicates the top word on the parameter stack. |
| Error Handling | |
| Error | Action |
| PARAMETER STACK OVERFLOW | Pushing data onto the parameter stack caused an overflow. The error procedure is invoked. |
| PARAMETER STACK UNDERFLOW | Popping data from the parameter stack caused an underflow. The error procedure is invoked. |

TABLE 102

| | |
|---|---|
| Command | NUMBER |
| Character | # |
| Input Parameters | Character<br>Character |
| Output Parameters | Number |
| Type | Pre-fix |
| Description | The 2 characters immediately following this command are concatenated into 1 word (1st character in the least significant byte). The resulting word is pushed onto the parameter stack. |
| Error Handling | |
| Error | Action |
| PARAMETER STACK UNDERFLOW | Popping data from the parameter stack caused an underflow. The error procedure is invoked. |

TABLE 103

| | |
|---|---|
| Command | EXCHANGE |
| Character | % |
| Input Parameters | Number 1<br>Number 2 |
| Output Parameters | Number 2<br>Number 1 |
| Type | Post-fix |
| Description | The top 2 words on the parameter stack are popped and then pushed back onto the stack in the reverse order. |
| Error Handling | |
| Error | Action |
| PARAMETER STACK UNDERFLOW | The parameter stack is exhausted. The error procedure is initiated. |

TABLE 104

| | |
|---|---|
| Command | READ FROM REGISTER |
| Character | = |
| Input Parameters | Register number |
| Output Parameters | Number |
| Type | Post-fix |
| Description | A word is read from the register specified and pushed onto the top of the parameter stack. |
| Error Handling | |
| Error | Action |
| INVALID REGISTER NUMBER | The register specified is not in the range 0-127. The error procedure is initiated. |
| PARAMETER STACK UNDERFLOW | Popping data from the parameter stack caused an underflow. The error procedure is invoked. |

TABLE 105

| | |
|---|---|
| Command | STORE IN REGISTER |
| Character | _ |
| Input Parameters | Number<br>Register number |
| Output Parameters | none |
| Type | Post-fix |

TABLE 105-continued

| | |
|---|---|
| Description | The 16 bit number specified by the command is stored in the register specified by the command. |
| Error Handling | |
| Error | Action |
| INVALID REGISTER NUMBER | The register specified is not in the range 0-127. The error procedure is initiated. |
| PARAMETER STACK UNDERFLOW | Popping data from the parameter stack caused an underflow. The error procedure is invoked. |

TABLE 106

| | |
|---|---|
| Command | SAVE |
| Character | [ |
| Input Parameters | none |
| Output Parameters | none |
| Type | Monadic |
| Description | The top word of the parameter stack is popped and saved internally within the VID-CPU The VID-CPU saves and restores on a first in, last out basis. |
| Error Handling | |
| Error | Action |
| BIND STACK OVERFLOW | The bind stack overflowed. The error procedure is initiated. |
| PARAMETER STACK UNDERFLOW | Popping data from the parameter stack caused an underflow. The error procedure is invoked. |

TABLE 107

| | |
|---|---|
| Command | RESTORE |
| Character | ] |
| Input Parameters | none |
| Output Parameters | none |
| Type | Monadic |
| Description | The value most recently saved using the SAVE command is popped from its store and pushed onto the top of the parameter stack. |
| Error Handling | |
| Error | Action |
| BIND STACK UNDERFLOW | The bind stack is exhausted. The error procedure is initiated. |
| PARAMETER STACK UNDERFLOW | Popping data from the parameter stack caused an underflow. The error procedure is invoked. |

Tables 108-113 describe these commands in detail.

Logical Commands

This group of commands perform logical operations on the values located on top of the parameter stack. The result is always pushed back onto the stack. All values are treated as 16 bit binary numbers. These commands do not affect the current position or direction. These commands are:

| | |
|---|---|
| AND | & |
| OR | ' |
| NOT | . |
| EXCLUSIVE OR | ! |

Tables 114-117 describe these commands.

Control Commands

This group of commands give the video station graphic language a programming-like structure. Macros can be defined and invoked. Subroutines can be defined and called. Macros can be conditionally executed depending on a range of conditions.

The datastream transmitted from the Host CPU to the video station may include groups of commands defined as macros. A macro has the form:

START MACRO, COMMAND, COMMAND, . . . COMMAND, END MACRO

When the video station encounters a START MACRO command it scans, but does not execute, the following commands until it encounters the END MACRO. Execution of the datastream commences on the command following the END MACRO.

The Host CPU may send many macros to the video station. They are stored in a first in last out manner. The video station only has access to the most recently defined macro. This can be invoked by one of the following commands:

REPEAT
EXECUTE WHILE
EXECUTE CONDITIONALLY

TABLE 108

| | |
|---|---|
| Command | ADD |
| Character | + |
| Input Parameters | Number<br>Number |
| Output Parameters | Sum |
| Type | Post-fix |
| Description | The top two words on the parameter stack are popped and an addition is performed. The result is pushed back onto the stack. No exception conditions caused by the addition will be reported to the Host. The addition of two large positive numbers may cause the result to be negative. It is the responsibility of the user to check for this and other such exceptions. All numbers are represented in 16 bits. |
| Error Handling | |
| Error | Action |
| PARAMETER STACK UNDERFLOW | Popping data from the parameter stack caused an underflow. The error procedure is invoked. |

TABLE 109

| | |
|---|---|
| Command | ABSOLUTE VALUE |
| Character | |
| Input Parameters | Number |
| Output Parameters | Absolute value of number |
| Type | Post-fix |
| Description | The top word on the parameter stack is popped. If it has a positive or zero value it is pushed back onto the stack. If it is negative it is first negated and then pushed onto the stack. |
| Error Handling | |
| Error | Action |
| PARAMETER STACK UNDERFLOW | Popping data from the parameter stack caused an underflow. The error procedure is invoked. |

TABLE 110

| | |
|---|---|
| Command | NEGATE |
| Character | ~ |
| Input Parameters | Number |
| Output Parameters | Minus number |
| Type | Post-fix |
| Description | The top word on the parameter stack is popped. Its value is negated (two's complemented) and the result is pushed back onto the stack. |
| Error Handling | |
| Error | Action |

TABLE 110-continued

| | |
|---|---|
| PARAMETER STACK UNDERFLOW | Popping data from the parameter stack caused an underflow. The error procedure is invoked. |

TABLE 111

| | |
|---|---|
| Command | MULTIPLY |
| Character | * |
| Input Parameters | Number<br>Number |
| Output Parameters | Product |
| Type | Post-fix |
| Description | The top two words on the parameter stack are popped and multiplied together. The result is pused back onto the stack. The VID-CPU will not report exception conditions caused by the multiplication. It is the responsibility of the user to keep track of integer overflows. The result is represented as a 16 bit integer. |
| Error Handling | |
| Error | Action |
| PARAMETER STACK UNDERFLOW | Popping data from the parameter stack underflow. The error procedure is invoked. |

TABLE 112

| | |
|---|---|
| Command | DIVIDE |
| Character | / |
| Input Parameters | Dividend<br>Divisor |
| Output Parameters | Quotient |
| Type | Post-fix |
| Description | The top two words on the parameter stack are popped and a division is performed. The remainder is ignored and the quotient is pushed back onto the stack. The VID-CPU will not report exception conditions caused by the division. A divide by zero will give the result zero. It is the responsibility of the user to keep track of integer overflows. The quotient is stored as a 16 bit integer. |
| Error Handling | |
| Error | Action |
| PARAMETER STACK UNDERFLOW | Popping data from the parameter stack caused an underflow. The error procedure is invoked. |

TABLE 113

| | |
|---|---|
| Command | REMAINDER |
| Character | \ |
| Input Parameters | Dividend<br>Divisor |
| Output Parameters | Remainder |
| Type | Post-fix |
| Description | The top two words on the parameter stack are popped and a division is performed. The quotient is ignored, and the remainder is pushed back onto the stack. A Divide by zero will result in the remainder being set to the dividend. The VID-CPU will not report exception conditions caused by the divide. It is the responsibility of the user to keep track of integer overflows. The remainder is represented as a 16 bit integer. |
| Error Handling | |
| Error | Action |
| PARAMETER STACK UNDERFLOW | Popping data from the parameter stack caused an underflow. The error procedure is invoked. |

TABLE 114

| | |
|---|---|
| Command | AND |
| Character | & |
| Input Parameters | Number<br>Number |
| Output Parameters | Result |
| Type | Post-fix |
| Description | The top 2 words are popped from the parameter stack and Logically ANDed together. The result is pushed back onto the stack. |
| Error Handling | |
| Error | Action |
| PARAMETER STACK UNDERFLOW | The parameter stack is exhausted. The error procedure is initiated. |

TABLE 115

| | |
|---|---|
| Command | OR |
| Character | , |
| Input Parameters | Number<br>Number |
| Output Parameters | Result |
| Type | Post-fix |
| Description | The top 2 words are popped from the parameter stack and Logically ORed together. The result is pushed back onto the stack. |
| Error Handling | |
| Error | Action |
| PARAMETER STACK UNDERFLOW | The parameter stack is exhausted. The error procedure is initiated. |

TABLE 116

| | |
|---|---|
| Command | NOT |
| Character | . |
| Input Parameters | Number |
| Output Parameters | Result |
| Type | Post-fix |
| Description | The top word is popped from the parameter stack and ones complemented. The result is pushed back onto the stack. |
| Error Handling | |
| Error | Action |
| PARAMETER STACK UNDERFLOW | The parameter stack is exhausted. The error procedure is initiated. |

TABLE 117

| | |
|---|---|
| Command | EXCLUSIVE OR |
| Character | ! |
| Input Parameters | Number<br>Number |
| Output Parameters | Result |
| Type | Post-fix |
| Description | The top 2 words are popped from the parameter stack and exclusive-ORed together. The result is pushed back onto the stack. |
| Error Handling | |
| Error | Action |
| PARAMETER STACK UNDERFLOW | The parameter stack is exhausted. The error procedure is initiated. |

Once a macro has been executed it is purged from the video station. The macro is also purged if it is acted upon by the EXECUTE WHILE or EXECUTE CONDITIONALLY command, even if it is not invoked due to a false condition.

If a DEFINE SUBROUTINE command is encountered in the datastream, then the most recently defined macro is stored as a subroutine. It is associated with the subroutine number specified in the command. The Host CPU may call the subroutine at any time by issuing a CALL command and specifying the correct subroutine number. The Host CPU cannot purge subroutines from the video station directly. The only way in which it can be removed is to define another subroutine with the same subroutine number. This then replaces the old subroutine.

Macros may be nested. The following structure is valid:

| |
|---|
| SM (SM . . . EM)(SM . . . (SM . . . (SM . . . EM)EM) . . . EM)EM) |

SM - START MACRO
EM - END MACRO

When nested macros are encountered in the host CPU datastream the video station stops executing at the command following th first START MACRO. Executing only resumes when the corresponding outer level END MACRO is encountered. A maximum of 64 macros may be nested in the video station.

These commands do not effect the current position or direction. These commands are:

| | |
|---|---|
| DEFINE SUBROUTINE | $ |
| START MACRO | ( |
| END MACRO | ) |
| CALL | C |
| REPEAT | R |
| EXECUTE WHILE | W |
| EXECUTE CONDITIONALLY | X |
| TEST POSITIVE | P |
| TEST NEGATIVE | n |
| TEST ZERO | z |
| TEXT RANGE | t |

Tables 118-128 describe these commands in detail.

State Command

This set of commands manipulate the video station state blocks. The START SIDETRIP command pushes the active state block onto the active window and makes a copy of it available for a 'side trip'. A side trip is analogous to a software interrupt in a programming language. When the side trip is complete the state block it used is purged and the original state block is popped from the active window to become the active state block again. The PUSH CURRENT POSITION command allows the Host to read the current position maintained in the active window by placing it on the parameter stack. The current position can then be transmitted from the stack to the Host.

There can be a window associated with each Host task. Within a window the current state block may be saved to accomodate Host subpictures. The Host tasks switch between windows by issuing the ENTER WINDOW command.

These commands do not have any effect on the current position or direction. These commands are:

| | |
|---|---|
| PUSH CURRENT POSITION | ? |
| ENTER WINDOW | ^W |
| START SIDE TRIP | [ |
| END SIDE TRIP | ] |

TABLE 118

| | |
|---|---|
| Command | DEFINE SUBROUTINE |
| Character | $ |
| Input Parameters | Subroutine number |
| Output Parameters | none |
| Type | Post-fix |
| Description | The most recently defined macro will be stored in the VID-CPU memory as a subroutine. The number specified in the command will be associated with the subroutine. When a CALL command is encountered, the subroutine specified will be executed. Subroutine numbers in the range 0-126 are available to reference general subroutines. Subroutine number 127 is reserved for the Host defined IDLE LOOP MACRO SUBROUTINE. This subroutine is invoked during the BACKGROUND TASK. |
| Error Handling | |
| Error | Action |
| INVALID REGISTER NUMBER | The subroutine number specified in this command is outside the range 0-127. The error procedure is invoked |
| PARAMETER STACK UNDERFLOW | Popping data from the parameter stack caused an underflow. The error procedure is invoked. |

TABLE 119

| | |
|---|---|
| Command | START MACRO |
| Character | ( |
| Input Parameters | none |
| Output Parameters | none |
| Type | Monadic |
| Description | The START MACRO command informs the VID-CPU interpreter that the data stream following is to be treated as a macro until an END MACRO command is encountered. |
| Error Handling | |
| Error | Action |
| AUX STACK OVERFLOW | Stack overflow due to more than 64 nested macros defined. The error procedure is initiated. |

TABLE 120

| | |
|---|---|
| Command | END MACRO |
| Character | ) |
| Input Parameters | none |
| Output Parameters | none |
| Type | Monadic |
| Description | The END MACRO command defines the end of a macro. For each START MACRO command there must be a corresponding END MACRO command. As the VID-CPU interprets the Host data stream it stops executing commands when it encounters a START MACRO command. The VID-CPU keeps count of the number of START MACRO and END MACRO commands it receives until the values become equal. The interpreter then starts executing the data stream in the normal manner. |
| Error Handling | |
| Error | Action |
| INVALID END MACRO | An END MACRO command was encountered without a preceding START MACRO command. The error procedure is invoked. |

TABLE 121

| | |
|---|---|
| Command | CALL |
| Character | C |

TABLE 121-continued

| | |
|---|---|
| ıput Parameters | Subroutine number |
| utput Parameters | none |
| ype | Post-fix |
| escription | Execution is transfered to the beginning of the specified subroutine. Upon completion, execution is resumed at the character following the call. |
| rror Handling | |
| rror | Action |
| ꞑVALID SUB-OUTINE CALL | The subroutine number specified in the call command has not been associated with a subroutine. The error routine is invoked. |
| ꞑVALID SUB-OUTINE NUMBER | The subroutine number specified in the call command is outside the range 0–127. The error procedure is invoked. |
| ARAMETER STACK NDERFLOW | Popping data from the parameter stack caused an underflow. The error procedure is invoked. |

TABLE 122

| | |
|---|---|
| ommand | REPEAT |
| haracter | R |
| ıput Parameters | Repeat count |
| 'utput Parameters | none |
| ype | Post-fix |
| ıescription | The most recently defined macro is executed the number of times specified by the repeat count. The count is a 16 bit unsigned integer. |
| ırror Handling | |
| ırror | Action |
| .UX STACK 'NDERFLOW | There is no macro defined prior to the repeat command. The error procedure is initiated. |
| ARAMETER STACK ꞁNDERFLOW | Popping data from the parameter stack caused an underflow. The error procedure is invoked. |

TABLE 123

| | |
|---|---|
| :ommand | EXECUTE WHILE |
| :haracter | W |
| nput Parameters | Boolean |
| )uput Parameters | none |
| 'ype | Post-fix |
| )escription | While the top word on the parameter stack is true then execute the most recently defined macro. The test on the top of the stack results in the top word being popped from the stack. It is the responsibility of the executing macro to replace the boolean value back on the stack. Prior to executing the next command the executed macro is purged from the VID-CPU whether it was executed or not. |
| :rror Handling | |
| :rror | Action |
| ιUX STACK ꞁNDERFLOW | No macro has been defined prior to this command The error procedure initiated. |
| 'ARAMETER STACK ꞁNDERFLOW | Popping data from the parameter stack caused an underflow. The error procedure is invoked. |

TABLE 124

| | |
|---|---|
| :ommand | EXECUTE CONDITIONALLY |
| :haracter | X |
| nput Parameters | Boolean |
| )utput Parameters | none |
| Гype | Post-fix |
| )escription | The top word on the parameter stack is popped and tested. If it is true (least significant bit = 1) then execute the most recently defined macro, otherwise do nothing. The executed macro is purged |

TABLE 124-continued

| | |
|---|---|
| | following this command whether it was invoked or not |
| Error Handling | |
| Error | Action |
| AUX STACK UNDERFLOW | No macro has been defined. The command is ignored and the error procedure is initiated |
| PARAMETER STACK UNDERFLOW | The parameter stack is empty. The command is ignored and the error procedure is initiated. |

TABLE 125

| | |
|---|---|
| Command | TEST POSITIVE |
| Character | p |
| Input Parameters | Number |
| Output Parameters | Boolean |
| Type | Post-fix |
| Description | The top word in the parameter stack is tested. If it has a value greater or equal to zero then it is replaced by a boolean TRUE (hex 'FFFF') otherwise it is replaced by a boolean FALSE (hex '0000'). |
| Error Handling | |
| Error | Action |
| PARAMETER STACK UNDERFLOW | Popping data from the parameter stack caused an underflow. The error procedure is invoked. |

TABLE 126

| | |
|---|---|
| Command | TEST NEGATIVE |
| Character | n |
| Input Parameters | Number |
| Output Parameters | Boolean |
| Type | Post-fix |
| Description | The top word in the parameter stack is tested. If it has a value less than zero then it is replaced by a boolean TRUE (hex 'FFFF') otherwise it is replaced by a boolean FALSE (hex '0000'). |
| Error Handling | |
| Error | Action |
| PARAMETER STACK UNDERFLOW | Popping data from the parameter stack caused an underflow. The error procedure is invoked. |

TABLE 127

| | |
|---|---|
| Command | TEST ZERO |
| Character | z |
| Input Parameters | Number |
| Output Parameters | Boolean |
| Type | Post-fix |
| Description | The number on the top of the parameter stack is popped and tested. If the number is zero then a boolean TRUE (hex 'FFFF') is pushed onto the stack, otherwise a boolean FALSE (hex '0000') is pushed onto the stack. |
| Error Handling | |
| Error | Action |
| PARAMETER STACK UNDERFLOW | Popping data from the parameter stack caused an underflow. The error procedure is invoked. |

TABLE 128

| | |
|---|---|
| Command | TEST RANGE |
| Character | r |
| Input Parameters | Limit #1<br>Limit #2<br>Number |
| Output Parameters | Boolean |
| Type | Post-fix |

TABLE 128-continued

| | |
|---|---|
| Description | The number on the top of the parameter stack is compared to the next 2 values on the stack. All 3 words are popped from the stack. If the number is less than the smallest limit value or greater than the highest value, then a boolean FALSE is pushed onto the stack. Otherwise a boolean TRUE is pushed on the stack. The comparison performed is signed. |
| Error Handling | |
| Error | Action |
| PARAMETER STACK UNDERFLOW | Popping data from the parameter stack caused an underflow. The error procedure is invoked. |

Tables 129–132 describe these commands in detail.

Graphic Commands

The graphic commands enable images to be constructed in the display buffer. Straight lines, arcs, dots and rectangles can all be drawn using a single command. A line type is defind which dictates the width of the lines and if the lines are to be drawn dashed or solid. Rectangles and polygons can be defined and filled with any color. There is also the ability to construct pie charts using the PIE SLICE command.

The MOVE ABSOLUTE command is the only command that uses absolute coordinates. The origin of the move is the local origin which need not be the same as the screen origin. When the active state block is created, it loads its local origin variable with the current position at that time.

All the draws are performed in the current foregound color, using the current line type, in the current color mode. Most graphic commands alter the current position, and some the current direction. The changes are documented in the command descriptions.

The coordinate system for the video station assumes that zero degrees points up, 90 degrees (= −270 degrees) points right, 180 degrees points down, and 270 degrees points left. A turn by a positive angle defines a turn in a clockwise direction. The graphic commands are:

| | |
|---|---|
| MOVE ABSOLUTE | M |
| MOVE RELATIVE | m |
| LINE DRAW | L |
| DRAW DOT | D |
| ARC DRAW | A |
| BOX DRAW | B |
| CLEAR RECTANGLE | c |
| START POLYGON FILL | F |
| END POLYGON FILL | E |
| DISABLE POLYGON FILL | ; |
| TURN COORDINATE SYSTEM | T |
| SKIP FORWARD | s |
| DRAW FORWARD | d |
| ARC DRAW (polar) | a |
| PIE SLICE | S |
| TURN | t |
| SET LINE TYPE | u |
| CLEAR SCREEN | ^S |

Tables 133–150 describe these commands.

TABLE 129

| | |
|---|---|
| Command | PUSH CURRENT POSITION |
| Character | ? |
| Input Parameters | none |
| Output Parameters | Current X<br>Current Y |

TABLE 129-continued

| | |
|---|---|
| Type | Monadic |
| Description | The current position is read from the active state block and pushed onto the parameter stack (X value first then the Y value). |
| Error Handling | |
| Error | Action |
| PARAMETER STACK UNDERFLOW | Popping data from the parameter stack caused an underflow. The error procedure is invoked. |

TABLE 130

| | |
|---|---|
| Command | ENTER WINDOW |
| Character | ^W |
| Input Parameters | Window number |
| Output Parameters | None |
| Type | Post-fix or Pre-fix |
| Description | THIS COMMAND IS VALID IN BOTH GRAPHICS AND TEXT MODES. The active state block is pushed onto the active window. The window specified in the command then becomes the active window, and the top state block in that window is popped to become the new active state block. Only the least significant two bits of the window number parameter are inspected. The high order bits are ignored. |
| Error Handling | |
| Error | Action |
| PARAMETER STACK UNDERFLOW | Popping data from the parameter stack caused an underflow. The error procedure is invoked. |

TABLE 131

| | |
|---|---|
| Command | START SIDE TRIP |
| Character | { |
| Input Parameters | none |
| Output Parameters | none |
| Type | Monadic |
| Description | A copy of the active state block is pushed onto the active window. The active state block remains unchanged and is ready to be used by a side trip. |
| Error Handling | |
| Error | Action |
| STATE BLOCK POOL EMPTY | No memory space is available to allocate to form a new state block. The error procedure is invoked. |

TABLE 132

| | |
|---|---|
| Command | END SIDE TRIP |
| Character | } |
| Input Parameters | none |
| Output Parameters | none |
| Type | Monadic |
| Description | The top state block in the active window is popped from the active window and stored as the new active state block. The previous active state block is lost. |
| Error Handling | |
| Error | Action |
| WINDOW EMPTY | The active window does not contain any state blocks. The error procedure is initiated. |

Text Commands

Figure 17E:
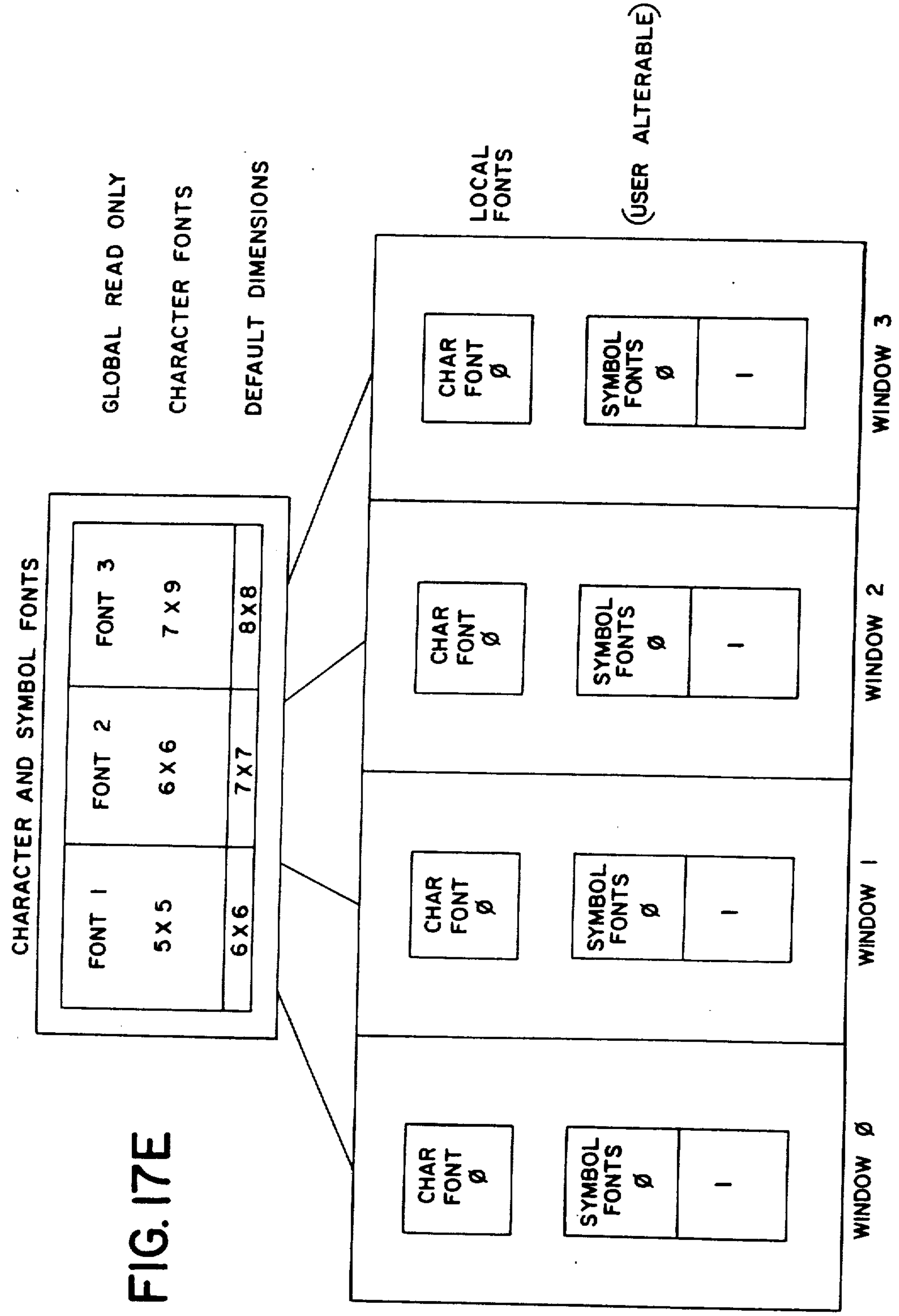
FIG. 17E is a diagrammatic representation of the character and symbol fonts that can be generated by the high level graphic language.

This set of commands allows characters and symbols to be displayed on the screen. Each video station window has access to four character fonts, one of which is alterable, the other three are shared by all four windows (see FIG. 17E). Each font contains 128 characters. All characters are defined in a 8 (horizontal) by 10 (vertical) character box. The Host CPU can only have access to one of the four fonts at any time. This is selected by the Host CPU issuing a SELECT CHARACTER FONT command. Characters are represented by 7 bit numbers, the most significant bit in the byte is ignored.

Character font 0 is the font which the Host CPU can alter. The other fonts (1-3) are read only. The character sizes are as follows:

| FONT | SIZE (w × h) | DIMENSIONS |
|---|---|---|
| 0 | User definable | User defined |
| 1 | 5 × 5 | 5 × 6 |
| 2 | 6 × 6 | 7 × 7 |
| 3 | 7 × 9 | 8 × 10 |

TABLE 133

| | |
|---|---|
| Command | MOVE ABSOLUTE |
| Character | M |
| Input Parameters | X<br>Y |
| Output Parameters | none |
| Type | Post-fix and pre-fix |
| Description | The current cursor position is replaced by values specified in this command. The values are considered as 16 bit signed integers. It is legal to move outside the screen area. The X and Y arguments are relative to the local origin. This is the origin defined in the active state block, it may be different from the screen origin. |
| Error Handling | |
| Error | Action |
| PARAMETER STACK UNDERFLOW | Popping data from the parameter stack caused an underlow. The error procedure is invoked. |

TABLE 134

| | |
|---|---|
| Command | MOVE RELATIVE |
| Character | m |
| Input Parameters | dx<br>dy |
| Output Parameters | none |
| Type | Post-fix and pre-fix |
| Description | The 2 values specified by this command (relative move lengths) are added to the current position to generate a new current position. The relative move parameters are considered as 16 bit signed intergers. It is the responsibility of the user to ensure that an integer overflow does not occur. The VID-CPU does not check for this condition which will produce an undefined new current position. It is legal to move outside the screen area. |
| Error Handling | |
| Error | Action |
| PARAMETER STACK UNDERFLOW | Popping data from the parameter stack caused an underflow. The error procedure is invoked. |

TABLE 135

| | |
|---|---|
| Command | LINE DRAW |
| Character | L |
| Input Parameters | dx<br>dy |
| Output Parameters | none |
| Type | Post-fix and pre-fix |
| Description | A line is drawn on the screen from the current position to a point calculated by adding the relative lengths to the current position. The current position is then moved to the end point of the line. If the line described is partially out of the screen area then it is clipped to the screen boundaries. If the line lies entirely outside the screen, then it is not drawn at all. The current direction becomes the direction of the line. The clipping only clips the line, it does not effect the newly calculated current position. If the addition of the relative lengths to the current position causes an overflow the action of the VID-CPU will be undefined. It is the responsibility of the user to ensure that this will not occur, no error will be reported. Both parameters are in the form of 16 bit signed integers. |
| Error Handling | |
| Error | Action |
| PARAMETER STACK UNDERFLOW | Popping data from the parameter stack caused an underflow. The error procedure is invoked. |

TABLE 136

| | |
|---|---|
| Command | DRAW DOT |
| Character | D |
| Input Parameters | none |
| Output Parameters | none |
| Type | Monadic |
| Description | A dot is drawn on the screen at the current position. If the current position is not inside the screen area then no dot is drawn. The current position and direction are not affected by this command. |
| Error Handling | |
| Error | Action |
| PARAMETER STACK UNDERFLOW | Popping data from the parameter stack caused an underflow. The error procedure is invoked. |

TABLE 137

| | |
|---|---|
| Command<br>4.7.5 | ARC DRAW (rectilinear) |
| Character | A |
| Input Parameters | dX destination<br>dY destination<br>dX intermediate<br>dY intermediate |
| Output Parameters | none |
| Type | Post-fix and pre-fix |
| Description | An arc is drawn on the screen starting at the current position and ending at the destination co-ordinates specified in the command. The arc will be drawn so that it passes through the intermediate point. The center of the arc is not specified and is calculated by the VID-CPU it does not have to be inside the screen area.<br>If any part of the arc falls outside the screen area then the arc is clipped to the screen boundaries. If the arc falls completely outside the screen area it is not drawn. An arc with the destination co-ordinates equal to the current position describes a circle.<br>The current position is changed to the destination co-ordinates of the arc, and the current direction becomes the direction of a tangent to the arc at the destination point in the direction in which the arc was described. All four parameters are represented as 16 bit signed integers. |
| Error Handling | |
| Error | Action |
| PARAMETER STACK | Popping data from the parameter |

TABLE 137-continued

| | |
|---|---|
| UNDERFLOW | stack caused an underflow. The error procedure is invoked. |

TABLE 138

| | |
|---|---|
| Command | BOX DRAW |
| Character | B |
| Input Parameters | dx<br>dy |
| Output Parameters | none |
| Type | Post-fix and pre-fix |
| Description | A rectangle is drawn on the screen with corner points at the current position and at the point calculated by adding the box edge lengths to the current position. If any of the box is outside the screen then the box edges are clipped to the screen boundaries. If all edges of the box lay outside the screen then the box is not drawn at all. The cursor position or current direction are not changed by this command. Both dX and dY are 16 bit signed integers. |
| Error Handling | |
| Error | Action |
| PARAMETER STACK UNDERFLOW | Popping data from the parameter stack caused an underflow. The error procedure is invoked. |

TABLE 139

| | |
|---|---|
| Command | CLEAR RECTANGLE |
| Character | c |
| Input Parameters | dx<br>dy |
| Output Parameters | none |
| Type | Post-fix and pre-fix |
| Description | A rectangle is described with corner points at the current position and at the point calculated by adding the box edge lengths to the current position. This rectangle is then cleared to the background colour. If any part of the rectangle lies outside the screen it is clipped to the screen boundaries, and the area remaining on the screen is cleared. If the rectangle lies entirely off the screen then the screen is not touched. If the edges of the rectangle lie off the screen, but they describe an area including the screen, then the whole screen will be cleared. Both dX and dY are 16 bit signed integers.<br>This command does not effect the current position or the current direction. |
| Error Handling | |
| Error | Action |
| PARAMETER STACK UNDERFLOW | Popping data from the parameter stack caused an underflow. The error procedure is invoked. |

TABLE 140

| | |
|---|---|
| Command | START POLYGON FILL |
| Character | F |
| Input Parameters | none |
| Output Parameters | none |
| Type | Monadic |
| Description | This command defines the start of a polygon. The polygon is defined by the following line and arc draw commands until an end polygon command is encountered. If the commands defining the polygon do not produce a totaly enclosed space, then the results of the polygon fill will be undefined. It is the responsibility of the Host to check for inappropriate commands such as a MOVE within a polygon structure. The current position and direction are not affected by this command. |
| Error Handling | |
| Error | Action |
| POLYGON OVERFLOW | |
| PARAMETER STACK UNDERFLOW | Popping data from the parameter stack caused an underflow. The error procedure is invoked |

TABLE 141

| | |
|---|---|
| Command | END POLYGON FILL |
| Character | E |
| Input Parameters | none |
| Output Parameters | none |
| Type | Monadic |
| Description | This command defines the end of a polygon. The polygon is defined by the preceding start polygon command followed by line and arc draw commands. The polygon defined is filled to the foreground colour. If the commands defining the polygon do not produce a totaly enclosed space, then the results of the polygon fill will be undefined. Care should be taken to ensure that the polygon starts and ends on the same point. If the start point and end point are not the same, then the VID-CPU will insert a straight line from the end point to the start point. The current position is set to the polygon end point, and the current direction to the direction of the final line describing the polygon. |
| Error Handling | |
| Error | Action |
| POLYGON OVERFLOW | |
| PARAMETER STACK UNDERFLOW | Popping data from the parameter stack caused an underflow. The error procedure is invoked. |

TABLE 142

| | |
|---|---|
| Command | DISABLE POLYGON FILL |
| Character | ; |
| Input Parameters | none |
| Output Parameters | none |
| Type | Monadic |
| Description | This command indicates that the command following is not to be included in the definition of a polygon. It is only relevant when executed between start and end polygon fill commands, otherwise it is ignored. |
| Error Handling | |
| Error | Action |

TABLE 143

| | |
|---|---|
| Command | TURN CO-ORDINATE SYSTEM |
| Character | T |
| Input Parameters | Angle |
| Output Parameters | none |
| Type | Pre-fix or post-fix |
| Description | The co-ordinate system may be rotated in 90 degree increments using this command. The only valid parameters are −270, |

TABLE 143-continued

| | |
|---|---|
| | −180, −90,0,90,180,270. An angle of 90 indicates a rotation of 90 degrees in the clockwise direction relative to the current co-ordinate system. The current direction is also turned by the specified angle. The current position remains unchanged. |
| Error Handling | |
| Error | Action |
| INVALID TURN ANGLE | The angle specified is not one of the values given above. An angle of 0 degrees is assumed and the error procedure is initiated. |
| PARAMETER STACK UNDERFLOW | Popping data from the parameter stack caused an underflow. The error procedure is invoked. |

TABLE 144

| | |
|---|---|
| Command | SKIP FORWARD |
| Character | s |
| Input Parameters | Length |
| Output Parameters | none |
| Type | Post-fix and pre-fix |
| Description | The current position is moved in the current direction by the length specified in the command. The current direction remains unchanged. It is permissable to move outside the screen area. |
| Error Handling | |
| Error | Action |
| PARAMETER STACK UNDERFLOW | Popping data from the parameter stack caused an underflow. The error procedure is invoked. |

TABLE 145

| | |
|---|---|
| Command | DRAW FORWARD |
| Character | d |
| Input Parameters | Length |
| Output Parameters | none |
| Type | Post-fix and pre-fix |
| Description | A line is drawn from the current position in the current direction for the length given in the command. The current position moves to the end point of the line. The current direction remains unchanged. If the line is partially outside the screen area then it is clipped to the screen boundaries. If the line lies completely outside then it is not drawn. Clipping does not affect the new current position. |
| Error Handling | |
| Error | Action |
| PARAMETER STACK UNDERFLOW | Popping data from the parameter stack caused an underflow. The error procedure is invoked. |

TABLE 146

| | |
|---|---|
| Command | ARC DRAW (polar) |
| Character | a |
| Input Parameters | Angle<br>Diameter |
| Output Parameters | none |
| Type | Post-fix and pre-fix |
| Description | An arc is drawn on the screen starting at the current position in the current direction. The length of the arc is specified by the angle parameter and the center is calculated by the VID-CPU using the diameter parameter. The angle parameter is the angle subtended by the arc at the arc center point. A positive angle results in a clockwise arc, a negative angle in an anti-clockwise arc. If the value of the angle equals 360 degrees then a circle is drawn. If |

TABLE 146-continued

| | |
|---|---|
| | the value of the angle exceeds 360 degrees then a circle is drawn, but the current position is moved passed the start point of the arc. If any part of the arc falls outside the screen area then the arc is clipped to the screen boundaries. If the arc falls completely outside the screen area it is not drawn.<br>The current position is moved to the end point of the arc. This position is found by calculating the final position after moving around the arc the correct number of degrees. The current direction is calculated by adding the angle parameter to the original current direction. |
| Error Handling | |
| Error | Action |
| PARAMETER STACK UNDERFLOW | Popping data from the parameter stack caused an underflow. The error procedure is invoked. |

TABLE 147

| | |
|---|---|
| Command | PIE SLICE |
| Character | S |
| Input Parameters | Angle<br>Diameter |
| Output Parameters | none |
| Type | Post-fix and pre-fix |
| Description | An arc is drawn in the same manner as with the polar draw arc command. Both ends of the arc are then connected to the arc center by straight lines. A positive angle results in a clockwise pie slice, a negative angle in an anti-clockwise pie slice. If the value of the angle equals 360 degrees then a circle with one radius is drawn. The pie slice angle must not exceed 360 degrees. If any part of the pie slice falls outside the screen area then it is clipped to the screen boundaries. If the pie slice falls completely outside the screen area then it is not drawn.<br>The current position is moved to the end point of the arc on the circumference of the pie slice. The current direction is calculated by adding the angle parameter to the original current direction. |
| Error Handling | |
| Error | Action |
| ANGLE OVERFLOW | The angle of the pie slice is outside the range −360 to 360 degrees. The angle is assumed to be 360 (or −360) degrees and the error procedure is initiated. |
| PARAMETER STACK UNDERFLOW | Popping data from the parameter stack caused an underflow. The error procedure is invoked. |

TABLE 148

| | |
|---|---|
| Command | TURN (current direction) |
| Character | t |
| Input Parameters | Angle |
| Output Parameters | none |
| Type | Post-fix and pre-fix |
| Description | The angle specified in the command is added to the current direction. A positive angle specifies a clockwise turn (0 degrees = 360 degrees). A negative angle an anti-clockwise turn. If the absolute value of the angle parameter is greater than 360 then 360 (or −360 for negative angles) is continually subtracted from it until it yields a value under 360. The current position remains unchanged. |
| Error Handling | |
| Error | Action |
| PARAMETER STACK UNDERFLOW | Popping data from the parameter stack caused an underflow. The error procedure is invoked. |

TABLE 149

| | |
|---|---|
| Command | SET LINE TYPE |
| Character | u |
| Input Parameters | Type |
| Output Parameters | none |
| Type | Post-fix and pre-fix |
| Description | The parameter specified by this command selects the type of line to be used as the current line type in the active state block. All lines are drawn using the current line type until another SET LINE TYPE command is received, or another state block with a different line type is made active. The following types of lines are supported by the VID-CPU |

| TYPE | DESCRIPTION |
|---|---|
| 0 | Proportionally spaced dashed line (1 pel wide) |
| 1 | Solid line 1 pel wide |
| 2 | Solid line 2 pels wide |
| 3 | Solid line 3 pels wide |
| 4 | Solid line 4 pels wide |
| 5 | Solid line 5 pels wide |
| 6 | Solid line 6 pels wide |
| 7 | Solid line 7 pels wide |
| 8 | Solid line 8 pels wide |

| | |
|---|---|
| Error Handling | |
| Error | Action |
| INVALID LINE TYPE | The line type is outside the range 0–8. A value of 1 is assumed and the error procedure is invoked. |
| PARAMETER STACK UNDERFLOW | Popping data from the parameter stack caused an underflow. The error procedure is invoked. |

TABLE 150

| | |
|---|---|
| Command | CLEAR SCREEN |
| Character | S |
| Input Parameters | none |
| Output Parameters | none |
| Type | Monadic |
| Description | THIS COMMAND IS VALID IN BOTH TEXT MODE AND GRAPHIC MODE. The contents of the whole screen are set to the background colour. The current position and direction remain unchanged. |
| Error Handling | |
| Error | Action |

Font 1 contains capitals only, for use in labelling mimic diagrams and graphs; and font 2 contains upper and lower case characters for use in applications where a large amount of text is required in a display. Font 3 contains large characters with descenders for use in applications where detailed characters are required. Each font has an associated default character dimension parameters. These parameters define the spacing between characters. Whenever a font is selected, the default values are used. The Host CPU has the ability to change these parameters at any time using the SET CHARACTER DIMENSIONS command.

Each window also has two user definable symbol fonts. These fonts each contain 128 symbols defined in a 8×8 pel matrix. Symbols are drawn on the screen in graphics mode only, using the DRAW SYMBOL command. The Host CPU can only access one symbol font in the active window at any one time. This is defined to be the current symbol font.

The Host CPU can load any type of alterable font using the BLOCK WRITE command. The operator can define symbols and characters (font 0 only) interactively by issuing the DEFINE CHARACTER/SYMBOL command. This enables a character or symbol to be defined and entered in one of the three alterable fonts.

The spacing between characters can be selected, as can the size of the characters. The character fonts can be scaled by a factor of 1, 2 or 4 in either the horizontal or the vertical direction. The horizontal and vertical scaling are completely independent.

Characters can be drawn using the DRAW CHARACTER command or by entering text mode. If the DRAW CHARACTER command is used a character is drawn with the bottom left hand corner of its character box at the current position. This command can draw a character at any position on the screen.

To speed up the transmission rate of alphanumerics, the datastream can operate in the text mode. In text mode every byte is treated as an ASCII character, and only the control characters are treated as commands. All data is treated as characters to be drawn on the screen until an ENTER GRAPHICS MODE command is encountered. The commands valid in text mode are discussed in the following subsection entitled "Text Mode Commands". Characters in text mode may only be drawn in the current text window. Many character windows may exist on the display but the Host CPU may only write characters to the window defined in an active state block. Text windows are defined using the DEFINE TEXT WINDOW command. Automatic carriage return, linefeed, and scrolling are performed in the text window by the video station. The text commands are:

| | |
|---|---|
| DEFINE TEXT WINDOW | y |
| SET CHARACTER DIMENSIONS | v |
| SET CHARACTER SCALING | k |
| DEFINE CHARACTER/SYMBOL | j |
| SELECT CHARACTER FONT | H |
| SELECT SYMBOL FONT | w |
| DRAW CHARACTER | ' |
| DRAW SYMBOL | K |
| ENTER TEXT MODE | G |

These commands are fully described in Tables 151–159.

TABLE 151

| | |
|---|---|
| Command | DEFINE TEXT WINDOW |
| Character | y |
| Input Parameters | dX<br>dY |
| Output Parameters | none |
| Type | Pre-fix or post-fix |
| Description | A rectangle is defined on the screen with corner points at the current position and at the point calculated by adding the dX,dY values to the current position. This rectangle is then stored in the active state block as the current text window. If the text window is partially outside the screen area, then it is clipped to the screen boundaries. The area of the window (after clipping) must be such that the area defined by the character dimensions will fit inside it. Some part of the text window must fall inside the screen area. The current position is moved to the left hand edge of the text window (after clipping) and positioned one current character Y dimension down from the top edge of the window. The current direction remains unchanged. |
| Error Handling | |
| Error | Action |
| INVALID TEXT WINDOW | The text window is defined outside the screen area. The error procedure is initiated. |
| INVALID CHARACTER DIMENSION | The character dimension is larger than the text window. The error procedure is initiated. |
| PARAMETER STACK UNDERFLOW | Popping data from the parameter caused an underflow. The error procedure is invoked. |

TABLE 152

| | |
|---|---|
| Command | SET CHARACTER DIMENSIONS |
| Character | v |
| Input Parameters | X dimension<br>Y dimension |
| Output Parameters | none |
| Type | Pre-fix or post-fix |
| Description | The size of the character box to be used with the current character font is loaded into the active state block, and used for drawing all following characters on the screen. The X and Y dimensions define the number of pels of the character box that will be drawn on the screen buffer. If both values equal one then the bottom left hand pel is drawn. If the values equal the character dimensions then the whole character box is drawn. If the values are greater than the size of the character box then the extra pels are set to 'blanks'. The current text window must be capable of displaying at least one character with the dimensions defined. The size of the character to be written to the screen is defined by the X and Y dimensions. If the scaling factor is altered the character dimensions are also changed by the same factor to allow the new size characters to be written to the screen. |
| Error Handling | |
| Error | Action |
| PARAMETER STACK UNDERFLOW | Popping data from the parameter stack caused an underflow. The error procedure is invoked. |

TABLE 153

| | |
|---|---|
| Command | SET CHARACTER SCALING |
| Character | k |
| Input Parameters | Horizontal scaling factor<br>Vertical scaling factor |

TABLE 153-continued

| | |
|---|---|
| Output Parameters | none |
| Type | Post-fix or pre-fix |
| Description | Characters can be displayed in three horizontal and three vertical sizes. Horizontal and vertical scaling are independant of each other. The character box height or width are set corresponding to the scaling values given in the table. |

| FACTOR | HORIZONTAL | VERTICAL |
|---|---|---|
| 1 | 8 pels | 10 pels |
| 2 | 16 pels | 20 pels |
| 3 | 32 pels | 40 pels |

| | |
|---|---|
| | The size of the character drawn in the screen buffer depends upon the current character dimensions. The values shown above represent the maximum sizes of characters for any given scaling factor. |
| Error Handling | |
| Error | Action |
| INVALID CHARACTER SCALING | The scaling values are outside the range 1-3. A value of 1 is assumed and the error procedure is initiated. |
| INVALID CHARACTER SIZE | The character size is larger than the text window. The error procedure is initiated. |
| PARAMETER STACK UNDERFLOW | Popping data from the parameter stack caused an underflow. The error procedure is invoked. |

TABLE 154

| | |
|---|---|
| Command | DEFINE CHARACTER/SYMBOL |
| Character | J |
| Input Parameters | Font number<br>Character number<br>10 byte font |
| Output Parameters | none |
| Type | Pre-fix or post-fix |

TABLE 154-continued

| | |
|---|---|
| Description | This command replaces a character or symbol in one of alterable fonts with the character defined in the command. The char- acter number selects which of of the 128 characters or symbols is defined. If one of the symbol fonts is specified then only the first 8 bytes of the character description is loaded into the font. All 10 bytes are loaded into the character font. The font number selects a font as defined below Only the least significant two bits of the font number parameter and the least significant seven bits of the character number are valid. |
| | NUMBER — FONT |
| | 0 — Text font 1 |
| | 1 — Text font 1 |
| | 2 — Symbol font 1 |
| | 3 — Symbol font 2 |
| Error Handling | |
| Error | Action |
| PARAMETER STACK UNDERFLOW | Popping data from the parameter stack caused an underflow. The error procedure is invoked. |

TABLE 155

| | |
|---|---|
| Command | SELECT CHARACTER FONT |
| Character | H |
| Input Parameters | Character font number |
| Output Parameters | none |
| Type | Pre-fix or post-fix |
| Description | Each window has access to one of four character fonts. This command selects which of the fonts is to be the current character font. If any of the fonts 1-3 are selected (read only fonts) then the current character dimensions are loaded with the associated default values. These can be changed at any time using the SET CHARACTER DIMENSIONS command. Only the least significant two bits of the font number parameter are valid. |

| FONT | SIZE (w × h) | DIMENSIONS |
|---|---|---|
| 0 | User definable | User defined |
| 1 | 5 × 5 | 5 × 6 |
| 2 | 6 × 6 | 7 × 7 |
| 3 | 7 × 9 | 8 × 10 |

| | |
|---|---|
| Error Handling | |
| Error | Action |
| PARAMETER STACK UNDERFLOW | Popping data from the parameter stack caused an underflow. The error procedure is invoked. |

TABLE 156

| | |
|---|---|
| Command | SELECT SYMBOL FONT |
| Character | U |
| Input Parameters | Symbol font number |
| Output Parameters | none |
| Type | Pre-fix or post-fix |
| Description | Each window has its own two symbol fonts. This command selects which of the fonts is to be the current symbol font for the active window. Only the least significant bit of the parameter is valid. |
| | 0 — Symbol Font 0 |
| | 1 — Symbol Font 1 |
| Error Handling | |
| Error | Action |
| PARAMETER STACK UNDERFLOW | Popping data from the parameter stack caused an underflow. The error procedure is invoked. |

TABLE 156-continued

TABLE 157

| | |
|---|---|
| Command | DRAW CHARACTER |
| Character | ' |
| Input Parameters | Character Code |
| Output Parameters | none |
| Type | Pre-fix or post-fix |
| Description | The character specified by the command is drawn on the screen at the current position. The current position is moved right (relative to the current co-ordinate system) by the current character X dimension. Using this command the character will be draw anywhere on the screen. The current text window is ignored. If the character is partially or completely outside the screen area then the character is not drawn, the current position is not affected, and a warning is sent to the Host. The current direction is not affected by this command. This command is the only command in graphic mode that can be drawn in STORE mode (see SET COLOUR MODE command description). |
| Error Handling | |
| Error | Action |
| PARAMETER STACK UNDERFLOW | Popping data from the parameter stack caused an underflow. The error procedure is invoked. |

TABLE 158

| | |
|---|---|
| Command | DRAW SYMBOL |
| Character | K |
| Input Parameters | Symbol code |
| Output Parameters | none |
| Type | Pre-fix or post-fix |
| Description | The symbol specified by the command is drawn on the screen at the current position. The current position is not affected by this command. If the character is partially or completely outside the screen area then the character is not drawn. the Error Handling |
| Error | Action |
| PARAMETER STACK UNDERFLOW | Popping data from the parameter stack caused an underflow. The error procedure is invoked. |

TABLE 159

| | |
|---|---|
| Command | ENTER TEXT MODE |
| Character | G |
| Input Parameters | none |
| Output Parameters | none |
| Type | Monadic |
| Description | This command switches the VID-CPU to text mode. All data following will be treated as characters (except for text mode control characters) and drawn in the text window. |
| Error Handling | |
| Error | Action |
| NO WINDOW DEFINED | No window has been defined prior to entering text mode. The error procedure is invoked. |

Text Mode Commands

In text mode all data is treated as characters to be drawn on the screen until an ENTER GRAPHICS MODE command is encountered. The commands valid in text mode are shown in Table 160.

Before text mode is entered the character dimensions, scaling, and font are selected. The text window in which the characters are to be drawn is also defined (see previous subsection). All characters received by the video station in text mode are drawn in the current text window.

The origin of each character is defined at the bottom left hand corner of its character box. The DEFINE TEXT WINDOW command leaves the current position so that if text mode is entered, the first character received from the Host CPU is drawn at the top left hand corner of the text window. The current position is moved right by the character X-dimension after each character is received. If the space remaining on the current line in the text window is too small to allow a character of the current size to be drawn, then the current position is moved to the left hand side of the text window at the start of the next line. The vertical position is determined by the character Y-dimension. If the current position is moved so that it falls below the text window, it is moved up until it is located at the bottom left hand corner. The text inside the window is scrolled up by the same amount, leaving one empty line at the bottom of the window to accept new text.

Characters that fall partially outside the text window are not clipped, they are drawn on the next line in the window.

TABLE 160

| | |
|---|---|
| BACKSPACE | ^H |
| TAB | ^I |
| LINEFEED | ^J |
| CLEAR LINE | ^K |
| CLEAR TEXT WINDOW | ^L |
| CARRIAGE RETURN | ^M |
| ENTER GRAPHICS MODE | ^T |
| CURSOR HOME | ^Z |
| TEXT CURSOR | ^C |

Tables 161-169 fully describe the text mode commands.

Color Commands

All images written into the screen buffers are in one of two colors; namely, the current foreground or background colors. These colors are selected from the 16 entries in the palettes. The background color is used to clear areas of the screen (CLEAR RECTANGLE, CLEAR SCREEN, CLEAR TEXT WINDOW, etc.). The draw fill, and text commands all use the current foreground color (DRAW LINE, DRAW CHARACTER, DRAW BAR etc). The image is written to the screen in one of three ways specified by the current color mode. See the SET COLOR MODE command description for details.

The foreground and background colors specify which bit planes are to be updated, and the type of update to be performed. By not updating one or more bit planes, different images can be constructed in the same area. These images can then be manipulated independently giving the impression of transparent colors.

As shown in FIG. 7, the screen is split up into zones (15 horizontal by 10 vertical). Each zone may select one of the four palettes. To remove the necessity of each task keeping track of which palettes are in use by the other tasks, the concept of logical and physical palettes is used. This allows each Host CPU task to reference its own palette by any number it pleases, regardless of the numbers any other task is using. The logical to physical mapping has to be performed only once at the start of each task.

TABLE 161

| | |
|---|---|
| Command | BACKSPACE |
| Character | ^H |
| Input Parameters | none |
| Output Parameters | none |
| Type | Monadic |
| Description | THIS COMMAND IS VALID IN TEXT MODE ONLY. The current position is moved left by the current character X dimension. If this action would result in the current position being moved outside the current window, then the command is ignored. The current direction remains unaltered. |
| Error Handling | |
| Error | Action |

TABLE 162

| | |
|---|---|
| Command | TAB |
| Character | ^I |
| Input Parameters | none |
| Output Parameters | none |
| Type | Monadic |
| Description | THIS COMMAND IS VALID IN TEXT MODE ONLY. All text windows are divided into vertical (tab) sections, each eight characters wide (except the last section which may be less). The TAB command moves the current position right to the begining of the next tab position. If the current position is within the last tab section on a line, then it is moved to the first tab position (bottom left hand corner of first character position) on the next line in the window. The TAB command will cause scrolling if the current position is within the last tab section on the bottom character line in a window. |
| The current direction remains unchanged. | |
| Error Handling | |
| Error | Action |

TABLE 163

| | |
|---|---|
| Command | LINEFEED |
| Character | ^J |
| Input Parameters | none |
| Output Parameters | none |
| Type | Monadic |
| Description | THIS COMMAND IS VALID IN TEXT MODE ONLY. The current position is moved down by the current character Y dimension. If this moves it below the text window then scrolling occurs until the current position is at the bottom edge of the text window. The current direction is not affected by this command. |
| Error Handling | |
| Error | Action |

TABLE 164

| | |
|---|---|
| Comand | CLEAR LINE |
| Character | ^K |
| Innput Parameters | none |
| Output Parameters | none |
| Type | Monadic |
| Description | THIS COMMAND IS VALID IN TEXT MODE ONLY. The character line in the current text window is cleared to the background colour. The current position is moved left to the left hand side of the text window. The area that is cleared is defined as follows: |

TABLE 164-continued

| | |
|---|---|
| | Height - character Y dimension<br>Width - width of text window<br>The current direction remains unchanged by this command. |
| Error Handling | |
| Error | Action |

TABLE 165

| | |
|---|---|
| Command | CLEAR TEXT WINDOW |
| Character | ^L |
| Input Parameters | none |
| Output Parameters | none |
| Type | Monadic |
| Description | THIS COMMAND IS VALID IN TEXT MODE ONLY. The current text window is cleared to the background colour. The current position is set to the left hand side of the window, Y-dimension from the top edge. The next character sent by the Host would be drawn in the first character position in the text window. The current direction remains unchanged. |
| Error Handling | |
| Error | Action |

TABLE 166

| | |
|---|---|
| Command | CARRIAGE RETURN |
| Character | ^M |
| Input Parameters | none |
| Output Parameters | none |
| Type | Monadic |
| Description | THIS COMMAND IS VALID IN TEXT MODE ONLY. The current position is moved left to the left hand edge of the text window. The current direction remains unchanged. |
| Error Handling | |
| Error | Action |

TABLE 167

| | |
|---|---|
| Command | ENTER GRAPHICS MODE |
| Character | ^T |
| Input Parameters | none |
| Output Parameters | none |
| Type | Monadic |
| Description | THIS COMMAND IS VALID IN TEXT MODE ONLY. All data received following this command is treated as graphic commands until an ENTER TEXT MODE is received. The current position and direction remain unchanged. |
| Error Handling | |
| Error | Action |

TABLE 168

| | |
|---|---|
| Command | CURSOR HOME |
| Character | ^Z |
| Input Parameters | none |
| Output Parameters | none |
| Type | Monadic |
| Description | THIS COMMAND IS VALID IN TEXT MODE ONLY. The current position is moved to the left hand side of the current text window, Y-dimension from the top edge. If a character is received, it will be drawn in the first position in the text window. The current direction remains unchanged. |
| Error Handling | |
| Error | Action |

TABLE 169

| | |
|---|---|
| Command | TEXT CURSOR |
| Character | ^C |
| Input Parameters | Boolean |
| Output Parameters | none |
| Type | Pre-fix |
| Description | THIS COMMAND IS VALID IN TEXT MODE ONLY. The boolean parameter controls the display of the text cursor.<br>Boolean — Cursor<br>0 — Not displayed<br>1 — Displayed |
| Error Handling | |
| Error | Action |

To allow the user to specify blinking colors each palette consists of two nine bit blocks 131 (see FIG. 6) for each of the 16 entries. The two blocks are switched at the blink so they become active alternately. If the same 9 bit color is contained in the same location in both blocks, then the color on the screen remains steady; otherwise the two colors blink. Each palette has 16 entries, each entry is associated with two 9 bit colors.

The color commands are:

| | |
|---|---|
| SET COLOR MODE | Y |
| SET FOREGROUND COLOR | f |
| SET BACKGROUND COLOR | b |
| SET ZONE | Z |
| SET PALETTE ENTRY | O |
| FETCH PALETTE ENTRY | Q |
| SET PALETTE MAP | U |
| EXOR PREFIX | x |

Tables 170-177 describe these commands in detail.

TABLE 170

| | |
|---|---|
| Command | SET COLOUR MODE |
| Character | Y |
| Input Parameters | Mode number |
| Output Parameters | none |
| Type | Post-fix or pre-fix |
| Description | This command selects one of three modes in which the screen may be updated. Colour modes 0 and 1 are identical in text and graphics mode. Colour mode 2 has different functions depending upon the mode. |

| NUMBER | MODE | ACTION |
|---|---|---|
| 0 | OR | Images are written directly into the screen buffer. |
| 1 | XOR | The contents of the screen buffer are exclusive ORed with the difference between the current foreground and background colours. |
| 2 | OR | (GRAPHIC mode only) Identical to mode 0. |
| 2 | STORE | (TEXT mode only) An area determined by the current character dimensions is cleared to the background colour before a character is written. |

The colour mode number is stored in the active state block. The mode is represented as an 2 bit number. Only the planes specified by the foreground (and background) colour are affected. In graphic mode two of the colour mode are treated the same as TABLE 170-continued

| | |
|---|---|
| | STORE has no direct meaning. Characters can be drawn in text mode using three different modes. The DRAW CHARACTER command is the only command in graphic mode to use the STORE mode. The XOR mode allows an image to be constructed in any available colour. If the same image is redrawn in XOR mode it is erased from the screen. |
| Error Handling | |
| Error | Action |
| INVALID MODE NUMBER | The mode number is outside the range 0-2. The mode is assumed to be 1 and the error procedure is initiated. |
| PARAMETER STACK UNDERFLOW | Popping data from the parameter stack caused an underflow. The error procedure is invoked. |

TABLE 171

| | |
|---|---|
| Commmand | SET FOREGROUND COLOUR |
| Character | f |
| Input Parameters | Colour code |
| Output Parameters | none |
| Type | Post-fix or pre-fix |
| Description | This command specifies an 8 bit colour code, two bits pertaining to each bit plane. The least significant two bits map to plane 1, the most significant to plane 4. Each pair of bits determines which planes will be updated, and the type of update to be performed. |

| CODE | UPDATE |
|---|---|
| 00 | Clear bit |
| 01 | Set bit |
| 10 | Bit not affected. |
| 11 | Bit not affected. |

The foreground colour is used by the following commands:
LINE DRAW
DRAW DOT
ARC DRAW
BOX DRAW
POLYGON FILL
DRAW FORWARD
PIE SLICE
DRAW CHARACTER
DRAW SYMBOL
DRAW BAR
DRAW LINE GRAPH

| | |
|---|---|
| Error Handling | |
| Error | Action |
| PARAMETER STACK UNDERFLOW | Popping data from the parameter stack caused an underflow. The error procedure is invoked. |

TABLE 172

| | |
|---|---|
| Command | SET BACKGROUND COLOUR |
| Character | b |
| Input Parameters | Colour code |
| Output Parameters | none |
| Type | Post-fix or pre-fix |
| Description | This command specifies an 8 bit colour code, two bits pertaining to each bit plane. The least significant two bits map to plane 0, the most significant to plane 3. Each pair of bits determines which planes will be updated, and the type of update to be performed. |

| CODE | UPDATE |
|---|---|
| 00 | Clear bit |
| 01 | Set bit |
| 10 | Bit not affected. |
| 11 | Bit not affected. |

The background colour is used by the following commands:
CLEAR RECTANGLE
CLEAR SCREEN TABLE 172-continued CLEAR LINE
CLEAR TEXT WINDOW
NEXT
TREND
CLEAR CHART
SHIFT
TEXT MODE in STORE colour mode only)

| | |
|---|---|
| Error Handling | |
| Error | Action |
| PARAMETER STACK UNDERFLOW | Popping data from the parameter stack caused an underflow. The error procedure is invoked. |

TABLE 173

| | |
|---|---|
| Command | SET ZONE |
| Character | S |
| Input Parameters | X co-ordinate<br>Y co-ordinate<br>Logical palette number |
| Output Parameters | none |
| Type | Pre-fix or post-fix |
| Description | The co-ordinate specified in this command maps to one of the zones on the screen. This zone is calculated and the contents in the zone map are mapped to the specified logical palette. Only the least significant two bits of the logical palette number parameter are valid. |
| Error Handling | |
| Error | Action |
| INVALID CO-ORDINATES | The co-ordinates specified are outside the screen area. The error procedure is initiated. |
| PARAMETER STACK UNDERFLOW | Popping data from the parameter stack caused an underflow. The error procedure is invoked. |

TABLE 174

| | |
|---|---|
| Command | SET PALETTE ENTRY |
| Character | O |
| Input Paramcters | Logical palette number (byte)<br>Logical colour (byte)<br>Hue 1<br>Hue 2 |
| Output Parameters | none |
| Type | Post-fix |
| Description | This command sets up a colour in one of the palettes. The logical palette number selects one of the four logical palettes. The logical colour selects one of the 16 entries in the palette. The hues select one of the 512 possible colours available. If the two hues have the same value, then a steady colour is defined, otherwise the two colours blink. Only the least significant two bits of the logical palette number, four bits of the logical colour, and nine bits of the hues are valid. |
| Error Handling | |
| Error | Action |
| PARAMETER STACK UNDERFLOW | Popping data from the parameter stack caused an underflow. The error procedure is invoked. |

TABLE 175

| | |
|---|---|
| Command | FETCH PALETTE ENTRY |
| Character | Q |
| Input Parameters | Logical palette number (byte)<br>Logical colour number (byte) |
| Output Parameters | Hue 1<br>Hue 2 |
| Type | Pre-fix or post-fix |
| Description | The 9 bit colours specified by this com- |

TABLE 175-continued

| | |
|---|---|
| | mand are pushed onto the parameter stack. The logical palette number selects one of the four logical palettes. The logical colour number selects one of the 16 entries into the logical palette. The two values associated with specified palette entry are pushed onto the parameter stack. The 9 bit colour codes are represented as 16 bit numbers with the most significant 7 bits set to zeros. Only the least significant two bits of the logical palette number, four bits of the logical colour, and nine bits of the hues are valid. |
| Error Handling | |
| Error | Action |
| PARAMETER STACK UNDERFLOW | Popping data from the parameter stack caused an underflow. The error procedure is invoked. |

TABLE 176

| | |
|---|---|
| Command | SET PALETTE MAP |
| Character | U |
| Input Parameters | Logical palette number (byte)<br>Logical palette number (byte)<br>Logical palette number (byte)<br>Logical palette number (byte) |
| Output Parameters | None |
| Type | Pre-fix or post-fix |
| Description | This command sets the mapping between the logical and physical palettes for the active state block. The four logical palette numbers specified, map in turn to physical palettes 0,1,2,3. All four parameters must be specified in this command. Only the least significant two bits of each parameter are valid. |
| Error Handling | |
| Error | Action |
| PARAMETER STACK UNDERFLOW | Popping data from the parameter stack caused an underflow. The error procedure is invoked. |

TABLE 177

| | |
|---|---|
| Command | EXOR PREFIX |
| Character | x |
| Input Parameters | none |
| Output Parameters | none |
| Type | Pre-fix or post-fix |
| Description | The next graphical draw command following this command will be performed in EXOR mode. All subsequent draws will be performed in the original mode. The following commands are affected<br>ARC DRAW (rectilinear)<br>ARC DRAW (polar)<br>LINE DRAW<br>DRAW FORWARD<br>BOX DRAW<br>DOT DRAW.<br>DRAW CHARACTER |
| Error Handling | |
| Error | Action |

Trend Commands

The video station has the facility to display trends using the commands described below. A trend is a graph which moves through a chart area while it is being updated (pen plotter simulation). Two types of trend graphs are supported in the video station: bar graphs, and line graphs. Bar graphs consist of rectangles filled with the foreground color whose height represents the data. Line graphs are constructed by plotting a point on the graph for each data item. The points are connected by straight lines in the foreground color. A maximum of two sets of bar graphs or four sets of line graphs may be plotted in any one chart. The two types may not be mixed.

Trending always moves the graphical data from right to left. This movement is relative to the current rotation of the coordinate system. By turning the coordinate system it is possible to display trending in any of the four major axis.

The area of the screen which is to include the trend must be defined to the video station using the DEFINE CHART command. Each window keeps track of only one chart definition at any one time. The chart defined in a window is the current chart and the only chart the Host CPU may use at that time.

The CHART BLOCKFILL command is used for initially filling a chart with data. The first bar (or line point) is written into the left of the chart and the following bars (points) are drawn from left to right across the chart to construct a graph. If the graph is filled and more data points are sent in these commands, then the leading extra data points are ignored. If the data transmitted is insufficient to fill the chart area, then the resulting graph is drawn right justified in the chart area.

When plotting bar graphs, the Host CPU has the ability to specify a base line other than the bottom edge of the chart. This allows positive and negative bars to be drawn in one chart. The bars are always drawn with their bottom left hand corner at the current position (if positive). When a chart is defined, the current position is set to the leftmost edge of the base line ready for plotting the first bar. Drawing a bar does not alter the current position. If the Host CPU requires bars to be drawn individually, the NEXT command can be used. This moves the current position right by the trend distance, in the correct position for drawing the next bar.

Line graphs are treated similar to bar graphs, except that the base line is assumed to be the bottom edge of the chart. A line graph with the same trend distance and containing the same number of data points as a bar graph does not have the same width due to the bars having a corresponding width.

The TREND command is used when new data is to be added to the right of the graph and the old data is shifted left. This command shifts the entire contents of the chart left by the trend distance. The old bar at the far left is removed from the screen, and an area is cleared at the right of the chart so as to be ready to draw a new bar (or line). The current position is left at the bottom left hand corner of this cleared area. If a DRAW BAR command follows, the new data is added to the graph.

All bars or lines destined for a chart are clipped to the chart boundaries. If clipping occurs, the data displayed is distorted. This results in the video station sending a warning to the Host CPU. The Host CPU then makes the decision to accept the distortion, indicate the distortion to the operator, or rescale the data.

Included in the trend section is the SHIFT command. This performs a similar action to trending but is not directly related to trending. This command does not use the current chart; rather, the area is specified as parameters in the command. The area is shifted in the direction indicated by the number of pels indicated. The area left 'empty' by the shift operation is filled with the background color.

The trend commands are:

| | |
|---|---|
| DEFINE CHART | o |
| CHART BLOCKFILL | q |
| NEXT | N |
| DRAW BAR | h |
| DRAW LINE GRAPH | i |
| TREND | V |
| CLEAR CHART | g |
| SHIFT | > |

Tables 178–185 describe these trend commands.

Touch Commands

The video station keeps a list of all buttons defined by the Host CPU. When the operator touches the screen, the video station searches the button table looking for a button hit. If a high priority button is hit, the idle loop task in the video station transmits the data to the Host CPU. Other touch data is passed to the video station idle loop macro. If the touch data survives this step, then a low priority button procedure checks for a low priority hit. If a hit is found, the data is sent to the Host CPU. The idle loop macro facility allows the Host CPU to send macros to the video station to process touch data without Host CPU assistance.

When touch information is sent to the Host CPU, it can respond with one of two replies. It may send an ACKNOWLEDGE INITIAL TOUCH informing the video station that the touch data has been received and no more data is required. If the Host CPU wants to poll the touch data, it responds with an ACKNOWLEDGE TOUCH PRESENCE command. The video station then sends the latest touch data to the Host CPU.

TABLE 178

| | |
|---|---|
| Command | DEFINE CHART |
| Character | o |
| Input Parameters | Type (byte)<br>Trend distance (byte)<br>Height<br>Number of data points<br>Base height |
| Output Parameters | none |
| Type | Pre-fix or post-fix<br>The type parameter specifies whether the chart is to be used for plotting a bar or a line graph. A bar graph consists of bars (height <= chart height, width =trend distance) filled to the foreground colour. A line graph is a series of points plotted at various heights connected by straight lines. The area below the line is not filled. Only the least significant bit of the type parameter is valid.<br>0 Bar graph<br>1 Line graph<br>A rectangular chart is established to be used by subsequent trend commands. The rectangle is defined with one corner point at the current position. The height of the chart is specified by the command. In the case of a bar chart, the number of data points is the number of bars to be plotted inside the chart. The trend distance is the width of the bars. The width of the chart is calculated from these two parameters. The base height parameter is only relevant when constructing a bar graph, it is ignored if a line chart is specified. This is the distance in pels of the base line from the base of the chart. If the value is greater than zero then negative bars (pointing down the base line) can be drawn<br>In the case of a line chart, the number of data points is the number of points to |

TABLE 178-continued

| | |
|---|---|
| | be plotted inside the chart. The trend distance is the horizontal distance between them. A line chart has a point plotted in each vertical edge of the chart area. If the number of samples is set to one then the chart would be one pel wide. If this were the case for a bar chart, the chart would be as wide as the trend distance (barwidth).<br>The VID-CPU has the concept of a current chart, only one chart is current at any one time. The current chart data is not stored in the active state block, but is associated with the active window. If the Host requires to plot data into a chart, the DEFINE CHART command should be retransmitted to redefine the chart area.<br>If the chart is defined partially outside the screen then it is clipped to the screen boundaries. Some part of the chart must be visible on the screen. If clipping is performed, then the warning procedure is invoked.<br>The current position is set to the bottom left hand corner of the chart area.<br>The current direction remains unchanged. |
| Error Handling | |
| Error | Action |
| INVALID CHART | The chart is defined completely outside of the screen area. The error procedure is initiated. |
| BASE HEIGHT INVALID | The base height is greater than the height of the chart. A value of 0 is assumed and the error procedure is invoked. |
| PARAMETER STACK UNDERFLOW | Popping data from the parameter stack caused an underflow. The error procedure is invoked. |

TABLE 179

| | |
|---|---|
| Command | CHART BLOCKFILL |
| Character | q |
| Input Parameters | Bar/point count<br>Data . . . |
| Output Parameters | none |
| Type | Pre-fix or post-fix |
| Description | This command takes the data and constructs a bar or line graph in the current chart area. The data is the height of the bars or points, the width is assumed to be the trend distance. The type parameter in the DEFINE CHART command specifies the type of data to be drawn in the chart area.<br>TYPE DESCRIPTION<br>0 The data parameters represent the height of bars, which are drawn on the screen and filled with the foreground colour.<br>1 The data parameters represent the height of points which are drawn on the screen.<br>The points are connected by straight lines. The current position is set to the bottom left hand corner of the current chart before the first bar is drawn. If the number of bars transmitted with this command does not fill the chart then the bars are right justified in the chart area. The bars will be drawn with space remaining at the left, not the right hand side of the chart. All bars are clipped to the current chart both horizontally and vertically. If the number of bars transmitted exceeds the space available in the chart area to display them then the first bars are ignored. The current position is always set to the bottom left hand corner of the right-most bar prior to the exit from this command. The current direction remains unaltered. |
| Error Handling | |

TABLE 179-continued

| Error | Action |
|---|---|
| NO CHART DEFINED | No chart has been defined. The error procedure is invoked. |
| PARAMETER STACK UNDERFLOW | Popping data from the parameter stack caused an underflow. The error procedure is invoked. |

TABLE 180

| | |
|---|---|
| Command | NEXT |
| Character | N |
| Input Parameters | none |
| Output Parameters | none |
| Type | Monadic |
| Description | The actions performed by this command differ depending upon the type of chart (bar or line). For a bar graph the current position is moved right by the trend distance. An area the height of the chart and the width of the trend distance is cleared to the background colour, ready to plot another bar. If the current chart is defined as a line chart then the current position is moved as previously described but the area cleared is to the left of the new current position. The whole of the area to be cleared must be visible inside the current chart. The current direction remains unaffected by this command. |
| Error Handling | |
| Error | Action |
| NO CHART DEFINED | No chart has been defined. The error procedure is invoked. |
| INVALID NEXT POSITION | The current position is not in a valid position to clear an area of the chart. The error procedure is invoked. |

TABLE 181

| | |
|---|---|
| Command | DRAW BAR |
| Character | h |
| Input Parameters | Height |
| Output Parameters | none |
| Type | Pre-fix or post-fix |
| Description | A bar is drawn with its bottom left hand corner at the current position. The bar has a width defined by the trend distance and a height passed as a parameter. The bar is filled to the foreground colour. If the height parameter has a negative value then the bar is drawn down from the current position. All bars are clipped to the screen area. The current position and direction remain unaffected by this command. |
| Error Handling | |
| Error | Action |
| PARAMETER STACK UNDERFLOW | Popping data from the parameter stack caused an underflow. The error procedure is invoked. |

TABLE 182

| | |
|---|---|
| Command | DRAW LINE GRAPH |
| Character | i |
| Input Parameters | Height of previous point<br>Height of current point |
| Output Parameters | none |
| Type | Pre-fix or post-fix |
| Description | The parameters specify the height of the last plotted point and the next point to be plotted. The next point is plotted directly above the current position at the height given by the parameter. A line is drawn in the current foreground colour connecting these two points. |

TABLE 182-continued

| | |
|---|---|
| | If the first parameter has the value hex 'FFFF' then only the point specified by the second parameter is plotted. Both points are assumed to fall within the chart area. The current position and direction remain unaffected by this command. |
| Error Handling | |
| Error | Action |
| NO CHART DEFINED | No chart has been defined The error procedure is invoked. |
| PARAMETER STACK UNDERFLOW | Popping data from the parameter stack caused an underflow. The error procedure is invoked. |

TABLE 183

| | |
|---|---|
| Command | TREND |
| Character | V |
| Input Parameters | Mask |
| Output Parameters | none |
| Type | Pre-fix or post-fix |
| Description | The contents of the current chart area are shifted left by the trend distance. If the chart is filled with bars then the left most bar is erased completely from the screen. An area the width of a bar and the height of the chart, at the right hand side of the chart is cleared to the background colour. The mask parameter informs the VID-CPU which of the four screen buffers take part in the trend operation. The least significant four bits of the mask define which planes will be affected (0 no action, 1 trend plane). These bit are shown below.<br>xxx1 Trend plane 0<br>xx1x Trend plane 1<br>x1xx Trend plane 2<br>1xxx Trend plane 3<br>The current position is set to the base of the current chart one barwidth left of the right hand chart boundary. If the chart contains line graphs then the actions performed are the same except that the current position is left at the bottom right hand corner of the chart. The current direction remains unchanged. |
| Error Handling | |
| Error | Action |
| NO CHART DEFINED | No chart has been defined. The error procedure is invoked. |
| PARAMETER STACK UNDERFLOW | Popping data from the parameter stack caused underflow. The error procedure is invoked. |

TABLE 184

| | |
|---|---|
| Command | CLEAR CHART |
| Character | g |
| Input Parameters | None |
| Output Parameters | None |
| Type | Monadic |
| Description | The area inside the current chart is cleared to the background colour. The current position is set to the bottom left hand corner of the chart. The current direction remains unchanged. |
| Error Handling | |
| Error | Action |
| NO CHART DEFINED | No chart has been defined. The error procedure is invoked. |

TABLE 185

| | |
|---|---|
| Command | SHIFT |
| Character | > |
| Input Parameters | dX<br>dY |

TABLE 185-continued

| | |
|---|---|
| | Mask (byte)<br>Direction (byte)<br>Distance |
| Output Parameters | none |
| Type | Pre-fix or post-fix |
| Description | This instruction describes a rectangle whose contents are to be shifted either horizontally or vertically. The rectangle is defined with corner points at the current position and at a point calculated by adding the dX, dY values to the current position. If the area is partially outside the screen then it is clipped to the screen boundaries. Some part of the area must be visible. The direction parameter defines the direction of the shift. The direction of the shift is relative to the current co-ordinate system. Only the least significant two bits of the direction parameter are valid.<br>0 up<br>1 right<br>2 down<br>3 left<br>The distance parameter specifies the number of pels to be moved. The current position and direction remain unchanged. The mask parameter informs the VID-CPU which of the four screen buffers take part in the shift operation. The least significant four bits of the mask define which planes will be affected (0 no action, 1 shift plane). These bits are shown below.<br>xxx1 Shift plane 0<br>xx1x Shift plane 1<br>x1xx Shift plane 2<br>1xxx Shift plane 3 |
| Error Handling | |
| Error | Action |
| INVALID AREA DEFINED | The rectangle defined for this command falls completely outside the screen boundaries. The command is ignored and the error reported to the Host. Processing continues normally. |
| PARAMETER STACK UNDERFLOW | Popping data from the parameter stack caused an underflow. The error procedure is invoked. |

The touch commands are:

| | |
|---|---|
| PUSH TOUCH COORDINATES | @ |
| ACKNOWLEDGE INITIAL TOUCH | I |
| ACKNOWLEDGE TOUCH PRESENCE | P |
| DEFINE BUTTON | J |
| ERASE BUTTON | e |

Tables 186-190 describe these commands.

Miscellaneous Commands

The following commands do not fit into any of the previous categories discussed. They are presented here under the miscellaneous heading:

| | |
|---|---|
| TRANSMIT | ^ |
| SEND ESCAPE SEQUENCE | \| |
| PREFIX | : |
| SET BELL FREQUENCY | ^F |
| BELL | ^G |
| KLAXTON | ^E |
| BLOCK WRITE | < |
| BLOCK READ | > |
| INITIALIZE | ^R |

Tables 191-199 describe these miscellaneous commands.

TABLE 186

| | |
|---|---|
| Command | PUSH TOUCH CO-ORDINATES |
| Character | |
| Input Parameters | none |
| Output Parameters | X touch<br>Y touch<br>Touch boolean |
| Type | Monadic |
| Description | The most recently received touch co-ordinates and the associated touch boolean are pushed onto the parameter stack. The touch boolean indicates whether the touch has already been acknowledged by the Host.<br>TOUCH BOOLEAN / DESCRIPTION<br>0 Host has not acknowledged touch<br>1 Host has acknowledged touch |
| Error Handling | |
| Error | Action |
| PARAMETER STACK OVERFLOW | Pushing data onto the parameter stack caused an overflow. The error procedure is invoked. |

TABLE 187

| | |
|---|---|
| Command | ACKNOWLEDGE INITIAL TOUCH |
| Character | I |
| Input Parameters | none |
| Output Parameters | none |
| Type | Monadic |
| Description | This command is sent by the Host in response to touch data being received from the VID-CPU. On reception of this acknowledge, the VID-CPU will transmit no further information on the touch. After the touch is released, subsequent touches will be reported. |
| Error Handling | |
| Error | Action |

TABLE 188

| | |
|---|---|
| Command | ACKNOWLEDGE TOUCH PRESENCE |
| Character | P |
| Input Parameters | none |
| Output Parameters | none |
| Type | Monadic |
| Description | This command is sent by the Host in response to touch data being received from the VID-CPU. On reception of this acknowledge, the VID-CPU will retransmit if the touch is still present. This loop continues for as long as the Host responds with the ACKNOWLEDGE TOUCH PRESENCE COMMAND and the touch is present. |
| Error Handling | |
| Error | Action |

TABLE 189

| | |
|---|---|
| Command | DEFINE BUTTON |
| Character | j |
| Input Parameters | Priority boolean<br>dX<br>dY<br>Button I.D. (4 char) |
| Output Parameters | none |
| Type | Pre-fix or post-fix |
| Description | A button is added to the VID-CPU button list. The button is defined to be a rectangular area on the screen surface. The area describing a button has corner points at the current position and at a point calculated by adding dX, dY to the |

TABLE 189-continued

| | |
|---|---|
| | current position. Buttons may not overlap and their centers must fall within the screen boundaries. The VID-CPU recognises two types of buttons, high priority and low priority. The idle loop task has routines to process each of these separately. When a button hit is detected, an escape sequence is sent to the Host containing the following information: Escape character 4 character button I.D. The VID-CPU is capable of storing a maximum of 64 buttons at any one time. |
| Error Handling | |
| Error | Action |
| OVERLAPPING BUTTON | The button overlaps a previously defined button. The error procedure is invoked. |
| INVALID BUTTON POSITION | The center point of the button lies outside the screen boundaries. The error procedure is invoked. |
| BUTTON TABLE OVERFLOW | Too many buttons are defined causing an overflow in the button table. The error procedure is invoked. |
| PARAMETER STACK UNDERFLOW | Popping data from the parameter stack caused an underflow. The error procedure is invoked. |

TABLE 190

| | |
|---|---|
| Command | ERASE BUTTON |
| Character | e |
| Input Parameters | dX dY |
| Output Parameters | none |
| Type | Pre-fix or post-fix |
| Description | All buttons which have their center point in the rectangle described by this command are erased from the VID-88 button list. The rectangle is defined with the corner points at the current position and at the point calculated by adding the dX, dY values to the current position. No error is reported if this area is partially or completely outside the screen boundaries. |
| Error Handling | |
| Error | Action |
| PARAMETER STACK UNDERFLOW | Popping data from the parameter stack caused an underflow. The error procedure is invoked. |

TABLE 191

| | |
|---|---|
| Command | TRANSMIT |
| Character | ^ |
| Input Parameters | Number |
| Output Parameters | none |
| Type | Post-fix |
| Description | The top word on the parameter stack is popped and transmitted to the Host. The transmission is sent via the auxiliary data link. |
| Error Handling | |
| Error | Action |
| PARAMETER STACK UNDERFLOW | Popping data from the parameter stack caused an underflow. The error procedure is invoked. |

TABLE 192

| | |
|---|---|
| Command | SEND ESCAPE SEQUENCE |
| Character | ] |
| Input Parameters | Word count data . . . |
| Output Parameters | none |
| Type | Post-fix |
| Description | The top word of the stack is popped and used as a word count. An escape character |

TABLE 192-continued

| | |
|---|---|
| | is then transmitted to the Host followed by a character count (calculated from the word count). A number of words (specified by the word count) are popped from the parameter stack and transmitted to the Host. The datastream is of the format shown below. ESCAPE CHAR, CHAR COUNT, CHAR, CHAR, CHAR, . . . The transmission takes place over the main data link, interspersed with keystrokes and touch data. |
| Error Handling | |
| Error | Action |
| PARAMETER STACK UNDERFLOW | The parameter stack is exhausted. The error procedure is invoked. |

TABLE 193

| | |
|---|---|
| Command | PREFIX |
| Character | : |
| Input Parameters | none |
| Output Parameters | none |
| Type | Monadic |
| Description | This command informs the VID-CPU that the command immediately following it is a prefix command. |
| Error Handling | |
| Error | Action |

TABLE 194

| | |
|---|---|
| Command | SET BELL FREQUENCY |
| Character | ^F |
| Input Parameters | Frequency |
| Output Parameters | none |
| Type | Pre-fix |
| Description | THIS COMMAND IS VALID IN BOTH GRAPHIC AND TEXT MODE. The frequency of the audio alarm is set up for use by the BELL command. The frequency range is from xx to xxK Hertz. The frequency number specified in this command is inversely proportional to the frequency of the alarm. Only the least significant byte of the frequency number is valid, the most significant byte is ignored. The current position and direction are not affected by this command. |
| Error Handling | |
| Error | Action |
| PARAMETER STACK UNDERFLOW | Popping data from the parameter stack caused an underflow. The error procedure is invoked. |

TABLE 195

| | |
|---|---|
| Command | BELL |
| Character | ^G |
| Input Parameters | none |
| Output Parameters | none |
| Type | Monadic |
| Description | THIS COMMAND IS VALID IN BOTH GRAPHIC AND TEXT MODE. The audio alarm on the VID-CPU is sounded. The duration of the alarm is approximately one second. The frequency of the alarm is determined by the SET BELL FREQUENCY command. The current position and direction are not affected by this command. |
| Error Handling | |
| Error | Action |

TABLE 196

| | |
|---|---|
| Command | KLAXON |

TABLE 196-continued

| | |
|---|---|
| Character | ^E |
| Input Parameters | none |
| Output Parameters | none |
| Type | Monadic |
| Description | This command sounds the klaxon alarm for 500 ms. It is the responsibility of the Host to continue transmitting the command if a continuous alarm is required. |
| Error Handling | |
| Error | Action |

TABLE 197

| | |
|---|---|
| Command | BLOCK WRITE |
| Character | < |
| Input Parameters | Destination I.D.<br>Data . . . |
| Output Parameters | none |
| Type | Pre-fix or post-fix |
| Description | This command allows the Host to transmit a data block to the VID-88 memory. The destination and the data size are determined by the destination I.D. parameter. |

| I.D. | DESTINATION | SIZE |
|---|---|---|
| 0 | Zone map | 150 bytes |
| 1 | Colour palette 1 | 16 words |
| 2 | Active state block | TBD |
| 3 | Text font 0 | 128 bytes |
| 4 | Symbol font 1 | 128 bytes |
| 5 | Symbol font 2 | 128 bytes |

Appendix B contains a description of the structure of the data blocks shown above.

Error Handling

| Error | Action |
|---|---|
| INVALID DESINATION ID. | The destination I.D. specified by this command is not in the range 0-5. The command is ignored and the error reporting procedure is invoked. |
| PARAMETER STACK UNDERFLOW | Popping data from the parameter stack caused an underflow. The error procedure is invoked. |

TABLE 198

| | |
|---|---|
| Command | BLOCK READ |
| Character | ~ |
| Input Parameters | Origin I.D. |
| Output Parameters | Data . . . |
| Type | Pre-fix or post-fix |
| Description | This command allows the Host to read a data block from memory of the VID-CPU. The origin and the data size are determined by the origin I.D. parameter. |

| I.D. | ORIGIN | SIZE |
|---|---|---|
| 0 | Zone map | 150 bytes |
| 1 | Colour palette 1 | 16 words |
| 2 | Active state block | TBD |
| 3 | Text font 0 | 128 bytes |
| 4 | Symbol font 1 | 128 bytes |
| 5 | Symbol font 2 | 128 bytes |

Error Handling

| Error | Action |
|---|---|
| INVALID DESTINATION ID. | The destination I.D. specified by this command is not in the range 0-5. The command is ignored and the error reporting procedure is invoked. |
| PARAMETER STACK UNDERFLOW | Popping data from the parameter stack caused an underflow. The error procedure is invoked. |

TABLE 199

| | |
|---|---|
| Command | INITIALISE |
| Character | ^R |
| Input Parameters | Type |
| Output Parameters | none |
| Type | Pre-fix |
| Decription | THIS COMMAND IS VALID IN BOTH TEXT MODE AND GRAPHIC MODE. The type parameter specifies the parts of the VID-CPU which are to be initialised. |

| TYPE | DESCRIPTION |
|---|---|
| 0 | Perform a soft reset. A hard reset is performed without invoking the power up diagnostics. |
| 1 | Initialise parameter stack. Parameter stack is purged. |
| 2 | Initialise active state block. The active state block is loaded with its default values. |
| 3 | Initialise active window. The active window is purged, except for the active state block, which is loaded with its default values. |
| 4 | Initialise interpreter. All macros, subroutines, and stacks are purged, and the VID-CPU registers are initialised. The state blocks are left untouched. |
| 5 | Initialise colours. The colour palette is loaded with the default colours. |

Error Handling

| Error | Action |
|---|---|
| INVALID RESET TYPE | The reset command parameter is outside the range 0-5. A value of O is assumed and the error procedure is invoked. |

VIDEO STATION ERRORS

Diagnostics

Power Up Diagnostics

Power up diagnostics are performed each time the video station is powered on. The Host CPU can also invoke the diagnostics by activating the reset line to the video station. The following functions are tested by the diagnostics:

| | |
|---|---|
| Memory check | All the RAM in the video station is checked.<br>All the ROM is read and the ROM checksums verified. |
| Video check | The bit planes are checked, and the video output circuits are tested (see Video check subsection) |
| Hardware check | All the video station logic is exercised (see Hardware check subsection). |

If any of the tests detect any type of failure, then the error procedure is invoked (see subsection on Error Reporting). Retries of tests causing errors are not performed. It is the responsibility of the Host CPU to instigate all retries. If the diagnostics reach the end, the video section initializat1on procedure is invoked.

Error Handling

The man-machine interface can operate in a process control environment. This make it important to react to all failures and errors cleanly, and to report them in a reliable manner. Most errors in the command datastream are caused by a user in designer mode. These errors can be easily corrected by informing the user of the problem. By the time a display file is run in operator mode, there should be no errors in the commands.

Logic Check

The large scale integration LSI chips that are included in the video station circuitry are tested by the video station prior to being initialized. Any circuit with loopback capability is tested in this manner.

Video Check

The keyboard logic contains analog to digital circuitry capable of measuring the video beam current. To allow the background diagnostics to test the video, a measurement on any one beam must be capable of being performed in the frame flyback time of the video circuitry . All three beams can be tested independently.

Watchdog Timer

The video station has an on board watchdog timing circuit. During initialization of the video station, the timer is set to trigger after 2 seconds. The video station operating system always resets the timer within that time frame during normal operation. If a time-out occurs it is assumed that the video station has encountered some type of failure, and the watchdog interrupt routine is called. This invokes the error procedure (see Error Reporting subsection).

Host CPU Time-out

It is the responsibility of the Host CPU to invoke a "time out" procedure if the video station fails to read buffers after a certain period of time. This procedure commences with the Host CPU resetting the video station.

Host CPU Datastream Errors

The command buffers received from the Host CPU have a built-in parity checking capability. If the transmission is in error the video station requests a retry by invoking the error procedure. It is the responsibility of the Host CPU to keep a record of retries and decide on the number permitted.

If the parity of the data is correct, the commands in the buffer are executed. If errors occur during the execution they are reported back to the Host CPU by invoking the error procedure.

Error Reporting

If errors are encountered in the video station, they are reported back to the Host CPU by invoking the error procedure. The error procedure operates as follows.

(1) An error code is transmitted to the Host CPU via the error datapath.

(2) The video station waits for a response from the Host CPU.

(3) The Host CPU responds to a video station error by transmitting an error acknowledge byte via the error datapath. The acknowledge can take one of three forms:

| | |
|---|---|
| CONTINUE ACKNOWLEDGE: | Ignore the error and continue processing the commands. The command that generated the error is executed using the error default values if appropriate. |
| IGNORE ACKNOWLEDGE: | Ignore the command that generated the error and continue processing beginning with the following command. |
| RESET ACKNOWLEDGE: | Execute a soft reset for the active window. |

The Host CPU may also activate the reset line to the video station causing a complete reset for all the video station windows. Video station warnings are reported to the Host CPU by the same mechanism. The video station treats errors and warnings identically.

INITIALIZATION

Initialization Procedure

The initialization procedure is executed following a power up, a hard reset from the Host CPU, or a SOFT RESET command (type O). Upon successful completion of the initialization, the video station resets the primary buffer count to 'empty', and waits for the Host CPU to transmit a buffer.

The following actions are performed during initialization:

1. All 128 video station registers are loaded with O.
2. The parameter stack is reset.
3. All internal video station parameters are reset.
4. All windows are allocated one state block which contains default values. Window 0 becomes the active window.
5. All color palettes are loaded with default values.
6. All zones are mapped to zone 0 and the screen is cleared.

Following initialization, the video CPU module interpreter executes graphic commands received by the host CPU.

MAN MACHINE INTERFACE ARCHITECTURE

Overview

The man-machine interface 20 comprises the various modules illustrated in FIG. 1. Each module shown therein (CPU module 22, memory module 24, video CPU module 26, video memory module 28, floppy disk control module 30, Winchester hard disk controller 32, general purpose communications module 34, local area network interface 36, and additional video CPU memories and additional CPU modules, 40, 42, and 38 respectively) are individually fabricated on electronic circuit boards 116 and are mounted within slots 107 of module housing 31, as best seen in FIG. 2. The boards communicate with each other by means of overall bus 93, as shown in FIG. 1 and consequently the man-machine architecture allows for different boards to communicate with each other so as to perform a particular function; where those particular functions may vary from installation to installation.

Thus the man-machine interface may have a single video monitor or multiple video monitors, may communicate by a communiations network such as the MODBUS™ communications network, may utilize a floppy disk controller and/or a hard disk controller, and may also communicate, with other devices through a local area network via a local area network interface, etc. Consequently, the architecture of the man-machine interface must allow such flexibility and ultimate use of the MMI regardless of the particular task to be accomplished by the MMI. It should be noted that many of the modules include independent microprocessors and it is therefore a function of the MMI architecture to allow those independent microprocessors to communicate with each other in an efficient fashion over the overall bus 93.

Conceptually, the architecture is similar to a communication network wherein the overall bus 93 represents the communication media and the boards 116 represent the nodes in the communication network. General information on such communication networks can be found in the publication entitled "Local Computer Networks", 2nd Edition, by Kenneth J. Thurber and Harvey A. Freeman, published by the Institute of Electronic Engineer Computer Society (IEEE Catalog No. EHO 179-2).

In a local communications network, the primary purpose of the media is to pass information between nodes; similarly, the primary purpose of the overall bus is to communicate information between the boards 116.

The types of information passed between the boards forming the man-machine interface have the characteristics as set forth in Table 26.

TABLE 26

(1) Data is passed. While the content (meaning) is unknown, the form is known. In a network, there are at least two forms; i.e., byte (8 bits) and word (16 bits). The network "transforms" the forms when the nodes are different. The overall bus 93 of the man-machine interface supports both byte and word transfers between different board including byte to word and word to byte transfers in addition to byte to byte and word to word transfers.

(2) Control information is passed. The network generally allows control information of the form "start task", "task aborted", "synchronize operation", "connect-disconnect", etc. This type of information is actually task-to-task information. Similarly, in the man-machine interface there is a need for a task-to-task "signalling" mechanism on the overall bus. In particular, the soft interrupt system as explained more fully later in this specification provides the capability where software tasks on individual boards initiate and respond to a special type of interrupt (called soft interrupts) which greatly facilitates interrupting another module in the man-machine interface and indicating the nature of the tasks to be performed.

(3) Network information is passed. This information represents control of the media in the sense of who owns the public bus, priorities of usage, and a "protocol" for acquiring ownership (token concept) of the public bus. This is necessary to allow an ordered usage of the bus. The present man-machine interface provides an enhanced bus arbitration scheme for enabling a second CPU module to be part of the overall MMI in a way that provides up to 50% of the public bus access while the remaining modules can access the bus for the remaining time and wherein information concerning the last token owner of the bus is maintained for rapid transfer back to that module after the second CPU relinquishes control of the bus.

(4) In a communications network, a predefined network of identifying and addressing nodes is required. Similarly, the man-machine interface bus 93 includes a board addressing and identification technique through status registers associated with each board to facilitate transfers of information between the boards and to enhance the self-diagnostic capabilities of the man-machine interface.

(5) In a local communications network, individual nodes may fail in a mechanism to notify other nodes of such failure is a desirable feature. Similarly, the man-machine interface of the present invention is able to maintain the integrity of the overall system through utilization of watchdog timers including an improved watchdog timer which minimizes the possibility of a defective module disrupting operation of the man-machine interface.

(6) Power up-power down, power fail and other asynchronous events. In network events such as power up do not normally occur at all nodes simultaneously. However, in a man-machine interface, power is normally applied to the bus and all boards simultaneously. However, the individual modules (boards) normally come to a usable operation at different times depending upon the circuity and software resident therein. This is actually due to the fact that each board (with a CPU) is essentially an independent computer. In essence, asynchronous events occur at the board level in a way similar to that found in local communication networks. The task of identifying and responding to such events is thus somewhat similar to that in the local communications network arena.

Hardware Overview

Figures 1, 2:
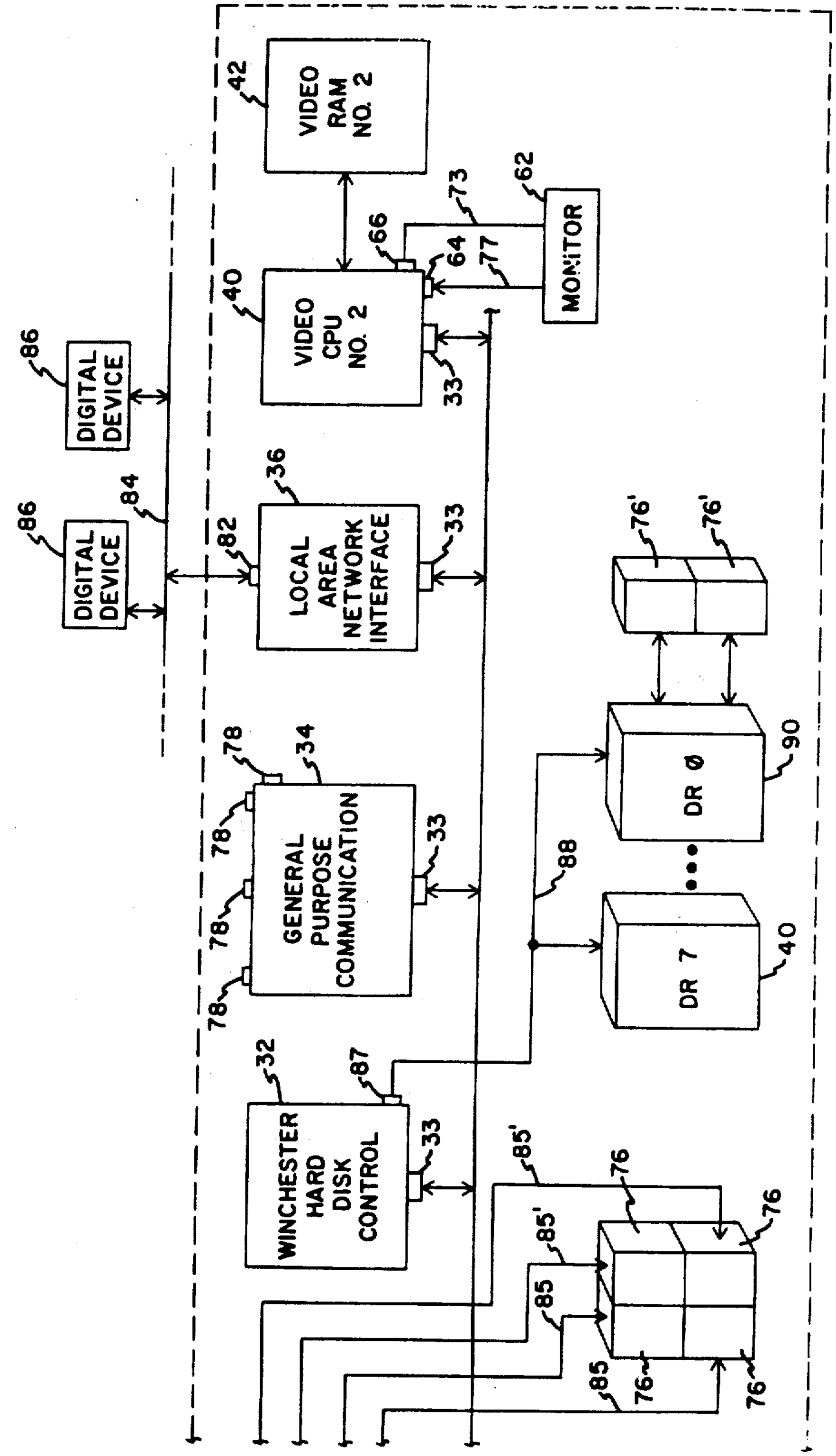
FIGS. 1-1 and 1-2 form an overall block diagram of the man-machine interface according to the present invention.
Figure 1A:
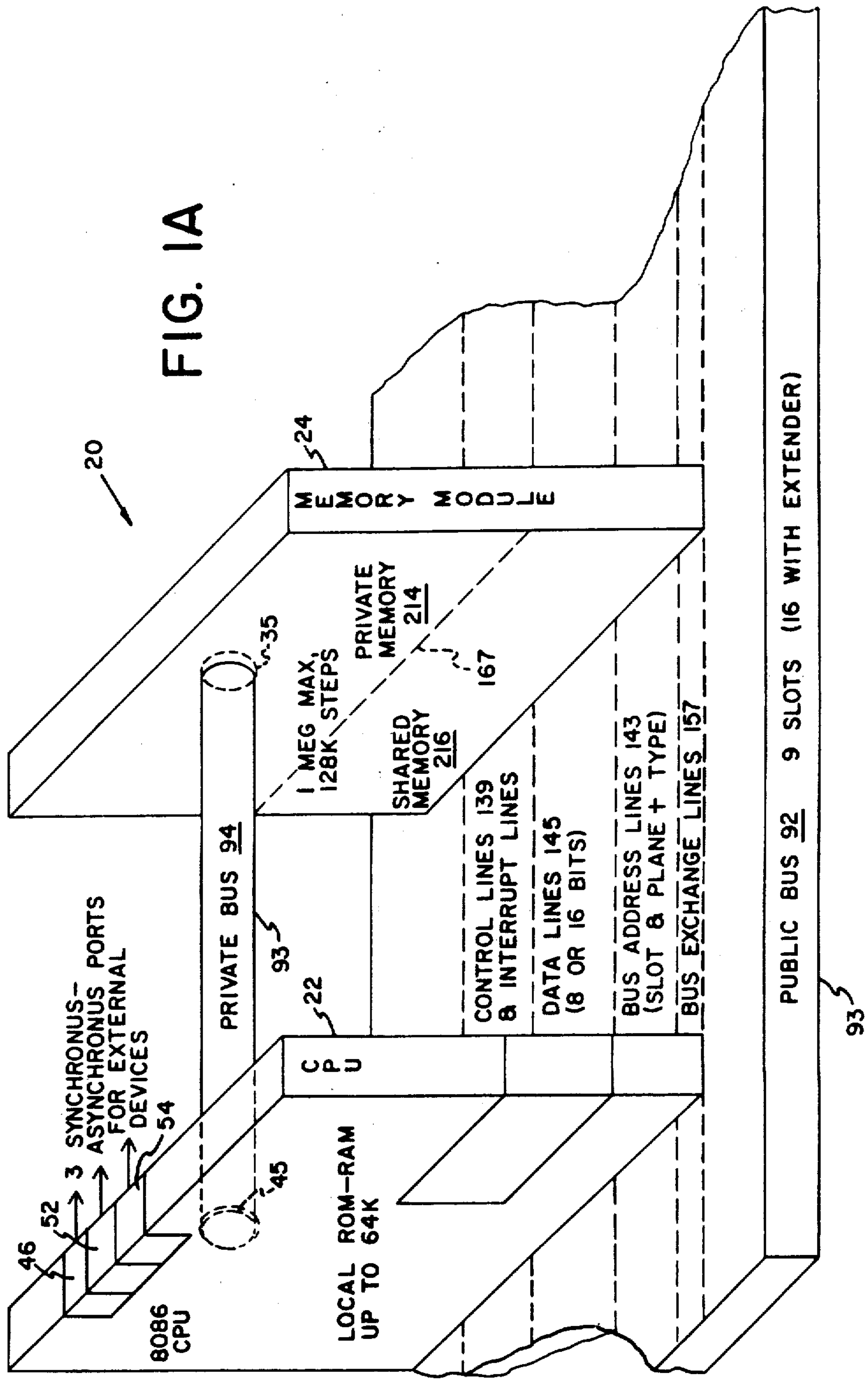
FIG. 1A is a diagrammatic perspective view of a portion of the man-machine interface basic configuration, showing the interconnection of the CPU module with the memory module via both the public bus and private bus.
Figure 1B:
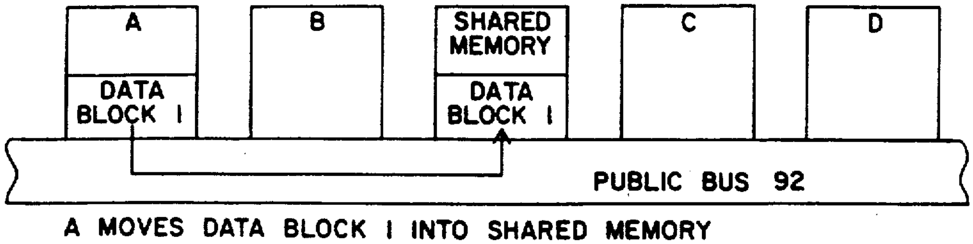
FIGS. 1B, 1C, 1D and 1E are diagrammatic views showing the technique for transferring data between modules communicating on the public bus.
Figure 1C:
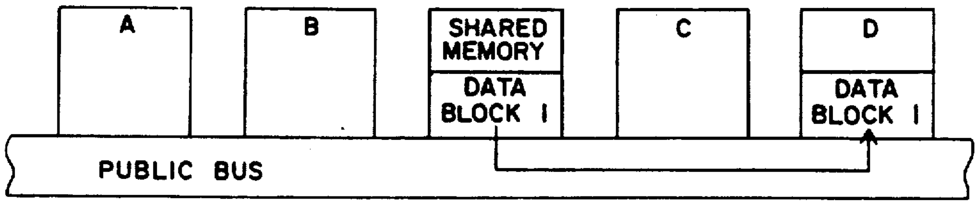

For understanding the overall architecture utilized by the man-machine interface, reference should be made to FIG. 1A which shows a simplified basic configuration of the MMI 20. As seen there, it comprises a CPU module 22, a memory module 24, a public bus 92, a private bus 94, the two combining to form an overall bus 93. The CPU module 22 is formed on a single board 116 as is the memory module 24. The CPU module has a port 45 by which it communicates via private bus 94 directly with memory module 24 through its port 35. This allows the CPU module to access the memory module—which contains shared memory used with other modules—at full speed with no interference by the CPU module with respect to other modules on the bus 92 (see FIG. 1). Indeed, bus 92 allows any board to directly access shared memory (that portion of the memory module not protected by fence 167) if it is connected to the bus. The priority schemes for access of the bus are described in a later section on bus arbitration. As seen in FIG. 1A, the data path on bus 92 is sixteen bits wide although communications can be made by either eight bits (one byte) of sixteen bits (one word). Thus a board which communications in units of bytes may communicate with a board which communications in units of words due to the interface logic associated with the boards and the bus 92.

The software resident with any module may cause the generate an interrupt or receive an interrupt with any other board. This utilizes the soft interrupt technique, as fully described in a later subsection, which provides the bus with the capability of allowing efficient board-to-board communication.

As seen in FIG. 1, in addition to the CPU module and the memory module forming a board pair via the private bus, the video CPU module 26 forms a board pair with the video random access memory module 28 via the private bus. It should be noted that if a second CPU module (such as CPU module 38) is made part of the MMI, it does not have private port access to the memory module bus but must access it through the public bus 92.

Although not shown in FIG. 1, additional memory modules 24 may be added to the bus so as to provide up to sixteen megabytes of random access memory. The addressability of the MMI allows this amount of RAM to be utilized.

System Features

The overall bus 93 has the primary purpose of allowing boards to communicate with each other. This communication includes two general classes of information; mainly, data and control. Indeed, a transfer of data often involves some control information such as the dialogue for the transfer or the "setup" for the transfer. This subsection discusses data transfers on the bus. Such items as pure control, watchdog timers, error registers, status registers, and power interrupts, are discussed in other subsections. In the man-machine interface, two forms of data transfer generally occur on the bus. Each form has implicit speed and usage constraints. The forms are (1) individual boards move data to/from shared memory, and (2) a board references data in shared memory.

These aspects of data transfer are illustrated in FIGS. 1B–1E. It should be noticed that transferring data between boards is a two step process. Thus in FIG. 1B and 1C, board A moves data block 1 into shared memory while board D moves data block 1 out of shared memory. This is the technique for transferring data between modules on the bus.

Figure 1D:
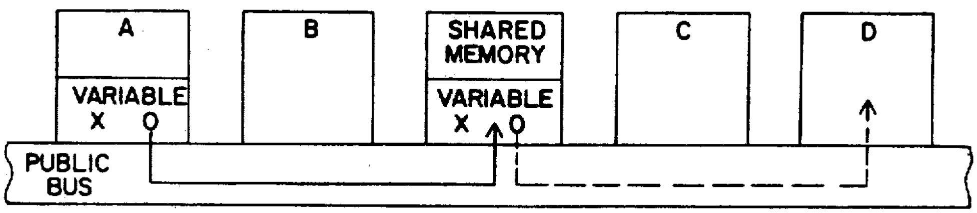
Figure 1E:
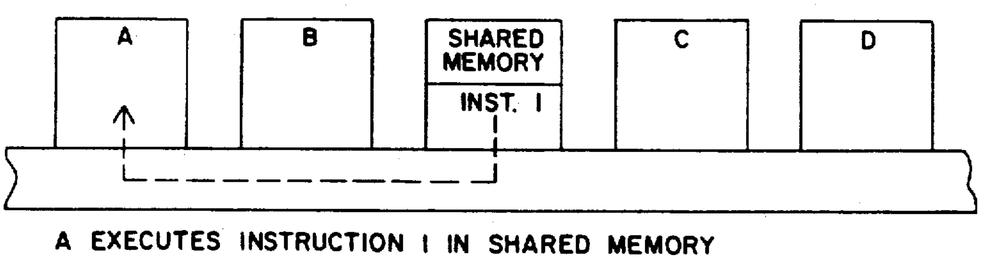

FIG. 1D illustrates board A moving (storing) variable X into shared memory and board D referencing (using) variable X from shared memory. It should be noticed that X is not stored in module D. Finally, FIG. 1E illustrates board A executing an instruction (I) out of shared memory. Here the program containing instruction I is not moved out of shared memory by board A.

The architecture of the present invention utilizes this two step process instead of directly transferring data between modules such as via a direct memory access (DMA) or a series of interrupts. The underlying reason is that a series of interrupts and a direct data transfer over the bus is actually slower for moving data than movement through shared memory. Therefore, no DMA capability is required in the MMI since its existence would interfere with the predictability of data transfer speeds. Of course, such DMA capabilities could be formed in the bus to allow board-to-board direct data transfers if individual configurations requiring such were desired.

The time required to transfer information from one module to or from the memory module 24 can be expressed by the following equation:

$$tt=(tc+tb+tm)\ x \qquad \text{Equation 1}$$

where:

tt = total transfer time for the information.

tc = time for the module to execute a memory reference instruction —basically instruction cycle time.

tb = time to acquire the bus for a data transfer.

tm = time required to move a piece of data to or from shared memory.

x = number of data transfers involved.

The value of tm is generally negligible so that Equation 1 becomes the following:

$$tt=(tc+tb)\ x. \qquad \text{Equation 2}$$

For any given module, tc has a fixed value which only increases if the memory cycle portion of an instruction is delayed. That delay can only originate in tb. Thus the following simplifications can be made:

$$Tt=Tc+Td$$

where

Tc = xtc,

Td = xtb, and

Tt = total transfer time.

It should be noted that Tc = xtc is exactly the time required to execute x occurrences of instruction on a dedicated memory. That is, Tc is exactly equal to the "normal" speed of the program. Td, therefore, represents the entire slow down above "normal" execution speed.

Therefore, Td can be analyzed to arrive at expected "slow down" speeds for different bus configurations and loading.

Since Td = xtb, and since x represents the number of memory reference instructions executed, the only independent variable is tb.

The variable tb can be considered as composed of two items; a fixed overhead for using the bus (OF) and a variable overhead for acquiring the bus when there is a conflict between boards (OV). So, Td = xOF + xOV.

Total delay now takes on the form:

$$Td=xOF+xOV, \qquad \text{Equation 3}$$

with xOF varying only with the number of memory reference instructions executed.

Figure 1F:
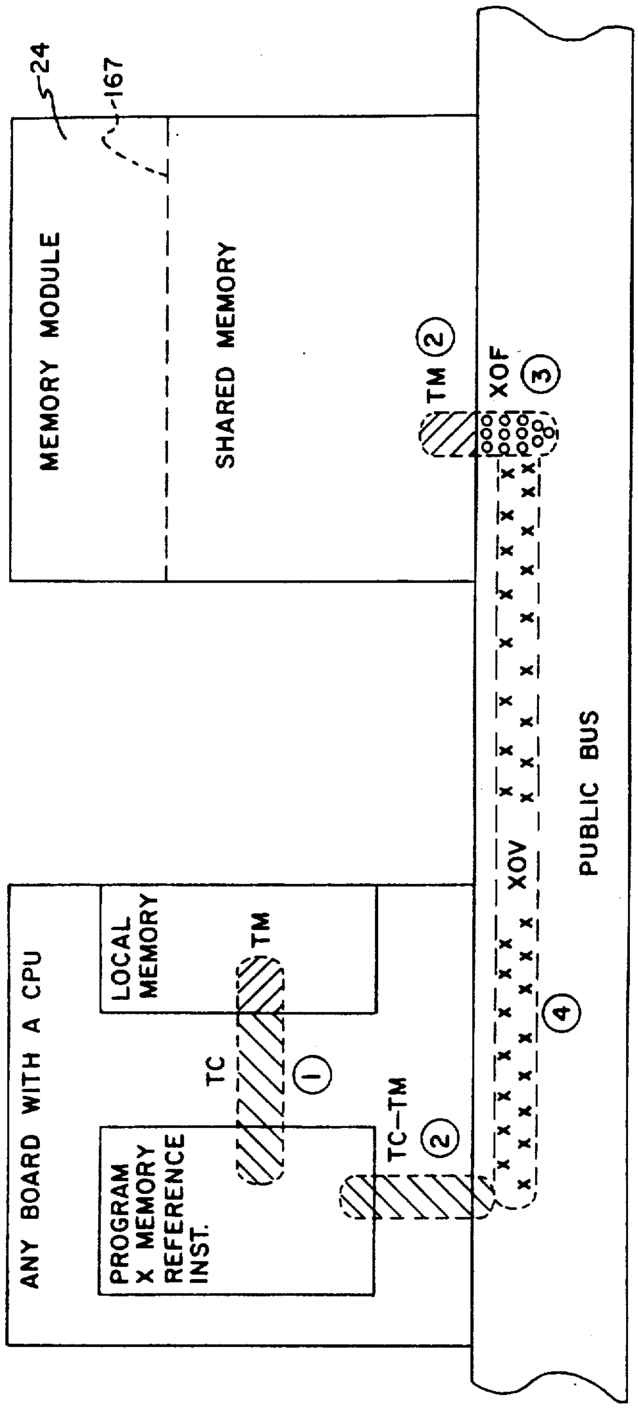
FIG. 1F is a diagrammatic representation showing the amount of time necessary for conducting various data transfers among the modules of the man-machine interface via the public bus.

FIG. 1F illustrates that the time required to move x bytes of shared memory is composed of the sequence of items set forth in Table 27.

TABLE 27

| |
|---|
| (1) Tc = xtc which is the program executive time for x instructions referencing local memory. |
| (2) xOF which is fixed overhead for each instruction cycle which uses the bus to access shared memory, and |
| (3) XOV which is a variable overhead for each instruction cycle which uses the bus and has a conflict with some other board wanting use of the bus. |

The fixed bus overhead (OF) is determined by the number of boards which contend for the bus at the same instant. Its value is the maximum time required for the arbitrator circuits of the bus to resolve all conflicts.

Since the number of active bus users (modules) range from 1 to 15, the bus clock speed which determines OF is jumper selectable. This allows different configurations of the MMI to use the bus efficiently.

Table 28 identifies bus clock rate (clock), fixed overhead value (OF), and the number of bus users (ACTIVE SLOTS).

TABLE 28

| CLOCK (MHZ) | OF (MICRO SEC.) | ACTIVE SLOTS |
|---|---|---|
| 2.5 | .4 | 15 |
| 4.9 | .2 | 7 |
| 9.8 | .1 | 3 |

Equation 3 represents a delay value (TD) based on a fixed (OF) and variable (OV) overhead and the number of memory references (x) made. Execution of a single instruction may involve more than one memory reference.

Generally, a single instruction requires one memory reference to fetch the instruction, and another to fetch or store data. Since the instruction or data or both may be in shared memory, the total delay value is represented by:

$$TD=(x+y)\ OF+XOV+YOV \quad \text{Equation 4}$$

where x represents the number of instruction fetches and y the number of data fetches and stores.

For calculations of speed for referencing shared memory variables, it is shown that the speed is equal to the speed for referencing local memory variables plus a fixed bus overhead (xOF) plus a variable bus overhead (xOV) based on bus "collisions".

Private vs. Shared Memory

In the MMI many of the modules are intelligent boards; that is, modules with resident CPU's. Each board is designed to accomplish a general task, and therefore has different requirements. These differing requirements effectively determine the amount of resident, private, memory required.

Private memory is the memory a CPU may reference without using the public bus. Since this memory is often mounted on the same board as the CPU it is sometimes referred to as "on board" or "local" memory.

Each intelligent board is designed to perform a series of diagnostics whenever power is applied (initial program, "IPL" or the board receives a "reset". These diagnostics are unique to each board and are designed to stand alone. That is, the diagnostics do not use the public bus or interfere in any way with the other boards on the MMI. Since the bus is not used, the diagnostic program cannot be loaded from another board; it must be in private read only memory.

Since the various boards communicate with each other using the public bus, each board must have private memory for buffers and a program which supports bus communication. The program may in ROM or RAM, but the buffers must be in RAM. The IPL program for each board can appear in ROM or RAM.

The programs described so far have the following characteristics: they are in private memory (ROM or RAM) and they represent low level support for the board itself.

The remaining programs that can appear on a board—the ones that provide a board with its functional capabilities—can reside in either private or shared memory. While each board has unique requirements which contribute to the decision for private or shared memory, the following points are significant for all boards:

Private memory is smaller than shared memory. It generally falls in the range of 32K–64K. This is because of physical space constraints on each board.

Private memory is faster to access and the access time is more easily predicted. This is important in situations where a board has real-time constraints on parts interacting with the outside world, such as communication or direct control applications.

Shared memory has the advantage of size (up to 16 megabytes). Shared memory is the only mechanism available for passing information between boards. No board may directly reference the private memory (except the CPU module) on any other board. Every board, however, may reference shared memory via the bus.

The following items illustrate typical usage of shared memory via the public bus:

1. It can be used as a buffer between boards. This use is particularly good in situations where blocking-/deblocking of records is needed.
2. It can be used for communicating state and context information between boards.
3. It can be used as a mechanism for linking and controlling programs on different boards where on functional capability is required, but several boards are necessary for the function.

Shared and Local Memory Addressing

The same scheme for addressing memory is used on all boards with a CPU and local memory. The Intel Corp. 8086 family of CPU's are used in the MMI and have 20 bits for addressing memory, (00000 to FFFFF). These 20 bits represent one megabyte of address space.

Since the MMI allows 16 megabytes of shared memory —000000 to FFFFFF, 24 bits address space —in addition to the local memory on each board, a common mechanism for memory addressing is incorporated in the architecture.

First, the 20 bit effective address is constructed by the CPU in the normal manner. The memory circuitry then performs the following functions (see also FIG. 1J):

1. If the effective address references memory that is local (on board), then local memory is used.
2. If local memory is not present, the effective address must be referencing shared (off board) memory. A second check is made by the address circuitry. If the high order address digit is not E, then the address circuitry maps the address directly to the first megabyte of shared memory (on memory module 24).

If the high order address is E, the E is replaced by the contents of the address segment register (ASR) on the board, and this new effective address (24 bits long now) is used to reference shared memory.

While this general scheme is used on all boards, the implementation on the CPU module 22 is different because of its private port to shared memory. The differences are discussed in the later subsection entitled "CPU Module and Shared Memory".

Thus the hardware automatically switches between local and shared memory for the first megabyte (except for the 64K "hole" between E0000 to EFFFF). This means that a programmer does not have to do anything special in his/her programs to use shared memory.

The second to sixteenth megabyte of shared memory is accessed via the 64K window of the ASR by using an address of the form EXXXX.

While the architecture of the MMI does not dictate how local or shared memory is populated (what memory is present), the following generalities apply:

(1) The Intel Corp. 8086 family of microcomputers expects "reset" type instructions to gain control at FFFFO. Thus high addressed local memory is usually pupolated downward from FFFFF to FOOOO (but not into the window area EXXXX). Since this code is often associated with initial program loca (IPL), a portion of this area generally contains ROM memory.

(2) The Intel Corp. 8086 family of microcomputers performs memory mapped I/O from the low address area of memory —0000 upwards. Low address local memory usually grows upward and predominately contains RAM for general purpose boards such as the CPU module and ROM for more specialized boards such as the floppy disk controller.

(3) Shared memory is populated in 128K steps. The number of shared memory boards is limited to 16 for 16 megabytes of memory but there is no requirement that all be present or populated.

(4) Overall, local and shared memory are designed in a manner which makes the first megabyte of shared memory extremely easy to use for a programmer, and the remaining 16 megabytes easy to use in 64K chunks.

Board Addressing

As shown in FIG. 2, each board 116 on the MMI slides into a slot 96 and connects to bus 93 via connectors 98. There are 9 slots in the basic chassis 31, and an expansion chassis (not shown) extends this number to 16.

The 16 bits required to address a board are assigned as follows:

Bits F to 9=1

Bit 8=rack number; 1 for basic chassis, 0 for expansion chassis.

Bits 7 to 14=slot number, values 0–8, decimal; 9 to F are invalid.

Bits 0 to 3=I/O register address; value 0 to 15 decimal.

Bits 0 to 3 (values O–F hex) represent registers on each board.

Register 0 is required, registers 2–F are optional and unique for each board.

Note that this scheme results in each slot being specified by the first three hex digits, and up to 16 registers specified by the last hex digit. Only register 0, the basis status register 171, is always present (see FIG. 26).

Status Register, Watch Dog Timers (WDT's)

Since the MMI allows many different boards to plug into the bus, some requirements have been placed on individual boards. These requirements are basically interface standards which permit each board to behave as a part of a larger system; namely, the MMI.

The basic status register 171 (see FIG. 26) is present on all boards which can use the bus. In some cases, a pair of boards has one drawing power from the bus, but not actually capable of using the bus. This "filler" board need not have a basic status register. The video RAM module 28 is an example of such a board. The purpose of the basic status register is to make available to all boards on the MMI the status of every other board.

The status register is 16 bits wide and is always at address 0. It is the responsibility of each board to assure that it can read 16 bits from any other board's status register with a single reference to register 0. When a normal board changes its own basic status register, all 16 bits change at the same time.

The contents of the status register is predefined and has the same meaning on all boards:

Bits 4–0 define a board's identification:

| |
|---|
| 0 - INVALID 1 - CPU modules 22 or 42 |
| 2 - FLOPPY disk controller module 30 |
| 3 - COMMUNICATIONS module 34 |
| 4 - HARD DISK control module 32 |
| 5 - Video CPU 26 or 40 |
| 6 - Local area network interface (LIU) module 36 |
| 7 - 23 Unassigned Normal Boards |
| 24 - Shared Memory (memory module) Board |

-continued

| |
|---|
| 25 - 31 Unassigned Special Boards |

Bit 5 is an indicator that the watchdog timer (WDT) on this board has expired. If the board has no WDT, then this bit is always 0.

Bit 6 is an error signal, indicating that this board has detected an on-board error. If this board cannot detect any errors, this bit is always 0.

Bits 15–7 have a predefined system wide meaning only when bit 6 is on. When bit 6 is not on, bits 7–15 may be used by the board for any local purpose. When bit 6 is on, bits 7–15 have the following meaning:

Bits 8–7 are an indication of where the error occurred. That is,

00=Board confidence test during board IPL. Hardware errors detected.

01=Operating system (OS) initialization during IPL Software probably in error.

10=Runtime (ongoing) diagnostic. Hardware error detected.

11=Runtime software detected an error. Software probably in error.

Basically, bit 8 indicates when the error was detected—IPL (0) or runtime (1); bit 7 indicates how the error was detected, by resident diagnostic code which checks hardware (1), or resident software detecting an error (1).

Bits 15–9 are a failure code which is unique for each board.

Upon detecting an error, a board sets bits 8–6. The setting of bit 6 turns on the an LED 49 (see FIG. 2) on the board and the global error LED 138 on the front panel (see FIG. 138). The seven bit code (bits 15–9) is flashed in the error LED's 51, 51' mounted vertically on each board (see FIG. 2). The uppermost error LED represents the tens digit, the lower one the units digit. All error codes are two digits and neither contain a 0. Possible error codes are therefore 11–19, 21–29, 29, 31–39, . . . , 91–99 for a total of 81 possible codes.

When safe to do so, a board detecting an error attempts to notify the "master" or IPL master CPU module (see CPU module section Infra and System Introduction subsection in this section) by presenting a soft interrupt.

Most normal boards have a watchdog timer. During IPL, this timer is programmed to run for a small timed interval. The software in the operating system periodically "toggles" this timer, setting it back to its initial value.

Since the time interval selected by the operating system is somewhat longer than the longest period correctly functioning software and hardware would execute without returning to the operating system, the watchdog timer becomes a "detection mechanism" for errors in software or hardware which cause "loops".

The mechanism for toggling the watchdog timer involves writing alternating bit patterns to the timer. This mechanism minimizes chance of bad software accidentally toggling the timer. Further details on the improved watchdog timer are given in a section so entitled.

A watchdog timer expiration indicates a "loop" caused by either hardware or software (but generally software). The hardware on each board sets the WTD bit (5) in its status register, and if safe, attempts to set the remaining bits (15 to 6) in the status register and display the error code. On some boards (configuration dependent), setting the WDT bit ON sounds an audible alarm and possibly sets off a klaxon (see FIG. 70).

Boards which have an unrecoverable error indication generally go "off line" to minimize interference with remaining functional boards. In some cases, this results in a complete "shut down" of the MMI which requires an outside action to restart the MMI.

A special board is any board with a status register 0 which does not fully conform to normal board usage.

The memory module 24, (device type 24) is such a board.

Soft Interrupts

The MMI has several boards with independent microprocessors plugged into the same public bus. These boards use the soft interrupt mechanism to signal or initiate communication between themselves.

The term "soft interrupt" indicates that a program (software) on one board causes an interrupt (hardware) on some other board.

The soft interrupt is initiated by the sending board addressing the receiving board. This causes an interrupt to be generated on the receiving board. Since no information is passed to the receiving board by the interrupt, shared memory is used by the sender and receiver as a mailbox. This mailbox identifies the sender and the reason for the interrupt. The operating system supplies software support for this mode of communication. Further details on the soft interrupt mechanism is given in a section so entitled.

SYSTEM INTERACTIONS

On the MMI, there are times where the interaction of the various boards must be controlled.

This subsection deals with situations where the interaction of various boards must be viewed as a system.

A. IPL

"IPL" is an acronym for "Initial Program Load". It represents the sequence of operations which are performed in order to bring the MMI from a powered down state to a state where application programs may run; that is, to the state where the operating system is running and in full control.

During IPL, the following tasks are accomplished:

1. Each board performs on-board diagnostic checks to assure correct functioning (if it is capable of doing such checks).
2. The memory module (shared memory) is used to select a temporary master.
3. The temporary master identifies all cards on the public bus and selects a master for IPL.
4. The IPL master tests shared memory and other "dumb boards" and then loads all boards with any software they require, leaving the operating system executing.

The first stage of IPL assures that each board with a CPU is functioning correctly, but avoids any bus usage which would complicate localizing errors. The power-up diagnostics during this stage are resident in ROM and may only use resources on the board being tested. At completion of power-up diagnostics, the board's status register is set to indicate success or failure. If the board failed the power-up diagnostic, it proceeds no further. If it passed, it writes its board address into a fixed location in shared memory and proceeds to Step 2 if it could be an IPL master. Otherwise, it proceeds to Step 4.

Step 2 of IPL is a mechanism for selecting a temporary master to continue IPL. From the time power is supplied, a fixed time interval is allowed (T1) for each board to complete its power up diagnostics and identify itself as a potential temporary master. At the completion of T1, each board participating in Step 2 reads the fixed location in shared memory. If the value read is not its own address, then it proceeds to Step 4.

Step 3 is performed only by the temporary master; the one that read its own address from the fixed location in shared memory. This board performs a local check of shared memory and then reads each slot in the MMI for the purpose of identifying all boards present. A table of slot usage and board state (good-bad) is constructed in shared memory. From this table (which includes board types) an IPL master is selected. A soft interrupt is presented to the IPL master as a signal to begin Step 4 of IPL. Note that at the end of this Step (Step 3) all intelligent boards are in a pass-fail state, the bus has been used, and a small portion of shared memory has been used.

In Step 4, the IPL master checks shared memory and any other dumb boards which are present. It then further verifies the bus by presenting a series of soft interrupts to each board while passing fixed data patterns through shared memory. The last part of Step 4 is the "loading" of the operating system and passing control to it. If the operating system is in ROM, the Step is skipped. If the operating system is not in ROM, then a bulk storage device is selected and the operating system is loaded using standard commands. Finally, control is passed to the operating system and normal execution starts.

During IPL, incorrectly operating boards are bypassed, and the MMI performs an ordered set of diagnostics which assure all boards being used are functioning correctly. The disposition of incorrectly functioning boards and the decision to run or shutdown is made in the operating system since it is affected by the actual configuration of boards and the applications selected for execution.

Errors

During execution, each board executes a background task consisting of run-time diagnostics (if it is capable of executing such a task). These diagnostics are unique to each board and are not exhaustive. They do detect certain errors on running boards. The software (primarily the operating system) also checks for errors during execution.

If either mechanism detects an error, the error is immediately identified as a recoverable error or an unrecoverable error. An unrecoverable error includes any error from which it is unsafe to attempt recovery.

Recoverable errors are reported to the logging unit (or backup logging unit), recovery occurs and execution continues. An example is a memory or disk error which is detected and corrected.

Unrecoverable errors cause an immediate but controlled shutdown of the board as follows: First, the error bit and possibly the code are set in the board's status register. Next, if possible, control is passed to the resident ROM error code which attempts to turn on the error light on the board and blink the error code. The board in error requires a reset before it can attempt any additional action. It is basically "off line" and does not attempt to communicate or use the bus since that could result in propagating an error or bad data to other boards.

It is the responsibility of the logging unit to periodically or on demand interrogate the status register of all boards for errors.

In practice, a failing board often is linked by running software to other good boards. Since a failed board is in an off line state, the good boards using it also "detect errors" by its sudden absence. Error recovery from this situation is entirely up to the good boards.

Watchdog Timer

The purpose of the watch dog timer (WDT) is to detect situations where expected intervals of time are exceeded. These situations may be caused by hardware failures, accidental software loops, or bugs in the software.

Since the situations to be detected by the WDT are caused by errors, the WDT mechanism is designed to be robust. It goes off even if the CPU stops operating.

The WDT mechanism is composed of the following logical parts.

(1) The timer hardware

The WDT is a programmable interval timer with a set of hardware "latches". When the board receives a master reset, the timer begins running (interval unknown) and the latches are set as follows:

Alarm Latch: Off

Programming Latch: On

Reset Latch (2 bits): Fixed Pattern (2) The setup software

During IPL, the WDT is programmed for a fixed interval. Once programmed, this interval may not be changed, it is hardware protected.

(3) The Activation Software

During IPL, the latch which arms the WDT is set ON. Once set on, it may not be turned off, it is hardware protected. If the timer now elapses, the alarms and status register are activated.

(4) The "reset" or "tickle" latch. Once the WDT is armed, (by writing a fixed 2 bit value to it) it must be reset before it counts up to its programmed value. After resetting, the hardware automatically restarts the counting sequence. Each time the WDT is reset with the 2 bit value, the reset latch value is changed by the hardware to its complement. Thus, a series of resets might use the values 01, 10, 01, 10, . . . or 11,00,11,00, . . . depending on the initial value. If the reset latch receives an invalid value, it is treated the same as if the timer had elapsed.

The WDT is a failure detection mechanism. It is initialized during IPL and is constantly tickled by the operating system. If for any reason the board "slows down" enough to prevent the operating system from tickling the WDT, it goes off, setting the WDT bit in the board's status register, activating appropriate audible alarms, and presenting an interrupt to the board. Operation of the board (if any) after the WDT goes off, depends on the board and the resident software and diagnostics. A master reset or soft restart to the board is required to recover (by reIPLing the board) from a WTD going off.

CPU Module and the Memory Module

The CPU board can be configured with the memory module board and a private port to the memory module. This configuration results in the ability to access the memory module either through the public bus or the private port. In addition, a "fence" limits public bus access to the memory module (in particular to that portion called shared memory), and addressing and interrupt vectoring undergo some changes.

This architecture extends the program space on the CPU module from a maximum of 64K (ROM and RAM) on board memory to include the one megabyte capability of the memory module. The speed problems encountered by running programs in the memory module over the bus are bypassed by using the private port.

Private Bus 94

The private bus 94 from the CPU to memory module board is capable of supporting one full megabyte of memory (except for the EXXXX window into the memory module via the private bus). Memory addressing to the memory module through the private bus is automatic, whenever memory is not present on the CPU.

Referencing memory via the public bus only occurs by using the EXXXX window and the ASR. The only degradation in speed occurs when the memory module is in the middle of a cycle using the bus. In this case, the memory reference through the public port is delayed until the bus reference is complete.

Fence 167

While a CPU module is coupled to the memory module via private bus, the memory module probably contains data used by other boards and referenced via the public bus.

When two different boards are using the same physical memory, the possibility always exists that one may overwrite memory used by the other. Since a CPU module with a private port to the memory module represents a major compute resource, a fence capability is provided for protecting the memory used exclusively by the CPU module—generally program space.

The fence is set by the CPU module writing to a register which represents 128K steps. The particular value selected places the fence at the appropriate memory boundary.

Once placed, the fence restricts memory module access via the public bus. It has no affect on memory access via the private port. The fence placement may be changed by the CPU module at any time.

Any board attempting to reference shared memory protected by the fence using the bus (that is memory outside of shared memory) gets a memory (bus) timeout. This is equivalent to referencing non-existing memory. In effect, the memory protected by a fence does not exist when referenced via the public bus.

Software Considerations

The MMI hardware architecture thus has many new features and attributes. This means that the software must correspondingly have new features and attributes. Somc of these features and attributes are introduced below:

A. Distributed Systems

The MMI hardware allows for a fully distributed software system; that is, a series of computers (boards) executing code independently. They are loosely coupled by the fact that they may be performing parts of a common task (application).

The operating system is not localized as it would be in a master/slave relationship. Application calls and data may pass between boards without the need for applications to be aware of the transfer mechanisms. Indeed, some applications may have no knowledge of the actual board they are executing on—just the general type. In short, the operating system becomes more complex since it now extends its control over several computers for a single operation.

B. File System—Bulk Storage

As seen by an application, the file system is fairly "standard". But the file system itself is unusual since it is distributed and must support file access to the same file with requests from different computers (boards) which sometimes represent the same application.

Since several medias are supported by the file system, but may be mixed on any particular MMI, the file system does not control devices directly or indeed have any specific knowledge of storage algorithms. Instead, it interacts with a bulk storage system.

The bulk storage system is basically a set of "device drivers" which are unique for each board (floppy disk, etc.) but which support a common set of file access interfaces to the file system.

This allows new hardware for mass storage to be added without any changes to the file system of applications.

C. Resource Management

Since the MMI is a distributed system, it is impossible to know ahead of time how it is configured.

In classical systems this kind of control is known as "resource management" and is generally implemented with detailed knowledge of equipment and hardware addresses.

In the MMI much of this detailed knowledge is changing dynamically during execution. For this reason (and others) the resource manager becomes considerably more complex and can operate at a symbolic level (see section entitled "Resource Manager").

Applications do not request explicit resources by specifying hardware addresses ("get a record from Sector 5, Track 3, Device 27"). Instead they specify resources symbolically ("get the third record of file JOE from the standard logging device").

PUBLIC AND PRIVATE OVERALL BUS 93 DESCRIPTION

GENERAL

Scope

One of the most important elements in a computer system is the bus structure that supplies the interface for all the hardware components. This bus structure contains the necessary signals to allow the various system components to interact with each other. It allows such events as memory and I/O data transfers, direct memory accesses, and generation of interrupts. This section provides detailed description of all the elements and features that make up bus 93 (referred to alternatively as "overall bus").

The bus supports two independent address spaces: memory and input/output (I/O). During memory cycles, the bus allows direct addressability of up to 16 megabytes, using 24-bit addressing. During I/O bus cycles, the bus allows addressing of up to 64K I/O ports using 16-bit addressing. Both memory and I/O cycles can support 8-bit or 16-bit data transfers.

The overall bus is a microcomputer system bus designed to be a universal processor bus architecture capable of supporting one or more processors as well as a host of global resources and intelligent peripheral devices (IOP's). The bus structure is built on a multimaster or master-slave concept where any master device in the system can take control of the bus. Each slave device, upon decoding its address, acts upon a command provided to it by any master. This handshake (master-slave relationship) between the master and slave devices allows modules of different speeds to be interfaced via the bus. The bus structure is an improvement of the Intel Corporation Multibus$^{TMV}$ bus structure.

The overall bus provides control signals for connecting multiple masters in a serial priority fashion so that more than one master may share the bus resources.

This section deals with the interface characteristics of microcomputer devices. Throughout this section, the term "system" denotes the byte or word interface system that in general includes all the circuits, connectors, and control protocol to effect unambiguous data transfer between devices. The term "device" or "module" denotes any product connected to the interface system that communicates information via the bus and that conforms to the interface system definition.

Object

The objects of this section are:

(1) To describe a microcomputer system bus for a family of products, (2) To describe the device-independent electrical and functional interface requirements that a module must meet in order to interconnect and communicate unambiguously via the overall bus, (3) To specify the terminology and definitions related to the overall bus, (4) To enable the interconnection of independently manufactured devices into a single functional system, (5) To permit products with a wide range of capabilities to be interconnected to the system simultaneously, and (6) To define a system with a minimum of restrictions on the performance characteristics of devices connected to the system.

Definitions

The following general definitions apply throughout this section. More detailed definitions can be found in the appropriate subsection.

General System Terms

Compatibility—The degree to which devices may be interconnected and used without modification, when designed in accordance with the descriptions set forth in the subsections entitled "Functional Description" and "Electrical Specification." The subsection entitled "Levels of Compliance" introduces the notion of levels of compliance and the corresponding notation.

Bus Cycle—The process whereby digital signals effect the transfer of data bytes or words across an interface by means of an interlocked sequence of control signals. Interlocked denotes a fixed sequence of events in which one event must occur before the next event can occur.

Interface—A shared boundary between two modules or between parts of systems, through which information is conveyed.

Interface System—The device-dependent electrical and functional interface elements necessary for communication between modules. Typical elements are: driver and receiver circuits, signal line descriptions, timing and control conventions, and functional logic circuits.

System—A set of modules interconnected via the overall bus, which achieve a given objective through the performance of a specified function.

Signals and Paths

Bus—A signal line or set of lines used by an interface system to connect a number of devices and to transfer information.

Byte—A group of eight adjacent bits operated on as a unit.

Word—Two bytes or sixteen bits operated on as a unit.

High State—The more positive voltage level used to represent one of two logical binary states.

Low State—The more negative voltage level used to represent on of two logical binary states.

Signal—The physical representation of data.

Signal Level—The relative magnitude of a signal when compared to an arbitrary reference. Signal levels are specified in volts.

Signal Line—One of a set of signal conductors in an interface system used to transfer messages among interconnected devices.

Signal Parameter—That element of an electrical quantity whose value conveys information.

FUNCTIONAL DESCRIPTION

This subsection provides an understanding of how the overall bus functions and describes the elements that connect to the bus, the signals that provide the interface to the bus, and the different types of operations performed on the bus.

In this subsection, as well as throughout the other subsections herein, a clear and consistent notation for signals has been used. The memory write command (BMWTC) is used to explain this notation. The terms one/zero and true/false can be ambiguous, so their use is avoided. In their place, the terms electrical High and Low (H and L) are used. A dash and an L or an H following the signal name (e.g., BMWTC-L) indicates that the signal is active low or active high as shown:

BMWTC-L=Asserted (active) at 0 volts

BMWTC-H=Asserted (active) at 4 volts

The signal (BMWTC-L) driven by a three state driver is pulled up to Vcc when not asserted. The following is used to further explain the notation used in this overall section.

| | Definitions | | |
|---|---|---|---|
| Function | Electrical | Logic | States |
| BMWTC-H | H | 1 | True Active, Asserted |
| | L | 0 | False |
| BMWTC-L | L | 1 | True Active, Asserted |
| | H | 0 | False |

At times there is a reference to "Master" or "Slave." It should be noted that a "Slave" can be a potential "master," and vice versa.

Overall Bus Elements

This subsection describes the elements (masters and slaves) that interface to the bus and the signal lines that comprise this interface.

Masters

A master is any module (such as CPU module 22—FIG. 1) having the ability to control the bus. The master exercises this control by acquiring the bus through bus exchange logic and then generating command signals, address signals, and memory or I/O addresses. To perform these tasks, the master is equipped with either a central processing unit or logic dedicated to transferring data over to the bus to and from other destinations.

The overall bus architecture can support more than one master in the same system, but in order to do this, there must be a means for each master to gain control of the bus. This is accomplished through the bus exchange logic as detailed later.

Slaves

Another type of module that can interface to the bus is the slave. Slave modules decode the address lines and act upon the command signals from any masters. When acting as a slave, a module cannot control the bus.

Overall Bus Signals

As seen diagrammatically in FIG. 1A, the sSignals transferred over the bus can be grouped into several classes based on the functions they perform. The classes are:

(1) Control Lines 139

(2) Address Lines 143

(3) Data Lines 145

(4) Interrupt Lines 154

(5) Bus Exchange Lines 157

The following subsections explain the different classes of overall bus signals.

Control Lines 139

The following signals are classified as control lines:

| Class | Function | Signal |
|---|---|---|
| Clocks | Constant Clock | CCLK-L |
| | Bus Clock | BCLK-L |
| Enable Clocks | Enable Clock In | ENCLKI-L |
| | Enable Clock Out | ENCLKO-L |
| Commands | Memory Write | BMWTC-L |
| | Memory Read | BMRDC-L |
| | I/O Write | BIOWC-L |
| | I/O Read | BIORC-L |
| Acknowledge | Transfer Acknowledge | BXACK-L |
| Initialize | Initialize | BINIT-L |

Clock Lines (1) Bus Clock (BCLK-L). A periodic signal used to synchronize the bus contention logic; it may be slowed, stopped, or single stepped. The bus clock is generated by the highest priority master (system bus master) in the system (the determination of the system bus master is described in the "Man Machine Interface Architecture" section). This means that each potential bus master must have the capability of generating an acceptable clock that can be connected to, or disconnected from the bus by using the Clock Enable In signal. In a multimaster system, only the highest priority master has its clock connected to the bus.

(2) Constant Clock (CCLK-L). All potential masters develop their own internal timing. However, a periodic signal of constant frequency, which may be used by masters or slaves as a master clock, is provided. The constant clock is generated by the highest priority master in the system.

(3) Enable Clock In and Enable Clock Out are used in a serial fashion to determine who supplies BCLK-L and CCLK-L. Slot 1's (see FIG. 2) ENCLKI-L is grounded, and as a result, the master in slot 1, or the closest master to slot 1, enables its BCLK-L and CCLK-L onto the bus. The master that supplies BCLK-L and CCLK-2 also starts the BPRN-L and BPRO-1 token (see later subsection for further details on these lines).

Command Lines (BMWTC-L, BMRDC-L, BIOWC-L, BIORC-L)

These command lines are elements of a communication link between masters and slaves. There are two command lines for memory and two command lines for I/O. An active command line indicates to the slave that the address lines are carrying a valid address, and that the slave is to perform the specified operation. In a data write cycle, the active command line (BMWTC-L or BIOWC-L) additionally indicates that the data is valid on the bus. In a data read cycle, the transition of the command (BMRDC-L or BIORC-L) from active to inactive indicates that the master has received the data from the slave.

Transfer Acknowledoe Line (BXACK-L)

This line is used by the slaves to acknowledge commands from the master. BXACK-L indicates to the master that the requested action is complete, and that data has been placed on, or accepted from, the data lines.

Initialize (BINIT-L)

The BINIT-L signal is generated to reset the entire system to a known internal state. BINIT-L may be generated by any or all of the bus masters or by an external source such as a buffered and debounced front panel switch. At power on the power supply furnishes a reset to the system for a specified period of time. This signal from the power supply is brought in from connector P100. See Table 29 for pin out.

Slot Number Lines

The slot number inputs from the motherboard are generated at each connector position. This is done by using a pull-up resistor or tying to ground the correct configuration of lines to generate an active low representation of the physical slot location.

The slot number lines are used with the address lines to determine the I/O address of each device. This is accomplished by using SLT01-L–SLT16-L (5 lines) in place of address lines ADR04-L–ADR07-L. This allows each device to have sixteen 16 bit I/O adresses.

Status Lines

The status lines are available to any master that wishes to use them and are used as front panel indicators. These lines are driven by open collector drivers so that more than one device can drive them at a time. As seen in FIG. 3, a 20 pin ribbon cable 168 and connector 169 (in phantom) are provided on motherboard 123 (formed by the interconnected backplane connector 98) as the interconnect means to the front panel. The 20 pin connector 169 is designated in the tables as connector P101. See Table 35 for the pin out configuration. P101 also provides +5 V power for the front panel light emitting diodes (LED's 134–138, see FIG. 3).

Address Lines 143 (24 Lines)

These lines, which specify the adress of the referenced memory location or I/O device, allow a maximum of 16 megabytes (16,777,216 bytes) of memory to be accessed. When addressing an I/O device, a maximum of 16 address lines (ADROO-L-ADROF-L) are used, thus allowing the addressing of a maximum of 64K devices (16,384).

The slot number lines are used with the address lines to determine the I/O address of each device. This is accomplished by using SLT01-L–SLT16-L in place of address lines ADR04-L–ADR07-L. This allows each device to have sixteen 16 bit I/O addresses.

Byte High Enable Line (BHEN-L)

This byte control line is used to enable the upper byte (bits 8-F) of a 16-word bit word to drive the bus. The signal is used on MMI's that incorporate 16-bit memory modules and 8-bit masters.

Data Lines 145 (DAT0-L–DATF-L)

These 16 bidirectional data lines transmit and receive information to and from a memory location or an I/O port. DATF-L is the most significant bit and DAT0-L is the least significant bit. In 8-bit MMI's, only lines DAT0-L–DAT7-L are valid.

TABLE 29

POWER FAIL AND POWER SUPPLY RESET

| PIN | SIGNAL | PIN | SIGNAL |
|---|---|---|---|
| 1 | GND | 14 | GND |
| 2 | BINTO-L(PWR FAIL) | 13 | SPARE 4 |
| 3 | GND | 12 | GND |
| 4 | BINIT-L(PWR RESET) | 11 | SPARE 3 |
| 5 | GND | 10 | GND |
| 6 | SPARE 1 | 9 | SPARE 2 |
| 7 | GND | 8 | GND |

TABLE 35

FRONT PANEL STATUS

| PIN | SIGNAL | PIN | SIGNAL |
|---|---|---|---|
| 1 | GND | 2 | GND |
| 3 | +5V | 4 | +5V |
| 5 | GND | 6 | GND |
| 7 | STAT1-L | 8 | STAT2-L |
| 9 | STAT3-L | 10 | STAT4-L |
| 11 | SPARE 1 | 12 | SPARE 2 |
| 13 | SPARE 3 | 14 | SPARE 4 |
| 15 | GND | 16 | GND |
| 17 | +5V | 18 | +5V |
| 19 | GND | 20 | GND |

Interrupt Lines 154

The interrupt lines consist of the following signals:

| Function | Signal |
|---|---|
| Interrupt Requests | BINTO-L - BINT7-L |
| Interrupt Acknowledge | BINTA-L |

Interrupt Request Lines (BINT0-L–BINT7-L)

Interrupts are requested by activating one of the eight interrupt request lines. BINT0-L has the highest priority and BINT7-L has the lowest priority. BINT0-L is reserved for Power Fail, and BINT1-L is reserved for Memory Error.

Interrupt Acknowledge (BINA-L)

In response to an Interrupt Request signal, an Interrupt Acknowledge signal can be generated by a bus master. The Interrupt Acknowledge signal is used to freeze the interrupt status.

Bus Exchange Lines 157

The bus exchange lines are used by the following signals:

| Function | Signal |
|---|---|
| Bus Clock | BCLK-L |
| Bus Priority | BPRN-L, BPRO-L |
| Bus Busy | BUSY-L |
| Common Bus Request | CBRQ-L |

A master gains control of the bus through the manipulation of these signals.

Bus Priority (BPRN-L and BPRO-L)

BPRN-L and PRO-L are a daisy-chained loop completed on the backplane by taking the BPRO-L of the last card (right most in housing 31, see FIG. 2) in the backplane and running it to the BPRN-L of the first card (left most in housing). This daisy-chained loop enables all masters on the bus to have equal priority. However, a "token" (low activate signal) must be initiated at power up to start the Bus Exchange sequence. The master who is supplying BCLK-L and CCLK-L is the master who possesses the token upon power up and passes the token to the next device. If the next device is not a master, it passes the token to the next device; and so on.

The priority functions allow masters to break a deadlock that can occur when more than one master concurrently requests the bus. The Bus Priority In (BPRN-L) signal indicates to a particular master that no other master is requesting use of the bus. The Bus Priority Out (BPRO-L) signal is used in serial (daisy-chain) bus resolution scheme. In such a scheme, BPRO-L is passed by one master to the BPRN-L input of the next master. All masters have equal priority on the bus.

A master can be configured to have the highest priority by jumpering its BPRN-L to ground which breaks the daisy chain of BPRN-L on BPRO-L. Only one master in the system can be configured as the highest priority. The next master in the daisy-chain then has second priority, the third has third priority, and so on.

Bus Busy (BUSY-L)

BUSY-L is a signal activated by the master in control of the bus to indicate that the bus is in use and prevents other masters from gaining control of the bus.

Common Bus Request(CBRQ-L)

CBRQ-L is a signal that maximizes a master's data transfer rate to the bus by sensing the absence of other bus requests. The CBRQ-L signal does this by serving two functions. It indicates to the master controlling the bus whether or not another master needs to gain control of the bus. To the other master, it is a means of notifying the controlling bus master that it must relinquish control of the bus if a higher priority request is pending.

Data Transfer Operation

The primary function of the overall bus architecture is to provide a path for the transfer of data between modules on the bus. The following subsections describe the different types of data transfers and the means by which they are implemented using the signals previously described.

The discussion of the data transfer operation of the bus is covered in three parts:

(1) An overview of the operation.

(2) A detailed description of the signals used in the transfer.

(3) A discussion of the specifics pertaining to the different transfers.

It is assumed in this discussion that there is only one master on the bus, and therefore no bus contention exists. (The bus exchange logic is discussed in the "Bus Exchange" subsection.)

Data Transfer Overview

A data transfer is accomplished as follows. First the bus master places the memory address or I/O port address on the address lines (if the operation is a write, the data is also placed on the data lines at this time). The bus master then generates a command (I/O read or write, or memory read or write), which activates the appropriate bus slave. The slave accepts the data if it is a write operation, or places the data on the data lines if it is a read operation. A Transfer Acknowledge signal is then sent to the bus master by the bus slave, allowing the bus master to complete its cycle by removing the command from the command line and then clearing the address and data lines.

Signal Descriptions

This subsection provides a detailed description of the overall bus signals. Included are timing, signal origination, and other information pertaining to the specific function that each signal performs in the data transfer operation.

Initialize (BINIT-L)

All system modules are reset to a known internal state. This can be accomplished by an BINIT-L signal initiated by one of four sources:

(1) A power-on clear circuit (RC network) which holds BINIT-L low until the power supplies reach their specific voltage outputs.

(2) A reset button which is sometimes provided on the system front panel for operator use.

(3) A software command that can be implemented to pull down the BINIT-L line.

(4) The Reset from the power supply brought in through P100 (see Table 29 for pinout details).

The BINIT-L line is driven by open-collector gates and requires signal conditioning to meet the electrical specifications of the bus. Every master is capable of driving BINIT-L on the bus.

Constant Clock (CCLK-L)

The Constant Clock signal, which is driven by only one source, provides a timing source for any or all modules on the bus. CCLK-L is a periodic signal with a specified frequency and is driven by a clock driver circuit.

Address Lines (ADR00-L-ADR17-L)

The address lines are used to specify the address of the memory location or the I/O device that is being referenced by the command. There are 24 address lines, binary coded, to allow up to 16,777,216 bytes of memory to be referenced. These lines are driven by three-state drivers and are always controlled by the master using the bus.

For I/O bus cycles, master modules have to generate 16 bits of addresses. The I/O space can accommodate up to 64K 8-bit ports; or up to 32K 16-bit ports; or any combination of 8-bit and 16-bit ports. All I/O devices are capable of decoding all 16 bits of address (ADROO-L-ADROF-L).

The slot number lines are used with the address lines to determine the I/O address of each device. This is accomplished by using SLT01-L-SLT16-L (5 lines) in place of address lines ADR04-L-ADR07-L. This allows each device to have sixteen 16-bit I/O addresses.

Data Lines

There are 16 bidirectional data lines used to transmit and receive information to and from a memory location or an I/O port. The 16 lines are driven by the master on write operations and by the addressed slave (memory or I/O) on read operations. Both 16-bit and 8-bit transfers can be accomplished by using only lines DAT0-L-DAT7-L (with DAT0-L being the least significant bit).

There are three types of transfers that take place across the bus:

(1) Transfer of low (even) byte on DAT0-L-DAT7-L.

(2) Transfer of high (odd) byte on DAT0-L-DAT7-L (using byte swap function).

(3) Transfer of a 16-bit word.

Figure 42:
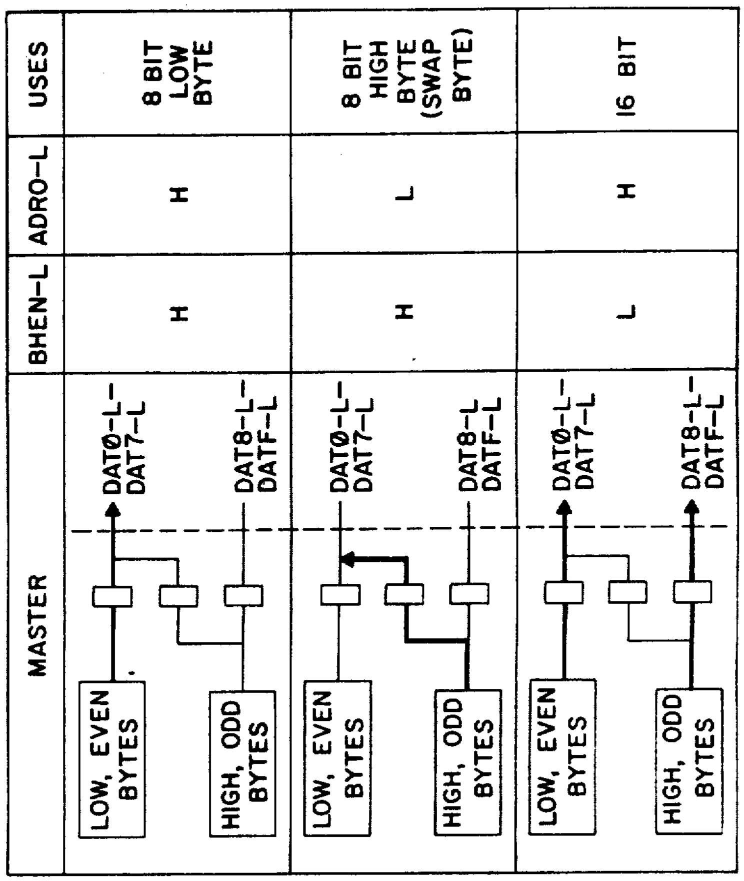
FIG. 42 is a block diagram regarding certain address implementations.

FIG. 42 and Table 30 show the data lines, and the contents of these lines for the three types of transfers mentioned.

Two signals control the data transfers. Byte High Enable (BHEN-L) active indicates that the bus is operating in the 16-bit mode, and the Address Bit 0 (ADR00-L) defines an even-byte or odd-byte transfer.

For an even byte transfer, BHEN-L and ADR00-L are inactive, indicating the transfer of an even byte. The transfer takes place across data lines DAT0-L-DAT7-L.

For an odd-byte transfer, BHEN-L is inactive and ADR00-L is active, indicating the transfer of an odd byte. On this type of transfer, the odd (high) byte is transferred through the Byte Swap Buffer to DAT0-L-DAT7-L. The high (odd) byte is transferred across on DAT0-L-DAT7-L to make 8-bit and 16-bit systems compatible.

Figure 43:
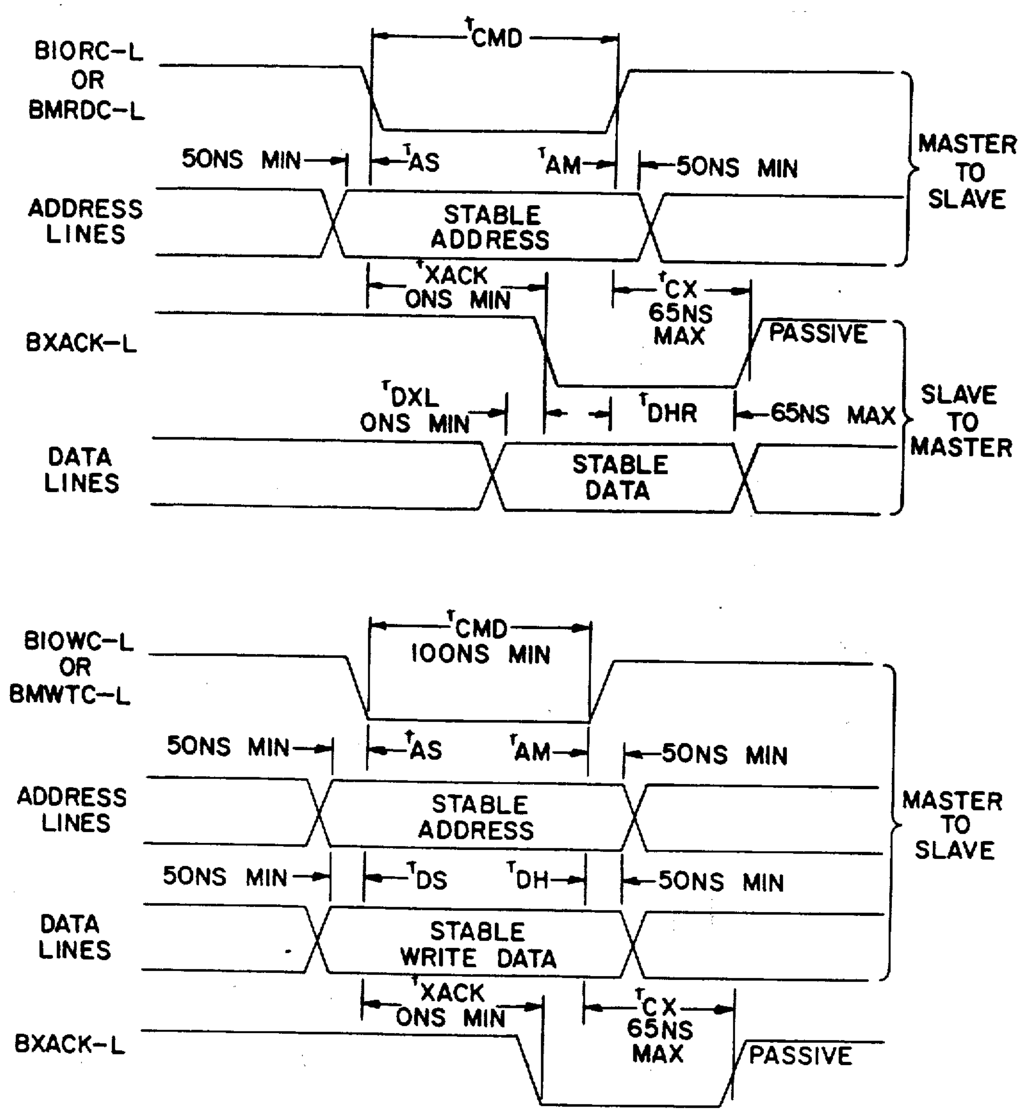
FIG. 43 is a timing diagram regarding the memory I/0 and read/write operations.

For a 16-bit transfer, BHEN-L is active and ADR00-L is inactive. On this type of transfer, the low (even) byte is transferred on DAT0-L-DAT7-L and the high (odd) byte is transferred across the bus on DAT8-L-DATF-L. FIG. 43 is an example of the Byte Swap function and the use of ADR00-L and BHE-L.

The overall bus data lines are driven by three-state drivers.

TABLE 30

| BHE-L | ADROO-L | Function |
|---|---|---|
| 0 | 0 | 16-bit word from/to address |
| 0 | 1 | Upper 8 bits from/to odd address |
| 1 | 0 | Lower 8 bits from/to even address |
| 1 | 1 | No device selection |

Command Lines

This subsection discusses the command lines and how they work in conjuntion with other lines to accomplish a read or write operation. There are four command lines:

| Function | Line |
|---|---|
| Memory Read Command | BMRDC-L |
| I/O Read Command | BIORC-L |
| Memory Write Command | BMWTC-L |
| I/O Write Command | BIOWC-L |

The command lines are driven by three-state drivers on the bus master. These lines indicate to the slave the action that is being requested.

Read Operation

The two read commands (BMRDC-L and BIORC-L) initiate the same basic type of operation. The only difference is that BMRDC-L indicates that the memory address is valid on the address lines, whereas BIORC-L indicates that the I/O port address is valid on the address lines.

This address (memory or I/O port) is valid on the bus 50 nanoseconds prior to read command generation. When the read command is generated, the slave module (memory or I/O port) places the data on the data lines and returns a Transfer Acknowledge (BXAC-L) signal, indicating that the data is on the bus.

Figure 44:
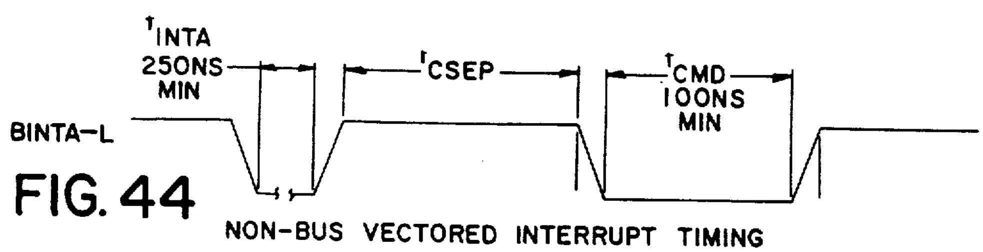
FIG. 44 illustrates the timing diagram associated with non-bus vectored interrupts.

When the bus master receives the acknowledge, it strobes in the data and removes the command (BMRDC-L or BIORC-L) from the bus. The slave address (memory or I/O port) remains valid on the bus a minimum of 50 nanoseconds after the read command is removed. BXACK-L is removed from the bus within 65 nanoseconds after the command is removed to allow for the next bus cycle. FIG. 44 shows the timing for the Memory Read or I/O Read command.

Write Operation

The write command (BMWTC-L and BIOWC-L) initiate the same basic type of operation. BMWTC-L indicates that the memory address is valid on the address lines, whereas BIOWC-L indicates that the I/O port address is valid on the address lines.

The address (memory of I/O) and data must be valid on the bus 50 nanoseconds prior to write command generation. This requirement allows data to be latched on either the leading or trailing edge of the command. When the write command (BMWTC-L or BIOWC-L) is asserted, the data on the data lines is stable and can be accepted by the slave.

The slave indicates acceptance of the data by returning a Transfer Acknowledge (BXACK-L), allowing the bus master to remove the command, address, and data from the bus. BXACK-L is removed from the bus within 65 nanoseconds to allow for the next bus cycle.

FIG. 43 shows the timing for the Memory Write or I/O Write command.

Transfer Acknowledoe (BXACK-L)

The Transfer Acknowledge (BXACK-L) signal is the response from the bus slave (memory of I/O) indicating that the commanded read or write operation is complete and that the data has been placed on, or accepted from, the data lines. In effect, this signal (BXACK-L) allows the bus master to complete the current bus cycle. FIG. 43 shows the timing for BXACK-L with read and write operation.

If a bus master addresses a nonexistent or malfuntioning memory or I/C module, an acknowledge is not returned to the master. If this occurs, the bus master normally waits indefinitely for an acknowledge and therefore never relinquishes control of the overall bus. To avoid this possibility, a bus timeout function is implemented on every bus master to terminate a bus cycle after a preset interval, even if no acknowledge has been received.

A bus timeout can therefore be defined as any data transfer cycle terminated by the master before the transfer acknowledge (BXACK-L) signal is received. The minimum allowable bus timeout interval is 1.0 milliseconds, although 6 milliseconds is typical.

Figure 45:
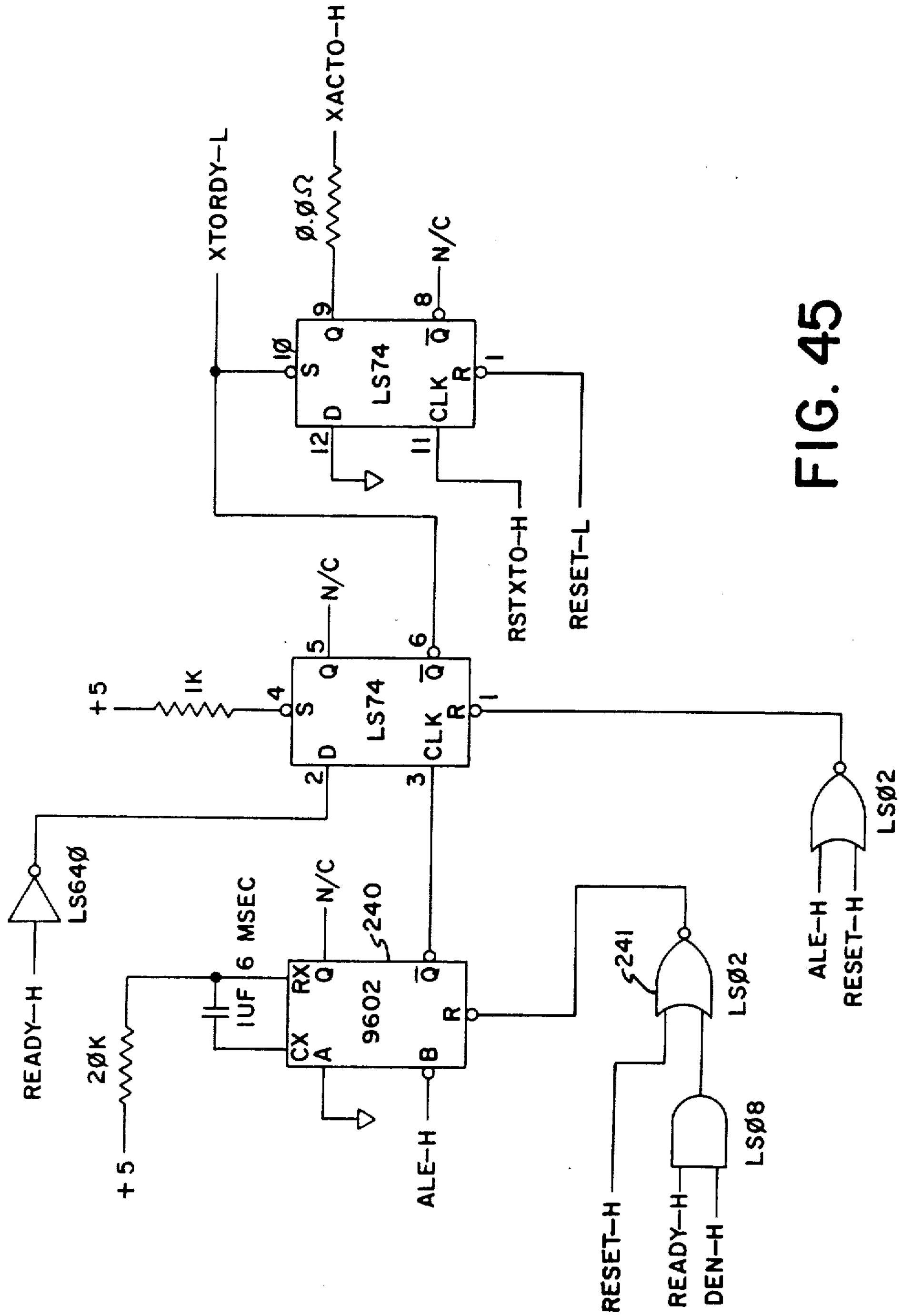
FIG. 45 is a schematic diagram regarding the bus transfer acknowledge timeout circuitry.

FIG. 45 is a detailed schematic of the circuitry for accomplishing the transfer time out signal. As indicated earlier, the purpose of this circuit is to detect a malfunction such as a module not responding to a data transfer request. As shown, a one-shot multi-vibrator 240 provides a 6 millisecond time frame in which a memory or I/O device can respond to a data transfer with a READY-H signal. If the module does not respond within this time period, the transfer acknowledge signals TRANSFER ACKNOWLEDGE TIMEOUT READY-LOW (XTORDY-L) and TRANSFER ACKNOWLEDGE TIMEOUT-HIGH (XACKTO-H) are generated. The XACKTO-H signal is used to provide an interrupt while the XTORDY-L signal provides an automatic READY-H signal for recovery purposes.

The circuitry shown in FIG. 45 is initialized via the RESET-H signal entering NOR gate 241. At the beginning of every central processing unit module cycle, the one-shot 240 is restarted via the falling edge of the ALE-H signal. If a timeout occurs, the signal XACTO-H can be reset by the issuance of an I/O write of the signal RESET TRANSFER ACKNOWLEDGE TIMEOUT-HIGH (RSTXT0-H) after the timeout interrupt routine has been serviced. The signal XTORDY-L is reset with the next ALE-H signal after a timeout occurs. The READY-H and DATA ENABLE-HIGH (DEN-H) signals are logically Anded so that when both are active, the one-shot 240 is reset. The purpose of this reset is to provide a means of handling wait states encountered by the CPU module that last longer than 6 milliseconds. When the wait states are completed, the one-shot is released from its reset state.

Figure 46:
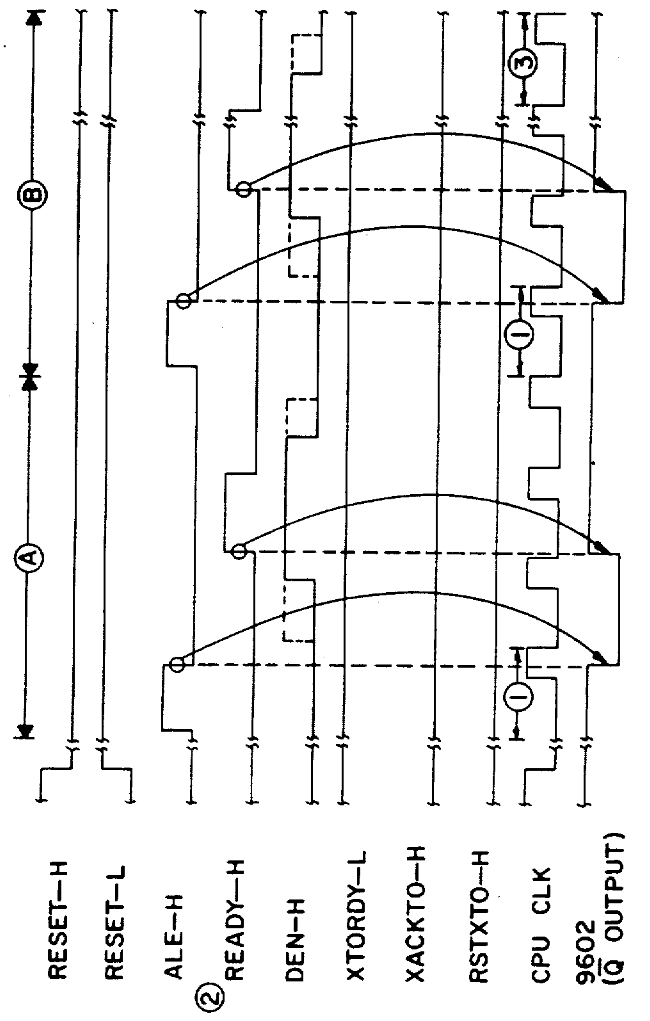
FIG. 46 is a timing diagram corresponding to the circuitry shown in FIG. 45.
Figure 47:
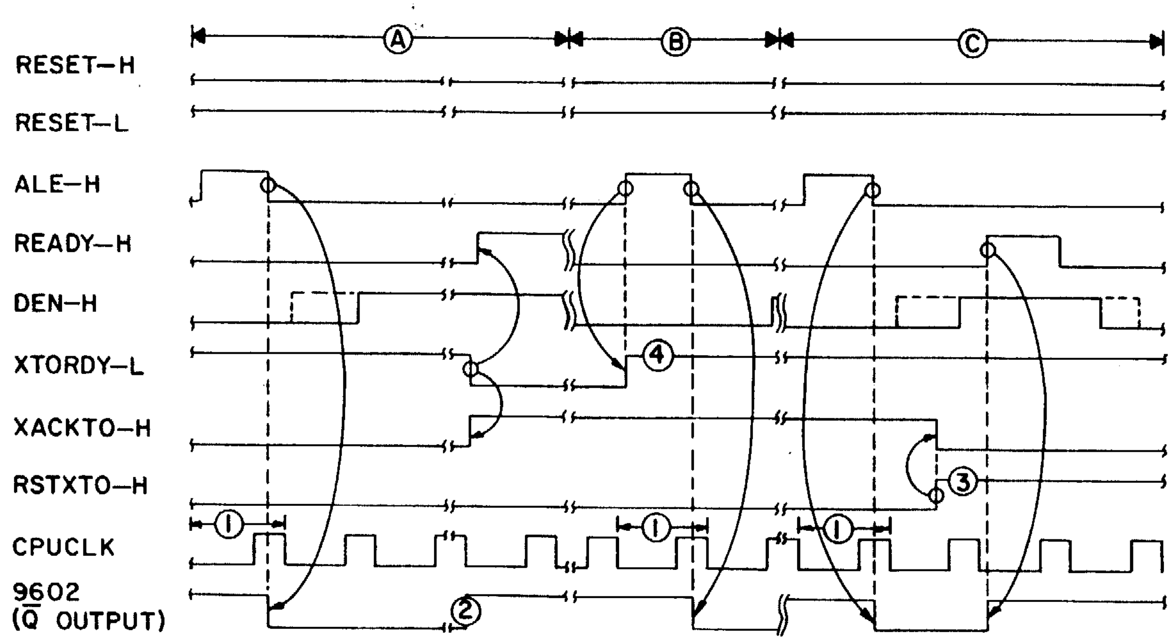
FIG. 47 is a further timing diagram regarding the circuitry shown in FIG. 45.

Timing diagrams illustrating the sequence for the above-mentioned signals are presented in FIGS. 46 and 47.

INTERRUPT OPERATIONS

The following subsections explain the overall bus signal lines used in the interrupt operation.

Interrupt Signal Lines

Interrupt Request Lines (BINT0-L–BINT7-L)

A set of interrupt request lines (BINT0-L–BINT7-L) is provided on the bus. An interrupt is generated by activating one of the eight interrupt request lines with an open-collector driver. All interrupts are level-triggered, rather than edge-triggered. By not requiring an edge to trigger an interrupt allows several sources to be attached to each line. The interrupt request lines are prioritized, with BINT0-L having the highest priority and BINT7-L having the lowest priority. BINTO-L is reserved for a Power Fail Interrupt which is brought from the power supply to the backplane by a 14 pin ribbon cable connector (see Table 29 for pin out details). BINT1-L is reserved for a Memory Error Interrupt leaving BINT2-L–BINT7-L available for general use.

Interrupt Acknowledoe (BINAT-L)

An interrupt acknowledge line (BINTA-L), driven by the bus master, requests the transfer of interrupt information on the bus. In general, the leading edge of BINTA-L indicates that the address bus is active; the trailing edge indicates that data is present on the data lines.

Non-Bus Vectored Interrupts

Non-Bus Vectored (NBV) interrupts are the only interrupts handled by the overall bus. The interrupt vector address is generated by the interrupt controller on the device being interrupted and transferred to the processor over its local bus. The "slave" modules generating the interrupt use an overall bus interrupt request line (BINT0-L–BINT7-L) to generate their interrupt request. When an interrupt request line is activated, the bus master performs its own interrupt operation and processes the interrupt. The Power Fail and Memory error interrupts are of this type.

Bus Exchange

The overall bus accommodates several masters on the same system, each taking control of the bus as it needs to effect data transfers. The bus masters request bus control through a bus exchange sequence.

The discussion of the overall bus exchange is separated into three parts. The first part explains the signals involved; the second part discusses the bus exchange serial priority technique; and the third part explains the implementation of the exchange logic.

Bus Exchange Signals

A set of five signals is used to implement the bus exchange operation. All bus exchange signals are synchronized by BCLK-L.

Bus Clock

This periodic clock signal is used to synchronize the exchange logic, with synchronization occurring on the trailing (high-to-low) edge of the pulse. BCLK-L has a duty cycle of approximately fifty percent, a maximum frequency of 10 MHz and can be slowed, stepped, or stopped as required by system design. There is no requirement for synchronization between BCLK-L and CCLK-L, but they may be derived from the same source. The BCLK-L line is driven by a tri-state clock driver.

Bus Busy (BUSY-L)

This signal is driven by the mster in control of the bus. All other masters monitor BUSY-L to determine the state or the bus. This bidirectional signal, which is driven by an open-collector gate, is synchronized by BCLK-L.

Bus Prioritv In (BPRN-L)

The BPRN-L is a non-bused signal that indicates to a master that no other master is requesting control of the bus. The BPRN-L signal is synchronized by BCLK-L and driven by TTL gates. In the serial resolution scheme, this is the master's input from the priority chain.

Bus Prioritv Out (BPRN-L)

This non-bused signal, when activated by a bus master, indicates to the next bus master that it may gain control of the bus (i.e., no other requests are pending for control of the bus). This signal is connected to the Bus Priority In (BPRN-L) input of the next bus master. The BPRO-L signal is driven by TTL gates and is synchronized by BCLK-L.

Common Bus Recuest (CBRO-L)

Any master that wants control of the bus but does not control it can activate the CBRQ-L signal with an open-collector gate. If CBRQ-L is high, it indicates to the bus master that no other master is requesting the bus, and therefore the present bus master can retain the bus. There are times when this can save the bus exchange overhead for the current master. This is because quite often when a master is controlling the bus, there are no other masters that are requesting the bus Without CBRQ-L, only BPRN-L indicates whether or not another master is requesting the bus. Between the master's bus transfer cycles, in order to allow other lower masters to take the bus if they need it, the master must relinquish the bus. At the start of the master's next transfer cycle, the bus must be regained. If no other master has the bus, this can take approximately three BCLK-L periods. To avoid this overhead of unnecessarily relinquishing and regaining the bus when no other masters need it, CBRQ-L may be used.

Any master that wants but does not have the bus must drive this line low (true). The master that has the bus can, at the end of a transfer cycle, sense CBRQ-L. If it is not low, then the bus does not have to be released, thereby eliminating the delay of regaining the bus at the start of the next cycle (at any time before the master's next cycle, any other master desiring the bus can drive CBRQ-L and cause the master to relinquish the bus at that time).

Bus Exchange Priority Technique

Serial Priority Technique

Serial priority resolution is accomplished with a daisy-chain technique (see FIG. 47A). With such a scheme, the bus priority output (BPROL-L) of each master is connected to the bus priority input (BPRN-L) of the next lower priority master.

Serial priority resolution is accomplished in the following manner. The BPRO-L output for a particular master is asserted if and only if its BPRN-L input is active and that master is not requesting control of the bus. Thus, if a master requests control of the bus, it sets its BPRO-L high which in turn disables the BPRN-L on all other masters.

The number of masters that can be linked in a serial chain is limited by the fact that the BPRN-L signal must propagate through the entire chain within one BCLK-L cycle. If the maximum BCLK-L of 10 MHz is used, then the number of masters in a serial chain is limited to three. FIG. 48 presents an example of the serial technique and the formula required to calculate BCLK-L.

Priority on the bus can be determined by physical location on the bus by connecting as master BPRN-L to ground (active). From that point in the rack, priority is determined by physical location in the serial daisy chain. The device with BPRN-L grounded has the highest priority; the next in the daisy chain of BPRO-L has the second highest priority; and the third in the daisy chain has third priority, and so on.

ELECTRICAL SPECIFICATIONS

This subsection presents the electrical specifications for the overall bus as follows:

(1) General bus considerations of the state relationships, signal line characteristics, and power supplies.

(2) Timing specifications for the bus signals.

(3) Specifications for the signal line drivers and receivers, as well as the electrical termination requirements.

When electrical specifications indicate minimum or maximum values for the bus, they must be measurable at any point on the bus.

General Bus Considerations

Logical and Electrical State Relationships

The signal names indicate whether or not the signal lines on the bus are active high or active low. If the signal name ends with "-L", then the signal is active low; if the signal name ends with "-H", then the signal is active high. The logical-electrical state relationship for a signal is:

| LOGICAL STATE | ELECTRICAL SIGNAL LEVEL |
|---|---|
| 1 | H = TTL High State |
| 0 | L = TTL Low State |
| At Receiver | At Driver |
| 5.25 V = H = 2.0 V | 5.25 = H = 2.4 V |
| 0.8 V = L = −0.5 V | 0.5 V = L = 0.0 V |

These specifications are based on TTL, 5 V +/−5%, referenced to logic ground (GND).

When specified, current flow into a node has a positive sign, and current flow out of a node has a negative sign.

Signal Line Characteristics

The following subsections describe two types of requirements. The first includes the requirements on the signal line that are measured when the signal line is in use. The second type includes those that are measured under special test conditions.

In-Use Signal Line Requirements

During normal use, the rise and fall times of the signals depend on which type of driver is used as detailed later. Typical rise and fall times are:

| | Open Collector | Totem Pole | Tri-State |
|---|---|---|---|
| RISE TIME | — | 10 ns | 10 ns |
| FALL TIME | 10 ns | 10 ns | 10 ns |

The maximum signal propagation delay on the bus is tdp (maximum). This is measured from the edge of any one board plugged into the bus to any other board plugged into the bus.

tpd (max)=3 ns (51.7 cm. backplane)

These dynamic signal parameters are tested by using 74S20 gates as drivers. After Power-Up, the following specifications apply:

(1) Bus termination required for each signal as detailed later.

(2) Setting time for all command line signals after transition is zero (see FIG. 43).

On these lines the ringing cannot go beyond the noise immunity levels (i.e., high, minimum; low, maximum). These requirements also apply to the data line (see subsection entitled "Data Lines") during any write operations. For noise immunity is required that all receivers have a hysteresis input.

For all data lines during read operations, the setup time is zero before the Transfer Acknowledge (BXACK-L) signal goes active; and the hold time is zero after the read type command goes inactive.

Figure 47B:
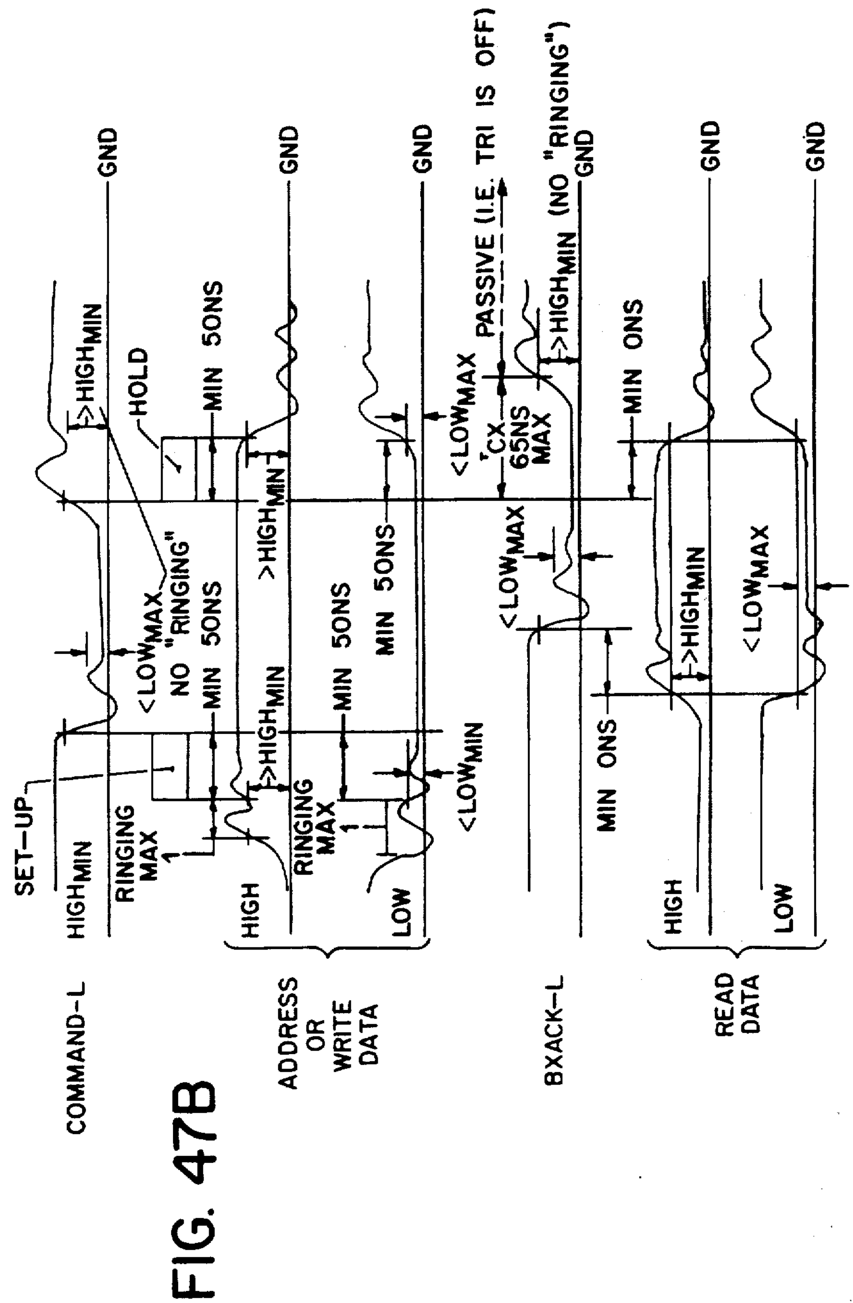
FIGS. 47B, C, D, and E, are further timing diagrams associated with the bus arbitration technique.

The setup, hold, and command ringing are summarized and graphically presented in FIG. 47B.

Backplane Signal Characteristics

Figure 47C:
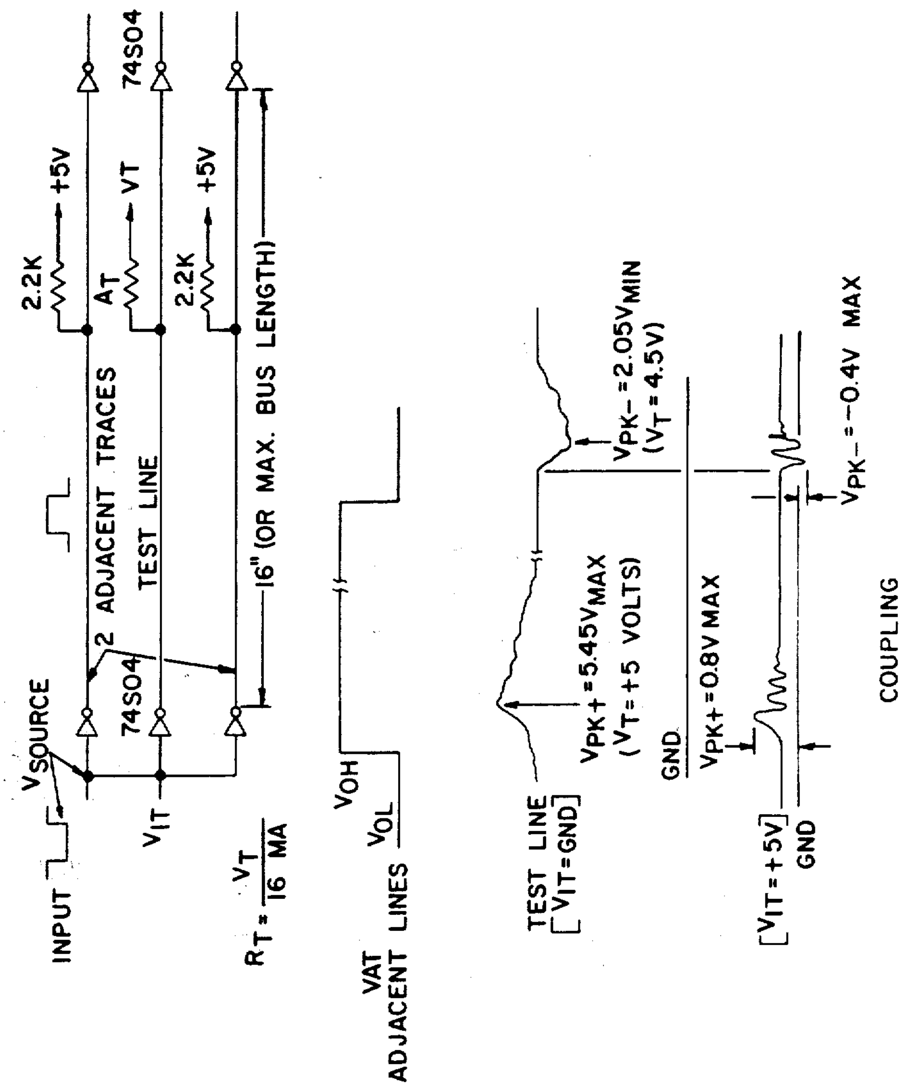
FIG. 47A is a block diagram showing the serial priority bus arbitration technique and various equations used therein.

Requirements for line-to-line coupling characteristics are shown in FIG. 47C. The specific test conditions under which the specifications are met are also shown.

Power Supply Specifications

Table 31 provides all power supply specifications. All voltages not shown in Table 31 that are required on a module plugging into the overall bus may be derived from one of the standard voltages (+5 V, +15 V, −15 V).

Battery Backup

Provisions are made on the backplane for +5V battery backup for use by any devices requiring it.

Timing

This subsection describes all timing specifications on the overall bus. It does not present descriptions or functional relationships (which are given in the subsection entitled "FUNCTIONAL DESCRIPTION"); however, this section does imply the functionality when relating two signals.

Table 32 summarizes the timing specifications in this section.

Figure 47D:
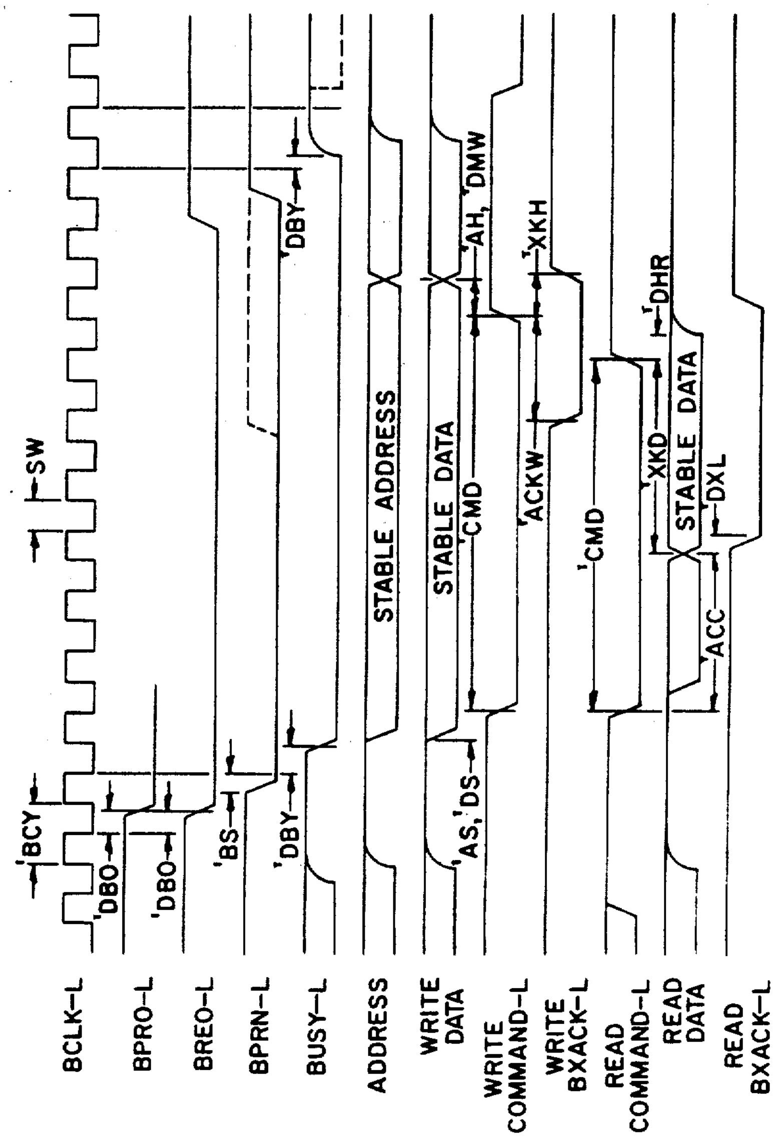

The timing diagrams shown in FIG. 47D show the minimum or maximum values required for each parameter. The timing diagrams show how all of the parameters are defined in relation to the signals involved.

Read Operations (I/O and Memory)

A read operation transfers data from memory or from I/O to the master that is controlling the bus (see the subsection entitled "Data Transfer Operation"). The lines involved and timing specifications for a read operation are shown in FIG. 43.

Write Operations (I/O and Memory)

A write operation transfers data from the master controlling the bus to memory or I/O (see the subsection entitled "Data Transfer Operation"). Timing for a write operation is shown in FIG. 43.

TABLE 31

POWER SUPPLY SPECIFICATIONS

| | STANDARDS[1] | | | |
|---|---|---|---|---|
| PARAMETER | Ground | +5 | +15 | −15 |
| MNEMONIC | GND | +5 V | +15 V | −15 V |
| TOLERANCE | Ref | 1% | 1% | 1% |
| COMBINED LINE & LOAD REG | Ref | 0.1% | 0.1% | 0.1% |
| RIPPLE (PEAK to PEAK) | Ref | 50 mV | 50 mV | 50 mV |
| TRANSIENT RESPONSE (50% Load Change) | | 100 us | 100 us | 100 us |

[1]Point of measurement is at connection point between motherboard and power supply. At any card edge connector a degradation of 2% maximum (e.g. voltage tolerance 2%) is allowed.

TABLE 32

BUS TIMING SPECIFICATION SUMMARY

| PARAMETER | DESCRIPTION | MIN | MAX | UNITS |
|---|---|---|---|---|
| tAH | Address Hold Time | 50 | — | ns |
| tAS | Address Setup Time (at "slave" board) | 50 | — | ns |
| tBCY | BCLK-L Period | 100 | — | ns |
| tBPRNO | BPRN-L to BPRO-L | 0 | 30 | ns |
| tBPRNS | BPRN-L to BCLK-L Setup Time | 22 | — | ns |
| tBPRO | BCLK-L to BPRO-L | 0 | 40 | ns |
| tBSYO | CBRQ-L to BUSY-L to | — | 12 | ns |
| tBUSY | BUSY-L delay from BCLK-L | 0 | 70 | ns |
| tBUSYS | BUSY-L to BCLK Setup Time | 25 | — | ns |
| tBW | BCLK-L Width | 0.35 (tBCY) | 0.65 (tBCY) | |
| tCBRO | BCLK-L to CBRQ | 0 | 60 | ns |

TABLE 32-continued

| BUS TIMING SPECIFICATION SUMMARY | | | | |
|---|---|---|---|---|
| PARAMETER | DESCRIPTION | MIN | MAX | UNITS |
| tCBRQS | CBRQ-L to BCLK-L SetuP Time | 35 | — | ns 7 |
| tCCY | CCLK-L period | 100 | 110 | ns |
| tCMD | Command Pulse Width | 100 | tTOUT | ns |
| tCMPH | Command Hold Time | 20 | — | ns |
| tCSEP | Command Separation | 100 | — | ns |
| tCW | CCLK-L Width | 0.35 (tCCY) | 0.65 (tCCY) | ns |
| tDHR | Read Data Hold Time | 0 | 65 | ns |
| tDHR | Write Data Hold Time | 50 | — | ns |
| tDS | Write Data Setup Time | 50 | — | ns |
| tDXL | Read Data Setup Time to XACL-L | 0 | — | ns |
| tLAD | BXACK-L | 0 | — | ns |
| tINIT | BINIT-L Width | 5 | — | ms |

Interrupt Implementations

Non bus, vectored (NBV) interrupts are handled on the bus master and do not require the bus for transfer of an interrupt vector address. The slave modules generating the interrupts may reside on the master module or on other bus modules, in which case they use the bus interrupt request lines (BINT0-L–BINT7-L) to generate interrupt requests to the bus master. When an interrupt request line is activated, the bus master performs its own internal interrupt operations and then processes the interrupt.

Bus Control Exchanges

A bus control exchange takes control of the bus (i.e., the ability to do read, write, and interrupt acknowledge operations) from one master and gives it to another master. For a functional description of this process, see the subsection entitled "Bus Exchange."

Figure 47E:
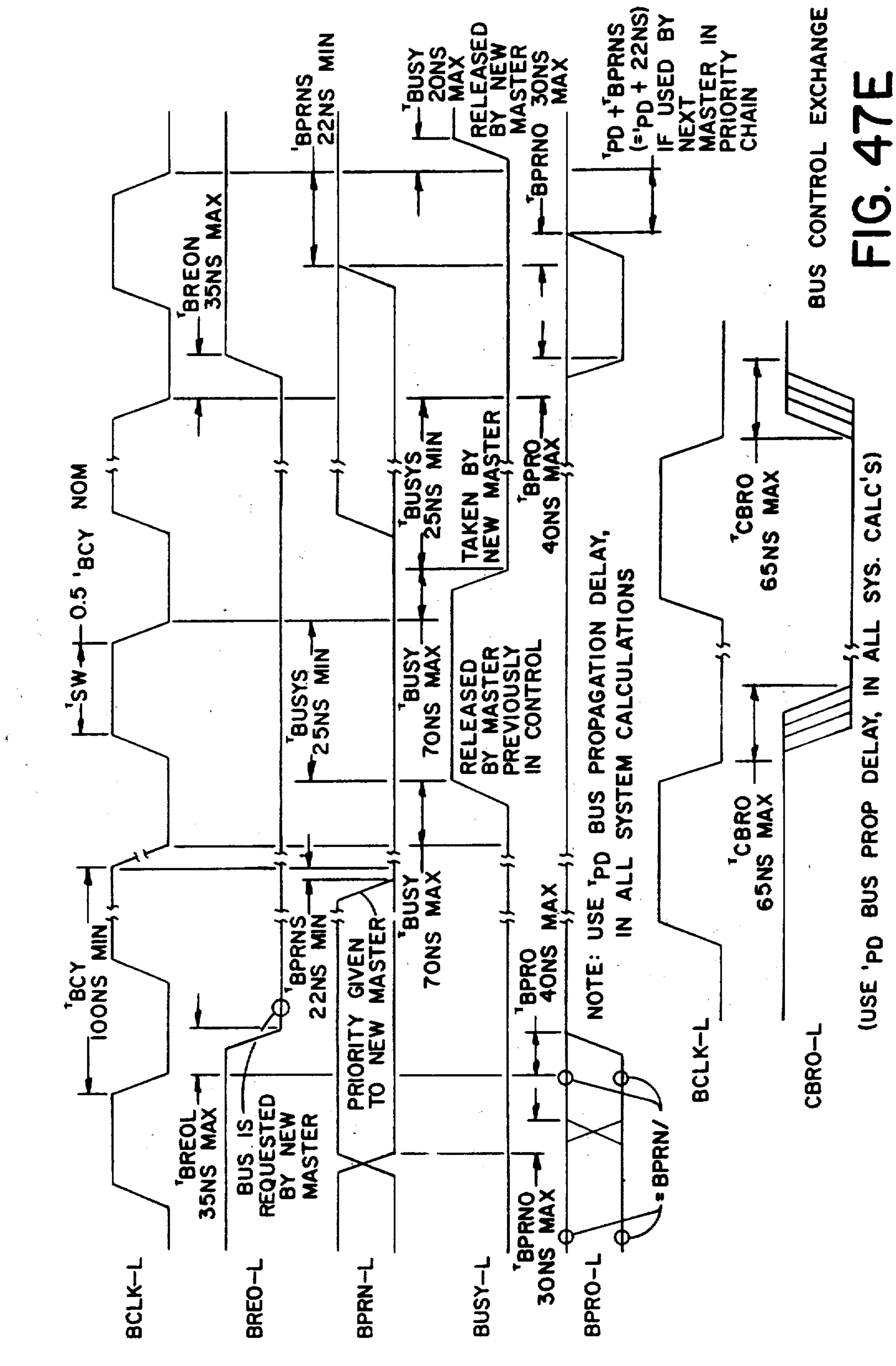

For a system using CBRQ-L (Common Bus Request), each master must also satisfy the timing requirements illustrated in FIG. 47E. Note that before "releasing the bus" (i.e., releasing BUSY-L), the hold times, etc., of any ending cycle must still be met as described in the previous subsections of this section. Likewise, after "taking the bus" (i.e., driving BUSY-L LOW), it is necessary to satisfy all applicable setup and other timing parameters for a cycle just beginning.

Serial Priority

Figure 47F:
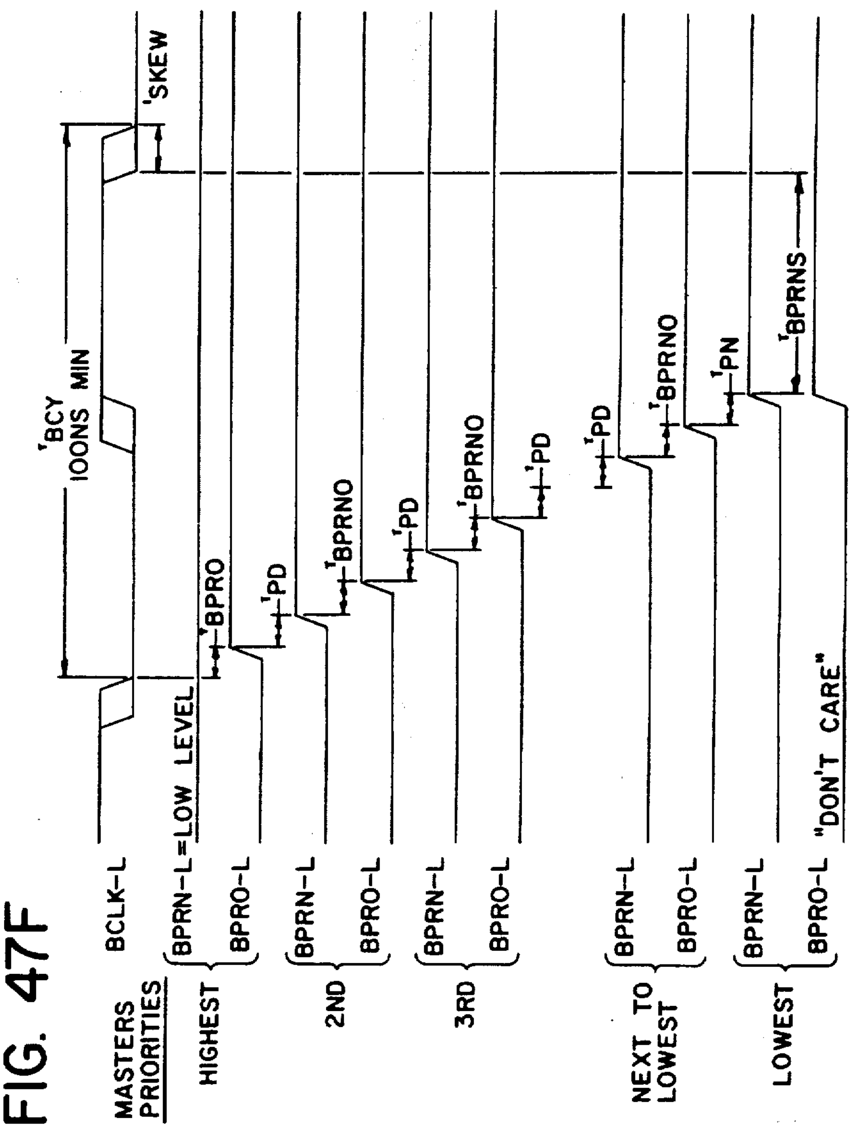

Using a serial priority scheme (i.e., daisy-chain BPRN-L and BPRO-L) the timing specifications in FIG. 47F apply.

Miscellaneous Timing

Figure 47G:
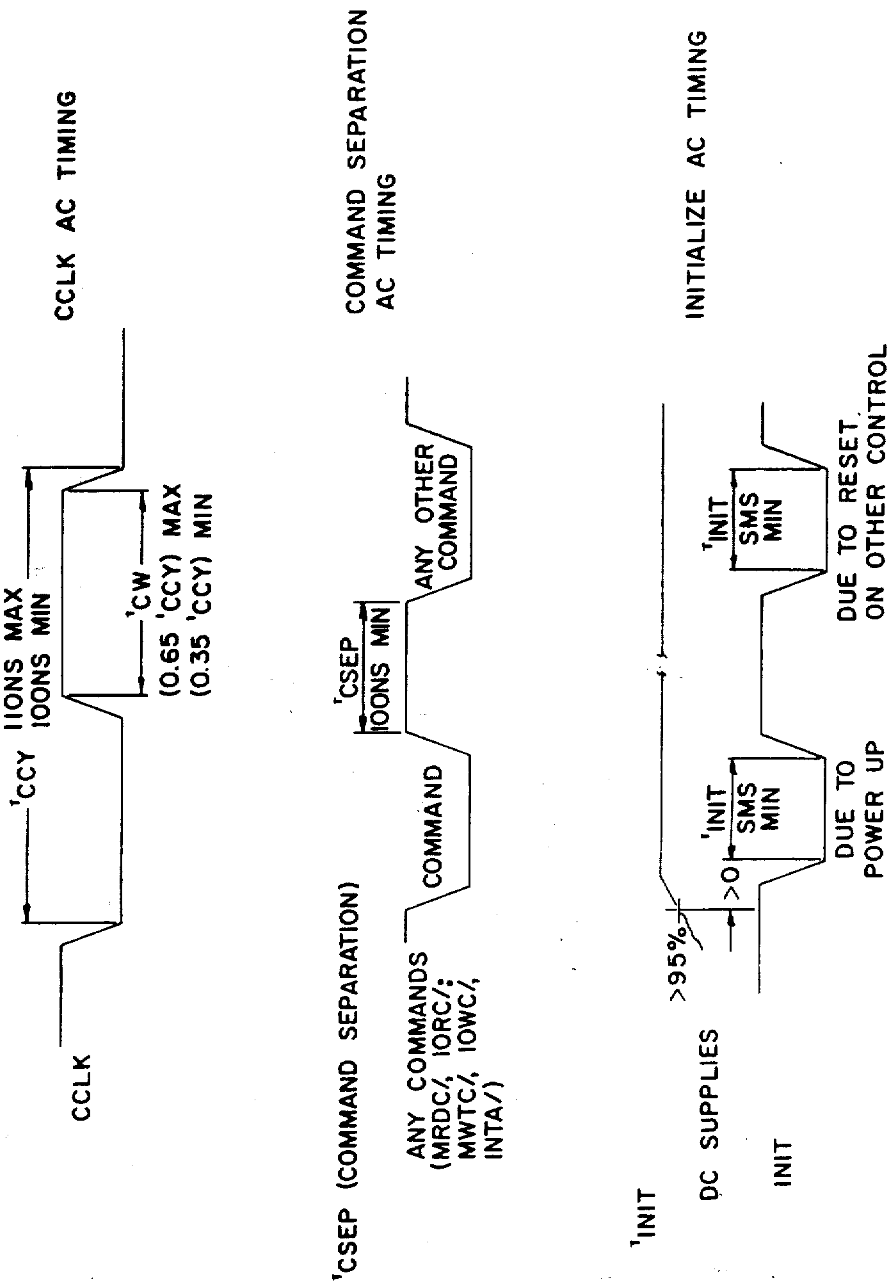

The timing diagrams in FIG. 47G show the timing of Constant Clock (CCLK-L), Command Separation (tCSEP), and Initialize (tINIT), respectively.

Receivers, Drivers and Terminations

Non-timing specifications unique to each signal line or to groups of signal lines are presented in Table 33. The requirements for the signal line receivers, drivers, and bus terminations, and the locations of the receiver, driver, and termination for each signal are given.

Backplane Considerations

The maximum length of the backplane connecting modules is 18 inches (45.72 cm). Extended boards used within the system are not supported by the bus unless the overall resulting length of the bus, including the extender card, is less than the 45.72 cm maximum.

Overall Bus Pin Assignments

Printed circuit boards which are designed to interface to the overall bus have one connector which plugs into the backplane and is called Pl. It mates with the 200 pin connector (formed from two 100 pin connectors 98 (see FIG. 2) forming the backplane for the slot 96 in which the board is mounted. Table 34 shows the pin/signal assignments for the connector on the printed circuit board. The undefined signals on the Pl connector are bussed to the adjacent connector through a jumper so that any number of card positions can be bussed together for a PRIVATE BUS interconnect. It is therefore seen that lines 24–46 and 55–99 of row B form the private bus 94, comprising 60 lines total. The remaining 140 lines form public bus 92.

Data Path

The overall bus allows for both 8 and 16 bit data path products. The 16 bit data path products use the byte swap technique described in the subsection entitled "Data Lines," and allows the 8 and 16 bit products to work together.

Memory Address Path

The overall bus standard designates a 24-bit address path. In many systems a 16- or 20-bit address path are sufficient though not fully compatilbe with the overall bus.

TABLE 33

| BUS | DRIVER[1] | | IOL MIN | IOH MIN | CO MIN | RECEIVER[2] | | | | TERMINATION[3] | | | |
|---|---|---|---|---|---|---|---|---|---|---|---|---|---|
| | BUS: DRIVERS, RECEIVERS AND TERMINATIONS | | | | | | IIL MAX | IIH MAX | CI MAX | | | | |
| SIGNAL | LOC | TYPE | mA | uA | pF | LOC | mA | uA | pf | LOC | TYPE | R | UNITS |
| DAT0-L-<br>DATF-L | M<br>(16 lines) | TRI | 24 | −2000 | 300 | S | −0.8 | 125 | 18 | MBD | PUP | 1.0K | ohm |
| ADR00-L-<br>ADR17-L,<br>BHEN-L | M<br>(25 lines) | TRI | 24 | −2000 | 300 | S | −0.8 | 125 | 18 | MBD | PUP | 1.0K | ohm |
| MRDC-L,<br>MWTC-L | M | TRI | 24 | −2000 | 300 | S | −0.8 | 125 | 18 | MBD | PUP | 1.0K | ohm |
| IORC-L<br>IOWC-L | M | TRI | 24 | −2000 | 300 | S | −0.8 | 125 | 18 | MBD | PUP | 1.0K | ohm |
| XACK-L | S | TRI | 24 | −400 | 300 | M | −0.8 | 125 | 18 | MBD | PUP | 1.0K | ohm |
| BCLK-L<br>CCLK-L | 1st<br>M | TRI | 48 | −3000 | 300 | Any | −0.8 | 125 | 18 | MBD | Term | 220/<br>330 | ohm |
| ENCLKI-L | E | TTL | 16 | −400 | 60 | M | −1.6 | 100 | 18 | N/R | | | |
| ENCLKO-L | E | — | 3.2 | −200 | 60 | N | −1.6 | 50 | 18 | N/R | | | |
| BPRN-L | E | TTL | 16 | −400 | 60 | N | −1.6 | 100 | 18 | N/R | | | |
| BPRO-L | E | TTL | 3.2 | −200 | 60 | N | −1.6 | 50 | 18 | N/R | | | |
| BUSY-L<br>CBRQ-L | M | OC | 20 | −250 | 300 | M | −0.5 | 50 | 18 | MBD | PUP | 1.0K | ohm |
| INIT-L | M | OC | 24 | −250 | 300 | A | −2.0 | 50 | 18 | MBD | PUP | 1.0K | ohm |
| INTA-L | M | TRI | 24 | −2000 | 300 | S | −0.8 | 125 | 18 | MBD | PUP | 1.0K | ohm |
| INTO-L-<br>INT7-L | S | OC | 16 | −250 | 300 | M | −0.8 | 50 | 18 | MBD | PUP | 1.0K | ohm |
| STAT1-L-<br>STAT4-L | M | OC | 24 | −2000 | 300 | — | — | — | — | MBD | PUP | 1.0K | ohm |
| SLT01-L-<br>SLT08-L | — | — | — | — | — | A | −0.8 | 125 | 18 | MBD | PUP | 1.0K | ohm |
| SLT16-L- | Any | TRI | 24 | −2000 | 300 | A | −0.8 | 125 | 18 | MBD | PUP | 1.0K | ohm |
| "SPARES" | Any | TRI | 24 | −2000 | 300 | A | −0.8 | 125 | 18 | MBD | PUP | 1.0K | ohm |

A = All
E = Each
M = Master
N = Next
S = Slave
OC = Open Collector
TRI = Tri-state
TTL = Totem-pole
MBD = Mother-board
N/R = Not Required
PUP = Pull-up
[1]Driver Requirements
IOH = High Output Current Drive
IOL = Low Output Current Drive
C0 = Capacitive Drive Capability
[2]Receiver Requirements
IIH = High Input Current Load
IIL = Low Input Current Load
CI = Capacitive Load
[3]+/− ¼ Watt Resistors

TABLE 34

OVERALL BUS P1 PIN ASSIGMENTS
(DOTTED LINES ARE FOR THE PRIVATE BUS USE)

| ROW B | SIGNAL | ROW A | SIGNAL | |
|---|---|---|---|---|
| 100 | GND | 100 | GND | |
| 99 | +5 V | 99 | +5 V | |
| 98 | +5 V | 98 | +5 V | POWER |
| 97 | GND | 97 | GND | |
| 96 | +15 V | 96 | +15 V | |
| 95 | GND | 95 | GND | |
| 94 | . . . | 94 | STAT4-L | |
| 93 | . . . | 93 | STAT3-L | STATUS |
| 92 | . . . | 92 | STAT2-L | LINES |
| 91 | . . . | 91 | STAT1-L | |
| 90 | . . . | 90 | CND | GROUND |
| 89 | . . . | 89 | ADR17-L | |
| 88 | . . . | 88 | ADR16-L | |
| 87 | . . . | 87 | ADR15-L | |
| 86 | . . . | 86 | ADR14-L | |
| 85 | . . . | 85 | ADR13-L | |
| 84 | . . . | 84 | ADR12-L | |
| 83 | . . . | 83 | ADR11-L | |
| 82 | . . . | 82 | ADR10-L | |
| 81 | . . . | 81 | ADR0F-L | |
| 80 | . . . | 80 | ADR0E-L | |
| 79 | . . . | 79 | ADRCD-L | |

TABLE 34-continued

OVERALL BUS P1 PIN ASSIGMENTS
(DOTTED LINES ARE FOR THE PRIVATE BUS USE)

| ROW B | SIGNAL | ROW A | SIGNAL | |
|---|---|---|---|---|
| 78 | . . . | 78 | ADR0C-L | ADDRESS |
| 77 | . . . | 77 | ADR0B-L | LINES |
| 76 | . . . | 76 | ADR0A-L | |
| 75 | . . . | 75 | ADR09-L | |
| 74 | . . . | 74 | ADR08-L | |
| 73 | . . . | 73 | ADR07-L | |
| 72 | . . . | 72 | ADR06-L | |
| 71 | . . . | 71 | ADR05-L | |
| 70 | . . . | 70 | ADR04-L | |
| 69 | . . . | 69 | ADR03-L | |
| 68 | . . . | 68 | ADR02-L | |
| 67 | . . . | 67 | ADR01-L | |
| 66 | . . . | 66 | ADR00-L | |
| 65 | . . . | 65 | BHE-L | |
| 64 | . . . | 64 | SPARE 12 | |
| 63 | . . . | 63 | SPARE 11 | |
| 62 | . . . | 62 | SLT16-L | |
| 61 | . . . | 61 | SLT08-L | SLOT |
| 60 | . . . | 60 | SLT04-L | NUMBER |
| 59 | . . . | 59 | SLT02-L | LINES |
| 58 | . . . | 58 | SLT01-L | |
| 57 | . . . | 57 | SPARE 10 | |
| 56 | . . . | 56 | SPARE 9 | SPARES |
| 55 | . . . | 55 | SPARE 8 | |
| 54 | GND | 54 | GND | |
| 53 | −15 V | 53 | −15 V | |
| 52 | GND | 52 | GND | |
| 51 | +5 V | 51 | +5 V | POWER |
| 50 | +5 V | 50 | +5 V | |
| 49 | GND | 49 | GND | |
| 48 | +15 V | 48 | +15 V | |
| 47 | GND | 47 | GND | |
| 46 | . . . | 46 | DATF-L | |
| 42 | . . . | 42 | DATB-L | |
| 41 | . . . | 41 | DATA-L | |
| 40 | . . . | 40 | DAT9-L | DATA |
| 39 | . . . | 39 | DAT8-L | LINES |
| 38 | . . . | 38 | DAT7-L | |
| 37 | . . . | 37 | DAT6-L | |
| 36 | . . . | 36 | DAT5-L | |
| 35 | . . . | 35 | DAT4-L | |
| 34 | . . . | 34 | DAT3-L | |
| 33 | . . . | 33 | DAT2-L | |
| 32 | . . . | 32 | DAT1-L | |
| 31 | . . . | 31 | DAT0-L | |
| 30 | . . . | 30 | SPARE 7 | |
| 29 | . . . | 29 | SPARE 6 | |
| 28 | . . . | 28 | CND | GROUND |
| 27 | . . . | 27 | CCLK-L | |
| 26 | GND | 26 | GND | |
| 25 | ENCLKIN-L | 25 | ENCLKO-L | CLOCKS |
| 24 | GND | 24 | BCLK-L | |
| 23 | GND | 23 | GND | GROUND |
| 22 | BUSY-L | 22 | CBREQ-L | |
| 21 | BPRN-L | 21 | BPRO-L | |
| 20 | BIORC-L | 20 | BIOWC-L | |
| 19 | BXACK-L | 19 | SPARE 5 | CONTROL |
| 18 | BMRDC-L | 18 | BMWTC-L | LINES |
| 17 | SPARE 3 | 17 | SPARE 4 | |
| 16 | BINIT-L | 16 | CPU REQ-L | |
| 15 | GND | 15 | GND | GROUND |
| 14 | BINTA-L | 14 | SPARE 1 | |
| 13 | BINT7-L | 13 | BINT6-L | INTERRUPT |
| 12 | BINT5-L | 12 | BINT4-L | LINES |
| 11 | BINT3-L | 11 | BINT2-L | |
| 10 | BINT1-L(MEM ERR) | 10 | BINT0-L(PWR FAIL) | |
| 9 | GND | 9 | GND | GROUND |
| 8 | BATTERY +5 V | 8 | BATTERY +5 V | BATTERY |
| 7 | BATTERY +5 V | 7 | BATTERY +5 V | BACK-UP |
| 6 | GND | 6 | GND | |
| 5 | −15 V | 5 | −15 V | |
| 4 | GND | 4 | GND | POWER |
| 3 | +5 V | 3 | +5 V | |
| 2 | +5 V | 2 | +5 V | |
| 1 | GND | 1 | GND | |

I/O Address Path

The overall bus allows for both 8- and 16-bit I/O address paths. The 16-bit path products are also configurable to act as 8-bit path products.

Interrupt Attributes

The overall bus (see the section entitled "Interrupt Operations") allows for considerable variety in interrupt attributes. The MMI, depending upon its configuration, may support no interrupts or Non Bus, Vectored (NVB) interrupts. Edge-triggered interrupt sensing is used.

Edge-triggered

The active level of the request line indicates an active request. Requiring no edge to trigger an interrupt allows several sources to be attached to a single request line. Sources for level triggered sense inputs should provide a programmtic means to clear the interrupt request.

A master supports the above interrupt sensing method. It is necessary to configure the system such that the sources of the interrupt requests correspond to the interrupt sensing method of the master.

Masters and Slaves

When constructing overall bus systems, it is not necessary that all modules have identical capabilities. One may, for instance, have a master with an 8/16 bit data path and a slave with an 8-bit data path. The system is completely functional, though the application must restrict itself to 8-bit access to that slave.

Thus the bus architecture provides the means to simultaneously designate private and public buses on the same overall bus. In any given installation, the private bus line may interconnect two or more modules to the exclusion of the other modules which provides that some of those other modules may also use the private bus for their own communications.

The bus architecture also provides the means for one module to become system bus master (so as to generate system clock signals) even though other modules in a configured MMI have the same capability.

The bus architecture also provides for both rotational priority and privileged rotational priority token (bus ownership) passing technique. The privileged rotational priority technique allows a second CPU module 38 (see FIG. 1) to be configured in the MMI without overly burdening the public bus 92.

The bus architecture further provides the means for implementing a "soft interrupt" mechanics for modules to interrupt each other in an efficient and orderly fashion. For this soft interrupt mechanism to operate, the location and states of all modules in the must be known. This is accomplished through use of board status registers, which communicate their status information over the bus.

This status information and bus architecture also allow an improved watchdog timer (WTD) to function. The bus architecture also allows data in a memory module to be fenced so as to protect some of the memory from access by board via the public bus, leaving such protected memory to the exclusive use of the module to which it is interconnected by the private bus. These and other features of the MMI are described in detail elsewhere in this document.

CPU MODULE 22

CPU Module Overview

The CPU module 22 is a central processor unit (CPU) capable of operating at speeds of up to 8 MHz. The CPU module supports 16 megabytes of memory space and 64K bytes of I/O. The lower 16K of I/O is reserved for on board I/O devices and the top 48 K bytes is on the public bus 92. The CPU module has PROM space which may use 4K or 8K (x8) parts, providing either 16K or 32K bytes of PROM (up to 32K bytes).

Figure 34:
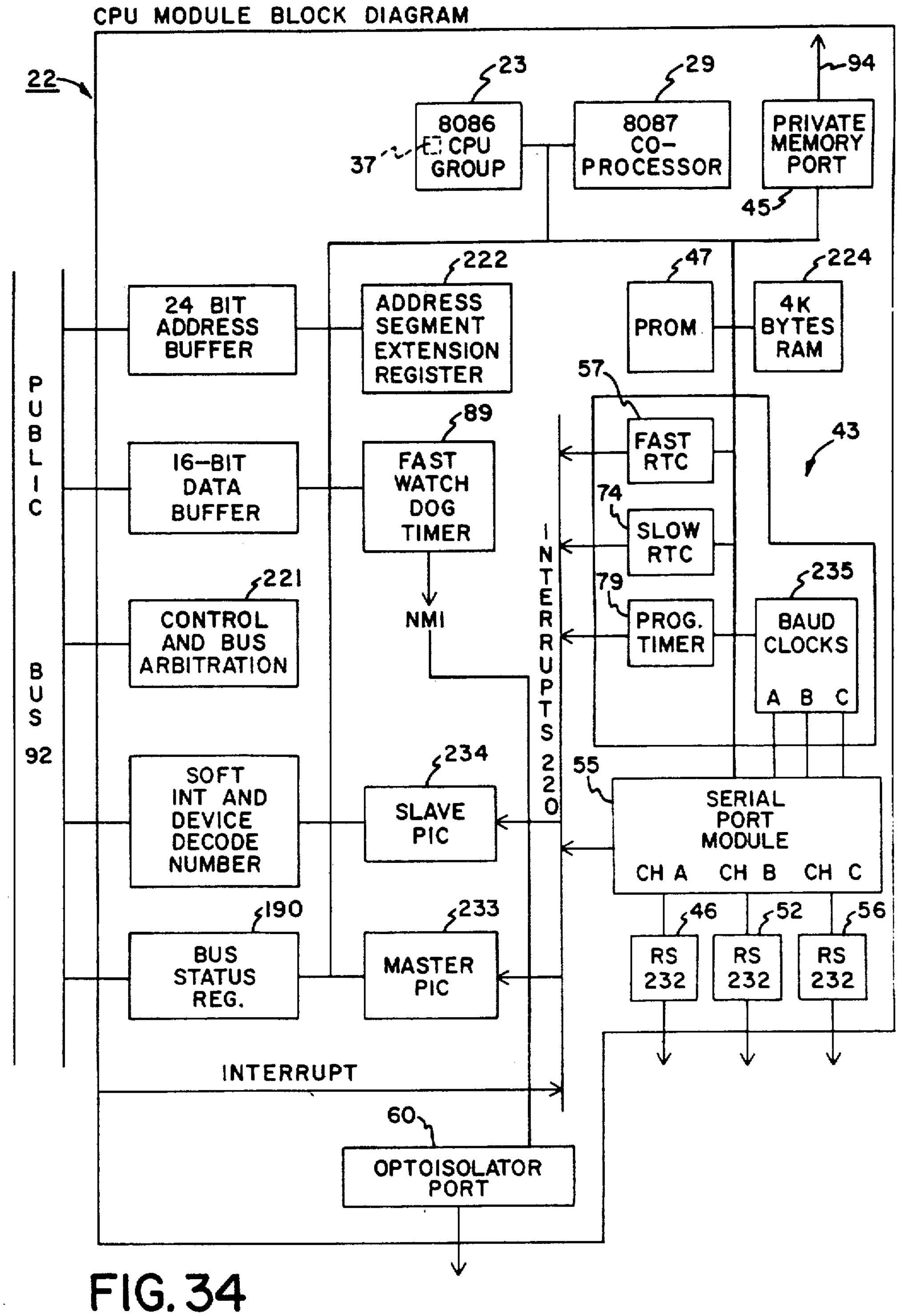
FIG. 34 is an overall block diagram of the CPU module.

As best seen in FIG. 34, CPU module operational blocks include a CPU group 23 (Intel Corporation's 8086 CPU 16 bit family), a numeric data processor 29 (NDP) (Intel Corporation type 8087, 16 bit), serial communication port module 55 with type RS232 serial ports 46, 52 and 56, private port 45 (to memory module 24), timer module 43, fast watchdog timer 89, interrupts 220, bus arbitration module 221, address segment extension register 222, bus interface (comprising a 24-bit address buffer 170, a 16-bit data buffer 72, control and bus arbitration module 22, bus status register 190, and soft interrupt and device decode number module 218), RAM 224 (up to 4K bytes) and resident diagnostics.

The CPU features consist of:

(1) Three full-duplex RS232 serial ports 46, 52, and 56 tnat support SYNC, ASYNC, and bit-oriented protocols.

(2) Real time clocks 57 and 74 consisting of two programmable interval timers The timers are chained and provide two separately armable interrupts.

(3) A fast watchdog timer 89 for sensing processor inactivity. A non-maskable interrupt (NMI) is generated and the user determines the task to be performed. An optoisolator port 60 is also provided to inform the outside world of a fast watchdog timeout.

(4) A numeric data processor 29 (Intel Corporation 8087) for supporting floating point arithmetic. It can also perform fixed point arithmetic on binary and decimal integers of up to 64 bits and 18 digits, respectively.

(5) Off board interrupts that are achieved by using a single interrupt line. The I/O soft interrupt address of the CPU as seen by the public bus is based on the CPU's rack number and slot in the backplane.

(6) The capability of driving the BCLK/ and CCLK/ on the public bus. The CCLK/ is a 9.8304 MHz clock. The frequency of the BCLK/ is strappable between 2.4576 MHz, 4.9152 MHZ and 9.8304 MHz to allow faster arbitration in systems with fewer devices. The BCLK/ frequency that is used depends upon the number of devices that may contend for the public bus using the Intel Corporation 8289 arbiter (in module 221) and also the total number of slots available. See Subsection entitled "Bus Interface" as to frequency determination.

(7) On board interrupts include:

(from high to low priority)

Non maskable interrupt (NMI)-Fast Watchdog Timer 89

1. XACK Timeout
2. Hard Memory Error
3. Power Fail (INTO)
4. MPSC2 Interrupt
5. MPSC1 Interrupt
6. Programmable Timer
7. INT2-Pub. lic Bus Hard Interrupt 8. Fast Real Time Clock
9. INT3-Public Bus Hard Interrupt
10. Slow Real Time Clock
11. INT4-Public Bus Hard Interrupt
12. Public Bus Soft Interrupt
13. 8087 (NDP)
14. Memory Module Soft Error Interrupt
15. Ring Indicator The Memory Error line is an "or" of the public bus memory error interrupt (INTI) and the memory module hard interrupt from the private RAM port. The public bus interrupt is only enabled to create an interrupt when the CPU has control of the bus.

(8) A private port to the memory module RAM board. The CPU may access up to 896 Kbytes of RAM via this port. Memory module has a fence 167 (see FIGS. 1 and 1A), settable by the CPU, to protect CPU code locations from public bus access.

(9) The capability of initiating the serial rotating priority arbitration for the public bus. See subsection entitled "Bus Arbitration" for details on the arbitration scheme.

REFERENCE DOCUMENTS

The following documents are hereby incorporated by reference and are useful for a fuller understanding of the CPU module:

(A) The Intel Corporation 8086 Family User's Manual (9800645A).

(B) The Intel Cororation 8086 Family Users Manual—Numerics Supplement—July 1980

(C) Intel Corporation Intel Peripheral design handbook—Ref. 8255A, 8253A (D) Intel Corporation Multibus Interfacing13 App. Note 28A.

(E) Designing Intel Cororation 8086, 8088, 8089 Multiprocesing Systems with 8289 Bus Arbiter—App. Note 51.

using the Intel Corporation 8259A Programmable Interrupt Controller—App. Note 59.

(G) Intel Corporation 8086 System Design—App. Note 67.

(H) EIA Scandard—RS232

(I) EIA RS232 Async. Port Standard WP-730-703-003

(J) Multi-Protocol Serial Controller (MPSC) specification (Intel Corporation 8274/NC7201)

Central Processing Unit Group 23

The CPU group 23 for CPU module 22 uses a microprocessor 37 (shown in phantom), such as the Intel Corporation 8086, 16-bit microprocessor. The CPU 22 can support both the 8086 and 8086-2, for maximum operating speeds of 5MHz and 8MHz respectively. The 5 or 8 MHz operating speed is jumper selectable. The software may read I/O port 44H (see later subsection) to determine the CPU speed. If data bit 4 is a logic "0", 8MHz is selected. A logic "1" indicates 5 MHz operation.

The CPU group microprocessor is configured in the maximum mode. This extends the system architecture to support a multiprocessor configuration and a local instruction set extension processor (i.e., co-processor 8087). An Intel 8289 bus arbiter and two Intel 8288 bus controllers are utilized to supply the resident bus commands and public bus commands.

The microprocessor may be reset by a power up or by a "soft" reset from another device. A jumper option is also available to reset the CPU on a hard memory error from private port RAM and public bus port RAM. The reset pulse is internally active for up to one clock period after the external reset. Therefore, any activity after reset is delayed one clock period after the external reset.

The CPU group 23 can ascertain the cause of its reset by reading I/O port 30H immediately after a reset. Data Bit 7 is the Soft Reset Bit and if set indicates that a soft reset has occurred. Data Bit 6 is the Hard Memory Error Bit and if set indicates that a hard memory error has occurred. The Soft Reset Bit is cleared only by a Master Reset or by a Hard Memory Error. The Hard Memory Error Bit is cleared by a Master Reset or by a clear of the Fast Watchdog Timer Latch which indicates that the system is OK. Table 60 presents a summary of this information.

TABLE 60

| DAT7 | DAT6 | CAUSE OF RESET |
|---|---|---|
| 0 | 0 | MASTER RESET (Power Up or Reset Button) |
| 0 | 1 | HARD MEMORY ERROR OCCURRED |
| 1 | 0 | "SOFT" RESET - No hard memory errors have occurred |
| 1 | 1 | "SOFT" RESET - A hard Memory Error has occurred at some previous point. |

Numeric Data Processor (NDP) 29

The numeric data processor 29 (Intel Corporation type 8087) is used in systems where large numeric processing is required. A jumper is installed if a NDP is not present so that the software may read a status line to determine whether or not the system contains a NDP. This line is read at I/O address 44H (PPIO - PORT C). If Data Bit 3 is set, there is a NDP on the CPU.

The NDP is a co-processor that extends the capabilities of the microprocessor to provide arithmetic and logical instruction support for a variety of numeric data types; it also executes numerous built-in transcendental functions (e.g., tangent and log functions).

The combination of the microprocessor 37 and the NDP appears to the programmer as a single machine. The NDP, in effect, adds new data types, registers, and instructions to the microprocessor. The programming languages and the co-processor architecture take care of most inter-processor coordination automatically. The NDP can interrupt the microprocessor when it detects an exception. Interrupts are discussed in a subsection entitled "Interrupts".

The NDP uses the request/grant line to obtain control of the resident bus for data transfers. The NDP utilizes the same clock generator and system bus interface components as the microprocessor.

The NDP and the microprocessor require instruction synchronization and this is accomplished via the WAIT instruction. The NDP's BUSY signal informs the CPU that the NDP is executing instructions. The microprocessor's WAIT instruction tests this signal to ensure that the NDP is ready to execute a subsequent instruction. There are few cases when synchronization is not required. Refer to reference document B at section S.5-instruction synchronization, page S-23 for complete details.

The NDP initializes itself after it receives a hardware reset pulse. Upon detecting a reset pulse going active, the NDP suspends all activities. The state of the NDP following initialization is shown in Table 61. Initialization also causes the NDP to identify the host CPU and begins to track its instruction fetches and execution. The contents of NDP registers are considered destroyed by initialization. The NDP also has software initialize capability. The instructions FINIT and FSAVE initialize the NDP but do not affect the NDP synchronization to the microprocessor.

The NDP is configured by the microprocessor. This operation is accomplished with the instructions FLDCW (load control word), FSTCW (store control word), and FSTSW (store status word). The bit configuration for the control and status registers is shown in Tables 62 and 63. An explanation of these and other NDP instructions is presented in reference B at section S.7.

Memory—PROM 47

The CPU 22 has a PROM 47 that uses either 4K or 8K (x8) chips, providing either 16K or 32K bytes respectively. Jumpers are used to select the size and speed of the PROM used. Address lines are connected to the devices starting with A1 and continuing up to the maximum number the device requires, leaving the remaining address lines for chip enable decoding.

TABLE 61

NDP Processor State Following Initialization (Intel Corporation Type 8087)

| FIELD | VALUE | INTERPRETATION |
|---|---|---|
| Control Word | | |
| Infinity control | 0 | Projective |
| Rounding control | 00 | Round to nearest |
| Precision control | 11 | 64 Bits |
| Interrupt-enable mask | 1 | Interrupts disabled |
| Exception Masks | 111111 | All exceptions masked |
| Status Word | | |
| Busy | 0 | Not Busy |
| Condition Code | ???? | (Indeterminate) |
| Stack Top | 000 | Empty Stack |
| Interrupt Request | 0 | No interrupt |
| Exception Flags | 000000 | No exceptions |
| Tag Word | | |
| Tags | 11 | Empty |
| Registers | N.C. | |
| Exception Pointers | | |
| Instruction code | N.C. | Not changed |
| Instruction address | N.C. | |
| Operand Address | N.C. | |

TABLE 62

8087 CONTROL REGISTER

| 15 | | | | | | 7 | | | | | 0 |
|---|---|---|---|---|---|---|---|---|---|---|---|
| | IC | RC | PC | IEM | | PM | UM | OM | ZM | DM | IM |

Exception Masks (1 = exception is masked.)

- IM — Invalid Operation
- DM — Denormalized Operand
- ZM — Zerodivide
- OM — Overflow
- UM — Underflow
- PM — Precision
- (reserved)
- IEM — Interrupt Enable(1)
- PC — Precision Control(2)
- RC — Rounding Control(3)
- IC — Infinity control(4)
- (reserved)

(1) Interrupt Enable Mask
0 = Interrupts Enabled
1 = Interrupts Disabled (masked)

(2) Precision Control
00 = 24 bits
01 = (reserved)
10 = 53 bits
11 = 64 bits (3) Rounding Control
00 = Round to nearest or even
01 = Round down (toward − infinity)
10 = Round up (toward + infinity)
11 = Chop (truncate toward zero)

(4) Infinity Control
0 = Projective
1 = Affine

TABLE 63

NUMERIC DATA PROCESSOR STATUS REGISTER

| 15 | | | | | | | 7 | | | | | | 0 |
|---|---|---|---|---|---|---|---|---|---|---|---|---|---|
| B | C3 | ST | C2 | C1 | C0 | IR | | PE | UE | OE | ZE | DE | IE |

EXCEPTION FLAGS

TABLE 63-continued

NUMERIC DATA PROCESSOR STATUS REGISTER

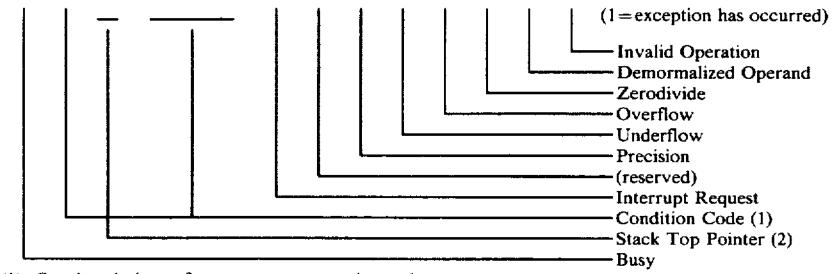

(1) See descriptions of compare, test, examine and remainder instructions in section S.7 for condition code interpretation.
(2) ST values:
000 = register 0 is stack top.
001 = register 1 is stack top
.
.
.
111 = register 7 is stack top The address for the PROMs is given below:

| PROM SPACE | ADDRESS |
|---|---|
| 16K bytes | FC000-FFFFF H |
| 32K bytes | F8000-FFFFF H |

TIMER MODULE 43

Real Time Clocks

The CPU module uses two real time clocks (counters); a fast real time clock (FRTC) 57, and a slow real time clock (SRTC) 74. There is also a programmable timer 79. The timers are programmable interval timers with a crystal oscillator input clock. The oscillator has a maximum error rate of 10 seconds per month (4 PPM).

All three timers may be used to create interrupts (see subsection entitled "Interrupts Using the Real Time Clocks and the Programmable Timer").

The programming of these counters is presented below:

PIT 0, Timer 0

This counter is used to provide the fast real time clock. The. input is a 1.9 MHz clock, giving a timer period of 1 microsecond. This time may be multiplied by an integer from 2 to 65535 for a maximum FRTC of 65.54 milliseconds. Thus a 1 ms FRTC requires multiplication by 1000 decimal = 03E8 Hex.

The programming sequence becomes:

| I/O ADDRESS | DATA | COMMENT |
|---|---|---|
| 16 H | 34 H | Initialize Timer 0 for Mode 2 |
| 10 H | E8 H | LSB Load |
| 10 H | 03 H | MSB Load |

This does not create the interrupt but the rate. Interrupt options are in the subsection entitled "Programming The Slave Pic".

PIT 0, Timer 1.

This timer is used as the slow real time clock. Its basic time period is the period of the fast real time clock. The period or the SLOW RTC may be from 4 microseconds to 1.192 hours. To obtain a SLOW RTC of 1 second from a 1 millisecond FRTC requires multiplication by 1000 decimal = 03E8 Hex.

The programming sequence is presented below:

| I/O ADDRESS | DATA | COMMENTS |
|---|---|---|
| 16 H | 74 H | Initialize Timer 1 for Mode 2 |
| 12 H | E8 H | LSB |
| 12 H | 03 H | MSB |

Again, the interrupts are programmed separately.

Programmble Timer 79

The programmable timer is programmed as the user desires. It may be programmed to create an interrupt so that it may time events or it may be used to provide a software check for the user to ensure that the capacity of the system to solve problems in a given time is not exceeded.

The interval of the programmable timer is a multiple of the FRTC and may range from 4 microseconds to 1.192 hours. To get a 10 second programmable timer, a 1 millisecond FRTC must be multiplied by 10,000 decimal = 2710H. The programming sequence is:

| I/O ADDRESS | DATA | COMMENTS |
|---|---|---|
| 16 H | B0 H | Initialize Timer 3 for Mode 0 |
| 14 H | 10 H | LSB |
| 14 H | 27 H | MSB |

The reinitialization of this counter is done by rewriting to address 14.

The Fast Watchdog Timer 57

The underlying concept of the fast watchdog timer utilized in the CPU module and all other modules which communicate through the public bus 92 is to minimize the possibility of an improper retriggering of the timer, thus preventing a timeout, when conditions warrant a timeout. Instead of having a single value able to retrigger the fast watchdog timer, the present configuration requires a specific 2-bit, bit pattern to be received by the timer in order for it to be reset. The specific bit pattern utilized is a complementary one; that is, if the bit pattern is 01 on a particular occasion, the next occasion will require the bit pattern to be 10 and the one after that to be 01, etc. It is also required that the complement be the next received signal to the watchdog timer, thus preventing the possibility of improper signals being received with an occasional proper bit pattern interspersed; with but all these signals (proper and improper) being received before the timeout. This particular aspect minimizes the possibility of a software loop accidentally submitting the complement within the period of time set by the watchdog timer circuitry.

The present fast watchdog timer causes an instant timeout if an improper bit pattern is received at its comparator.

In addition to the two bits portion for comparison, the comparator also receives six additional bits forming a full 8-bit byte, five of which are associated with the slot location for the particular module. That is, the module must receive not only the proper 01, 10 bit pattern, but also must receive the bit pattern for its slot in order for the comparator to compare the 01, 10 bit pattern received. When the system is running properly, the FWDT should never realize its terminal count. If the FWDT is set for a 200 millisecond period, the software must retrigger the watchdog within 200 milliseconds of the last trigger to keep the error indicators from being set. The mechanism for retriggering this timer is by doing an I/O write to address B4 H with an alternating data pattern. The data must be as follows:

| D7 | D6 | D5 | D4 | D3 | D2 | D1 | D0 |
|---|---|---|---|---|---|---|---|
| 0 | V1 | V2 | SLT16-L | SLT08-L | SLT04=L | SLT02-L | SLT01-L |

V1 and V2 are alternating data bits. The first trigger after a reset or a restart must have V1=0 and V2=1. Each time the timer is retriggered, these two bits are toggled, requiring the software to remember which data pattern is required. The slot lines, are read at I/O port 30H (see subsection entitled "Status Indicators"). If the CPU module is in Slot 4 of Rack 0, the first trigger rquires the data to be 3BH, the second trigger requires 5BH, and so on. A jumper is available to create a watchdog timeout if an incorrect data pattern is written to I/O address B4H.

If a watchdog timeout occurs, the mechanism for restarting the watchdog also resets the values of data bits 5 and 6 (V1 nd V2) needed for the retrigger value (see subsection entitled "Restarting the FWDT after A Timeout" for details).

Figure 35:
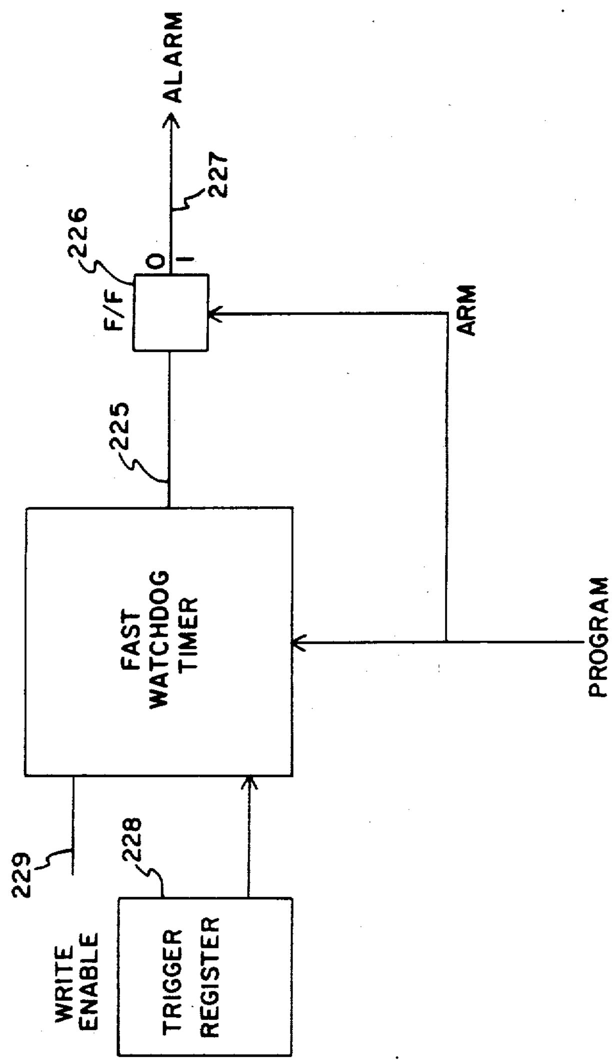
FIG. 35 is a diagrammtic representation of the fast watchdog timer and its arming circuitry.

A diagrammatic representation of the fast watchdog timer operation is shown in FIG. 35. As seen there, a flip-flop 226 is interposed between the output 225 of the fast watchdog timer and the alarm signal 227 generated when the fast watchdog timer has timed out and the flip-flop is in the enabled or 1 state. Thus, during initial program load, the watchdog timer value is randomly set. Consequently there is no set number which is counted down from and if a low number is initially stored in the fast watchdog timer, it could time out prior to completion of initialization. The flip-flop 226 is thus put in series with the output 225 of the fast watchdog timer, preventing the alarm output 227 from being generated even if a timeout occurs, provided the flip-flop has not been armed. Once the initialization procedure has concluded, the number to be stored in the fast watchdog timer is presented to it through the program software and the flip-flop is armed; that is, placed in the enabled state so as to allow the output 225 of the fast watchdog timer to be presented as the alarm output 227 whenever a timeout condition occurs.

Furthermore, the number that the watchdog timer has stored in it after initialization is module-dependent. Different modules can require a different timeout period and thus a timer register with a particular value associated with that module is dumped into the fast watchdog timer register from an associated timer register 228. This requires that the write enable line 229 be disabled whenever the flip-flop 226 is in the armed or enabled state corresponding to logic 1. Thus a program error presenting a very large number to the fast watchdog timer is prevented once initialization has occurred.

Figure 36:
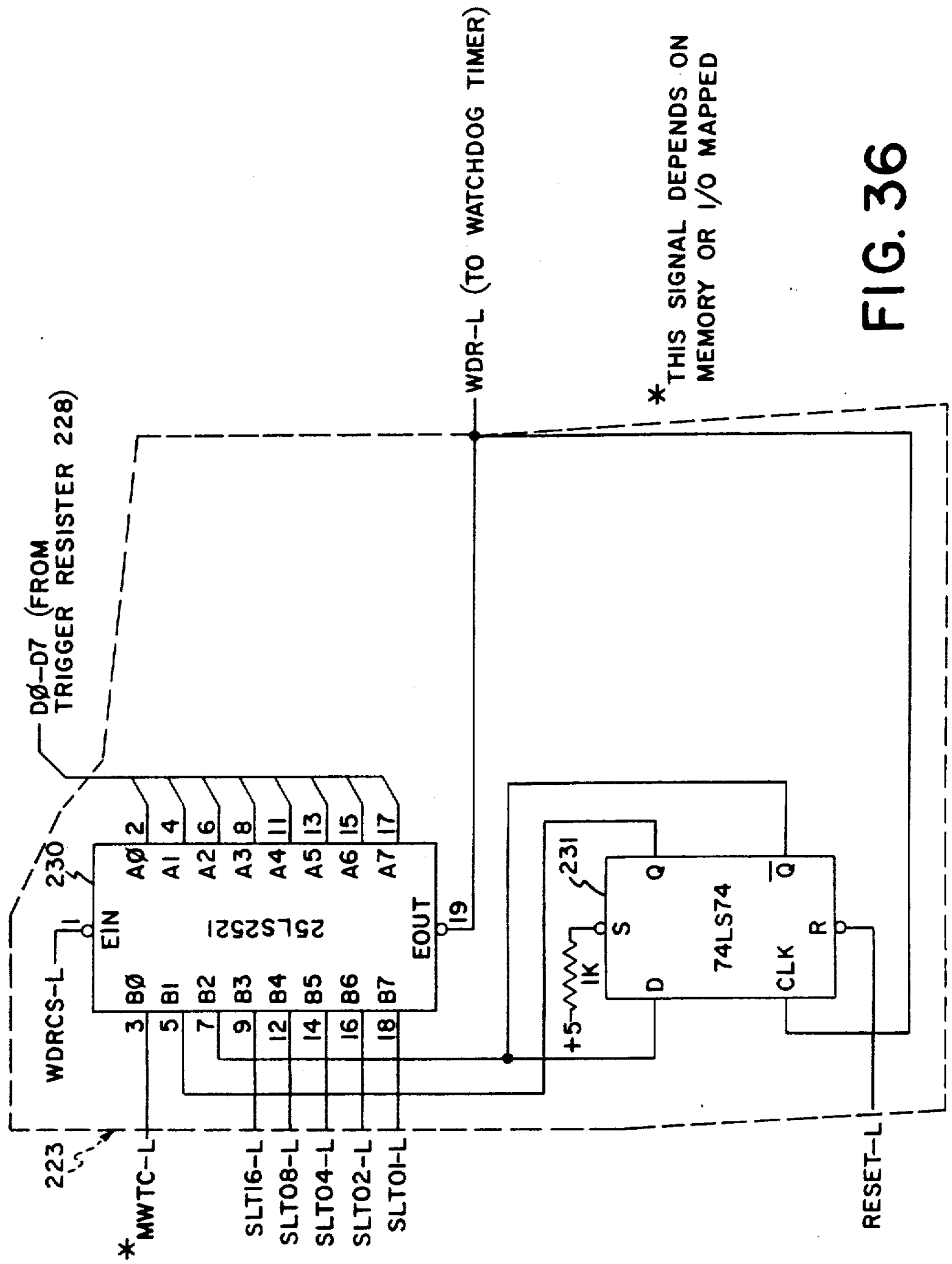
FIG. 36 is a schematic diagram of the fast watchdog timer circuitry.

As best seen in FIG. 36, the fast watchdog timer has a watchdog retrigger circuit 223 in turn comprising a comparator 230 and a flip-flop 231. This watchdog retrigger circuit keeps the watchdog timer from timing out provided that the CPU, address lines, data lines, and appropriate decoders are working properly. The system software writes at alternating intervals two different known data values to the comparator 230, wherein the data values are the slot numbers for the module on which the watchdog timer is resident and a 2-bit value from the flip-flop 231. This 2-bit value corresponds to the Q, Q-bar outputs from the flip-flop as transferred to inputs B1 and B2 of the comparator 230. The comparator also receives a MEMORY WRITE COMMAND (MWTC-L) on input B0 to complete the comparator 8-bit signal. If the comparison of this 8-bit number is equal to that set in the comparator from data lines D0–D7 (corresponding to comparator inputs A0–A7), the watchdog timer is re-started via the signal WDR-L. This signal is also used to clock flip-flop 231. The flip-flop alternates the Q and Q-bar outputs as presented to inputs B1 and B2 of the comparator. If the watchdog timer does not receive a restart signal WDR-L, then a non-maskable interrupt (NMI) is generated and presented to the central processing unit module 222, indicative of a failure.

Figure 37:
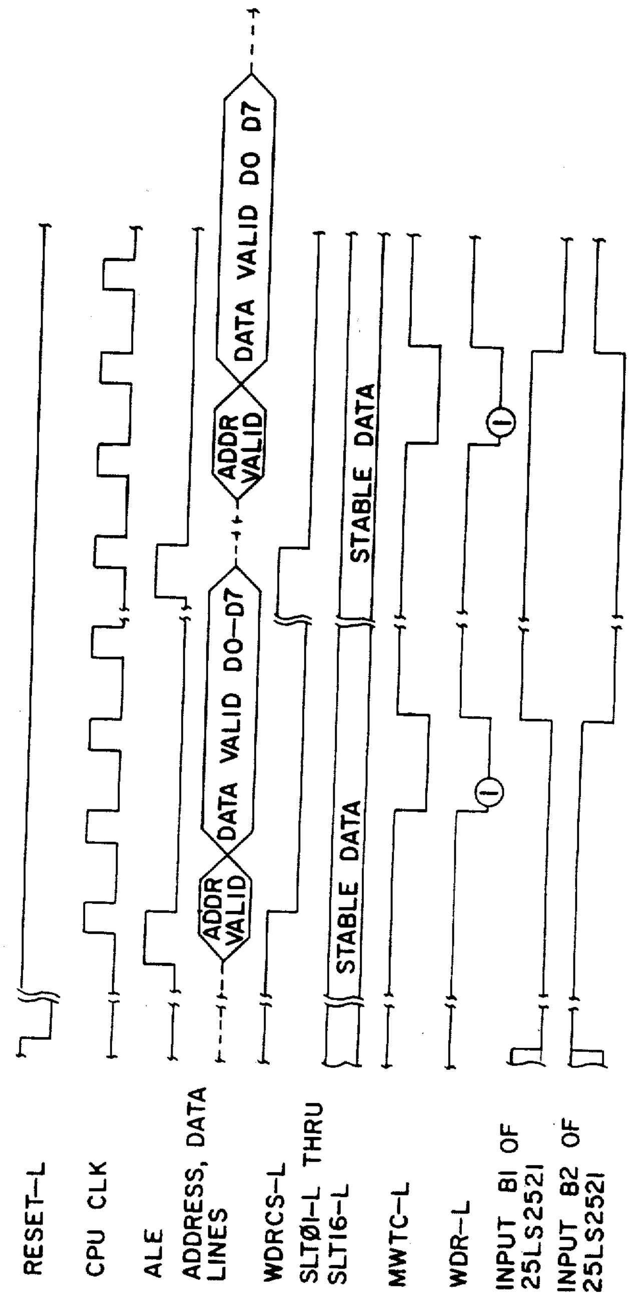
FIG. 37 is a timing diagram associated with the schematic shown in FIG. 36.

A timing diagram corresponding to the operation of the fast watchdog timer retrigger circuit is shown in FIG. 37.

A fast watchdog timer (FWDT) 57 is required in many real time control systems to sense processor inactivity. Should this timer elapse, it is indicative of a serious fault. A FWDT timeout triggers the following:

Non Maskable Interrupt (NMI)
Optoisolated output trigger an alarm
On board runlight
Global runlight
Reset to all 3 serial ports 46, 52 and 56.

The status of the CPU module FWDT can be read by another board through the bus status register 190 by performing an I/O read of the CPU address (see subsection entitled "Status Indications, I/O Address"). If data bit 5 is set, the FWDT has timed out. This allows another board to check the CPU module to determine if it is functional. The CPU module may also read the status of its own FWDT by performing an I/O read of address 44H. If data bit 7 is set, the FWDT has timed out.

As shown in FIG. 59, the FWDT comprises a programmable timer (Intel Corporation type 8253) which is set up for the desired time period durng initialiation. Hardware then disables any I/O writes to this timer so that the timer may not be changed in any way once initialization is complete. The timer is chained from another timer which runs off a 1 Mhz clock. The first timer is programmed in mode 3 to provide a square-wave input clock for the FWDT. The FWDT is programmed in mode 1 to provide a retriggerable one-shot. An I/O write to address B4H with the appropriate data pattern pulses the gate input to the FWDT and thus restarts the counter at its programmed value. The mechanism for setting and restarting the timer is described below. If the CPU is not executing its proper code or if some other failure occurs, the timer is not restarted, and the alarm and other error indicators are triggered. The CPU module can then choose to stop operation or may try to restart. The output of the timer is latched and remains timed out until restarted as described in the subsection entitled "Restarting The FWDT After A Timeout".

After reset, a read of the FWDT status from either the public bus or the on board status register indicates the FWDT has timed out. The FWDT is disabled from creating an NMI, from triggering the alarm output and from resetting the serial ports. Both runlights are off. The sequence for setting up and running the watchdog timer is as follows:

1. Setup the input clock to the FWDT to desired value. (see next subsection).
2. Setup the FWDT in Mode 1 for the correct period. (see next subsection).
3. Trigger the watchdog once by writing the correct data pattern to I/O port B4H. (see subsection entitled "Retriggering the Fast Watchdog Timer"). This turns on the runlights, clears the watchdog status bits and toggles the bits for the trigger data.
4. If timer 89 is to be disabled, wait 1 period of the input clock to the FWDT from the trigger and write to I/O port B0H with any data pattern. This disables the write to the timer and enables the alarm output and resets the serial ports. If the timer is not going to be disabled, I/O port B0H is not written to.
5. For no timeout, I/O port B4H is written to with an alternating data pattern once every watchdog period.
6. If a timeout occurs and the timer is not disabled, the following happens:

Get an NMI
Runlights go out
Status bits are set
No alarm is generated
No reset to serial ports If a timeout occurs and the timer is disabled, the following happens:

Get an NMI
Runlights go out
Status bits are set
Alarm output is turned on
Serial ports are reset 7. To restart after any timeout, write to I/O port B0H with any data pattern. (see subsection entitled "Restarting the FWDT After a Timeout"). Start from step 1.

SETTING THE FAST WATCHDOG TIMER

PIT 1, TIMER 0

Pit 1, Timer 0 is the clock which provides the input clock to the FWDT. This clock has a 1 Mhz input clock and thus may range from 2 to 65.5 microseconds. This clock is programmed in Mode 3 to provide a square wave input clock to the FWDT. The programming sequence to program this clock for a 20 microsecond period is:

| I/O ADDRESS | DATA | COMMENTS |
|---|---|---|
| 26 H | 36 H | Initialize Timer 0 for Mode 3 |
| 20 H | 14 H | LSB |
| 20 H | 00 H | MSB |

PIT 1, TIMER 1

PIT 1, Timer 1 is the fast watchdog timer. It is programmed in Mode 1 to provide a retriggerable one-shot. The FWDT may have a period from 4 microseconds to 1.192 hours, based on the PIT 1, Timer 0 output. To set the FWDT for a 200 millisecond period, a 20 microsecond input period is multiplied by 10,000=2710 hex. The programming sequence is:

| I/O ADDRESS | DATA | COMMENTS |
|---|---|---|
| 26 H | 72 H | Initialize Timer 1 for Mode 1 |
| 22 H | 10 H | LSB |
| 22 H | 27 H | MSB |

Restarting The FWDT After A Timeout

To restart the FWDT after a timeout, the timer (Intel counter 8253) must be re-enabled. This is done by performing an I/O write to address B0H to clear the FWDT latch. This re-enables writing to the counter if the FWDT has already timed out. This I/O write also turns off the alarm and releases the reset to the serial ports. The sequence for starting the watchdog is now identical to the sequence described above for setting the watchdog timer. Retriggering the FWDT then starts with the same data pattern as after a reset.

Soft Interrupt and Reset

A soft interrupt is achieved by the interrupting device performing an I/O write to the CPU module address (see subsection entitled "Status Indicators, I/O Address) with data equal to 01H. Before doing this I/O write, the board performing the soft interrupt must write to a predefined memory location to inform the CPU module who is interrupting it. The interrupt is latched and must be cleared by the soft interrupt service routine. If a second soft interrupt occurs before the first one is cleared, the PIC will not generate another interrupt to the CPU. Software clears the interrupt latch at the beginning of the interrupt service routine. Then the memory is checked to determine which boards interrupting with soft interrupts. An I/O write to address B2 H clears the soft interrupt latch.

A soft reset to the CPU module is latched and then cleared. An I/O write to the CPU module address with data equal to 02 H latches the reset line, putting the CPU module in an inactive state. The CPU module is left in the reset state for a minimum of 1.8 microseconds to satisfy the reset requirements of on board devices. To clear the reset and restart the CPU module, an I/O write to the same address is performed with data equal 03H. A status bit is available to allow the CPU module to determine whether the cause of its reset was a power up or a soft reset.

The hardware on the CPU module disables both the soft interrupt and the soft reset functions when the CPU module has control of the public bus. This is to insure that the CPU module does not interrupt or reset itself via this method.

Interrupts

The CPU module has 15 interrupt levels. As seen in FIG. 34, interrupts 220 are serviced with the use of two programmable interrupt controllers (PIC's) 233 and 234 in the master/slave configuration. Both PIC's are programmed as edge triggered and in non-buffered mode. The public bus hard interrupts are of the non-bus vectored interrupt type. This requires that the interrupt vector address be supplied by one of the on board PIC's and is not supplied by the public bus.

The following is an example of PIC programming.

Programming the Master PIC 233

The initialization for the master PIC is as follows:

| I/O ADDRESS | DATA | COMMENTS |
|---|---|---|
| 90 H | 11 H | ICW1- edge triggered, cascade mode |
| 92 H | 20 H | ICW2- interrupt vector address |
| 92 H | 80 H | ICW3- Slave Pic on interrupt line 7 |
| 92 H | 13 H | ICW4- special fully nested mode, non-buffered, auto E0I |

The operational control words are given in Table 64.

Programming The Slave PIC 234

The initialization for the slave PIC is as follows:

| I/O ADDRESS | DATA | COMMENTS |
|---|---|---|
| A0 H | 11H | ICW1 edge triggered, cascade mode |
| A2 H | 28 H | ICW2 Interrupt vector address |
| A2 H | 07 H | ICW3 slave ID |
| A2 H | 01 H | ICW4 non-buffered, normal E0I |

TABLE 64

OCW1 TABLE INTERRUPT MASKS

TABLE 64-continued

| Bit | |
|---|---|
| D0 | XACK TIMEOUT |
| D1 | HARD MEMORY ERROR |
| D2 | POWER FAIL |
| D3 | MPSC2 INTERRUPT |
| D4 | MPSC1 INTERRUPT |
| D5 | PROGRAMMABLE TIMER |
| D6 | PUBLIC BUS INTERRUPT 2 |
| D7 | SLAVE PIC |

| I/O ADDRESS | DATA | COMMENTS |
|---|---|---|
| 92 H | As required from OCW1 Table | OCW1- 1 = mask interrupt 0 = enable interrupt |
| 90 H | 80 H | OCW2- Rotate on automatic EOI |
| 90 H | 08 H | OCW3- vectored mode |

The operational control words are given Table 65.

Priority

The vector addresses for the interrupts as specified above by ICW2 for the master and slave PIC's is shown in Table 66. Locations 00H through 7FH are reserved by the chip manufacturer (Intel Corporation) and are not used.

Communications and ASR Registers

Two Intel Corporation 8255A chips are used for reading and writing communications status and for setting the Address Segment Register. The chips are first initialized as follows:

| I/O ADDRESS | DATA | COMMENTS |
|---|---|---|
| 46 H | 8B H | PPI0 Port A - Output Address Segment Register Port B - Input Communication Status 1 Port C - Input Communication Status 2 |
| 56 H | 80 H | PPI1: Port A - Output Communication Control 1 Port B - Output Communication Control 2 Port C - Output Communication Control 3 |

The bit structures of the six ports are presented in Table 67.

TABLE 65

OCW1 TABLE INTERRUPT MASKS

| Bit | |
|---|---|
| D0 | FAST REALTIME CLOCK |
| D1 | PUBLIC BUS INTERRUPT 3 |
| D2 | SLOW REAL TIME CLOCK |
| D3 | PUBLIC BUS INTERRUPT 4 |
| D4 | PUBLIC BUS SOFT INTERRUPT |
| D5 | 8087 (NDP) |
| D6 | MEMORY MODULE SOFT MEMORY ERROR |
| D7 | RING INDICATOR |

| I/O ADDRESS | DATA | COMMENTS |
|---|---|---|
| A2 H | As required from OCW1 table | OCW1- 0 = enable interrupt 1 = disable |

TABLE 65-continued

| | | | |
|---|---|---|---|
| A0 H | 20 H | OCW2- | interrupt non-specific EOI, sent at end of interrupt service routine |
| A0 H | 08 H | OCW3- | vectored mode |

TABLE 66

| | | |
|---|---|---|
| MASTER PIC | | |
| IRO - 80H | = | XACK TIMEOUT |
| IR1 - 84H | = | HARD MEMORY ERROR |
| IR2 - 88H | = | POWER FAIL |
| IR3 - 8CH | = | MPSC2 INTERRUPT |
| IR4 - 90H | = | MPSC1 INTERRUPT |
| IR5 - 94H | = | PROGRAMMABLE TIMER |
| IR6 - 98H | = | PUBLIC BUS INTERRUPT 2 |
| IR7 - See slave PIC priority | | |
| SLAVE PIC | | |
| IRO - AOH | = | FAST REALTIME CLOCK |
| IR1 - A4H | = | PUBLIC BUS INTERRUPT 3 |

TABLE 66-continued

| | | |
|---|---|---|
| IR2 - A8H | = | SLOW REALTIME CLOCK |
| IR3 - ACH | = | PUBLIC BUS INTERRUPT 4 |
| IR4 - BOH | = | PUBLIC BUS SOFT INTERRUPT (SEE NOTE 1) |
| IR5 - B4H | = | (NDP) |
| IR6 - B8H | = | MEMORY MODULE SOFT MEMORY ERROR |
| IR7 - BCH | = | RING INDICATOR |

Note 1:
Soft interrupts are achieved by the interrupting device performing an I/O write to the specified I/O address and having data equal to 01H.

TABLE 67

PPI0: PORT A

| I/O ADDRESS | D7 | D6 | D5 | D4 | D3 | D2 | D1 | D0 |
|---|---|---|---|---|---|---|---|---|
| 40 H | ASR13 | ASR12 | ASR11 | ASR10 | ASR0F | ASR0E | ASR0D | ASR0C |

PPI0: PORT B

| I/O ADDRESS | D7 | D6 | D5 | D4 | D3 | D2 | D1 | D0 |
|---|---|---|---|---|---|---|---|---|
| 42 H | | SQC-L | SQB-L | SQA-L | 0 | DSRC-L | DSRB-L | DSRA-L |

D7 — MEMORY MODULE ENABLE-H
0=NO MEMORY MODULE PRIVATE PORT PRESENT
1= MEMORY MODULE PRIVATE PORT PRESENT

PPI0: PORT C

I/O ADDRESS 44 H

- D0 — RINGA-L
- D1 — RINGB-L
- D2 — RINGC-L
- D3 — 8087-H; 0=NO 8087; 1=8087
- D4 — 8MHZ ENABLE-L; 0=8 MHZ; 1=5 MHZ
- D5 — DIAGNOSTIC 1; See section 4.1.6
- D6 — DIAGNOSTIC 2; See section 4.1.6
- D7 — FAST WDT STATUS; 0=OK; 1=TIMED OUT

PPI1: PORT A

I/O ADDRESS 50 H

- D0 — CH A BAUD SELECT
- D1 — CH B BAUD SELECT
- D2 — CH C BAUD SELECT; 0 = ON BOARD; 1 = OFF BOARD
- D3 — NOT USED
- D4 — CH A RATE SELECT
- D5 — CH B RATE SELECT
- D6 — CH C RATE SELECT; 0=HIGHER DATA RATE; 1=FALL BACK DATA RATE
- D7 — NOT USED

PPI1: PORT B

TABLE 67-continued

I/O ADDRESS 52 H

| Bit | Function |
|---|---|
| D0 | CH A ON BOARD LOOPBACK |
| D1 | CH B ON BOARD LOOPBACK |
| D2 | CH C ON BOARD LOOPBACK<br>0 = DISABLED<br>1 = ENABLED |
| D3 | NOT USED |
| D4 | CH A DIGITAL LOOPBACK |
| D5 | CH B DIGITAL LOOPBACK |
| D6 | CH C DIGITAL LOOPBACK<br>0=DISABLED<br>1=ENABLED |
| D7 | NOT USED |

PPI1: PORT C

I/O ADDRESS 54 H

| Bit | Function |
|---|---|
| D0 | CH A ANALOG LOOPBACK |
| D1 | CH B ANALOG LOOPBACK |
| D2 | CH C ANALOG LOOPBACK<br>0 = DISABLED<br>1 = ENABLED |
| D3 | NOT USED |
| D4 | NOT USED |
| D5 | NOT USED |
| D6 | NOT USED |
| D7 | NOT USED |

Multi Protocol Serial Ports (MPSC)

Three RS 232 serial ports 46, 52 and 56 are provided on the CPU module. The ports are DTE and support modem controls as well as testability features. They support communications at rates up to 19.2K baud. Transmit and receive clocks can be generated via an on board baud rate generator. Software defines how the communications ports are configured. Any one of the three ports may be used for auto-dial operation, provided the external dialing mechanism interfaces to an RS-232 port. Ring indication, data set ready, and signal quality are provided but not via the communications device itself. An interrupt is generated on a ring from any channel. All three signals can be read via an external register so that the software can detect their presence or absence.

The dual channel USINART is capable of handling asynchronous and synchronous byte oriented protocol such as IBM Bisync, and synchronous bit-oriented protocols such as HDLC and IBM SDLC. The ports have the facilities for modem controls in both channels, can generate and check CRC codes in any synchronous mode, and can be programmed to check data integrity in various modes.

The MPSC has several modes of operation. In addition, it has two channels. The channels are identical in every respect, except Channel A write register 2 establishes system configuration and Channel B write register 2 holds the vectored interrupt address. Channels A and B of MPSC1 are referred to as channels A and B. Channels A and B of MPSC2 are referred to as channels C and D. Channel D is only used for the interrupt vector in Register 2.

There are 8 write registers and 3 read registers in each channel. Register 2 of channels A and C is programmed with non-vectored interrupts and both channels are non-DMA. Register 1 of Channels B and D is programmed with a status vector. All other registers are programmed in accordance with the port mode of operation. Refer to the MPSC specification (reference J) for programming details. The I/O addresses for the MPSC are:

| | |
|---|---|
| Channel A data | 70 H |
| Channel A control | 72 H |
| Channel B data | 74 H |
| Channel B control | 76 H |
| Channel C data | 00 H |
| Channel C control | 02 H |
| Channel D data | 04 H |
| Channel D contrl | 06 H |

Handling an MPSC Interrupt

The master PIC vectors the program to the MPSC interrupt service routine. This routine reads register 2 of channel B or D to determine the nature of the interrupt. Three bits in this register change to indicate the cause of the interrupt. The sequence for doing this in channel B is presented in Table 68.

Loop Back

Both local and remote loop back are supported on the CPU module. Local loop back consists of two levels under software control. The first is an on-board loop back which wraps transmit data to receive data along with various control signals. This loop back does not check the communication line drivers and receivers.

The second form of local loop back is a modem signal to indicate to a modem that a test of the on board drivers, receivers and physical connection is to be accomplished. The modem actually does all the looping required, therefore testing the integrity of the connection.

Remote loop back is also a modem signal which indicates the complete physical link is to be verified (analog test). This signal verifies the integrity from the communications interface to the terminating interface (from DCE to DTE or DTE to DTE). Note that the last two forms of loop back are only performed if the modem has loop back capability.

TABLE 68

| I/O ADDRESS | DATA | | | | COMMENTS |
|---|---|---|---|---|---|
| 76 H | Write 02 H | | | | Pointer 2 |
| 76 H | D7 D6 D5 D4 D3 | D2 | D1 | D0 | Read Reg. 2 |
| | x x x x x | 0 | 0 | 0 | Ch B Tx Buffer Empty |
| | These 5 bits are set during Channel B or D Reg. 2 programming | 0 | 0 | 1 | Ch B External/Status Change |
| | | 0 | 1 | 0 | Ch B Rx Character Available |
| | | 0 | 1 | 1 | Ch B Special Rx Condition |
| | | 1 | 0 | 0 | Ch A Tx Buffer Empty |
| | | 1 | 0 | 1 | Ch A External/Status Change |
| | | 1 | 1 | 0 | Ch A Rx Character Available |
| | | 1 | 1 | 1 | Ch A Special Rx Condition OR No Interrupt Pending- Ch A - Reg. 0 must be read to check interrupt pending bit. If this bit is set, Ch A Special Rx Condition is the cause of the interrupt. |

INTERPRETATION OF INTERRUPTS

| | |
|---|---|
| Rx CHARACTER AVAILABLE | One or more characters in buffer |
| Tx BUFFER EMPTY | Indicates transmitter has no more data to send. If no more data is to be sent, a Reset Pending Transmitter Interrupt must be sent to Reg. 0. |
| EXTERNAL/STATUS CHANGE | Read Reg. 0 to determine which external/status changes occurred |
| DCD | A zero indicates that DCD went high during reception of a character |
| CTS | A zero indicates CTS went high during transmissions of a character |
| SPECIAL RECEIVE CONDITION | Read Reg. 1 to determine which condition occurred |
| PARITY ERROR | Parity not correct on received data |
| Rx OVERRUN | Data was not removed from Rx buffer before it filled and overflowed |
| FRAMING ERROR | Received character length incorrect |

To exit from an interrupt in either channel, an EOI must be sent to Channel A of that MPSC. This clears the interrupt-in-service latch of the MPSC.

| I/O ADDRESS | WRITE DATA | COMMENTS |
|---|---|---|
| 72 H | 38 H | Return from interrupt |

Table 69 describes the I/O port address and bit assignments for each form of the loop back.

Baud Rate Generation

As seen in FIG. 34, baud rate generation may come from two sources, an on board baud rate generator (clock) or externally from a modem or a data communications source (DCE). Software has the option of selecting on or off board baud rates. If software selects on board baud operation, both the transmit and receive clocks have the same frequency.

To select on or off board baud rate clocks, I/O port 50H is written to as set forth in Table 70.

Tables 71 and 72 show the frequencies required for standard baud rates. Refer to the "baud rate clocks" subsection for details on setting the on-board baud rate clocks. An internal divide by 16 is programmed into the MPSC for asynchronous transmission.

Fall Back Data Rates (Auto Baud Select)

A fall back data rate option is provided for each port. This signal notifies a modem to enable its fall back data rate, usually a slower speed. A logic 0 written to these fall back lines enables the higher data rate as per the RS 232 specification. Table 73 illustrates the I/O address and bit assignment for each channel.

Ring Indicators

A ring indicator for auto answer ports is provided for each of the three serial ports. When a "ring" signal is present on any of the three ports, an interrupt to the on board processor is generated. Software then reads I/O Address 44H, bits 0–2, to determine which of the three ports caused the interrupt. Any one of the three or all of the three may have caused the interrupt. Software remembers which one(s) caused the interrupt. Next, a timer is started to determine if a second "ring" signal arrives. The timer is programmed to expire after 200 milliseconds. If the timer expires, the process is aborted and set up for a new sequence of ring indication. If a second ring interrupt occurs for the same channel before the 200 millisecond timeout, then it is a valid call coming in from the auto dial mechanism and the CPU module therefore responds. Table 74 lists the I/O address and bit assignment for the ring indicators.

TABLE 69

PPI1: PORT B

I/O ADDRESS 52 H

| Bit | Assignment |
|---|---|
| D0 | CH A ON BOARD LOOPBACK |
| D1 | CH B ON BOARD LOOPBACK |
| D2 | CH C ON BOARD LOOPBACK<br>0 = DISABLED<br>1 = ENABLED |
| D3 | NOT USED |
| D4 | CH A DIGITAL LOOPBACK |
| D5 | CH B DIGITAL LOOPBACK |
| D6 | CH C DIGITAL LOOPBACK<br>0 = DISABLED<br>1 = ENABLED |
| D7 | NOT USED |

PPI1: PORT C

I/O ADDRESS 54 H

| Bit | Assignment |
|---|---|
| D0 | CH A ANALOG LOOPBACK |
| D1 | CH B ANALOG LOOPBACK |
| D2 | CH C ANALOG LOOPBACK<br>0 = DISABLED<br>1 = ENABLED |
| D3 | NOT USED |
| D4 | NOT USED |
| D5 | NOT USED |
| D6 | NOT USED |
| D7 | NOT USED |

TABLE 70

PPI1: PORT A

I/O ADDRESS 50 H

| Bit | Assignment |
|---|---|
| D0 | CH A BAUD SELECT |
| D1 | CH B BAUD SELECT |
| D2 | CH C BAUD SELECT<br>0 = ON BOARD<br>1 = OFF BOARD |
| D3 | NOT USED |
| D4 | CH A RATE SELECT |
| D5 | CH B RATE SELECT |
| D6 | CH C RATE SELECT |
| D7 | NOT USED |

TABLE 71

ASYNCHRONOUS TABLE

| BAUD RATE | FREQUENCY | DIVIDE DEC | DIVIDE HEX |
|---|---|---|---|
| 19,200 | 307,200 | 4 | 00 , 04 |
| 9,600 | 153,600 | 8 | 00 , 08 |
| 7,200 | 115,200 | 11 | 00 , 0B |
| 4,800 | 76,800 | 16 | 00 , 10 |
| 3,600 | 57,600 | 21 | 00 , 15 |
| 2,400 | 38,400 | 32 | 00 , 20 |
| 2,000 | 32,000 | 38 | 00 , 26 |
| 1,800 | 28,800 | 43 | 00 , 2B |
| 1,200 | 19,200 | 64 | 00 , 40 |
| 600 | 9,600 | 128 | 00 , 80 |
| 300 | 4,800 | 256 | 01 , 00 |
| 150 | 2,400 | 512 | 02 , 00 |
| 134 | 2,144 | 573 | 02 , 3D |
| 110 | 1,760 | 700 | 02 , BC |
| 100 | 1,600 | 768 | 03 , 00 |
| 75 | 1,200 | 1028 | 04 , 00 |
| 50 | 800 | 1536 | 06 , 00 |
| 10 | 160 | 7680 | 1E , 00 |

TABLE 72

SYNCHRONOUS TABLE

| BAUD RATE | FREQUENCY | DIVIDE DEC | DIVIDE HEX |
|---|---|---|---|
| 19,200 | 19,200 | 64 | 00 , 40 |
| 9,600 | 9,600 | 128 | 00 , 80 |

TABLE 73

PPI1: PORT A

I/O ADDRESS

50 H

| Bit | Function |
|---|---|
| D0 | CH A BAUD SELECT |
| D1 | CH B BAUD SELECT |
| D2 | CH C BAUD SELECT |
| D3 | NOT USED |
| D4 | CH A RATE SELECT |
| D5 | CH B RATE SELECT |
| D6 | CH C RATE SELECT 0=HIGHER DATA RATE 1=FALL BACK DATA RATE |
| D7 | NOT USED |

TABLE 74

I/O ADDRESS

44 H

| Bit | Function |
|---|---|
| D0 | CHANNEL A |
| D1 | CHANNEL B |
| D2 | CHANNEL C 1 = Ring Present |
| D3 | 8087-H |
| D4 | 8 MHz ENABLE-L |
| D5 | DIAGNOSTIC 1 |
| D6 | DIAGNOSTIC 2 |
| D7 | FAST WDT STATUS |

Signal Quality and Data Set Ready

For each of the three serial ports, a data set ready and signal quality signal is provided. Signal quality verifies the quality of the signal coming into the communications interface. A logic "1" for this signal indicates a high probability of error and data transmissions may not be acceptable. Signal quality is latched such that if the signal ever goes to a logic "1", it remains at this state until cleared by software. All three signal quality lines are cleared by an I/O write to adress B6 H. This provides the capability for clearing signal quality at the beginning of a transmission and then verifying that the signal quality line remains at a logic "0" throughout the transmission.

Data Set Ready indicates that the local data communications equipment is connected and any timing functions are established. A logic "0" on this line indicates an active signal. Both signal quality and Data Set Ready are polled by software. Table 75 lists the I/O address and bit assignment for the serial channels.

Baud Rate Clocks

Timers 1, 2 and 3 provide the on board baud rate clocks for the MPSCs. These clocks have an input frequency of 1228.8 KHZ. The timers are programmed in mode 3 to provide a square wave output, with the data used set forth in Tables 71 and 72. Table 76 presents the I/O addresses used to program these clocks.

TABLE 75

I/O ADDRESS

42H

TABLE 75-continued

| Bit | Function |
|---|---|
| D0 | DATA SET READY A |
| D1 | B |
| D2 | C |
| D3 | NOT USED |
| D4 | SIGNAL QUALITY A |
| D5 | B |
| D6 | C |
| D7 | MODMEM ENABLE-H |

TABLE 76

| | I/O ADDRESS |
|---|---|
| CHANNEL A | |
| Command | 66 H |
| Data | 60 H |
| CHANNEL B | |
| Command | 66 H |
| Data | 62 H |
| CHANNEL C | |
| Command | 66 H |
| Data | 64 H |

The following example shows the sequence for programming Channel A with 110 baud in the Asynchronous mode.

| I/O ADDRESS | DATA | COMMENTS |
|---|---|---|
| 66 H | 36 H | Initialize Timer 0 to Mode 3 |
| 60 H | BC H | LSB |
| 60 H | 02 H | MSB |

Bus Arbitration Module 221

A description of the bus arbitration module for the CPU module and other modules is provided in the Overall Bus section.

Address Segment Register

The address segment register is an 8-bit read/write register that is used to extend the CPU module's 20 address lines to 24 address lines on the public bus. On board operations only use the CPU module's 20-bit address lines. The address segment register also allows the CPU module to access the total 16 megabyte of off-board memory (see section on MMI architecture).

All memory operations that are not accessing onboard devices or the private port to RAM are decoded as off-board (see subsection entitled "Interface Requirements, CPU Memory and I/O Map"). Additionally, off-board addresses E0000–EFFFFH are used as a "window" to place the 8 bits from the address segment register on the public bus along with the lower 16 address bits from the CPU. When the CPU module is configured such that it accesses memory module RAM via the private port, all public bus memory operations use the Address Segment Register. When the CPU is configured without a memory module, the lower 896K bytes of CPU memory space are decoded as off-board. For all off-board operations not in the window, the 24 bit public bus address consists of the full 20-bit CPU address and all zeros in the top 4 bits. Thus any megabyte of the available 16 megabytes of off-board memory may be accessed with the address segment register, while only the bottom megabyte minus the on-board or private port addresses may be accessed without the address segment register.

The address segment register is loaded by the CPU and is treated as a single 8-bit port which is I/O mapped at address 40H. The off-board memory is thus broken into 256 pages (each page containing 64K bytes) with the address segment register containing the page and the 16 least significant address bits from the CPU providing the remainder of the address. The following steps are performed to write to off-board memory loction ADFE20H.

| ADDRESS | DATA | COMMENTS |
|---|---|---|
| 40H - I/O WRITE | ADH | SET ASR WITH 8 MSB |
| EFE20 H-MEM write | XX | "Dummy" write to window and 16 LSB |

Private Port 45 to Memory Module 24 RAM

As shown in FIGS. 1 and 34, the CPU module has a private port 45 which allows it to access up to 896 kilobytes of RAM without arbitration for the private bus. Addresses 00000 H through DFFFF H access the dual-ported memory module if one is in the adjacent MMI slot (see FIG. 2). Otherwise this memory block accesses the public bus. The CPU module may read I/O port 42H to determine if a memory module board is present. A HI at data bit 7 indicates the presence of the memory module. The memory module can have up to 1 megabyte of memory space, using 64K DRAM's. The memory module must reside next to the CPU module in order to connect the two via the private port. The private port connections are in pairs slot 0 - slot 1, slot 2 - slot 3, etc. Connection to the memory module private port is via the standard public bus connector. The pinout of the connector is detailed in the subsection entitled "Connector, Bus 93".

When addressed by the CPU, addresses begin at 0000 and continue until the highest stuffed location. An I/O port on the memory module can be read to determine the memory size. READY is not returned to the CPU if the addressed location does not exist. Memory beings at 0000 in order to guarantee sufficient memory space for interrupt vectors.

Interrupt vectors are stored in the bottom 1K of the processor's memory space. When addressed by the public bus, memory module addresses begin at arbitrary locations. The start address lies on a 1 megabyte boundary of the 16 megabyte address space. The start address of a memory module can be read through an I/O port on the board.

Memory Arbitration

Access to the memory is awarded on a rotating priority basis. Refresh always has the highest priority in accessing the memory. When a refresh cycle is requested by the on-board timer, it is always granted within 571 nanoseconds (one cycle time).

If the CPU requests access, and the public bus is not requesting access, then a cycle is granted to the CPU. If the public bus requests access and the CPU is not requesting access, then a memory cycle is granted to the public bus. If both the CPU and the memory bus request cycles, they are granted cycles on a "round robin" basis.

Round-Robin priority works as follows: REFRESH cycles always are highest priority. Sometimes the CPU is second priority and public bus is third priority, and sometimes the public bus is second priority and the CPU is third priority. This technique guarantees that the longest any user must wait is two cycle times (the first for a possible refresh, the second for the other user). Note that this arbitration scheme affects the function of a public bus 'LOCK'. If the CPU is checking or setting semaphores in the memory module memory, it uses its address extension register and the public bus port to the memory board to perform this function.

Cycle Time

Memory cycle time is 571 nanoseconds for all cycles:

A. REFRESH

B. WRITE

C. READ

This speed results in one wait state for a 5 MHz CPU and two wait states for an 8 MHz CPU.

Latency is defined as the time that passes between the request for a cycle by the CPU or public bus and the granting of the request. If no other cycles are pending, the latency is no more than 95 nanoseconds. If another cycle is executing when the request is made, then the maximum wait time is 571 nanoseconds. If refresh is executing and a hither priority cycle is pending, then the maximum latency is 1,000 nanoseconds. Note that this last case can happen no more than 3% of the time.

Error Detection and Correction

The memory module can be configured for either error detection using one parity bit per word, or it can be configured for error detection and correction using a modified Hamming code using six bits per word.

Parity guarantees detection of a single error per word. If there are multiple errors per word, it is possible that no error detection will take place. Upon detection of a parity error, an interrupt is generated to the port requesting the memory operation.

The user of Hamming codes provides the capability to correct all single errors and detect all double errors in a word. When a single error occurs in any cycle, the hardware automatically corrects the data. The occurrence of a correction is logged in the ERROR LOG counter. Corrections are executed but not logged when they occur during a refresh cycle. The correction is invisible to the CPU or public bus. When a double bit error per word occurs, an interrupt is generated to the port which caused the error. If double bit errors occur during a refresh cycle, the interrupt is routed to the CPU.

Interrupts

The memory module provides two interrupt lines to the CPU via the private memory port. Memory module interrupts are only enabled to create an interrupt to the CPU when the CPU is accessing the memory.

The first interrupt is a hard memory error caused by:

A. Any double error being detected (only if the board is configured for ECC).

B. Parity error (only if the board is configured for detecting parity errors).

This interrupt is 'ORed' with the public bus memory error interrupt to produce an interrupt to the PIC. The second interrupt is caused by:

A. 255 errors being accumulated in the Error Log counter (only if the board is configured for ECC).

I/O LOCATIONS

Private Port

There is one port on the memory module addressable only via the private CPU port. This is a write-only, 8 bit port which is located at I/O address 80H. This port is used to set the fence boundary for the area of memory which is not accessible by the public bus. The actual address of the fence is the value written into the fence register shifted left 12 bits so that the address falls on a 4K boundary. Details on the fence for partitioning the memory module's memory into private memory and shared memory is presented in the memory module 24 section.

Public Port

There are three 8-bit read registers and one 8-bit write register on the memory module accessible only via the public bus. The I/O adresses at which they reside, in keeping with all public bus cards, is governed by the slot in which the card sits, as described later. The addresses and usage of these registers are given below:

| I/O Address | Read/Write | Comments |
|---|---|---|
| FXXOH | READ | Memory size and card ID |
| FXX2H | READ | Soft error count |
| FXX4H | READ | Error flags and base address |
| FXXOH | WRITE | Error and Check flag set and/or reset |

cl BUS INTERFACE

The CPU module bus interface is in accordance with the public bus specification. The bus interface is a connector to a connector interface. The CPU module bus features a 24 bit address bus, a 16 bit data bus (byte swap), five hard interrupts, INIT signal, and BUS CLK, CONSTANT CLK and TOKEN (BATON START) drive capability. All signals on the bus must meet the required drive capability as specified in the public bus specification.

To determine which BCLK is needed, the following formula is used:

$$\text{BCLK period } 111\ ns+(N-1)(11)ns+M(18)ns$$

where

N = # of arbiters in system

M = total # of empty slots

The periods of the available BCLK's are given below:

| BCLK FREQUENCY | PERIOD |
|---|---|
| 2.4576 MHz | 406.9 ns |
| 4.9152 MHz | 203.5 ns |
| 9.8304 MHz | 101.7 ns |

STATUS INDICATORS

Three ports of an Intel 8255A, PPI2 are used to read and write status information. Port A is a read only port which reads the slot lines used for the CPU I/O address as shown below and reads the cause of an XACK Timeout or a reset. Ports B and C contain the error status bits set by the CPU when it determines an error. These bits can be read over the public bus and can drive light emitting diodes (LED's). The 8255 is initialized as shown in Table 77.

TABLE 77

| I/O Address | Data | Comments | |
|---|---|---|---|
| 36 H | 90 H | PPI2: | |
| | | Port A - | Input Slot lines, Status |
| | | Port B - | Output Error Status Register 2 |
| | | Port C - | Output Error Status Register 1 |

PPI2: PORT A

Port A is a read only port located at I/O address 30 H with the bit assignments as follows.

- D7 — Reset Status: 0 = Power Up Reset; 1 = Soft Reset
- D6 — Hard Error Status: 0 = No hard errors; 1 = Hard error occurred
- D5 — Not used
- D4 — SLT16
- D3 — SLT08
- D2 — SLT04
- D1 — SLT02
- D0 — SLT01

PPI2: PORT B

Port B is a read/write port located at I/O address 32 H and contains the following error bits.

- D0 — Status Bit B
- D1 — Status Bit C
- D2 — Status Bit D
- D3 — Status Bit E
- D4 — Status Bit F
- D5 — LED 4 - Self Test Error 2
- D6 — LED 3 - Self Test Error 1
- D7 — Not used

PORT C

Port C is a read/write port located at I/O address 34 H and contains the following error bits.

- D0 — Self Test Error
- D1 — Status Bit 7
- D2 — Status Bit 8
- D3 — Status Bit 9
- D4 — Status Bit A
- D5 — Xack Timeout Clear
- D6 — Not used
- D7 — Not used

I/O Address

The CPU's I/O address indicates which slot in the backplane and which rack the board occupies. The CPU's initialization routine reads the slot lines through Port A of the 8255A as described above to determine its full address. Note that the slot lines read at Port A are low true and are inverted to form the CPU's I/O address. The I/O address for a CPU board is:

| PUBLIC BUS ADDRESS BITS | CPU I/O ADDRESS BITS |
|---|---|
| OF | 1 |
| OE | 1 |
| OD | 1 |
| OC | 1 |
| OB | 1 |
| OA | 1 |
| 09 | 1 |
| 08 | SLT16-H (RACK NUMBER) |

-continued

| PUBLIC BUS ADDRESS BITS | CPU I/O ADDRESS BITS |
|---|---|
| 07 | SLT08-H |
| 06 | SLT04-H |
| 05 | SLT02-H |
| 04 | SLT01-H |
| 03 | 0 |
| 02 | 0 |
| 01 | 0 |
| 00 | 0 |

This gives an I/O address in the range FEOO to FFFO H.

BUS STATUS REGISTER

Sixteen status bits are provided that can be read by another device on the public bus by performing an I/O read to the CPU's I/O address as shown above. The sixteen bits are defined as follows:

| | |
|---|---|
| DAT 4–DAT 0 | Device Number CPU = 01H |
| DAT 5 | FWDT Status |
| DAT 6 | Self Test error |
| DAT 7 | Status Bit 7 |
| DAT 8 | Status Bit 8 |
| DAT 9 | Status Bit 9 |
| DAT A | Status Bit A |
| DAT B | Status Bit B |
| DAT C | Status Bit C |
| DAT D | Status Bit D |
| DAT E | Status Bit E |
| DAT F | Status Bit F |

Status bit DAT 6 is an error indicator which indicates that the diagnostics found an error if it is set to a 1. Bits 7 through F are general purpose bits that can be used to report diagnostic information and other status information. The software sets these bits through the error status registers in Ports B and C of the status 8255. Each port can be set by doing an I/O write to the appropriate address. The bits in Port C can also be set and reset individually. Individual bit programming is performed by doing an I/O write to address 36H with data as follows:

| D7 | D6 | D5 | D4 | D3 D2 D1 | D0 |
|---|---|---|---|---|---|
| 0 | 0 | 0 | 0 | 0–7 indicates which bit is to be Set/Cleared. | 0 = Clear bit<br>1 = Set bit |

Refer to reference C for further explanation of the 8255A Port C operation.

LED's

Four LED's 49–51 (see FIGURE ") are provided to indicate board status. The functions of these LED's are as follows:

| | |
|---|---|
| LED 1 - Fast watch Dog Timer Timeout (Runlight) | ON = OK<br>OFF = Timed Out |
| LED 2 - Bus Master (Based on the system address enable (SAEN-L) line) | ON = CPU is master of public bus.<br>OFF = CPU is not master of public bus. |
| LED 3 - Self Test Error 1 (Set through Port B of 8255A-PPI2) | Light pattern used to indicate which error found. |
| LED 4 - Self Test Error 2 (Set through Port B of 8255A-PPI2) | Light pattern used to indicate which error found. |

GLOBAL STATUS LINES

Four status lines are available on the public bus to indicate status of the entire system. They are open collector and may be driven by any board. These four lines drive LED's on the front panel of the system (see FIG. 3).

STAT 1 is a self test error line. The self test error line (PPI2-Port C) that drives DAT 6 of the bus status register also drives this line. The light for this status line turns on when any board in the system encounters a self test error.

STAT 2 is defined as a FWDT timeout line. This line drives a runlight which goes out when any board in the system has a FWDT timeout.

STAT 3 is undefined and is not driven by the CPU.

STAT 4 is undefined and is not driven by the CPU.

DIAGNOSTICS

The CPU board uses 4K bytes of RAM for diagnostic purposes. The RAM resides at location FOOOO--FOFFF H.

Two lines are provided on the public bus to indicate which type of diagnostics is being performed. These lines can be read through PPI0, Port C. Bits 5 and 6 are the diagnostic lines 1 and 2, respectively. The actual meaning of these lines is shown below:

| DIAG 2 | DIAG 1 | |
|---|---|---|
| 0 | 0 | NORMAL MODE - on power up, one pass of confidence test is done and control is passed to the Operating System. |
| 0 | 1 | System Diagnostics |
| 1 | 0 | Service Center Remote Diagnostics |
| 1 | 1 | Loop on Confidence Test |

INTERFACE REQUIREMENTS

Connectors

Figure 77:
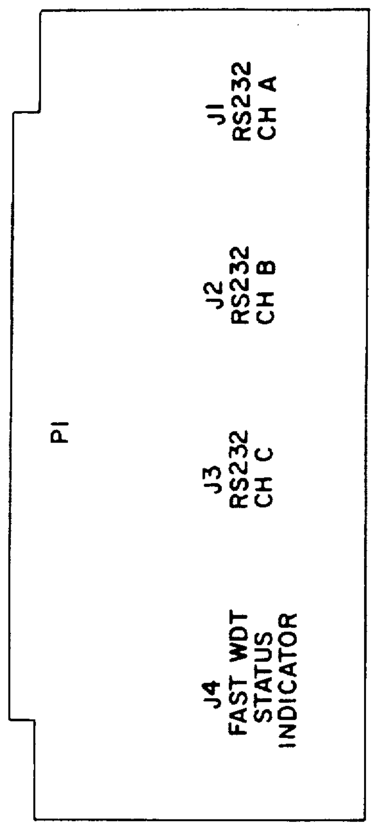
FIG. 77 is a block diagram of the connectors between the CPU module and the fast watchdog timer and serial ports.
Figure 78A:
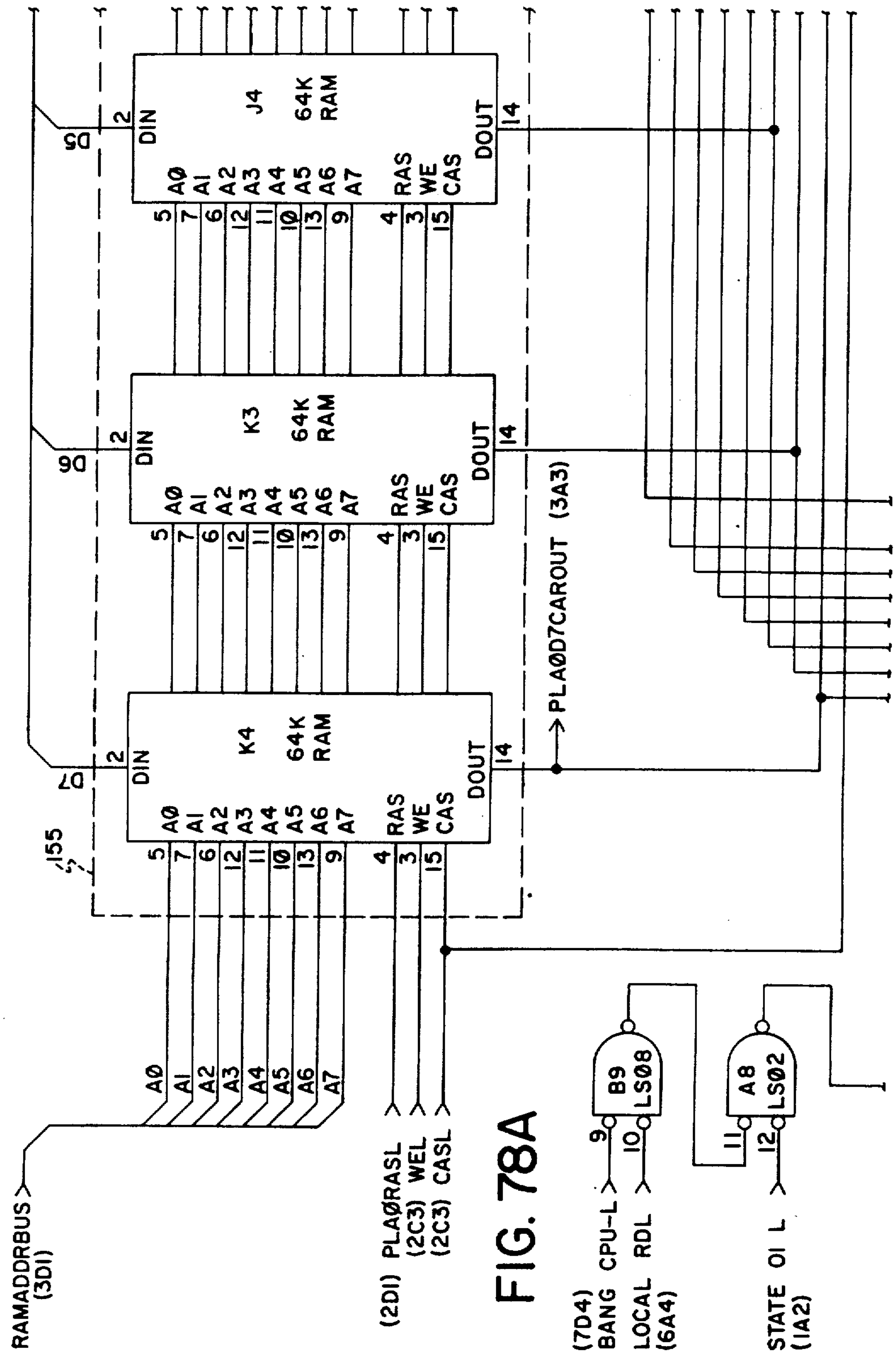
FIGS. 78A-78H are schematic diagrams of the bit banger, bit shifter, and bit map memory of the video RAM module.
Figure 78B:
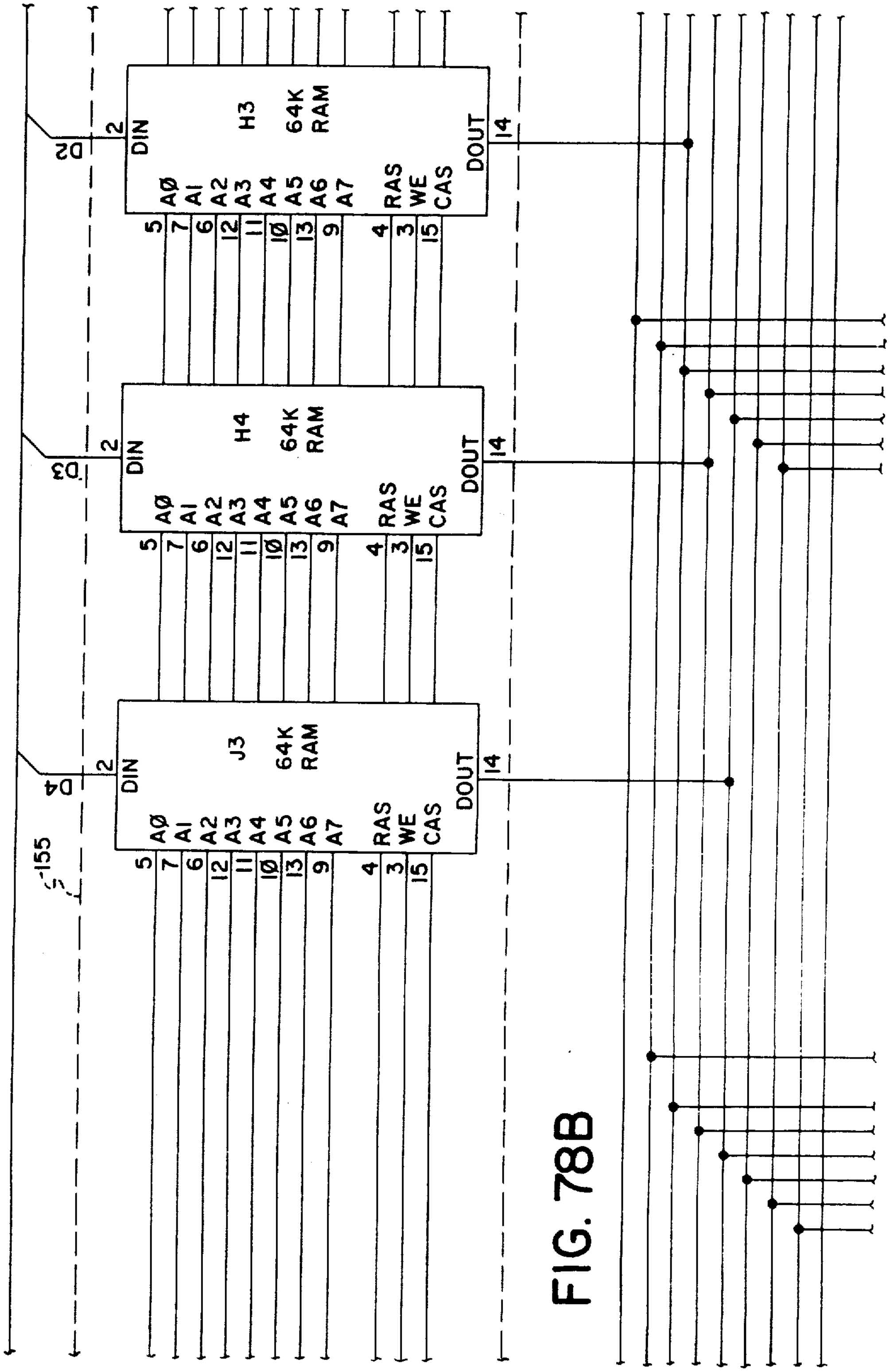
Figure 78C:
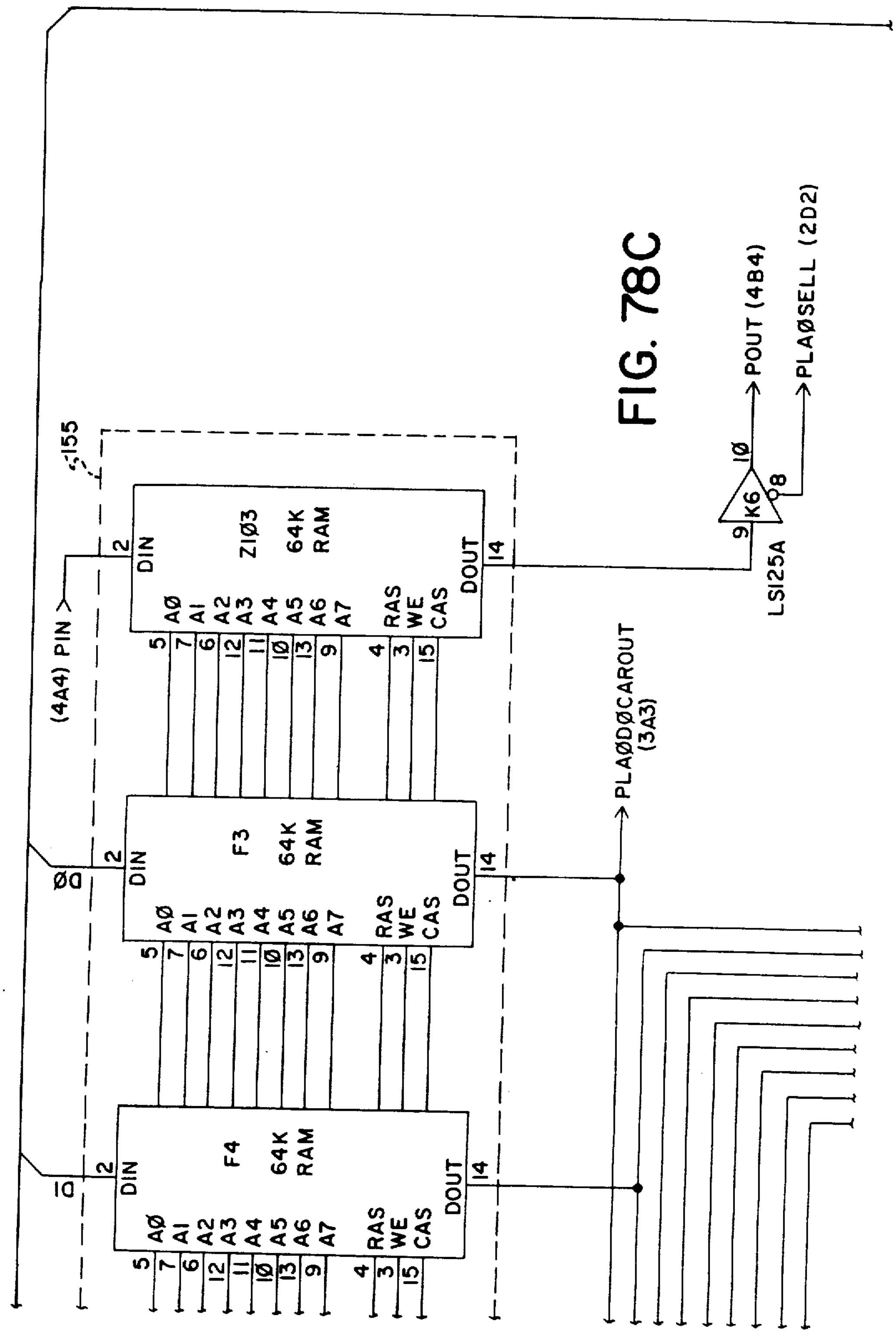
Figure 78D:
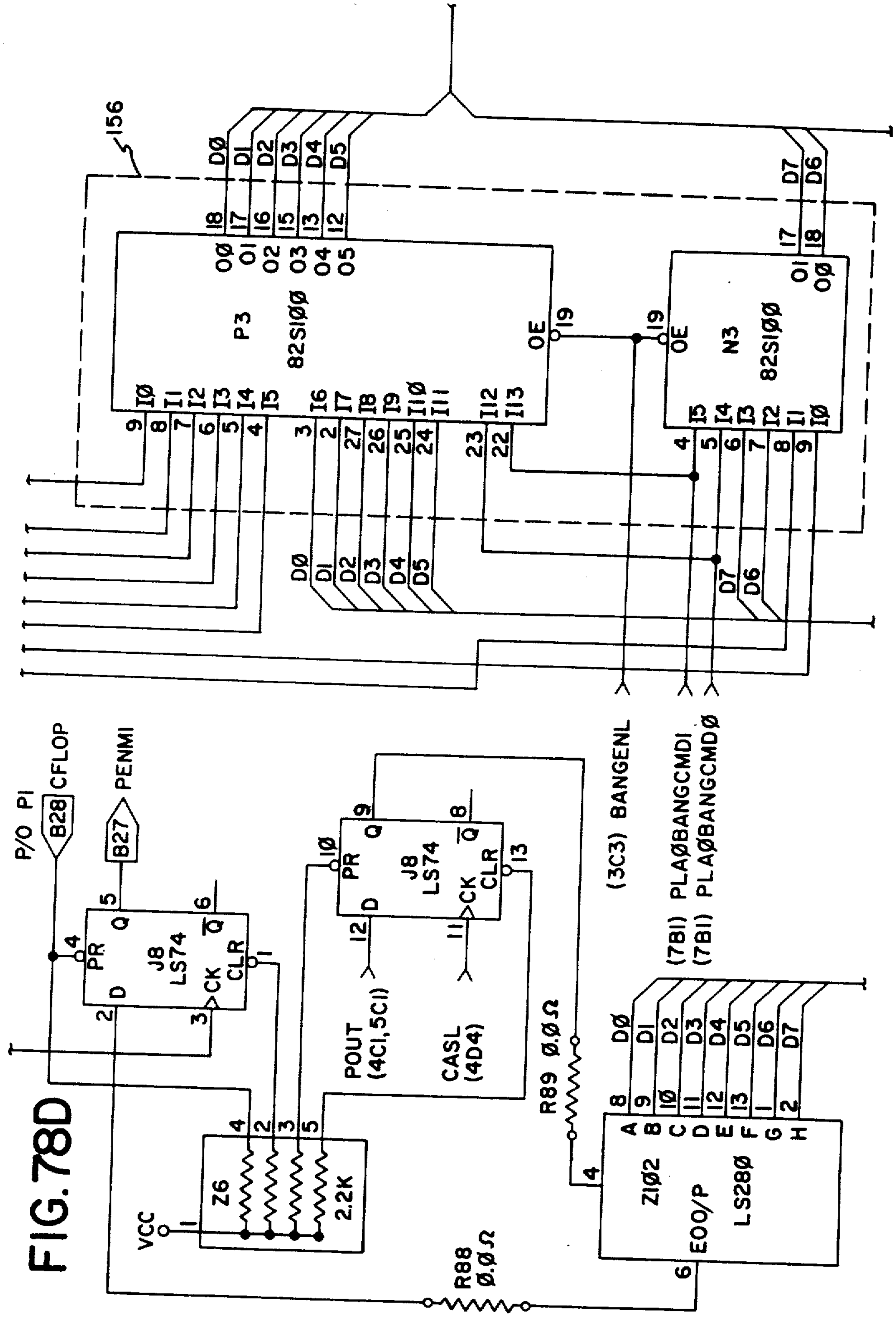
Figure 78E:
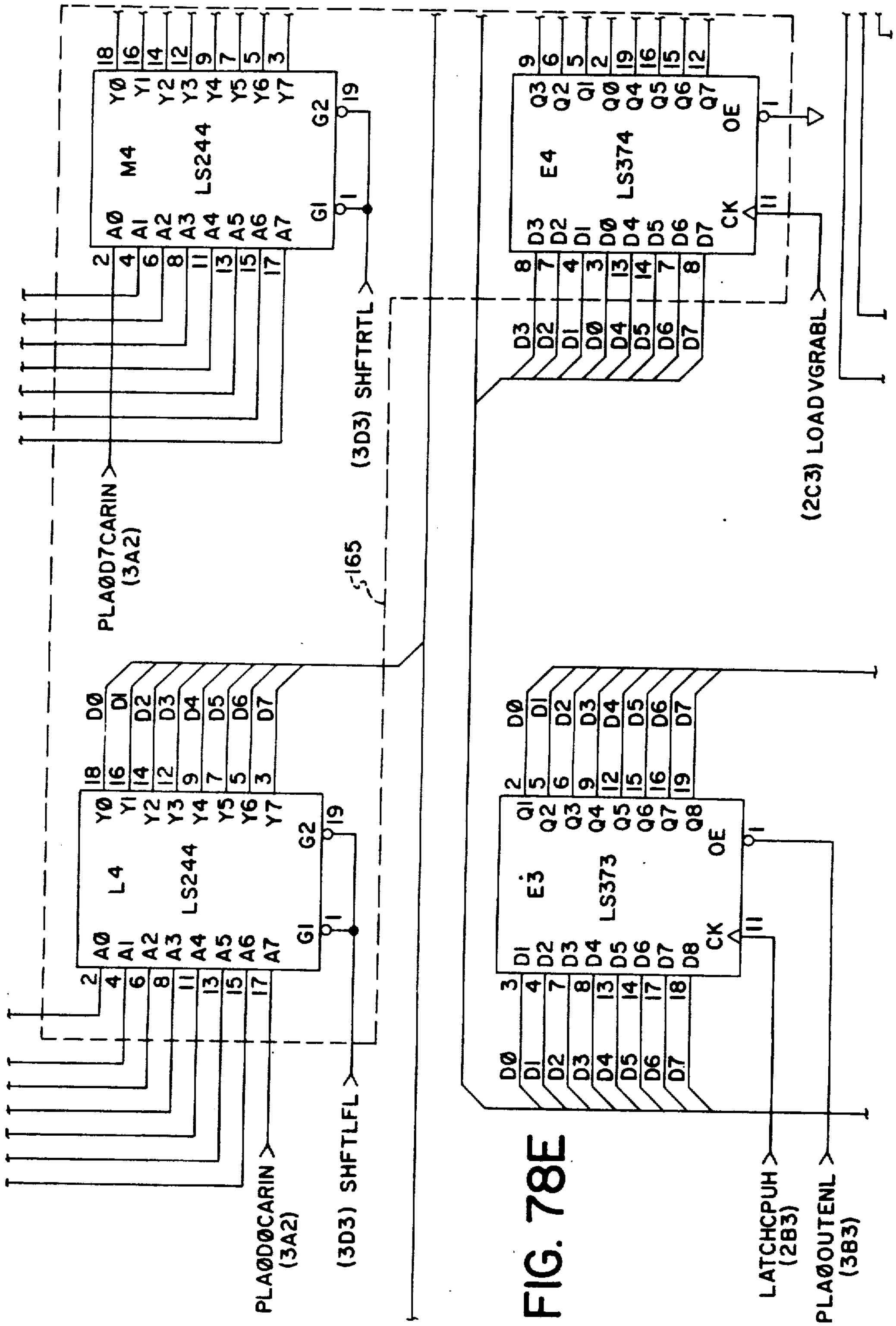
Figure 78F:
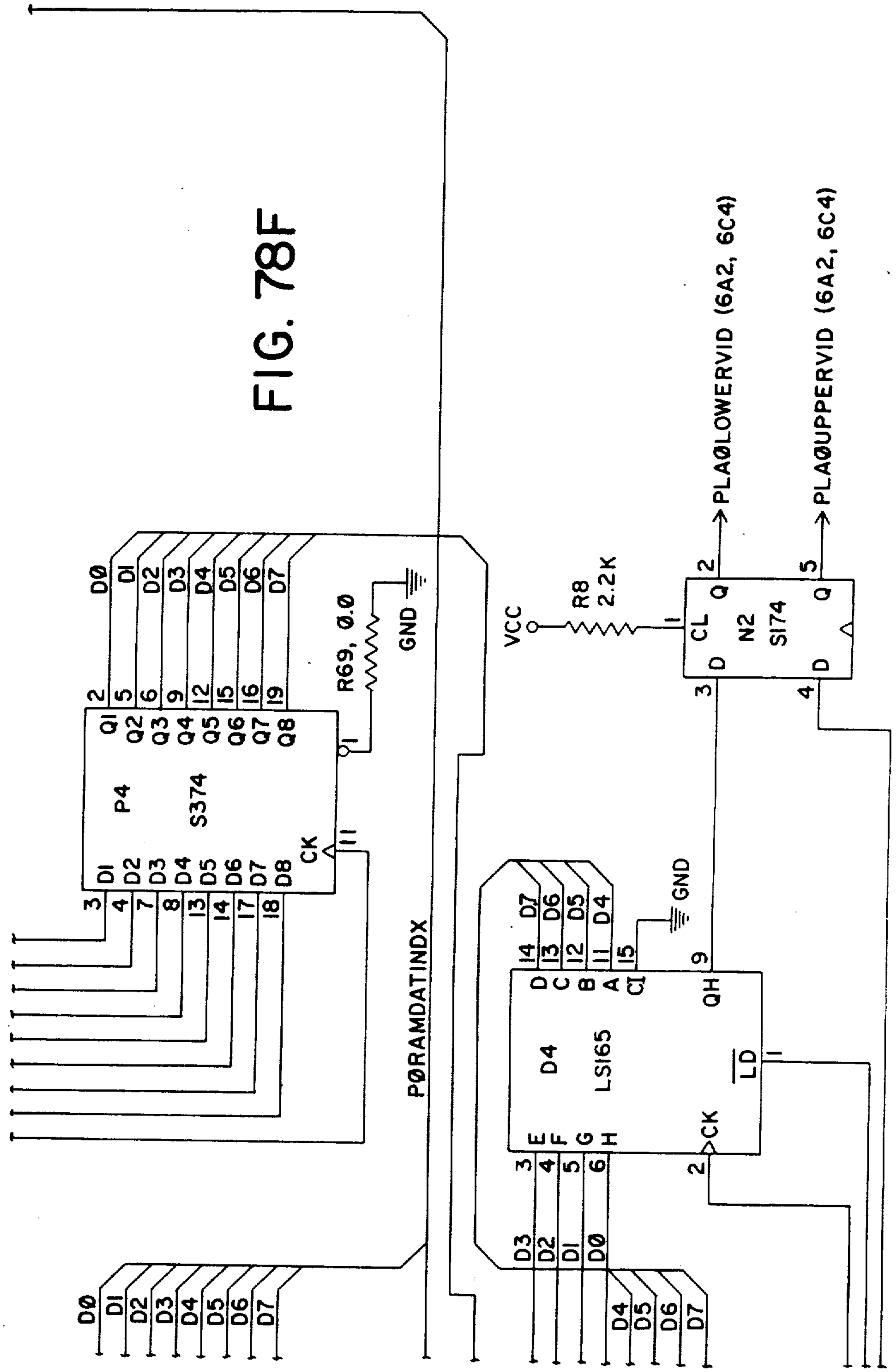
Figure 78G:
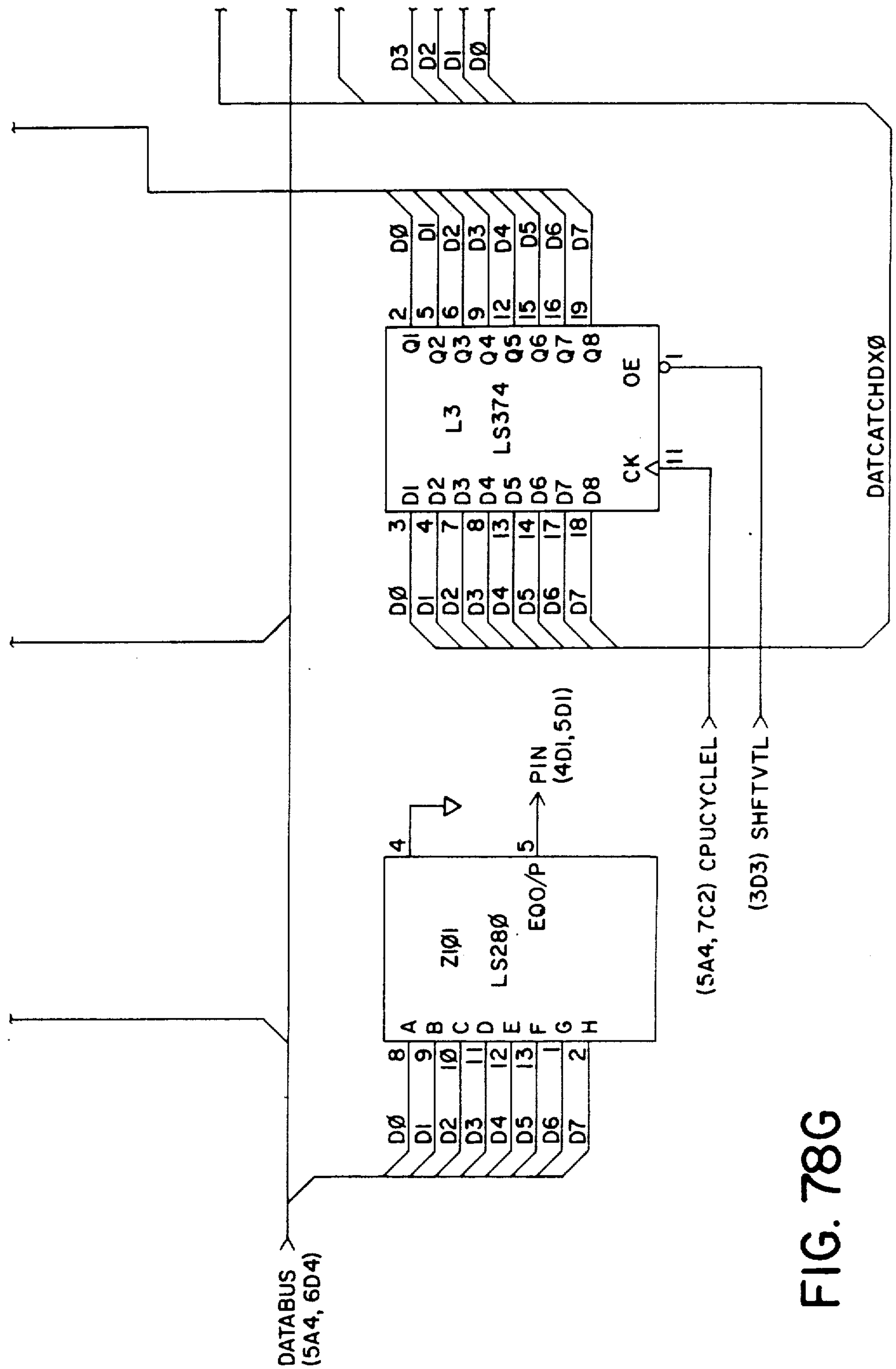
Figure 78H:
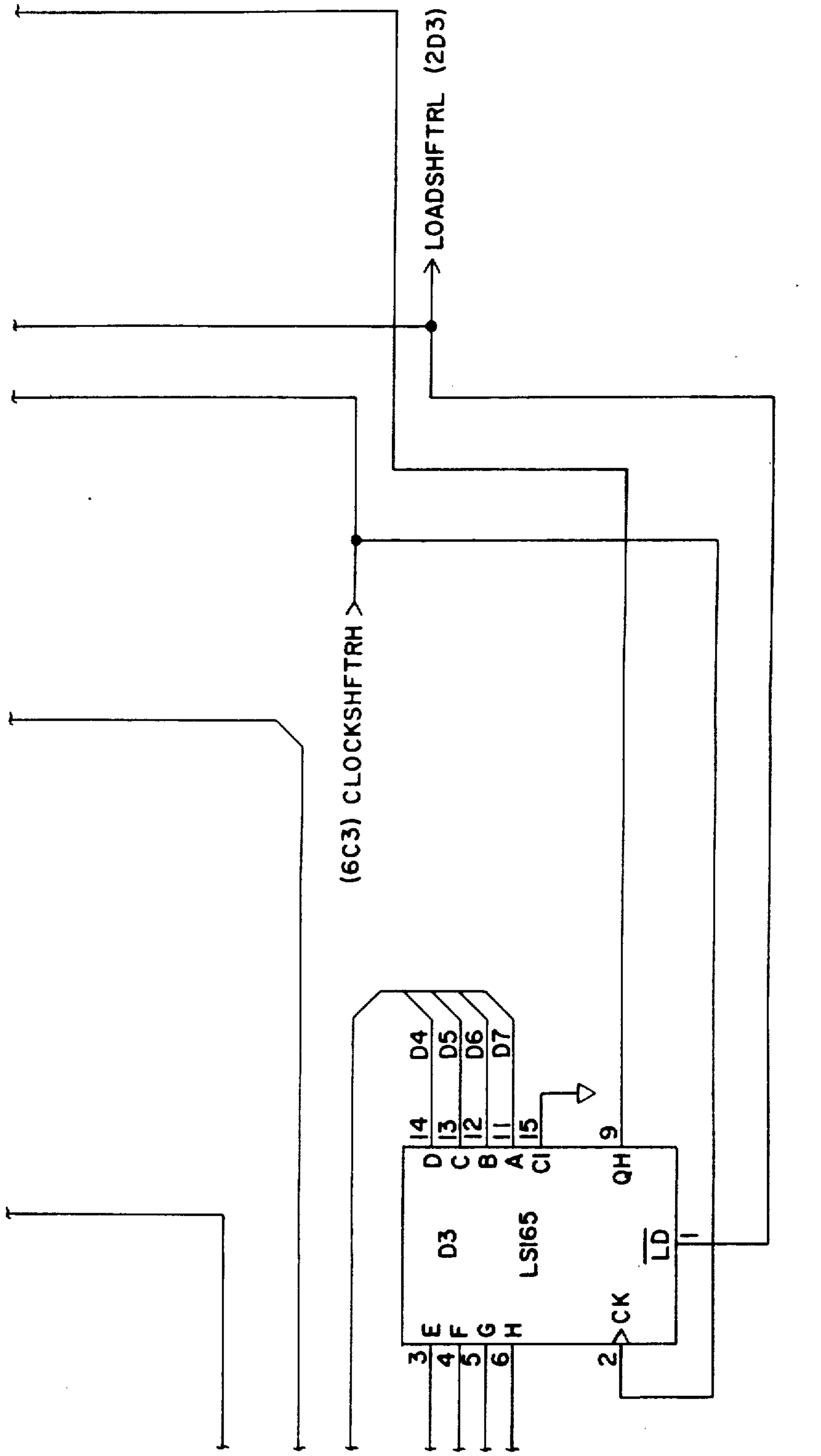

The connectors that connect to the board's LED's are shown in FIG. 77.

The pin assignments for the overall bus 93 are set forth in Table 78.

J1, J2, and J3—RS232 Connectors

J1, J2 and J3 shown in FIG. 77 are DTE 25 pin connectors conforming to EIA Standard RS232-C. J1 is the connector for Channel A, J2 is the connector for Channel B, and J3 is the connector for Channel C of the MPSC's. The following are the pin assignments for these connectors. The pin numbers are RS232 standards. The drivers and receivers for these signals are implemented in I/O chips (1488 and 1489's). References H and J can be consulted for details. The pin signals are set forth in Table 79.

Table 79

TABLE 79

(1) Chassis ground
(2) Transmit data
(3) Receive data
(4) Request to send
(5) Clear to send
(6) Data set ready
(7) Signal ground
(8) Carrier detect
(11) Local loopback
(15) Transmit signal timing TABLE 79-continued

(17) Receive signal timing
(18) Remote loopback
(20) Data terminal ready
(21) Signal quality detect
(22) Ring indicator
(23) Rate select
(24) Signal timing

(20) Data terminal ready
(21) Signal quality detect
(22) Ring indicator
(23) Rate select
(24) Signal timing

TABLE 78

OVERALL BUS - P1 PIN ASSIGNMENTS
(Row B, 29-46 and 62-94 are pins for the private memory port.)

| ROW B | SIGNAL | ROW A | SIGNAL | |
|---|---|---|---|---|
| 100 | GND | 100 | GND | |
| 99 | +5V | 99 | +5V | |
| 98 | +5V | 98 | +5V | POWER |
| 97 | GND | 97 | GND | |
| 96 | +16V | 96 | +16V | |
| 95 | GND | 95 | GND | |
| 94 | MIORC-L | 94 | STAT4-L | |
| 93 | MIOWC-L | 93 | STAT3-L | STATUS |
| 92 | MMRDC-L | 92 | STAT2-L | LINES |
| 91 | MMWTC-L | 91 | STAT1-L | |
| 90 | MAMWC-L | 90 | GND | GROUND |
| 89 | MEMXACK-H | 89 | ADR17-L | |
| 88 | MHARDINT-L | 88 | ADR16-L | |
| 87 | MSOFTINT-L | 87 | ADR15-L | |
| 86 | ... | 86 | ADR14-L | |
| 85 | MADR13-H | 85 | ADR13-L | |
| 84 | MADR12-H | 84 | ADR12-L | |
| 83 | MADR11-H | 83 | ADR11-L | |
| 82 | MADR10-H | 82 | ADR10-L | |
| 81 | MADR0F-H | 81 | ADR0F-L | |
| 80 | MADR0E-H | 80 | ADR0E-L | |
| 79 | MADRoD-H | 79 | ADR0D-L | |
| 78 | MADR0C-H | 78 | ADR0C-L | ADDRESS |
| 77 | MADR0B-H | 77 | ADR0B-L | LINES |
| 76 | MADR0A-H | 76 | ADR0A-L | |
| 75 | MADR09-H | 75 | ADR09-L | |
| 74 | MADR08-H | 74 | ADR08-L | |
| 73 | MADR07-H | 73 | ADR07-L | |
| 72 | MADR06-H | 72 | ADR06-L | |
| 71 | MADR05-H | 71 | ADR05-L | |
| 70 | MADR04-H | 70 | ADR04-L | |
| 69 | MADR03-H | 69 | ADR03-L | |
| 68 | MADR02-H | 68 | ADR02-L | |
| 67 | MADR01-H | 67 | ADR01-L | |
| 66 | MADR00-H | 66 | ADR00-L | |
| 65 | MBHE-L | 65 | BHE-L | |
| 64 | DPRAM-L | 64 | SPARE 8 | |
| 63 | DPI/OSEL-L | 63 | SPARE 7 | |
| 62 | MMEN-H | 62 | SLT16-L | |
| 61 | ... | 61 | SLT08-L | SLOT |
| 60 | ... | 60 | SLT04-L | NUMBER |
| 59 | ... | 59 | SLT02-L | LINES |
| 58 | ... | 58 | SLT01-L | |
| 57 | ... | 57 | SPARE 6 | |
| 56 | ... | 56 | SPARE 5 | SPARES |
| 55 | 8MHZEN-L | 55 | SPARE 4 | |
| 54 | GND | 54 | GND | |
| 53 | −16V | 53 | −16V | |
| 52 | GND | 52 | GND | |
| 51 | +5V | 51 | +5V | POWER |
| 50 | +5V | 50 | +5V | |
| 49 | GND | 49 | GND | |
| 48 | +16V | 48 | +16V | |
| 47 | GND | 47 | GND | |
| 46 | MDATF-H | 46 | DATF-L | |
| 45 | MDATE-H | 45 | DATE-L | |
| 44 | MDATD-H | 44 | DATD-L | |
| 43 | MDATC-H | 43 | DATC-L | |
| 42 | MDATB-H | 42 | DATB-L | |
| 41 | MDATA-H | 41 | DATA-L | |

TABLE 78-continued

OVERALL BUS - P1 PIN ASSIGNMENTS
(Row B, 29-46 and 62-94 are pins for the private memory port.)

| ROW B | SIGNAL | ROW A | SIGNAL | |
|---|---|---|---|---|
| 40 | MDAT9-H | 40 | DAT9-L | DATA |
| 39 | MDAT8-H | 39 | DAT8-L | LINES |
| 38 | MDAT7-H | 38 | DAT7-L | |
| 37 | MDAT6-H | 37 | DAT6-L | |
| 36 | MDAT5-H | 36 | DAT5-L | |
| 35 | MDAT4-H | 35 | DAT4-L | |
| 34 | MDAT3-H | 34 | DAT3-L | |
| 33 | MDAT2-H | 33 | DAT2-L | |
| 32 | MDAT1-H | 32 | DAT1-L | |
| 31 | MDAT0-H | 31 | DAT0-L | |
| 30 | MDEN-H | 30 | SPARE 3 | |
| 29 | · MDT-H | 29 | · SPARE 2 | |
| 28 | . . . | 28 | GND | GROUND |
| 27 | . . . | 27 | CCLK-L | |
| 26 | GND | 26 | GND | |
| 25 | ENCLKIN-L | 25 | ENCLKO-L | CLOCKS |
| 24 | GND | 24 | BCLK-L | |
| 23 | GND | 23 | GND | GROUND |
| 22 | BINTA-L | 22 | SPARE 1 | |
| 21 | BINT7-L | 21 | BINT6-L | INTERRUPT |
| 20 | BINT5-L | 20 | BINT4-L | LINES |
| 19 | BINT3-L | 19 | BINT2-L | |
| 18 | BINT1-L(MEM ERR) | 18 | BINT0-L(PWR FAIL) | |
| 17 | GND | 17 | GND | GROUND |
| 16 | BINIT-L | 16 | CPUREQ-L | |
| 15 | BMRDC-L | 15 | BMWTC-L | |
| 14 | BIORC-L | 14 | BIOWC-L | |
| 13 | BXACK-L | 13 | DIAG2-L | CONTROL |
| 12 | CRDPRS-L | 12 | DIAG1-L | LINES |
| 11 | BUSY-L | 11 | CBREQ-L | |
| 10 | BPRN-L | 10 | BPRO-L | |
| 9 | GND | 9 | GND | GROUND |
| 8 | BATTERY +5V | 8 | BATTERY +5V | BATTERY |
| 7 | BATTERY +5V | 7 | BATTERY +5V | BACK-UP |
| 6 | GND | 6 | GND | |
| 5 | −16V | 5 | −16V | |
| 4 | GND | 4 | GND | POWER |
| 3 | +5V | 3 | +5V | |
| 2 | +5V | 2 | +5V | |
| 1 | · GND | 1 | · GND | |

J4—FAST WDT STATUS INDICATOR

J4 (part 60) uses three pins of a nine pin connector to inform the outside world of the fast watch dog timer status. The signals are the outputs of an optoisolator.

The signals are intended to trigger a relay that may drive an alarm klaxon to inform the world of a fast WDT timeout. This output is off after reset and only triggers the relay when there is a timeout during operation.

The pinout for J4 is as follows:

1. Base 1
2. Alarm-L
3. Emitter 1

The output characteristics of the optoisolator 60 are:

ISOLATION VOLTAGE: 2500 V
OUTPUT CURRENT (MAX): 25 mA
OUTPUT VOLTAGE (MAX): 70 V

JUMPER OPTIONS

Jumpers are provided to choose 5 or 8 MHz operation, 8087 presence, PROM size, PROM speed, hard memory error handling, bus priority type and BCLK frequency. Selection is made by specifying the position of a 0.0 ohm resistor. The jumper connections for the various configurations are set forth in Table 80.

TABLE 80

| | | Zero Ohm Resistor |
|---|---|---|
| CPU SPEED | | |
| Speed | | |
| 5 MHz | | none. |
| 8 MHz | | R2 |
| PROM SIZE | | |
| Size | | |
| 4K × 8 | | R24<br>R26<br>R37<br>R39 |
| 8K × 8 | | R25<br>R27<br>R38<br>R39 |
| PROM SPEED | | |
| No. of Wait States | | |
| 5 MHz | 8 MHz | |
| 0 | 0 | R32<br>R35 |
| 0 | 1 | R32<br>R34 |
| 1 | 2 | R33<br>R36 |
| BCLK | | |
| Frequency | | |
| 2.4576 MHz | | R11 |
| 4.9152 MHz | | R12 |
| 9.8304 MHz | | R13 |
| BUS PRIORITY TYPE | | |

TABLE 80-continued

| Zero Ohm Resistor | | |
|---|---|---|
| Type | | |
| Rotating | | |
| Serial | | R18 |
| Priority | | R88 |
| CPU with 50% | | R19 |
| of bus cycles | R87 | R92 |
| HARD MEMORY ERROR HANDLING | | |
| Interrupt | | R49 |
| to 2nd level | | |
| of Master 8259A | | |
| Reset the CPU-86 | | R50 |
| 8087 | | |
| Not Present | | R12 |
| Present | | none |
| WATCHDOG RETRIGGERING | | |
| NMI if wrong | | R91 |
| data written | | |
| for retriggering | | |
| No NMI if wrong | | R90 |
| data written | | |
| for retriggering | | |

TABLE 81

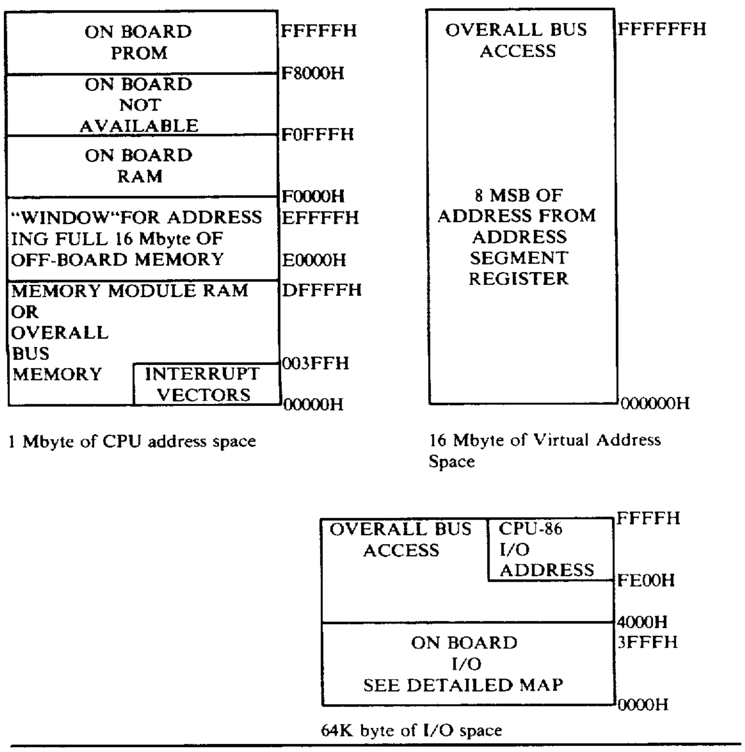

CPU MEMORY AND I/O MAP

The memory and I/O maps are set forth in Table 81. In all the following memory and I/O maps, the term "NOT AVAILABLE" indicates that the addresses in that range do not access any device and a ready does not be returned. Word accesses to I/O addresses will have the same effect. The XACK timeout circuit is activated, and a ready and an interrupt are generated after 6 milliseconds.

Details of the on board I/O address space for the CPU module are given in Table 82.

OPERATING REQUIREMENTS

Power Requirements

The CPU uses +5 V, +16 V, −16 V and ground. The +16 V and the −16 V supplies are regulated on the CPU down to +12 V and −12 V.

| VOLTAGE | MAXIMUM CURRENT |
|---|---|
| +5 Volts | 7.71 amps |
| +12 Volts | 150 milliamps |
| −12 Volts | 138 milliamps |

Summary

Thus the CPU modules provide the overall application program execution. These modules incorporate the computing capabiliy required to execute application programs. The modules are also responsible for setting the memory module fence and, when system master, for generating system clock signals. The CPU modules incorporate the overall module features including soft interrupt capability status registers and an improved fast watchdog timer.

TABLE 82

| | |
|---|---|
| MPSC2 CHC DATA | 0000 |
| NOT AVAILABLE | 0001 |
| MPSC2 CHC CONTROL | 0002 |
| NOT AVAILABLE | 0003 |
| MPSC2 CHD DATA | 0004 |
| NOT AVAILABLE | 0005 |
| MPSC2 CHD CONTROL | 0006 |
| NOT AVAILABLE | 0007 |
| | 000F |

TABLE 82-continued

| | |
|---|---|
| PIT 0 TIMER #0<br>FAST REAL TIME CLK | 0010 |
| NOT AVAILABLE | 0011 |
| PIT 0 TIMER #1<br>SLOW REAL TIME CLK | 0012 |
| NOT AVAILABLE | 0013 |
| PIT 0 TIMER #2<br>PROGRAMMABLE TIMER | 0014 |
| NOT AVAILABLE | 0015 |
| PIT 0 CONTROL WORD | 0016 |
| NOT AVAILABLE | 0017<br>001F |
| PIT 1 TIMER #0<br>FWDT INPUT CLOCK | 0020 |
| NOT AVAILABLE | 0021 |
| PIT 1 TIMER #1<br>FAST WATCHDOG TIMER | 0022 |
| NOT AVAILABLE | 0023 |
| PIT 1 TIMER #2<br>NOT USED | 0024 |
| NOT AVAILABLE | 0025 |
| PIT 1 CONTROL WORD | 0026 |
| NOT AVAILABLE | 0027<br>002F |
| PPI2-PORT A<br>SLOT LINES, STATUS | 0030 |
| NOT AVAILABLE | 0031 |
| PPI2-PORT B<br>ERROR REGISTER 2 | 0032 |
| NOT AVAILABLE | 0033 |
| PPI2-PORT C<br>ERROR REGISTER 1 | 0034 |
| NOT AVAILABLE | 0035 |
| PPI2 - CONTROL WORD | 0036 |
| NOT AVAILABLE | 0037<br>003F |
| PPI0-PORT A - ASR | 0040 |
| NOT AVAILABLE | 0041 |
| PPI0-PORT B<br>COMMUNICATION STAT1 | 0042 |
| NOT AVAILABLE | 0043 |
| PPI0-PORT C<br>COMMUNICATION STAT2 | 0044 |
| NOT AVAILABLE | 0045 |
| PPI0 - CONTROL WORD | 0046 |
| NOT AVAILABLE | 0047<br>004F |
| PPI1-PORT A<br>COMMUNICATION CTRL1 | 0050 |
| NOT AVAILABLE | 0051 |
| PPI1-PORT B<br>COMMUNICATION CTRL2 | 0052 |
| NOT AVAILABLE | 0053 |
| PPI1-PORT C<br>COMMUNICATION CTRL3 | 0054 |
| NOT AVAILABLE | 0055 |
| PPI1 - CONTROL WORD | 0056 |
| NOT AVAILABLE | 0057<br>005F |
| PIT 2 TIMER #0<br>CH A BAUD CLOCK | 0060 |

TABLE 82-continued

| | |
|---|---|
| NOT AVAILABLE | 0061 |
| PIT 2 TIMER #1<br>CH B BAUD CLOCK | 0062 |
| NOT AVAILABLE | 0063 |
| PIT 2 TIMER #2<br>CH C BAUD CLOCK | 0064 |
| NOT AVAILABLE | 0065 |
| PIT 2 CONTROL WORD | 0066 |
| NOT AVAILABLE | 0067<br>006F |
| MPSC1 CHA DATA | 0070 |
| NOT AVAILABLE | 0071 |
| MPSC1 CHA CONTROL | 0072 |
| NOT AVAILABLE | 0073 |
| MPSC1 CHB DATA | 0074 |
| NOT AVAILABLE | 0075 |
| MPSC1 CHB CONTROL | 0076 |
| NOT AVAILABLE | 0077<br>007F |
| PRIVATE MODMEM<br>FENCE REGISTER | 0080 |
| NOT AVAILABLE | 0081 |
| MODMEM I/O<br>UNUSED | 0082 |
| NOT AVAILABLE | 0083 |
| MODMEM I/O<br>UNUSED | 0084 |
| NOT AVAILABLE | 0085 |
| MODMEM I/O<br>UNUSED | 0086 |
| NOT AVAILABLE | 0087<br>008F |
| MASTER PIC ADR 0 | 0090 |
| DO NOT USE | 0091 |
| MASTER PIC ADR 1 | 0092 |
| NOT AVAILABLE | 0093<br>009F |
| SLAVE PIC ADR 0 | 00A0 |
| NOT AVAILABLE | 00A1 |
| SLAVE PIC ADR 1 | 00A2 |
| NOT AVAILABLE | 00A3<br>00AF |
| CLEAR FWDT LATCH | 00B0 |
| NOT AVAILABLE | 00B1 |
| CLEAR SOFT<br>INTERRUPT | 00B2 |
| NOT AVAILABLE | 00B3 |
| FWDT RETRIGGER | 00B4 |
| NOT AVAILABLE | 00B5 |
| CLEAR<br>SIGNAL QUALITY | 00B6 |
| NOT<br>AVAILABLE | 00B7<br>3FFF |

PRIVILEGED ROTATIONAL PRIORITY BUS ARBITRATION

Bus Contention and Priority

In the "System Features" subsection of the Man-Machine Interface section (above) the general equation for a speed degradation when any program on any board uses the memory module was derived. In this subsection, the reasons for bus contention on the MMI are described along with the consequences of bus ownership and details of the bus arbitration techniques.

Bus contention arises whenever two or more boards wish to use the public bus at the same instant of time. The bus arbitration circuitry selects one of the boards as the bus owner and makes the others wait. That is, the priority of bus ownership is established by the bus hardware.

The public bus allows for different, jumper selectable, bus arbitration schemes.

Figure 1G:
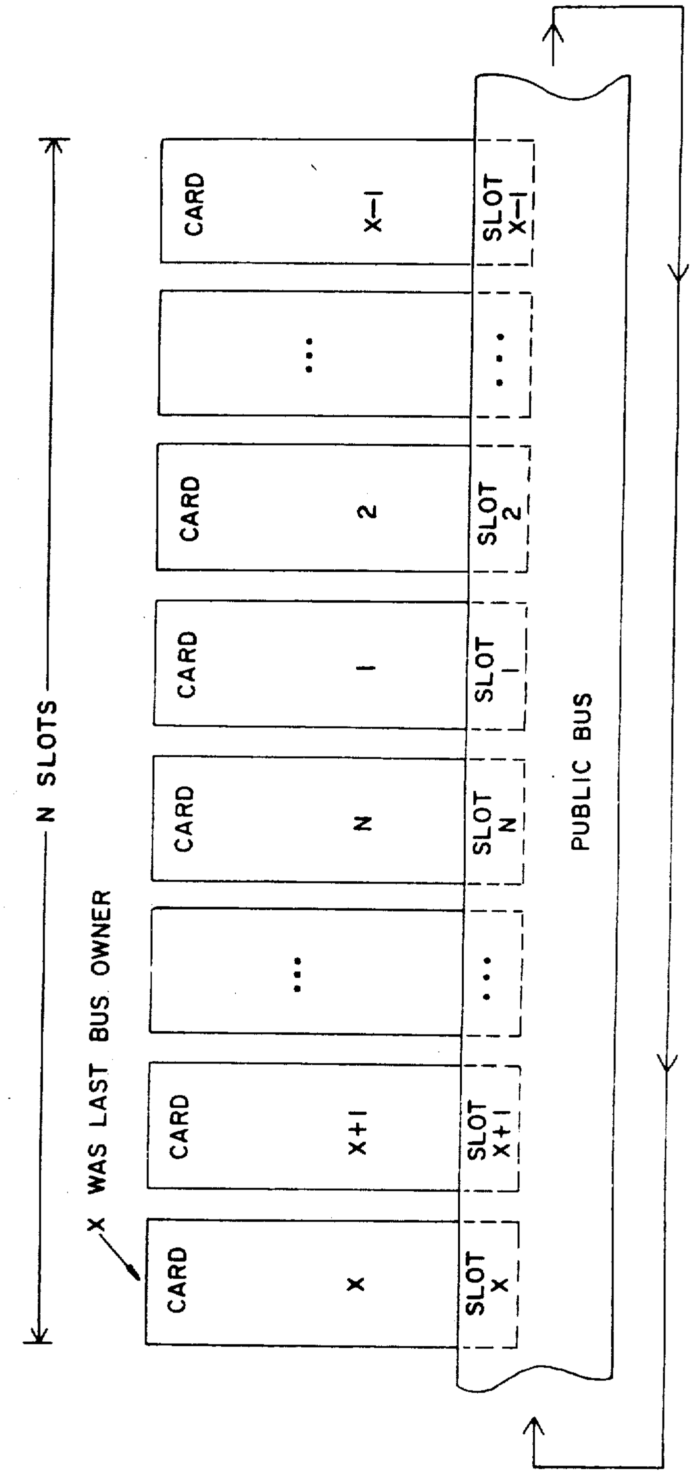
FIG. 1G is a further diagrammatic representation of the rotational priority arbitration technique used for control of the public bus.

Rotational priority passes ownership of the bus (a conceptual bus "token" or "baton") to the right with the last bus position passing ownership to the first. Priority "rotates" around the bus. FIG. 1G illustrates this form of bus arbitration.

Figure 1H:
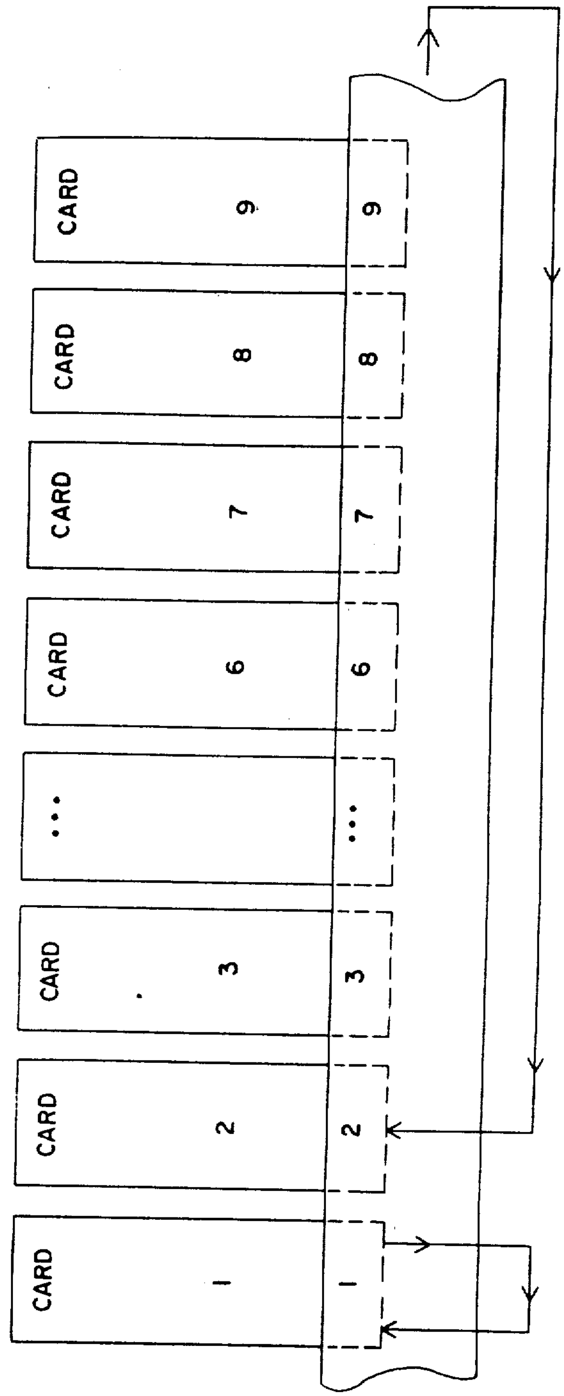
FIG. 1H is a diagrammatic representation of a privileged rotational priority arbitration technique used for control of the public bus in which a second CPU module has preferential access to the bus.
Figure 11:
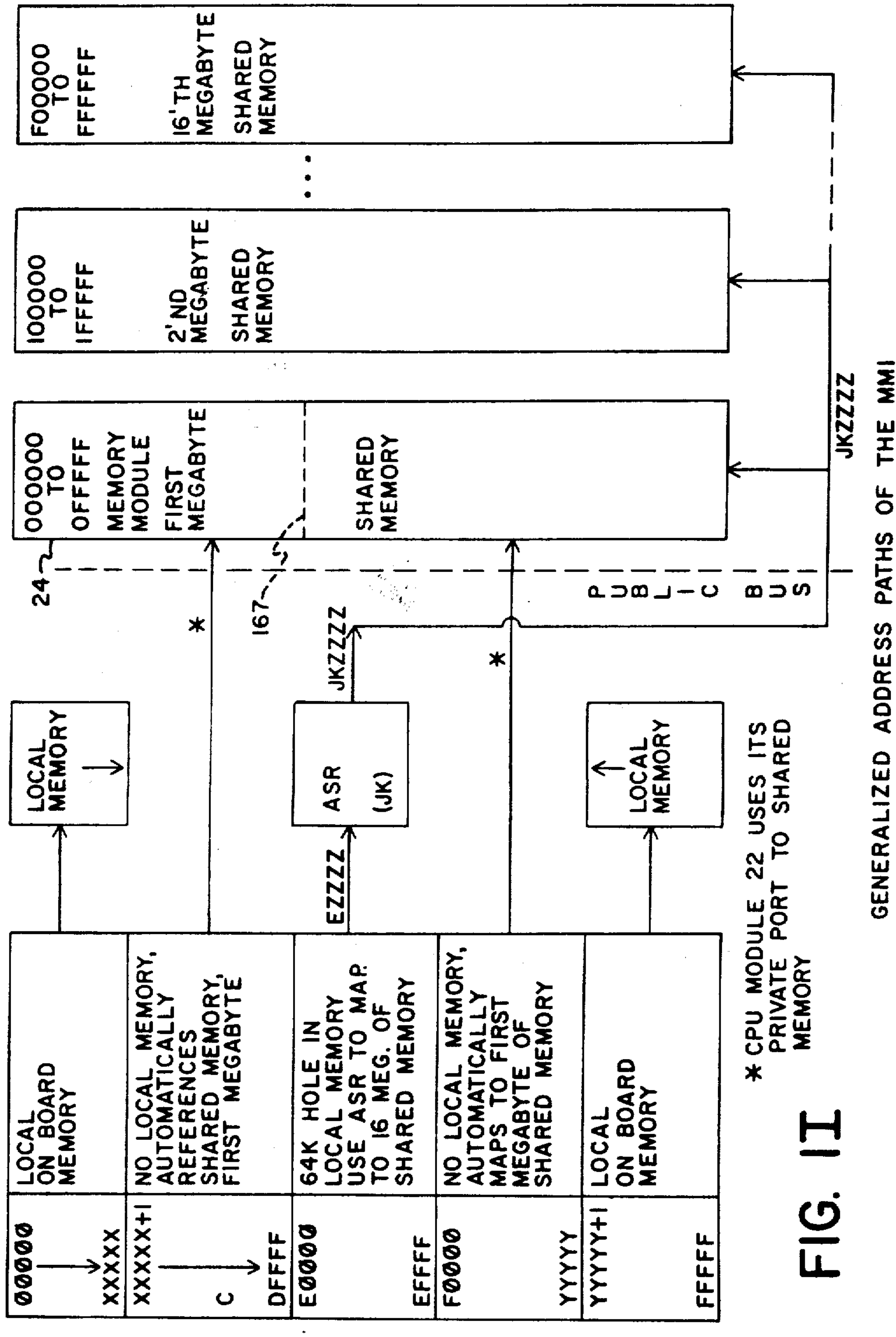
Figure 2:
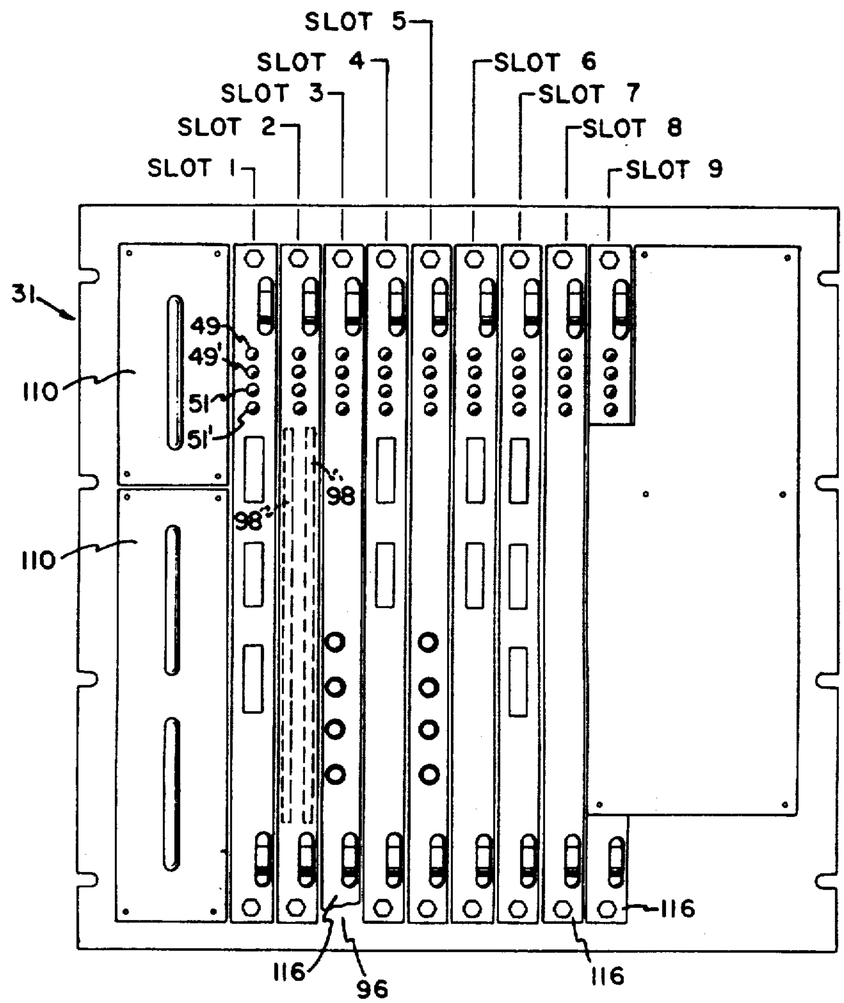
Figure 3:
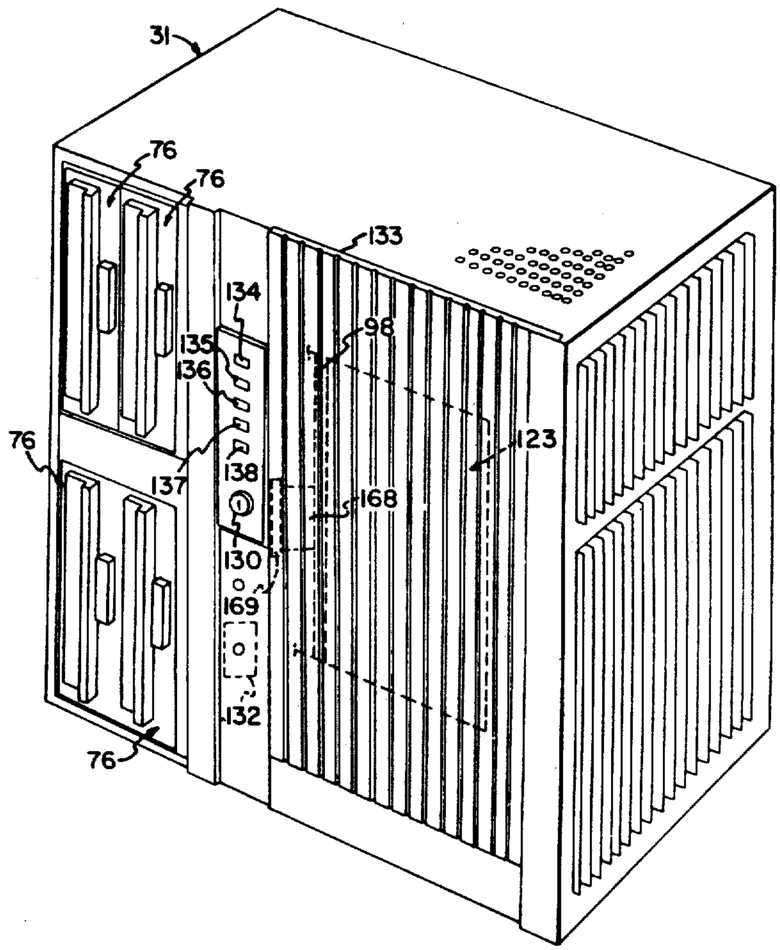

Privileged rotational priority arbitration grants every other bus cycle to slot 1, and treats the remainder of the slots on a rotational priority. FIG. 1H illustrates this form of bus arbitration. This form is especially useful where a second CPU module (see CPU #2 in FIG. 1) forms part of the MMI. Since the second CPU module does not have a private port to the memory module, allotting it up to 50% of the bus cycles grants it sufficient access to the shared memory in the memory module without preventing normal utilization of the public bus by the other modules in the MMI.

The privileged rotational priority scheme grants the public bus to slot 1 on even bus cycles, and to the "next slot to the right on the ring" on odd bus cycles (slot 1 is not considered part of the ring).

Bus requests are generated by a program in a slot whenever a data item is read from or written to shared memory. One is also generated for each program instruction executed from shared memory. Since the bus lockout for low priority slots may occur in the middle of an instruction cycle—the memory fetch or store portion—the CPU in that slot is effectively frozen in the middle of an instruction. It cannot respond to normal interrupts.

In an instruction cycle only a portion of the time is used referencing memory. The exact amount of time varies with different instructions from 5% to 10% for "calculation instructions" to 70%-80% for data movement instructions. A safe rule of throughput is 40% of the instruction execution time is involved in references to data over the public bus to shared memory.

Thus if two slots are executing programs out of local memory and referencing data in shared memory, they often go into "lock-step" or alternate usage. The same applies if the programs are in shared memory but the variables are in local memory because of the instruction fetch cycles. If both the instructions and data are in shared memory, then bus contention often rises to a point where program execution begins to degrade.

Any slot performing a data movement to or from shared memory with a lock prefix owns the bus (the "token") for the entire instruction. This amounts to a "software DMA" and thus would dominate bus usage.

Rotational priority behaves as follows: If locked instructions are ignored, an equation representing maximum degradation due to bus conflicts can be calculated. The total delay factor derived in equation 4 is:

$$TD=OF(x+y)\ xOV+yOV$$

where y is the number of data references to shared memory and x is the number of instructions executed out of shared memory.

Since all active slots (N) may contribute to the delay, the total delay becomes:

$$TD=N(OF(x+y)+xOV+OV)$$

where x and y are calculated once for each slot.

This value can become large, but is always predictable. The rotational bus priority scheme is usable in real-time if the degradation factor is predictable and small enough to allow response to real time constraints such as interrupt servicing of real-time devices.

Both priority schemes result in degradation when using shared memory. Rotational priority degrades all slots equally but has a maximum calculatable degradation for any individual slot. Privileged rotational degrades all slots, but slot 1 gets service 50% of the cycles.

Privileged rotational priority results in the following maximum time degradations:

for slot 1; TD=50% (average) and for all other slots (N−1 of them)

$$TD=\frac{(N-1)\ (OF(x+y)+xOV+yOV)\ \text{average}}{2}$$

since slot 1 gets ½ of the bus cycles.

All degradations discussed above have involved using the public bus to reference shared memory. In reality shared memory is referenced via the bus generally when exchanging or sharing data between slots. The CPU module has a "private port" to the memory module (including memory) and when it is used, no bus degradation occurs. The other intelligent boards also have private memory which does not involve the bus (such as the video CPU with the video RAM).

In general, then, bus contention is the only major consideration in slot to slot communications.

Bus arbitration is accomplished with the use of a bus arbiter (Intel type 8289). The use of this type of bus arbiter provides means for resolving priority between bus masters simultaneously requesting the public bus. The arbitration technique is serial priority and resident mode. Once an arbiter obtains the bus, it remains in control until the bus is requested by another board (module).

The strapping option for the bus arbiter to achieve the configuration required is the resident bus mode. The following pins on the CPU module are strapped:

| PIN | NAME | STATE |
|---|---|---|
| 4 | RESB | High |
| 2 | IOB/ | High |
| 14 | ANYRQST | High |

Refer to references A and E of the CPU module section for more detail on using the Intel Corporation 8289 bus arbiter.

The CPU module is capable of being a system bus master and thus may provide the bus clock signal (BCLK) and the common clock signal (CCLK), and initiate the bus arbitration scheme. The ENCLKIN and ENCLKO lines on the backplane enable these signals on the first board with this capability and disable these signals on all other boards.

Two versions of the bus arbitration mechanism are supported. Jumpers are provided to select between the 2 methods. The basic version (as described above) is a rotating priority scheme whereby the device with priority at any time is the one imxediately after the current bus user. The priority follows a completely circular path from this point. After a power up or a system reset, any device may obtain the bus by requesting it. Request for public bus ownership (token ownership) is obtained by pulling low the public bus request line. If this device or module is immediately after the current public bus owner, it next receives the bus token. The device with the highest priority is the device imxediately after the system bus master.

The system bus master is the device in the rack which is providing BCLK and CCLK. Once a device obtains the bus, it retains ownership of the bus until another device requests it. The device currently using the bus then gives up the bus once it has finished its current bus cycle.

As seen in FIG. 1, a second CPU module may also be part of a particular man-machine interface configuration. This second CPU module does not have private port access to the memory module 24. If it is desirable that this second CPU module have preferred access to the memory module, but in a way that does not overly burden the public bus 92.

A second version of the bus arbitration method guarantees the second CPU module 50% of all public bus cycles if these cycles are needed. With this method, any module can obtain public bus access after a power up, but the second CPU module every other cycle bus priority. The remainder of the devices have priority based on the same rotating mechanism as described above. This method uses an additional backplane line to indicate to the other devices that it is the second CPU module that is requesting the bus. Once this line is activated, the device currently holding the bus gives it up when the current bus cycle is completed. The 50% CPU module then is given the bus. The device that gave up the bus retains knowledge that it last had the bus. When another device requests the bus, the second CPU module relinquishes the bus once the bus cycle is completed. The top priority device is now the one imxediately after the device that gave up the bus to the 50% CPU module. This method is not slot dependent, so that the 50% CPU module need not reside in slot 1 and it need not be the system master. If two such 50% boards are placed in a single rack, the bus arbitration method still operates as described but any devices other than the two 50% boards only receives the bus when one of the 50% boards has it and the other is not requesting it. Such devices could conceivably wait for long time periods before acquiring the bus.

Performance for Privileged Rotational Priority Bus Arbitration

The period of BCLK required for either arbitration method is:

BCLK period $111+(n-1)11+m(18)$ nanoseconds where n= number of bus masters in the rack m= number of empty slots in the rack This formula is derived from the propagation delay through boards not requesting the bus and the delay through the backplane. The worst case is when there are only 2 bus masters in the rack and no dumb boards. In a 9 slot rack the BCLK period is then $111+1(11)+7(18)=248$ nanoseconds. BCLK must then be less than 4.0 Mhz. with an MMI configuration of 1 CPU module
1 Floppy controller module
1 VID CPU module
1 VID memory module
1 1 Mbyte memory module the formula yields BCLK period $111+2(11)+4(18)=189$ nanoseconds. BCLK is then 5.29 Mhz or slower. Note that to avoid a dumb board being counted as an empty slot, all dumb boards ground the CRDPRS-L on the backplane and connect BPRN-L to BPRO-L and thus eliminate device delays through that slot.

The worst case for a 16 slot rack is $111+1(11)+14(18)=374$ nanoseconds making the fastest BCLK allowed 2.67 Mhz. A full 16 slot rack might consist of:

| | # of boards | # of masters |
|---|---|---|
| 2 CPU module | 2 | 2 |
| 1 1 Mbyte memory | 1 | 0 |
| 2 VID sets | 4 | 2 |
| 1 Floppy | 1 | 1 |
| 1 Hard disk | 1 | 1 |
| 1 4 port comm | 1 | 1 |
| 2 LIU sets | 4 | 2 |
| 2 other masters | 2 | 2 |
| Total # of boards | 16 | |
| Total # of masters | | 11 |

This system consists of a total of 11 bus masters and no empty slots. BCLK must be greater than $111+10(11)=221$ nanoseconds. The necessary BCLK must be less than 4.5 Mhz.

The formula for BCLK period using a straight serial priority scheme in the public bus backplane is:

BCLK period $55+(n-1)25+m(18)$

The breakeven point where the rotating method allows a faster clock is when there are five or more masters in the system.

Figure 39:
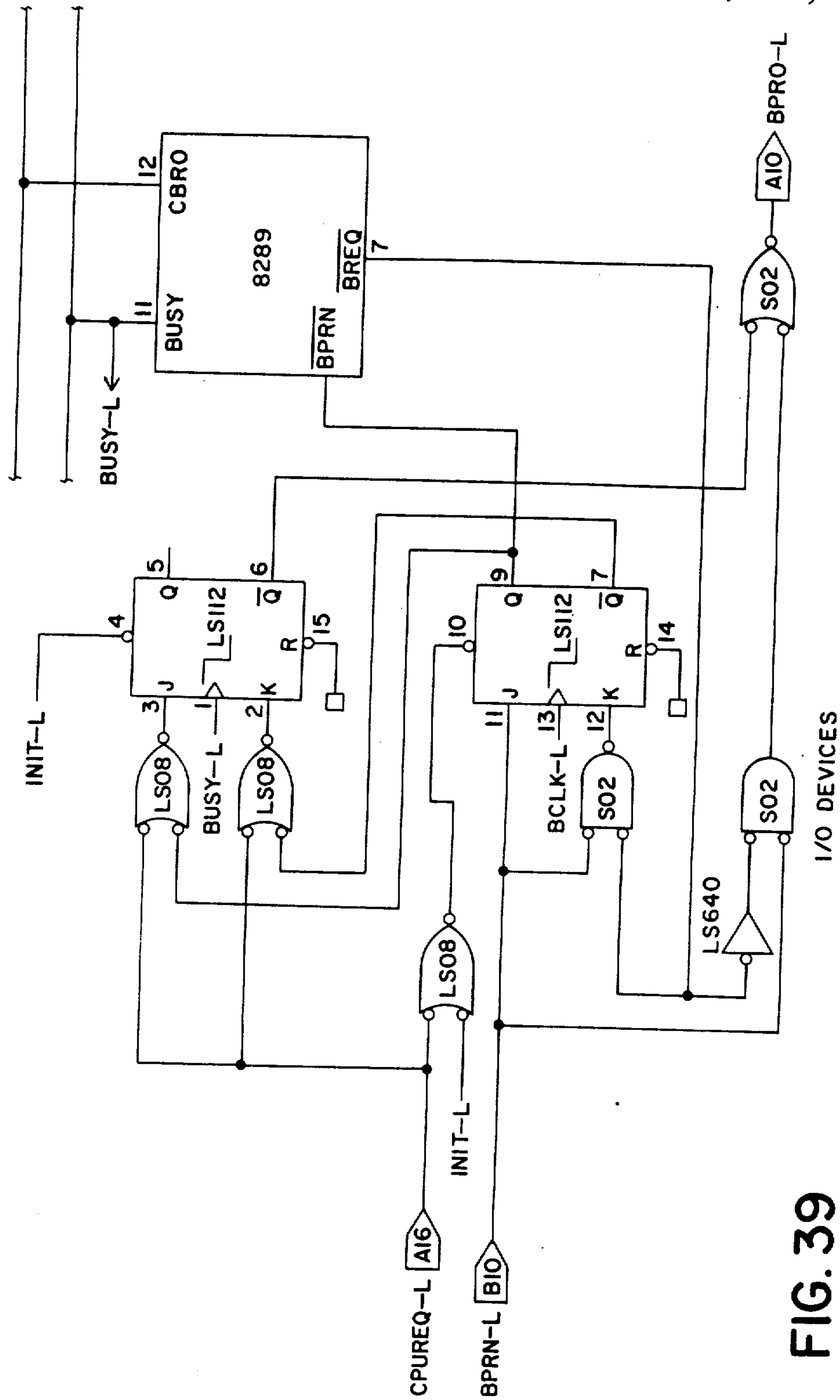
FIG. 39 is a schematic diagram of the bus arbitration circuitry.
Figure 40:
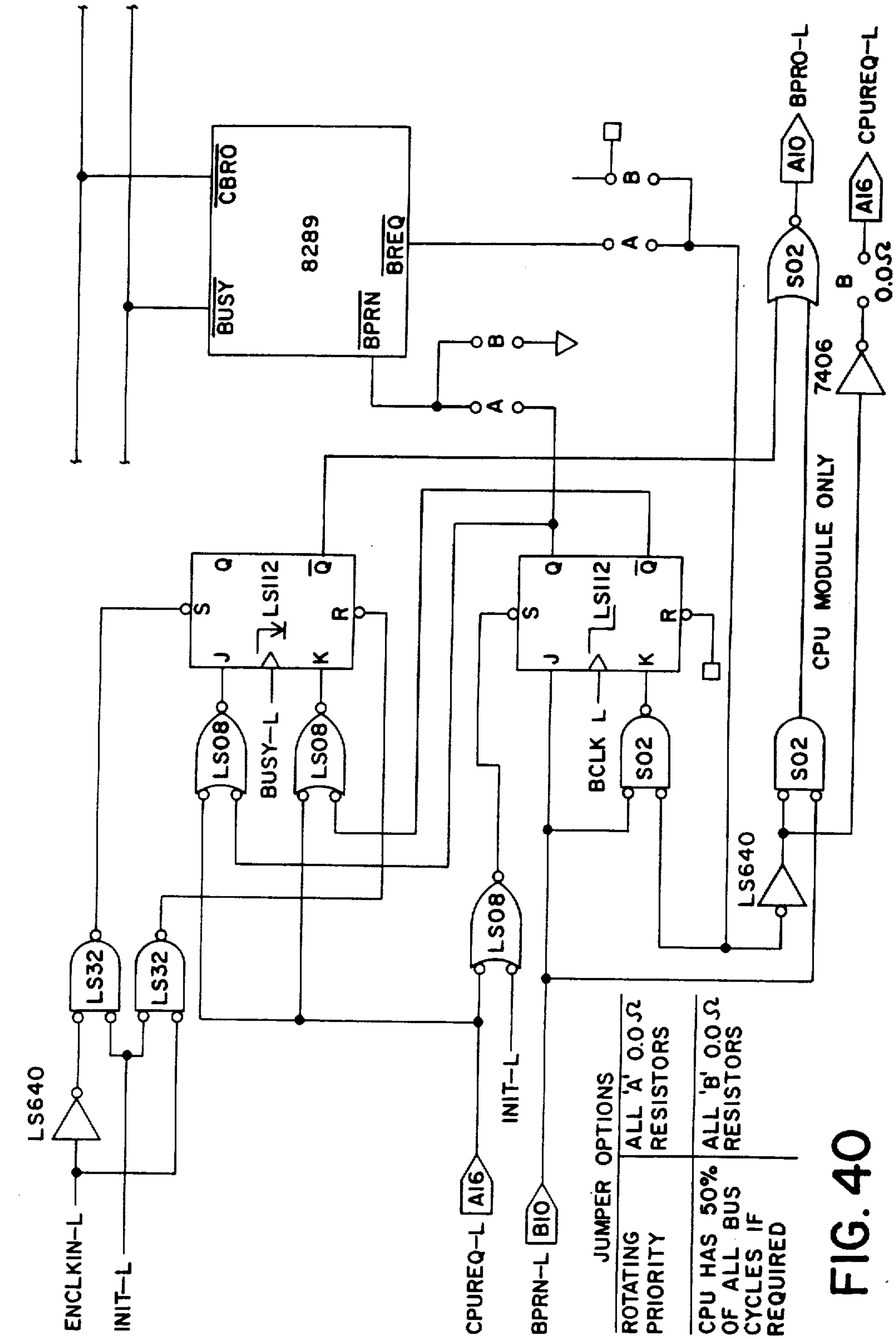
FIG. 40 is a further schematic diagram regarding the bus arbitration circuitry.
Figure 41:
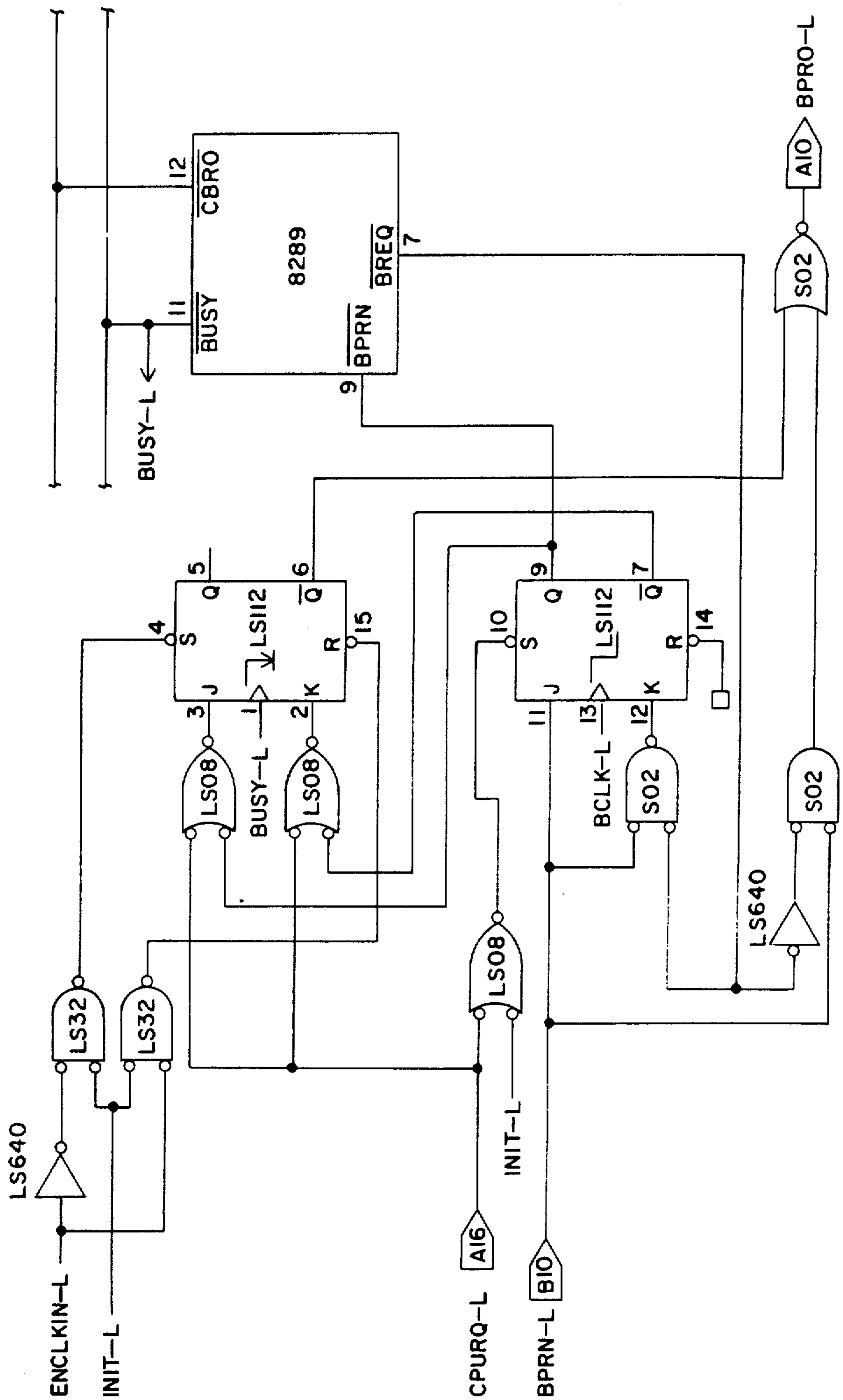
FIG. 41 is a further diagram regarding the bus arbitration circuitry.

The time to change bus masters is a delay inherent in the bus arbiter chip (Intel Corporation type 8289, see FIGS. 39–41). The bus arbiter on the current bus master may take up to 2 BCLKs and 2 CPUCLKs to relinquish the bus once it is finished its cycle and an additional 1 BCLK for the bus arbiter on the new bus master to grab the bus. With a 5 Mhz BCLK and a 5 Mhz CPUCLK, the time to transfer the bus is 1 microsecond.

Bus arbitration initiates a transfer acknowledge timeout (XACK time out). Once the bus is requested, a 6 millisecond timer is set. If the timer times out before the bus is acquired, an interrupt and a READY to the CPU module are generated. Under normal circumstances, the public bus is acquired before a timeout occurs. If the public bus is acquired and an XACK is not returned within the 6 millisecond time period, the CPU module is interrupted and a READY is generated. The XACK timeout interrupt is latched and cleared by software. This is done by creating a rising edge on Bit 5 of PPI2, Port C on the CPU module. The sequence for doing this is presented below:

| ADDRESS | DATA | COMMENTS |
|---|---|---|
| 36 H | OB H | Set Bit 5 |
| 36 H | OA H | Reset Bit 5 |

Figure 38:
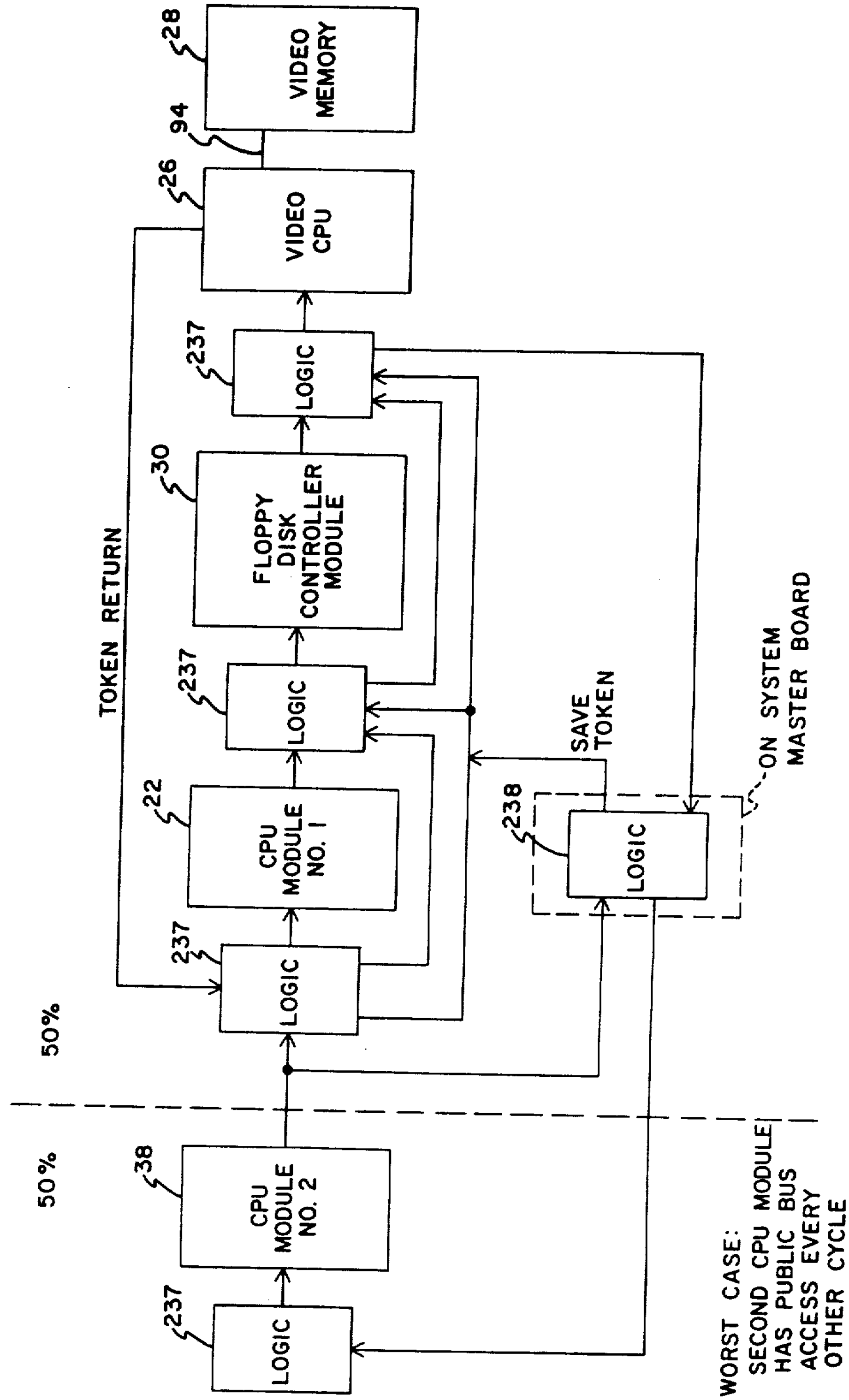
FIG. 38 is a block diagram of the privileged rotational priority mechanism.

FIG. 38 diagrammatically shows operation of the bus arbitration scheme for the second CPU module configuration. It is seen that each module has an associated logic section 237 with the system master board having an additional logic module 238. The logic circuit 238 retains knowledge of the previous token owner when the token is requested by the second CPU. An example is where the floppy disk controller has access to the token and thus access to the public bus. If the second CPU module requests the token, it is transferred from the floppy disk controller to the second CPU. The logic module 238 retains knowledge that the floppy disk controller previously had the token and when the second CPU is finished with the token or when the 50% duty cycle has been completed, the token is transferred back to the floppy disk controller.

FIGS. 39, 40 and 41 are detailed schematics for the logic portions 237 and 238 illustrated in FIG. 38. More particularly, FIG. 39 shows the detailed schematic for the logic sections 237 associated with any of the modules (that cannot be bus system masters) interconnecting to the public bus. Such modules include the floppy disk controller modules, the memory modules, the Winchester hard disk control module, general purpose communication modules, and local area network interface modules. FIG. 40 illustrates the logic section 238 associated with the system master when the system master is a CPU module 22. FIG. 41 is a detailed schematic of the logic section 238 when the system master is otner than a CPU module 22. The components shown in these schematic diagrams are of the 74 LS series, where indicated, or are Intel Corporation components such as the Intel 8289 bus arbiter shown in FIGS. 39, 40 and 41.

SOFT INTERRUPT MECHANISM

Figure 26:
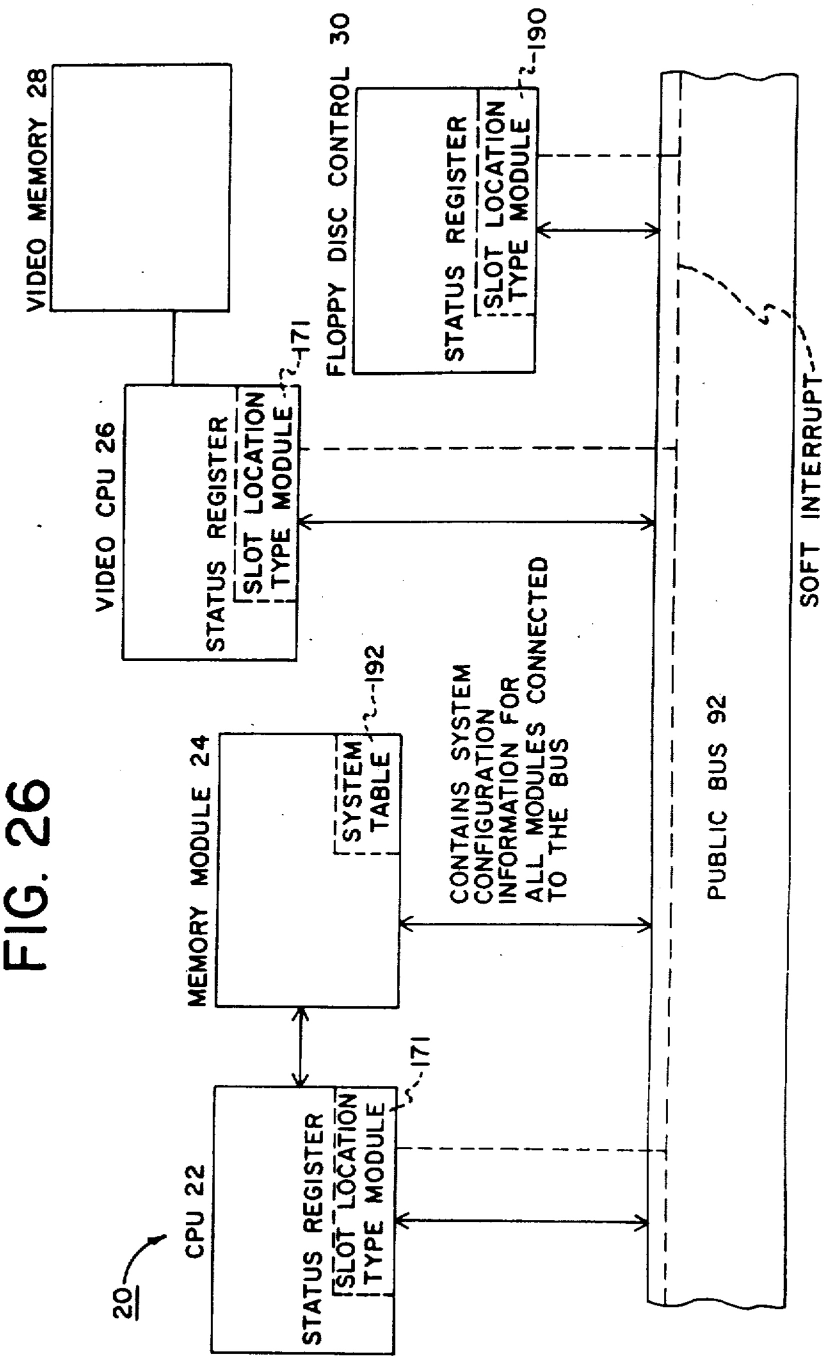
FIG. 26 is a block diagram illustrating the soft interrupt mechanism of the present invention.

As best seen in FIG. 26, each module forming the man-machine interface 20 has a dedicated status register 190 which contains information regarding the slot location of the module (that is which slot in the cabinet the module is placed, see FIG. 2), as well as information regarding the type of module in that particular slot. In this regard information is stored in the status register to indicate whether the module is a CPU, a floppy disk control module, a video CPU module, a video memory module, a hard disk control module, etc. As power is applied to the man-machine interface through power supplies 110 (see FIG. 1), an initial check is made of each slot of the MMI to determine if a board is in the slot as well as determine the type of board. This information, residing in status register 190 for each module, is then transferred to a dedicated portion of the memory module 24 known as the system table 192. This information can then be read by other modules so as to know the location of the remaining modules forming the man-machine interface as well as their location. This facilitates communication between the modules over public bus 92.

If, for some reason, after power up a module is switched from one slot location to another, a different module addressing that moved module will not be able to access it through the information stored in the status table. Such a change would result in an ACKNOWLEDGE TIME OUT signal being generated at the requesting board; thereby indicating to itself that the slot location at which it thought a particular module was located is no longer correct. This information can then be reported to the CPU module 22 where appropriate corrective actions may be taken.

This situation may also arise from a module failing even though its slot location has not changed. In any event the requesting module can determine through its own ACKNOWLEDGE TIME OUT that that particular module is not operating properly. This information can then be transferred to the CPU so that corrective action may be implemented.

Figure 27:
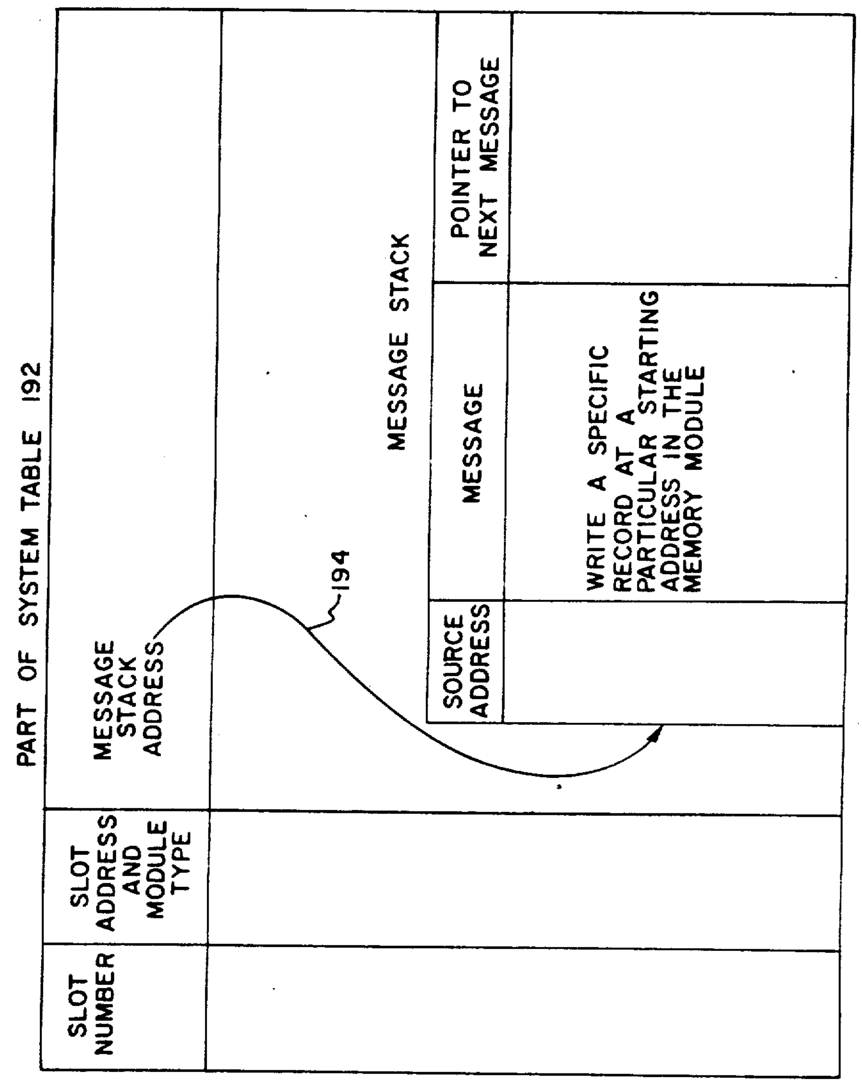
FIG. 27 is a block diagram of the system table in the memory module used for implementing the soft interrupt mechanism.

Information can be communicated from one module to another through the use of what is known as a "soft interrupt." Referring to FIG. 26, it is possible that the video CPU 26 wishes to send a record to the floppy disk control board 30 for storage on the floppy disks 76 (see FIG. 1). The video CPU 26 does this by placing a command in a message stack for the floppy disk control module 30, the message stack forming part of the system table 192. FIG. 27 shows in more detail the portion of the system table in which the message stack is located.

Continuing the example, the video CPU identifies the slot address of the floppy disk control board, and it uses the slot address to present an interrupt to the floppy disk control board. This interrupt is a soft interrupt in that the command to be executed is stored in the floppy disk control board's portion of the message stack.

The video board upon placing the soft interrupt to the floppy disk control board enters a suspended state waiting for the floppy disk control board to become active due to the soft interrupt. The floppy disk control board upon receipt of the soft interrupt signal goes to the system table (see FIG. 27), and using its slot address finds the beginning of the message stack (the conceptualized pointer 194). It thereby finds the message placed into the stack by the video CPU, the message in turn containing the command for execution by the floppy disk control board and the address of the location where the record is stored in another portion of the memory module 24.

The floppy disk control board at this point informs the video CPU board that it is processing the command placed in the message stack while at the same time initiating execution of the command. In the example, this is writing the record from the floppy disk control board to the indicated location in the memory module.

While the floppy disk control module is executing the command from the video CPU, the video CPU can be either looking at the floppy disk control board's system table entry waiting for the message status to change state; that is, to change from a conceptualized "DO A WRITE" to a conceptualized "THE FLOPPY IS NOW PERFORMING THE WRITE", or the video CPU can go off and do a separate routine while it is waiting for the floppy disk control board to complete the write command. Both mechanisms can be used depending upon the overall efficiency required of the man-machine interface.

In our given example, the floppy disk control board eventually completes the write operation and at this point it notifies the video CPU board that the write command has been completed so that the video CPU can use the area of shared memory where the record has been written. This information can be transferred to the video CPU from the floppy disk control module by either changing the system table entry (that is the request for the floppy disk control board to perform the write) or by presenting a soft interrupt back to the video CPU. The floppy disk control board then removes the message from its message stack.

While the floppy disk control board is removing the message from its message stack, it looks to see if there are any other messages placed in the stack by any boards including the video CPU board. If there are, it examines them to see which one is of highest priority and executes the message with the highest priority, unless they all have the same priority, in which case the next sequential command is executed. This continues with the floppy disk control board executing each of the messages placed in its message stack, the floppy disk control board informing each approximate module that its message has been completed, and the floppy board removes each message from the stack upon its completion. This continues until each message in its stack has been executed.

The same situation exists for the other modules which have direct access to the public bus. Consequently an interrupt system is provided which can accommodate multiple interrupts with various priorities while limiting the number of interrupt lines and with utilization of a single status register associated with each module in order to implement the interrupt mechanism.

Furthermore, a module which wishes to place an interrupt in another module's message stack can examine the messages already there to ascertain their priority and, depending upon its own priority, insert the message in the appropriate place in the message stack.

Furthermore, the soft interrupt's mechanism provides the ability for a module to terminate execution of a previously entered command due to an interrupt received having a higher priority than that presently under execution.

For example, while the disk control module is reading a record from an associated disk for placement in the memory module, it may receive a request from the CPU 22 which requires it to respond to a query regarding the floppy board's proper operation. This message could be left in the message stack for the floppy disk control board with the interrupt again being placed in the status register 190 for the floppy disk control module by the CPU module. Upon receipt of this signal, the floppy disk control module examines the message in its message stack and determines its priority as being greater than that of the read operation as left by the video CPU. Consequently, it suspends the operation taking place for the video CPU and responds to the request by the CPU module. Upon completion of that command (including the removal of the message from its message stack and the transferral of a soft interrupt to the CPU module informing it that the message has been executed) the floppy disk control module returns to complete the execution of the read operation requested by the video CPU module.

Figure 28C:
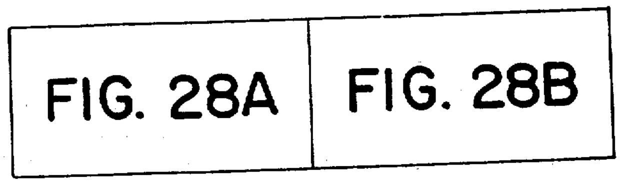
FIG. 28C is a diagram showing how
Figure 28A:
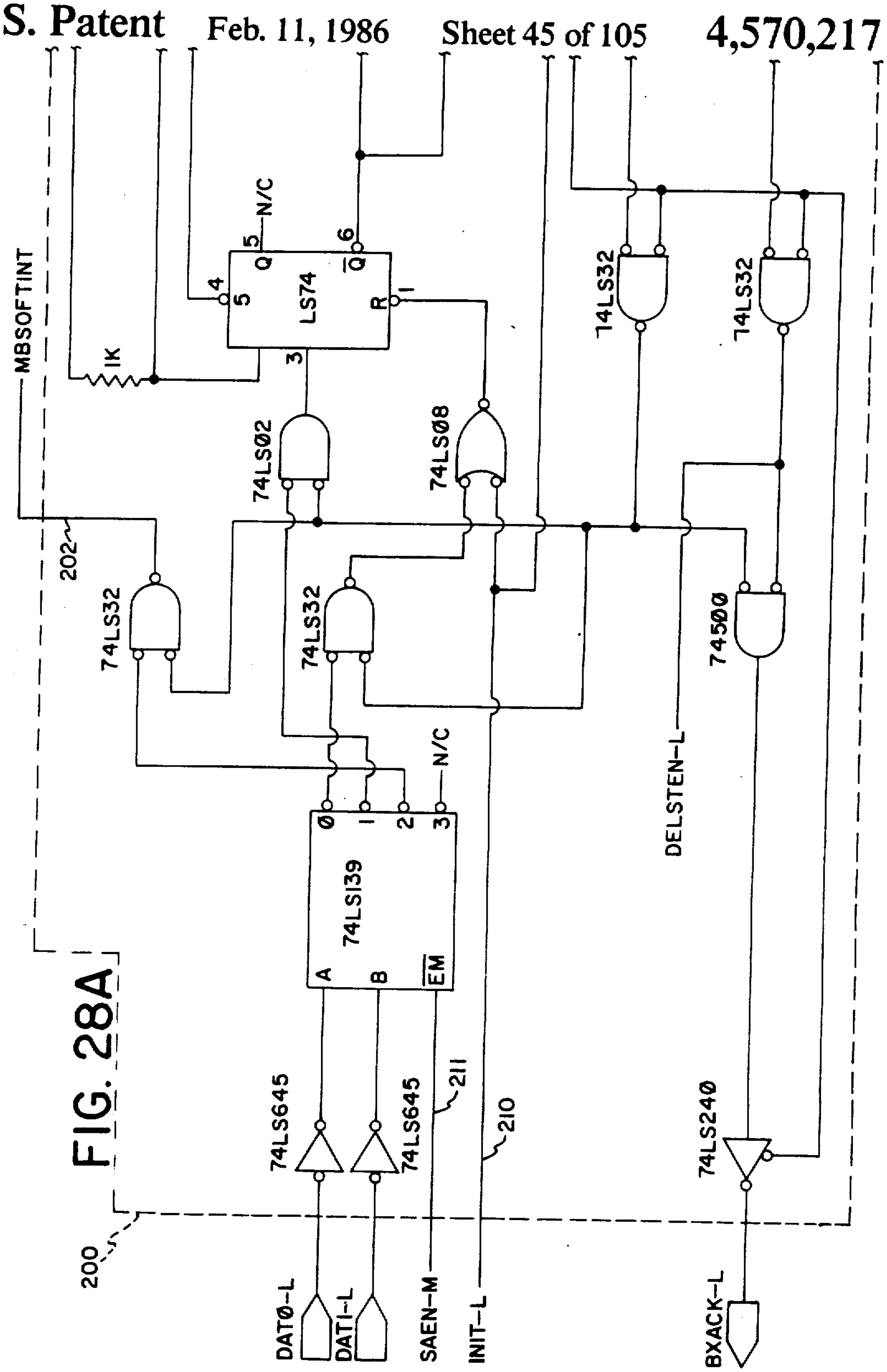
FIGS. 28A and 28B form a schematic diagram illustrating the soft interrupt circuitry.
Figure 28B:
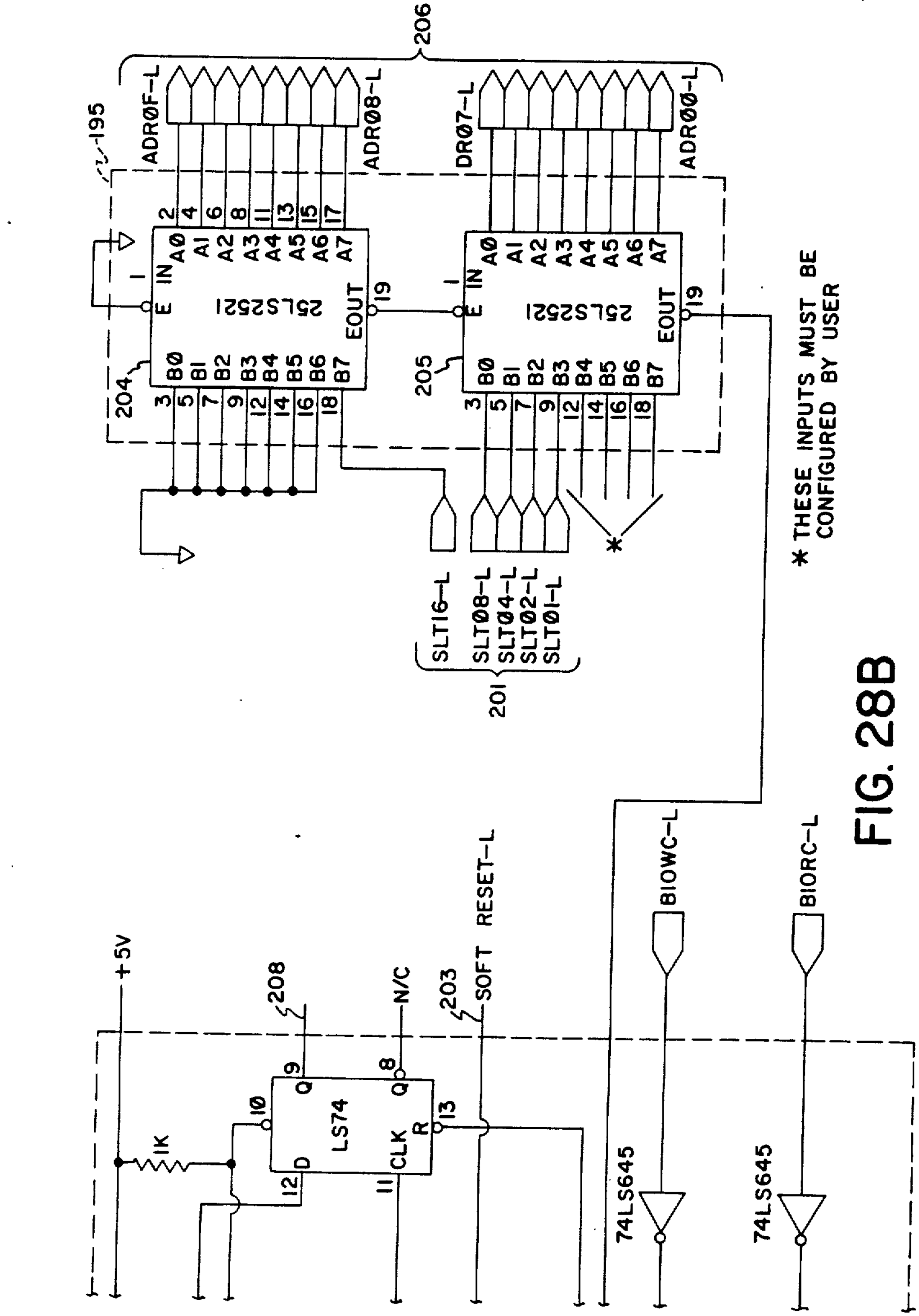
Figure 29:
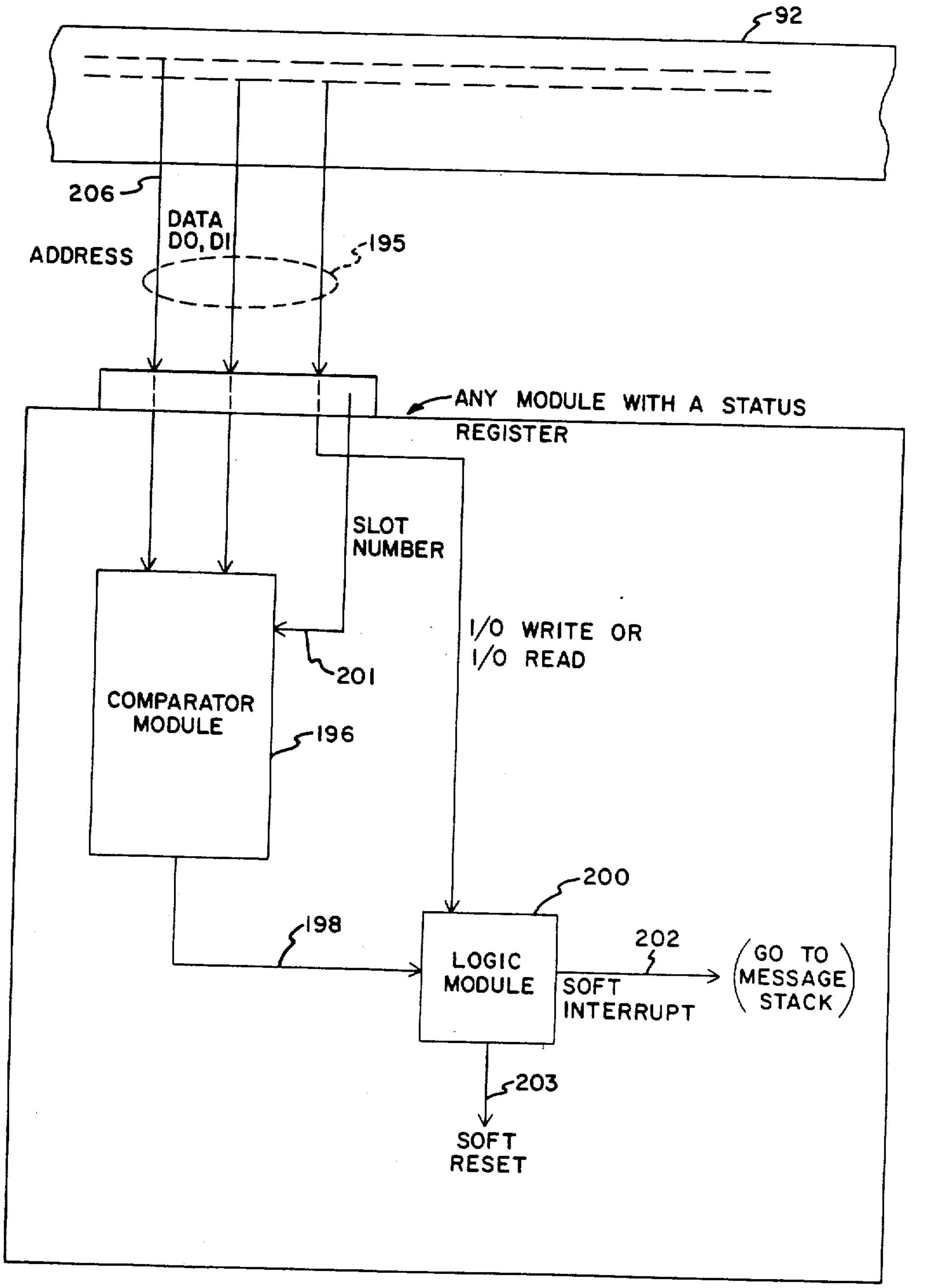
FIG. 29 is a diagrammatic representation of a portion of the soft interrupt mechanism.
Figure 30:
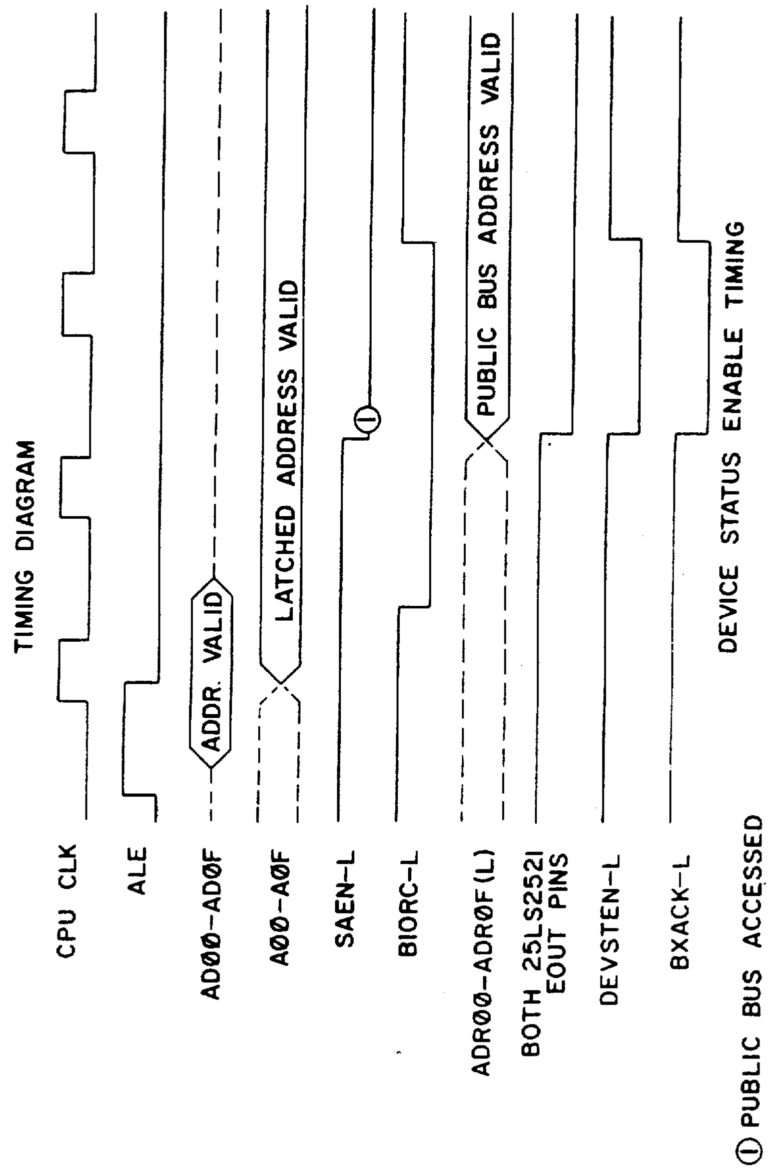
FIG. 30 is a timing diagram associated with the schematic diagram of FIG. 28.
Figure 31:
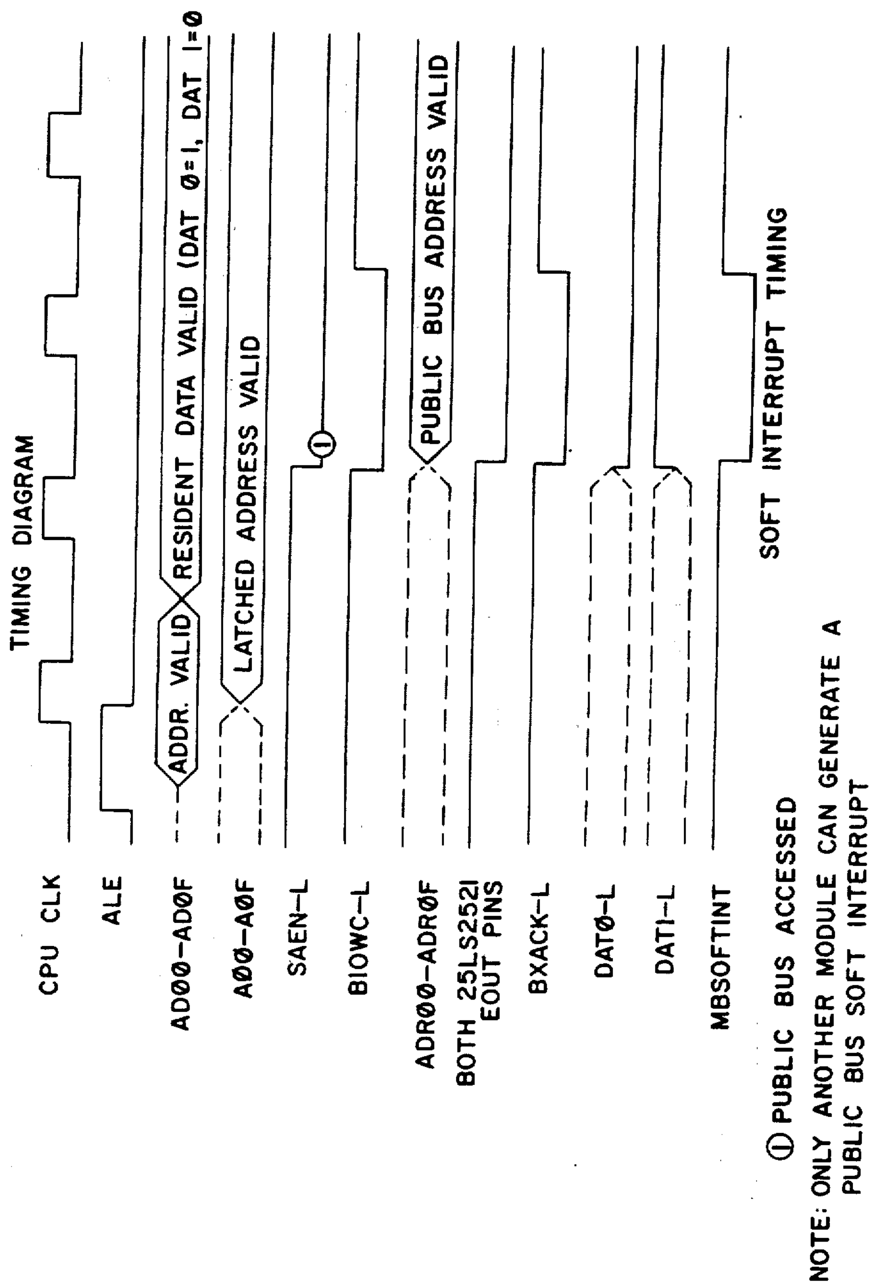
FIG. 31 is a further timing diagram with respect to the soft interrupt mechanism.
Figure 32:
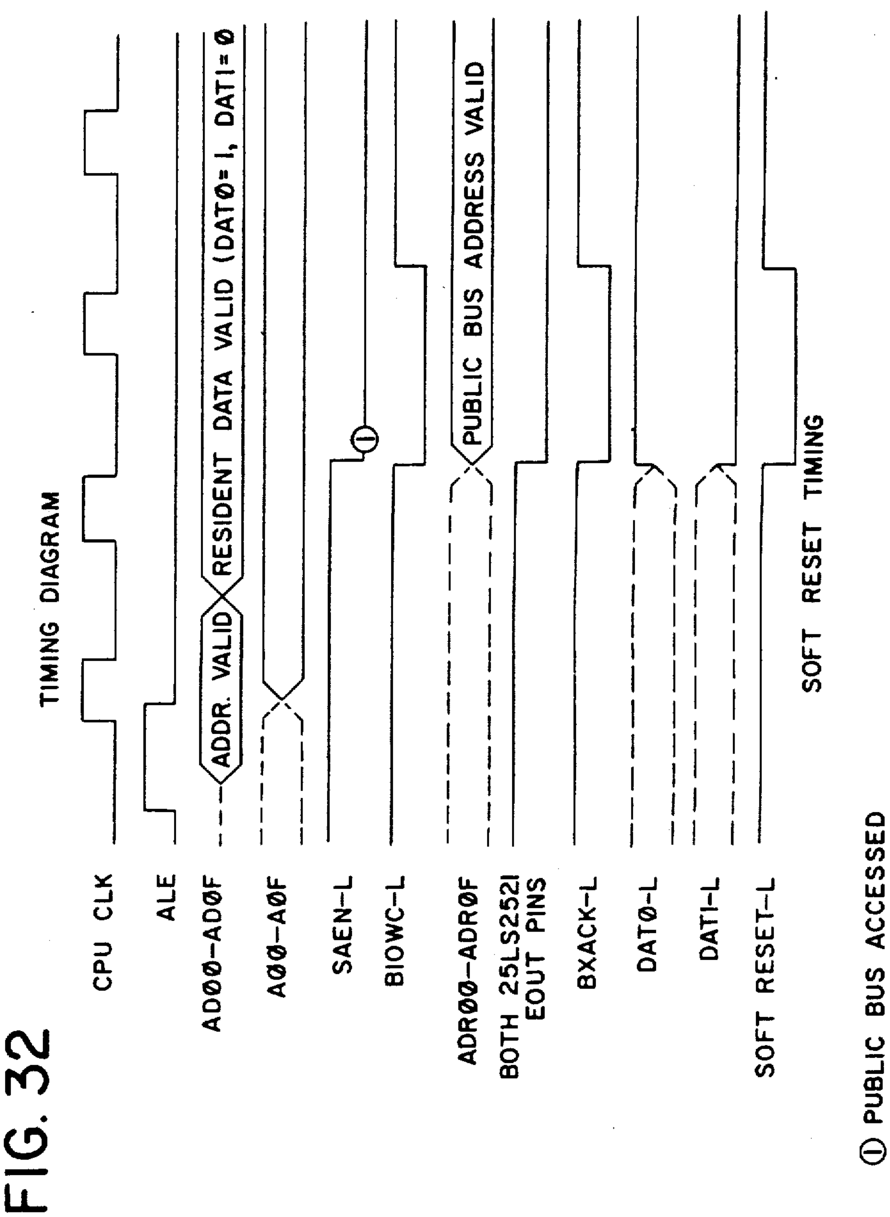
FIG. 32 is another timing diagram with respect to the soft interrupt mechanism.
Figure 33:
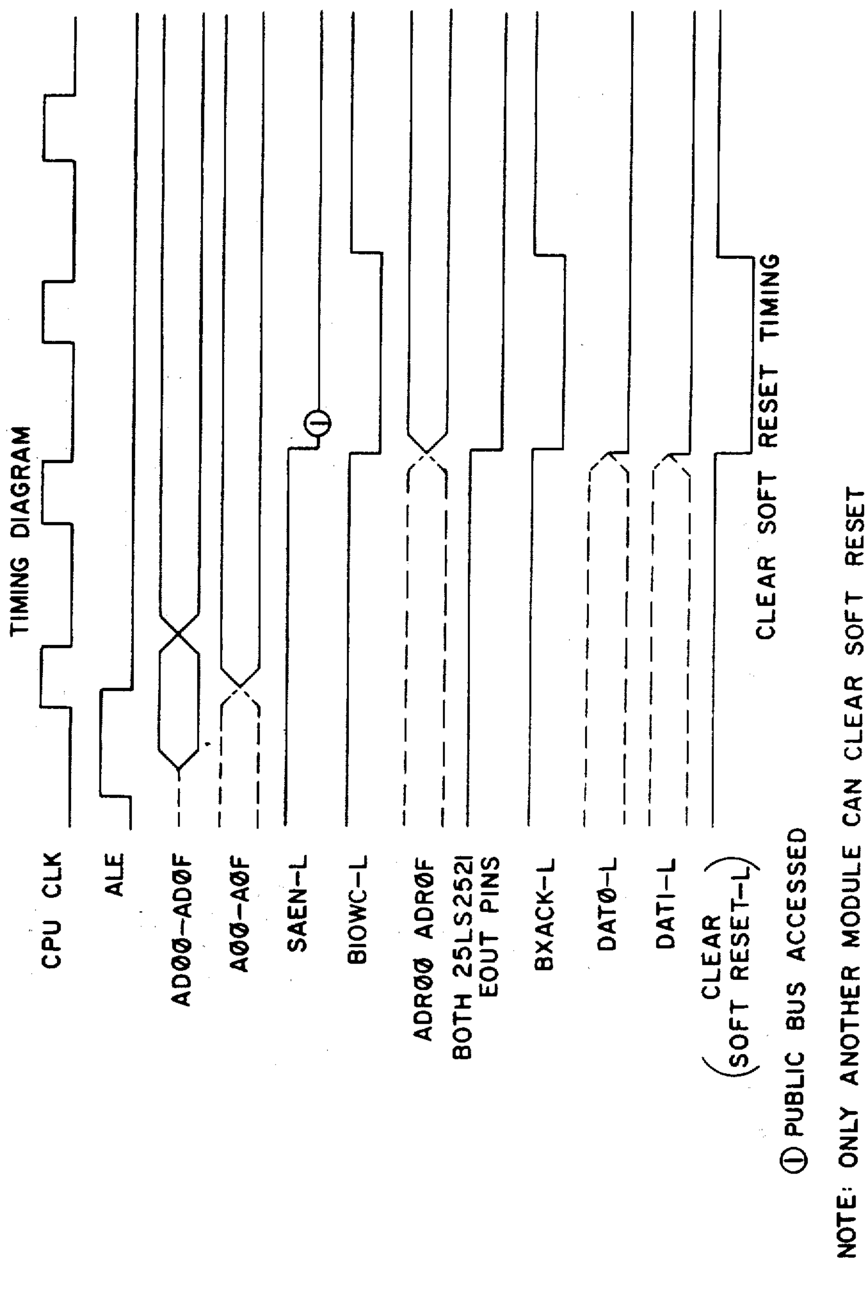
FIG. 33 is a further timing diagram with respect to the soft interrupt mechanism.

The actual circuitry to implement the software interrupt signal to the status register associated with the modules is shown in FIG. 28. The circuitry shown there is embodied in each module capable of receiving a soft interrupt. The operation of the circuit in FIG. 28 is shown in FIG. 29. Thus, a software interrupt signal generated by a module really is a message which is only interpreted by the designated module, such as the floppy disk control module shown in FIG. 26. In order to differentiate the proper module, the incoming software interrupt signal 195 comprises an address field and a data field, both of which are transferred to a comparator module 196. If the number associated with the address corresponds to the slot number associated with that particular module, then an output signal 198 is generated which in turn is transferred to a logic module 200. The slot number information is obtained on each board by the physical location of the board in the slots. This information is shown diagrammatically by the incoming slot number 201 shown in FIG. 29.

The data bits D0 and D1 have a specific bit pattern for a software interrupt. Thus, a typical software interrupt has these bits set at 0 and 1 respectively whereas if the incoming information is to be interpreted as a soft reset (a re-initialization without a previous power-down), the bit pattern has to be a 10. This ensures that the module properly interprets the nature of the signal coming to it to determine if it is a soft interrupt or a soft reset. The logic module 200 is responsible for determining whether a soft interrupt or a soft reset is occurring on the output signal 198 and appropriately energizes the correct output line 202 or 203.

Thus, it is apparent that the 16 address lines coming to the module from the public bus 92 can be utilized for both memory and I/O functions. Thus, an I/O WRITE signal or an I/O READ signal is also sent to the module to properly inform it that an I/O function is being requested by the soft interrupt. These lines are also conceptually shown in FIG. 29. Similar lines exist for a memory READ or a memory WRITE. The logic module upon activating the soft interrupt line, in essence is conceptually activating a "doorbell" signal which informs that module to go to its message stack (its mailbox) in the memory module system table to determine the message corresponding with the received interrupt.

It should be noted in FIG. 29 that when the soft interrupt signal is enabled (line 202), the modules servicing that interrupt may either enable or disable the logic module so as to receive a second interrupt signal. Thus, in a typical application, the CPU 22 may disable the logic module while it is servicing a given interrupt, and only upon completion of that interrupt command does it go back and enable the logic module so as to receive another software interrupt signal. However, if during the time that it is servicing the first interrupt, a second interrupt is received, the logic module stores that information and consequently the CPU module knows that it must go back to the appropriate message stack to determine the next interrupt.

It is also conceivable that third, fourth and fifth interrupt signals are received during the servicing of a first interrupt and that these signals could be lost. In the soft interrupt procedure this does not occur since the message stack allows the placement of messages therein even if the software interrupt signal to the particular module is not processed. Thus, when the module completes servicing of the first interrupt message, it looks at the message stack to see if any remaining messages exist and executes those messages even if they were queued while it was servicing the first interrupt message.

As explained earlier, FIG. 28 shows the detailed circuit components for performing the receipt of a soft interrupt message at the module level. There are four major functions associated with this circuit, one being the public bus soft interrupt, the second being a latched soft reset, the third being a clear soft reset, and the fourth being a module status. As explained earlier, the CPU floppy disk control board or any other module that is to receive a soft interrupt must be I/O addressed to enable anyone of the previously mentioned functions. The I/O address range of the public bus is FE00 hexadecimal to FFF0 hexadecimal. The upper seven bits of these addresses are fixed to FE for the first rack of eight modules. The number is FF for the second rack of eight modules. Thus, as explained in previous sections, the public bus can service up to sixteen interconnected modules.

The next five bits (ADR04-L through ADR08-L) contain the module slot number for the module to whom the software interrupt signal is sent. The slot numbers start from 0 and end with binary 1111 so as to allow up to sixteen slots to have distinct addresses. The four least significant bits in the address can be set to 0 or can be configured to accommodate up to sixteen unique I/O locations. If they are used to define particular I/O locations, this portion of the address can be used to have more than one I/O device within a module at the same address. Thus, the comparison made by the circuitry in FIG. 8 is with respect to the rack and slot numbers received from the incoming signal.

As mentioned earlier, the central processing unit can determine which module is in any slot by issuing an I/O read to each slot. This is normally performed during power up. If there is a module within the slot being read, the signal DEVSTEN-L (Device Standing Enable-Low) enables the status register 190 (see FIG. 26) to output a unique code for that module. Along with this code, other information such as error signals can be read. If an I/O read is issued within a slot containing no card, a transfer acknowledge timeout signal is received by the CPU.

The comparator module shown in FIG. 29 comprises comparators 204 and 205. As seen in FIG. 28, the incoming address lines 206 are compared against five slot lines 201 and generally a fixed number FE as shown by input signals B0–B6 on comparator 204. Inputs B4–B7 on comparator 205 are configured by the user if different types of I/O locations are to be located within the same module, these latter four bits being compared with the four least significant bits from the address lines 206. The data 0 and data 1 lines 207 are transferred to the logic module 200 comprising the logic circuits shown in FIG. 28.

A public bus soft interrupt output signal 202 (identified by MBSOFTINT) is enabled by the interrupting device performing an I/O write to the module's I/O address with data equal to 01 hexadecimal; that is, with the data lines D0, D1 respectively set to the bit pattern 01. If bit pattern 02 hexadecimal is received, the soft reset line 203 (SOFT RESET-L) is latched low putting the module in an inactive state. To clear the reset, an I/O write to the same I/O address must be performed with data equal to 03 hexadecimal.

A status bit (signal RESSTAT-H) 208 is available in such a situation to determine the cause of the reset; that is, by a soft reset or by a power up via the line INIT-L 210. The output line SAEN-H 211 becomes active whenever this particular module has control of the public bus 92. This in turn disables decoder 212 which in turn ensures that it does not interrupt or reset itself while it has control of the bus.

The parts utilized in FIG. 28 are given in Table 36 and timing diagrams are given in FIGS. 30, 31, 32 and 33.

TABLE 36

| Reference Numeral | Part No. | Manufacturer |
|---|---|---|
| | 74LS645 IC | Texas Instruments |
| 212 | 74LS139 IC | Motorola |
| | 74LS240 IC | Motorola |
| | 74S00 IC | Signetics |
| | 74LS32 IC | Texas Instruments |
| | 74LS08 IC | Motorola |
| | 74LS74 IC | Motorola |
| | 1K OHM Resistor | |
| 204, 205 | 25LS2521 IC | AMD |
| | 74LS02 IC | Texas Instruments |

MEMORY MODULE 24

Introduction

As shown in FIG. 1, memory module 24 is the general memory board for the man-machine interface 20. It contains up to one megabyte of error correcting memory. The board is dual-ported; one port 33 is available to the public bus 92 and one "private" port 35 is available to the CPU 22. A hardware "fence" 167 is provided which segregates the memory modules' memory into two areas, a private memory 214 accessible only to the CPU module via private bus 94, and a shared memory 216 available to all modules via public bus 92. Upon first power-up, the memory module is initialized, so that no software intervention is required to correctly enable error correction and detection.

This section describes the hardware characteristics of memory modules. Since use is made the Intel Corporation's 8206 error correcting chips, reference is hereby made to Intel Corporation's data sheet for this chip.

Memory Module Block Diagram

Figure 24:
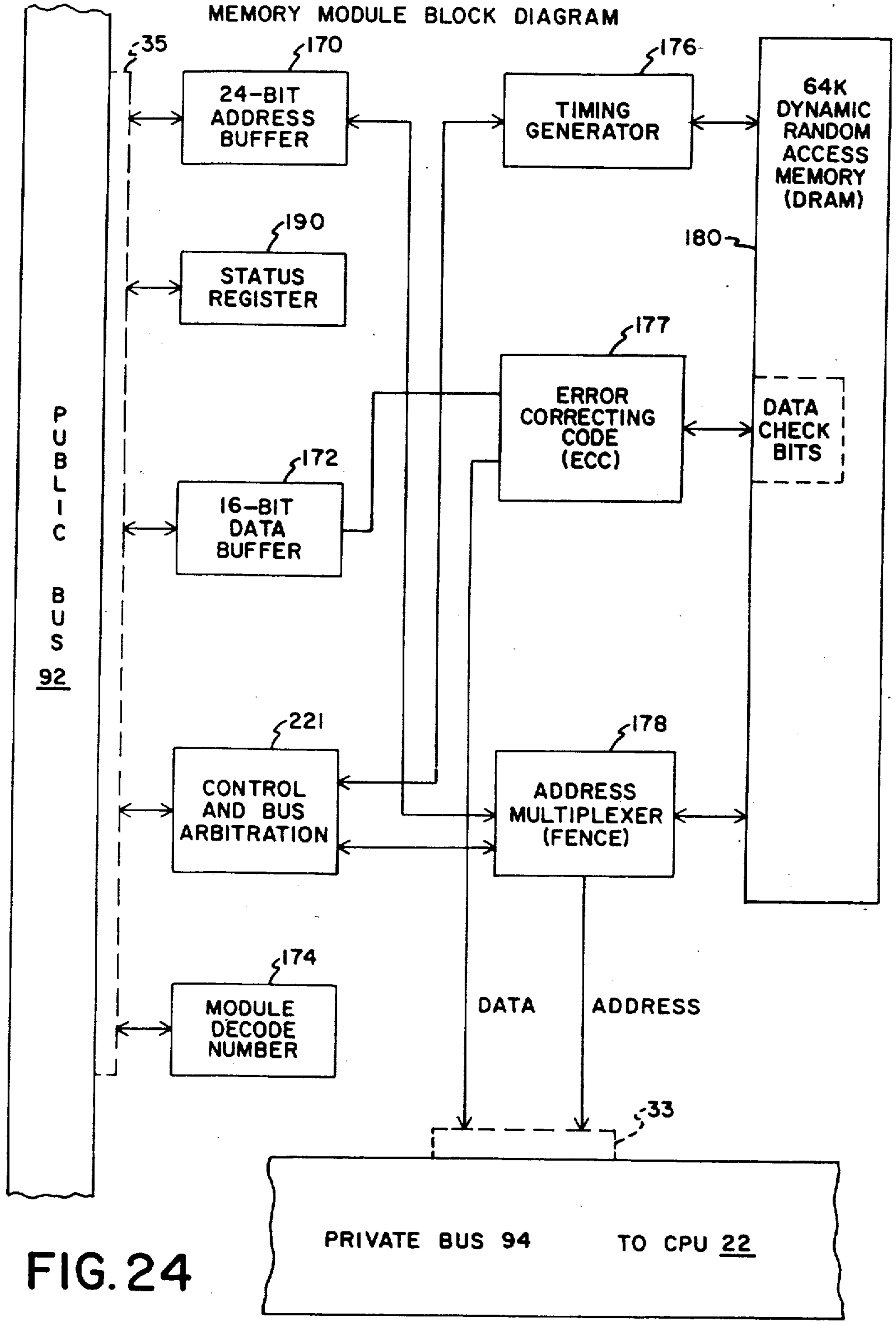
FIG. 24 is an overall block diagram of the memory module.

FIG. 24 is an overall block diagram of the memory module 24. The memory module comprises a 24 bit address buffer 170, a status register 171, a 16 bit data buffer 172, and a control and bus arbitration module 221 and a decode number module 174. The 24 bit address buffer, the status register, the 16-bit data buffer, the and control and bus arbitration module perform the same functions as discussed previously with respect to the CPU 22.

In addition, the memory module further comprises a timing generator 176, an error correcting code module 177, an address multiplexer including the fence circuitry 178 and a dynamic random access module 180. The address multiplexer 178, when the selected address from the public bus is greater than the fence value, provides the multiplexing to address the particular location in the dynamic random access memory 180 for either a read or a write operation. The operation and circuitry regarding the fence is described later in this section.

Memory Array 180

The memory 180 consists of up to 176 chips (Intel Corp. type 4864) divided into eight banks. The signals RAS, CAS WE (Write Enable) and CWE (Check Write Enable) are supplied to each bank separately. Data In to the DRAM 180 comes from the error correcting code (ECC), module 177 (an Intel Corporation 8206ECC) or from the CPU or public bus interfaces and parity chips (if parity checking rather than error correcting circuitry is used at module 177). DATA OUT from the RAM goes to the ECC module 177. Checks bits to the RAM come from the ECC module.

Address Multiplexer 178

The addresses for the DRAM 180 come from either the public bus or from the CPU ports. A comparator serves to select this memory board if addresses are in the range of the board. Addresses from the CPU port are fed directly into the address multiplexer 178. Addresses from the public bus are first routed into a comparator to determine if the input address is in the board's range. Addresses as seen over public bus lie on one megabyte boundaries.

After address offset and bounds checking, the public bus address is compared to the fence address. Only if the address is greater than the number in the fence latch is a cycle requested (see discussion of fence circuitry later in this section). Addresses are routed to the DRAM 180 via the address multiplexer. Type 74S151 multiplexers are used to ensure no buffer contention exists. The inputs to the multilexer are:

Public Bus Row
Public Bus Column
CPU row
CPU Column
Refresh Row
Refresh Column

A full 16 bit address is given to the memory chips during refresh. This is because not only do refresh cycles refresh rows of all 176 chips comprising DRAM 180 but, they also scrub errors of one bank of chips. It is this error scrubbing which requires the complete address (see discussion of such systematic error detection and correction in the present assignee's U.S. patent application Ser. No. 972,440, filed Dec. 22, 1978, inventor Richard E. Morley, entitled "Systematic Memory Error Dection and Correction Apparatus and Method"). The timing generator 176 performs system timing for read and write requests.

Functional Description

Key functional descriptions for the memory module are presented in the following subsections.

Initialization

The error correction facilities require that the data bits and check bits stored as corresponding items should always be consistent. Upon module power up, there may be differences between these two types of bits. The memory hardware therefore goes through all locations on the memory board and sets each bit to zero with the appropriate check pattern. During this time period access to the memory is denied to both ports (public bus port 35 and CPU private bus 33).

The initialization operation takes approximately 0.6 seconds. Initialization only occurs on power-up, not on re-initialization (soft reset).

Memory Size and Data Path Width

The memory module uses 64K dynamic random access (DRAM) chips so that up to one megabyte can be addressed. Following Intel Corporation convention, memory can be addressed by either port in both WORD or BYTE units. The public bus port supports data on either 8 or 16 data lines, while the private port supports data presented on 16 lines only.

Error Detection and Correction

The memory board can be configured for error detection using one parity bit per word, or for error detection and correction using a modified Hamming code using six bits per word.

Parity Error Detection

This memory when so configured uses ODD parity. Use of parity requires the addition of one memory plane (17 bits per word instead of 16). Detection of a single error per word is guaranteed. If there are multiple errors per word, it is possible that no error detection will take place. Upon detection of a parity error, an interrupt is generated. The memory then sends the interrupt to either the host CPU (CPU module 22) (via the "private" port) or to the public bus, depending on which port has control of the memory at the time the interrupt is issued.

Hamming Error Detection and Correction

The use of Hamming codes provides the capability to correct all single bit errors and detect all double bit errors in a word. In addition, some multiple (three or greater) errors may be detected. Twenty-two bits per word are required to implement the Hamming code. Of these, 16 bits are for data bits and 6 bits are for the Hamming code.

Only five bits are normally required to correct single bit errors in words of sixteen bits (i.e. normal Hamming code), but if double and some multiple errors are to be detected the Hamming distance must be increased by using an extra-check bit, making six in all (i.e. modified Hamming code).

When a single error occurs in any cycle, the hardware automatically corrects the data. The occurrence of a correction is logged in the ERROR LOG counter. The correction is invisible to the CPU module and other items communicating through the public bus. Corrections are not logged when they occur during a refresh cycle.

It should be noted that the gross error conditions of all bits set or all bits cleared are detected. This is because the first two check bits are formed using the XNOR function. Hence there is always at least one bit set in the 22 bit word as a whole.

When a double error per word occurs, an interrupt is generated. The hardware routes the interrupt to the device (public bus or CPU) which caused the error to occur. If double bit errors occur during a refresh cycle, the interrupt is routed to the CPU module 22.

In addition, the error-correcting memories are periodically "swept" clean of errors. This is done in the memory module during refresh cycles. A refresh cycle occurs approximately every 15 microseconds. When refreshing the RAS lines of memory chips, a READ-MODIFY-WRITE cycle is performed on one bank of chips, "sweeping" out any errors in this unique location. Every location is "swept" at least once every eight seconds. This process is fully described in the previously cited pending U.S. application Ser. No. 972,440. All memory cycles are always READ-MODIFY-WRITE Generation of Check Bits The check bits are formed by exclusive OR-ING, or exclusive NOR-ING together various data bits. Table 83 outlines which bits are used to derive the appropriate check bit (and the operation performed on them).

TABLE 83

| CHECK BIT | OPERATION | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| 0 | XNOR | X | X | — | X | — | X | X | — | X | — | — | X | — | X | — | — |
| 1 | XNOR | X | — | X | — | — | X | — | X | — | X | — | X | X | — | X | — |
| 2 | XOR | — | X | X | — | X | — | X | X | — | — | X | — | X | — | — | X |
| 3 | XOR | X | X | X | X | X | — | — | — | X | X | X | — | — | — | — | — |
| 4 | XOR | — | — | — | X | X | X | X | X | — | — | — | — | — | X | X | X |
| 5 | XOR | — | — | — | — | — | — | — | — | X | X | X | X | X | X | X | X |

Whenever an X is shown in Table 83 that bit is part of the function to find the check bit. For instance, check bit 5 is the exclusive or of the last 8 bits.

Certain data patterns have been determined that selectively set a single check bit while leaving the remaining bits, zeros, and another set of patterns that selectively reset a single check bit while leaving the remaining bits ones. There are no data patterns that set all or reset all check bits.

Setting the Bit Fields in Correction Bits

Table 84 illustrates where single bits are set to one with the remaining bits left zero.

TABLE 84

| DATA | CHECK PATTERN |
|---|---|
| 0800H | 20H |
| 0020H | 10H |
| 0001H | 08H |
| 5020H | 04H |
| 2410H | 02H |
| 4410H | 01H |

Table 85 illustrates where single bits are set to zero with remaining bits left ones.

TABLE 85

| DATA | CHECK PATTERN |
|---|---|
| 0010H | 1FH |
| 0400H | 2FH |
| 8000H | 37H |
| 040AH | 3BH |
| 0824H | 3DH |
| 0822H | 3EH |

Memory Arbitration

There are two portions of the MMI that use the memory module; namely the public bus and the host CPU module. Access to the memory is awarded on a rotating priority basis. Refresh is always the highest priority in accessing the memory. When a refresh cycle is requested by the on-board timer, it is always granted within 571 nano seconds (one cycle time).

If the CPU module requests access, and the public bus is not requesting access, then a cycle is granted to the CPU. If the public bus requests access and the CPU module is not requesting access, then a memory cycle is granted to the public bus. If both the CPU and the public bus request cycles, they are granted cycles on a "round robin" basis. Further details on the memory arbitration are set forth in the CPU module section.

Memory Addressing From CPU

When addressed by the CPU, the memory module addresses always begin at 0000 and continue to the highest stuffed location. The highest location is indicated by the memory size value which can be read from an I/O port (see later), while the size bits (3 of them) indicate the number of 128k byte segments. Table 86 presents the relationship of the memory size bits to the actual memory size.

TABLE 86

| Memory Size Bits | | | Actual Size 128 kbyte blocks (⅛th of a megabyte) |
|---|---|---|---|
| memsize2 | memsize1 | memsiz | |
| 0 | 0 | 0 | one |
| 0 | 0 | 1 | two |
| 0 | 0 | 0 | three |
| . | . | . | . |
| 1 | 1 | 1 | eight (one megabyte) |

READY is not returned to the CPU if the addressed location does not exist. Memory begins at 0000 to guarantee that there are physical locations for interrupt vectors. Interrupt vectors are stored in the bottom 1K area of the processor's memory space. The CPU addresses only one memory board through its private port.

Memory Adressing From The Public Bus

When addressed through the public bus, the memory module addresses begin at fixed locations. The start address lies on a one megabyte boundary of the sixteen megabytes address space (see discussion of total shared memory address space in section entitled Man Machine Interface Architecture) . This start address can be read in a manner similar to that for the size bits. It is a four bit field indicating which boundary the memory begins on.

The space addressable by the public memory starts at the location indexed from the start address by the fence value and continues to the highest stuffed location. READY is not returned to the public bus if the addressed location does not exist or if the addressed location is a fenced-off area. No interrupt is issued by the memory if an attempt is made to read or write into the fenced-off area. There can be an XACK time-out interrupt generated on the accessing module.

Fence 167

The memory module is provided with a hardware "fence". The fence is a feature which provides protection to that portion of memory (called private memory 214) which is used by the CPU for program storage. The fence prevents accesses from the memory module's public bus port from writing to this protected area. The CPU module sets the fence address relative to its own address space; this means that the fence address is set without regard to where into the memory module space the memory is mapped. The fence address always represents the lower bound of the allowable space accessible by the public bus. The public bus port therefore can access memory in the range defined by the fence address and the highest location stuffed on the board. The fence location lies on a 4K boundary.

The fence is "off" after power is applied to the board. The fence is activated by writing to it. This is done in case the memory board is used without the private port connection; by having the fence initially "off", the entire address space is then available to the public bus.

Figures 23A, 23B:
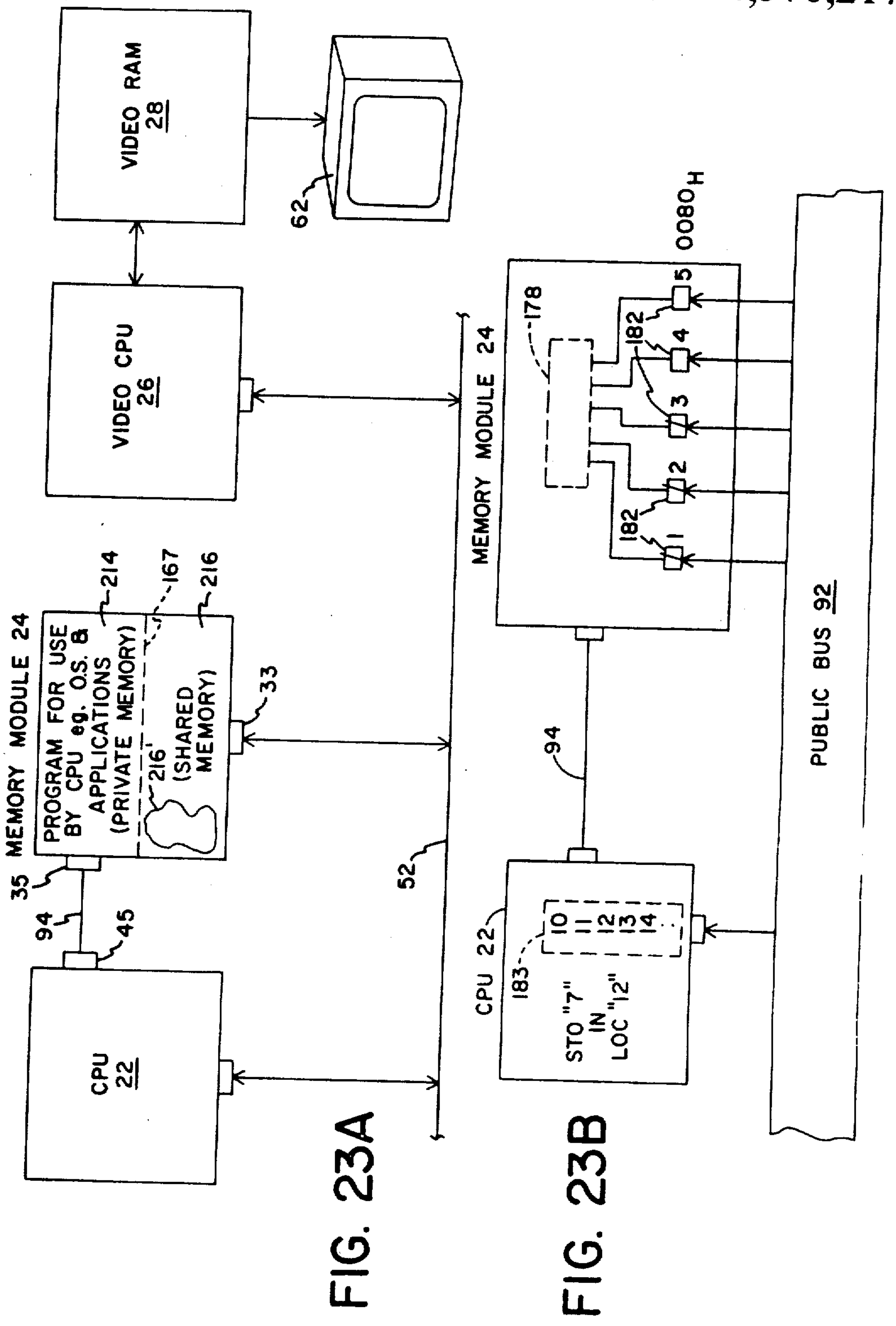
FIG. 23A is a block diagram illustrating the transfer of data between modules through use of shared memory within the memory module.
FIG. 23B is a diagrammatic representation of a location in the CPU module and its transfer to the memory module for establishing a fence location.

As best seen in FIGS. 1A and 23A, the fence is a conceptualized boundary for the memory module 24. The CPU module 22 may access any portion of the memory module including the private memory portion 214 and the public or shared memory portion 216. The CPU module can access both memory portions either through the private bus 94 or the public bus 92. However, most data transfers between the CPU module and the memory module are performed through the private port 94 in order to limit the loading on the public bus by the CPU; and thereby allow the public bus to be accessible to the other modules on the bus for a greater percentage of time (see FIG. 1).

A typical example in which the memory module is utilized is in the presentation of color graphics. Typically the CPU module 22 generates the high level graphic commands as interpreted from program instructions in private memory 214 and transfers the interpreted commands to a region of the shared memory such as that shown by region 216'. In this region, the video CPU module 26 can access the instructions as placed there by the CPU module 22 and then interpret them so as to generate the bit pattern in the video RAM module 28 for presentation on monitor 62.

Thus the region of shared memory 216' is accessed by both the CPU module 22 and the video CPU 26. While the video CPU 26 interprets those commands. the CPU module 22 can update the graphic information by rewriting portions of the interpreted commands in shared memory 216'.

As seen in FIG. 23B, the operation of the fence can be seen as the control of comparators 182 located at a particular memory module address 0080H. CPU module 22 has a memory map I/O region at which a particular unit of data can be stored at any location. In the given example, the number 7 is stored in I/O location 12, the number 7 being translated into the binary number 111 so as to disable comparators (gates) 1, 2, and 3 at address location 0080 in the memory module. That is, the number stored at memory map location 12 is transferred directly to the address in the memory module corresponding to the fence address. The public memory can only access the address multiplexer 178 if the address selected is greater than that set by the CPU at the fence address location 0080. Thus in the given example, if the public bus attempted to perform a read or write at a memory module address less than binary 111, the memory module through the fence would prevent access to the address multiplexer 178; thereby causing the module communicating through the public bus to be unable to perform a read or write operation to the selected address. If, on the other hand, the selected address is greater than binary 111, such as binary 11110, the number would be allowed to pass to the address multiplexer 178 for selecting the particular address location in the memory module.

Figure 25:
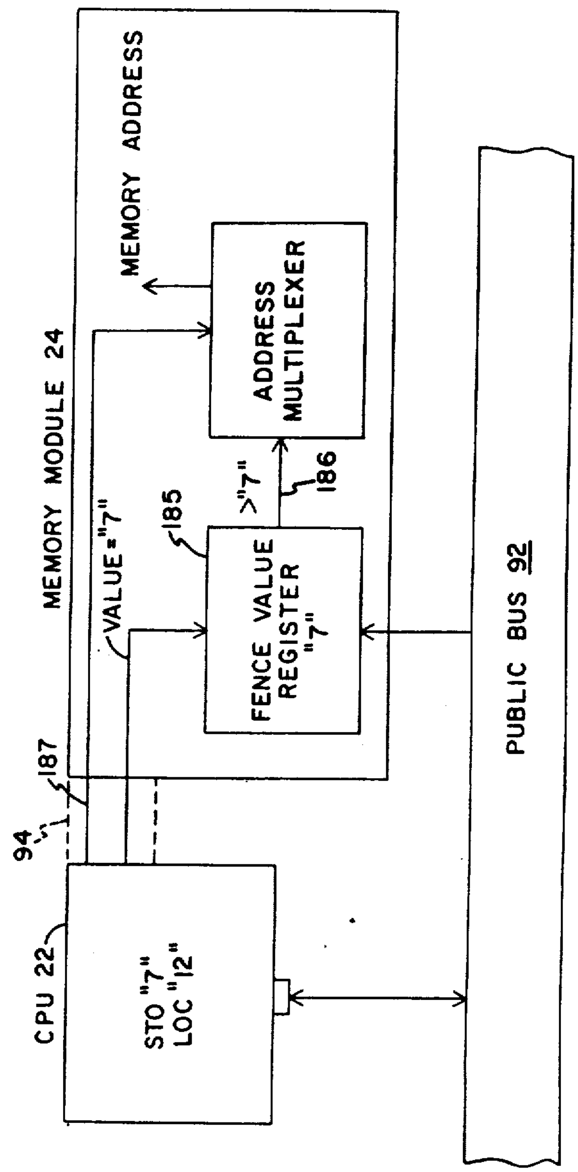
FIG. 25 is a diagrammatic representation of the CPU module and its use for implementing a fence value within the fence value register of the memory module.

More detail in the conceptualization of the fence is shown in FIG. 25. As shown there, the CPU is storing the value "7" at an I/O memory map location 12. This value get rransferred to the fence value register 185 in the memory module 24. The public bus may access the memory module only through the fence value register 185. If the address selected through the public bus is greater than the value "7", then the value is passed through to the address multiplexer as shown by line 186. Otherwise, the value is not passed to the address multiplexer thereby preventing a read or write by the module seeking the same.

On the other hand, the CPU has direct access to the address multiplexer through lines 187 and therefore the fence is transparent to the CPU through the private bus 94.

A schematic diagram of the components of the fence mechanism is shown in FIG. 17B. As seen there, the mechanism comprises a fence latch 161 which receives an 8 bit number from the CPU module over private bus 94. Since the memory module has a one megabyte address space, 20 bits are needed to define a unique address. The 8 bit number to the fence latch is therefore used to set the high order 8 bits of the 210 bit address space, and therefore has resolution of 4k bytes ($2^{12}=4k$). Consequently the fence location can be set anywhere in the memory module address space as that space is divided in 4k segments.

The value of the fence latch is split and transferred to two four bit comparators 175 and 181. This value is then compared to the eight most significant address bits coming to the memory module from the public bus. If the address input from the public bus is greater than the fence value, the fence violation signal 184 remains high, allowing the public bus to be assigned memory via the memory arbitration circuitry.

Figure 17F:
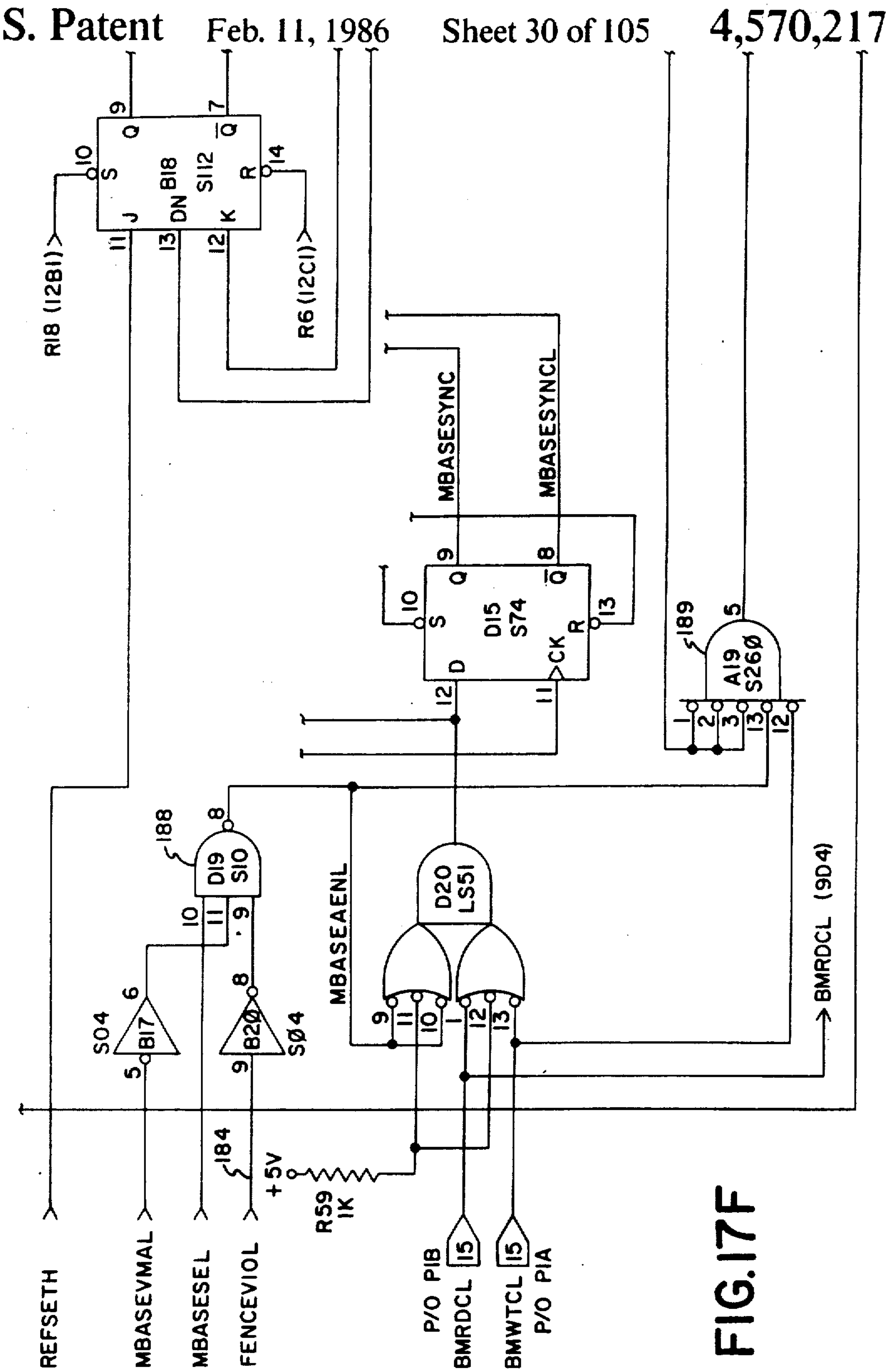
FIG. 17F is a schematic diagram of additional fence circuitry for implementing the fence operation.
Figure 17G:
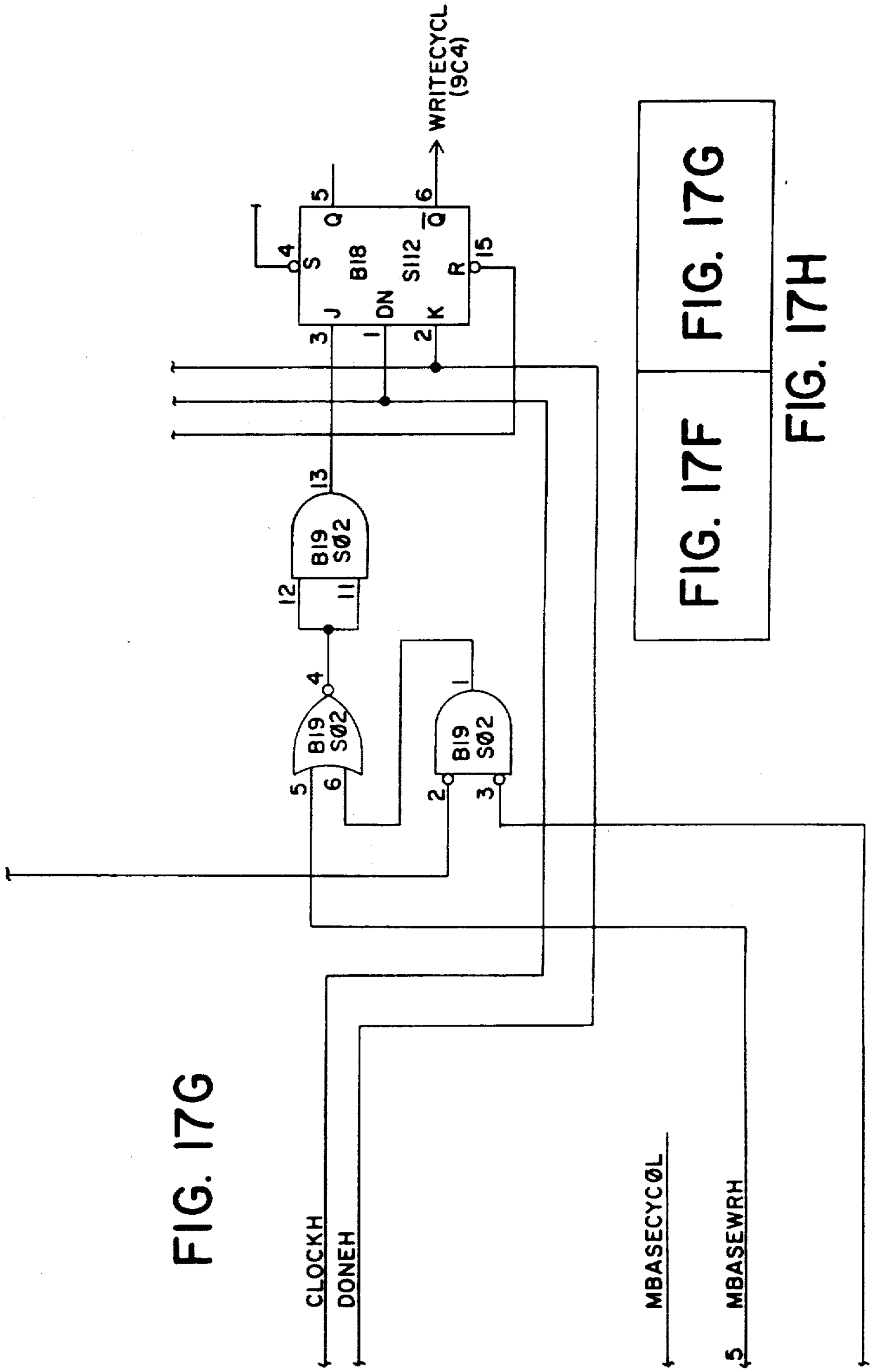
FIG. 17G is a further schematic diagram illustrating the fence circuitry.

Thus as shown in FIGS. 17F and 17G, the fence violation signal 184 is transferred, after inversion to nand gate 188 where it is gated with signals regarding the slot selection and megabyte address space of the memory module (that is the public bus address received mus also correspond to the slot number of the memory module and to its overall address space—since the MMI can have up to sixteen megabytes of shared memory). Only if the fence violation signal is high does the nand gate intput have a true state which, when logically combined with other clock and memory cycle signals, causes a true output for nand gate 189. The output of nand gate 189, after further gating is performed, triggers flip flot 191 to generate a write cycle signal 193 to allow memory space in the memory module to be written by data from the public bus.

If the address value is less than the fence value, the fence violation signal goes low, preventing the I/O request from the public bus from reaching this memory arbitration circuit. The module generating the request then realizes that its request has not been serviced since an internal watchdog timer will have timed out after about six milliseconds.

It should be noted that upon initialization, the fence value has a value of 0 thereby allowing any module to access any portion of the memory module until such time as the CPU module sets the fence value. In this way, an arbitrarily high fence value cannot be set accidentally until such time as the CPU is fully operational and determines the proper fence value. The initial zero fence value also allows a MMI configuration where CPU module lacks a private port to the memory module.

I/O Locations

There are a number of I/O locations which may be addressed only by the public bus port on the memory module. These locations are not addressable by the CPU port. Also there is just one output port (the fence) addressable only by the private CPU port, but not by the public bus. The reason for this is to allow the monitoring and testing of a memory module which may have no private port connection, but the fence register may only be loaded via the private port, since this is only required if such a private port connection exists. All I/O registers on the memory module are 8 bits wide and reside on even address boundaries. This ensures that the registers can be used by both 16 and 8 bit processors.

Private Port

There is just one location assigned, which is at location 0080H. This is a write only location and the value loaded there is the value of the fence. The fence's value (8 bits) designates which port of the memory is inaccessible to the public bus. It is initialized to zero during system initialization (BINIT-L). The fence value is the number of blocks (each of 4k bytes) that are inaccessible to the public bus.

Write to the Fence Register ADDRESS 0080H

A write command to this 16 bit location activates the fence register if it is not yet active. The write command also loads the FENCE address. The public bus port is not capable of reading or writing data at addresses below this location. Note that this is a WRITE-ONLY location. Fence addresses are shifted left 12 bits so that addresses fall on 4K boundaries (see discussion above).

Public Port

There are three readable registers and just one writeable register accessed via the public port public bus. The address at which they reside, in keeping with all modules connected to the public bus, is governed by the slot in which the card sits.

Adressing, Public

The addresses of the following registers each consist of a 16 bit address. This address is formed by having the 7 top most significant bits set, the next 5 most significant bits defined by the SLOT number, and the 4 least significant bits defined by on-board registers (that is, up to 16 registers). The adress scheme is shown in Table 87.

TABLE 87

15 … 0

| | | | | | | | | | | | | | | | |
|---|---|---|---|---|---|---|---|---|---|---|---|---|---|---|---|
| 1 | 1 | 1 | 1 | 1 | 1 | 1 | SLOT | SLOT | SLOT | SLOT | SLOT | X | X | X | X |
| | | | | | | | 16 | 8 | 4 | 2 | 1 | | | | |

MS ←——→ LS

Slot Number ^ On-board ^

Addresses

Thus a module (card0 residing in slot 0 of the MMI has the address FEOO Hex for its first on-board address.

Read Addresses

Read card identification and memory size ADDRESS XX00H This is an 8 bit wide status register residing on an even address boundary, which allows usage by Intel 8086 and Intel 8088 CPU's without byte-swapping. Table 88 illustrates the address scheme.

TABLE 88

7 … 0

| | | | | | | | |
|---|---|---|---|---|---|---|---|
| SIZE | SIZE | SIZE | | | | | |
| 2 | 1 | 0 | 0 | 0 | 1 | 1 | 1 |

MS ←——→ LS

SIZE ^ CARD I.D. ^ = FIXED

The card I.D. number is seven (in a 5 bit field). The remaining 3 bits indicate the amount of memory populated on this particular board. This amount can change in one-eights of a megabyte (128K byte) increments. There is always at least 128 byte fitted. Therefore if three zeros are not returned in the size field, 128K bytes are fitted rather than zero memory fitted. Table 89 illustrates the memory size coding used.

TABLE 89

| MEMORY SIZE BITS | | | |
|---|---|---|---|
| SIZE 2 | SIZE 1 | SIZE 0 | ACTUAL SIZE |
| 0 | 0 | 0 | 128K ⅛M |
| 0 | 0 | 1 | 256K ¼M |
| 0 | 1 | 0 | 384K ⅜M |
| 0 | 1 | 1 | 512K ½M |
| 1 | 0 | 0 | 640K ⅝M |
| 1 | 0 | 1 | 768K ¾M |
| 1 | 1 | 0 | 896K ⅞M |
| 1 | 1 | 1 | 1024K 1M |

READ error log counter

ADDRESS: XX02H

A READ command to this I/O location is by the CPU port. Such a command returns the contents of the ERROR LOG counter. The counter's contents is in the range of 0–255. If a 256th error is encountered, an interrupt is issued. The error counter accumulates single errors which occur during CPU or public bus cycles; errors which occur during refresh cycles are not counted. Table 90 illustrates the format of this register.

TABLE 407

| | | | | | | | |
|---|---|---|---|---|---|---|---|
| 7 | 6 | 5 | 4 | 3 | 2 | 1 | 0 |

MS LS 8 bit count of accumulated errors.

Read Base Address And Configuration

ADDRESS XX04H

There are 8 bits of general information about the memory board at this address. Its configuration is shown in Table 91.

TABLE 408

```
7                4              0
|BASE |BASE |BASE |BASE | 3 | 2 | 1 | 0 |
| 3   | 2   | 1   | 0   |   |   |   |   |
MS                      |   |   |   | LS
<-------------------->  |   |   |   |
         ^              |   |   |   |--LOCKED
   BASE ADDRESS         |   |   |-------ERROR OVF
                        |   |-----------DBL. ERROR/
ERROR                   |                PARITY
                        |---------------PARITY ECC
```

BITS 7-4

Base Address These 4 bits indicate the one megabyte boundary, out of 16, at which the memory begins, when accessing over the public bus.

BIT 3

Parity ECC. This bit indicates the board's configuration for error protection.

If set 1—Parity Option

If reset 0—ECC Option Error Correcting

BIT 2

Double Error/Parity Error Flag—this bit when set indicates that a non-recoverable error has taken place. If the board is configured for ECC, it means that a double bit or worse error occurred. If the board is configured for Parity, it means a parity error occurred.

BIT 1

Error OVF—this bit when set indicates that the soft error log (readable at address XX02) has overflowed. (>256 errors since cleared).

NOTE - Both bits 1 and 2 are automatically cleared after being read.

BIT 0

Locked—this bit can only be set by initializing the board, it can be reset by a write command at address 0 (see Write Address below). The locked bit indicates that certain test facilities have been disabled permanently (locked off), after they have been used and tested. This is necessary since some of these facilities are such that if an error occurred (e.g. an extraneous write) they would cause system memory failure. So when they have been used they are disabled permanently by locking them. This bit so indicates this condition.

Write Address

There is one public bus addressable write port on the memory module. It has control bits for various functions on the board, set forth in Table 92.

TABLE 92

```
| 7 | 6 | 5 | 4 | 3 | 2 | 1 | 0 |
MS              |   |   |   |
<--SPARE BITS-->|   |   |   |LS--ERROR LOG CLEAR
                |   |   |--------READ CHECK BITS
                |   |------------LOCK
                |----------------WRITE DISABLE
```

NOTE: All bits on this port are initialized to one (set). Hence the set condition is the in-active condition for these bits.

BIT 0—Error log clear, this bit when reset (zero), clears error log counter (accumulated soft errors) and holds it clear. It is set (one) to enable the error log counter to increment on soft errors.

BIT 1—Read Check Bits, when reset (zero) this bit activates the read check bit function. This means that all public bus transfers do not read data as stored but read the check bits generated from and associated with that data. When set (one) this function is inactivated and normal data is read. Although public bus access receives check bits rather than data, CPU access still receives data. This is arranged so that a CPU may still fetch instructions correctly. This function is a lock-able function.

BIT 2—Lock, this is the bit which allows software to disable the two diagnostic functions on the board (i.e. Read Check bit, bit 1, and Write disable, bit 3). It is initialized to a one (set) (like all bits on this port). The first time it is set to a zero (or reset) the test facilities are disabled. This condition remains until the board is reset. Setting the bit does not re-enable the test facilities.

BIT 3—Write Disable, when reset to zero this bit disables the write control signal to the array of check bits. The significance of this is that software can perform checks on the Error Correction facilities. For instance, a word may be written (along with its associated check bits) to store. Then the write disable is activated and the word rewritten with one data bit changed. The write disable is then removed. Now the data is stored and associated check bits do not correspond. When the word is next accessed, the ECC data and check bits indicate an error. The ECC corrects that error and logs its occurrence. Note that there is a finite possibility that refresh can access the location during a test, correct the "error" and log its occurrence before software can access it. If this happened, it cannot happen again, at the same address, for approximately 8 seconds (the time necessary for the ECC circuitry to sweep all of memory). Double bit errors can be tested similarly.

Interrupts

The memory module generates a hard interrupt which is connected to level 2 on the public bus or to level 2 on the CPU. The public bus interrupt is WIRE-ORable with the same interrupt level as that on other boards. All interrupts are presented as negative going pulses with a duration of between approximately 700 nanoseconds and 850 nanoseconds.

Interrupts are caused by:

A. 255 errors being accumulated in the ERROR LOG counter. (if the board is configured for ECC).

B. Any double error being detected (if the board is configured for ECC).

C. Parity error (if the board is configured for detecting parity errors).

Interrupt Direction

Once an interrupt has occurred it is directed in the manner set forth in Table 93.

Table 93

CPU Interrupts

When a private port cycle causes an error to be detected, that interrupt is routed back to the CPU module. Instructions or data read over this port potentially produces both HARD interrupts (double errors) and SOFT (OVF of single errors) interrupts. If the board is configured for parity, only parity error interrupts can be generated (on the HARD interrupt line), no SOFT error interrupts are generated.

Public Bus Interrupts

When a public bus port cycle causes an error to be detected, it is handled in a similar manner. There is only one interrupt back along the public bus; that is, the HARD/parity error interrupt. This can be done on a very low priority since soft errors are correctable. The OVF indication bit is latced until read. The error rate is generally extremely low.

Physical Interconnect

Connection to the memory module is via the overall bus connector for both the public bus port and the "private" CPU port. The pinout of the connector is the same as for the CPU module (see Table 78).

Summary

Thus the memory module 24 is used for both CPU operating system and application programs (including the host CPU graphic language) and is accessible by the private port with all modules that can communicate on the public bus. The memory can be divided into a private segment and a shared memory segment by the CPU module defining a fence location to th memory module hardware.

Although only one memory module is shown in FIG. 1 with a one megabyte RAM, the MMI architecture, through use of a 24 bit address, can accommodate up to 16 megabytes of module RAM (see Man Machine Interface Architecture section).

VIDEO STATION 26

Video Station Overview

As shown in FIG. 1, the video station 108 acts as a smart color-video display controller. The station contains up to 128 bytes of refresh memory in its video RAM module 28. The video station provides high level graphics capability for the man-machine interface.

Figure 18:
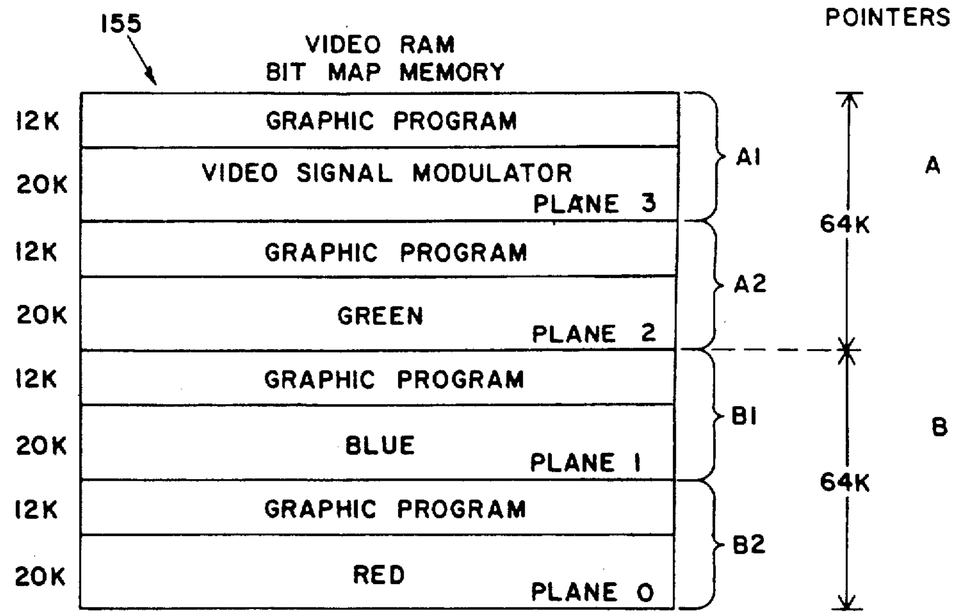
FIG. 18 is a block diagram illustrating the bit map memory associated with the video RAM module.

As shown in FIG. 7, the video station displays images on a 480 wide×312 high array of pixels. As shown in FIGS. 6 and 18, there are up to four planes (planes 0, 1, 2, and 3) of image memory, each plane having a 480×312 size. The video station can display at one time up to 64 colors from four palettes 124, 125, 126 and 127. As shown in FIGS. 1 and 21A-21D, the overall operation of the video station consists of the video CPU module 26 writing appropriate graphic bit patterns (lines, symbols, alphanumerics, etc.) into video RAM module 28. Because the video computer writes into the video RAM module, the host CPU module 22 (see FIG. 1) is relieved of the burden of point by point plotting. The host and the video stations thus can communicate via terse, high level messages forming the high level graphics language (see sections concerning this language and its implementation).

The video computer module 26 is structured to write into the video RAM module at high speed, and to communicate efficiently with the host CPU module 22 via the public bus 92. The video station contains all circuitry necessary to connect to black and white and R-G-B color monitors 62. Hardware for extensive on-board diagnostics is also included.

FIG. 21 (formed by FIGS. 21A-21D) is an overall block diagram of the video station. Its primary modules are:

1. CPU group 236.
2. ROM, Program RAM, and Periherals.
3. Bus Interface
4. Bit Map RAM 155, Bit Bangers 156, Shifters 165
5. Video Output Circuitry.

CPU Group 136

The CPU group consists of an Intel 8088 microprocessor and its associated circuitry. The 8088 has a 16 bit wide internal bus and an eight bit wide external bus. The chip is operated in its MAXIMUM mode. Two Intel 8288 bus controllers are also used in this mode, one for on-board bus control and one for public bus control. An Intel 8284A clock is used by the video CPU to generate clock signals and to synchronize the READY line.

An Intel 8259A programmable interrupt controller (PIC) 242 handles interrupts 220 coming from the public bus or from peripherals. Eight interrupts can be accommodated by the PIC, each interrupt generating an address for a unique interrupt vector. The vectors are stored in a 32×8 PROM.

The video CPU communicates to the rest of the video station by the private bus 94 (see FIGS. 1 and 21). A first portion of this private bus contains a 20 bit ADDRESS bus, and the second portion contains an eight bit DATA bus. A decoder for determining if an address generated by the video CPU is for an on-board device or for a device on the public bus is also included in the CPU Group.

The video CPU is capable of addressing one megabyte of RAM, this address space can be thought of as consisting of 16 "pages", each 64K bytes long. The first page (00000-0FFFF) is the interrupt vector space. The next two pages (10000-2FFFF) are decoded as the bit map memory 155. The address window (80000-8FFFF) is allocated for on-board peripherals, on-board ROM, or on-board program memory. The last two pages (E00-00-EFFFF) are allocated for the public bus. Addresses generated by the video CPU which reference any of the other 8 pages are not used. If any of these restricted addresses are used, indeterminate data is returned after the XACK timeout circuitry "fires."

ROM's Program Memory, and Peripherals

The RAM 244 contains 2K, 4K, or 8K×8 static RAM chips (Intel types 2716, 2732 or 2764 respectively). There is also a programmable timer (PIT) 249, a watchdog timer 89, a video timing and control chip (VTAC) 252, a programmable interrupt controller (PIC) 242, two RS-232-interfaces 65 and 65', the public bus address segment register 222, control and status registers 221 and 190, color map control, zone map control, and the bit-banger and shifter control.

Program Memory

The 28 pin program memory comprises ROM/RAM sockets that occupy the highest page. These sockets can be populated with ROM 243 or RAM 244. Programs, if loaded by a boot-ROM, can be stored here.

Video Timing and Control Chip (VTAC)

The VTAC 252 is a video timing generator driven by a 45.8957 MHz clock. It generates RAM addresses for the display memory as well as generating appropriate video sync signals. The video signal generated by the video station have the following characteristics:

| | |
|---|---|
| Horizontal Frequency | 19.92 KHz |
| Vertical Frequency (non interlaced) | 60 Hz |
| Horizontal Blanking Interval | 8.367 usec. |
| Vertical Blanking Interval | 1.0 msec (20 lines) |
| Total Blanking Lines | 332 |
| Displayed Vertical Lines | 312 |
| Horizontal Sync pulse width | 2.788 usec. |
| Vertical Sync pulse width | 150.6 usec. |
| Pixel clock period | 87.15 nsec. |

Proorammable Timer Chip 249

The programmable timer, an Intel 8253A has three 16 bit timers. TIMER 0 is used as a baud rate generator for the 8274 multi-protocol-serial controller (USART). The clock is 1.2288 MHz (derived from the 4.9152 MHz CPU clock). The ourput of the timer, which is operated in MODE-3, Squarewave, goes to the TXC and RXC lines of the UART. To achieve a rate of 19.2 Kbaud, the clock frequency is divided by 4 (the 8274 is run in the X16 mode). To achieve a rate of 300 baud, the 8253A timer is programmed to divide by 256. In addition to driving the clock inputs of the USART, TIMER 0 output goes to a status bit which can be examined by the video CPU group 236 (used in diagnostics to verify operation of this counter).

Timer 1 is used to generate a frequency for a tone or for a real time clock. As a tone generator, this timer can be programmed for any frequency in the audible range. The clock source is the 19.92 KHz horizontal frequency. The output of the timer goes to a gated audio amplifier and to an interrupt input at the PIC. The gate of this timer is permanently active. This device is operated in MODE-3. The speaker (beeper 61, see FIG. 1) can be disabled via a control register bit. When the speaker is disabled and the interrupt is enabled, this timer can be used as a real time clock. Further details on the beeper operation are contained in the interface layer 67 section (see FIG. 70). In addition to driving the audio amp and the real time clock interrupt, this timer's output also goes to a status bit which can be examined by the video CPU (used in diagnostics to cerify operation of this counter).

Timer 2 is used to generate interrupts for blinking screen 72. It is driven by the leading edge of the vertical sync pulse. By counting integral vertical sync pulses, the color map can be updated periodically during the vertical blanking interval. The device is operated in Mode 0. The output of the timer is connected to an interrupt line in the PIC. In addition to the PIC, the output from this timer goes to a status bit which can be examined by the video CPU (used in diagnostics).

Watchdog Timer 89

The watchdog timer consists of a comparator, counter and the watchdog status flip flop. If more than two seconds pass without the watchdog being activated by the video CPU, then NMI (non maskable interrupt) on the video CPU is activated, and a status bit is set. This status bit can be interrogated by the host CPU 22. Further details of the watchdog timer can be found in the CPU module section.

Serial Communications (Ports 65 and 65')

One part of an Intel 8274 USART is used as a general purpose communications port. By timing from TIMER 0, the USART can operate from 300 baud to 19.2 Kbaud. RTS, CTS, DSR, and DTR lines can be polled or acivated from the chip by using the available features of the chip. Signal levels at this serial port are RS-232-C.

A second port is also available for connection to the remote touch panel 70/keyboard 68. Baud rates on this port are configurable by jumpers from 300 baud to 9600 baud. This port can be configured to support the full serial interface. All ports can be switched between synchronous and asynchronous operation under computer control. All lines can be looped back, and end-to-end tests can be made to verify information of the port.

Programmable Interrupt Controller (PIC) 242

The PIC is addressable as a multi-register device. Its inputs are:

1st—XACK TIMEOUT (Attempt to write to non-existent memory or public bus denial)
2nd—Global memory error
3rd—POWER FAIL
4th—Blink Timer
5th—8274, TXRDY, RXRDY, CTS, DSR, DCD (loss of carrier)
6th—Tone Time (real time clock)
7th—A/D converter interrupt
8th—Public Bus (Attention from Host CPU).

Control and Status Registers

The video station has 3 Intel 8255A chips (total of nine ports) which are used as Control and Status Registers (CSR's). One register is used as the public bus address segment register 222; the other eight CSR locations are used for various control and status functions. The address segment register operation is described in the MMI architecture section.

Color RAM 239

As shown in FIGS. 6 and 21 the color RAM 239 is loaded with up to 64 words of 9 bits to provide four palettes (124–127, see FIG. 6) of many colors at many intensity levels. This is a read-write memory. The read function is included to allow verification of the memory operation.

Zone RAM 117

The zone RAM 117 forming the zone map (see FIG. 6) is a memory which selects "zones" on the screen in a 15×10 array. These zones are used to select one of four sets of color code tables stored in the color RAM 239. Each zone is selected by a two bit number written into one of 256 locations in the zone RAM.

Public Bus Interface

The public bus interface makes the video station capable of acting as a bus-master as well as a bus-slave. As a bus master, an Intel 8289 chip (module 221) arbitrates for control of the bus. The public bus address segment register, described in the previous subsection, supplies the eight high-order address bits and the on-board video CPU generates the sixteen low order address bits.

If, when the video station is acting as a bus master, READY is not returned with 6 mS in response to a command, then a timer forces READY to be returned and causes an Xack Timeout interrupt to occur. This interrupt tells the on-board video CPU that a public bus READY failure has occurred; the video CPU then takes appropriate corrective action. This time out is activated by either inability to become bus master within 6 mS. or by addressing "EMPTY" address space.

When in the slave mode, the video station can receive the following commands from the Host CPU module 22: (a) Soft Interrupt, (b) Soft Reset, and (c) Clear Soft Reset. The host can also read the 16 bit status register 190 of the video station.

Bit Map Memory 155

The bit map memory 155 of the video station consists of two 8-bit wide banks of 64K RAM chips. The two banks are divided into four color planes (see FIG. 18). Even though two banks are used, from the programmer's viewpoint, four planes are apparent, each beginning at a 64K boundary. Each plane is $(4+60)\times 312=19{,}968$ bytes long. Each line is 64 bytes long even though only 60 bytes (480 pixels) are displayed due to the VTAC 252. The first four bytes of each line are suppressed.

The bit-map memory has a dual-port; it is accessed either by the video CPU module or by the VTAC on a time-shared basis. Accessing the memory for display on the screen causes refresh to occur automatically. In 1.394 microseconds (16 pixel display times) the VTAC accesses the memory two times in each plane, and the video CPU is allotted one access time. CPU average latency is therefore 697 nsec=3.5 wait states. Again, latency is the average time the CPU waits from the time it initiates a memory command until the cycle request is granted by the dual port logic.

Support circuitry, in addition to the timing generator, includes address mapping and RAS-CAS generation. Hardware shifters 165 (see also FIG. 20) support the display RAM to allow speedy updates of trends. Bit bangers 156 (see FIG. 19) are included for each plane to implement Boolean operations (BIS, BIC, NOT, DATA FROM CPU) simultaneously in two planes under the control of a mask (memory control) register 158. When the shifters or the bit-bangers are enabled by the control registers 158 and 158', each CPU invoked RAM cycle becomes a READ-MODIFY-WRITE cycle. The bangers can work on all four planes at once.

BIT BANGERS AND BIT SHIFTERS

The video station described herein comprises hardware bangers that implement logical operations on the graphic data as stored in the video RAM 28. These logical operations allow changes in the graphic data to be implemented in a rapid and efficient manner. Thus a bit clear operation, a bit set operation, a complement operation and a pass through operation can all be implemented by the bangers which result in changes of the graphic display with respect to color or some other visual parameter without the necessity of the user performing the change in color or other parameter for each portion of the display for which that change is desired. Rather, the Host CPU module, in conjunction with the video station, merely indicates the color to be implemented for a particular portion of the display with the generation of that graphic portion conducted in the standard background and foreground colors. Therefore each byte of information for each pixel display need not be changed by the video CPU through read and write operations to the video RAM, but rather the portion of video RAM corresponding to the desired area is modified by the bangers under control of the video CPU. This information is then passed to the video monitor for display.

Furthermore, shifting of the display in the horizontal and vertical directions is also performed by hardware devices known as shifters, rather than through updating of the graphic information as stored in the video RAM bit map.

Figure 19:
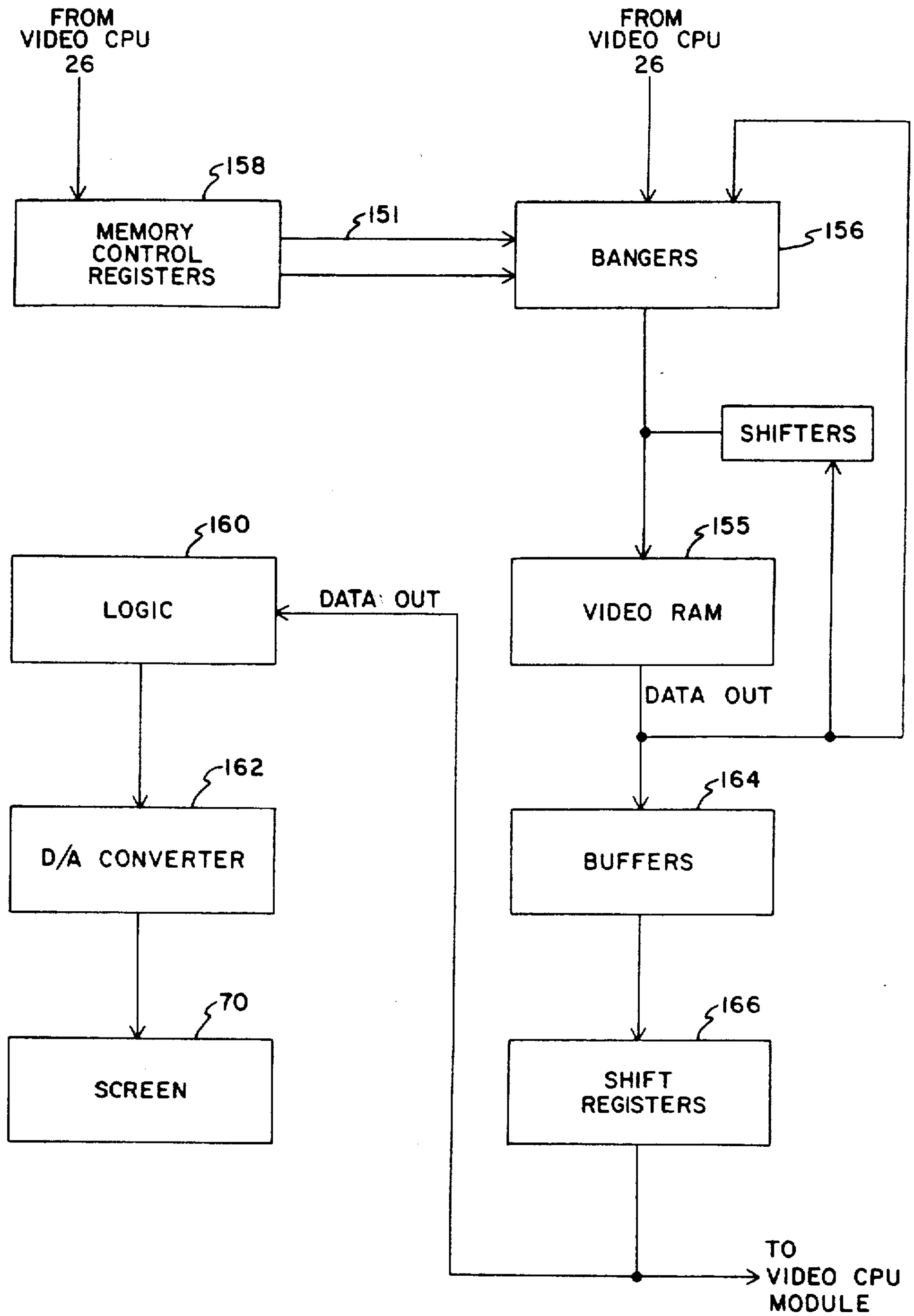
FIG. 19 is a block diagram illustrating the overall operation of the video bangers and shifters.

The concept of the bit bangers is shown in FIGS. 18 and 19. Thus as shown in FIG. 18, the video RAM 28 (see also FIG. 1) comprises 128 kilobytes memory 155, this memory broken up into two 64 kilobyte sections A and B. Each 64 kilobyte section further broken into two 32 kilobyte sections A1, A2, B1 and B2 respectively. As shown in FIG. 7, the screen 70 comprises 312 lines, each line having 480 physical locations. For each physical location, three primary colors can be defined. Each location can be defined as a pixel. Consequently, for each color there are 480×312 pixels or 149,760 pixels. This corresponds to 18,720 bytes of information. However, each screen line has four more bytes of non visible data and these 19,968 bytes of information must be stored for each color plane. There are also 20 kilobytes of memory allocated to the composite synchronization used by the video monitor. Each 32 kilobyte section A1, A2, B1, B2 is thus broken into a 20 kilobyte portion and a 12 kilobyte portion. The latter portion is used for graphic program storage. Thus there is a one-to-one correspondence at each pixel for each color to be displayed. As explained earlier and as shown in FIG. 6, these bit planes are used in conjunction with a zone map and color palettes (color RAM) to define the actual signals to be sent to the red, green and blue electron guns of the monitor along with the modulation sync signal.

The operation of the bit bangers is shown in more detail in the block diagram of FIG. 19 and the detailed block diagram of the video CPU module 26 and video RAM module 28 shown in FIGS. 21A–21D. FIGS. 78A–78H illustrate the bangers and shifters (discussed below) in detail. In FIGS. 19, 21 and 78, it is seen that the video CPU sends commands to the memory control registers 158. The memory control registers include information concerning which operation is to be performed by the bangers; namely, the bit clear operation (BIC), the bit set operation (BIS), the bit complement operation (CMA), and the pass through operation. The memory control registers have banger control signals 151 that control the operation of bangers 156. These bit operations thus operate on incoming data from the video CPU to the bangers (data path 141) in combination with corresponding bit location memory data in the bit map. The output of the bangers is transferred to the bit map memory 155 corresponding to that shown in FIG. 18.

The data out from the bit map memory 155 is presented back to the bangers and also to buffers 164 which supply information back to the video CPU 26 after passing through shift registers 166. The graphic output data is also passed from the shift registers to logic circuitry 160 which in turn performs logical operations for presentation of this video information to the digital to analog converters 162. The outputs from these D/A converters are transferred to monitor 62 (see FIG. 1) for presentation on screen 72. A black and white (B/W) monitor signal 179 is also generated from the video data output from the shift registers by use of a mixing amplifier 209.

In a given example, it might be desired that data coming in from the video CPU to the bangers be logically combined with the data in the bit map so as to store this logically combined information in the memory, thereby representing a different color for a particular portion of the screen. If the bangers were not utilized to perform these bit manipulation operations, it would be necessary for the video CPU to read the data from the selected addresses in the video RAM (including all the control cycles in order to perform the read operations) to perform the bit manipulation operation in the video CPU, and then write the new data back into the same memory address location of the bit map memory, all consuming many clock cycles and thus time for implementation. Instead, the video bangers can perform this operation in a quick and efficient operation. Thus, the memory control registers set the logic operation to be performed by the bangers for particular data arriving from the CPU. This data is received in bytes of information (8 bits) and the data read from the bit map memory is also presented to the bangers.

Table 94 illustrates a typical implementation. It is there seen that the CPU presents a particular byte of information to the banger; such as the bit pattern 10001110. The corresponding address location in the bit memory presents to the bangers data stored therein, such as the bit pattern 10110101. If the memory control register commands the bangers to perform a bit clear operation, an exclusive oring of these two bytes of information is performed; namely, 00111011. This data is stored in the bit map memory and presented to the logic circuitry for presentation to the screen. Thus the modification of the information in the memory is efficiently obtained through use of the banger with minimum interaction with the video CPU.

Table 95 illustrates another operation performed by the video bangers; namely, the bit set operation. In the example shown there, the video CPU inputs the bit pattern 10010011 while the random access memory location addressed contains 11011101. The output from the banger in this operation is a logical AND and thus for this particular example represents the bit pattern 10010001.

The third bit manipulation operation performed by the bangers is the complement in which the bit in the bit map is complemented if the corresponding data bit from the video CPU is a logical 1 and leaves the bit in the RAM unchanged if the CPU bit logical 0. In the example given (see Table 96), the data coming the video CPU has the bit pattern 10010011, whereas the data from the corresponding byte in the video RAM has the bit pattern 11011011. Therefore the resultant complement from the is 01001000.

The forth bit operation performed by the bangers is a simple pass through. This operation allows whatever data is arriving from the video CPU to be written into the given memory location of the bit map memory. A typical use of the bangers is where a given line as defined by the high level graphic language is to be changed from a solid red color to a dotted red color; that is, every other pixel to be red. The CPU could then input a 10101010 bit pattern to the bangers and command a complement operation to be performed. Each place where a 1 was input from the CPU, the complement is generated for corresponding bit in the bit map memory. Thus the bit plane for the red color instead of being all 1's for this particular line is changed to a 10101010 pattern corresponding to a dotted red line. Of course, the spacing of the alternating pattern could be changed if multiple pixels are to be red and others nonred, by simply changing the bit pattern from the CPU to the RAM.

When bit bangers are turned on by setting the SELECT BANGER bit in the shifter control register, the normal data-in path to the bit map RAM is disabled. Every time a location in the plane is accessed, the corresponding positions in the other three planes are accessed as well. Data at the addressed locations is read out, and is modified on a bit-by-bit basis by the data from RAM and returned to the same location.

When the shift mode is invoked by setting one or both of the two shift bits in the control register, and by selecting the planes to be shifted, the normal data-in path to the display RAM is disabled. Every time a location in any plane is accessed, bytes in corresponding positions of the three other planes are accessed and operated upon as weil. All cycles are READ-MODIFY-WRITE cycles. The current contents of RAM are read out. The following gets written back to the bit map memory.

1. Shift "Left"—
   bit 7 from present location to bit 6 of present location
   bit 6 from present location to bit 5 of present location
   bit 5 from present location to bit 4 of present location
   bit 4 from present location to bit 3 of present location
   bit 3 from present location to bit 2 of present location
   bit 2 from present location to bit 1 of present location
   bit 1 from present location to bit 0 of present location
   and bit 7 gets the contents of bit 0 from the most recent previously accessed location.
2. Shift "Right"—
   bit 0 from present location to bit 1 of present location
   bit 1 from present location to bit 2 of present location
   bit 2 from present location to bit 3 of present location
   bit 3 from present location to bit 4 of present location
   bit 4 from present location to bit 5 of present location
   bit 5 from present location to bit 6 of present location
   bit 6 from present location to bit 7 of present location
   and bit 0 gets the contes of bit 7 from the most recent previously accessed location.
3. Shift Vertical—The entire present byte is latched. The byte latched in the previous cycle is written into the present location during the current cycle.

Through use of the banger and shifter operations, the overall graphic displays can be rapidly moved and changed without overly taxing the video CPU so that real time changes can be implemented within the video station. Furthermore, through use of the zones associated with the video display and the various color palettes that can be defined for each zone, rapid changes in coloration can be obtained while the image is being shifted vertically or horizontally.

Furthermore, invisible information can be presented so that when an image is shifted to the left or right, its background and foreground colors need no longer be the same and consequently, the image appears instantaneously on the display. In this latter aspect, a particular zone map may define a particular palette wherein two separate entries define the same color. Thus even though an image may be displayed, its background and foreground colors can be set equal to each other and therefore no image is displayed. However, if this display is shifted vertically or horizontally, it can move into a different zone of the screen wherein those two separate entry codes no longer represent the same colors and consequently there is a difference in the background and foreground color causing the display or text to instantly appear on the screen (see discussion of coloration in overall man machine interface description section). The overall result is a flexible, easy to utilize, real time display for presenting graphic information in conjunction with textual information.

Figure 20:
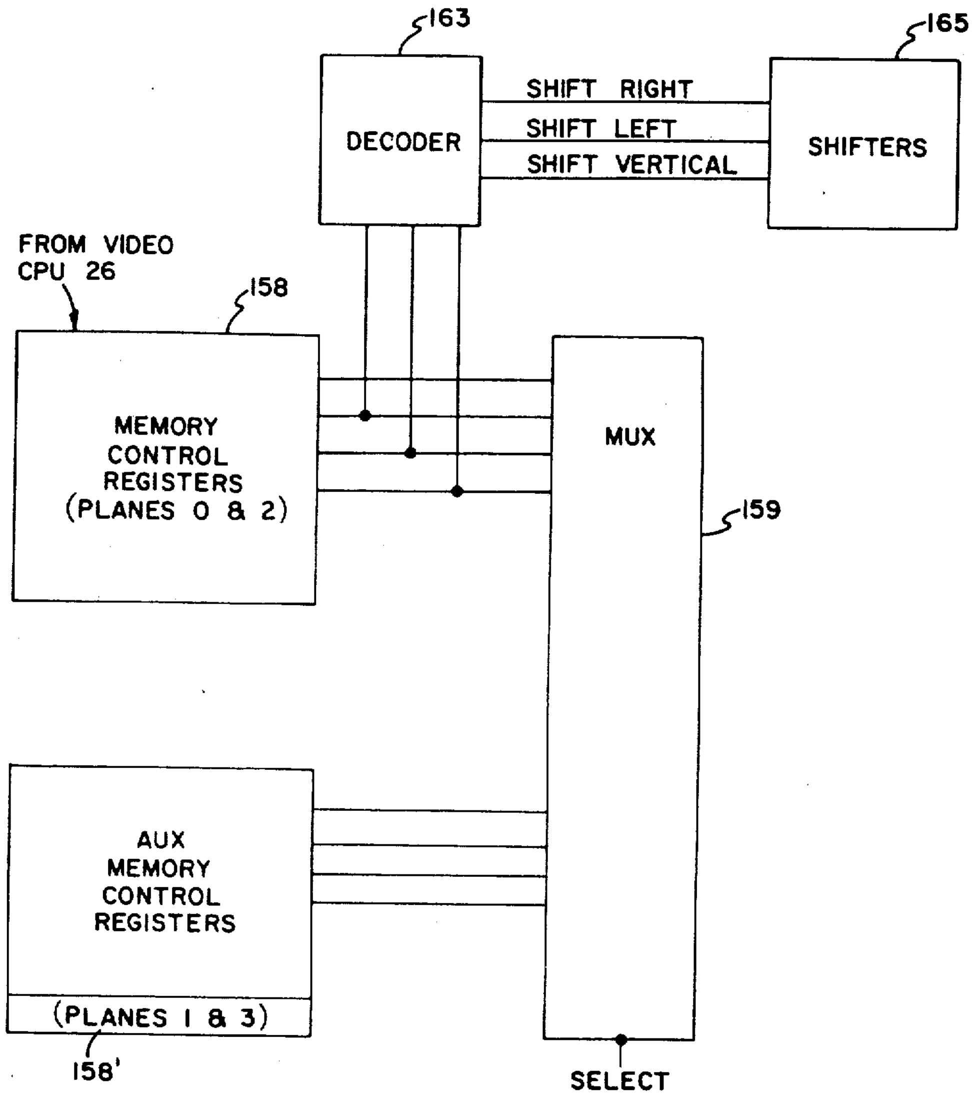
FIG. 20 is a more detailed block diagram of the video shifters.
Figure 21A:
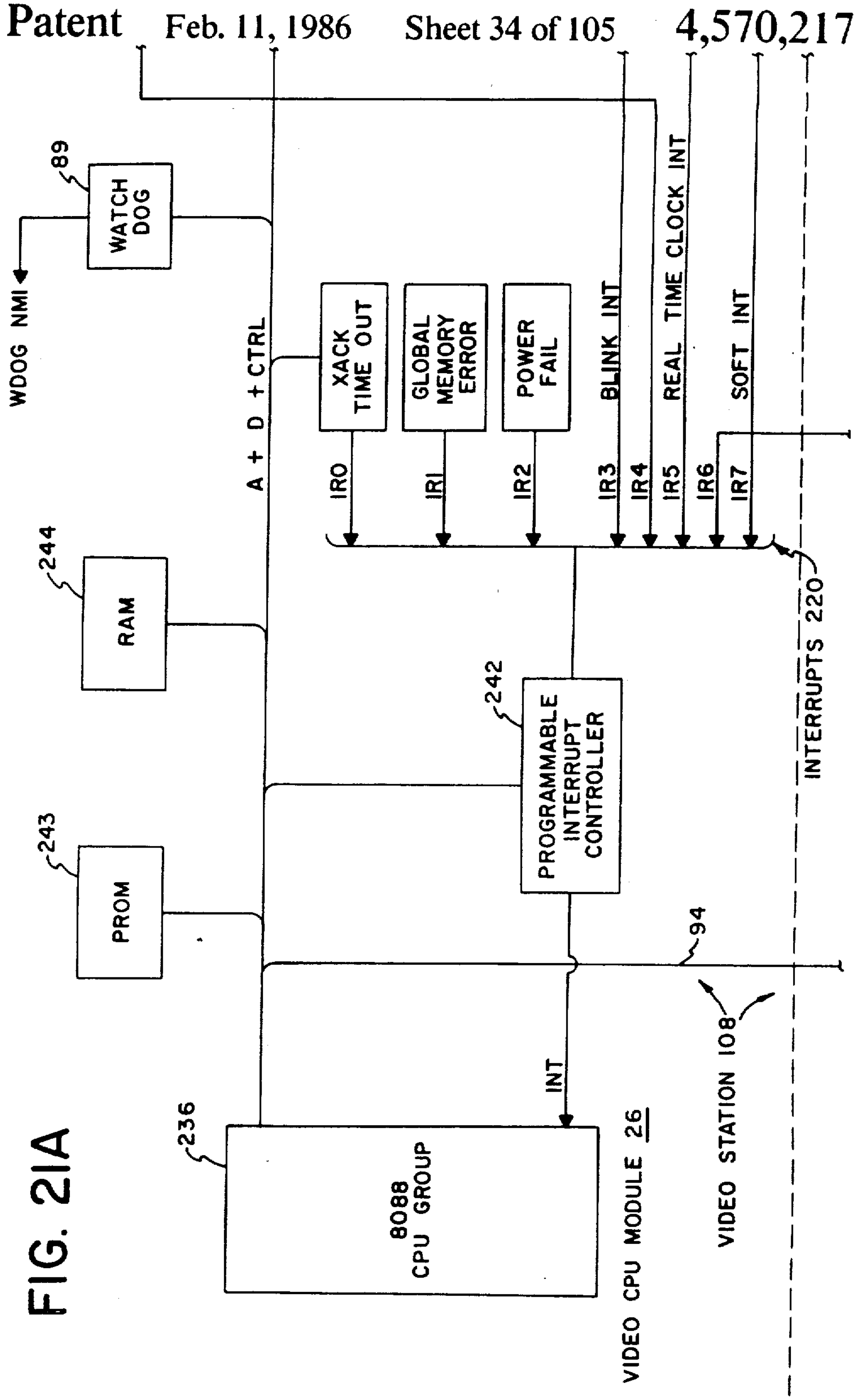
FIGS. 21A, B, C and D form a detailed block diagram of the video CPU module and video RAM module forming the overall video station.
Figure 21B:
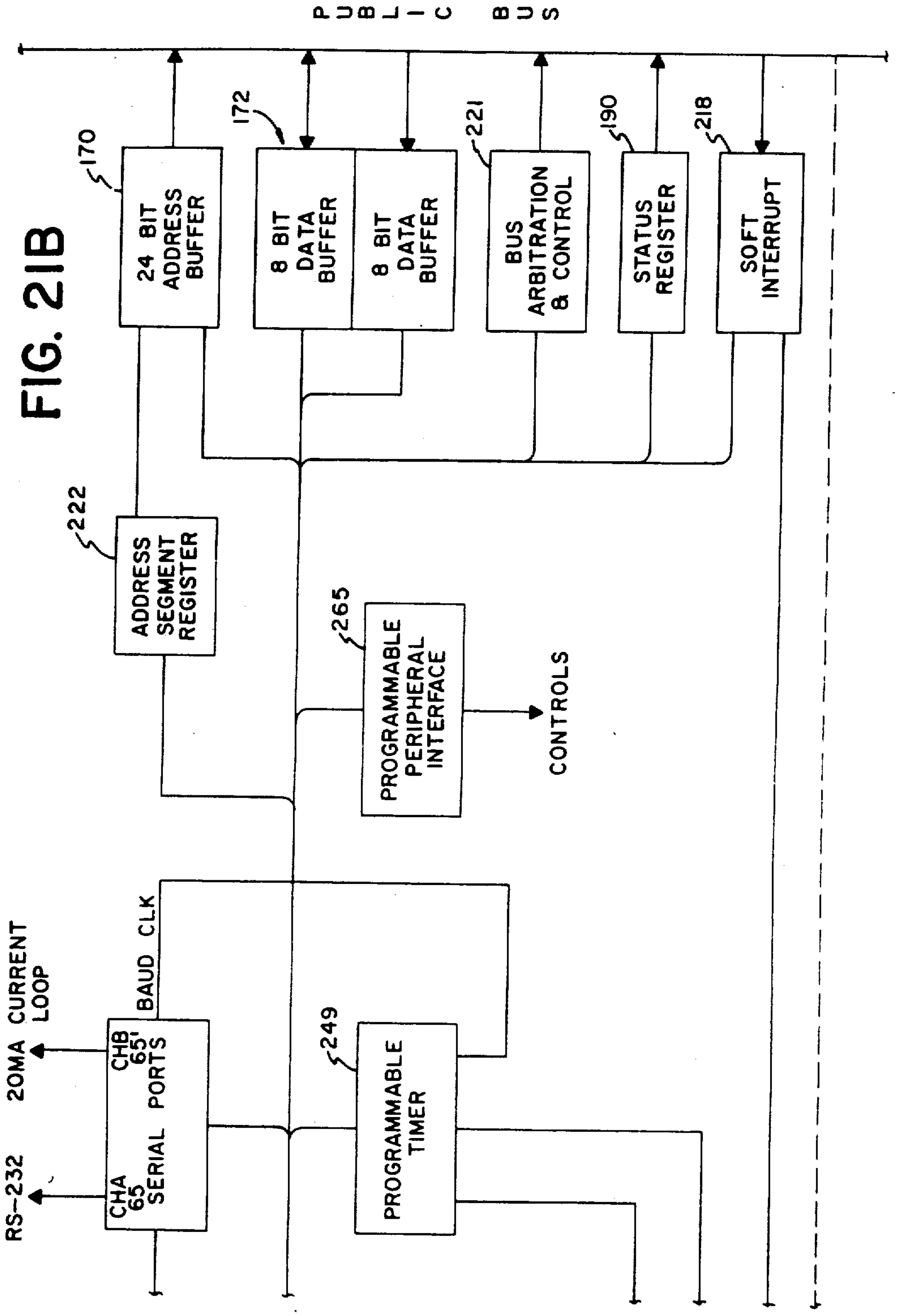
FIG. 21E is a diagram showing how FIGS. 21A, B, C, and D are put together to form FIG. 21.
Figure 21C:
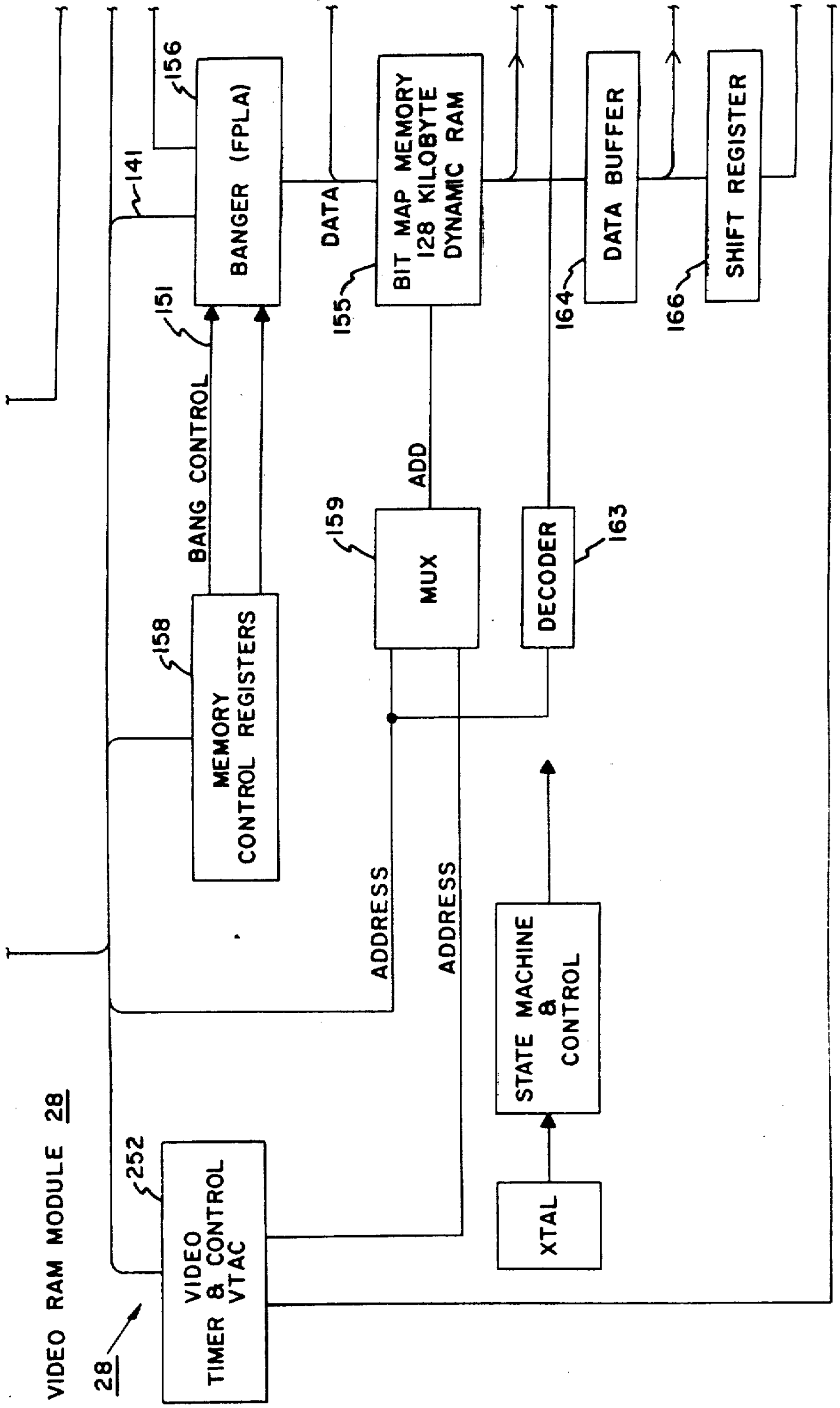
Figure 21D:
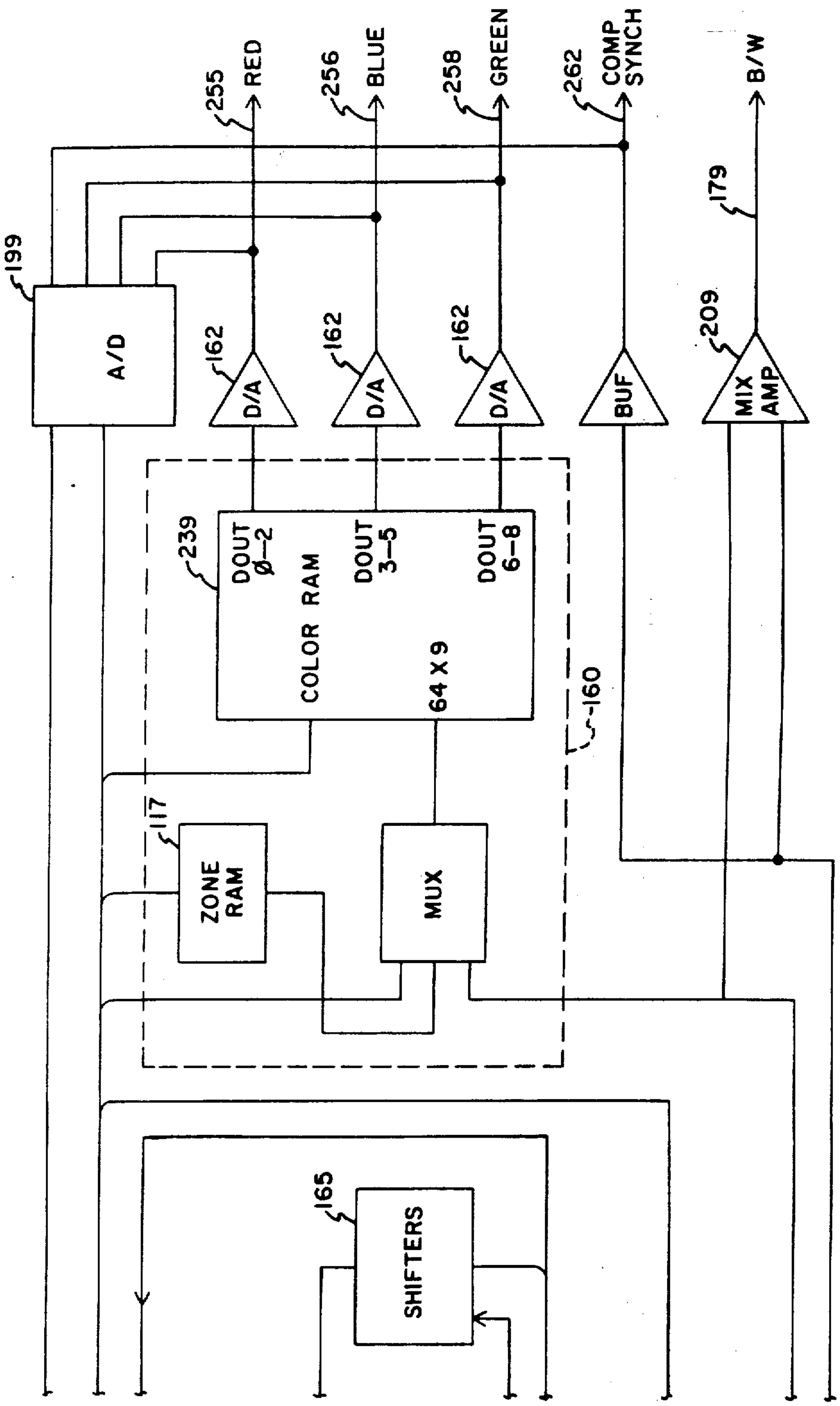

FIG. 20 illustrates the general block diagram for performing bit map shifts. The shifters perform three different shift operations; namely, shift right, shift left and shift vertical. As seen in FIG. 20, the memory control registers 158 and 158' are used for both the bit bangers and the bit shifters. Bit banging memory control register 158 is used for planes to 0 and 2, while the auxiliary memory control register 158' is used for planes 1 and 3. The memory control register 158 is also used to control all four planes of the bit map with respect to bit shifting. More specifically, the signals from the memory control register are transferred to a decoder wherein if the proper signals are received, either a shift right, shift left or shift vertical signal is sent to the shifter module 165. If a shift right operation is desired, the information from the bit map memory is shifted, on a byte basis, one bit to the right. Thus as set forth in Table 97, if a particular memory address has the bit pattern 01001100 before the shift right operation, its bit pattern after passing through the shifters with a shift right operation is 00100110.

Table 98 shows the same input byte both before and after a shift left. Table 99 shows a vertical shift wherein the address byte is to the next succeeding address location such as from address location 1 to address location 2. This technique can be used for any or all of the bit planes and thus any or all of the colors associated with a particular image may be shifted vertically or horizontally. This allows for a rapid movement of a portion of a display without the need for the video CPU to become involved with the shifting operations on a bit rewriting basis.

TABLE 94

| BANGER OPERATION: BIC | | | | | | | | |
|---|---|---|---|---|---|---|---|---|
| Example: | | | | | | | | |
| FROM CPU | 1 | 0 | 0 | 0 | 1 | 1 | 1 | 0 |
| FROM VIDEO RAM | 1 | 0 | 1 | 1 | 0 | 1 | 0 | 1 |
| BANGER OUTPUT | 0 | 0 | 1 | 1 | 1 | 0 | 1 | 1 |

TABLE 95

| BANGER OPERATION: BIS | | | | | | | | |
|---|---|---|---|---|---|---|---|---|
| Example: | | | | | | | | |
| FROM CPU | 1 | 0 | 0 | 1 | 0 | 0 | 1 | 1 |
| FROM VIDEO RAM | 1 | 1 | 0 | 1 | 1 | 1 | 0 | 1 |

TABLE 95-continued

| | | | | | | | | |
|---|---|---|---|---|---|---|---|---|
| BANGER OUTPUT | 1 | 0 | 0 | 1 | 0 | 0 | 0 | 1 |

TABLE 96

| BANGER OPERATION: COMPLEMENT | | | | | | | | |
|---|---|---|---|---|---|---|---|---|
| Example: | | | | | | | | |
| FROM CPU | 1 | 0 | 0 | 1 | 0 | 0 | 1 | 1 |
| FROM VIDEO RAM | 1 | 1 | 0 | 1 | 1 | 0 | 1 | 1 |
| BANGER OUTPUT | 0 | 1 | 0 | 0 | 1 | 0 | 0 | 0 |

TABLE 97

| SHIFT RIGHT | |
|---|---|
| Example | |
| 0 1 0 0 1 1 0 0 | VIDEO RAM before shift right |
| 0 0 1 0 0 1 1 0 | VIDEO RAM after shift right |

TABLE 98

| SHIFT LEFT | |
|---|---|
| Example | |
| 0 1 0 0 1 1 0 0 | VIDEO RAM before shift left |
| 1 0 0 1 1 0 0 0 | VIDEO RAM after shift left |

TABLE 99

| SHIFT VERTICAL | | |
|---|---|---|
| Example | | |
| 0 1 0 0 1 1 0 0 | ↑ | $002_{10}$ address |
| 0 1 0 0 1 1 0 0 | ↑ | $001_{10}$ address |

Video Outout Circuitry

The video station can produce black-and-white composite video images or mapped color images. For color images, the output signals consist of 3 separate video signals (RED 255-BLUE 256-GREEN 258) and a composite sync signal 262. All video output signals have a 75 ohm source impedance and produce a 1 volt peak to peak signal when terminated with 75 ohms.

Black and White Composite Video 179

For black and white display the first two display planes (first bank of bit map memory) are used to generate the following gray scale:

| | Second Plane Blue Plane | First Plane Red Plane |
|---|---|---|
| Black | 0 | 0 |
| Dark Gray | 0 | 1 |
| Light Gray | 1 | 0 |
| White | 1 | 1 |

Mapped Color Video

Figure 22:
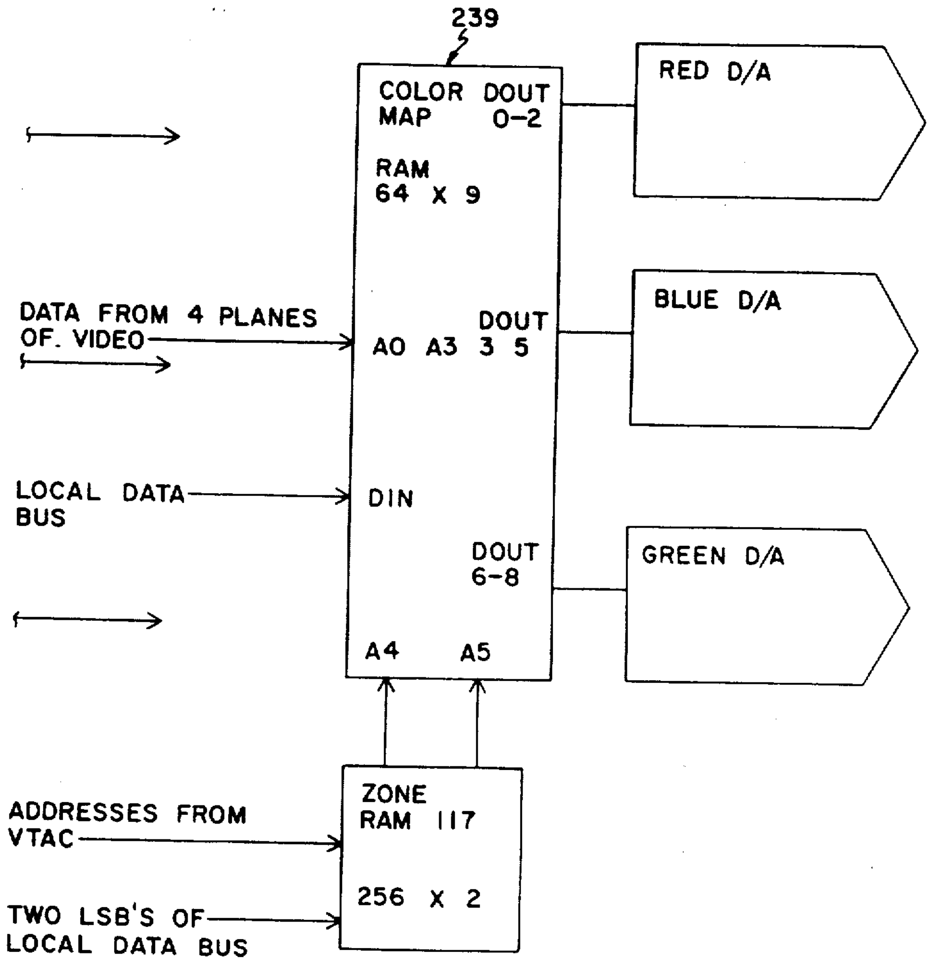
FIG. 22 is a detailed block diagram of the color RAM module forming part of the video RAM of the man-machine interface.

Through use of particular output circuitry, a wide range of colors can be displayed. In addition, color modification for different zones of the screen can be obtained, and rapid shifts between the four color code tables can be obtained to effect blinking. FIG. 22 is a detailed block diagram of the color RAM 239. The architecture shown in FIG. 22 yields a palette of many hues plus black. Each gun is driven by a 3 bit D/A converter 162. The D/A converters settle in less than 20 nanoseconds and are driven by a latch associated with the color RAM. The color RAM is 64 words by 9 bits in size. The width of 9 bits corresponds to three guns at 3 bits per gun. The color RAM is implemented via a Signetics 64×9 RAM chip (Part #82S09). The color RAM is loaded with data at power-up or during the vertical blinking interval. The color RAM contains four tables; each table contains sixteen values. One of the sixteen values is selected by the output from the four planes in the RAM bit map. There are two signals from the zone RAM which select which of the four tables is to be displayed.

The color zones are selected by a coarse bit map (13H×9V) which is addressed simultaneously with the display bit map. The color zone RAM is loaded by the CPU. This technique allows the screen to be partitioned into different zones (such as between operator prompts and process displays). The different zones are represented by different color code tables.

As shown in FIG. 21, an A/D converter 199 is used to verify the activity of the output stages. This allows the video station to self-test proper operation of the D/A's and output amplifiers.

Memory Map

The memory map of the video station as seen by the video CPU is given below (all addresses in hexadecimal):

| | |
|---|---|
| Interrupt vectors: | 00080-0009F (eight vectors) |
| Red plane (plane 0): | 10000-14DFF |
| Blue plane (plane 1); | 18000-1CDFF |
| Green plane (plane 2): | 20000-24DFF |
| White plane (plane 3): | 28000-2CDFF |
| Public bus window | E0000-EFFFF |
| Zone RAM: | 80000-800FF |
| Color RAM: | 80800-8087F |
| A/D Converter: | 81000 |
| Memory Control Register | 81800 |
| VTAC: | 82000-8200F |
| Watchdog timer | 82800 |
| Auxiliary Memory Control Reg | 83000 |
| PPI for segment address assorted control/status | 84000-84003 |
| Dual USART: | 84800-84803 |
| Clear SG: | 85800 |
| PPI #1: | 86000-86003 |
| PPI #2: | 86800-86803 |
| PIC: | 87000-87001 |
| Timer: | 87800-87803 |
| ROM/Program RAM (64K Reserved) | F0000-FFFFF |

Zone RAM 117

The Zone RAM is programmed as a 256×2 RAM starting at location 80000. Only data bits D0 and D1 are significant. The other data bits are "don't care". This RAM is read/write. (Bits D2-DF always read as "ones"). Because two bits are used, four planes of the zone RAM may be addressed. The zone RAM can be thought of as four planes, each plane is 16×16. Each plane maps into 23 horizontal by 10 vertical zones. In each horizontal line, the first zone is suppressed (a zone is 4 bytes or 32 pels wide). In each column the first 10 zones are displayed (a zone is 32 lines high). The bottom row of zones is only partially displayed because the last zone contains only 20 lines because 312 lines are displayed.

Color RAM 239

The color RAM is a 64×9 RAM. The video CPU treats it like a 64×16 RAM. At address 80800, the first eight bits of the first word are written. At 80801, the remaining ninth bit is written, with D0 being the least significant bit. This process continues until 128 locations have been written. The two locations are always written as a pair, with the even location always written first. The three low order data bits drive the RED color gun, the middle three bits drive the BLUE color gun, and the three high order bits drive the GREEN color gun. In each group of three bits, the MSB bit drives the MSB of the D/A converter. The sense of address is inverted.

A/D Converter 199

An eight input A/D converter is used by the onboard diagnostic software to determine if the analog output stages are operating properly. The converter contains an output latch, and an eight input multiplexer. Analog inputs 0-3 are not used. The remaining analog inputs are connected as follows:

Input 4: Red Gun output
Input 5: Blue Gun output
Input 6: Green Gun output
Input 7: Composite Sync output All these signals are connected via long time-constant low pass filters; these filters average the input signals and are used in lieu of sample and hold circuitry. To operate the A/D converter, the following sequence is carried out:

1. Select the desired analog input at the A/D's 8 MUX inputs. This is done by writing to the A/D location in bit positions D0-D2.

D0=LSB
D1=Middle bit
D2=MSB

These three bits are used as an address to select the desired input from the above table.

2. The ALE bit which latches the desired address into the converter is now set. The addresses selected in the above step are maintained. ALE is D3 of the A/D WRITE location.

3. With the A/D MUX input still valid and ALE still true, the conversion is now started. This is done by bringing D4, HI.

4. The Start A/D signal and the ALE signal can now be brought LO.

5. The A/D converts the input analog data. When the conversion is complete. the A/D interrupts the video CPU.

6. In response to the interrupt, the video CPU pulls out the data by reading the A/D location.

Memory Control Register 158

The memory control registers (including the auxiliary memory control register 158') operate the shifters and bangers.

To entirely disable the data inputs to both banks of the bit memory 155, data FF is written to the memory control register. Any changes to this register are made through data FF for at least one instruction time. This ensures that data drivers will switch smoothly with no glitches. Glitches cause splatter on the screen.

Beyond this one requirement, the two planes are programmed independently, except that use of bangers in one plane and shifters in another plane is forbidden.

Table 206 presents details for memory control register and auxiliary control register programming.

TABLE 206

| MEMORY CONTROL REGISTER PROGRAMMING | | | | | | | | |
|---|---|---|---|---|---|---|---|---|
| Reqister data bit | 7 | 6 | 5 | 4 | 3 | 2 | 1 | 0 |
| COMMAND | | | | | | | | |
| OFF | 1 | 1 | 1 | 1 | 1 | 1 | | |
| 1 | | | | | | | | |
| Plane 0 | | | | | | | | |
| BIT SET | P | P | X | X | 0 | 0 | 1 | |
| 1 | | | | | | | | |
| BIT CLEAR | L | L | X | X | 0 | 1 | 0 | |
| 1 | | | | | | | | |
| COMPLEMENT BIT | A | A | X | X | 0 | 1 | 1 | |
| 1 | | | | | | | | |
| DATA FROM CPU | N | N | X | X | 0 | 0 | 0 | |
| 1 | | | | | | | | |
| | E | E | | | | | | |
| SHIFT RIGHT | | | X | X | 1 | 1 | 0 | |
| 0 | | | | | | | | |
| SHIFT LEFT | S | S | X | X | 1 | 1 | 1 | |
| 0 | | | | | | | | |
| SHIFT VERT | E | E | X | X | 1 | 0 | 1 | |
| 0 | | | | | | | | |
| | L | L | | | | | | |
| Plane 2 | E | E | | | | | | |
| BIT SET | C | C | 0 | 1 | 0 | X | X | |
| 1 | | | | | | | | |
| BIT CLEAR | T | T | 1 | 0 | 0 | X | X | |
| 1 | | | | | | | | |
| COMPLEMENT BIT | | | 1 | 1 | 0 | X | X | |
| 1 | | | | | | | | |
| DATA FROM CU | | | 0 | 0 | 0 | X | X | |
| 1 | | | | | | | | |
| PLANE SELECT CODE | | | | | | | | |
| PLANE 0 | 0 | | 1 | | | | | |
| PLANE 2 | 1 | | 0 | | | | | |
| CPu to select plane | 1 | | 1 | | | | | |
| PLANE 0 PLANE 2 | 0 | | 0 | | | | | |

AUXILIARY CONTROL REGISTER

BIT 7

DOUBLE CYCLE—When this bit is set, double cycles are executed. Double cycles are executed only when Bit Banging functions are executed. The bit banging functions are BIT SET, BIT CLEAR and COMPLEMENT. This bit is never set when using the shifters or reading and writing data to or from the video CPU. When this bit is set, all video CPU cycles become double cycles operating on the address location and the addressed location plus 32K. By setting this bit, operation of the bangers through the use of string commands becomes possible. When the bangers are operated in this manner, the video CPU's perception is that all four planes are being banged at once. When the double cycle bit is set, the rest of the bits in the word are required to specify which functions in which planes are to be banged.

BIT 6

This bit is LO when it is desired to bang into planes 1 and 3. It is high all other times. This bit is ignored if BIT 7 is not set.

BIT 5

This bit is LO when it is desired to bang into plane 3 but not plane 1. It is HI for all other types of banging. What happens in planes 0 and 2 does not affect this bit. This bit's state does not matter if BIT 7 is not set.

BIT 4

This bit is LO when it is desired to bang into plane 1 but not plane 3; it is HI all other times. What happens in planes 0 and 2 does not affect this bit. This bit's state does not matter if BIT 7 is not set.

NOTE: No more than one of the three above bits may be low during the time bit 7 is set. If it is not necessary to bang into either plane 3 or into plane 1, then bit 7 is not set. Alternately, it is possible to set bit 7 but keep bits 4–6 all high; this suffers from longer execution time than the first choice because double cycles are performed. The remaining four bits in this register select which banger functions are to be performed in planes 1 and 3 as set forth in Table 207.

TABLE 207

| | Plane 1 | |
|---|---|---|
| | D3 | D2 |
| BIS | 0 | 1 |
| BIC | 1 | 0 |
| COM | 1 | 1 |
| | **Plane 3** | |
| | D1 | D0 |
| BIS | 1 | 0 |
| BIC | 0 | 1 |
| COM | 1 | 1 |

For programming the VTAC, the following sequence is used:

VTAC+E=0

VTAC+C=0

VTAC+A=0

VTAC+0=47

VTAC+1=31

VTAC+2=3B

VTAC+3=26

VTAC+4=26

VTAC+5=14

VTAC+6=26

VTAC+E=0

VTAC+C=0

PPI for SEGMENT and Miscellaneous CSR Functions

Port A is used as the public bus segment register. It is programmed for operation in MODE 0 OUTPUT.

Port B is used as a status port programmed for operation in MODE 0, INPUT. The bit assignments are set forth in Table 208.

Table 208

BIT B0—DSRA, Data Set Ready from the A port serial channel
BIT B1—DSRB, Data Set Ready from the B port serial channel
BIT B2—Not Used
BIT B3—Not Used
BIT B4—Latched Signal Quality A. The signal quality from the A port is latched when it goes active. The output of the latch is brought to this signal. The latch is reset by the RESET signal or by CLEAR SG (see subsection "CCR SQ-L" below)
BIT B5—Latched Signal Quality B. The signal quality from the B port is latched when it goes active. The output of the latch is brought to this signal. The latch is reset by the RESET signal or by CLEAR SQ (see subsection "CLR SQ-L" below).
BIT B6—Baud rate clock for channel A. This signal is brought here so proper operation of the baud rate clock can be determined as part of the diagnostics.
BIT B7-Baud rate clock for channel B. This signal is brought here so proper operation of the baud rate clock can be determined as part of the diagnostics. This is necessary for channel B because the baud rate for channel B is not under program control. Examination of this port pin tells the system that the selected baud rate is correct.

Port C is used as a status port programmed for operation in MODE 0 INPUT. The bit assignments are set forth in Table 202.

Table 209

BIT C0—RING A. The status of the RING line of the A port is reported on this line.
BIT Cl—RING B. The status of the RING line of the B port is reported on this line.
BIT C2—Blink. The timer output (TIMER 3) responsible for the blink function is connected here.
BIT C3—Tone. The timer output (TIMER 2) responsible for the tone/real-time clock function is connected here.
BIT C4—HORIZONTAL SYNC. The Horizontal Sync out of the VTAC is connected here. This waveform is useful in establising proper operation of the VTAC when executing diagnostics.
BIT C5—DIAG 1 line from the public bus.
BIT C6—DIAG 2 line from the public bus.
BIT C7—Watchdog Status. This line is LO when either the watchdog timer has timed out, or if the DIAGPASSED bit is not set. The DIAGPASSED bit is set when all the power-on and warm start diagnostics are passed.

Dual USART 65 and 65'

The synchronous/asynchronous communications channels are provided by an Intel 8274A chip. For a detailed description of operation of this part see the Intel manual for the chip. The "A" USART is used as a general purpose port. This is the port which has the programmable baud rate.

The "B" port of the USART ia used primarily for operation with the touch panel and keyboard interface. Its baud rate is set by jumpers.

CLR SO-L

When this location is selected by the CPU, the two SIGNAL QUALITY flip-flops are reset.

PPI #1 265

All three ports of this device are operated in OUTPUT, MODE 0. Many bits in this device are not used (this is done in order to conform to the BSA nuncio on similarity of serial ports from the operating system viewpoint). Only those bits which are actually used are described in Table 210 below.

Table 210

BIT A0—EXTCLKA-H. When HI, this line selects the clock source for the RECEIVE DATA to be external for channel A. This implies synchronous comunications. When LO, the TRANSMIT clock is looped back to the RECEIVER.
BIT Al—EXTCLKB-H. When HI, this line selects the clock source for the RECEIVE DATA to be external for channel B. This implies synchronous communications. When LO, the TRANSMIT clock is looped back to the RECEIVER.
BIT A4—RATESELA-H. When HI, the RATE SEL signal to serial port A is active. When LO, it is not active.
BIT A5—RATESELB-H. When HI, the RATE SEL signal to serial port B is active. When LO, it is not active.
BIT B0—RESLOOPA-H. This signal is used to test serial port A. When LO, the circuitry operates in the normal mode. When HI, the following takes place:
DTR is looped back to DSR
RTS is looped back to CTS
RTS is looped back to DCD
TXD is looped back to RXD.
Note that the clock is looped back to itself by bringing EXTCLKA-H (BIT A0) LO.
BIT B1—RESLOOPB-H. This signal is used to test serial port B. When LO, the circuitry operates in the normal mode. When HI, the following takes place:
DTR is looped back to DSR
RTS is looped back to CTS
RTS is looped back to DCD
TXD is looped back to RXD. Note that the clock is looped back to itself by bringing EXSTCLKB-H BIT Al) LO.
BIT B4—DIGLOOPA-H. When HI, this bit activates the RS-232 signal LOCAL LOOP for serial channel A.
BIT B5—DIGLOOPA-H. When HI, this bit activates the RS-232 signal LOCAL LOOP for serial channel B.
BIT C0—REMOTELOOPA-H. When HI, this bit activates the RS-232 signal REMOTE LOOP for serial channel A.
BIT C1—REMOTELOOPB-H. When HI, this bit activates the RS-232 signal REMOTE LOOP for serial channel B.
BIT C5—TONE-ON-H. When this bit is HI, th frequency generated in TIMER0 is sent to the audio amplifier.

PPI #2

Port A of this device is operated in MODE 0, INPUT. Bit assignments are set forth in Table 211.

Table 211

BIT A0-BIT A4—These five lines are the slot number from the motherboard. The video station can read these lines to determine where it is.

BIT A5—This bit is HI when an acknowledge timeout has occurred. It is cleared when INTA is emitted. This line is only polled during diagnostics.

BIT A6 Soft Reset Stat—This bit is HI when the Soft Reset is activated.

BIT A7 XACK TIME STAT—This bit is Lo if Xac Timeout is due to public bus denial and is Hi for addressing the EMPTY address space.

PORTS B and C - These are output ports operating in MODE 0. They report status information to the host CPU. The host CPU reads the status information in a 16 bit location. Bit assignments are:

BIT B0—When HI, error in Serial Channel A.
BIT Bl—When HI, error in Serial Channel B.
BIT B2—Undefined but wired.
BIT B3—Error condition 1 when HI.
BIT B4—Error condition 2 when HI.
BIT B5—Undefined but wired.
BIT B6—Undefined but wired.
BIT B7—Undefined but wired.
BIT C0—Selftest error when HI.
BIT Cl—RAM error wen HI.
BIT C2—ROM error when HI.
BIT C3—Timer error when HI.
BIT C4—PPI error when HI.
BIT C5—Undefined but wired.
BIT C6—Undefined but wired.
BIT C7—Undefined but wired.

PIC 242 The Intel 8259A PIC 242 is programmed for operation in the buffered, master-slave mode with no slaves. Interrupts are programmed to be edge triggered. The PIC is programmed using the following initialization words (ICW's):

ICWl=11H
ICW2=20H
ICW3=00H
ICW4=0DH

TIMERS 249

TIMER 0 is the baud rate generator. It operates in MODE 3.

TIMER 1 is the realtime clock/tone generator. It operates in MODE 3.

TIMER 2 is used for timing blink intervals. It operates in MODE 0.

Video Station as Seen as a Slave From the Public Bus

The memory map of the video station as seen from the public bus is set forth in Table 212.

Table 212

Location:
(SLOTNUM * 16).Write from host CPU-clear soft RESET.
(SLOTNUM * 16)+1. Write from host CPU-Apply soft RESET.
(SLOTNUM * 16)+2. Public bus-Write from host CPU-soft attention.
(SLOTNUM * 16). Read from Host CPU. LO order status word.
(SLOTNUM * 16)+1 Read from host CPU. HI order status word.

The bit map as viewed on the CRT has the features set forth in Table 213.

Table 213

1. There are 312 rows. ROW 0 is at the top of the screen, row 311 is at the bottom of the screen.
2. There are 64 bytes in each row. BYTE 0 is at the left (as viewed by the operator), BYTE 59 is at the right, BYTES 60-63 are not visible and are not used by the programmer.
3. There are eight bits in each byte. BIT 0 is at the leftmost position and BIT 7 is at the rightmost position (as viewed by the operator).

A byte location in memory is referenced by:

Address=(b 64×row number)+byte number

Video Station Miscellanous Information

Table 214 lists general characteristics of the video station and interrelated modules.

Table 214

A. Bytes are displayed on the CRT with the LSB's in the leftmost position.
B. From the time a reset signal is applied to the video station restarting the-program, until the RAM frefresh circuitry is guaranteed to be operating, can take 33 msec. The following start-up routine (residing in ROM) is used before attempting to read or write from RAM:
   1. Initialize control register disabling shifters.
   2. Initialize VTAC, activating refresh circuitry.
   3. Do a timed wait of about 45 msec.
C. Alpha characters should be programmed using a 5×7 matrix, in a 6×8 field. This yields a presentation of 80 characters by 39 rows.
D. When the hardware shifters or bangers are used, NO Display RAM accesses by the CPU may be executed except to those locations directly involved in the shift.
E. Shift to the right (decrement flag set) interrupts are disabled when the shifters are enabled.
   1. Shift left is done by excuting LODS from the left.
   2. Shift right is done by executing LODS from right to left (decrement flag clear).
   3. Shift vertical is done by executing LODS up or down columns.
   4. BLOCK FILL can be done by executing LODS in any direction or by using bit bangers.

Connectors

The video station uses the public bus to communicate to the other modules of the man-machine interface (see FIG. 1). Connection to the color monitor is via 4 connectors. Connection to a black and white monitor is via one connector.

Connection to the serial communications ports 65 and 65' is via pin "D" connectors. The video station is configured as DTE (Data Terminal Equipment). Voltage levels are the standard RS-232-C voltages. Connector pinout is summarized in the Table 215.

TABLE 215

| PIN | SIGNAL | |
|---|---|---|
| 1 | PROTECTIVE GROUND | |
| 2 | TRANSMITTED DATA | TO DCE |
| 3 | RECEIVED DATA | TO DTE |

TABLE 215-continued

| PIN | SIGNAL | |
|---|---|---|
| 4 | REQUEST TO SEND | TO DCE |
| 5 | CLEAR TO SEND | TO DTE |
| 6 | DATA SET READY | TO DTE |
| 7 | SIGNAL GROUND | |
| 8 | CARRIER DETECT | TO DTE |
| 11 | LOCAL LOOPBACK | TO DCE |
| 15 | XMIT SIGNAL TIMING | TO DTE |
| 17 | RCV SIGNAL TIMING | TO DTE |
| 18 | REMOTE LOOPBACK | TO DCE |
| 20 | DATA TERMINAL READY | TO DCE |
| 21 | SIGNAL QUALITY DETECT | TO DTE |
| 22 | RING INDICATOR | TO DTE |
| 24 | TRANSMIT SIG TIMING | TO DCE |

Connection to the beeper 61 is via one connector. Connection to the keyboard 68 and touchpanel 70 is via a cable and a connector.

INTERFACE LOGIC 67

Overview

As seen in FIG. 1, the purpose of the interface logic 67 is to interface keyboard 68, touch panel 70, and monitor screen 72 (the circuitry driving CRT screen 72) to the overall MMI. Communications are made via a 20MA current loop operating at 1200 baud.

As shown in FIGS. 1 and 70, the interface logic 67 incorporates an Intel Corporation 8031 microcomputer 370, ROM 371, RAM 372 (forming part of CPU 370) and an analog to digital converter 373 for processing touch panel coordinates and video level diagnostics.

Audio circuitry 375 is provided for an internal speaker (beeper 61), an output 376 for a public address system and a relay circuit 377 for driving a klaxon 39. Optionally, a joystick 378 may be connected to the A/D converter 373. The joystick can replace the touch panel 70 should the monitor 62 be out of reach of an operator.

References

MCS-51 Family of single Chip Microcomputers User's Manual—July, 1981.

Intel Corporation Component Data Catalog—1981.

National Semiconductor Data Conversion Data Book, 1980.

Performance Characteristics

Central Processing Unit (8031—CPU)

The Intel Corporation 8031 CPU is a single chip microcomputer capable of operating at a frequencey of 12 MHz. Resident within the CPU is a chip oscillator and clock circuitry, volatile 128×8 read/write data memory 372, 32 I/O lines, two 16-bit timer/event counters, two priority level, nested interrupt structure, and a full duplex serial I/O channel. The CPU coordinates the activity of the interface module and services the circuit's I/O devices.

The CPU's serial I/O channel is configured as an 8-bit asynchronous UART having 8 data bits, one start bit, one stop bit and a parity bit. The UART operates at 1200 baud providing communication between the MMI and the interface logic 67.

The CPU has its external access pin (EA) grounded, configuring its ports in a defined manner: Port 3 as a control port (read, write, interrupts, etc.); Port 0 as an 8-bit multiplexed address/data bus; Port 2 as the 8 most significant bits of the 16-bit address bus; and Port 1 as a general purpose I/O port. The CPU is capable of accessing up to 64K of program memory (ROM) 371 and 64K of data memory (RAM).

Within the internal RAM 372 are 256 individually addressable bits. Of these, 128 bits are located in the internal data RAM (0-7FH) and the second 128 bits are in the Special Function Registers. These bits are utilized as control flags and various control registers for the I/O devices.

ROM Space

The ROM 371 comprises 2K×8 bytes. ROM space contains the module's program as well as diagnostic routines.

RAM Space

The RAM space is divided into two areas: one resident within the CPU, the other to access I/O devices. The CPU area contains stack space and variable and flag space required by the program. The I/O space is linearly decoded to access the on-board I/O devices.

Interval Timers

An interval timer 380, (Intel type 8253 Programmable Interval Timer (PIT)) contains three 16-bit timers. Two of the three have their clock inputs tied to a 1.2 MHz oscillator.

The first timer is used as a baud rate generator for UART 381 (Intel Corporation 8251A). The second timer is used in conjunction with speaker 61 to provide a beep noise within the monitor. The timer's gate input is tied to a control bit from a latch 382 to enable or disable the beeper under software control. The third timer is left open for future use.

Universal Asynchronous Receiver-Transmitter (UART) 381

The UART 381 is configured in an asynchronous mode having one start bit, one stop bit, and 8 data bits operating at 1200 baud. Both the receive and transmit operate at the same speed. The UART is used to communicate with the keyboard 68. Information transmitted from the keyboard is checked by the UART to insure no error conditions occur. If an error occurs, providing it is not in diagnostic mode, the received data is ignored. If an error occurs in diagnostic mode, the error condition is recorded and transmitted to the MMI. The UART's transmitter is used to verify the integrity of the connection between the keyboard and the interface board as well as providing diagnostic capability.

Analog to Digital Converter (A/D) 373

The A/D converter 373 is an 8-bit microprocessor compatible analog to digital converter with 8 analog inputs. Selection of one of the 8 inputs is accomplished via three addressing inputs. In this application the A/D converter is utilized to convert the touch panel's analog inputs to a digital value which is then transmitted to the MMI as an X/Y coordinate. The remaining analog inputs are utilized for verification of video levels and as a joystick input. Each analog input is read at least twice to insure a stable input before the value is transmitted to the MMI. If two consecutive readings of the same value cannot be accomplished (i.e., an unstable input), a message is sent to the MMI indicating an A/D error.

20 Milliamp Current Loop 383

A current loop 383 is utilized for serial communications (up to 200 feet). The transmitter is driven by the CPU 370 through a buffer, then to a 2N3984 transistor capable of supplying 20 MA. The communications again are at 1200 baud. The receive portion of the communications is accomplished by the use of an opto-isolator (6N139) whose output is buffered and then connected to the CPU receiver line.

Analog Circuits

Audio Circuitry 375

Two forms of audio circuits are available on the interface board: a transistor driver circuit (2N3904) to interface to a speaker 61 within the monitor itself; and a transistor driver circuit through a 600 Ohm matching transformer providing an output 376 which can be connected to a public address system.

Both audio circuits are controlled by software and may be programmed to emit various tones.

Relay Circuit 377

A transistor driver circuit is provided to accommodate a relay to drive a klaxon. The relay circuit is controlled by a latched output under software control. The circuit is capable of supplying 200 milliamps at 12 volts maximum.

Touch Panel Circuitry

Touch Interrupt

A touch interrupt signal 384 is generated whenever contact has been made between the surfaces of the touch panel. Software writes the appropriate control byte to a latch 385 (LS374) that selects the interrupt mode. This in turn enables an open collector driver circuit (75452) supplying 5 volts or 2.5 volts (depending on the touch panel requirements) to the X plane of the touch panel. If contact is made, the wiper and X plane are at the same potential (5 or 2.5 volts). The wiper is connected to a voltage comparator (LM399) negative input. The positive input is clamped to half the voltage on the X plane. If contact is made, the negative comparator input becomes more positive than half the X plane voltage, so the output of the comparator goes low, generating an interrupt signifying that a touch is present. If no touch is present, the touch panel wiper is pulled to ground through a 1 megohm resistor.

X-Y References

X-Y references are generated by software writing the appropriate bit pattern to a latch 385 (LS374) enabling the X or Y axis supply voltage to the touch panel. The return lines of the touch panel references are then interfaced through an analog switch (14066B) then to operational amplifiers which generate the references required by the A/D converter 373.

X-Y Position

An X-Y position is measured by supplying a voltage (2.5 or 5 volts) across the resistive material on the touch panel 70 (see FIG. 1) surface. Depending upon where the panel is touched, there is a voltage on the opposite surface. This voltage is interfaced to the inputs of the A/D converter. The A/D converter then converts the voltage level to a digital value between 0 and FFH (0 volts or 5 volts).

Diagnostics

Diagnostics on the interface logic are performed when power is applied. The MMI sends a command via the serial link instructing the interface logic as to which test is to be performed. The following is a brief description of each test.

Checkrom—a checksum is calculated for the on-board ROM and the keyboard ROM. The keyboard has a check-sum routine within its resident program. This routine is initiated by sending a hexadecimal code 8C to the keyboard which returns a single byte as a check-sum. The onboard ROM check-sum is initiated at the same time as the keyboard routine (when the 8C hexadecimal code is received from the from the MMI). The keyboard check-sum and onboard check-sum are added together and transmitted to the MMI as a single byte.

Reset—whenever a hexadecimal code "92" is received from the MMI, the interface logic will reset itself including the keyboard. All I/O devices will be returned to an initialized state.

Echo Mode—echo mode is initiated whenever a "9E" hexadecimal code is received from the MMI. This test echoes 256 characters transmitted from the MMI. The flow of the routine is to receive the characters, transmit them to the keyboard, which in turn echoes the characters back to the interface logic, which in turn echoes the characters back to the MMI. In this way, the entire serial link from MMI to the interface logic and back can be verified. This routine excludes codes 9E and 8C which are interpreted as reset and checkrom.

LEDS—a total of 10 LED's is visible to an operator. Eight of the 10 reside within the keyboard 68. (LED 0–7). Commands received from MMI illuminate the LED's as follows:

Hexadecimal code:

AX-LEDS 0–3

BX-LEDS 4–7

CX-LEDS 8 & 9

The "X" portion of the command is the pattern written to the LED's. LED's 8 and 9 are warning lamps mounted to the monitor 62 (lamps 101 and 103, see FIG. 1).

SOFTWARE INTERFACE

CPU ADDRESS 10 H and 11H

| C/D (A0) | RD | WR | CS (A4) |
|---|---|---|---|
| 0 | 0 | 1 | 0 = 8251 Data → Data Bus |
| 0 | 1 | 0 | 0 = Data Bus → 8251 Data |
| 1 | 0 | 1 | 0 = Status → Data Bus |
| 1 | 1 | 0 | 0 = Data Bus → Control |
| X | 1 | 1 | 0 = Data Bus → Tri-State |
| X | X | X | 1 = Data Bus → Tri-State |

Mode Instructions (Data = 4 FH)

Table 58 illustrates the signals associated with the various formats. The pin assignments for the board connectors J1 and J2 are shown in Table 59.

Thus the interface logic circuit provides the necessary interconnects between the monitor CRT, keyboard, touch screen and MMI so as to provide the means for design, configurer and operator use of the overall MMI.

TABLE 58

| D7 | D6 | D5 | D4 | D3 | D2 | D1 | D0 |
|---|---|---|---|---|---|---|---|
| 0 | 1 | X | 0 | 1 | 1 | 1 | 1 |

- Baud Rate Factor X64
- Character Length 8 Data Bits
- Parity Disabled
- Parity Odd/Even
- Stop Bits = 1

Command Instruction

| D7 | D6 | D5 | D4 | D3 | D2 | D1 | D0 |
|---|---|---|---|---|---|---|---|
| X | 0 | X | 1 | 0 | 1 | X | 0 |

- Transmit Disable
- Data Terminal Ready
- Receive Enable
- Send Break = Normal
- Error Reset 1 = Reset Flags
- Request to Send
- Internal Reset - does not return to mode format
- Enter hunt mode Status Information

| D7 | D6 | D5* | D4* | D3* | D2 | D1 | D0 |
|---|---|---|---|---|---|---|---|

- Transmit RDY
- Receive RDY
- Transmitter Empty
- Parity Error
- Overrun Error
- Framing Error
- Sync Detector
- Data Set RDY

*Only concerned with errors.

- 8253 PIT - ADDRESS 20H-23H

| $\overline{CS}$ | $\overline{RD}$ | $\overline{WR}$ | A1 | A0 | |
|---|---|---|---|---|---|
| 0 | 1 | 0 | 0 | 0 | LOAD COUNTER 0 |
| 0 | 1 | 0 | 0 | 1 | LOAD COUNTER 1 |
| 0 | 1 | 0 | 1 | 0 | LOAD COUNTER 2 |
| 0 | 1 | 0 | 1 | 1 | WRITE MODE WORD |
| 0 | 0 | 1 | 0 | 0 | READ COUNTER 0 |
| 0 | 0 | 1 | 0 | 1 | READ COUNTER 1 |
| 0 | 0 | 1 | 1 | 0 | READ COUNTER 2 |
| 0 | 0 | 1 | 1 | 1 | NOP TRI-STATE |
| 1 | X | X | X | X | DISABLE TRI-STATE |
| 0 | 1 | 1 | X | X | NOP TRI-STATE |

Control Word Format

| D7 | D6 | D5 | D4 | D3 | D2 | D1 | D0 |
|---|---|---|---|---|---|---|---|
| SC1 | SC0 | RL1 | RL0 | M2 | M1 | M0 | BCD |

SC = Select Counter

| SC1 | SC0 | |
|---|---|---|
| 0 | 0 | - Select Counter 0 |
| 0 | 1 | - Select Counter 1 |
| 1 | 0 | - Select Counter 2 |
| 1 | 1 | - Illegal |

RL = Read/Load

| RL1 | RL0 | |
|---|---|---|
| 1 | 0 | - Read/Load MSB only |
| 0 | 1 | - Read/Load LSB only |
| 1 | 1 | - Read/Load LSB then MSB |
| 0 | 0 | - Counter Latching Operation |

M = Mode

| M2 | M1 | M0 | |
|---|---|---|---|
| 0 | 0 | 0 | - MODE 0 |
| 0 | 0 | 1 | - MODE 1 |
| X | 1 | 0 | - MODE 2 |
| X | 1 | 1 | - MODE 3 |
| 1 | 0 | 0 | - MODE 4 |
| 1 | 0 | 1 | - MODE 5 |

Mode Definition

0 = Interrupt on terminal Count
1 = Programmable one shot

TABLE 58-continued

2 = Rate generator
3 = Square wave generator
4 = Software triggered strobe
5 = Hardware triggered strobe
BCD - 0 = Binary counter (16 Bits)
1 = Binary coded decimal (4 decades)

ADC 0808 - A/D Converter - Address 8H-FH

| CS(A3) | RD | WR | A(A0) | B(A1) | C(A2) | |
|---|---|---|---|---|---|---|
| 0 | 0 | 1 | X | X | X | - READ |
| 0 | 1 | 0 | 0 | 0 | 0 | - START CONVERSION IN0 |
| 0 | 1 | 0 | 1 | 0 | 0 | - START CONVERSION IN1 |
| 0 | 1 | 0 | 0 | 1 | 0 | - START CONVERSION IN2 |
| 0 | 1 | 0 | 1 | 1 | 0 | - START CONVERSION IN3 |
| 0 | 1 | 0 | 0 | 0 | 1 | - START CONVERSION IN4 |
| 0 | 1 | 0 | 1 | 0 | 1 | - START CONVERSION IN5 |
| 0 | 1 | 0 | 0 | 1 | 1 | - START CONVERSION IN6 |
| 0 | 1 | 0 | 1 | 1 | 1 | - START CONVERSION IN7 |
| 1 | X | X | X | X | X | - TRI-STATE |

8031 - Port 1 - Status Port

| D7 | D6 | D5 | D4 | D3 | D2 | D1 | D0 |
|---|---|---|---|---|---|---|---|
| X | X | X | | | | | |

- A/D Converter Ready
- Receive Interrupt (8251)
- Transmit Interrupt (8251)
- Joy RDY (Joystick Available)
- Spare
- JS But (Joystick push button)

TABLE 59

Pin Assignments
Power Connector J1

1. - - - Spare
2. - - - Spare
3. - - - 5 Volts
4. - - - Center Tap
5. - - - 5 Volts
6. - - - 12 Volts
7. - - - Center Tap
8. - - - 12 Volts
9. - - - Chasses GND Pin Assignments J2 (Analog)

1. Transmit Data (current loop)
2. GND
3. Spare
4. RXD (keyboard)
5. GND
6. GND
7. Touch Panel Select
8. Touch Panel X supply
9. Touch Panel Y supply
10. + ref. Y axis
11. + ref. X axis
12. X wiper
13. Spare
14. LED B
15. LED 9
16. Spare
17. Joystick X
18. Joystick Button
19. GND TABLE 59-continued

| |
|---|
| 20. + 12 volts |
| 21. P.A. Out |
| 22. Speaker + |
| 23. Spare |
| 24. Spare |
| 25. Spare |
| 26. + 12 volts |
| 27. Receive return (current loop) |
| 28. Receive Data (current loop) |
| 29. Keyboard reset |
| 30. TXD (keyboard) |
| 31. + 5 (keyboard) |
| 32. Spare |
| 33. GND |
| 34. Touch Panel X supply |
| 35. Touch Panel Y return |
| 36. - ref. Y axis |
| 37. - ref. X axis |
| 38. Y wiper |
| 39. + 5 volts |
| 40. LED A |
| 41. LED 8 |
| 42. + 5 volts |
| 43. Joystick Y |
| 44. Joystick Ready |
| 45. Spare |
| 46. Relay return |
| 47. P.A. Out |
| 48. GND |
| 49. Spare |
| 50. Spare |

FLOPPY DISK CONTROLLER MODULE

Overview

The floppy disk controller module 30 is a single board intelligent disk controller capable of controlling both 8-inch (15.3 cm) (MAXI) and 5¼-inch (13.1 cm) (MINI) disk drives. It interfaces to the public bus 92 and is responsible for disk control and is capable of file management.

The floppy disk controller module supports mini and maxi soft-sectored, single or double sided disk drives. The two mini drives are connected radially, and the four maxi drives are daisy-chained. The combination of these drives is limited to four drives. The disk format technique is IBM 3740 (single density) or IBM system 34 (double density). The floppy disk controller module is also capable of accepting disks formatted on the Convergent Technologies' systems (Convergent Technologies, Santa Clara, Calif., and their operating manual for their CTOS operating system). The storage capability of a disk drive varies with manufacturers.

Typical storage capacities of double density formatted disks are:

| | Track | Disk |
|---|---|---|
| MAXI Single-Sided | 6.6K Bytes | 500K Bytes |
| MAXI Double-Sided | 6.6K Bytes | 1000K Bytes |
| MINI Single-Sided | 4.6K Bytes | 161.3K Bytes |
| MINI Double-Sided | 4.6K Bytes | 322.6K Bytes |

Figure 75:
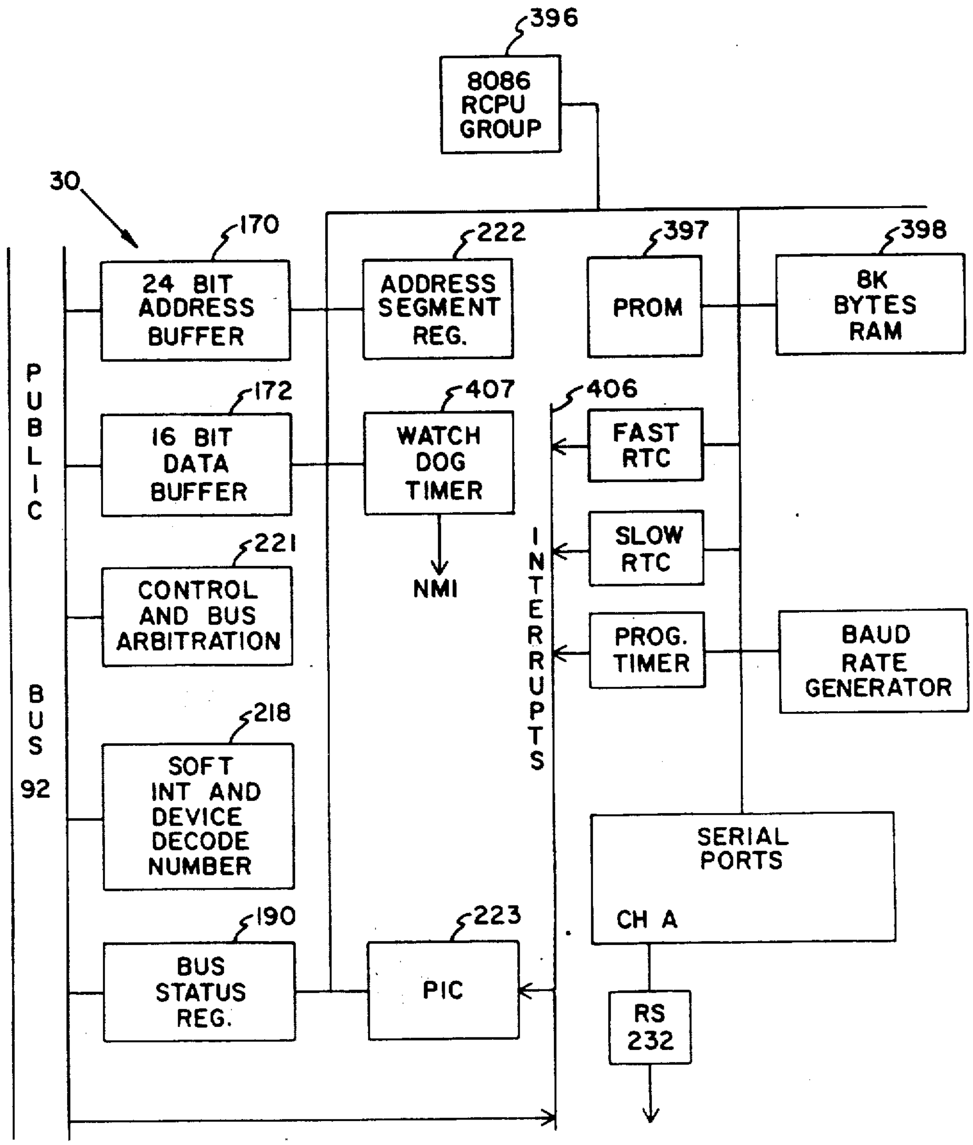
FIG. 75 is an overall block diagram of the floppy disk controller.

As seen in FIG. 75, the floppy disk controller module operational blocks are the Intel Corp. 8086 CPU group, 4K–32K bytes of PROM 397, 8K bytes of static RAM 398, a bus interface comprises address buffer 170, data buffer 172, soft interrupt and device decode module 218, address segment/register 222/status register 190, interrupts, control and bus arbitration module 221, floppy disk controller section 405, timers 406 including watchdog timer 407, programmable interrupt controller (PIC) 223 and diagnostics. The 24 bit address buffer 170, the status register 190, the 16 bit data buffer 172, the control and bus arbitration module 221, the soft interrupt and device decode module 218, the address segment register 222, the fast watchdog timer 407, and PIC 223 utilize similar circuitry and perform in completely analogous fashion to those same modules in the CPU module 22, the memory module 24 and the video CPU modules 26 described elsewhere in this document.

The floppy disk controller module features are as follows:

(1) Capable of 5 MHz or 8 MHz operation,
(2) Watch dog timer,
(3) Soft interrupt and soft reset to support the public bus 92,
(4) The ability to determine the drive configuration and pass this information on to the configuration block,
(5) Registers which are all rea/write registers, and
(6) Diagnostic serial port.

Reference Documents (A) Shugart Corporation SA800/850 Diskette Storage Drive Maintenance Manual,
(B) Shugart Corporation SA800/850 Diskette Storage Drive OEM Manual,
(C) Shugart Corporation SA400/450 Minifloppy Diskette Storage Drive Service Manual,
(D) Shugart Corporation SA400/450 Minifloppy Diskette Storage Drive OEM Manual,
(E) ISBC Corporation 86/12 Single Board Computer Hardware Reference Manual (9800645A),
(F) The Intel Corp. 8086 Family User's Manual (9800645A),
(G) Nippon Electric Corp. Microcomputers, User's Manual, P765 Single/Double Density Floppy Disk Controller,
(H) Nippon Electric Corp. Microcomputers, Application Note 8,
(I) Intel Corp. Peripheral Design Handbook Ref. 8255A, 8272, 5251A, 8253-5,
(J) Intel Corp. Multibus Interfacing—App. Note 28A
(K) "Designing 8086, 8088, 8089 Multiprocessing Systems with the 8289 Bus Arbiter"—Intel Corp. App. Note 51,
(L) "Using the 8259A Programmable Interrupt Controller"—Intel Corp. App. Note 59
(M) "8086 System Design"—Intel Corp. App. Note 67,
(N) EIA Standard—RS232, and
(O) EIA RS232 Asynchronous Port Standard WP-730-703-003.

PERFORMANCE SPECIFICATION

Resident Control Processing Unit (RCPU)

The floppy disk controller module is based on the Intel Corp. 8086, a 16-bit microprocessor. It can support both the Intel Corp. 8086 and 8086-2, for maximum operating speeds of 5 MHz and 8 MHz respectively.

The Resident Control Processing Unit (RCPU) 396 has a minimum and a maximum mode. The RCPU is configured in the maximum mode. This extends the system architecture to support multiprocessor configurations. Maximum mode configuration requires the addition of an Intel Corp. 8288 bus controller or equivalent. This allows for the enhancements of the system architecture. Two 8288's are utilized to supply the resident bus commands and public bus 92 commands. See Reference F for more detail.

The RCPU requires a high active reset with minimum pulse width of 4 CPU clocks, except after power-on which requires a 50 micro-second reset pulse. The reset pulse is internally active for up to one clock period after the external reset. Therefore, any activity after reset is delayed one clock period after the external reset. Therefore, non-maskable interrupts (NMI) or hold request on RQ/GT which occur are not acknowledged.

The RCPU is capable of receiving a reset pulse. This is accomplished by either the INIT/signal, or the soft reset, both of which come from the system bus. Refer to Reference F for details on INIT implementation.

The RCPU self initializes on power-up. The RCPU sets the floppy disk controller module up for operation and informs the CPU module 22 of its configuration at the completion of initialization.

Floppy Disk Controller (NEC UPD 765/Intel Corp. 8272)

The UPD is an LSI floppy disk controller (FDC) 405 chip which contains the circuitry and control function for interfacing a processor to four floppy disk drives 76.

There are fifteen separate commands which the UPD765 executes. Each of these commands requires multiple 8-bit bytes to fully specify the operation which the processor wishes the FDC to perform. The following commands are available.

| | |
|---|---|
| Read Data | Write Data |
| Read ID | Format a track |
| Read deleted data | Write deleted data |
| Read a track | Seek |
| Scan equal | Recalibrate (restore TROO) |
| Scan high or equal | Sense interrupt status |
| Specify | Sense drive status |

The instruction set and operation procedures are described in detail in references G and H. Special requirements are detailed later.

Data Encoding/Write Precompensation, and Data Decoding

Write precompensation is used during data encoding to further reduce peak shift in the play back signal. The encoding process is accomplished within the UPD765. The encoding algorithm for precompensation is controlled by the hardware. The precompensation for mini drives is 125 nanoseconds and for maxi drives is 200 nanoseconds (inner tracks).

The data decoding process is the recovering of the data recorded on the disk. The process must take into account speed variation of the disk drive and peak shifts in the playback signal. Data decode is accomplished by using phase lock loop (PLL) and phase control circuitry. The phase control circuit provides the adjustable delay used to obtain the proper phase difference between the readback pulses and PLL clock signals. The phase control circuit also provides the data window which brackets the decoded data bits that are inputted by the FDC. The FDC performs the process of serial to parallel data conversion (8-bit byte). The data decoder is selectable to function for both single and double density data compaction.

Memory—PROM/RAM

PROM 397

The floppy disk controller module has PROM space capable of using either 4K or 8K×8 parts, providing either 8K, 16K or 32K bytes of PROM, respectively. Jumpers are provided to select the size and speed of the PROM used. The floppy disk controller module is configured to use 4K×8 parts. Address lines are connected to the devices starting with A1, not A0, and continuing up to the maximum number the device requires, leaving the remaining address lines for chip enable decoding.

The addresses for the PROM's are:

| PROM Space | Address |
|---|---|
| 8K bytes | FE000-FFFFF H |
| 16K bytes | FC000-FFFFF H |
| 32K bytes | F8000-FFFFF H |

Static RAM 398

The floppy disk controller module is capable of using 2K or 8K×8 parts, providing either 8K, 16K, or 32K bytes of RAM. Jumpers are provided to select the size of the RAM used. The floppy disk controller module is configured to use 2K×8 parts. Interfacing the RAM to the system requires that AO and BHE/ be included in the chip select/chip enable decoding of the device. This analysis is described in Reference F on page A-54.

The addresses for the RAM's are:

| RAM Space | Address |
|---|---|
| 8K bytes | 00000-01FFF H |
| 32K bytes | 00000-07FFF H |

Bus Arbitration

Bus Arbitration is accomplished with the use of the Intel Corp. 8289 bus arbiter. The use of the 8289 allows a means of resolving priority between bus masters simultaneously requesting the system bus. Further details of the bus arbitration are presented in the overall bus section herein.

Bus Interface

The floppy disk controller module bus interface is in accordance with the description in the overall public bus section. The floppy disk controller module bus features a 24-bit address bus, a 16-bit data bus with byte swap capability, and four hard interrupts. It can receive the INIT signal, soft interrupts, and the BUS CLK, which is driven by the first board in the system capable of driving it. Since the floppy disk controller module cannot drive the BUS CLK, the ENCLKIN-L and ENCLK0-L are jumpered.

AS/Control/Drive Status Registers (ACSR)

The ACSR performs the following three functions:

(1) Address segment (ASR)

(2) Control (CR)

(3) Drive status register (DSR)

The function of each of these registers is explained in the following subsections. The implementation of these read/write registers is achieved with the Intel Corp. 8255A programmable peripheral interface (PPI). The PPI is initialized via a mode instruction as follows:

| MODE DEFINITION | | |
|---|---|---|
| Memory Address | Data | Comments |
| 7FFF6 | 98 | Port A - Inputs<br>Port B - Outputs<br>Port C - Bits 0-3 Outputs<br>Port C - Bits 4-7 Inputs |

Drive Status Register (DSR)

The status register is Port A of the PPI. The register is 8 bits and is used for system operation and configuration. The bits are as follows:

| Memory Address Port A Bit | Name | Function |
|---|---|---|
| 0 | MINOIN-L | A 0 indicates mini disk drive 0 is connected in connector J2. |
| 1 | MIN1IN-L | A 0 indicates mini disk drive 1 is connected in connector J3. |
| 2 | MAXIN-L | A 0 indicates a maxi disk drive is connected in connector J1. this signal only informs you that a maxi drive is connected. It does not inform you of how many maxi drives are in the systems. |
| 3 | HARDINT- | This bit, when a 1, informs the floppy disk controller module that the hard interrupt it generated has not been serviced. A 0 means the interrupt has been serviced. |
| 4 | SPARE | Not Used |
| 5 | SPARE | Not Used |
| 6 | SPARE | Not used |
| 7 | FINT-H | This signal is used to perform floppy disk operations. When a 1, the FDC is serviced with the sense interrupt command to determine the cause of the interrupt. |

Address Segment Register (ASR) 222

The address segment register, Port B of the PPI, is used to extend the 20 address lines of the RCPU to 24 address lines for the public bus 92. This allows the floppy disk controller module to access the full 16 megabytes of off-board memory. On board operations use only the RCPU's 20-address lines (see man machine interface architecture section).

All memory operations that are not accessing on board devices are decoded as off board. Additionally, off board addresses E0000–EFFFF are used as a "window" to place the 8 bits from the address segment register onto the public bus 92 along with the lower 16 address bits from the RCPU. For all off board addresses not in this "window", the 24-bit public bus 92 address consists of the full 20-bit RCPU address and zeroes in the top 4 bits. Thus, any megabyte of the available 16 megabytes of off board memory may be accessed with the address segment register, while only the bottom megabyte minus the on board addresses may be accessed without the address segment register.

The Address segment register is loaded by the floppy disk controller module and is treated as a single 8-bit port which is memory mapped at 7FFF2H. The off board memory is thus broken into 256 pages (each page containing 64K bytes) with the address segment register contining the page and the 16 least significant address bits from the RCPU providing the remainder of the address. Again, the floppy disk controller module address must be in the range of E0000–EFFFF for the 8 bits from the address segment register to be placed on the bus. Thus the following is done to write to off board memory location ADFE20H:

| DATA | ADDRESS | COMMENTS |
|---|---|---|
| ADHH | MEM write - 7FFF2 | Set ASR with 8 MSB |
| XX | MEM write - EFE20H | "Dummy" write, to window and the 16 LSB |

| MEMORY ADDRESS 7FFF2 PORT B BIT | NAME | FUNCTION |
|---|---|---|
| 0 | MBA10 | Public Bus 92 Address 10 |
| 1 | MBA11 | Public Bus 92 Address 11 |
| 2 | MBA12 | Public Bus 92 Address 12 |
| 3 | MBA13 | Public Bus 92 Address 13 |
| 4 | MBA14 | Public Bus 92 Address 14 |
| 5 | MBA15 | Public Bus 92 Address 15 |
| 6 | MBA16 | Public Bus 92 Address 16 |
| 7 | MBA17 | Public Bus 92 Address 17 |

Control Register

The control register establishes system operations and configuration. The CR is the Port C register of the PPI. Bits 0–3 are outputs while bits 4–7 are inputs. This register allows byte read/write operation or individual bit set/reset operation. The bit set/reset operation is used to eliminate the problems that are encountered with byte operations. When using the bit set/reset function, the mode instruction memory address is used.

Memory Address

The memory address used by the floppy disk controller is given in Table 45.

Timer-Watchdog

The watchdog timer performs several functions. It informs the CPU module 22 that the floppy disk controller module has malfunctioned and generates both a RCPU NMI and a FDC terminal count. The terminal count ensures proper floppy termination. The CPU module 22 at this time does not rely on the floppy disk controller module and takes appropriate action for recovery.

The timer is not enabled until an initial write to the watchdog address is done. After this first write, the timer requires that the floppy disk controller module operating system retrigger the timer, thus not allowing it to timeout and indicate a failure.

The mechanism for retriggering the timer is described below. The CPU module 22 determines the state of the floppy disk controller module watchdog by performing a soft interrupt read of the floppy disk controller module system I/O address which is detailed later.

Data bit 0=1 timed out

Data bit O=0 no time out

Should the floppy disk controller module recover from its error state, the watchdog timer is reset.

TABLE 45

MEMORY ADDRESS 7FFF4 PORT C

| BIT | NAME | FUNCTION |
|---|---|---|
| 0 | ONBDRST-H | Allows the MMDC to put the hardware into the reset state. The on board reset does not reset the RCPU or the PPI. It must be set to a 1 for a minimum of 3 usec and then set to 0. |
| 1 | TERCNT1-H | A 1 gives a terminal count to the floppy disk controller chip. |
| 2 | MNL-MXH | This bit selects the type of drive being utilized. A 0 selects Mini drives, a 1 selects Maxi drives. The drive type for a particular system is determined with Port A of the PPI. |
| 3 | TEST-H | A 1 will force the test line on the RCPU to the active state. |
| 4 | 8MHzEN-L | A 1 indicates 5MHz operation. A 0 indicates 8MHz operation. |
| 5 | DIAG1-L | TBD |
| 6 | DIAG2-L | TBD |
| 7 | WTCHDG-H | A 0 indicates normal operation. A 1 indicates the watchdog timer has timed out. |

Retriggering the Watchdog Timer

When the system is running properly, the watchdog timer can never timeout. The software retriggers the timer within 520 milliseconds of the previous retrigger. Retriggering the timer is accomplished by a memory write to address 7FFD8H with an alternating data pattern. The data is as follows:

| D7 | D6 | D5 | D4 | D3 | D2 | D1 | D0 |
|---|---|---|---|---|---|---|---|
| 0 | V1 | V2 | SLT16-L | SLT08-L | SLT04-L | SLT02-L | SLT01-L |

V1 and V2 are the alternating data bits. The first time the timer is triggered, V1=0 and V2=1. Each time the timer is triggered, these two bits toggle, thus requiring the software to keep track of which data pattern is required. A timeout resets V1 to 0 and V2 to 1.

If the floppy disk controller module is in Slot 4 of rack 0, the initial trigger requires the data be 3 1 BH. The next trigger requires 5BH, 3BH, 5BH, and so on. Further details of the improved watchdog timer mechanism are presented elsewhere herein.

Interrupts

Programmable Interrupt Controller (PIC) 223

The floppy disk controller module has six interrupt levels. Interrupts are serviced with the use of a programmable interrupt controller (PIC). The interrupt controller can be configured in many ways to suit system applications.

Programming the PIC

The PIC is initialized to obtain proper operation. This is done by using the initialization control words. Table 46 shows the loading sequence and data required for initialization.

TABLE 46

| | ADDRESS | DATA | COMMENTS |
|---|---|---|---|
| ICW1 | 7FFE8 | 13H | SINGLE PIC, EDGE TRIGGERED |
| ICW2 | 7FFEA | 20H | INTERRUPT VECTOR ADDRESS |
| ICW3 | — | — | ICW3 IS NOT NEEDED |
| ICW4 | 7FFEA | OFH | SPECIAL FULLY NESTED MODE, BUFFERED, AUTO EOI |

TABLE 47

| | ADDRESS | DATA | COMMENTS |
|---|---|---|---|
| OCW1 | 7FFEA | D7 D6 D5 D4 D3 D2 D1 D0 | 0=ENABLE 1=MASK |
| OCW2 | 7FFE8 | 80H | ROTATE ON AUTO EOI |
| OCW3 | 7FFE8 | 08H | VECTORED MODE |

After the initialization control words have been entered, operational control words are used to set up current functions.

The interrupt inputs are masked or enabled as desired. This is done by OCW1. The format is set forth in Table 47.

The control words selected do the following:

(1) Automatically reset control after interrupt acknowledge (no software intervention required)

(2) Priority

Priority and vector address as follows:

| INTERRUPT | NAME | VECTOR ADDRESS |
|---|---|---|
| NMI | NMI-H | 08H |
| IR0 | XACKT0-H | 80H |
| IR1 | BINT1-L (Memory Error) | 84H |
| IR2 | BINT0-L (Power Fail) | 88H |
| IR3 | FINT-H | 8CH |
| IR4 | RTC-H | 90H |
| IR5 | SFTINT-H | 94H |
| IR6 | USART-H | 98H |
| IR7 | INDX-H | 9CH |

Reference I contains a complete detailed description of the PIC.

The interrupts that are generated are a result of the following condition:

NMI NMI-H—The watchdog timer has timed out.

IRO XACKTO-H—This interrupt indicates no response to the floppy disk controller module last system read or write.

IR1 BINT1-L (Mem Err)—The memory error interrupt is a non bus vectored interrupt. When a memory error is detected, the memory board asserts this interrupt line and keeps it asserted. The interrupt is cleared when a public bus 92 device (in this case the floppy disk controller module) reads the appropriate memory status register and resets the error interrupt bit. This interrupt is enabled only when the floppy disk controller module has control of the system bus.

IR2 BINT0-L (Pwr Fail)—The power fail interrupt is asserted by the power supply module on detection of a power fail condition. Refer to Reference J, Section 3.3.

IR3 FINT-H—An interrupt signal is generated by the FDC for one of the following reasons:

(1) Upon entering the result phase of:
  a. Read data command
  b. Read a track command
  c. Read ID command
  d. Read deleted data command
  e. Write data command
  f. Format a cylinder command
  g. Write deleted data command
  h. Scan commands (2) Ready line of FDD changes state (3) End of seek or recalibrate command (4) During execution phase in the NON-DMA mode Interrupts caused by reasons 1-4 above occur during normal command operations and are easily discernible by the processor. However, interrupts caused by reasons 2 and 3 above may be uniquely identified with the aid of the sense interrupt status command. This command when issued resets the interrupt signal and via bits 5, 6, and 7 of status register 0 identifies the cause of the interrupt, as set forth in Table 48.

TABLE 48

| SEEK END | INTERRUPT CODE | | |
|---|---|---|---|
| BIT 5 | BIT 6 | BIT 7 | CAUSE |
| 0 | 1 | 1 | Ready Line changed state, either polarity |
| 1 | 0 | 0 | Normal Termination of Seek or Recalibrate Command |
| 1 | 1 | 0 | Abnormal Termination of Seek or recalibrate command |

IR4-RTC-H—The real time clock has timed out.

IR5-SFTINT-H—The soft interrupt is the floppy disk controller module's door bell. This indicates that the floppy disk controller module should read its mail box and perform the necessary function. This interrupt is generated by a system device by doing an I/O write to the floppy disk controller module system I/O address as detailed later. Further details on the soft interrupt are presented in a separate section so entitled.

IR6-USART-H—The USART interrupt is either a transit or a receive interrupt. The interrupt is determined by a status read of the USART, as detailed later.

TRANSMIT INT. The serial port (8251A) is ready to accept a data character from the RCPU.

RECEIVE INT. The serial port (8251A) has a complete character to be input to the RCPU.

IR7-INDX-H—The INDEX PULSE from the floppy drive. This is used in the diagnostic program to determine the floppy drive motor speed.

Hard Interrupts

The floppy disk controller module is capable of generating a hard interrupt to the public bus 92. This is accomplished by a memory write to address 7FFD0 (data value does not matter). The hard interrupt can be read both by external boards via the bus/resident register (detailed later) and the floppy disk controller module via the drive status register. The hard interrupt is reset by the interrupted external board by an I/O write to the floppy disk controller module system I/O address.

Soft Interrupt, Soft Interrupt Clear, Soft Reset, and Hard Interrupt Clear

A soft interrupt is achieved by the interrupting device performing a write to the floppy disk controller module system I/O address (as detailed later) with data equal to 01H.

The soft interrupt bit is cleared by the floppy disk controller module. This is done with a write to memory address 7FFC8 (data value does not matter).

The soft reset to the floppy disk controller module is latched and cleared. A write to the floppy disk controller module system I/O address with data equal to 02H latches the reset line, putting the floppy disk controller module in a reset state. To clear the reset and restart the floppy disk controller module, a system I/O write to the same address must be done with data equal to 03H.

A status bit is available to allow the floppy disk controller module to determine the cause of its reset as detailed later.

The hard interrupt is cleared by the interrupted device by doing a write to the floppy disk controller module system I/O address with data equal to 00H.

The floppy disk controller module cannot perform a soft interrupt or a soft reset on itself. It also cannot clear the hard interrupt.

Status Indicators

Bus Status Register

Three ports of an Intel Corp. 8255A are used to read and write status information. Port A is a read only port which reads the slot lines used for the floppy disk controller module system I/O address as discussed earlier, the causes of a reset or XACK timeout, and the floppy drive's index pulse (for diagnostic use). Ports B and C are outputs that contain the error status bits set by the RCPU when it determines an error, plus three control bits. The error bits may be read over the public bus 92 and may activate a light emitting diode (LED) indicator on module housing 31 (see FIG. 3). Port C is used to read the status of diagnostic bits.

The 8255 is initialized via a mode instruction as follows:

| MODE DEFINITION | | |
|---|---|---|
| Memory Address | Data | Comments |
| 7FFC6 | 90H | Port A - Input Slot lines, Status Port B - Output Error Status Register 2 Port C - Output Error Status Register 1 |

Status
MEMORY ADDRESS
7FFC0
Port A

| Bit | Name | Function |
|---|---|---|
| 0 | SLT01-L | Slot Address |
| 1 | SLT02-L | Slot Address |
| 2 | SLT04-L | Slot Address |
| 3 | SLT08-L | Slot Address |
| 4 | SLT16-L | Slot Address |
| 5 | Spare | Not Used |
| 6 | Spare | Not Used |
| 7 | Status Reset | 0=Power Up Reset |

Error Register 2
Memory Address
7FFC2
Port B

| Bit | Name | Function |
|---|---|---|
| 0 | Floppy Read | 0=OK 1=Error |
| 1 | Floppy Write | 0=OK 1=Error |
| 2 | Floppy - wrong track | 0=OK 1=Error |
| 3 | Floppy - cannot find ID | 0=OK 1=Error |
| 4 | Floppy Seek | 0=OK 1=Error |
| 5 | LED 4 | TBD |
| 6 | LED 3 | TBD |
| 7 | Spare | Not Used |

Error Register 1
Memory Address
7FFC4
Port C

| Bit | Name | Function |
|---|---|---|
| 0 | Self Test | 0=OK 1=Error |
| 1 | RAM Test | 0=OK 1=Error |
| 2 | ROM Test | 0=OK 1=Error |
| 3 | Timer Test | 0=OK 1=Error |
| 4 | Peripheral Interface Test | 0=OK 1=Error |
| 5 | RSTXTO-H | A 1 resets the xack timeout bit |
| 6 | SMOONO-H | This bit performs the function of turning the mini disk drive 0 motor on. A 1 turns the motor on. A 0 turns the motor off. |
| 7 | SMOON1-H | Performs the same function as SMOON 0 except the signal is for drive 1 |

Further explanation of the Port C bit set/reset operation is given later.

I/O Address

The floppy disk controller module system I/O address identifies itself as a floppy disk controller module board and indicates which slot in the backplane the board occupies. The floppy disk controller module initialization routine reads the slot lines through Port A to determine its full address.

The I/O addresses for a floppy disk controller module board are:

| ADROF | ADROE | ADROD | ADROC | ADROB | ADROA | ADRO9 | ADRO8 |
|---|---|---|---|---|---|---|---|
| 1 | 1 | 1 | 1 | 1 | 1 | 1 | SLT16-L (Rack No.) |
| ADRO7 | ADRO6 | ADRO5 | ADRO4 | ADRO3 | ADRO2 | ADRO1 | ADRO0 |
| SLT08-L | SLT04-L | SLT02-L | SLT01-L | 0 | 0 | 0 | 0 |

Bus/Resident Status Register 190

Sixteen status bits are provided. They may be read by another devide on the public bus 92 by performing an I/O read to the floppy disk controller module I/O address as described earlier. The sixteen bits are defined as follows

| | |
|---|---|
| DAT 4 - DAT 0 (floppy disk controller module =02H) | Device Number |
| DAT 5 | Watchdog Sttus |
| DAT 6 | Self Test Error |
| DAT 7 | RAM Error |
| DAT 8 | ROM Error |
| DAT 9 | Timers Error |
| DAT A | Peripheral Interface Error |
| DAT B | Floppy Error 0 |
| DAT C | Floppy Error 1 |
| DAT D | Floppy Error 2 |
| DAT E | Floppy Error 3 |
| DAT F | Floppy Error 4 |

Status bits DAT 5 through DAT F are error status indicators which indicate an error if they are set to a 1. The software sets these bits through the error status registers in Ports B and C of the bus status 8255. Each port may be set by a memory write to the appropriate address. The error labels given at this time are the signals needed to perform an error reporting mechanism.

Further details of the status register are given in the "soft interrupt section."

LED Indicators

Four LED's (49 through 51—see FIG. 2) are provided to indicate board status. The functions of these LED's are as follows:

| | | |
|---|---|---|
| LED 1 - | Watchdog Timer Timeout (runlight) | ON = OK<br>OFF = Timed Out |
| LED 2 = | Bus Master (based on the system address enable (SAEN-L) line) | ON = floppy disk controller module is master of the public bus 92.<br>OFF = floppy disk controller module is not master of the public bus 92. |
| LED 3 - | LED 3 | ON = Determined by diagnostics |
| LED 4 - | LED 4 | ON = Determined by diagnostics |

Further details on LED's 3 and 4 coding are given elsewhere.

Global Status Lines

Four status lines are available on the public bus 92 to indicate status of the entire system. They are open collector and can be driven by any board. These four lines drive LED's on the front panel of the system (see LED's 134–137 in FIG. 3).

STAT 1 is a self test error line. The self-test error line from error register 1 (referred to earlier) drives this line. The light or this status line is turned on when any board in the system encounters a self test error.

STAT 2 is defined as a watchdog timer timeout line. This line drives a runlight which goes out when any board in the system has a watchdog timer timeout.

STAT 3 is undefined and is not driven by the floppy disk controller module.

STAT 4 is undefined and is not driven by the floppy disk controller module.

Diagnostic Serial Port

Serial communication is accomplished through the use of a universal synchronous/asynchronous receiver/transmitter (USART). The port is DTE and supports the four baud rates presented in Table 49. The functional configuration of the USART is programmed by the system software via a mode instruction and a command instruction. The USART is used in the asynchronous mode with a 16× baud rate factor. The mode instruction is written before the command instruction. The USART then stays in the command mode until it receives either an internal or external reset. Refer to Reference I for complete details of the Intel Corp. 8251A.

Programmable Interval Timer (PIT)

The programmable interval timer (PIT) has three programmable timers. Timer 0 is used for the real time clock, timer 1 for the USART baud rates, and timer 3 is unused. See Reference I for further details.

Timer 0 (Real Time Clock)

Timer 0 is user programmable and can be programmed to create an interrupt so events may be timed. The interval of the timer is a multiple of 125 KHz which gives a range from 16 microseconds to a maximum of 524 milliseconds in 8 microsecond increments. The timer is programmed as follows:

| Memory Address | Data | Comments |
|---|---|---|
| 7FFE:6 | 34 H | Mode 2 Timer 0 |
| 7FFE:0 | 02 H | LSB |
| 7FFE:0 | 00 H | MSB |

The above example shows both the minimum least significant byte and the minimum most significant byte. Programmed with this data, the timer puts out an interrupt every 16 microseconds.

TABLE 49

MODE INSTRUCTION FORMAT

| MEMORY ADDRESS |
|---|
| 7FFCA |

TABLE 49-continued

D7 D6 D5 D4 D3 D2 D1 D0

- D1, D0 → BAUD RATE FACTOR

| D0 | 0 | 1 | 0 | 1 |
|---|---|---|---|---|
| D1 | 0 | 0 | 1 | 1 |
| | SYNC MODE | (1X) | (16X) | (64X) |

- D3, D2 → CHARACTER LENGTH

| D2 | 0 | 1 | 0 | 1 |
|---|---|---|---|---|
| D3 | 0 | 0 | 1 | 1 |
| | 5 BITS | 6 BITS | 7 BITS | 8 BITS |

- D4 → PARITY ENABLE
  1=ENABLE 0=DISABLE
- D5 → PARITY GENERATION/CHECK
  1=EVEN 0=ODD
- D7, D6 → *NUMBER OF STOP BITS

| D6 | 0 | 1 | 0 | 1 |
|---|---|---|---|---|
| D7 | 0 | 0 | 1 | 1 |
| | INVALID | 1 BIT | 1.5 BIT | 2 BIT |

*(ONLY EFFECTS Tx. Rx NEVER REQUIRES MORE THAN ONE STOP BIT)

COMMAND INSTRUCTION FORMAT

MEMORY ADDRESS
7FFCA

D7 D6 D5 D4 pD3 D2 D1 D0

- D0 → TRANSMIT ENABLE
  1=ENABLE 0=DISABLE
- D1 → DATA TERMINAL
  1 FORCES DTR-L OUTPUT TO A 0
- D2 → RECEIVE ENABLE
  1=ENABLE 0=DISABLE
- D3 → SEND BREAK CHARACTER
  1 FORCES TxD OUTPUT TO A 0
  0=NORMAL OPERATION
- D4 → ERROR RESET
  1 RESETS ERROR FLAGS
  PE,OE,FE
- D5 → REQUEST TO SEND
  1 FORCES RTS-L OUTPUT TO A 0
- D6 → INTERNAL RESET
  1 RETURNS THE 8251A TO THE
  MODE INSTRUCTION FORMAT
- D7 → *ENTER HUNT MODE
  1 ENABLES SEARCH FOR SYNC
  CHARACTERS

*(HAS NO EFFECT IN ASYNC MODE)

STATUS READ FORMAT

MEMORY ADDRESS
7FFCA

D7 D6 D5 D4 D3 D2 D1 D0

- D0 → 1=TRANSMIT ENABLE*
- D1 → 1=RECEIVE READY
- D2 → 1=TRANSMIT BUFFER EMPTY
- D3 → 1=PARITY ERROR

TABLE 49-continued

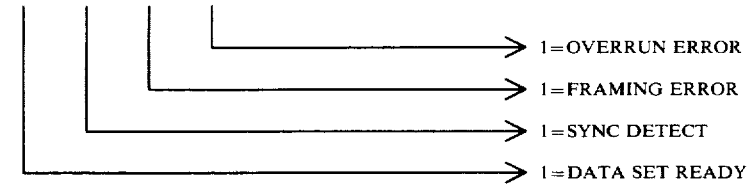

*(THIS ONLY MEANS THE DATA BUS BUFFER IS EMPTY. THIS BIT IS NOT CONDITIONED BY CTS-L OR TxEN.)

| MEMORY ADDRESS | TRANSMIT/RECEIVE DATA |
|---|---|
| 7FFC8 | |

Timer 1 (Baud Rate Generation)

Timer 1 provides the baud rate clock for the USART. It has an input frequency of 1.2288 MHz which allows baud rate clocks from a minimum of 10 baud to a maximum of 19200 baud to be generated. The timer is programmed as follows:

| Memory Address | Data | Comments |
|---|---|---|
| 7FFE:6 | 76 H | Mode 3 Timer 1 |
| 7FFE:0 | 08 H | LSB |
| 7FFE:0 | 00 H | MSB |

The above example shows data used to generate a 9600 baud rate clock. The following shows the data needed for the common baud rates.

| Baud Rate | LSB | MSB |
|---|---|---|
| 19200 | 04H | 00H |
| 9600 | 08H | 00H |
| 4800 | 10H | 00H |
| 2400 | 20H | 00H |
| 1200 | 40H | 00H |
| 600 | 80H | 00H |
| 300 | 00H | 01H |
| 150 | 00H | 02H |
| 110 | BCH | 02H |
| 100 | 00H | 03H |
| 75 | 00H | 04H |
| 50 | 00H | 06H |
| 10 | 00H | 1EH |

INTERFACE REQUIREMENTS

Figure 76:
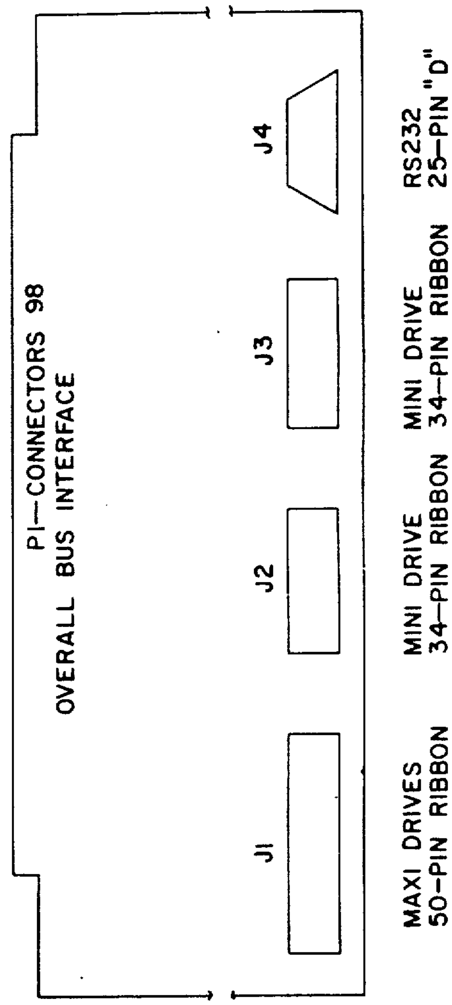
FIG. 76 is a diagrammatic representation of the overall bus interface.

FIG. 76 illustrates the interface by the floppy disk controller module to the overall bus 93.

Connector - Disk Drive Pin Assignments

Maxi Pin Assignments

J1 pin assignment for interfacing to the maxi (8 inch) disk drives are as set forth in Table 50. Unlisted pins are unused.

Mini Pin Assignments

J2+J3 pin assignment for interfacing to the mini (5.25 inch) disk drives are presented in Table 51. Unlisted pins are unused.

TABLE 50

| Signal | Pin (J1) | To/From diskette drive |
|---|---|---|
| GND | 2,3,6<br>9,11,13<br>15,17,19<br>21,23,25<br>27,29,31,<br>33,35,37<br>39,41,43,<br>45,47,49 | |
| Direction | 34 | To diskette drive |
| Drive select 0 | 26 | To diskette drive |
| Drive select 1 | 28 | To diskette drive |
| Index | 20 | From diskette drive |
| Read Data | 46 | From diskette drive |
| Side Select | 14 | To diskette drive |
| Step | 36 | To diskette drive |
| Track 00 | 42 | From diskette drive |
| Write data | 38 | To diskette drive |
| Write Gate | 40 | To diskette drive |
| Write Project | 44 | From diskette drive |
| Two Sided | 10 | From diskette drive |
| Ready | 22 | From diskette drive |
| Drive Select 2 | 30 | To diskette drive |
| Drive Select 3 | 32 | To diskette drive |
| Head Load | 18 | To diskette drive |

TABLE 51

| Signal | PIN | To/From diskette drive |
|---|---|---|
| | J2 | |
| GND | 1,3,5<br>7,9,11,<br>13,15,17,<br>19,21,23,<br>25,27,29,<br>31,33 | |
| Direction | 18 | To diskette drive |
| Drive Select 0 | 10 | To diskette drive |
| Index 0 | 8 | From diskette drive |
| Motor on 0 | 16 | To diskette drive |
| Read Data | 30 | From diskette drive |
| Side Select | 32 | To diskette drive |
| Step | 20 | To diskette drive |
| Track 00 | 26 | From diskette drive |
| Write data | 22 | To diskette drive |
| Write Gate | 24 | To diskette drive |
| Write protect 0 | 28 | From diskette drive |
| | J3 | |
| GND | 1,3,5<br>7,9,11<br>13,15,17,<br>19,21,23<br>25,27,29<br>31,33, | |
| Direction | 18 | To diskette drive |
| Drive select 1 | 12 | To diskette drive |
| Index 1 | 8 | From diskette drive |
| Motor on 1 | 16 | To diskette drive |
| Read Data | 30 | From diskette drive |
| Side Select | 32 | To diskette drive |
| Step | 20 | To diskette drive |
| Track 00 | 26 | From diskette drive |
| Write data | 22 | To diskette drive |
| Write gate | 24 | To diskette drive |

TABLE 51-continued

| Signal | PIN | To/From diskette drive |
|---|---|---|
| Write protect 1 | 28 | From diskette drive |

Configuration Limitations

Drive configuration is limited to a total of four drives. The mixing of mini and maxi drives is allowed with the following restrictions.

Mini drives must reside at drive select 0 and/or drive select 1.

The limitations of drives that can be connected are:

Mini: Up to two drives

Maxi: Up to four drives

The following is an example of possible drive configurations:

| | #1 | #2 | #3 | #4 |
|---|---|---|---|---|
| DR0 | Mini | Mini | Maxi | Maxi |
| DR1 | Mini | Maxi | Mini | Maxi |
| DR2 | Maxi | Maxi | Maxi | Maxi |
| DR3 | Maxi | Maxi | Maxi | Maxi |

Maxi drives are daisy-chained together and interface to the floppy disk controller module via J1. The cable 88 is a flat ribbon cable with a maximum length of 10 feet to the last drive in the chain. The mini interface is radial via J2 and J3. The cable is a flat ribbon cable 85' with a maximum length of 10 feet. FIG. 1 shows a typical configuration with two 8-inch drives and two 5¼-inch drives.

Connector - Diagnostic Serial Port

Serial Port Pin Assignments

J4 is a DTE 25 pin connector conforming to EIA Standard RS232-C. The drivers and receivers for these signals are implemented in I/O chips (1488's and 1489's). (See References N and O.)

| J4 Signal | Pin |
|---|---|
| Chassis Ground | 1 |
| Transmit Data | 2 |
| Receive Data | 3 |
| Request to Send | 4 |
| Clear to Send | 5 |
| Data Set Ready | 6 |
| Signal Ground | 7 |
| Data Terminal Ready | 20 |

Jumper Options

Jumpers are provided to choose 5 or 8 MHz operation, PROM size, PROM speed, RAM size, and drive configuration. Selection is made by specifying the location of a 0.0 Ohm resistor as set forth in Table 52. An asterisk denotes default operations.

Disk Drives

The disk drive requires configuration in order for the floppy disk controller module to operate. The configuration is detailed in Table 53.

Software Interface

Memory Map and I/O Map

The memory map and I/O map are set forth in Table 54.

Software Operation

This subsection documents the information needed to correctly operate the floppy disk controller module.

The floppy disk controller module hardware performs the following three basic functions:

1. Mini Disk Controller
2. Maxi Disk Controller
3. System Interface

The mini and maxi operations are functionally the same, and the variation between the two is shown. The basic flow chart is set forth in Table 55. Other flow charts pertaining to the disk commands are presented in Reference H.

The reset pulse for the FDC is 3 microseconds minimum. Port C is used to perform this function due to its bit set/reset capability.

TABLE 52

| CPU Speed | | |
|---|---|---|
| SPEED | | 0.0 OHM RES. |
| *5 MHz | | NONE |
| 8 MHz | | R2 |
| PROM Size | | |
| SIZE | | 0.0 OHM RES. |
| *4K × 8 | | R30,R115 |
| 8K × 8 | | R29,R116 |
| PROM Speed | | |
| Number of wait states 5 MHz | 8 MHz | 0.0 OHM RES. |
| *0 | 0 | R16,R14 |
| 0 | 1 | R16,R13 |
| 1 | 2 | R15,R12 |
| RAM Size | | |
| SIZE | | 0.0 OHM RES. |
| *2K × 8 | | R34,R36,R38 R40,R42,R44 |
| 8K × 8 | | R35,R37,R39 R41,R43,R45 |

TABLE 53

| Maxi: | | Mini: IC Location 1F |
|---|---|---|
| T2, 800, A,B,C,L | -shorted on all drives. | MX-shorted HL-shorted |
| DS1,DS2, DS3,DS4 | shorted to -desired drive number. | D1-open D2-open D3-open |
| T1, T3, T4 T5, T6, | -shorted only on the last drive in the daisy chain. | |

TABLE 54

ON BOARD MEMORY

TABLE 54-continued

| | | |
|---|---|---|
| 1MByte | ON BOARD PROM 4K-32K | FFFFFH F8000H |
| | OFF BOARD | F7FFFH F0000H |
| | "WINDOW" FOR ADDRESSING FULL 16 MBYTE MEM | EFFFFH E0000H |
| | OFF BOARD | DFFFFH 80000H |
| | FDCR | 7FFFAH |
| | FDCS | 7FFF8H |
| | DRIVE PPI ICWR | 7FFF6H |
| | DRIVE PPI PORT C | 7FFF4H |
| | DRIVE PPI PORT B | 7FFF2H |
| | DRIVE PPI PORT A | 7FFF0H |
| | PIC | 7FFEAH |
| | PIC | 7FFE8H |
| | PIT CNTL/MODE | 7FFE6H |
| | PIT COUNT REGs. | 7FFE0H |
| | WATCH DOG TIMER | 7FFD8H |
| | HARD INT | 7FFD4H |
| | CLR SFT INT | 7FFD0H |
| | UART CNTL/MODE | 7FFCAH |
| | UART DATA | 7FFC8H |
| | B/R PPI ICWR | 7FFC6H |
| | B/R PPI PORT C | 7FFC4H |
| | B/R/PPI PORT B | 7FFC2H |
| | B/R PPI PORT A | 7FFC0H |
| | OFF BOARD | 7FFBFH 08000H |
| 0 | ON BOARD RAM 8K-32K BYTES | 07FFFH 00000H |

16 MBYTE OFF BOARD MEMORY

| | | |
|---|---|---|
| 16Mbyte | MODBASE BUS ACCESS 9 MSB OF THE ADDRESS ARE FROM THE ADDRESS SEGMENT REGISTER | FFFFFFH |
| 0 | | 000000H |

OFF BOARD I/O

| | |
|---|---|
| MODBASE BUS ACCESS | FFFFH |
| MMDC I/O ADDRESS | 0000H |

TABLE 55

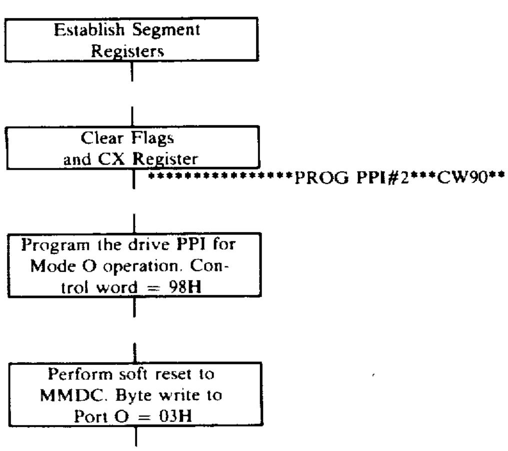

TABLE 55-continued

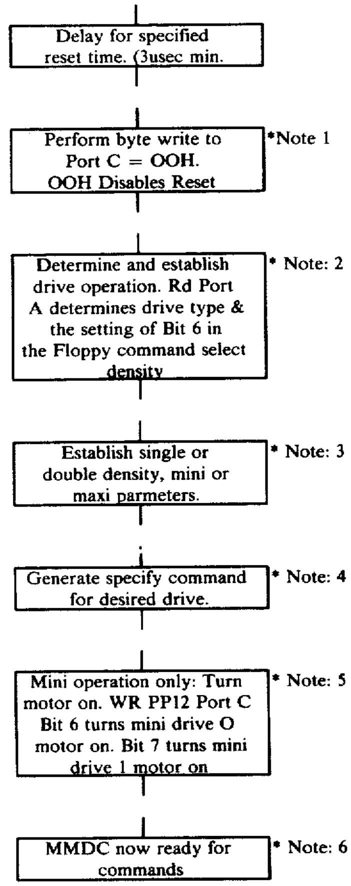

Port C is used to perform functions other than reset which are described below.

Port C has a bit/set reset function. It is utilized by performing a write to the PPI CONTROL WORD. When the opcode field (Bit 7) of the control word is equal to a zero, the control word is interpreted by the PPI as a Port C bit set/reset command word. Through the use of the bit set/reset command, any of the 8 bits on Port C may be independently set or reset. The bit functions are set forth in Table 56.

A read of Port A informs the floppy disk controller module of the specific drives that are connected to the floppy disk controller module. Interpretation of the bits is set forth in Table 57..

The density is not determined by hardware. Density is a function of the system architect and is determined at system configuration. The FDC commands use bit 6 to determine density. Bit 6=1=double density; Bit 6=0=single density commands.

As stated above, density is determined at system configuration. This is accomplished with a density byte in the initialization of the system.

| | |
|---|---|
| Density byte = | 00 = mini single density |
| | 02 = maxi single density |
| | 01 = mini double density |
| | 03 = maxi double density |

The establishing of drive type—mini or maxi—is accomplished with Port C. Bit 2 is the MI/MA bit. Bit 2=0 selects the hardware for maxi operation. This bit is set to the correct value in order for the hardware to function properly.

Changing from mini to maxi or maxi to mini initiates a floppy interrupt. This requires that a sense interrupt command be issued before continuing disk operation. Reading of the FDC status after this command indicates the readiness of the FDC to accept the next command. FDC status=80H.

TABLE 56

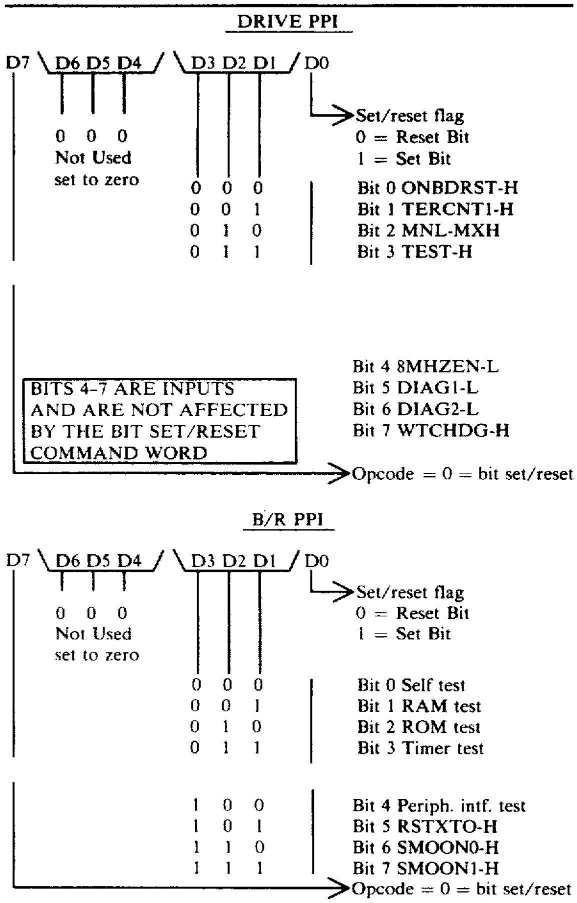

TABLE 57

| D2 | D1 | D0 | |
|---|---|---|---|
| 0 | 0 | 0 | Mini - drive 0 (DS0)<br>Mini - drive 1 (DS1)<br>Maxi - drive 3 and/or drive 4<br>Software must determine if the drive is at DS3 and/or DS4. Refer to Note 3. No more than four drives connected. |
| 0 | 0 | 1 | Mini - drive 1<br>Maxi - drive 0, drive 2, drive 3 (any or all) |
| 0 | 1 | 0 | Mini - drive 0<br>Maxi - drive 1, 2, 3 (any or all) |
| 0 | 1 | 1 | Maxi - drive 1, 2, 3, 4 (any or all) |
| 1 | 0 | 0 | Mini - drive 0, 1 |
| 1 | 0 | 1 | Mini - drive 1 |
| 1 | 1 | 0 | Mini - drive 0 |
| 1 | 1 | 1 | No drives connected |

The density is not determined by hardware. Density is a function of the system architect and is determined at system configuration. The FDC commands use bit 6 to determine density. Bit 6 = 1 = double density, Bit 6 = 0 = single density commands.

The specify command sets the specific step rates, (SRT), head load time (HLT) and the head unload time (HUT), for the specific drive (mini or maxi), and whether in DMA or non-DMA mode (ND). The following are the byte values for each drive type.

Specify Command - 03H mini — SRT + HUT - 31H
HLT + ND - 01H

The ND=1 which indicates the non-DMA mode of operation.

maxi — SRT + HUT - 81H
HLT + ND - 33H

Mini disk drives require that the drive motor be turned on and off for operation. The turning on and off of the mini motor is under software control. Turning the motor on requires a 1 second delay before performing any floppy commands. This 1 second delay is performed in hardware and signals the floppy disk controller module by setting the ready signal, which in turn generates and interrupts. The interrupt is generated due to the transition of the RDY signal. With the generation of the sense interrupt command and evaluation of the status (Reference G), the cause of the interrupt can be determined.

The command sequence as described in Reference G requires the polling of the main status register. The status register being read must be equal to 80H before a command may be written into the command buffer. After the first byte of the command sequence has been generated, the main status register equals 90H. This indicates that the FDC is busy. The reading of the main status register in performing the command and result phases of FDC commands requires minimum delays of 15 microseconds for maxi drives and 30 microseconds for mini drives. This delay between read or write operations allows for the proper bit setting of the main status registers.

Thus the floppy disk controller module can control maxi or mini drives and has the same software interrupt capability, improved watchdog timer, and overall bus interfacing features as those of the other modules forming the man machine interface.

INTER-BOARD COMMUNICATIONS

Introduction

This section describes the protocol used to communicate between modules forming the MMI. It also specifies the way in which an application program uses this protocol.

Overview

A general mechanism is provided on the MMI to allow non-local processes (both applications and system processes) to pass messages back and forth. Some samples of the uses of this mechanism include:

- file structure code on the CPU module 22 to pass requests to the floppy disk controller module 30 (see FIG. 1);
- floppy controller to pass completion status to the CPU module 22.

video driver on CPU 22 to pass data and control information to the video CPU module 28 or 40.

video CPU to pass keyboard input to the keyboard driver on the CPU module.

keyboard driver on the CPU module to pass control information and data for display in LED's to the video CPU.

video host software on the CPU 22 to communicate with the video controller.

The mechanism that provides this communication consists of the following pieces:

hardware— memory module 24 containing stored memory, an address segment register (ASR) on each board, a soft interrupt mechanism software— a subroutine call to send a message to a non-local destination;

an interrupt handler on each board to field soft interrupts and pass the incoming information to the appropriate receiver.

Figure 73:
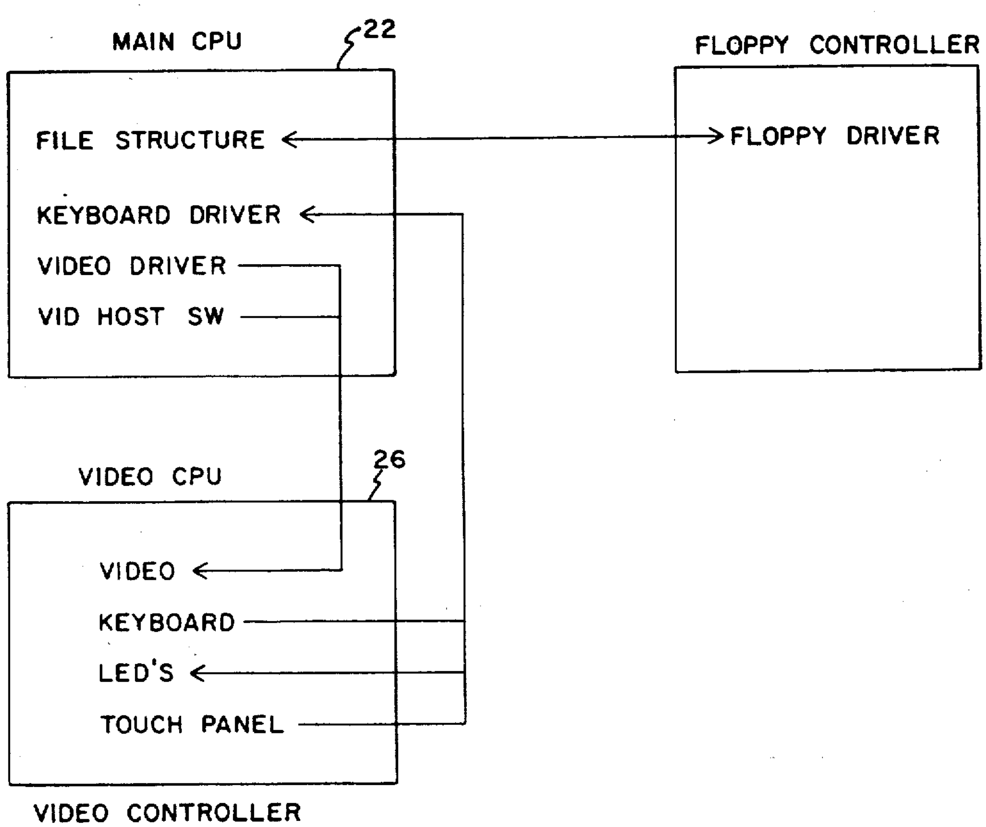
FIG. 73 is a block diagram regarding communication between the CPU module with the video CPU module and the floppy disk controller module.

Some of communication paths are shown in FIG. 73.

Hardware

As shown in FIG. 1, the MMI system contains a megabyte of shared memory (expandable to 16 megabytes). This memory may be accessed, via the public bus (forming the backplane) by every board in the system. The main CPU module 22 has a private port 48 to the memory, module, which shares memory accesses with the public bus port into the shared memory portion of the memory module. The main CPU is the only processor that executes code from the shared memory module. Its interrupt vectors and system tables also reside there.

The processors used on the boards (Intel Corp. 8086 and 8088) support addressing of only 1 megabyte (20 bit addresses). In order to extend the address space to the full 16 megabytes (24 bit addresses) available on the MMI, a register called the Address Segment Register (ASR) is available on each board on the MMI. The ASR is an 8 bit register that is used to specify the 64K section of the shared memory to be accessed. When a 20 bit address in the range EOOOO–EFFFF (the window) is used by the processor, the actual 24-bit address to be used is formed by concatenating the contents of the ASR with the low order 16 bits of the 20-bit address. The high-order 4 bits of the 20-bit address are ignored, as they are merely used to indicate that the ASR is to be used. Any 20-bit addresses that fall outside the window are used as is (the ASR is not used). On the CPU module 22, use of the ASR implies accessing memory via the public bus while memory accesses outside the window are made through the private port or refer to on-board memory. Each board has access to the full 16 megabyte address space of shared memory when using the ASR. The amount of shared memory that can be accessed by using a 20-bit address outside the window is no greater than than 1 megabyte, and is further reduced by the fact that many 20-bit addresses correspond to onboard memory or memory-mapped I/O.

All addresses passed between the boards are in the 24-bit form, rather than relying on knowledge of which 20-bit address is mapped to the shared memory for the particular boards involved. The receiving process then loads the ASR, a segment register, and a base register directly from that form of the address.

The window is always positioned to start on a 64K byte boundary. This means that unless the process has a great deal of control over exactly where in the shared memory its data is, it has to keep track of when it runs over the edge of the window and adjust the ASR accordingly (i.e., the ASR is not automatically incremented).

There is no operating system support on CPU 22 for the ASR—its contents are not saved/restored as part of a context switch, no compiler or assembler generates code to handle 24-bit addresses, and 24-bit addresses may not be used in calls to system services. The convention used by the operating system on the main CPU is that each piece of code that changes the ASR (this is limited to SendRemote, Lock, Unlock, and the soft interrupt handler) must save it before changing it, and restore it before exiting. This allows such code to run with interrupts enabled, and to be reentrant.

Each board on the MMI has a board status register 190 (see FIG. 26), whose address (which lies in I/O space) is a function of its slot number. Reading this register returns a 16-bit value indicating what type of board it is and its current status (e.g., diagnostic mode, watchdog timer expired, etc.). If a value of 1 is written to this register, a "soft interrupt" is generated on the board addressed.

Software

Each board (main CPU, video CPU, and floppy disk controller) can both send and receive messages. The software provided for the board to act as a sender is the subroutine SendRemote. The software provided for it to act as receiver is the soft interrupt handler.

SendRemote (pHeader, pMsg, [priority]) : ercType
- pHeader—pointer to Header
- Header—sender board-id (word)
  - sender sub-type (word)
  - destination board-id(word)
  - destination sub-type (word)
  - filler (6 words)
- pMsg—pointer to Msg
- Msg—user's message
- priority—message priority—used only if OS on destination board supports prioritized message queues
- possible errors include:
  - no such board-id
  - destination board not operational
  - destination message queue full
  - invalid header address
  - invalid message address A board-id is the 16-bit I/O address of the board.

The destination sub-type field indicates local routing information for the message. If the destination board has a CTOS-type OS, sub-type indicates the exchange on which the message is to be queued. For other destinations, the sub-type field may be ignored or may have some meaning assigned by the destination. For example, on the video CPU, sub-type may be defined as the window number to be used.

The allocation and deallocation of the memory used for the header and message are the responsibility of the application software. The same memory area may be reused for subsequent messages, but the OS does not check whether the area being reused is in fact still being used for an earlier message. The header and message must both be entirely located on the public bus-accessible side of the fence in the memory module.

The representation of a pointer (or address) is board-dependent. On the main CPU, all pointers passed as parameters are in the standard doubleword form used by the PL/M programming language, resulting in a 20-bit address. On other boards, they may be represented in that form, in 24-bit form, or in any other convenient form. All pointers passed between boards are in 24-bit form.

The format of a 24-bit address is a standard doubleword address (offset followed by segment base) followed by a word whose low-order byte is the value to be loaded into the ASR. This requires a total of 3 words (6 bytes). The segment base normally is EOOO, although any segment-offset combination that results in a 20-bit address in the range EOOOO–EFFFF may be used.

Soft Interrupt Handler

What gets delivered to the destination is a pointer to the header, which has been transformed into the following format:

| | |
|---|---|
| sender board-id | (word) |
| sender sub-type | (word) |
| destination board-id | (word) |
| destination sub-type | (word) |
| pointer to user's message (24-bit form of address) | (3 words) |
| message priority | (1 word) |
| filler | (2 words) |

The soft interrupt handler does the following:

verify that the message is valid store the header pointer somewhere (board-dependent)

return status to the sender dispatch the message (board-dependent)

The overhead time of sending a message is normally in the neighborhood of a few hundred microseconds, excluding the time required to enter and exit from the SendRemote code. The memory overhead consists of a few dozen words of data.

Semaphores

A capability to use non-local semaphores (e.g., to synchronize events between processes on different CPU's) is required to implement the protocol described above. Such semaphores are useful outside the context of the protocol, so two subroutines are provided to use them directly. These subroutines are available on the main CPU, and may be available on other boards if wanted.

Lock and unlock may be used to synchronize events, control resource allocation, etc. between processes on different boards, since they guarantee that the checking and setting (in Lock) are done without the possibility of any intervening operation. Any memory location in the memory module that is available from the public bus may be used as a semaphore. Each semaphore must be initialized by the application using it. Each access to a given semaphore must use the same freeValue and lockValue (defined below), but different semaphores may have different freeValues and lockValues, as required by the application.

Lock

Lock (p24Semaphore, freeValue, lockValue): ercType p24Semaphore is the address of the semaphore in 24-bit form.

freeValue is the semaphore value when it is unlocked lockValue is the semaphore value when it is locked Lock checks are used to determine if the semaphore is unlocked. If so, the Lockvalue is inserted and a success status is returned. If not, a status code indicating that the semaphore is already locked is returned. In this case, the calling process waits a while and tries again to Lock.

Unlock

Unlock (p24Semaphore, freeValue): ercType p24Semaphore is the address of the semaphore in 24-bit form.

freeaAlue is the semaphore value when it is unlocked

Unlock puts freeValue into the semaphore, regardless of its previous value.

Protocol Details

There are two data structures in the memory module which are used to synchronize communication between processors and to pass information about the message. These data structures are set up when the main CPU boots and do not move during system operation. They are:

(A) a table of board addresses for every board found on the system at bootstrap time, plus, for each board, its type and its current status;

(B) a protocol control block, consisting of a semaphore, a pointer, and a status word.

Each board is able to determine the location of these data structures. The protocol works as follows:

(1) The board wishing to send a message gains access to the protocol control block by use of the semaphore. If it is already in use, the board waits some short time interval (a few instruction executions) and tries again.

(2) Once the sending board has gained access to the protocol block, it fills in the address of the header of the message being sent, verifies that the destination board is healthy (via its board status register), and generates a soft interrupt to the destination board. It then sets a timer for a predetermined interval.

(3) The destination board fields the soft interrupt, checks the header for validity, copies the header pointer to some preallocated area of memory, puts an appropriate status value in the protocol block, and interrupts the sender. The validity check determines whether the sender and destination board-id's are valid, and whether the header and message are accessible from the destination board.

(4) The sender gets the status from the protocol control block, releases the semaphore, and cancels the timer that was started when the message was sent. If the timer expires before the message is acknowledged, the sender rechecks the board status of the destination to see whether it has died. If it is still healthy, it waits a while longer.

If the sender gets an xack timeout at any point during this sequence, it is handled the same as any other xack timeout, which is to force a shutdown of the sending board.

The destination board has preallocated some fixed area into which it can copy incoming message header pointers. If this area gets filled, some error status is returned to the sender, who can try again later.

The protocol control block is normally in use for a very short period of time for each message. Rough calculations indicate that, if the destination has interrupts enabled when the soft interrupt is generated to it, it is in use for about 50–100 microseconds. This timing allows for almost-worst-case bus and memory access times. It does not allow for the case in which the current bus master is getting an xack timeout, which could potentially add some multiple of 6 milliseconds to the total.

The semaphore is handled by using the LOCK XCHNG instruction. On the main CPU, this instruction is written in such a way as to force the access to the semaphore memory location to be over the public bus, rather than through the private port to memory.

Implementation Details for the CPU Module 2

The changes and additions to existing CT TM software to support the inter-board communication mechanism are as follows:

(1) SendRemote is a system service, available via request or indirectly through the procedural interface.

(2) Lock and unlock are subroutines added to CTOS.-LIB.

(3) There is a new status code returned by Wait to indicate that a message has come from a remote sender.

(4) An interrupt handler for soft interrupts is added.

The procedural level interface to SendRemote corresponds to the subroutine call described in the SendRemote subsection of this section; that is:

ErrorCode: = SendRemote (pHeader, pMsg, priority);

where pHeader, pMsg and priority are exactly as defined in the SendRemote section.

The request level interface is accessed by:

erc: = Request (pRequest);

where erc is a word value returned to indicate completion status of the request.

pRequest is a pointer to the request block containing the parameters associated with the request.

The format of the request block passed to SendRemote is:

| byte | description | value |
|---|---|---|
| 0 | sCntlInfo | 10 |
| 2 | nReqPbCb | 0 |
| 3 | nRespPbCb | 0 |
| 4 | userNum | |
| 6 | exchResp | |
| 8 | ercRet | |
| 10 | rqCode | −4 |
| 12 | pHeader | |
| 16 | pMsg | |
| 20 | priority | |

where

| | |
|---|---|
| sCntlInfo | is the count of bytes of control information in the request block. This is 10. |
| nReqPbCb | is the number of "PbCb's" being passed by the request. This is 0. |
| nReqpPbCb | is the number of "PbCb's" to be passed back in response to the request. This is 0. |
| userNum | not used |
| exchResp | is the exchange on which the process waits for a response indicating completion of the request. |
| ercRet | is the error code returned. |
| rqCode | is −4. |
| pHeader | |
| pMsg | |
| priority | are the parameters passed, as described in the SendRemote subsection herein. |

When the request level interface is used, the caller can do processing after issuing the request, but must eventually wait at the response exchange indicated by the exchResp field in the request block. When the destination board has acknowledged or rejected the message, a response is sent to that exchange. The caller can then read the ercRet field of the request block to determine whether the message reached the destination board. Note that a success status here does not indicate that processing of the message has been completed by the destination. This can be established by the destination sending a message back to the caller by using the SendRemote capability on its own board.

LOCAL AREA NETWORK INTERFACE MODULE 36

Overview

As seen in FIG. 1, the local area network interface module (LIU) 38 is a communications vehicle designed to enable the transfer of data between a local area network 84 and the public bus 92 of the MMI. Its circuitry is memory mapped, is able to access 16 megabytes of external memory space and 64k bytes of external I/O space. The LIU has PROM space for up to 16k bytes which may use either 8k byte or 4k byte devices.

Figure 74:
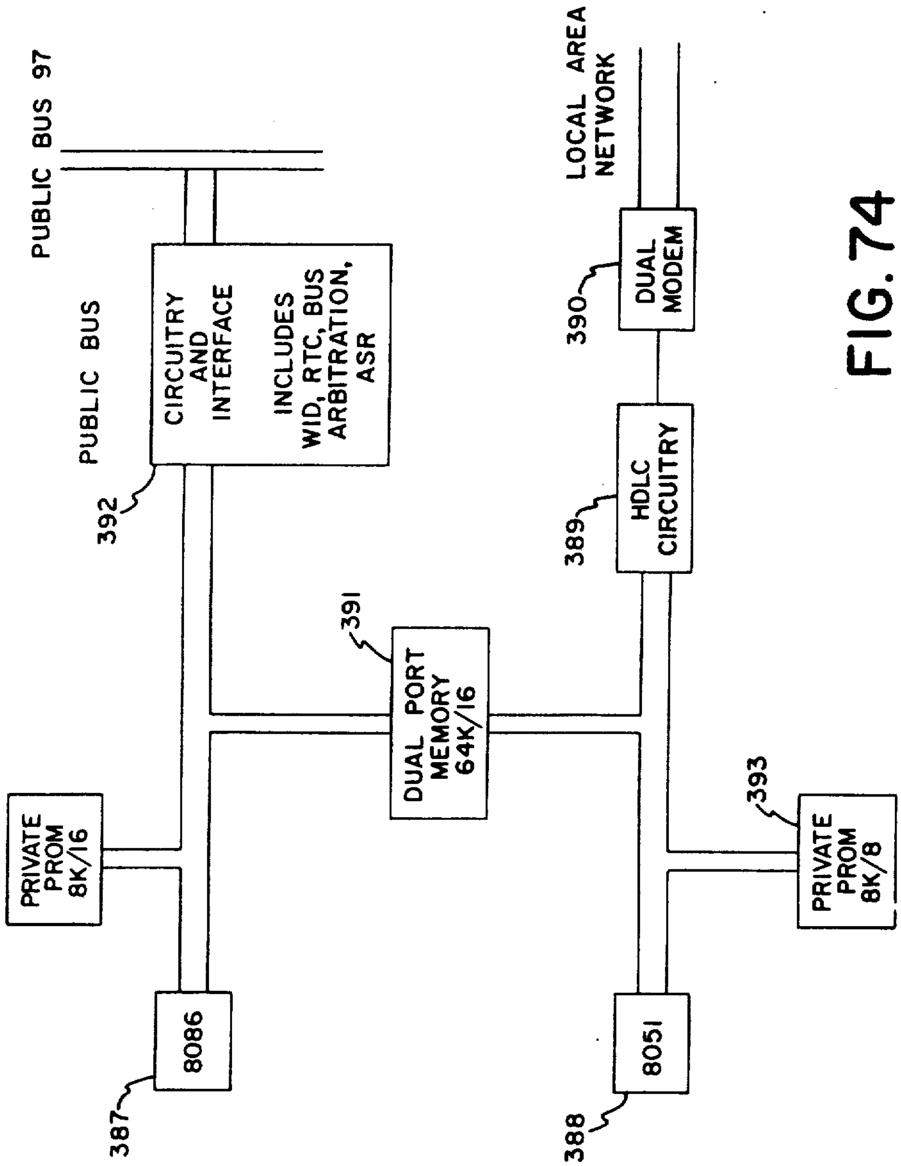
FIG. 74 is an overall block diagram of the local area network interface block diagram.

As shown in FIG. 74, the LIU operational blocks include a CPU 387 (Intel Corp. 8086), a watchdog timer, a real time clock, interrupts, bus arbitration, address segment extension register, bus interface, resident diagnostics (collectively in public bus circuitry and interface 392), a local area network interface CPU 388 (Intel Corporation 8051), high data link control circuitry 389, a dual modem 390, and dual-port memory 391.

The LIU features consist of:

1. Dual baseband modems for transmitting and receiving data from the media used with the local area network.

2. A real time clock consisting of a programmable interval timer.

3. A watchdog timer which generates a non-maskable interrupt (NMI) upon timeout. Indication is provided to inform the outside world of a watchdog timeout 4. An access machine consisting of an 8051 CPU, HDLC circuitry 389 which handles bidirectional traffic between a modem 39 and the interface 388, and up to 12k bytes of private interface CPU program memory 393.

5. A dual port-memory (128k bytes) which allows communication between the interface CPU and the public bus CPU 387 and which contains the public bus CPU program memory.

6. Off board interrupts are achieved by using a single interrupt line. The I/O soft interrupt address of the LIU as seen by the public bus is based on its rack number and its slot in the backplane.

7. On board interrupts include (in descending priority):

NMI-Watchdog Timer or DRAM data parity error.

1. XACK timeout.
2. Global memory failure.
3. Power failure.
4. Not used.
5. Soft interrupt.
6. Real time clock.
7. Interface CPU interrupt.
8. Not used.

Reference Documents

A. The Intel Corp. 8086 Family User's Manual (9800645A).

B. Intel Peripheral Design Handbook—Intel Corp. Ref. 8255A.

C. Intel Multibus Interfacing—Intel Corp. App. Note 28A

D. Designing 8086, 8088, 8089 Multiprocessing Systems with the 8289 Bus Arbiter—Intel Corp. App. Note 51.

E. Using the 8259A Programmable Interrupt Controller—Intel Corp. App. Note 59.

F. 8086 System Design—Intel Corp. App. Note 67.

G. Motorola MC68B54 Data Sheet.

Performance Specification

CPU 387

The LIU uses an 8086, 16-bit microprocessor running at 5 MHz which is configured in maximum mode. This extends the system architecture to support multiprocessor configurations. An Intel 8289 bus arbiter and two Intel 8288 bus controllers are utilized to supply the resident bus commands and public bus commands.

The LIU may be reset by either power up, a hard reset button, an 8086 DRAM program parity error or by a soft reset from another device.

The LIU self-initializes on power-up and sets itself up for operation.

CPU Memory—PROM 394

The 8086 has PROM space capable of using either 4k or 8k byte parts. Jumpers are provided to select the size of the PROM used. Address lines are connected to the devices starting with A1, not A0, and continuing up to the maximum number the device requires, leaving the remaining address lines for chip enable decoding.

The addresses for the PROM's are:

PROM SPACE ADDRESS
16k bytes FC000 - FFFFF
8k bytes FE000 - FFFFF

Real Time Clock Module

The Real time clock module consists of a programmable interval timer which has 3 separate 16 bit counters with the inputs supplied at 2.4576 MHz.

The programming of the counters is as follows:

Timer 0

This counter is used to provide the refresh clock for the dynamic dual port memory, which requires a rising edge every 13.8 microseconds. Thus since 13.8 microseconds multiplied by 2.4576 MHz gives 34, the counter is loaded with 34=22 H.

| DATA | ADDRESS | COMMENT |
|---|---|---|
| 36 H | F6806H | Initialized counter 0 for Mode 3 |
| 22 H | F6800H | LSB Load |

-continued

| DATA | ADDRESS | COMMENT |
|---|---|---|
| 00 H | F6800H | MSB Load |

Timer 1

This timer is used as a Real Time Clock. Its period may be varied from 0.8 microseconds to 52 milliseconds. The following derives a clock of 20 milliseconds: 20mS multiplied by 2.4576 MHz equals 49152=C000 H. It is programmed as follows:

| DATA | ADDRESS | COMMENT |
|---|---|---|
| 76 H | F6806 H | Initialized counter 1 for Mode 3 |
| 00 H | F6802 H | LSB Load |
| 00 H | F6802 H | MSB Load |

The output from this clock may be used to interrupt the interrupt controller which must be programmed separately.

Timer 2

SPARE (at address F6804H)

WatchdogTimer

A watchdog timer is used to sense correct operation of the CPU 387. During normal operation, this CPU resets the WDT in a predetermined amount of time by following the procedure:

| DATA | ADDRESS | COMMENT |
|---|---|---|
| 0AH | F7806H | Reset bit 5 of Port C, PPI0 |
| 0BH | F7806H | SET bit 5 of Port C, PPI0 |

Timeout of the watchdog timer causes an NMI.

The status of the WDT of the LIU may be read by another board by performing an I/O read from the LIU address. If data bit 5 is set, the WDT has timed out. This allows another board to check if the LIU is functional. The CPU 387 may also read the status of its own WDT. The LIU has an on-board run light and an off-board run light output based on the status of the WDT.

Soft Interrupt and Resets

A soft interrupt is achieved by the interrupting device performing an I/O write to the LIU address with data equal to 01H. The interrupt is latched and is cleared by the soft interrupt service routine. The procedure shown below clears the soft interrupt. If a second soft interrupt occurs before the first one is cleared, the PIC will not generate another interrupt to the CPU. Software checks which boards are interrupting with soft interrupts before clearing the interrupt.

| INSTRUCTION | COMMENT |
|---|---|
| ADD PPI1 PORT B, 04 | ADD 04 H TO PPI1 PORT B |
| SUB PPI1 PORT B, 04 | SUBTRACT 04 H FROM PPI1 PORT B |

A soft reset is achieved by the resetting device performing an I/O write to the LIU address with data equal to 02H. This action is latched and holds the CPU reset. To clear the reset and to restart the CPU, an I/O write to the same address is done with data equal to 03H. Two status bits are available to allow the CPU to determine whether the cause of its reset was a power up, a hard (button) reset, a soft reset or a program memory parity error.

Interrupts

The CPU 387 has 9 interrupt levels. Interrupts are serviced with the use of an Intel Corp. 8259A programmable interrupt controller (PIC). The PIC is programmed in the edge-triggered and buffered mode. The following is an example of PIC programming. The interrupt controller may be configured in many ways to suit system application. Reference Document B (Intel Peripheral Design Handbook—Intel Corp. Ref. 8255A) and Reference Document E (Using the 8259A Programming Interrupt Controller—Intel Corp. App. Note 59) should be consulted for the various modes.

The initialization for the PIC is as follows:

| DATA | ADDRESS | COMMENTS |
|---|---|---|
| 13H | F7000 H | ICW1 - Edge triggered |
| 20H | F7002 H | ICW2 - Interrupt vector address |
| 80H | F7002 H | ICW3 - No slave PIC |
| 1FH | F7002 H | ICW4 - Special fully nested mode, buffered, Auto EOI |

The operational control words are given in Table 37.

Priority

Below are the vector addresses for the interrupts as specified above by ICW2. Note that locations 00H through 7FH are reserved by Intel and are used.

IRO - 80H=XACK TIMEOUT
IR1 - 84H=GLOBAL MEMORY ERROR
IR2 - 88H=POWER FAILURE
IR3 - 8CH=NOT USED
IR4 - 90H=SOFT INTERRUPT
IR5 - 94H=REAL TIME CLOCK
IR6 - 98H=8051 INTERRUPT
IR7 - 9CH=NOT USED.

Communications and ASR Registers—8255A's

Two Intel Corp. 8255A's are used for reading and writing communications status and for setting the address segment register. The 8255A's must first be initialized as follows:

| DATA | ADDRESS | COMMENTS |
|---|---|---|
| | | PPI0: Mode 0 |
| 82 H | F67FE H | Port A - Output |
| | | Port B - Input |
| | | Port C - Output |
| | | Address Segment Register |
| | | PPI1: MODE 0 |
| 90 H | F7806 H | Port A - input |
| | | Communications Status |
| | | Port B - output |
| | | Communications Status |
| | | Port C - output |
| | | Communications Status |

The bit structures of the six ports are given in Table 38.

TABLE 37

OCW1 TABLE INTERRUPT MASKS

| Bit | Function |
|---|---|
| D0 | XACK TIMEOUT |
| D1 | GLOBAL MEMORY ERROR |
| D2 | POWER FAIL |
| D3 | NOT USED |
| D4 | SOFT INTERRUPT |
| D5 | REAL TIME CLOCK |
| D6 | 8051 INTERRUPT |
| D7 | NOT USED |

| DATA | ADDRESS | COMMENTS |
|---|---|---|
| As required from 0CW1 table | F7002 H | 0CW1 - 1 = Mask interrupt |
| 80 H | F7000 H | 0CW2 - Rotate on automatic E01 |
| 08 H | F7000 H | 0CW3 - Vectored mode |
| 3.8 Priority | | |

Below are the vector addresses for the interrupts as specified above by ICW2. Note that locations 00H through 7FH are reserved by Intel and should not be used.

The output ports of the 8255A's may be controlled in two ways. Either by:

(a) Adding or subtracting a number which is a power of 2 to the port. e.g.,

| INSTRUCTION | COMMENT |
|---|---|
| ADD PPI1, PORT B, 04 | Add 04H to PPI1 Port B thus setting Bit 3 LO. |
| SUB PPI1, PORT B, 04 | Subtract 04H from PPI1, Port B thus resetting Bit 3 LO. |

or;

(b) By specifically setting or resetting a BIT. This is only possible for PORT C. Individual bit programming is performed by writing to the PPI control address with data as set forth in Table 39.

Refer to Reference Document B (Intel Peripheral Design Hanbook—Intel Corp. Ref. 8255A) for further explanation of the 8255A Port C operation.

Bus Arbitration

Bus arbitration is accomplished with the use of the Intel Corp. 8289 bus arbiter. The use of the 8289 allows a means of resolving priority between bus masters simultaneously requesting the Bus. The arbitration technique is serial priority and resident mode. Once an arbiter obtains the bus, it remains in control until the bus is requested by another board.

The strapping option for the 8289 to achieve the configuration required is the resident bus mode. The following pins are strapped:

| PIN | NAME | STATE |
|---|---|---|
| 4 | RESB | High |
| 2 | IOB/ | High |
| 14 | ANYRQST | High |

TABLE 38

| | | | | | | | | |
|---|---|---|---|---|---|---|---|---|
| PPI0; | PORT A: | OUTPUT | | | | | | |
| ADDRESS | D7 | D6 | D5 | D4 | D3 | D2 | D1 | D0 |
| F67FB | ASR13 | ASR12 | ASR11 | ASR10 | ASROF | ASROE | ASROD | ASORC |
| PPI0: | PORT B: | INPUT | | | | | | |
| ADDRESS | D7 | D6 | D5 | D4 | D3 | D2 | D1 | D0 |
| F67FA | TBD | TBD | TBD | TBD | TBD | TBD | TBD | XACK TIMER |

TABLE 38-continued

| | | | | | | | | STATUS |
|---|---|---|---|---|---|---|---|---|
| PPI0: | PORT C: | OUTPUT | | | | | | |
| ADDRESS | D7 | D6 | D5 | D4 | D3 | D2 | D1 | D0 |
| F67FC | TBD | 8031 INTER-RUPT | CLEAR WATCH DOG TIMER | CLEAR XACK TIME OUT | CLEAR PARITY ERROR | 8031 DIAG-NOSTIC INT | 8031 RESET-L | WD BOOT-L |
| PPI1: | PORT A: | INPUT | | | | | | |
| ADDRESS | D7 | D6 | D5 | D4 | D3 | D2 | D1 | D0 |
| F7800 | RSB1 | RSB2 | WDSTAT-L | SLT16-L | SLT08-L | SLT04-L | SLT02-L | SLT01-L |
| PPI1 | PORT B: | OUTPUT | | | | | | |
| ADDRESS | D7 | D6 | D5 | D4 | D3 | D2 | D1 | D0 |
| F7802 | TBD | SELF TEST OK | P2 | P1 | AUX | CLEAR SOFT INT | TBD | TBD |
| PPI1: | PORT C: | OUTPUT | | | | | | |
| ADDRESS | D7 | D6 | D5 | D4 | D3 | D2 | D1 | D0 |
| F7804 | TBD | TBD | TBD | TBD | TBD | TBD | TBD | TBD |

TABLE 39

| D7 | D6 | D5 | D4 | D3 D2 D1 | D0 |
|---|---|---|---|---|---|
| 0 | 0 | 0 | 0 | 0 to 7 indicates which bit is to be set/cleared. | 0 = clear bit<br>1 = set bit |

Refer to Reference Documents C (Intel Multibus Interfacing—Intel Corp. App. Note 28A) and Reference Document D (Designing 8086, 8088, 8089 Multiprocessing Systems with the 8289 Bus Arbiter—Intel Corp. App. Note 51) for more detail on using the 8289.

The LIU is not capable of providing the "BATON START" signal and therefore connects its ENCLKIN to its ENCLKO line.

One priority method is rotating serial priority. With this method, the priority rotates in a complete circle, where each board in turn may become the highest priority bus master. To achieve this priority method, the Bus Priority is jumpered to the "Rotating Priority Latch" which ensures that once the LIU has the bus, BPRN-L stays LO.

Another priority method is privileged rotational priority as described in detail in the overall bus section. Bus arbitration initiates a transfer acknowledge timeout (XACK time out). Once the bus is requested, a 6 millisecond timer is set. If the timer times out before the bus is acquired, an interrupt and a READY to the CPU are generated. Under normal circumstances, the bus is acquired before a timeout occurs. If the bus is acquired and an XACK is not returned within the 6 milliseconds, the CPU is interrupted and a READY is generated. The interrupt service routine can read a status register to determine which failure caused the timeout.

Address Segment Register

The address segment register is an 8-bit read/write register that is used to extend the 8086's 20 address lines to 24 address lines on the public bus. On board operations only use the 8086's 20-bit address lines. The address segment register also allows the LIU to access the total 16 Mbyte of off-board memory.

All memory operations that are not accessing on-board devices are decoded as off-board (See 8086 Memory Map). Additionally, off-board addresses E0000--EFFFFH are used as a "window" to place the 8 bits from the address segment register on the public bus along with the lower 16 address bits from the 8086. For all off-board operations not in the window, the 24 bit public bus address consists of the full 20-bit 8086 address and all zeros in the top 4 bits. Thus any megabyte of the available 16 Mbytes of off-board memory may be accessed with the address segment register, while only the bottom megabyte minus the on-board addresses may be acessed without the address segment register.

The address segment register is loaded by the 8086 and is treated as a single 8-bit port which is memory mapped at address F67FC. The off-board memory is thus broken into 256 pages (each page containing 64K bytes) with the address segment register containing the page and the 16 least significant address bits from the 8086 providing the remainder of the address. Again, the 8086 address must be in the range E0000-EFFFF for the 8 bits from the address segment register to be placed on the bus. Thus the following is done to write to off-board memory location ADFE20H.

| DATA | ADDRESS | COMMENTS |
|---|---|---|
| AD H | FC67C H | Set ASR with 8 MSB |
| XX H | EFE20 H | "Dummy" write to window and 16 LSB |

Bus Interface

The LIU bus interface is in accordance with the public bus section. The bus interface is a connector.

I/O Address

The LIU I/O address identifies itself as an LIU board and indicates which slot in the backplane and which rack the board occupies. The LIU's initialization routine reads the slot lines through Port A of PPI 1 to determine its full address.

The I/O addresses for a LIU board are:

| ADR OF-OC | ADR OB-08 | ADR 07-04 | ADR 03-00 |
|---|---|---|---|
| 1 1 1 1 | 1 1 1 SLT16 (rack no.) | SLT8 SLT4 SLT2 SLT1 | 0 0 0 0 |

This gives an I/O address in the range FE00 TO FFF0 H.

Bus Status Register

Sixteen status bits are provided that may be read by another device on the public bus by performing an I/O read to the LIU I/O address (see I/O address). The sixteen bits are defined as follows:

| | |
|---|---|
| DAT 0-DAT 4 | Device Number LIU = 06H |
| DAT 5 | FWDT Status |
| DAT 6 | Self Test Error |
| DAT 7 | |
| DAT 8 | |
| DAT 9 | |
| DAT A | |
| DAT B | |
| DAT C | |
| DAT D | |
| DAT E | |
| DAT F | |

Status bits DAT6 through DATF are error indicators which indicate an error if they are set to a 1. The software must set these bits through the error status registers in Ports B and C of the status 8255. Each port may be set by writing to the appropriate address.

LED'S

Four LED'S are provided to indicate board status. The function of these LED's are as follows:

| | | |
|---|---|---|
| LED 1 - Fast Watch Dog Timer Timeout (Runlight) | ON = | OK |
| | OFF = | Timed out |
| LED 2 - Bus Master [Based on the System Address Enable (BAEN-H) line ] | ON = | LIU is master of public bus. |
| | OFF = | LIU is not master of public bus. |
| LED 3 - Self Test Error (Set through Port B of 8255A-PPI1) PPI1) | ON = | Error found during Power Up diagnostics. |
| | OFF = | Power up |
| Sequence found | No errors | |
| LED 4 - Cable 1 on (Set through Port B of 8255A-PPI1 PPI1) | ON = | Cable 1 in use |
| | . . .OFF = | Cable 2 on |

Global Status Lines

Four status lines are available on the public bus to indicate status of the entire system. They are open collector and may be driven by any board. These 4 lines drive LED's on the front panel of the system.

STAT 1 is a self test error line. The self-test error line from PPI1 Port B drives this line. The light for this status line is turned on when any board in the system encounters a self test error.

STAT 2 is defined as a FWDT timeout line. This line drives a runlight which will go out when any board in the system has a WDT timeout.

STAT 3 and STAT 4 are undefined and are not driven by the LIU.

Diagnostics

The LIU meets the DDS diagnostic strategy. Those tests may be triggered manually, at power up, or remotely via the local area network supervisory channel.

Upon power up the LIU self checks the following items:

a. CPU
b. PROM checksum
c. Dual port RAM
d. Timers
e. Watchdog timer
f. Modem loopback
g. Jabber timer
h. Public bus interface Dual-Port RAM 391

The dual-port RAM has two functions. Firstly it provides the program for the CPU 387. Secondly it provides a communications path between the CPU 387 and the CPU 388. 64k×1 DRAM devices are used with data integrity parity checking. The memory is structured as 64k×18 bits. A parity bit is used for each byte, since byte accesses are required. The lower 32k×18 bit is used as the 8086 program space while the upper 32k×18 is used as the data transfer space. The 8086 may access the complete 64k words but the 8051 may only access the upper 64k bytes.

The result of a detected parity error is determined by the area of memory which caused the error. If the error occurred within the data transfer space then an NMI is sent to the 8086. The 8086 then reads a port to see if it was a parity error or the watchdog timer that caused the NMI. In the event that it was a parity error then reinitialization occurs. If the error occurred within the program space then the LIU resets; and the bootup, self test and down-loading procedure occurs. Since parity checking occurs on every read cycle, it is necessary that on initialization, every location of the dual-port memory be written into to correctly set the parity bits.

There are three possible "owners" of the dual-port RAM. They are in descending order of priority: the 8051, the refresh circuitry and the 8086. The arbitration of the memory is as follows:

At arbitration time, it is decided who will next have the dual-port memory. This time is either the time when the 8051 ALE goes low or, if the 8051 is held reset, it is once every microsecond. The requests from both the refresh circuitry and the 8086 have to be valid before the rising edge of the 8051 ALE, or if the 8051 is being reset, then 100 ns before arbitration time. The refresh circuit requests a cycle every 14 microsecnds.

Requests from both the refresh circuit and the 8086 are latched until they are granted.

Access Machine

The ACCESS MACHINE consists of an 8051, a 68B54 and the associated PSEUDO-DMA circuits needed for block moves. A 28 pin socket for external ROM or static RAM is included.

CPU 388

CPU 388 is an Intel Corporation 8051 CPU that runs at 12.35 MHz. This clock is derived from an integrated 24.704 MHz crystal oscillator which is part of the HD6409 Manchester Encoder/Decoder device. Therefore, both devices are synchronized.

Decoding of memory space is configured by jumpers. 8051 family parts with or without ROM are used.

External Interrupt 0 is wired to a control bit from the 8086. This allows the 8086 to interrupt the 8051.

The two timers on the 8051 chip are used by the ACCESS software to time out various intervals. The basic frequency of the timer clock is 1 MHz.

The 8051's UART is not used.

Ports 0 and 2 are used as the address and data bus for external program and data memory. Note that when an 8051 cycle begins and ports 0 and 2 are all HI at ALE time, then an instruction fetch cycle from internal ROM cycle is being executed.

Ports 1 and 3 are used as miscellaneous input and output lines. The pin assignments for these ports are discussed in the 8051 control and status bits section.

8051 Control and Status Bits

Ports 0 and 3 are used as general input and output ports for various functions in the access machine. The function of these port pins is given in Table 40.

Modem Redundancy Control & Status Registers

The signals given in Table 41 are used to control and read the Modem redundancy control hardware.

8051 Memory - PROM 393

The 8051 has an 8k byte PROM to operate from in addition to a possible 4k bytes of internal program memory. There are three possible combinations using these memories as set forth in table 42.

THE 68B54 Communications Chip

The 68B54 Communications Chip encodes and decodes the 8-bit parallel data going to and from the 8051 to a serial, synchronous, HDLC type data stream. The serial stream goes to/from the modem. The 68B54 is memory mapped near the top of the 8051's address space.

Modem 390

The modem has two channels, each attached to a local area network coaxial cable (see FIG. 1). Both channels may be used simultaneously either to transmit or receive.

There are two TX modes of operation:

a. To transmit down 1 line only, b. To transmit down both lines

The normal mode is to transmit down both lines.

The serial data comes to the modem from the HDLC circuitry encoded in NRZI form. This is further encoded by the modem into differentially encoded Manchester II. The digital pulses are then shaped for better propagation and finally enter onto a local area network as a 1.544 Mbit per second bitstream.

8086 Memory Map

See Table 43

8051 Memory Map

See Table 44

TABLE 40

| | |
|---|---|
| P1.0 - OUTPUT - | Enables 68B54 transmitter data out when HI |
| P1.1 - OUTPUT - | When a rising edge occurs, an interrupt to the 8086 occurs. This pin should normally be kept HI and only brought LO immediately before bringing it back HI again. |
| P1.2 - OUTPUT - | Enables the PSEUDO-DMA when HI. In PSEUDO-DMA mode, data moves between the 6854 and the memory while the CPU thinks it's executing memory write instructions. The memory address is supplied by the CPU. |
| P1.5 - OUTPUT - | When LO, DCD from the Modem is allowed to pass to the 68B54. When HI, DCD is gated off from the 68B54. |
| P1.4 - OUTPUT - | When LO the MODEM's output is looped (MODEM loop) to its inputs via a maximum attenuation path allowing MODWAY diagnostics to be performed. |
| P1.5 - OUTPUT - | When HI, the direction of data flow in PSEUDO-DMA is from RAM to 68B54. When LO, it's from the 68B54 to RAM. The state of this bit is normally selected before PSEUDO-DMA-H (P1.2) is set. |
| P1.6 - INPUT - | Spare |
| P1.7 - INPUT - | LO when CLEAR TO SEND from the MODEM is active. |
| P3.0 - INPUT - | HI when the FLAG-DETECT flip-flop catches a FLAG. The FLAG DETECT flip-flop is reset in the absence of CTS being active. |
| P3.1 - INPUT - | RDSR-H. This is the RDSR line of the 68B54 indicating, when HI, that a byte is ready in the 68B54's data buffer. |
| P3.2 - INPUT - | IRQ-L. A falling edge here signifies a 68B54 interrupt. |
| P3.3 - INPUT - | A falling edge here signifies an interrupt from the 8086. |
| P3.4 - INPUT - | TDSR-H. This is the TDSR line of the 68B54. A HI indicates that the data input buffer wants a byte. |
| P3.5 - INPUT - | LO when CARRIER DETECT (DCD) from the modem is active. |
| P3.6 & P3.7 - | These are the READ and WRITE signals generated by the 8051 for Ports 1 and 2. |

TABLE 41

| | |
|---|---|
| BIT0 - FRUN-L- | When LO, the Modem will "pick-up" the first cable with active carrier. When HI, the Modem will "pick-up" the cable indicated by BIT1. |
| BIT1 - SCBL1-L | The state of this bit only matters if BIT0 is HI. When BIT1 is HI, the Modem will use the secondary cable. When LO, the Modem will use the primary cable. |
| BIT2 - JBRK1-H | When HI, the primary MODEM will be disconnected from the primary cable. |
| BIT3 - JBRK2-H | When HI, the secondary MODEM will be disconnected from the secondary cable. |
| BIT4 - ATTNMAX1-H | During a self-test, this bit may be set high to insert an extra XX dB attenuation in the signal path between the primary TX and RX. |
| BIT5 - ATTNMAX2-H | During a self-test, this bit may be set high to insert an extra XX dB attenuation in the signal path between the secondary TX and RX. |
| 3.15.3.2 | MODEM Redundancy Status Input Port, Address FFF7 H |
| BIT0 - SJBR1-H | This line goes HI when the Modem "JABBER" timer for Line 1 times out. |
| BIT1 - SJBR2-H | This line goes HI when the Modem "JABBER" timer for Line 2 times out. |
| BIT2 - PR1-SEL-L | A LO on this line indicates that the Modem is communicating over the primary cable. A HI indicates that the Modem is communicating over the secondary cable. |
| BIT3 - SRCD1-H | This bit is HI when carrier 1 is detected. |
| BIT4 - SRCD2-H | This bit is HI when carrier 2 is detected. |
| BIT5 - DIAG-INT-H | This state of the 8086's diagnostic interrupt is input here. This signal comes from Bit 2 of PPI0. |
| BIT6 | Not used. |
| BIT7 | Not used. |

TABLE 42

| TOTAL ADDRESS SPACE | TYPE | EXT. ADDRESS SPACE | EA JUMPER | COMP JUMP | RAM SPACE |
|---|---|---|---|---|---|
| 0-4K | Int.Only | None | E1-E2 | None | 0-FFEO |
| 0-8K | Ext.Only | 0-8K | E2-E3 | E4-E6 | 2000-FFEO |
| 0-12K | Int.8Ext. | 4K-12K | E2-E3 | E4-E5 | 2000-FFEO |

TABLE 43

| ADDRESS | USE |
|---|---|
| FFFFF | 8 or 16K bytes of UVPROM |
| FC000 | |
| F7FFF | PROGRAMMABLE INTERFACE |
| F7800 | PERIPHERAL 1 |
| F77FF | PROGRAMMABLE INTERRUPT |
| F7000 | CONTROLLER |
| F6FFF | PROGRAMMABLE INTERVAL TIMER |
| F6800 | |
| F67FF | PROGRAMMABLE INTERFACE |
| F67F8 | PERIPHERAL 0 |
| EFFFF | MODBASE INDIRECT ACCESS |
| E0000 | |
| DFFFF | MODBASE DIRECT ACCESS |
| 20000 | |
| 1FFFF | DUAL - PORT MEMORY |
| 00000 | |

TABLE 44

| ADDRESS | USE | | |
|---|---|---|---|
| FFFF | 68B54 DATA LINK CONTROLLER | | |
| FFF0 | | | |
| FFEF | DUAL PORT MEMORY | | |
| 4000 | | | |
| 3FFF | 8K | DUAL | IF INTERNAL |
| | EXTERNAL | PORT | ROM IS USED |
| | PROM | MEMORY | SOLELY THEN |
| 2000 | + | — | THIS SPACE |
| 1FFF | 4K | 8K | BECOMES |
| | | | DEDICATED |
| | INTERNAL | EXTERNAL | TO THE DUAL |
| 0000 | ROM | PROM | PORT MEMORY |

MMI OPERATING SYSTEM

Introduction

This section generally describes the MMI operating system. This operating system (OS) is based upon the CTOS TM operating system of Convergent Technologies, Inc., 2500 Augustine Drive, Santa Clara, CA. Detailed information on the CTOS operating system is available in the CTOS Operating System Manual ©1981 by Convergent Technologies, hereby incorporated by reference.

The OS support is described for the following areas:

floppy disk support
serial port drivers
memory hardware support
inter-board communication support
bootstrap initialization
timer support
video support
keyboard and touch panel support
additional system services from the ROM-based OS.

Floppy Disk Support

The user interface to the floppy disk on the MMI is functionally identical to that on CTOS. The floppy board looks (to the CPU's) like a dumb device. Communication between the floppy board and the CPU's uses the inter-board communication scheme described later in this section. The following features are supported on the floppy board:

watchdog timer
memory error handling
bootstrap initialization and configuration dialogue with the CPU.

Serial Port Drivers

The CPU module supports three ports (see FIG. 1), using some asynchronous protocol or public bus protocol. It fields interrupts for both data transfers and ring indications, and passes the data and status information associated with the interrupt to an application.

Memory Support

Memory is allocated only by the CPU OS. There is no operating system-level function to allocate shared memory from any other processor, although an application process running on the CPU module may allocate memory and pass a pointer regarding that memory to an application on another board by using the inter-board communication mechanism.

Inter-Board Communication Support

The operating system provides a means for applications running on different boards in MMI to communicate with each other. This includes an interrupt handler for soft interrupts from other boards and a subroutine call to send a message to an application on another board. The interrupt handler notifies the appropriate application process (depending on the destination specified by the incoming message) of the interrupt. Any data passed between processors is done by using the shared memory. The soft interrupt handler and the subroutine call are present on the CPU module and the floppy board. Any other board (e.g., the video CPU) that wishes to use soft interrupts to communicate with the CPU module or floppy board uses a compatible soft interrupt handler and subroutine call. Bootstrap Initialization Bootstrapping on the MMI after a power-up or system reset consists of two major parts: PROM-resident code and disk-resident code. The PROM-resident code is activated once the confidence test diagnostics have completed successfully. It does some hardware initialization, determines what other boards are present in the system and verifies that they have also successfully completed their confidence tests. It then issues commands to the floppy board to load the disk-resident system image into memory. The disk-resident code completes the hardware initialization, runs more comprehensive diagnostics, initializes the interrupt vectors and other system tables as necessary, and then starts running the applications processes. It also is required to downline load the video software.

Timer Support

The CPU module has a watchdog timer (see details in the CPU module section) and three programmable interval timers. The watchdog timer is initialized on power-up or reset and then a specified value is written to it on a regular basis (the exact interval is software-selected) to keep it from expiring. The watchdog timer interrupt handler invokes the system shutdown routine.

Video Support

There are 2 modes of -video operation on the MMI - CT mode and MMI mode. CT mode supports the CT executive and required utilities in their use of the CT device . MMI mode supports MMI applications for full use of the video CPU graphics capabilities. MMI mode communication with the video CPU are done directly through the inter-board communication mechanism and are not seen by the OS as an I/O operation. MMI mode supports as many video stations as are physically present. CT mode supports at most one video module at a time.

Keyboard and Touch Panel Support

Support is provided for up to 2 keyboards attached to the video CPU board. Incoming keyboard characters and touch panel inputs are passed to the CPU module by means of the inter-board communication mechanism. The CPU module sends LED output information to the video CPU. Both encoded and unencoded modes of keyboard input are supported.

System Services

Those features which are available on the CPU module are:

Restart
Quit
Wait with timeout
Interrupt handling for new interrupt types (xack timeout, memory errors, power fail, . . . ).

DATABASE MANAGER

Overall Purpose and Function

The database is the mechanism by which displays are linked with the user application. A typical application is controlled via programmable controllers (PC's). Each PC contains a number of internal variables which can be read from or written to displays. These PC internal variables come in two varieties: Coils and Registers. Each coil or register is assigned a reference number. PC's are also assigned reference numbers so that in a multi-PC application, each PC Coil or Register can be uniquely specified with a PC number and a Register/-Coil number. The mechanism by which PC's communicate with each other is via the public bus.

The database contains a reflection of the application's Coils and Registers. The displays read and write to the database as though they were directly conversing with the PC's. The database is continuously maintained to reflect the current state of the PC variables via an independent process which communicates to the PC's via the public bus.

General Functional Description

Datatypes

The database contains two datatypes, called Coil and Register to reflect the naming convention used in PC's. Coils are boolean (true/false) variables whereas Registers are real variables. While internally to the PCs Registers are integer values, the capability is provided for automatic conversion to engineering units on input (and conversion back on output) so that the display need only deal with real values.

Database Names

Each database element has a user assigned name by which it can be referred. The name is hierarchical in nature. This means that logically related database items can be grouped together in convenient ways. This capability is especially useful when configuring displays, since many database elements can be referred to with a single reference.

db Handles

It is especially useful in certain applications to refer to portions of database names rather than the full name. For example, one has the ability to pass partial names as parameters to subpictures. For this reason, subnames are given db Handles, a method of referring to partial names.

Autolog Facility

An attribute of every database element is the Auto-Log facility. This feature allows all operator changes to the database to be automatically logged. This facility can be switched on or off from displays.

Datapoint Protection

To provide protection from unauthorized personnel from modifying important datapoints, every datapoint can be assigned a protection level. Lockout from modification to the datapoint is automatic if the security level of the operator is not sufficient. Six levels of protection are provided.

System Variables

As a convenience to the user, certain variables exist in the database that can be accessed by all displays in the system. Some of these variables are continuously updated via a background process without the user designation. For example, the current date and time are always available as elements in the database.

Scanner

Elements in the database may be designated as being 'connected' to a register or coil in a particular PC. Although displays use the database as though they are directly communicating with PC's, there is another process which is actually doing the communication. This process is the scanner. Each database element may be assigned a scan rate so that it may reflect the actual changes occurring in a PC within a certain time interval. Also, when a connected database element is modified from a display, the new value is written out to the PC, also via the scanner.

Database Names

Some DBM functions take as an input argument the mnemonic descriptor (name) of the datapoint in question. This name will be hierarchical in nature and consists of strings of ASCII characters (subnames) in the range 'A', 'Z', '0', '9' and separated by periods ('.'). The first character in each subname must be a letter. There is no distinction between upper and lower case, as conversion to upper case is automatic. Examples of valid names are:

PLANT22.AREA18.GROUP2.STEAMTANK.-PRESSURELOOP.SETPOINT
TANK1.PRESSURELOOP.SETPOINT

TANK1.PRESSURELOOP.PRESSURE
TANK1.TEMPLOOP.SETPOINT
TANK1.TEMPLOOP.TEMP
TANK1.TEMPLOOP.ALARMLIMIT
TEMPORARY
P3.ONE4159
T

It is useful to visualize these names as being organized in a sort of tree structure. The above names should be thought of as having the following structure set forth in Table 202.

TABLE 202

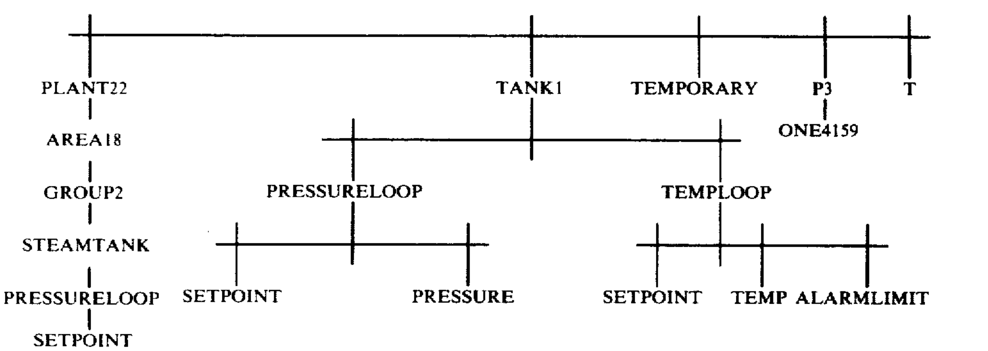

Multiple Database Capability

The ability to distinguish between several logically separate databases is provided, even if the databases have elements with the same name. The distinction is handled by a prefix to the element name of which the user is normally unaware. This prefix is delimited by slashes '/' to distinguish it from a normal prefix. For example:

/DB0 STEAMTANK.PRESSURE
/DB1 STEAMTANK.PRESSURE are two variables with the same name residing in different databases.

A database is assigned to a display at configuration time and the ability exists to copy one database to another so that the only remaining task for the configurator is to change the PC routing.

Once a database is chosen for a display, the user need not specify the database prefix thereafter. However he/she can explicitly request or connect an item in another database by referring to the full name.

Default Databases

Two databases are provided as defaults at system configuration, are for system data and one for process variables. These are named /SYS/ and /DB0/. If no database is specified, /DB0/ is be the default database.

Two default dbHandles are provided to correspond to the two default databases. These are internal variables not available to the user but available to application programs through cosmic memory. Within this section the names pDB0 and pSYS are used for these handles.

System Database

The database called /SYS/ is for system data and contains the following default elements:

/SYS/TIME.SECONDS
/SYS/TIME.MINUTES
/SYS/TIME.HOURS
/SYS/DATE.MONTH
/SYS/DATE.DAY
/SYS/DATE.YEAR
/SYS/POWER.UP

The user may add system variables if desired.

dbHandles

To permit certain conveniences to the user, it is often necessary to refer to partial names. As an example, a display might have a subpicture which contains the variables:

X.PRESSURE
X.SETPOINT
X.HILIMIT
X.LOWLIMIT

The subpicture is designed to have one parameter, named X. In the database, process variables exist for each of the display variables, but the names are cumbersome:

PLANT22. AREA18. GROUP2. STEAMTANK. PRESSURELOOP. PRESSURE
PLANT22. AREA18. GROUP2. STEAMTANK. PRESSURELOOP. SETPOINT
PLANT22. AREA18. GROUP2. STEAMTANK. PRESSURELOOP. HILIMIT
PLANT22. AREA18. GROUP2. STEAMTANK. PRESSURELOOP. LOWLIMIT

The user can resolve all references by passing

'PLANT22. AREA18. GROUP2.STEAMTANK.-PRESSURELOOP' for the parameter X.

To prevent the display interpreter from having to do complex string substitutions when handling this type of parameter passing, the capability is provided for searching for subnames in the database. The result of this type of request is called a dbHandle. (This handle tells the database manager where to start searching for a name it can be thought of as a variable which holds a prefix).

In the above example:

pTemp: = SearchDB(pDBO,'PLANT22.AREA18.-GROUP2.STEAMTANK.PRESSURELOOP')
pPres: = SearchDB(pTemp, 'PRESSURE');

Now all accesses to

PLANT22.AREA18.GROUP2.STEAMTANK.-PRESSURELOOP.PRESSURE can be made through the dbHandle pPres.

If the database is thought of as being a tree structure, a dbHandle can be thought of as a pointer to one of the nodes. The above example can be visualized as set forth in Table 203.

TABLE 203

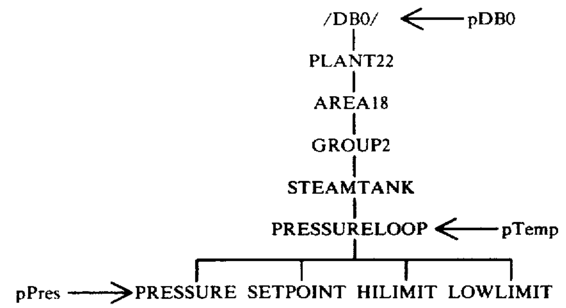

Database Descriptors

A database descriptor is a record which describes a datapoint both in form and where it comes from (internally or from a programmable controller). There are two types of database elements available to the user: Registers and Coils. Each field within a descriptor is modifiable through a DBM function which is specific to that field.

Common Descriptor Characteristics

There are some characteristics which apply to all datapoints. Fields labeled with an * are modifiable by the user.

Protection*

One of the attributes that can be configured into process datapoints is datapoint protection level. The datapoint protection level specifies the access allowed to the database after system security has been established. Unless otherwise specified, a datapoint is unprotected.

In order to design a display to establish security clearance, the designer checks a password list and derives a security level in the range 0 . . . 2. This number is then put into the database in the system variable called /SYS/SECURITY. The database manager then checks security versus datapoint protection level whenever there is a request to modify a datapoint. The DBM rejects the request if the system security level is not sufficient. If no security establishing display is designed, a level of 0 (no security) is assumed. Security codes are as follows:

0—No security—only unprotected datapoints may be changed.

1—Low security—only datapoints with protection levels 3, 7, or 15 may be changed.

2—High security—all datapoints may be changed.

Datapoint protection levels are as follows: (numbers chosen to correspond with current Current Technology file protection scheme—see discussion on operating system)

| | |
|---|---|
| 0 access protected 2 - | The datapoint is read and modify protected. A security level of 2 is needed to read or modify it. |
| 1 read protected 1 - | The datapoint is read and modify protected. A security level of 1 or 2 is needed to read it. A security level of 2 is needed to modify it. |
| 3 access protected 1 - | The data point is read and modify protected. A security level of 1 or 2 is needed to read or modify it. |
| 5 modify protected 2 - | The datapoint is modify protected. It can be read without security clearance. A security level of 2 is needed to modify it. |
| 7 modify protected 1 - | The datapoint is modify protected. It is not protected to read. A security level of 1 or 2 is needed to modify it. |
| 15 unprotected | The datapoint is not protected. It can be read or modified without security clearance. |

A summary is presented in Table 204.

TABLE 204

| protection level | security for read | security for write |
|---|---|---|
| 0 | 0 | 2 |
| 1 | 1,2 | 2 |
| 3 | 1,2 | 1,2 |
| 5 | 0,1,2 | 2 |
| 7 | 0,1,2 | 1,2 |
| 15 | 0,1,2 | 0,1,2 |

OWNER

This field provides the mechanism for the database manager to reconstruct the name of a datapoint if only the current datapoint is known. This is of no consequence to the user.

AUTOLOG

AutoLog provides the capability for automatic logging of all changes made to the value of a datapoint by an operator. The user may toggle this field on or off.

ENABLED

The enabled field allows the user to disconnect a datapoint from the man-machine interface system. All requests to change the value of the datapoint are ignored. The datapoint remains in the state it was in prior to being disconnected, even if it is attached to a PC. The user may toggle this filed on or off.

CONNECTED

This field specifies if the datapoint is connected to a PC. Once connected, the datapoint is automatically scanned by the scanner. The operator changes to this datapoint are written out to the PC. This field may be toggled on or off.

VALID

This field is provided as an aid to the user. In certain calculations the display may determine that the value or this datapoint is invalid; i.e. it is out of range or contradicts known conditions. Toggling this field to false in this event allows the user to carry this knowledge through to other calculations which might rely on this value.

PC NUMBER

If a datapoint is to be connected to a PC, a PC number must be supplied for the scanner to know which PC to consult.

PC REGISTER/COIL NUMBER

The register or coil number within a PC must be provided if the datapoint is connected.

REGISTER CHARACTERISTICS

The register data type is a real number. When connected to a PC register, an automatic conversion takes place between PC register units and engineering units. To establish the parameters for this conversion, the field SPAN and ZERO are provided. As a convenience, the field ENG-UNITS is provided to save a four-character string describing the engineering units used.

COIL CHARACTERISTICS

The coil datatype is a boolean value (true/false).

DATABASE MANAGER (DBM) FUNCTIONS

The following is a list of the functions provided by the database manager.

CreateDatabase(database name):dbHandle;

This function creates a new database. The input to this function is a database name of the form described above. A dbHandle is returned which is then used as a prefix in SearchDB operations.

RemoveDatabase(dbHandle);

This function removes a database from the system and all its associated process variables. If any variables in the database are connected to a PC, then this function has no effect.

SearchDB (dbHandlePrefix, name): dbHandle;

SearchDB provides most of the flexibility of the database manager, and understanding this function is essential to the understanding of the database manager. This function is never actually directly used by the operator. It is instead used by the display interpreter to enable passing subnames as parameters and also by the configuration editor to implement a set prefix operation.

SearchDB searches the database for a given name or subname. A dbHandle is returned which can. then be used in further SearchDB operations. It is used to conceptualize the database as being a tree structure where each mode of the tree is a subname. For example, the database called /DBO/ might have three variables called:

TANK1. PRESSLOOP.SETPOINT
TANK1. PRESSLOOP.PRESSURE
TANK1. OIHERLOOP.SETPOINT

These variables are arranged in the database as follows:

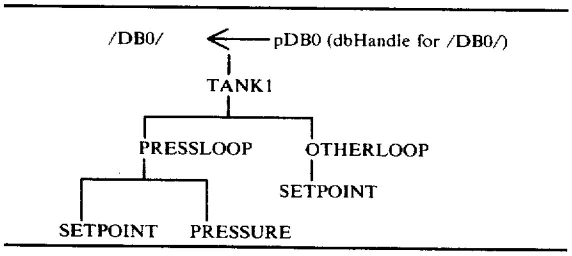

The subname PRESSLOOP is searched by performing the following:

pPressLoop: = SearchDB(pDB0,"TANK1.PRESSLOOP");

Searches for TANK1, SETPOINT the variables, SETPOINT and PRESSURE require:

pSet: = SearchDB (pPressLoop, "SETPOINT");
pPress: = Search DB (pPressLoop, "PRESSURE");

Now the following dbHandles are available:

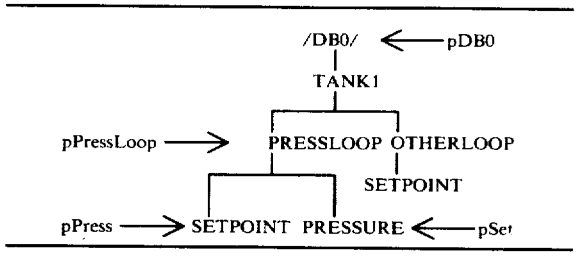

The dbHandles pPress and pSet now provide direct access into the database. All database manager functions which require a dbHandle to gain access to actual database records can use these dbHandles. Note that pDBO and pPressLoop do not point to the end of any database name and therefore cannot be used in this way. An attempt to use them in this manner causes an error condition.

CreateCoil (dbHandlePrefix, name);

CreateCoil is used to creat a coil database element. If the dbHandlePrefix is already pointing to a name end, then the "name" parameter should be null. Elements within the database record are defaulted as follows:

Value = false
AutoLog = false
Enabled = true
Connected = false
Valid = true
Protection = 15

CreateRegister (dhHandlePrefix, name):

CreateRegister is used to create a register database element. If the dbHandlePrefix is already pointing to a name end, then the "name" parameter should be null. Elements within the database record are defaulted as follows:

Value = 0.0
Span = 1.0
Zero = 0.0
Eng-Units = ' '
AutoLog = false
Enabled = true
Connected = false
Valid = true
Protection = 15

DeleteName (dbHandle);

SetAutoLog (dbHandle, fSet: boolean);

This function sets AutoLog to correspond to the condition of fSet.

OueryAutolog (dbHandle): boolean;

This function returns the present setting of Autolog.

SetConnected (dbHandle, fSet: boolean);

This function sets connected to correspond to the condition of fSet.

OueryConnected (dbHandle): boolean;

Function to return the present setting of connected.

SetValid (dbHandle, fSet: boolean);
This function sets valid to correspond to the condition of fSet.

QueryValid (dbHandle): boolean;
Function to return the present setting of valid.

SetSampleRate (dbHandle, rate);
This function is a sampling rate by which the scanner reads from a PC to update the value.

QuerySampleRate (dbHandle): rate;
Function to return the present sampling rate.

SetEnabled (dbHandle, fSet: boolean);
This function sets Enabled to correspond to the condition of fSet.

QueryEnabled (dbHandle): boolean;
This function returns the present setting of enabled.

SetProtection (dbHandle, protection);
This function sets a protection level whereby further changes to this datapoint are restricted.

QueryProtection (dbHandle): protection;

CopyDB (dbHandle1, dbHandle2);
CopyDB enables database building to be accomplished quickly. This function is primarily used by the configuration editor. CopyDB copies a part of a database to another part, whether it is ah entire database or just a small portion. The following examples serve to illustrate this function.

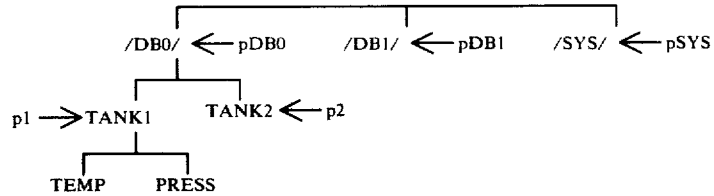

This diagram represents the entire man-machine interface database at an early stage of building. Database /DB0/ contains three variables: TANK1.TEMP, TANK1.PRESS, and TANK2. /DB1/ was created via the CreateDatabase function which returned a dbHandle of pDB1. The system database /SYS/ does not have its variables shown. Database handles pointing to TANK1 and TANK2 were obtained via the SearchDB function.

The function CopyDB (pDB0, pDB1) results in the following effect:

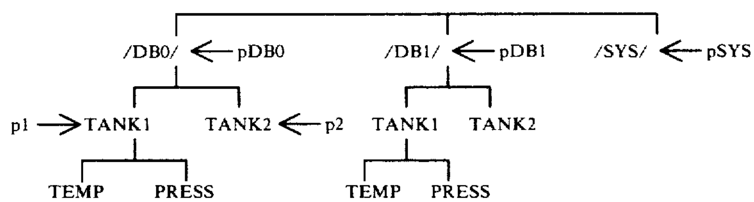

In this case, the entire variable list under /DB0/ was copied to /DB1/. Normally the only additional task for the user to perform is to respecify the PC routing information.

The function CopyDB (p1,p2) produces the following:

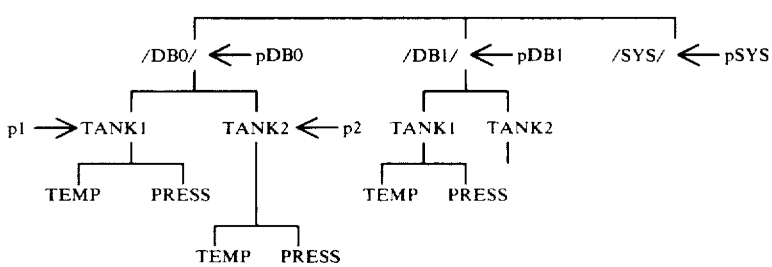

Here only a portion of a database was copied into another part of the same database creating the additional names TANK2.TEMP and TANK2.PRESS in one operation.

MMI TASK MANAGER

Overall Purpose and Function

The task manager is the top level of the MMI host software. It has two primary functions: (1) to perform all host software initialization and (2) to behave as a scheduler for MMI display processes (display tasks).

General Functional Description

The initialization of the MMI host software occurs as part of the bootup sequence. Some of the initialization is performed completely by the operating system or through calls to the operating system from the task manager.

After initialization is complete, a configured display file (CDF) which was previously chosen (in configuration mode) to be the initial MMI display is read in. A display task is started up for this initial display.

During normal operation of the MMI, the task manager insures that display tasks run at their scheduled times. The task manager behaves as an independent process which monitors all other processes in the system. It keeps the system status information for whatever process might need it. For example, a display can be designed to show the operator system status. The task manager can determine what actions need be taken if a process is to be terminated.

SYSTEM INITIALIZATION

MMI Initialization

Initialization of Cosmic Data

Cosmic data is internal data which applies to all processes running in the host software (as opposed to global data which just pertains to one process). The task manager initializes this data on powerup.

Startup of Scanner

The scanner is an independent task which performs the data acquition for the database. It talks via the communications network 44 (see FIG. 1) to programmable controllers 48 and updates the database to reflect the application. This process is started up as part of the host initialization.

Video Code Download

There may be up to 2 video CPU's connected to a host CPU (see FIG. 1). Each video CPU contains a PROM which contains a loader program as well as code to make it appear as a "dumb" terminal. On video CPU powerup, the video CPU behaves as a dumb terminal by accepting ASCII characters from the host and echoing them to the screen. A particular control code sequence puts the video CPU into loader mode, after which the host sends down the video CPU software to each video CPU. It is possible that this actual function occurs entirely within the operating system.

Startup of Initial Display Task

One configured display file (CDF) can be chosen to be read automatically on system powerup. This CDF can be designed by the user to suit his/her own application.

DISPLAY TASKS

Display tasks implement the user application by allowing a program (display) written in graphic language to run within the MMI. Display tasks are concurrent processes which are scheduled to run by the Task manager. Each display task accepts a configured display file and runs the configured display it represents by feeding it through the display interpreter. Since a display can be written which creates and schedules another display task, the interpreter is allowed to call task manager functions. Up to ten display tasks are permitted to run concurrently in a manner shown in Table 200.

TABLE 200

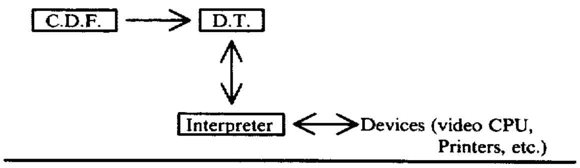

There are two display tasks which behave a little differently, primarily because they serve to create CDF's rather than read them. These are the designer editor and the configuration editor. Otherwise these display tasks behave identically to all other display tasks in the MMI.

Task Scheduler

The task scheduler keeps track of the status of all tasks within the MMI system (both system tasks and display tasks) and keeps this information available for whatever system task might need it. This information is located in the cosmic data area within the task scheduler to make it accessible to whichever task needs it.

The primary function of the task scheduler is to process requests from tasks to introduce new tasks into the system or to eliminate one that is already there. The user can create a CDF which can request that another task be started up either in addition to the one which issued the request or to replace it.

All MMI tasks have access to the task scheduler functions. For a display task to be run within MMI a "spawn" request must be made to the task scheduler. There are two types of spawn request, SPAWN and SPAWN SUBTASK. The difference between the two is primarily in the way the processes they create are terminated. A SPAWN creates an independent process which, when terminated, cleans up and dies without affecting any other processes. SPAWN SUBTASK, on the other hand, creates a subordinate process to the one that issued the SPAWN SUBTASK request. When the parent process is terminated, all of its subtasks are also terminated.

When spawning a task, only two things need be specified: (1) a configured display file to run and (2) an execution priority. Priority levels are limited to the range 0 . . . 10, with 10 being the highest priority.

Once spawned a task can be referred to by its handle (called a dtHandle) which is returned to its parent through spawn. Other task scheduler functions work in a similar manner, referring to a task through its dtHandle.

Once a display task is spawned, it is scheduled for execution. A display task can be scheduled to run immediately or with a delay. A display task can also be started up given a time of day.

A task may be removed from the system and returned to the pool of free display tasks. If necessary, a display task can have its execution suspended either for an amount of time or conditional on some event.

Scheduler Functions

Scheduler functions are available to all MMI host software as a collection of reentrant functions.

Table 201 is a list of functions provided by the Task Manager.

TABLE 201

| | |
|---|---|
| SPAWN (dtHandle,cdf,priority,status); | |
| function: | To enter a new task into the MMI system. |
| inputs: | cdf = Configured Display Filename |
| returns: | dtHandle = Display Task Index<br>status = ok, no more dts |
| SPAWN SUBTASK (dtHandle,cdf,priority,status); | |
| function: | To enter a subtask into the MMI system, subordinate to the display task that issued the command. |
| inputs: | cdf = Configured Display Filename |
| returns: | dt Handle = Display Task Index<br>status = ok, no more dts |
| SCHEDULE (dtHandle,when,status); | |
| function: | A task, once spawned, can be scheduled for execution. |
| inputs: | dtHandle = Display Task Index<br>when = delay or time of day |
| returns: | status = ok, error |
| REPLACE (dtHandle1,dtHandle2,status); | |
| function: | The task described by dtHandle1 is to be replaced by the task described by dtHandle2. Both tasks must be designed to occupy the same physical dimensions as the same video CPU window is to be used. |
| inputs: | dtHandle1 = Display Task Index for task to be replaced.<br>dtHandle2 = Display Task Index of replacement task. |
| returns: | status = ok<br>error display task 1 does not exist<br>error display 2 has not been spawned. |
| SLEEP (dtHandle,status); | |
| function: | To suspend execution of a task. |
| input: | dtHandle = Display Task Index |
| returns: | status - ok<br>error |
| WAKE (dtHandle,status); | |
| function: | To continue execution of a task which has been suspended. |
| input: | dtHandle = Display Task Index |
| returns: | status = ok<br>error |
| KILL (dtHandle,status); | |
| function: | To remove a task from the MMI system. If the task has any subordinate subtasks, they are killed also. |
| inputs: | dtHandle = Display Task Index |
| returns: | status = ok, error |
| RETIRE (dtHandle,status); | |
| function: | After a task has completed its current cycle, it will be KILLed. |
| input: | dtHandle = Display Task Index |
| returns: | status = ok<br>error |
| QUERY (dtHandle,state,status); | |
| function: | To query about the state which a task is in. |
| input: | dtHandle = Display Task Index |
| returns: | state = nonexistent<br>dormant<br>pending<br>running<br>suspended<br>status = ok<br>error |

State and Transition Diagram

Figure 71:
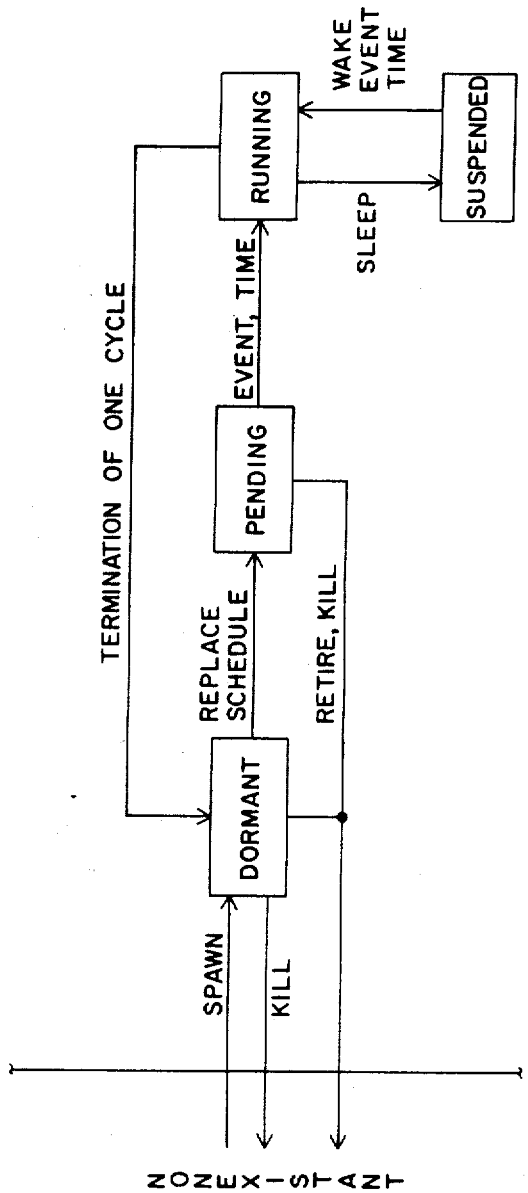
FIG. 71 is a state and transition diagram for the task manager.

FIG. 71 illustrates the state and transition diagram for the task manager.

RESOURCE MANAGER

Overview

The resource manager (RM) serves as the middleman between the application tasks and the MMI system resources. It controls the flow of all communication between host tasks and such resources as video station touch screens, video station windows, video station keyboards, and printers. The information to be passed between the tasks and the resources is in the form of messages.

The resource manager simplifies the work of the application tasks with regards to communication with a system resource by allowing each task to reference a desired resource by means of a logical unit number (LU) and an exchange number. When a task desires to communicate a particular resource, it informs the RM of its intentions and passes to the RM an exchange number. The exchange number must be a positive non-zero integer for any video station resource and zero for a printer. If the resource wanted is available and healthy, the RM allocates an LU to the specified resource and returns the logical unit to the requesting LU number or by its associated exchange number. No two tasks are the same LU when requesting a resource. The procedure to be called by the task requesting a specific resource is the ASSIGNLU procedure. The RM maintains a table of each logical unit number, a flag indicating whether the LU is available or not, and the exchange number associated with the LU if the LU has been given to a specific task.

The resource manager consists of processes in addition to several other procedures. Two processes are initially needed since there are two video stations to be monitored. If additional video stations become part of the system, then the number of processes must be increased. In other words, one process must be created and activated for each video station in the system. A process constantly inspects for messages from its associated video station by waiting at the appropriate exchange until released by an incoming message from the video station. The message sent from the video station resides in a buffer whose address is sent to the video station by the polling process. This buffer is used for error returns, button pushes, video station responses, and keyboard inputs. Once a process receives a message, it examines the table for the task which is associated with the resource from which the message was just received and copies the message into a separate table where it may be retrieved by the task when desired. If no task is connected to the resource via a logical unit, then the message is discarded. No exchanges are needed between the RM and the printer since this resource is incapable of generating unexpected messages. Messages received from the video station always contain in the first byte the window number from which the message was generated. This information is needed by the RM in order for it to associate the message with the correct logical unit number.

When a task desires to obtain information from a particular resource with which it is connected via an LU, the task must wait at the exchange number which was passed to the RM when the particular resource was allocated. When the resource manager gets a message from any resource, it queues the address of the message at the exchange which is associated with that particular resource. Thus, when the task waits at the exchange, it obtains the earliest message sent to that exchange.

Each allocated resource is given a unique logical unit number, however, several resources may be linked to the same exchange number. Therefore, when a task waits at an exchange to receive a message, the message it receives may be from one of several resources or not even from a physical resource at all but rather from another task such as the task manager, the interpreter, etc. The receiving task may determine where the message came from by examining the second byte of the message itself. This byte contains a character indicating the "message type." The exact format of all messages as well as a further explanation of "message types" is given later in this section.

Some of the messages the resource manager receives from a video station are queued up in a fixed sized table. The table consists of 32 buffers, each message occupying one of these buffers regardless of its size. Each buffer in the table is 132 bytes long, allowing for 4 bytes of necessary information about the message itself, followed by 128 bytes of actual message. Before copying a message just received from a video station window, the RM waits at the "free buffer" exchange. There is a corresponding SEND at this exchange only if there is an available buffer in the message table for the video station message to be copied into. Initially, there are 32 SENDS at this exchange since there are locations for 32 messages in the table. The address of each available buffer is queued at this exchange so that when the RM waits at this exchange for a free buffer, it not only is told when a buffer is available, but also obtains the address of the buffer.

When a task receives a message by waiting at the appropriate exchange, the message is not cleared from the message table because only the address of the message is given to the task. Eventually the table becomes full if no message is released after it is taken by a task. Therefore, it is the responsibility of the task to first copy the message into its own buffer area and then call the procedure FreeMessB which performs a SEND to the "free buffer" exchange returning the address of the message buffer just used. Thus, all addresses queued at the "free buffer" exchange are message buffers which may be considered empty and available for re-use by the resource manager. A full table, indicated by no SENDs at the "free buffer" exchange causes the RM to wait indefinitely at this exchange and consequently prohibis the video stations from inputting any additional messages. The system at this point will basically be in a halt state and will only proceed once some tasks accept some of the messages in the message table.

If a task desires to output a command or information to a resource, then it may use the resource manager procedure WRITERES. The task indicates which LU it wishes to address, and the resource manager, by means of the table which maintains what resource is connected to each LU, sends the information on to the appropriate resource. The information going to the resources follows the same message protocol as information coming from the video stations, however, the format of the messages themselves is slightly different. All message formats are discussed in greater detail later.

The fact that a task is given a logical unit number by the RM for a desired resource indicates that no other task wishes to communicate with that specific resource at that time. However, since another task may be in need of the resource at a later time, the task currently possessing the access rights to that resource must make sure that it relinquishes these rights once it has no further need to communicate with the specific resource. A task indicates that it has no further need to communicate with a resource by calling the RM procedure RELEASELU. Resources are assigned to tasks on a first come, first serve basis. Therefore, a task which must have a particular resource before it can proceed requests the resource, and if not available, waits for a short time period and then request the resource again. This process is repeated by the task until it gets the desired resource.

Message Formats

Messages incoming to the RM from a video station as well as messages to be sent to a video station from a task must all be in certain formats.

Messages from a video station to a task or to the RM have the following form:

| window # | MSG type | byte count | MSG |
|---|---|---|---|
| 1 byte | 1 byte | 2 bytes | |

When the RM receives a message from the video station either for itself or to be passed on to a task, it not only receives a pointer to the message but also receives a pointer to a header. The first four bytes of the message area contain information (window #, MSG type, byte count) which may also be found in the header. The RM examines this information in the header in order to determine what to do with the message. Since the task which the RM transfers the address of the message to does not have access to the header information, it is necessary to include these four bytes of information in the message area itself.

The window # is the video station window from which the message was sent. This number is needed by the RM in order for it to determine at which exchange the message is to be queued. The first window in a video station is numbered 0, the second is numbered 1, and so on. The window # is zero for any message coming from a keyboard.

The message type is a number from 0 to 255 indicating one of the following:

| TYPE VALUE | MEANING |
|---|---|
| 0 | ACKNOWLEDGE (Message-is a video station acknowledgement that it received the information sent to it by a call to WRITERES.) |
| 1 | RESPONSE (Message is in response to a request by a task.) |
| 2 | BUTTON (Message is a result of a button push.) |
| 3 | KEYBOARD (Message was sent from a keyboard.) |
| 4 | ERROR (Message indicates an error condition.) |

If a message is simply an acknowledgement, then it is for the resource manager's use only and is not sent on to any task. There is no actual physical message accompanying a video station acknowledgement. Once the RM examines the MSG type in the header and realizes it is simply a video station acknowledgement, it does not look any further for an accompanying message. Messages of the other types are sent on to the task connected to the sending window or keyboard.

The byte count simply informs the task of the number of bytes in the message itself. The byte count is zero if the message is an acknowledgement from the video station.

MSG is the actual message information. For messages of all types other than acknowledgements, this area may be up to 128 bytes long. The MSG area is undefined for messages which are simple acknowledgements.

Messages to the video station from a task or the RM is given below:

| type | byte count | (colon) | CNTL W | window # |
|---|---|---|---|---|
| 1 byte | 2 bytes | 1 byte | 1 byte | 1 byte |
| | | MSG | | |

The type is supplied by the RM regardless of where the message is coming from. The type is a number from 0 to 255 indicating one of the following:

| TYPE VALUE | MEANING |
|---|---|
| 0 | ACKNOWLEDGE/MSG |
| 1 | INITIALIZE |
| 2 | TASK MSG |

When the RM is initialized or booted, part of its initialization procedure is to send to each video station the exchange number associated with the video station and the address of the message area it is to use. Thus an "INITIALIZE" message must be sent to each video station passing it the necessary information. When a video station sends a message, the RM copies the message into a buffer in the message table, if a buffer is available, and sends an acknowledgement (ACK/MSG) to the video station. Similar to acknowledgements from the video station, RM acknowledgements require no actual physical message but are indicated in the header which is sent to the video station. A message of the type "TASK MSG" is one that is being sent from a task to a video station via a call to the procedure WRITERES.

The byte count is supplied by the sending task and is the number of bytes in the MSG. The byte count is zero for the acknowledgement type.

The area labelled MSG is the message being sent to the video station from a task. Even though this message comes from a task, the first three bytes of this area are filled by the RM with some important command characters. The first byte contains a colon, the second a CNTL W, and the third the window number to which the message is to be sent.

Communication to and from the Resource Manager

Figure 72:
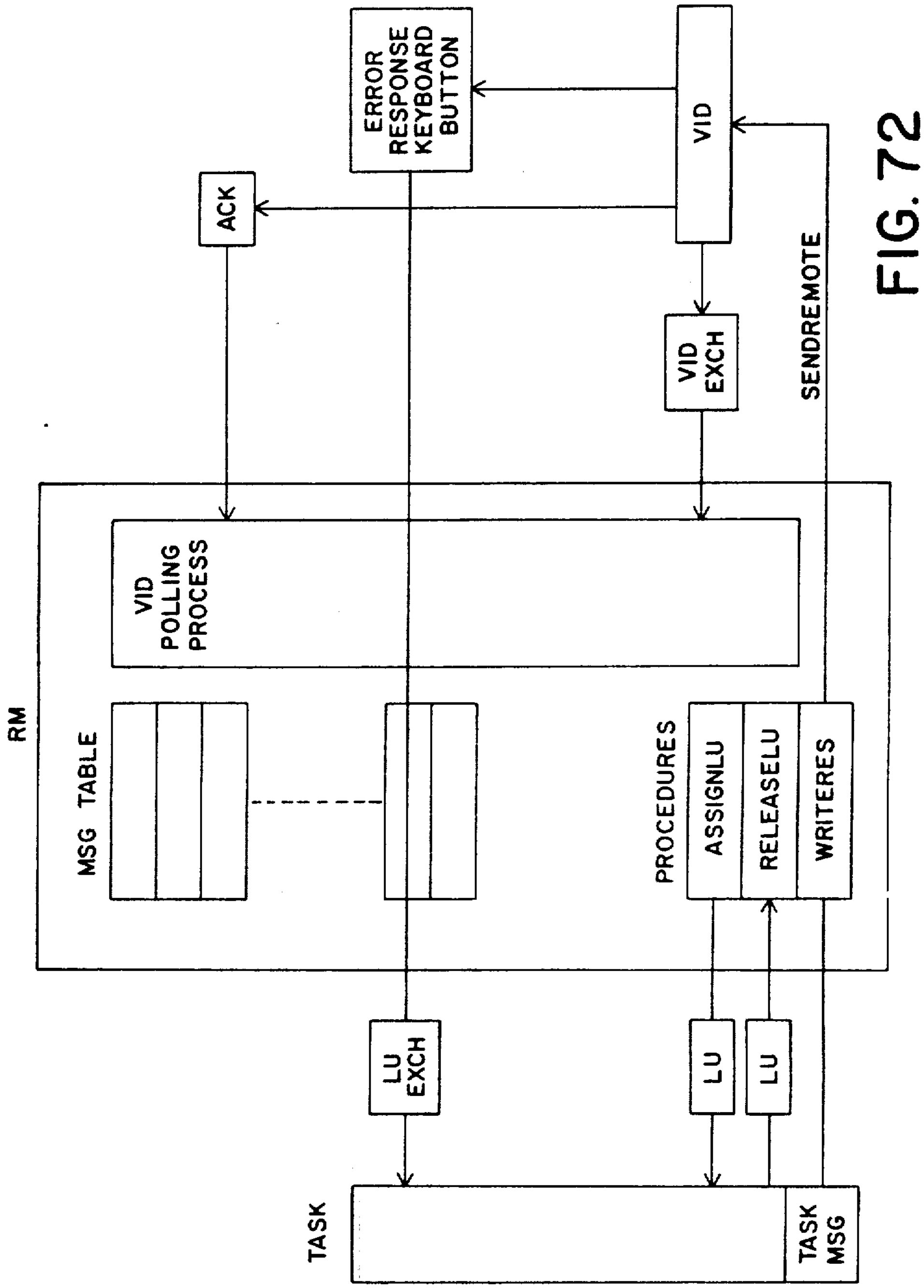
FIG. 72 is an overall block diagram of the resource manager operation.

FIG. 72 gives a simplified picture of the flow of all communications to and from the resource manager.

Initialization

The resource manager sets up and allocates if necessary the memory needed for messages to be sent from a video station to a task destination. This is necessary since a video station is unable to allocate memory for its own needs. A message buffer of 128 bytes is allocated for each video station in the system. Each video station is sent the address of the buffer allocated for it.

The resource manager allocates the necessary exchanges and informs each video station of the exchange number to be used in all communication between the RM and that particular video station.

The resource manager initializes the table where the logical unit numbers are allocated, along with information on the system resource to which each is associated.

The board number and status of each video station must be obtained and set aside for future reference.

Memory is set aside as a place to queue up the messages received from the different LU's until they are requested by a specific task. A table which is constructed out of this memory must be initialized at this time.

The "free buffer" exchange is allocated and 32, SENDs are issued to the exchange since 32 is the total number of message buffers available in the message table. A SEND at the exchange informs the RM that a buffer is available for storage of a message from the video station. Initially, all 32 buffers are available.

Memory for the resource manager's data base must be allocated. Approximately 7K bytes of memory are needed.

Headers which are allocated as part of the data base must be initialized. The host board number must be put into each header in the "Sender Board ID" field.

An exchange number for each printer must be allocated. These exchanges are needed in order to prevent two tasks from trying to output to the same printer at the same time.

Header exchange numbers must also be allocated. This is to prevent two or more tasks from attempting to output to the same video station at the same time.

The array whose indices are the LUs of the resources must be initialized. Each element of the array is a record containing two variables. The first is used to indicate if the LU has been assigned to a task or not, while the second contains the exchange number associated with the LU if the LU has been assigned. Both of these variables must initially be zero for every record in the array.

System Requirements and Restrictions

Certain restrictions and requirements are necessary to guarantee the proper communication between a task and its associated resources. Some of these requirements include the following.

The resource manager processes must run at a higher priority than any of the display tasks.

When an LU is released by a call to the procedure RELEASELU, any messages already queued at the exchange that were associated with that LU are left there. When a task waits at an exchange for a message, it can easily determine if the message is associated with an existing LU by checking the window # which is part of the message itself. The ASSIGNLU procedure not only provides the task with an LU for the desired resource but also reports which video station window it is associated with if a window was requested.

A task does not put any information in the first, fourth, fifth,and sixth bytes of a message it is to send to the video station. The task must put the byte count of the message in the second and third bytes of the message buffer it is to send to the video station.

All 132 bytes of the buffer which is given to a video statio it to put messages into must lie on a single physical page (64K bytes long) and not cross page boundaries.

Table Specifications

INTRO—There are a fixed number of devices to which logical units (LU's) are always assigned. For example, video station 1, window 1 is always LU 2. The resource manager always makes sure that the devices for which an LU is requested is in existence.

TABLE—For each static LU there is an element of an array wnich itself contains a record with the necessary information to keep track of the requests for the devices. One of the elements of the record is an exchange which is given to the RM by the caller of ASSIGNLU, where the messages directed toward the LU are queued.

There is an LU for each window in each video station, one for each keyboard on each video station, and one for output devices such as the printer. The video station resources, keyboards and windows are always assigned the lower logical unit values while the printers are given the higher LU numbers. The video station logical unit numbers are fixed, but the printer LU's are not. Assuming 6 windows and 1 keyboard per video station, then video station 1 is always LU's 1 through 7, video station 2 always LU's 8 through 14, video station 3 is always LU's 15 through 21, and so on. The printer LUs change, however, with the addition of new video stations to the system. If the system initially has 2 video stations using LUs 1 through 14, then the first printer is LU 15, the second printer is LU 16, and so on. Should a third video station be added to this system, it is given LUs 15 through 21, thus moving the first printer to LU 22, the second printer to LU 23, and so on. It is also important to note that a video station's keyboard is always given the first LU number of the group of LU numbers associated with that video station.

When requesting a window, the applications request the video station and the resource manager allocates the first available window. If no windows are available, an error message is returned to the application. Keyboards and the printer are requested directly by the applications, and when the requested LU is already taken by some process, an error message is returned to the process making the ASSIGNLU call. The literal strings to be used when requesting a specific resource are listed in Table 205 along with the logical unit assigned to each device.

TABLE 205

| DEVICE | | DEVICE NAME | LU # DECIMAL |
|---|---|---|---|
| VID 1 | KBD | KBD1 | 1 |
| VID 1 | WINDOW 1 | VID1 | 2 |
| VID 1 | WINDOW 2 | VID1 | 3 |
| VID 1 | WINDOW 3 | VID1 | 4 |
| VID 1 | WINDOW 4 | VID1 | 5 |
| VID 1 | WINDOW 5 | VID1 | 6 |
| VID 1 | WINDOW 6 | VID1 | 7 |
| VID 2 | KBD | KBD2 | 8 |
| VID 2 | WINDOW 1 | VID2 | 9 |
| VID 2 | WINDOW 2 | VID2 | 10 |
| VID 2 | WINDOW 3 | VID2 | 11 |
| VID 2 | WINDOW 4 | VID2 | 12 |
| VID 2 | WINDOW 5 | VID2 | 13 |
| VID 2 | WINDOW 6 | VID2 | 14 |
| NOT IMPLEMENTED | | | |
| VID 3 | KBD | KBD3 | 15 |
| VID 3 | WINDOW 1 | VID3 | 16 |
| VID 3 | WINDOW 2 | VID3 | 17 |
| VID 3 | WINDOW 3 | VID3 | 18 |
| VID 3 | WINDOW 4 | VID3 | 19 |
| VID 3 | WINDOW 5 | VID3 | 20 |
| VID 3 | WINDOW 6 | VID3 | 21 |
| VID 4 | KBD | KBD4 | 22 |
| VID 4 | WINDOW 1 | VID4 | 23 |
| VID 4 | WINDOW 2 | VID4 | 25 |
| VID 4 | WINDOW 3 | VID4 | 25 |
| VID 4 | WINDOW 4 | VID4 | 26 |
| VID 4 | WINDOW 5 | VID4 | 27 |
| VID 4 | WINDOW 6 | VID4 | 28 |
| PRINTER1 | | PTR1 | 15 |
| PRINTER2 | | PTR2 | 16 |
| | | LU allocation | |

Resource Manager Data Base

The components of the resource manager's data base are described below.

LU—An array whose indices are the logical units for the resources. Each element of the array is a record containing two variables. The first one, "Semaphore," contains the value 0 if the device is available, 1 otherwise. The second variable, "ResponseExch" contains the exchange number associated with that LU. The exchange number is obtained when the LU is assigned to a specific task. Its value is zero if the LU has not been assigned to a task or if the LU is for a printer.

Buffer Table—A 32 element array whose elements are the message buffers into which video station messages are to be copied. Each buffer is 132 bytes long.

VidMessage—An array containing the message areas to be used by the video stations when they wish to send a message to the RM. Each message area is 132 bytes long, and there is one for every video station in the system.

VidExch—An array containing the exchange numbers to be used in communicating with the video stations. There is an exchange number for each video station in the system.

VidNum—Contains a value which indicates to each polling process the video station number it is to monitor. The first process to access "VidNum" finds the value 1 in it, and it monitors video station 1. This same process then increments "VidNum" by one so when the next polling process references "VidNum" it finds the number 2 in it and thus monitors video station 2. This procedure continues for all the polling processes.

RMexch—An exchange number used by a process to lock out the database when it wishes to reference and/or change certain elements.

Header—An array of headers which are needed when a message is sent to a video station. Each header is a record containing the following elements:

| | |
|---|---|
| | Sender Board ID |
| | Sender Sub Type |
| | Destination Board ID |
| | Destination Sub Type |
| Message Pointer | Offset |
| | Segment |
| | ASR |
| | Message Priority |
| | Spare Field |
| | Spare Field |
| User Field | Window# / MSG Type |
| | Byte Count |

There is a header for each video station in the system.

HeaderExch— An array containing the exchange numbers used to protect the header for each video station. These exchange numbers prevent two or more processes from writing to a video station at the same time. Once a task outputs a message to a particular video station, it waits at the corresponding HeaderExch for an acknowledgement from the video station. One header exchange number is needed for each video station in the system.

PtrExch— An array containing an exchange number for each printer in the system. Use of these exchange numbers prevents two or more tasks from outputting to the same printer simultaneously.

FreeBuffExch— Exchange where the addresses of available message buffers are queued.

Resource Manager Procedures

ASSIGNLU

To allocate a resource, a reference to ASSIGNLU must be made. This call determines if the device requested is available and if it is, returns its LU number and window number. If the device is not available a status message of −300 is returned.

The form of the call is:

ASSIGNLU (LU, window i, e, m)

where:

VAR LU is the Resource Managers Logical Unit assigned to the Device. This LU number always remains in effect until the device is removed.

VAR window is the window number allocated if the request is for a video station window.

i is an Lstring which contains the name of the device (See Table 205 for the naming convention).

e is the exchange at which all messages for the logical unit are queued. Multiple LU's may have the same exchange.

VAR m returns the status of the request. All error returns are negative numbers in the range of −300 < = m < = −399. A value of one (1) is returned if the request is accepted.

where m=

−300 The device is not available

−306 The device does not exist (invalid device name)

RESLEASELU

To allow an ASSIGNed device to be accessed by other processes a reference to RELEASELU must be made. A call to RELEASELU by a task makes the resources referenced by that LU no longer available to the task.

The form of the call is:

RELEASELU (LU, m)

where:

LU is the logical unit number returned from the call to ASSIGNLU

VAR m is the status of the call where m=

−305 Invalid Logical unit specified (no such LU)

WRITERS

A reference to WRITERES causes the caller to pass a message to the specified device which is associated to the given LU number.

The form of the call is:

WRITERES (LU, p, m)

where:

LU is the Logical Unit to be written to

P is the pointer to the message to be passed to the device

VAR m is the status of the call where m=

−303 Attempt to write to a keyboard

−304 Lu specified has not been assigned to any task

−305 Invalid logical unit specified (no such LU)

FreeMessBuff

After a task has copied a message from a message buffer into its own storage area, it must inform the RM that the message buffer is available for re-use. This is accomplished by a call to FreeMessBuff. This procedure first checks to see if the address passed to it is truly that of a valid message buffer. If it is, then it puts the address on the "free buffer" exchange by performing a SEND to that exchange. When a polling process gets a message from a video station it waits at the "free buffer" exchange in order to get the address of an available message buffer to copy the video station message into.

The form of the call is:

FreeMessBuff (pMSG, status)

where:

pMSG is the address of the message buffer to be made available

VAR status—returns the status of the call where status=

−301 Address is is not that of a valid message buffer.

WaitWithTO

The WaitWithTO function allows a task to wait for a message at a particular exchange and return from waiting when it has either received a message or when a specified time limit has elapsed.

The form of the call is:

status = WitWithTO (exch, TOvalue, ppmesbuff)

where:

exch is the exchange number to wait at

TOvalue is the maximum amount of time (in units of 100 milliseconds) the task wishes to wait for a message. Maximum value allowed is 65535 which corresponds to 6553.5 seconds or 109.225 minutes.

ppmesbuff must contain address of where the address of the incoming message is to be placed.

status contains the status of the call where status=

1 A message was sent to the exchange before the indicated time limit

−302 No message was input to the exchange within the specified time.

It is in the above described manner that the Resource Manager performs the interfaces between the application tasks and the man machine interface system resources.

APPENDIX A

```
program mrd1(input,output);

{$INDEXCK-}
{$RANGECK-}

TYPE

   BUFFER  = packed array[0..1023] of char;
   adsBUFF = ADS OF BUFFER;
   BUTTON  = PACKED ARRAY [WRD(0)..4] OF CHAR;
   adsBUTT = ADS OF BUTTON;
   lstr    = lstring(100);

VAR
  BUFF   : BUFFER;
  nc: integer;
  buflimit: integer;
  i : integer;
  ch : char;
  BUTT : BUTTON;
  Vstat : BYTE;

function  OpenVid:integer;              EXTERN;
procedure SENDVID(p:adsBUFF;k:integer);EXTERN;
procedure GetButton(p:adsBUTT);         EXTERN;
function  VidChar: byte;                EXTERN;
function  VidBsy: boolean;              EXTERN;
function  EOB: boolean;                 EXTERN;
function  EOV: boolean;                 EXTERN;
function  VidStat: byte;                EXTERN;
procedure initDMA;                      EXTERN;
```

```
procedure becho;                    {procedure becho - button echo}
  begin
    initDMA;                                  {init dma}
    if OpenVid <> 0 then return;              {if vid isn't open then return}
    while true do begin                       {repeat until a break is done}
      write('>');                                     {write prompt char to ct vid}
      i := 0;                                         {read a bunch of chars into buff[0..]}
      read(ch);
      while not eoln do begin
        buff[i] := ch;
        i := i + 1;
        read(ch);
        end;
      if i = 0 then break;                            {if line was empty then break out of here}
      SENDVID(ADS BUFF , i);                          {send the buffer to the vid}
      While VidBsy do begin                           {as long as the vid is busy do the following}
        while not EOB do begin                                {while EOB is false}
          GetButton(ADS BUTT);                                        {get button code and display
 writeln('Button Push ....     ',butt[1],butt[2],butt[3],butt[4])
 end;
while not EOV do writeln('Response Byte = ', VidChar:3);        {while eov is false display vidcl
end;

   Vstat := VidStat;                                  {read the vid status}
   if Vstat <> 0 then begin                           {if not zero then}
     writeln('VID-88 ERROR STATUS ( ',Vstat:2,' )');          {display the error}
     break                                                    {and break out of here}
     end;
   end;
 end;
```

```
procedure disp(s:lstr);{procedure disp :  display graphics commands}
  var
    j: integer;
  begin
    for j:=1 to ord(s[0]) do begin {add the string to the buffer}
      buff[nc]:=s[j];
      nc:=nc+1;
      end;
    if nc>buflimit then begin       {if the buffer is full enough then}
      while vidbsy do;                      {wait until vid ready}
      sendvid(ads buff, nc);                {ship it to the vid}
      Vstat := VidStat;                     {read the vid status}
      if Vstat <> 0 then begin              {if not zero then}
        writeln('VID-88 ERROR STATUS ( ',Vstat:2,' )'); {display the error}
        end;
      nc:=0; {clear the buffer}
      end;
    end;
procedure disptext(s:lstr);
  var
    j: integer;
  begin
    buff[nc]:='G'; nc:=nc+1;         {add 'enter text mode' to buffer}
    for j:=1 to ord(s[0]) do begin   {add the string to the buffer}
      buff[nc]:=s[j];
      nc:=nc+1;
      end;
    buff[nc]:=chr(20); nc:=nc+1;     {add 'enter graphics mode' to buffer}
    if nc>buflimit then begin        {if the buffer is full enough then}
      while vidbsy do;                      {wait until the vid is ready}
      sendvid(ads buff,nc);                 {send it to the vid}
      Vstat := VidStat;                     {read the vid status}
      if Vstat <> 0 then begin              {if not zero then}
        writeln('VID-88 ERROR STATUS ( ',Vstat:2,' )');{display the error}
        end;
      nc:=0;                                  {clear the buffer}
      end;
    end;
```

```
                                      — Move Absolute
procedure loop_display;
  begin
                                       !start side trip
    disp('{');
                                       !clear a big box to black
    disp('0 b 0 0 M 50 150 c');
                                            — — Clear

                   — —Draw Box
                                — — _ Background Color
                                 !draw a border around it
disp('50 150 B');                      !dbox(dx,dg)
                                 !clear a vertical rectangle for the scale
disp('20 40 M 16 b 10 100 c');                  !clear a skinny rectangle
                                 !clear a red rectangle at the bottom of it for low alarm range
disp('1 b 10 15 c');
                                 !clear a rectangle at the top of it for high alarm range
disp('20 125 M 10 15 c');
                                 !draw a bunch of graduation marks
disp('15 40 M 5 0 L');— — Draw Line
disp('-5 10 m 5 0 L');—Move Relative
disp('-5 10 m 5 0 L');
disp('-5 10 m 5 0 L');
disp('-5 10 m 5 0 L');
disp('-5 10 m 5 0 L');
disp('-5 10 m 5 0 L');
disp('-5 10 m 5 0 L');
disp('-5 10 m 5 0 L');
disp('-5 10 m 5 0 L');
disp('-5 10 m 5 0 L');
                                 !Clear a rectangle on left side of bar for PV indicator
disp('0 40 M 0 b 15 100 c');
                                 !draw and clear a pentagonal indicator
disp('0 75 M0 10 L10 0 L5 -5 L-5 -5 L-10 0 L');
                                 !print the PV value inside it
```

```
disp('0 9 m');
disptext('999.9');
                        !clear a rectangle on right side of bar for SPT indicator
disp('30 40 M0 b15 100 c');
                        !draw and clear a pentagonal indicator
disp('30 90 M5 5 L10 0 L0 -10 L-10 0 L-5 5 L');
                        !print the spt value inside it
disp('5 4 m');
disptext('999.9');
                        !store a button on the right side for operator modify

disp('30 40 M1 20 20 #A #B #C #D J');

                        !clear a horizontal bar for the valve indicator
disp('0 20 M4  b50 10 c');
                        !clear a bar within it to represent valve position
disp('0 2 m3 b25 6 c');
                        !clear rectangle on left end for slew closed button
disp('0 20 M1 b15 10 c');
                        !put in slew closed button

disp('1 15 10 #a #b #c #d J');

                        !clear rectangle on right for slew open button
disp('35 20 M2 b15 10 c');
                        !put in slew open button

disp('1 15 10 #a #b #c #d J');
```

```
                              !print valve position in center of bar
    disp('20 28 M');
    disptext('50%');
                              !put up ACK button for alarm
    disp('0 10 M2 b20 10 c');
 {
    disp('1 20 10 #a #b #c #d J1 9 m');
 }
    disptext('ACK');
                              !Put up AUT button
    disp('20 10 M2 b20 10 c');
 {
    disp('1 20 10 #a #b #c #d J1 9 m');
 }
    disptext('AUT');
                              !Put up REM button
    disp('0 0 M 2 b20 10 c');
 {
    disp('1 20 10 #a #b #c #d J1 9 m');
 }
    disptext('REM');
                              !Put up MIMIC button
    disp('20 0 M2 b20 10 c');
 {
    disp('1 20 10 #a #b #c #d J1 9 m');
 }
    disptext('MIMIC');
                              !Put up DETAIL button
    disp('40 0 M2 b10 20 c');
 {
    disp('1 10 20 #a #b #c #d J1 14 m');
 }
    disptext('DETAIL');
                              !put legend at top
    disp('0 150 M');
    disptext('LOOP DISPLAY');
                              !end side trip
    disp('}');
    end;
procedure group_display;
  var
    i: integer;
  begin
    disp('0 0M 0b 480 312c');
    disp('0 160M');
    for i:=1 to 6 do begin
      loop_display;
      disp('60 0m');
      end;
    end;

procedure test;
  var
```

```
  i: integer;
begin
  if OpenVid <> 0 then return; {if vid isn't open then return}
  write('Start the Vid. Then input buffer limit (i.e. 0-900)');
  readln(buflimit);             {read the buffer limit}
  nc:=0;                        {clear the buffer}
  while true do group_display;          {do loop display forever}
  end;

begin
  test;
  end.
```

What we claim is:

1. A man-machine interface for design, configuration and operation of an interconnected external process control system comprising:

(A) a monitor having means for the display of information to the designer, configurer and operator, and for the receipt of information from the designer, configurer and operator;

(B) means for generating video signals in response to graphic commands and for presenting an overall display on the monitor corresponding to the received graphic commands;

(C) means for processing information, including the processing of designer, configurer and operator information, said information including the updating of database variables associated with the process control system, and further for generating graphic commands for use by the video signal generating means, wherein the graphic commands may be referenced to database variables (D) means for the storage of randomly addressable information, said information including a high level graphic language for defining and implementing the graphic commands and variables, the high level graphics languages including means, in association with said monitor information receipt means, for the creation of displays and subpictures, wherein subpictures are collections of user selected or predefined display language commands that each perform a logical function, including functions that perform graphics, and wherein displays are collections of one or more subpictures that may be graphical in nature; wherein the created subpicture commands are selected in static or dynamic mode, wherein if selected in static mode, the features drawn are assumed to be unaffected by database variables and such features are therefore only drawn once on the monitor, and wherein if the commands are selected in dynamic mode, bhe features are assumed to be affected by database variables and are redrawn at a predetermined rate on the monitor means so that the dynamic commands of the subpictures displayed on the monitor can be rapidly updated;

(E) means for communicating with the external process control system so that the process control system can be designed, configured and monitored by the man-machine interface; and (F) means for the transfer of information between the monitor, video generating means, the processing means, the memory storage means, and communicating means.

2. A man-machine interface as defined in claim 1, further wherein the graphic language for presentation of information on the monitor further uses variables whose types are determined by the value os the variable on a dynamic basis; whereby the variable type can change for the same variable as it is used in the design, configuration, or operation of an external process control system.

3. A man-machine interface as defined on claim 1, wherein the graphic commands further define default variables so that the video generating means can generate an overall display even if some of the variables within the commands defining the overall display are undefined.

4. A man-machine interface as defined in claim 1, wherein the monitor is of the raster scan type and further wherein the video generating means comprises a video central processing unit (video CPU) for interpreting graphic commands from the processing means and also comprises a bit map memory for storage of information for each pixel of the monitor for each primary color presentable on the monitor, and wherein said video generating means further comprises means for performing Boolean operations on data read from the bit map memory and data received from the video CPU for a corresponding pixel, wherein the result of the Boolean operation is written back into the same memory location of the bit map memory; thereby providing that the video data to be presented on the monitor can be rapidly altered in the bit map memory without the need for the video CPU to perform read, bit manipulation, and write operations to each memory location in the bit map memory for which a change is desired.

5. A man-machine interface as defined in claims 1 or 4, wherein the video generating means further comprises means for performing bit shift operations for the bits associated with any addressable memory locations in the bit map memory.

6. A man-machine interface as defined in claim 5, wherein the bit shift operations includes:

(A) to shift the bits in a byte one bit to the right, with wraparound;

(B) to shift the bits in a byte one bit to the left, with wraparound; and (C) to shift the bits in oen byte to an adjacent vertical byte.

7. A man-machine interface as defined in claims 1 or 4 wherein the monitor includes a touch screen and wherein the monitor receives information from said touch screen.

8. A man-machine interface as defined in claim 7, further comprising a keyboard communicating with said monitor, and wherein information is further received by said keyboard.

9. A man-machine interface as defined in claim 4, wherein the video generating means further comprises a zone map and color palettes, each palette having a plurality of color entries (color RAM) wherein the monitor screen is divided into a plurality of zones, each zone defining a predetermined number of possible color types, each pixel in each zone defined in the bit map memory for each color plane, wherein the actual color presented to the monitor as associated by a particular display, corresponds to one of the color palettes for each zone and to one of the entries of the selected palette for each pixel in the corresponding zone.

10. A man-machine interface as defined in claim 1, wherein the means for the transfer of information comprises an overall bus having a public bus and a private bus, the public interconnected between each of the means which communicate information among themselves and the private bus interconnected between one or more pairs of means for the private transfer of information between the means forming each pair.

11. A man-machine interface as defined in claim 10, wherein the overall bus supports two independent address spaces, one for memory and another for input/output.

12. A man-machine interface as defined in claim 10, wherein the overall bus transfers signals in the following classes, (1) control lines, (2) address lines, (3) data lines, (4) interrupt lines, (5) bus exchange lines.

13. A man-machine interface as defined in claim 12, wherein the overall bus comprises 200 lines of which 60 lines are dedicated to the private bus and the remaining lines are dedicated to the public bus.

14. A man-machine interface as defined in claim 10, 12, or 13, wherein each module which communicates on the public bus comprises means for arbitrating control of the public bus (bus ownership) for the transfer or receipt of information from another means which can communicate on the public bus, and wherein this bus arbitrating means results in bus ownership being changed from one means to another on a rotating prioritized basis and wherein the public bus comprises bus priority lines, a bus busy line, and a common bus request line for indicating to the means communicating on the bus the priority status of the other means and the state of the public bus at any particular time.

15. A man-machine interface as defined in claim 14, wherein the processing means incorporates a central processing unit module (CPU module) which communicates with the memory means via the private bus and further wherein the man-machine interface comprises a second central processing unit module which communicates only on the public bus, and wherein the second central processing unit module (second CPU module) is provided privileged access to the public bus so that the rotating priority bus arbitration mechanism is altered so that all other means communicating on the bus have access to the bus on a serial prioritized basis but wherein the second CPU module has access to the bus on a 50% duty cycle basis and wherein the bus arbitration means for each means further comprises means for storing information regarding the previous public bus owner whenever bus control is transferred to the second CPU module so that public bus ownership can be transferred back to the previous bus owner by the second CPU module.

16. A man-machine interface as defined in claim 15, wherein the bus comprises slot number lines which are used by each means communicating on the public bus so as to identify its location in the overall man-machine interface with respect to the public bus so that data transfers can be made to and from specific means on the bus through information contained in the slot numbers.

17. A man-machine interface as defined in claim 14, wherein the bus comprises slot number lines which are used by each means communicating oh the public bus so as to identify its location in the overall man-machine interface with respect to the public bus so that data transfers can be made to and from specific means on the bus through information contained in the slot numbers.

18. A man-machine interface as defined in claim 1 or 9, further comprising a soft interrupt mechanism for generating soft interrupts between a first means and a second means, both of which communicate with each other on the communicating means; wherein the soft interrupt mechanism comprises a dedicated area in the memory means for the storage of messages from the first means to be implemented by second means, wherein the first means wishing to interrupt the second means places a message in this dedicated memory area and sends an interrupt signal to the second means; whereby the second means when interrupted goes to the dedicated memory area which is reserved for it to read and execute its message.

19. A man-machine interface as defined in claim 18, wherein the dedicated memory area for the storage of messages for each of the means which can communicate on the bus, allows multiple messages to be stored for each of said means so that said multiple messages can be executed sequentially by the second means.

20. A man-machine interface as defined in claim 1 wherein at least some of the means incorporate an improved watchdog timeout mechanism, said mechanism requiring that different bit patterns be received by the watchdog mechanism on a predefined basis in order for the mechanism to be reinitialized, thereby preventing a time-out; and further wherein the watchdog mechanism requires that these varying bit patterns be received without the receipt of other information therebetween.

21. A man-machine interface as defined in claim 20, wherein the watchdog timer mechanism further comprises an arming circuit for disabling the output of the watchdog timer during power-up initialization so as to prevent an inadvertent timeout of the watchdog mechanism during the period of time that the means on which the mechanism is associated is being initialized.

22. A man-machine interface as defined in claim 1, wherein the graphic commands include the following:

move absolute, move relative, draw line, draw box, start polygon fill, end polygon fill, and draw arc.

23. A man-machine interface as defined in claim 22, wherein the graphic commands include alphanumeric characters.

24. A man-machine interface as defined in claim 10, wherein the memory means has a selectable region that is only accessible through the private bus.

25. A man-machine interface for design, configuration and operation of an interconnected external process control system comprising:

(A) a monitor of the raster scan type having means for the display of information to the designer, configurer and operator, and for the receipt of information from the designer, configurer and operator;

(B) means for generating video signals in response to graphic commands and for presenting an overall display on the monitor corresponding to the received graphic commands, wherein the video generating means comprises a video central processing unit (video CPU) for interpreting graphic commands from the processing means and also comprises a bit map memory for storage of information for each pixel of the monitor for each primary color presentable on the monitor, and wherein said video generating means further comprises means for performing Boolean operations on data read from the bit map memory and data received from the video CPU for a corresponding pixel, wherein the result of the Boolean operation is written back into the same memory location of the bit map memory; thereby providing that the video data to be presented on the monitor can be rapidly altered in the bit map memory without the need for the video CPU to perform read, bit manipulation, and write operations to each memory location in the bit map memory for which a change is desired;

(C) means for processing information, including the processing of designer, configurer and operator information, said information including the updating of database variables associated with the process control system, and further for generating graphic commands for use by the video signal generating means, wherein the graphic commands may be referenced to database variables;

(D) means for the storage of randomly addressable information, said information including a high level graphic language for defining and implementing the graphic commands and variables;

(E) means for communicating with the external process control system so that the process control system can be designed, configured and monitored by the man-machine interface; and (F) means for the transfer of information between the monitor, video generating means, the processing means, the memory storage means, and communicating means.

26. A man-machine interface as defined in claim 25, wherein the video generating means further comprises means for performing bit shift operations for the bits associated with any addressable memory locations in the bit map memory.

27. A man-machine interace as defined in claim 26, wherein the bit shift operations include:

(A) to shift the bits in a byte one bit to the right, with wraparound;

(B) to shift the bits in a byte one bit to the left, with wraparound; and (C) to shift the bits in one byte to an adjacent vertical byte.

28. A man-machine interface as defined in claim 27, wherein the monitor includes a touch screen and wherein the monitor receives information from said touch screen.

29. A man-machine interface as defined in claim 28, further comprising a keyboard communicating with said monitor, and wherein information is further received by said keyboard.

30. A man-machine interface as defined in claim 25, wherein the video generating means further comprises a zone map and color palettes, each palette having a plurality of color entries (color RAM) wherein the monitor screen is divided into a plurality of zones, each zone defining a predetermined number of possible color types, each pixel in each zone defined in the bit map memory for each color plane, wherein the actual color presented to the monitor corresponds to one of the color palettes for each zone and to one of the entries of the selected palette for each pixel in the corresponding zone.

31. A man-machine interface as defined in claim 30, further comprising a soft interrupt mechanism for generating soft interrupts between a first means and a second means, both of which communicate with each other on the communicating means; wherein the soft interrupt mechanism comprises a dedicated area in the memory means for the storage of messages from the first means to be implemented by the second means, wherein the first means wishing to interrupt the second means places a message in this dedicated memory area and sends an interrupt signal to the second means; whereby the second means when interrupted goes to the dedicated memory area which is reserved for it to read and execute its message.

32. A man-machine interface as defined in claim 31, wherein the dedicated memory area for the storage of messages for each of the means which can communicate on the bus, allows multiple messages to be stored for each of said means so that said multiple messages can be executed sequentially by the second means.

33. A man-machine interface as defined in claim 25, wherein at least some of the means incorporate an improved watchdog timeout mechanism, said mechanism requiring that different bit patterns be received by the watchdog mechanism on a predefined basis in order for the mechanism to be reinitialized, thereby preventing a time-out; and further wherein the watchdog mechanism requires that these varying bit patterns be received without the receipt of other information therebetween.

34. A man-machine interface as defined in claim 33, wherein the watchdog timer mechanism further comprises an arming circuit for disabling the output of the watchdog timer during power-up initialization so as to prevent an inadvertent time-out of the watchdog mechanism during the period of time that the means on which the mechanism is associated is being initialized.

35. A man-machine interface for design, configuration and operation of an interconnected external process control system comprising:

(A) a monitor having means for the display of information to the designer, configurer and operator, and for the receipt of information from the designer, configurer and operator;

(B) means for generating video signals in response to graphic commands and for presenting an overall display on the monitor corresponding to the received graphic commands;

(C) means for processing information, including the processing of designer, configurer and operator information, and further for generating graphic commands for use by the video signal generating means;

(D) means for the storage of randomly addressable information, said information including a high level graphic language for defining and implementing the graphic commands and variables;

(E) means for communicating with the external process control system so that the process control system can be designed, configured and monitored by the man-machine interface; and (F) means for the transfer of information between the monitor, video generating means, the processing means, the memory storage means, and communicating means, said transfer means comprising an overall bus having a public bus and a private bus, the public bus interconnected between each of the means which communicate information among themselves and the private bus interconnected between one or more pairs of means for the private transfer of information between the means forming each pair.

36. A man-machine interface as defined in claim 35, wherein the overall bus supports two independent address spaces, one for memory and another for input/output.

37. A man-machine interface as defined in claim 35, wherein the overall bus transfers signals in the following classes:

(1) control lines,
(2) address lines,
(3) data lines,
(4) interrupt lines,
(5) bus exchange lines.

38. A man-machine interface as defined in claim 37, wherein the overall bus comprises 200 lines of which 60 lines are dedicated to the private bus and the remaining lines are dedicated to the public bus.

39. A man-machine interface as defined in claims 38, wherein each module which communicates on the public bus comprises means for arbitrating control of the public bus (bus ownership) for the transfer or receipt of information from another means which can communicate on the public bus, and wherein this bus arbitrating means results in bus ownership being changed from one means to another on a rotating prioritized basis and wherein the public bus comprises bus priority lines, a bus busy line, and a common bus request line for indicating to the means communicating on the bus the priority status of the other means and the state of the public bus at any particular time.

40. A man-machine interface as defined in claim 39, wherein the processing means incorporates a central processing unit module (CPU module) which communicates with the memory means via the private bus and further wherein the man-machine interface comprises a second central processing unit module which communicates only on the public bus, and wherein the second central processing unit module (second CPU module) is provided privileged access to the public bus so that the rotating priority bus arbitration mechanism is altered so that all other means communicating on the bus have access to the bus on a serial prioritized basis but wherein the second CPU module has access to the bus on a 50% duty cycle basis and wherein the bus arbitration means for each means further comprises means for storing information regarding the previous public bus owner whenever bus control is transferred to the second CPU module so that public bus ownership can be transferred back to the previous bus owner by the second CPU module.

41. A man-machine interface as defined in claim 40, wherein the bus comprises slot number lines which are used by each means communicating on the public bus so as to identify its location in the overall man-machine interface with respect to the public bus so that data transfers can be made to and from specific means on the bus through information contained in the slot numbers.

42. A man-machine interface as defined in claim 35, wherein at least some of the means incorporate an improved watchdog timeout mechanism, said mechanism requiring that different bit patterns be received by the watchdog mechanism on a predefined basis in order for the mechanism to be reinitialized, thereby preventing a time-out; and further wherein the watchdog mechanism requires that these varying bit patterns be received without the receipt of other information therebetween.

43. A man-machine interface as defined in claim 42, wherein the watchdog timer mechanism further comprises an arming circuit for disabling the output of the watchdog timer during power-up initialization so as to prevent an inadvertent time-out of the watchdog mechanism during the period of time that the means on which the mechanism is associated is being initialized.

* * * * *